US005815400A

United States Patent [19]

Hirai et al.

[11] Patent Number: 5,815,400

[45] Date of Patent: Sep. 29, 1998

[54] MACHINING METHOD USING NUMERICAL CONTROL APPARATUS

[75] Inventors: Hayao Hirai; Akihiko Fujimoto, both of Aichi, Japan

[73] Assignee: Mitsubishi Denki Kabushiki Kaisha, Tokyo, Japan

[21] Appl. No.: 679,158

[22] Filed: Jul. 10, 1996

[30] Foreign Application Priority Data

Jul. 10, 1995 [JP] Japan .................................... 7-197308

[51] Int. Cl.[6] ............................ G06F 19/00; G06G 7/64; G06G 7/66

[52] U.S. Cl. ............................... 364/474.15; 364/474.24; 364/474.26; 364/474.11; 364/474.15

[58] Field of Search .............................. 364/468, 474.24, 364/474.11, 474.15, 474.14, 474.21, 474.26

[56] References Cited

U.S. PATENT DOCUMENTS

| | | | |
|---|---|---|---|
| 4,646,251 | 2/1987 | Hayes et al. | 364/518 |
| 4,937,768 | 6/1990 | Carver et al. | 364/571.01 |
| 5,465,221 | 11/1995 | Merat et al. | 364/474.24 |
| 5,481,465 | 1/1996 | Itoh et al. | 364/468 |
| 5,485,390 | 1/1996 | LeClair et al. | 364/474.24 |
| 5,510,995 | 4/1996 | Oliver | 364/474.24 |
| 5,532,933 | 7/1996 | Nakata | 364/474.24 |

FOREIGN PATENT DOCUMENTS

| | | | |
|---|---|---|---|
| A2 0199962 | 12/1986 | European Pat. Off. | B23Q 35/121 |
| A1 0207998 | 1/1987 | European Pat. Off. | G05B 19/403 |
| Al 0311703 | 4/1989 | European Pat. Off. | G05B 19/42 |
| A2 0431572 | 6/1991 | European Pat. Off. | G05B 19/18 |
| A2 0556049 | 8/1993 | European Pat. Off. | G05B 19/02 |
| 62-133504 | 6/1987 | Japan | G05B 19/403 |
| 2-15949 | 1/1990 | Japan | B23Q 15/00 |
| 2-36046 | 2/1990 | Japan | B23Q 15/00 |
| 2-109657 | 4/1990 | Japan | B23Q 15/00 |
| 3-81604 | 4/1991 | Japan | G01B 11/24 |
| 3-251907 | 11/1991 | Japan | G05B 19/403 |
| 4-75850 | 3/1992 | Japan | B23Q 15/00 |
| 4-148306 | 5/1992 | Japan | G05B 19/405 |
| WO 9323820 | 11/1993 | WIPO | G06F 15/46 |
| WO 9408751 | 4/1994 | WIPO | B23Q 15/00 |
| WO 9514278 | 5/1995 | WIPO | G06F 17/00 |

*Primary Examiner*—Reba I. Elmore
*Assistant Examiner*—Ramesh Patel
*Attorney, Agent, or Firm*—Sughrue, Mion, Zinn, Macpeak & Seas, PLLC

[57] ABSTRACT

A machining method in which a numerically controlled apparatus carries out a series of operations such as the determination of machining procedures, the selection of a tool, the preparation of a workpiece and inspection programs, machining operation, and inspection, required when a numerically controlled machine tool carries out a machining operation on the basis of input graphics and process information, using at least machine tool information, tool information, cutting condition information, material information, machining method symbol information, finishing symbol information, finishing allowance information, surface treatment information, information about thermal refining, and cost information, the method includes the steps of, while using electronic calculators including a numerical control unit, an FA system, and a personal computer, and a series of data processing units and machine tools, registering a variety of information files; inputting machining pattern data; processing a finished pattern; processing a machining pattern before a workpiece has finished undergoing another process; identifying the pattern; making a decision with regard to a machining process; and deciding whether or not material should be measured.

19 Claims, 170 Drawing Sheets

RETURN TO S2, AND THEN PROCEED TO S3

FIG. 12

RESULTS OF PATTERN IDENTIFICATION

| STAGE NO. | DIRECTION OF INPUT DATA | ANGLE OF CONSTITUENT LINE SEGMENT OF PATTERN | PATTERN CODE | COMMENT |
|---|---|---|---|---|
| 1 | X+ | 0 | IF | |
| 2 | Z+ | −90 | I | |
| 3 | X+ | 0 | IF | |
| 4 | Z+ | −90 | I | |
| 5 | X+ | 0 | IF | |
| 6 | Z+ | −90 | I | |
| 7 | X+ | 0 | IF | |
| 8 | Z+ | −90 | I | |
| 9 | X+ | 0 | IF | |
| 10 | Z+ | −90 | I | |
| | | | | |
| 11 | X+ | 0 | F | |
| 12 | Z− | +90 | E | |
| 13 | X+ | 0 | EF | |
| 14 | Z− | +90 | E | |
| 15 | X+ | 0 | EF | |
| 16 | Z− | +90 | E | |
| 17 | X+ | 0 | EF | |
| 18 | Z− | +90 | E | |
| 19 | X+ | 0 | EF | |
| 20 | Z− | +90 | E | |
| 21 | X+Z− | +80.07 | ER | |
| 22 | X+Z− | +84.29 | ES | |
| 23 | Z− | +90 | E | |
| 24 | X+ | 0 | EF | |
| 25 | Z− | +90 | E | |
| 26 | X+ | 0 | EF | |
| | | | | |
| 27 | Z− | +90 | E | |
| 28 | X− | +180 | EF | (EG) |
| 29 | Z− | +90 | EG | EG |
| 30 | X+ | 0 | EF | EG |
| 31 | Z− | +90 | E | |
| 32 | X− | +180 | EF | |
| 33 | Z− | +90 | E | |
| 34 | X− | +180 | EF | |
| 35 | Z− | +90 | E | |
| 36 | X− | +180 | EF | |
| 37 | Z− | +90 | E | |
| 38 | X− | +180 | F | |
| | | | | |

WORKPIECE SHOWN IN FIG. 44 WHEN VIEWED IN THE DIRECTION OF THE ARROW A

BOTTOM VIEW OF WORKPIECE SHOWN IN FIG. 44 WHEN VIEWED IN THE DIRECTION OF THE ARROW A

FIG. 47

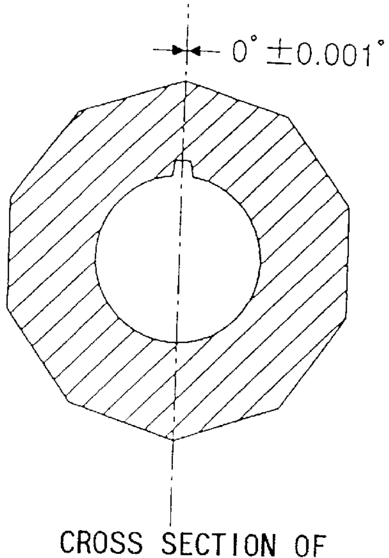

CROSS SECTION OF WORKPIECE TAKEN ALONG LINE B-B SHOWN IN FIG. 44

| | | | | |
|---|---|---|---|---|
| NAME OF GEAR | | INTERNAL GEAR | ACCURACY | SECOND GRADE |
| TOOL | TOOTH PROFILE | INVOLUTE | | GRADE |
| | MODULE | M1.5 | | GRADE |
| | PRESSURE ANGLE | PA20 | HARDNESS | HRC20 |
| NUMBER OF TEETH | | Z18 | QUENCHING METHOD | THERMAL REFINING OF MATERIAL |
| REFERENCE PITCH DIAMETER | | φ27 | REMARKS | |
| ADDENDUM MODIFICATION | | 0 | | |
| DIAMETER OF OVERSIZE PIN (DIMENSIONAL DIFFERENCE) | | $23.648^{+0.060}_{0}$ (DIAMETER OF PIN=2.520) | | |
| ROUGHNESS OF TOOTH FLANK (FINISHING METHOD) | | 3S (ELECTRIC DISCHARGE MACHINING) | | |

FIG. 48

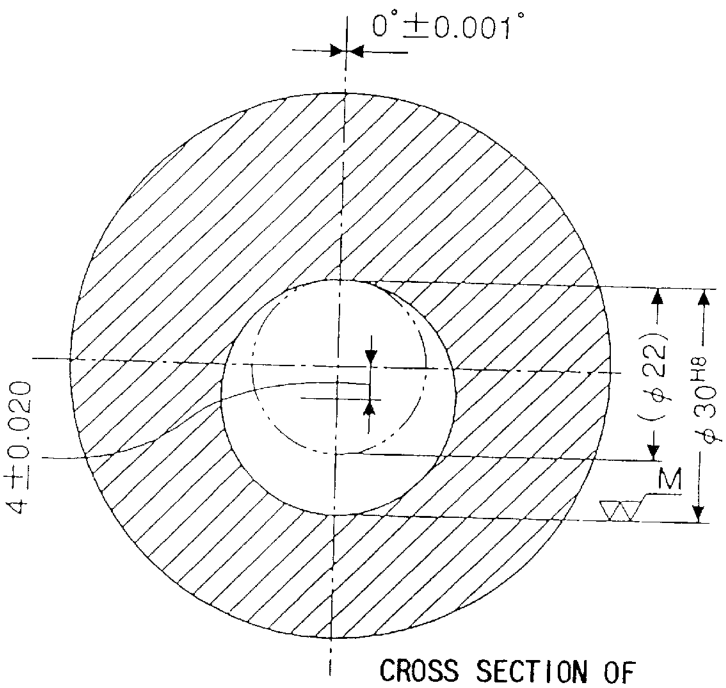

CROSS SECTION OF WORKPIECE TAKEN ALONG LINE C-C SHOWN IN FIG. 44

CROSS SECTION OF WORKPIECE TAKEN ALONG LINE D-D SHOWN IN FIG. 44

WORKPIECE WHEN VIEWED IN THE DIRECTION OF THE ARROW E SHOWN IN FIG. 44

WORKPIECE WHEN VIEWED IN THE DIRECTION OF THE ARROW H SHOWN IN FIG. 44

CROSS SECTION OF WORKPIECE WHEN VIEWED IN THE DIRECTION OF THE ARROW H SHOWN IN FIG. 44

FIG. 57

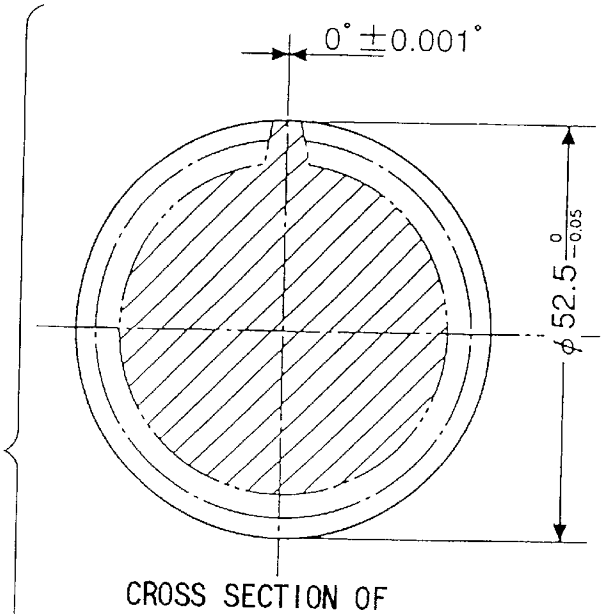

CROSS SECTION OF WORKPIECE TAKEN ALONG LINE J-J SHOWN IN FIG. 44

| | | | | |
|---|---|---|---|---|
| NAME OF GEAR | | SPUR GEAR | ROUGHNESS OF TOOTH FLANK (FINISHING METHOD) | ▽▽▽ HOBBING |
| TOOL | TOOTH PROFILE | INVOLUTE | | |
| | MODULE | M2.5 | ACCURACY | JIS 3rd GRADE |
| | PRESSURE ANGLE | PA20 | | GRADE |
| NUMBER OF TEETH | | Z19 | | GRADE |
| REFERENCE PITCH DIAMETER | | φ47.5 | HARDNESS | HRC30 |
| ADDENDUM MODIFICATION | | 0 | QUENCHING METHOD | THERMAL REFINING OF MATERIAL |
| DIMENSIONAL DIFFERENCE OF TOOTH THICKNESS | BASE TANGENT LENGTH | $18.451^{-0.010}_{-0.025}$ (THREE TEETH) | REMARKS | |
| | DIAMETER OF OVER-SIZE PIN | (PIN DIAMETER= ) | | |
| | CHORDAL TOOTH THICKNESS (CHORDAL ADDENDUM) | ( ) | | |

FIG. 58

| SEQUENCE NO. | MACHINE TOOL | MACHINE ID NO. | Abs/Inc | LEAST INPUT INCREMENT (μm/0.001deg) | | | | | | MAXIMUM TRAVEL DISTANCE (mm OR deg) | | | | | | |
|---|---|---|---|---|---|---|---|---|---|---|---|---|---|---|---|---|
| | | | | X | Y | Z | A | B | C | X | Y | Z | ± | A | ± | B |
| 2000 | SW | CSW001 | 1 | 1 | 1 | 1 | | | | 200 | 150 | 1500 | | | | |
| 2001 | L | XLD001 | 1 | 1 | 1 | 1 | 1 | 1 | 1 | 400 | 150 | 1500 | | | | |
| 2002 | D | XLD001 | 1 | 1 | 1 | 1 | 1 | 1 | 1 | 400 | 150 | 1500 | ± | 30 | ± | 30 |
| 2003 | DR | XLD001 | 1 | 1 | 1 | 1 | 1 | 1 | 1 | 400 | 150 | 1500 | ± | 30 | ± | 30 |
| 2004 | M | XLD001 | 1 | 1 | 1 | 1 | 1 | 1 | 1 | 400 | 150 | 1500 | ± | 30 | ± | 30 |
| 2005 | MSD | XLD001 | 1 | 1 | 1 | 1 | 1 | 1 | 1 | 400 | 150 | 1500 | ± | 30 | ± | 30 |
| 2006 | T | XLD001 | 1 | 1 | 1 | 1 | 1 | 1 | 1 | 400 | 150 | 1500 | ± | 30 | ± | 30 |
| 2007 | B | XLD001 | 1 | 1 | 1 | 1 | 1 | 1 | 1 | 400 | 150 | 1500 | ± | 30 | ± | 30 |
| 2008 | HB | XHB001 | 3 | 01 | 01 | 01 | 1 | 1 | 1 | 350 | 150 | 300 | ± | 60 | | |
| 2009 | GE | XGE001 | 1 | 01 | 01 | 01 | | | 1 | 400 | 150 | 1500 | | | | |
| 2010 | GI | XGI001 | 1 | 01 | 01 | 01 | | | 1 | 200 | 100 | 1500 | | | | |
| 2011 | CMM | XCM001 | 1 | 001 | 001 | 001 | 001 | 001 | 001 | 2500 | 2500 | 1000 | ± | 45 | ± | 45 |

FIG. 59

| | | FIXED ORIGIN (mm/deg) | | | | | | | | | | | | MACHINABLE DIMENSION | | |
|---|---|---|---|---|---|---|---|---|---|---|---|---|---|---|---|---|
| ± | C | ± | X | ± | Y | ± | Z | ± | A | ± | B | ± | C | Max ; X | Min ; X | Max ; Y |
| | | − | 50 | + | 150 | | 0 | | | | | | | 150 | 10 | 150 |
| ± | 360 | + | 300 | + | 75 | + | 1500 | | 0 | | 0 | | 0 | 300 | 0 | 75 |
| ± | 360 | + | 300 | + | 75 | + | 1500 | | 0 | | 0 | | 0 | 300 | 0 | 75 |
| ± | 360 | + | 300 | + | 75 | + | 1500 | | 0 | | 0 | | 0 | 300 | 0 | 75 |
| ± | 360 | + | 300 | + | 75 | + | 1500 | | 0 | | 0 | | 0 | 300 | 0 | 75 |
| ± | 360 | + | 300 | + | 75 | + | 1500 | | 0 | | 0 | | 0 | 300 | 0 | 75 |
| ± | 360 | + | 300 | + | 75 | + | 1500 | | 0 | | 0 | | 0 | 300 | 0 | 75 |
| ± | 360 | + | 300 | + | 75 | + | 1500 | | 0 | | 0 | | 0 | 300 | 0 | 75 |
| ± | ∞ | + | 300 | + | 75 | + | 300 | + | 60 | | | | 0 | 300 | 0 | |
| ± | ∞ | + | 300 | + | 75 | + | 1500 | | | | | | 0 | 300 | 0 | 75 |
| ± | ∞ | + | 150 | + | 50 | + | 1500 | | | | | | 0 | 150 | 0 | 50 |
| ± | ∞ | | 0 | | 0 | + | 1000 | | 0 | | 0 | | 0 | 2400 | 0 | 2400 |

FIG. 60

| MACHINABLE DIMENSION | | | | | | | | | CENTER-TO-CENTER DISTANCE | | (GRADING HOLE IN THE X DIRECTION) |
|---|---|---|---|---|---|---|---|---|---|---|---|
| Min ; Y | Max ; Z | Min ; Z | Max ; A | Min ; A | Max ; B | Min ; B | Max ; C | Min ; C | Max ; Z | Min ; Z | IN THE Z + DIRECTION |
| 0 | 1500 | 10 | | | | | | | | | |
| 0 | 1500 | 0 | 30 | 0 | 30 | 0 | 360 | 0 | 1550 | 0 | |
| 0 | 1500 | 0 | 30 | 0 | 30 | 0 | 360 | 0 | 1550 | 0 | + 30 |
| 0 | 1500 | 0 | 30 | 0 | 30 | 0 | 360 | 0 | 1550 | 0 | + 30 |
| 0 | 1500 | 0 | 30 | 0 | 30 | 0 | 360 | 0 | 1550 | 0 | + 30 |
| 0 | 1500 | 0 | 30 | 0 | 30 | 0 | 360 | 0 | 1550 | 0 | + 30 |
| 0 | 1500 | 0 | 30 | 0 | 30 | 0 | 360 | 0 | 1550 | 0 | + 30 |
| 0 | 1500 | 0 | 30 | 0 | 30 | 0 | 360 | 0 | 1550 | 0 | + 30 |
| | 300 | 0 | 60 | 0 | | 0 | ∞ | 0 | 350 | 0 | |
| 0 | 1500 | 20 | | | | | ∞ | 0 | 1550 | 0 | |
| 0 | 750 | 0 | | | | | ∞ | 0 | | | |
| 0 | 1000 | 0 | 45 | 0 | 45 | 0 | ∞ | 0 | | | + 45 |

FIG. 61

| LIMIT OF GRADING HOLE IN THE X DIRECTION (deg) | | | | | LIMIT OF GRADING HOLE IN THE Z DIRECTION (deg) | | | | | |
|---|---|---|---|---|---|---|---|---|---|---|
| IN Z − DIRECTION | IN Y + DIRECTION | IN Y − DIRECTION | IN A + DIRECTION | IN A − DIRECTION | IN X + DIRECTION | IN X − DIRECTION | IN Y + DIRECTION | IN Y − DIRECTION | IN C + DIRECTION | IN C − DIRECTION |
| | | | | | | | | | | |
| | | | | | | | | | | |
| −30 | +30 | −30 | +30 | −30 | +30 | −30 | +30 | −30 | +360 | −360 |
| −30 | +30 | −30 | +30 | −30 | +30 | −30 | +30 | −30 | +360 | −360 |
| −30 | +30 | −30 | +30 | −30 | +30 | −30 | +30 | −30 | +360 | −360 |
| −30 | +30 | −30 | +30 | −30 | +30 | −30 | +30 | −30 | +360 | −360 |
| −30 | +30 | −30 | +30 | −30 | +30 | −30 | +30 | −30 | +360 | −360 |
| −30 | +30 | −30 | +30 | −30 | +30 | −30 | +30 | −30 | +360 | −360 |
| | | | | | | | | | | |
| | | | | | | | | | | |
| | | | | | | | | | | |
| −45 | +45 | −45 | +45 | −45 | +45 | −45 | +45 | −45 | +360 | −360 |
| | | | | | | | | | | |

FIG. 62

| LIMIT OF GRADING HOLE IN THE Y DIRECTION (deg) | | | | | | PERMISSIBLE MAXIMUM MACHINING WEIGHT (N) | WS/TS | CT/CW | CAPACITY OF MAIN SPINDLE (1) | | | | | | |
|---|---|---|---|---|---|---|---|---|---|---|---|---|---|---|---|
| | | | | | | | | | EXTENT OF ROTATING SPEED/OUTPUT FOR FIRST AREA | | | CT/CW | EXTENT OF ROTATING SPEED/OUTPUT FOR SECOND AREA | | |
| + IN X DIRECTION | − IN X DIRECTION | + IN Z DIRECTION | − IN Z DIRECTION | + IN B DIRECTION | − IN B DIRECTION | | | | MIN. ROTATION | MAX. ROTATION | OUTPUT (kw) | | MIN. ROTATING SPEED | MAX. ROTATING SPEED | OUTPUT (kw) |
| | | | | | | 7740 | T | T | 30 | 500 | 225 | | | | |
| | | | | | | 4000 | W | T | 0 | 1000 | 15 | W | 1000 | 6000 | 15 |
| + 30 | − 30 | + 30 | − 30 | + 30 | − 30 | 4000 | W | T | 0 | 1000 | 15 | W | 1000 | 6000 | 15 |
| + 30 | − 30 | + 30 | − 30 | + 30 | − 30 | 4000 | W | T | 0 | 1000 | 15 | W | 1000 | 6000 | 15 |
| + 30 | − 30 | + 30 | − 30 | + 30 | − 30 | 4000 | W | T | 0 | 1000 | 15 | W | 1000 | 6000 | 15 |
| + 30 | − 30 | + 30 | − 30 | + 30 | − 30 | 4000 | W | T | 0 | 1000 | 15 | W | 1000 | 6000 | 15 |
| + 30 | − 30 | + 30 | − 30 | + 30 | − 30 | 4000 | W | T | 0 | 1000 | 15 | W | 1000 | 6000 | 15 |
| + 30 | − 30 | + 30 | − 30 | + 30 | − 30 | 4000 | W | T | 0 | 1000 | 15 | W | 1000 | 6000 | 15 |
| | | | | | | 4000 | W | T | 0 | 600 | 75 | | | | |
| | | | | | | 4000 | W | T | 10 | 100 | 22 | W | 100 | 800 | 22 |
| | | | | | | 1000 | W | T | 0 | 150 | 22 | W | 150 | 800 | 22 |
| + 45 | − 45 | + 45 | − 45 | + 45 | − 45 | 4000 | | | | | | | | | |
| | | | | | | | | | | | | | | | |

FIG. 63

OUTPUT (KW)

| WS/TS | CT/CW | CAPACITY OF MAIN SPINDLE (2) — EXTENT OF ROTATING SPEED/OUTPUT FOR FIRST AREA: MIN. ROTATION | MAX. ROTATION | OUTPUT (kw) | CT/CW | EXTENT OF ROTATING SPEED/OUTPUT FOR SECOND AREA: MIN. ROTATING SPEED | MAX. ROTATING SPEED | OUTPUT (kw) | MECHANICAL EFFICIENCY (1) | MECHANICAL EFFICIENCY (2) | RIGIDITY OF MAIN SPINDLE (1) IN AXIAL DIRECTION: PERMISSIBLE MAXIMUM CAPACITY | RIGIDITY (μm/N) | RIGIDITY OF MAIN SPINDLE (1) IN RADIAL DIRECTION: PERMISSIBLE MAXIMUM CAPACITY | RIGIDITY (μm/N) | RIGIDITY OF MAIN SPINDLE (2) IN AXIAL DIRECTION: PERMISSIBLE MAXIMUM CAPACITY | RIGIDITY (μm/N) | RIGIDITY OF MAIN SPINDLE (2) IN RADIAL DIRECTION: PERMISSIBLE MAXIMUM CAPACITY | RIGIDITY (μm/N) | RIGIDITY OF TAILSTOCK (1) IN AXIAL DIRECTION: PERMISSIBLE MAXIMUM CAPACITY | RIGIDITY (μm/N) |
|---|---|---|---|---|---|---|---|---|---|---|---|---|---|---|---|---|---|---|---|---|
| | | | | | | | | | 85 | | | | 8000 | 0001 | | | | | | |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 0 | 1500 | 3 | W | 1500 | 10000 | 3 | 85 | 95 | 30000 | 0001 | 6000 | 0001 | 10000 | 0001 | 2000 | 0001 | 15000 | 0001 |
| T | T | 10 | 1000 | 37 | | | | | 95 | 95 | 8000 | 0001 | 4000 | 0001 | 3000 | 0001 | 2000 | 0001 | 4000 | 0001 |
| T | W | 990 | 4000 | 45 | | | | | 85 | 98 | 6000 | 0001 | 30000 | 0001 | 6000 | 0001 | 30000 | 0001 | 6000 | 0001 |
| T | W | 990 | 6000 | 75 | W | 6000 | 40000 | 15 | 85 | 98 | 6000 | 0001 | 6000 | 0001 | 3000 | 0001 | 1500 | 0001 | | |

FIG. 64

| RIGIDITY OF TAILSTOCK (1) IN RADIAL DIRECTION MAX. CAPACITY | RIGIDITY OF TAILSTOCK (1) IN RADIAL DIRECTION RIGIDITY (μm/N) | RIGIDITY OF TAILSTOCK (2) IN AXIAL DIRECTION MAX. CAPACITY | RIGIDITY OF TAILSTOCK (2) IN AXIAL DIRECTION RIGIDITY (μm/N) | RIGIDITY OF TAILSTOCK (2) IN RADIAL DIRECTION MAX. CAPACITY | RIGIDITY OF TAILSTOCK (2) IN RADIAL DIRECTION RIGIDITY (μm/N) | ALLOWABLE MAXIMUM DEPTH OF CUT * FEED, MAIN SPINDLE (1) DEPTH OF CUT | MAIN SPINDLE (1) FEED OF EVERY ROTATION | MAIN SPINDLE (2) DEPTH OF CUT | MAIN SPINDLE (2) FEED OF EVERY ROTATION | ROTATING SPEED OF MAIN SPINDLE (1) MAX. ROTATING SPEED (rpm) | ROTATING SPEED OF MAIN SPINDLE (1) MIN. ROTATING SPEED (rpm) | GEARSHIFT | AUTOMATIC/MANUAL | U RANGE MAX. ROTATING SPEED | U RANGE MIN. ROTATING SPEED | M RANGE MAX. ROTATING SPEED |
|---|---|---|---|---|---|---|---|---|---|---|---|---|---|---|---|---|
| | | | | | | 8 | 5 | | | 500 | 30 | | | | | |
| 3000 | 0001 | | | | | 7 | 07 | 2 | 02 | 6000 | 01 | | | | | |
| 3000 | 0001 | | | | | | | 2 | 02 | 6000 | 01 | | | | | |
| 3000 | 0001 | | | | | | | 2 | 02 | 6000 | 01 | | | | | |
| 3000 | 0001 | | | | | | | 2 | 02 | 6000 | 01 | | | | | |
| 3000 | 0001 | | | | | | | 2 | 02 | 6000 | 01 | | | | | |
| 3000 | 0001 | | | | | | | 2 | 02 | 6000 | 01 | | | | | |
| 3000 | 0001 | | | | | | | 2 | 02 | 6000 | 01 | | | | | |
| 4000 | 0001 | | | | | 2 | 15 | | | 600 | 01 | | | | | |
| 30000 | 0001 | | | | | | | | | 800 | 101 | | | | | |
| | | | | | | | | | | 800 | 01 | | | | | |

FIG. 65

| M RANGE | L RANGE | | S RANGE | | ROTATING SPEED OF MAIN SPINDLE (2) | | GEARSHIFT | AUTOMATIC/MANUAL | U RANGE | | M RANGE |
|---|---|---|---|---|---|---|---|---|---|---|---|
| MIN. ROTATING SPEED | MAX. ROTATING SPEED | MIN. ROTATING SPEED | MAX. ROTATING SPEED | MIN. ROTATING SPEED | MAX. ROTATING SPEED (rpm) | MIN. ROTATING SPEED (rpm) | | | MAX. ROTATING SPEED | MIN. ROTATING SPEED | MAX. ROTATING SPEED |
| | | | | | 10000 | 0 | 1 | | | | |
| | | | | | 10000 | 0 | 1 | | | | |
| | | | | | 10000 | 0 | 1 | | | | |
| | | | | | 10000 | 0 | 1 | | | | |
| | | | | | 10000 | 0 | 1 | | | | |
| | | | | | 10000 | 0 | 1 | | | | |
| | | | | | 10000 | 0 | 1 | | | | |
| | | | | | 1000 | 10 | 1 | | | | |
| | | | | | 4000 | 990 | 1 | | | | |
| | | | | | 40000 | 3000 | 1 | | | | |
| | | | | | | | | | | | |
| | | | | | | | | | | | |

FIG. 66

| M RANGE | L RANGE | | S RANGE | | RAPID TRAVERSE SPEED (1) [m/min, 10³deg/min] | | | | | | RAPID TRAVERSE SPEED (2) [m/min, 10³deg/min] | | | | | | (MIN. FEED FOR CUTTING) | |
|---|---|---|---|---|---|---|---|---|---|---|---|---|---|---|---|---|---|---|
| MIN. ROTATING SPEED | MAX. ROTATING SPEED | MIN. ROTATING SPEED | MAX. ROTATING SPEED | MIN. ROTATING SPEED | X | Y | Z | A | B | C | X | Y | Z | A | B | C | X | Y |
| | | | | | 5 | 5 | 20 | | | | | | | | | | 05 | 05 |
| | | | | | 15 | 10 | 15 | 4 | 4 | 4 | | | | | | | 000 | 000 |
| | | | | | 15 | 10 | 15 | 4 | 4 | 4 | | | | | | | 000 | 000 |
| | | | | | 15 | 10 | 15 | 4 | 4 | 4 | | | | | | | 000 | 000 |
| | | | | | 15 | 10 | 15 | 4 | 4 | 4 | | | | | | | 000 | 000 |
| | | | | | 15 | 10 | 15 | 4 | 4 | 4 | | | | | | | 000 | 000 |
| | | | | | 15 | 10 | 15 | 4 | 4 | 4 | | | | | | | 000 | 000 |
| | | | | | 15 | 10 | 15 | 4 | | 4 | | | | | | | 000 | 000 |
| | | | | | 5 | 5 | 5 | 4 | | 78 | | | | | | | 005 | 005 |
| | | | | | 5 | 5 | 15 | | | 104 | | | | | | | 000 | 000 |
| | | | | | 5 | 5 | 15 | | | 104 | | | | | | | 000 | 000 |
| | | | | | 15 | 15 | 10 | 4 | 4 | 4 | | | | | | | 000 | 000 |
| | | | | | | | | | | | | | | | | | | |

FIG. 67

| MIN. FEED RATE FOR CUTTING (1) [m/min, 10³deg/min] | | | | MIN. FEED RATE FOR CUTTING (2) [m/min, 10³deg/min] | | | | | | MAX. FEED RATE FOR CUTTING (1) [m/min, 10³deg/min] | | | | | | MAX. FEED RATE FOR CUTTING (2) [m/min, 10³deg/min] | | | | | | FEED POWER· EFFICIENCY (1) | | | | | |
|---|---|---|---|---|---|---|---|---|---|---|---|---|---|---|---|---|---|---|---|---|---|---|---|---|---|---|---|
| Z | A | B | C | X | Y | Z | A | B | C | X | Y | Z | A | B | C | X | Y | Z | A | B | C | X kw | X n | Y kw | Y n | Z kw | Z n |
| 05 | | | | | | | | | | 5 | 5 | 6 | | | | | | | | | | 2 | 95 | 2 | 95 | 5 | 95 |
| 050 | 000 | 000 | 000 | | | | | | | 5 | 5 | 5 | 2 | 2 | 2 | | | | | | | 2 | 95 | 1 | 95 | 2 | 95 |
| 000 | 000 | 000 | 000 | | | | | | | 5 | 5 | 5 | 2 | 2 | 2 | | | | | | | 2 | 95 | 1 | 95 | 2 | 95 |
| 000 | 000 | 000 | 000 | | | | | | | 5 | 5 | 5 | 2 | 2 | 2 | | | | | | | 2 | 95 | 1 | 95 | 2 | 95 |
| 000 | 000 | 000 | 000 | | | | | | | 5 | 5 | 5 | 2 | 2 | 2 | | | | | | | 2 | 95 | 1 | 95 | 2 | 95 |
| 000 | 000 | 000 | 000 | | | | | | | 5 | 5 | 5 | 2 | 2 | 2 | | | | | | | 2 | 95 | 1 | 95 | 2 | 95 |
| 000 | 000 | 000 | 000 | | | | | | | 5 | 5 | 5 | 2 | 2 | 2 | | | | | | | 2 | 95 | 1 | 95 | 2 | 95 |
| 000 | 000 | 000 | 000 | | | | | | | 5 | 5 | 5 | 2 | 2 | 2 | | | | | | | 2 | 95 | 1 | 95 | 2 | 95 |
| 005 | 005 | | 000 | | | | | | | 5 | 5 | 5 | 4 | | 78 | | | | | | | 1 | 95 | 1 | 95 | 2 | 95 |
| 000 | | | 000 | | | | | | | 5 | 5 | 15 | | | 104 | | | | | | | 3 | 95 | 1 | 95 | 3 | 95 |
| 000 | | | 000 | | | | | | | 5 | 5 | 15 | | | 104 | | | | | | | 2 | 95 | 1 | 95 | 2 | 95 |
| 000 | 000 | 000 | 000 | | | | | | | 5 | 5 | 5 | 2 | 2 | 2 | | | | | | | | | | | | |

FIG. 68

| FEED POWER·EFFICIENCY (1) | | | | | | FEED POWER·EFFICIENCY (2) | | | | | | | | | | | | UNIT OF FEED (1) | | | | | | UNIT OF FEED (2) | | | | | | TOOL REPLACEMENT (1) | | TOOL REPLACEMENT (2) | | MACHINE ACCURACY | | |
|---|---|---|---|---|---|---|---|---|---|---|---|---|---|---|---|---|---|---|---|---|---|---|---|---|---|---|---|---|---|---|---|---|---|---|---|---|
| A | | B | | C | | X | | Y | | Z | | A | | B | | C | | | | | | | | | | | | | | | | | | | | |
| kw | n | kw | n | kw | n | kw | n | kw | n | kw | n | kw | n | kw | n | kw | n | X | Y | Z | A | B | C | X | Y | Z | A | B | C | P/N | NO. OF TOOLS | P/N | NO. OF TOOLS | EXTENT OF TOLERANCE | FINISHING SYMBOL | ROUGHNESS OF FINISHED SURFACE (μm) |
| | | | | | | | | | | | | | | | | | | 2 | 2 | 2 | | | | | | | | | | N | 1 | | | 005 | 2M | 25 |
| 05 | 95 | 05 | 95 | 2 | 95 | | | | | | | | | | | | | 1 | 1 | 1 | 2 | 2 | 2 | | | | | | | N | 64 | | | 001 | 3L | 63 |
| 05 | 95 | 05 | 95 | 2 | 95 | | | | | | | | | | | | | 2 | 2 | 2 | 2 | 2 | 2 | | | | | | | N | 64 | | | 005 | 1D | 100 |
| 05 | 95 | 05 | 95 | 2 | 95 | | | | | | | | | | | | | 2 | 2 | 2 | 2 | 2 | 2 | | | | | | | N | 64 | | | 0005 | 3DR | 63 |
| 05 | 95 | 05 | 95 | 2 | 95 | | | | | | | | | | | | | 2 | 2 | 2 | 2 | 2 | 2 | | | | | | | N | 64 | | | 002 | 2M | 12 |
| 05 | 95 | 05 | 95 | 2 | 95 | | | | | | | | | | | | | 2 | 2 | 2 | 2 | 2 | 2 | | | | | | | N | 64 | | | 0015 | 2M | 12 |
| 05 | 95 | 05 | 95 | 2 | 95 | | | | | | | | | | | | | 2 | 2 | 2 | 2 | 2 | 2 | | | | | | | N | 64 | | | 005 | 1D | 100 |
| 05 | 95 | 05 | 95 | 2 | 95 | | | | | | | | | | | | | 2 | 2 | 2 | 2 | 2 | 2 | | | | | | | N | 64 | | | 0005 | 3L | 63 |
| 05 | 95 | | | 1 | 95 | | | | | | | | | | | | | 2 | 2 | 1 | 2 | | 2 | | | | | | | N | 5 | | | 0008 | 3HB | 63 |
| | | | | 2 | 95 | | | | | | | | | | | | | 1 | 1 | 1 | | | 1 | | | | | | | N | 5 | | | 0001 | 4GE | 08 |
| | | | | 2 | 95 | | | | | | | | | | | | | 1 | 1 | 1 | | | 1 | | | | | | | N | 5 | | | 0001 | 4GI | 08 |
| | | | | | | | | | | | | | | | | | | 1 | 1 | 1 | 2 | 2 | 2 | | | | | | | N | 1 | | | 0001 | CMM | 001 |

FIG. 69

| STRAIGHT-NESS | FLATNESS | CIRCULAR-ITY | CYLINDRI-CALITY | PARALLEL-ISM | PERPENDIC-ULARITY | CONCEN-TRICITY | RUN OUT | (CONDITIONAL) SPECIAL MACHINE ACCURACY | | | | | | | | | |
|---|---|---|---|---|---|---|---|---|---|---|---|---|---|---|---|---|---|
| | | | | | | | | EXTENT OF TOLERANCE | DEPTH OF CUT | FEED RATE (mm/rev) | NOSE R OF TOOL | FINISHING SYMBOL | DEPTH OF CUT | FEED RATE (mm/rev) | NOSE R OF TOOL | ROUGHNESS OF FINISHED SURFACE (μm) | DEPTH OF CUT |
| − | ▱ | ○ | ⌭ | // | ⊥ | ◎ | ↗ | | | | | | | | | | |
| | ▱005 | | | //005 | | | | | | | | | | | | | |
| | ▱0005 | ○0003 | ⌭0010 | //0005 | ⊥0003 | ◎0003 | ↗0006 | | | | | 4L | 01 | 005 | 04 | 08 | 01 |
| | | | | | | | | | | | | | | | | | |
| | | ○0005 | ⌭0010 | | ⊥0003 | | | | | | | | | | | | |
| | ▱001 | | | //001 | ⊥001 | | | | | | | | | | | | |
| | ▱001 | | | //0008 | ⊥001 | ◎0008 | | | | | | | | | | | |
| | | | | | | | | | | | | | | | | | |
| | | ○0005 | ⌭0010 | | ⊥0003 | | | | | | | | | | | | |
| | | | ⌭0010 | | | ◎0005 | ↗0005 | | | | | | | | | | |
| | | ○0001 | ⌭0005 | | | ◎0002 | ↗0005 | | | | | | | | | | |
| | | ○0001 | ⌭0003 | | | ◎0002 | ↗0005 | | | | | | | | | | |
| −0001 | ▱0001 | ○0001 | ⌭0001 | //0001 | ⊥0001 | | | | | | | | | | | | |
| | | | | | | | | | | | | | | | | | |

FIG. 70

| FEED RATE (mm/rev) | NOSE R OF TOOL | SYMBOL | CAPACITY VALUE | (CONDITIONAL) SPECIAL MACHINE ACCURACY: DEPTH OF CUT | FEED RATE (mm/rev) | NOSE R OF TOOL | ROTATING SPEED (rpm) | (DIAMETER OF TOOL) | SYMBOL | CAPACITY VALUE | DEPTH OF CUT | FEED RATE (mm/rev) | NOSE R OF TOOL | ROTATING SPEED (rpm) | (DIAMETER OF TOOL) | FINISHING ALLOWANCE | ATTACHMENT AND REPLACEMENT | STANDARD TIME FOR MACHINE·OPERATION (Hr): SETTING OF COORDINATES OF WORKPIECE | TOOL PREPA-RATION | WORK-PIECE REPRACE-MENT | TOOL REPLACE-MENT | TIP REPLACEMENT |
|---|---|---|---|---|---|---|---|---|---|---|---|---|---|---|---|---|---|---|---|---|---|---|
| | | | | | | | | | | | | | | | | | | 0025 | 01 | 005 | 02 | |
| 005 | 04 | // | 0003 | 01 | 005 | 04 | 400 | | | | | | | | | 1 | 01 | 005 | 02 | 003 | 0005 | 005 |
| | | | | | | | | | | | | | | | | | 01 | 005 | 02 | 003 | 0005 | |
| | | | | | | | | | | | | | | | | | 01 | 005 | 02 | 003 | 0005 | |
| | | | | | | | | | | | | | | | | | 01 | 005 | 02 | 003 | 0005 | |
| | | | | | | | | | | | | | | | | | 01 | 005 | 02 | 003 | 0005 | |
| | | | | | | | | | | | | | | | | | 01 | 005 | 02 | 003 | 0005 | |
| | | | | | | | | | | | | | | | | | 01 | 005 | 02 | 003 | 0005 | |
| | | | | | | | | | | | | | | | | | 01 | 005 | 02 | 003 | 001 | |
| | | | | | | | | | | | | | | | | | 01 | 005 | 02 | 003 | 1 | |
| | | | | | | | | | | | | | | | | | 01 | 005 | 02 | 003 | 1 | |
| | | | | | | | | | | | | | | | | | 01 | 005 | 01 | 005 | 0005 | |

FIG. 71

| SPECIAL GRINDING: WIDTH OF GRINDSTONE | MASTER FILE: MIN. GRINDING WIDTH: GRINDING FOR FIXED SIZE | MASTER FILE: MIN. GRINDING WIDTH: INDIRECT GRINDING FOR FIXED SIZE | MASTER FILE: MIN. GRINDING WIDTH: GRINDING WITH STOPS | SPECIAL MASTER FILE FOR DRILL/TAP: MAX. DIAMETER OF DRILL | SPECIAL MASTER FILE FOR DRILL/TAP: MAX. DIAMETER OF TAPE | SPECIAL MASTER FILE FOR MILLING CUTTER: MAX. DIAMETER OF END MILL | SPECIAL MASTER FILE FOR MILLING CUTTER: MAX. DIAMETER OF FACE MILLING CUTTER | SPECIAL MASTER FILE FOR MILLING CUTTER: MAX. DIAMETER OF SIDE CUTTER | ALLOWABLE DIMENSION OF FIXTURE: MAX. DIAMETER | ALLOWABLE DIMENSION OF FIXTURE: MAX. LENGTH | OPERATING TIME OF MACHINE TOOL: STARTING/STOPPING TIME OF MAIN SPINDLE (1) | STARTING/STOPPING TIME OF MAIN SPINDLE (2) | POSITIONING TIME FOR QUICK TRAVERSE (1) X | POSITIONING TIME FOR QUICK TRAVERSE (1) Y | POSITIONING TIME FOR QUICK TRAVERSE (1) Z | POSITIONING TIME FOR QUICK TRAVERSE (2) X | POSITIONING TIME FOR QUICK TRAVERSE (2) Y |
|---|---|---|---|---|---|---|---|---|---|---|---|---|---|---|---|---|---|
| | | | | | | | | 315 | 400 | 15 | | | 00006 | 00006 | 00006 | | |
| | | | | | | | | | 80 | 300 | 0012 | | 00006 | 00006 | 00006 | | |
| | | | | 25 | | | | | 80 | 300 | 0012 | | 00006 | 00006 | 00006 | | |
| | | | | 25 | | | | | 80 | 300 | 0012 | | 00006 | 00006 | 00006 | | |
| | | | | | | 25 | 80 | 80 | 80 | 300 | 0012 | | 00006 | 00006 | 00006 | | |
| | | | | | | | | 80 | 80 | 300 | 0012 | | 00006 | 00006 | 00006 | | |
| | | | | | 25 | | | | 80 | 300 | 0012 | | 00006 | 00006 | 00006 | | |
| | | | | | | | | | 80 | 300 | 0012 | | 00006 | 00006 | 00006 | | |
| | | | | | | | | | 75 | 150 | 0012 | | 00006 | 00006 | 00006 | | |
| 75 | 5 | 1 | 1 | | | | | | 500 | 100 | 0012 | | 00006 | | 00006 | | |
| 13 | | 1 | 1 | | | | | | 50 | 750 | 0012 | | 00006 | 00006 | 00006 | | |
| | | | | | | | | | | | 0012 | | 00006 | 00006 | 00006 | | |
| | | | | | | | | | | | | | | | | | |

FIG. 72

ABC/Dr

| OPERATING TIME OF MACHINE TOOL (Hr) | | | | | | | | | | FINISHING ALLOWANCE WITHIN REMOVING CAPACITY |
|---|---|---|---|---|---|---|---|---|---|---|
| | POSITIONING TIME FOR QUICK TRAVERSE | | | OPERATING TIME OF TAILSTOCK | | | | STARTING/STOPPING TIME OF COOLING UNIT | | |
| Z | A | B | C | FORWARD TRAVEL (1) | FORWARD TRAVEL (2) | BACKWARD TRAVEL (1) | BACKWARD TRAVEL (2) | (1) | (2) | |
| | | | | 0006 | | 0006 | | | | 2 |
| | | | | 0006 | | 0006 | | 0006 | | 0020 |
| | 00006 | 00006 | 00006 | 0006 | | 0006 | | 0006 | | |
| | 00006 | 00006 | 00006 | 0006 | | 0006 | | 0006 | | |
| | 00006 | 00006 | 00006 | 0006 | | 0006 | | 0006 | | 0050 |
| | 00006 | 00006 | 00006 | 0006 | | 0006 | | 0006 | | 0010 |
| | 00006 | 00006 | 00006 | 0006 | | 0006 | | 0006 | | 0010 |
| | 00006 | 00006 | 00006 | 0006 | | 0006 | | 0006 | | 0010 |
| | 00006 | 00006 | | 0006 | | 0006 | | 0006 | | 0002 |
| | | | | 0006 | | 0006 | | 0006 | | 0003 |
| | | | 00006 | | | | | | | |
| | 00006 | 00006 | 00006 | | | | | | | |

FIG. 73

| SEQUENCE NO. | CHUCKING CAPACITY | MACHINE ID NO. | CHUCKING SIZE MAX. | CHUCKING SIZE MIN. | NO. OF JAWS | JAWS DIVIDING CLASSIFICATION | UNEQUAL FLUTE SPACING ANGLE OF PAWL (deg) 1 | 2 | 3 | 4 | PAWL STROKE (ONE SIDE) | PAWL SYNC SEGMENT | SIFT OF PAWL POSITION | DIRECTION OF PAWL | DISTANCE BETWEEN MECHANICAL REFERENCE POSITION AND PAWL REFERENCE POSITION X | Y | Z | PAWL WIDTH | PAWL HEIGHT |
|---|---|---|---|---|---|---|---|---|---|---|---|---|---|---|---|---|---|---|---|
| 2100 | SE | CSW001 | 150 | 0 | 2 | C | | | | | 150 | 2 | 0 | Y | 0 | 0 | 80 | 150 | 170 |
| 2101 | RE | XLD001 | 400 | 0 | 3 | C | | | | | 25 | 1 | 150 | X | 0 | 0 | 0 | 30 | 45 |
| 2102 | RE | XLD001 | 300 | 0 | 3 | C | | | | | 25 | 1 | 150 | X | 0 | 0 | 0 | 30 | 45 |
| 2103 | RI | XLD001 | 300 | 30 | 3 | C | | | | | 25 | 1 | 150 | X | 0 | 0 | 0 | 30 | 15 |
| 2104 | RE | XHB001 | 300 | 0 | 3 | C | | | | | 25 | 1 | 100 | X | 0 | 0 | 0 | 20 | 15 |
| 2105 | RD | XGE001 | 300 | 10 | 1 | | | | | | | | | X | | | | | |
| 2106 | RE | XGI001 | 300 | 0 | 3 | C | | | | | 25 | 1 | 100 | X | 0 | 0 | 0 | 20 | 15 |
| 2107 | RI | XGI001 | 300 | 30 | 4 | C | | | | | 25 | 0 | 100 | X | 0 | 0 | 0 | 20 | 15 |

FIG. 74

| SPECIFICATIONS FOR THROUGH-HOLE | | SEGMENTS FOR SHAPE, SIZE, AND CAPACITY OF PAWL | | | | | | | | | | | | | | | | | |
|---|---|---|---|---|---|---|---|---|---|---|---|---|---|---|---|---|---|---|---|
| | | X1 | | CAPACITY | Z1 | | X2 | | CAPACITY | Z2 | | X3 | | CAPACITY | Z3 | | Z4 | | CAPACITY |
| BORE | DEPTH OF THROUGH-HOLE | COORDINATES OF STARTING POINT | COORDINATES OF END POINT | | COORDINATES OF STARTING POINT | COORDINATES OF END POINT | COORDINATES OF STARTING POINT | COORDINATES OF END POINT | | COORDINATES OF STARTING POINT | COORDINATES OF END POINT | COORDINATES OF STARTING POINT | COORDINATES OF END POINT | | COORDINATES OF STARTING POINT | COORDINATES OF END POINT | COORDINATES OF STARTING POINT | COORDINATES OF END POINT | |
| 0 | | 0 | 0 | 1 | 0 | 170 | 0 | 30 | 0 | 170 | 170 | 30 | 50 | 0 | 170 | 0 | | | |
| 40 | 150 | 0 | 0 | 1 | 0 | 15 | 0 | 10 | 0 | 15 | 15 | 10 | 10 | 1 | 15 | 30 | 10 | 20 | 0 |
| 40 | 150 | 0 | 0 | 1 | 0 | 15 | 0 | 25 | 0 | 15 | 15 | 25 | 35 | 0 | 15 | 0 | | | |
| 40 | 150 | 0 | 0 | 0 | 0 | 45 | 0 | 15 | 0 | 45 | 45 | 15 | 15 | 1 | 45 | 30 | 15 | 25 | 0 |
| 40 | 100 | 0 | 0 | 1 | 0 | 15 | 0 | 15 | 0 | 15 | 15 | 15 | 15 | 0 | 0 | 0 | | | |
| 0 | | | | | | | | | | | | | | | | | | | |
| 80 | 150 | 0 | 0 | 1 | 0 | 15 | 0 | 15 | 0 | 15 | 15 | 15 | 15 | 0 | 15 | 5 | 15 | 25 | 0 |
| 80 | 150 | 0 | 0 | 0 | 0 | 15 | 0 | 15 | 0 | 15 | 15 | 15 | 15 | 1 | 15 | 5 | 15 | 25 | 0 |

FIG. 75

| SEGMENTS FOR SHAPE, SIZE, AND CAPACITY OF PAWL | | | | | | | | | | | | POSITION AND DIRECTION OF PAWL OF A METAL-PRESSING METHOD | | | | | | | |
|---|---|---|---|---|---|---|---|---|---|---|---|---|---|---|---|---|---|---|---|
| Z4 | | X5 | | CAPACITY | Z5 | | X6 | | CAPACITY | Z6 | | DIRECTION OF PAWL | REFERENCE POSITION OF PAWL (1) | | DIRECTION OF PAWL | REFERENCE POSITION OF PAWL (2) | | DIRECTION OF PAWL | REFERENCE POSITION OF PAWL |
| COORDI-NATES OF STARTING POINT | COORDI-NATES OF END POINT | COORDI-NATES OF STARTING POINT | COORDI-NATES OF END POINT | | COORDI-NATES OF STARTING POINT | COORDI-NATES OF END POINT | COORDI-NATES OF STARTING POINT | COORDI-NATES OF END POINT | | COORDI-NATES OF STARTING POINT | COORDI-NATES OF END POINT | | X | Y | | X | Y | | X |
| 30 | 45 | 20 | 20 | 1 | 30 | 45 | 20 | 35 | 0 | 45 | 45 | | | | | | | | |
| | | | | | | | | | | | | | | | | | | | |
| 30 | 30 | 25 | 25 | 1 | 30 | 15 | 25 | 35 | 0 | 15 | 15 | | | | | | | | |
| | | | | | | | | | | | | | | | | | | | |
| | | | | | | | | | | | | | | | | | | | |
| 5 | 5 | 25 | 25 | 0 | 0 | 0 | | | | | | | | | | | | | |
| 5 | 5 | 25 | 25 | 1 | 0 | 0 | | | | | | | | | | | | | |

FIG. 77

MACHINING METHOD SYMBOL / PROCESS SYMBOL (MACHINING FUNCTION) / REGISTRATION

| MACHINING METHOD SYMBOL | PROCESS SYMBOL (MACHINING FUNCTION) | PROCESS NAME | REGISTRATION |
|---|---|---|---|
| AM | AM | MARKING | |
| B | B | BORING | |
| | B-M | BORING USING MILLING CUTTER | |
| | B-L | BORING USING LATHE | |
| C | C | CASTING | |
| CMS | CMS | DRILLING OF CENTER HOLE | |
| | CMS-L | DRILLING OF CENTER HOLE USING LATHE | * |
| D | D | DRILLING | |
| | D-L | DRILLING USING LATHE | * |
| | D-M | DRILLING USING MILLING CUTTER | |
| DR | DR | REAMING | |
| | DR-L | REAMING USING LATHE | * |
| | DR-M | REAMING USING MILLING CUTTER | |
| F | F | CASTING | |
| FS | FS | SCRAPING | |
| G | G | GRINDING | |
| GE | GE | GRINDING OF OUTSIDE DIAMETER | * |
| GI | GI | GRINDING OF INSIDE DIAMETER | * |
| GH | GH | HONING | |
| GL | GL | LAPPING | |
| GSP | GSP | SUPER FINISHING | |
| HB | HB | HOBBING | * |
| L | L | TURNING | |
| | LB | TURNING USING BAR FEEDING MACHINE | |
| | LC | TURNING OF WORKPIECE WHILE BEING SUPPORTED AT ITS DOUBLE CENTER HOLES | * |

MACHINING METHOD SYMBOL / PROCESS SYMBOL (MACHINING FUNCTION) / REGISTRATION

| MACHINING METHOD SYMBOL | PROCESS SYMBOL (MACHINING FUNCTION) | PROCESS NAME | REGISTRATION |
|---|---|---|---|
| L | LCF | TURNING OF WORKPIECE WHILE BEING SUPPORTED AT ITS SINGLE CENTER HOLE | * |
| | LCS | TURNING OF WORKPIECE WHILE BEING SUPPORTED AT ITS SPECIAL DOUBLE CENTER HOLES | |
| | LF | TURNING OF WORKPIECE WHILE CHUCKING IT | * |
| M | M | MILLING | |
| | M-L | MILLING USING LATHE | |
| ME | ME | END MILLING | |
| | ME-L | END MILLING USING LATHE | * |
| MP | MP | PLAIN MILLING | |
| MPC | MPC | FACE MILLING | |
| MSD | MSD | SIDE MILLING | |
| | MSD-L | SIDE MILLING USING LATHE | * |
| P | P | PLANING | |
| SPEC | SPEC | ELECTRO-CHEMICAL MACHINING | |
| SPED | SPED | ELECTRIC DISCHARGE MACHINING | |
| | SPED-W | WIRE CUTTING ELECTRIC DISCHARGE MACHINING | |
| SPLB | SPLB | LASER BEAM MACHINING | |
| SW | SW | SAWING | * |
| T | T | TAPPING | |
| | T-L | TAPPING USING LATHE | * |
| | T-M | TAPPING USING MILLING CUTTER | |

FIG. 78

| SEQUENCE NO. | TOOL ID NO. | SHANK ID NO. | TIP ID NO. | SPECIFICATIONS FOR CHIP BREAKER: CHIP BREAKER WIDTH CORNER | CHIP BREAKER WIDTH BASE | CHIP BREAKER HEIGHT CORNER | CHIP BREAKER HEIGHT BASE | ANGLE ± | ANGLE | HAND OF TOOL CUTTING EDGE | SPECIFICATIONS FOR MAJOR CUTTING EDGE: CUTTING EDGE ANGLE ± | CUTTING EDGE ANGLE (κ) | CLEARANCE ANGLE (αo) | SIDE RAKE ± | SIDE RAKE (γf) | BACK RAKE ± | BACK RAKE (γp) | NOSE RADIUS |
|---|---|---|---|---|---|---|---|---|---|---|---|---|---|---|---|---|---|---|
| 1000 | | 1CCLNL2525M1204W | CNMG120404 | 15 | 15 | 05 | 05 | | 0 | L | + | 5 | 5 | - | 50 | - | 5 | 04 |
| 1001 | | 2CDJNL2525M1504W | DNGC150404 | 15 | 15 | 05 | 05 | | 0 | L | + | 3 | 5 | - | 5 | - | 5 | 04 |
| 1002 | | 3CDJNL2525M1504W | DNGC150404 | 15 | 15 | 05 | 05 | | 0 | L | + | 3 | 5 | - | 5 | - | 5 | 04 |
| 1003 | | 4JIS43-4 | JISB4104-08-04 | | | | | | | R | + | 90 | 6 | | 0 | | 6 | 04 |
| 1004 | | 5JIS49-4 | JISB4104-05-04 | | | | | | | R | - | 30 | 6 | | 0 | | 6 | 02 |
| 1005 | | 6JIS50-4 | JISB4104-05-04 | | | | | | | L | - | 30 | 6 | | 0 | | 6 | 02 |
| 1006 | | 7JIS48-S | JISB4104-03-01 | 15 | 20 | 05 | 05 | | 0 | L | + | 273 | 6 | + | 3 | | 0 | 04 |
| 1007 | | 8JIS52-S | JISB4104-08-04 | | | | | | | L | | 0 | 6 | | 0 | | 6 | 04 |

FIG. 79

| SPECIFICATIONS FOR MINOR CUTTING EDGE (1) | | | SPECIFICATIONS FOR MINOR CUTTING EDGE (2) | | | SPECIFICATIONS FOR MINOR CUTTING EDGE (3) | | | | | | | □/○ | SHANK SIZE | | XT/ZT | REFERENCE TIP POINT | | | | LENGTH OF PROJECTION FROM TOOL HOLDER | | ANGLE OF PROJECTION FROM TOOL HOLDER | | ANGLE OF ATTACHMENT OF TOOL HOLDER | | RIGIDITY OF TOOL | | TIP CLAMP |
|---|---|---|---|---|---|---|---|---|---|---|---|---|---|---|---|---|---|---|---|---|---|---|---|---|---|---|---|---|---|
| MINOR CUTTING EDGE ANGLE | | CLEARANCE ANGLE | MINOR CUTTING EDGE ANGLE | | CLEARANCE ANGLE | DISTANCE FROM REFERENCE TIP POINT AT STARTING POINT | | | | MINOR CUTTING EDGE ANGLE | | CLEARANCE ANGLE | | DIAMETER/ WIDTH | HEIGHT | | | | | | | | | | | | IN X DIRECTION (μm/N) | IN Z DIRECTION (μm/N) | |
| ± | (κ'1) | (ακ'1) | ± | (κ'2) | (ακ'2) | ± | X | ± | Z | ± | (κ'3) | (ακ'3) | | | | | ± | X | ± | Z | X | Z | ± | | ± | | | | |
| + | 85 | 5 | | | | | | | | | | | 1 | 25 | 25 | 1 | + | 105 | + | 7 | 25 | 0 | | 0 | | 0 | 0001 | 0001 | C |
| + | 58 | 5 | | | | | | | | | | | 1 | 25 | 25 | 1 | + | 120 | + | 7 | 40 | 0 | | 0 | | 0 | 0004 | 0004 | C |
| + | 58 | 5 | | | | | | | | | | | 1 | 25 | 25 | 1 | + | 120 | + | 7 | 40 | 0 | | 0 | | 0 | 0004 | 0004 | C |
| - | 1 | 1 | + | 1 | 1 | | | | | | | | 1 | 19 | 25 | 1 | + | 110 | | 0 | 30 | 0 | | 0 | | 0 | 0007 | 028 | B |
| + | 30 | 6 | | | | | | | | | | | 1 | 25 | 25 | 1 | + | 123 | - | 45 | 43 | 0 | | 0 | | 0 | 0004 | 0004 | B |
| + | 30 | 6 | | | | | | | | | | | 1 | 25 | 25 | 1 | + | 123 | - | 45 | 43 | 0 | | 0 | | 0 | 0004 | 0004 | B |
| - | 3 | 6 | | | | | | | | | | | 2 | 9 | | 2 | - | 20 | + | 55 | 0 | 55 | | 0 | | 0 | 0094 | 0094 | B |
| | | | | | | | | | | | | | 2 | 13 | | 2 | - | 20 | + | 45 | 0 | 45 | | | | | 0022 | 0022 | B |

FIG. 80

SIDE CLEARANCE RADIUS FOR SHANK WIDTH

| LIMIT OF DEPTH OF CUT (mm) | | LIMIT OF FEED (mm/rev) | | MAX. CUTTING ENDURANCE (N) | ALLOWABLE LIMIT OF INTERRUPTED CUTTING OPERATION | | | | SIDE RAKE OF MINOR CUTTING EDGE | | | BACK RAKE OF MINOR CUTTING EDGE | | | SPECIFICATIONS FOR GROOVING TOOL | | | |
|---|---|---|---|---|---|---|---|---|---|---|---|---|---|---|---|---|---|---|
| MAX. VALUE | MIN. VALUE | MAX. VALUE | MIN. VALUE | | CUTTING ENDURANCE (N) | THRESHOLD FREQUENCY | MAX. DEPTH OF CUT | MAX. FEED | $\gamma_i\kappa'_1$ ± | $\gamma_i\kappa'_2$ ± | $\gamma_i\kappa'_3$ ± | $\gamma_p\kappa'_1$ ± | $\gamma_p\kappa'_2$ ± | $\gamma_p\kappa'_3$ ± | GROOVE WIDTH | GROOVE DEPTH | LEFT | RIGHT |
| 1243 | 04 | 039 | 001 | 16666 | 6666 | 800 | 12 | 025 | - 5 | | | - 5 | | | | | | |
| | | | | | | | | | - 5 | | | - 5 | | | | | | |
| | | | | | | | | | | | | | | | | | | |
| | | 018 | 001 | 7143 | 2857 | 400 | | | 0 | 0 | | 0 | 0 | | 4 | 30 | | |
| 1 | 001 | 9 | 001 | 1250 | 500 | 400 | 03 | 015 | 0 | | | 0 | | | | | | |
| 1 | 001 | 9 | 001 | 1250 | 500 | 400 | 03 | 015 | 0 | | | | | | | | | |
| 05 | 01 | 015 | 001 | 55 | 22 | 20 | 02 | 005 | | | | | | | | | | |
| | | 015 | 001 | 227 | 91 | 20 | | | | | | | | | | | | |

FIG. 81

| R/F | TOOL MATERIAL | MACHINE TOOL ID NO. SPECIALLY PROVIDED FOR TOOLS | MACHINING SEGMENT | TOOL CODE OF MAJOR CUTTING EDGE — MACHINING ANGLE — START ANGLE | TOOL CODE OF MAJOR CUTTING EDGE — MACHINING ANGLE — END ANGLE | MACHINING SEGMENT | TOOL CODE (1) OF MINOR CUTTING EDGE — MACHINING ANGLE — START ANGLE | TOOL CODE (1) OF MINOR CUTTING EDGE — MACHINING ANGLE — END ANGLE | R/F | MACHINING SEGMENT | TOOL CODE (2) OF MINOR CUTTING EDGE — MACHINING ANGLE — START ANGLE | TOOL CODE (2) OF MINOR CUTTING EDGE — MACHINING ANGLE — END ANGLE | R/F | MACHINING SEGMENT | TOOL CODE (3) OF MINOR CUTTING EDGE — MACHINING ANGLE — START ANGLE | TOOL CODE (3) OF MINOR CUTTING EDGE — MACHINING ANGLE — END ANGLE | R/F |
|---|---|---|---|---|---|---|---|---|---|---|---|---|---|---|---|---|---|
| R | JISP20 | XLD001 | E | 935 | 3535 | F | 1765 | 2735 | R | | | | | | | | |
| R | JISP20 | XLD001 | E | 1465 | 3585 | F | 1785 | 3035 | R | | | | | | | | |
| F | JISP10 | XLD001 | E | 151 | 357 | F | 180 | 302 | F | | | | | | | | |
| F | JISP20 | XLD001 | EG | 180 | 0 | E | 90 | 0 | F | E | 270 | 0 | F | | | | |
| F | JISP20 | XLD001 | EH | 153 | 30 | E | 33 | 330 | F | | | | | | | | |
| F | JISP20 | XLD001 | EH | 33 | 330 | E | 153 | 30 | F | | | | | | | | |
| F | JISP10 | XLD001 | I | 90 | 180 | I | F180 | 270 | F | | | | | | | | |
| F | JISP10 | XLD001 | IG | 0 | 180 | I | 87 | 0 | F | I | 0 | 267 | F | | | | |

FIG. 82

| SEQUENCE NO. | TOOL ID NO. | SHANK ID NO. | TIP ID NO. | SPECIFICATIONS FOR TOOL DIAMETER: TOOL DIAMETER | SPECIFICATIONS FOR TOOL DIAMETER: TOLERANCE SYMBOL | SPECIFICATIONS FOR TOOL DIAMETER: UPPER DIMENSIONAL DIFFERENCE ± | SPECIFICATIONS FOR TOOL DIAMETER: LOWER DIMENSIONAL DIFFERENCE ± | SPECIFICATIONS FOR TOOL WIDTH: TOOL WIDTH | SPECIFICATIONS FOR TOOL WIDTH: TOLERANCE SYMBOL | SPECIFICATIONS FOR TOOL WIDTH: UPPER DIMENSIONAL DIFFERENCE ± |
|---|---|---|---|---|---|---|---|---|---|---|
| 1008 | 9 | DMT2 | | 19 | | | | | | |
| 1009 | 10 | DA2-JISB4304 | | 5 | h9 | 0 | - 0030 | | | |
| 1010 | 11 | DB4-JISB4304 | | 85 | h9 | 0 | - 0043 | | | |
| 1011 | 12 | DMT2 | | 19 | | | | | | |
| 1012 | 13 | D | | 48 | | | | | | |
| 1013 | 14 | R | | 5 | m5 | + 0009 | + 0004 | | | |
| 1014 | 15 | D | | 42 | | | | | | |
| 1015 | 16 | T | | 5 | | | | | | |
| 1016 | 17 | FBED2160S | | 16 | | 0 | - 0050 | | | |
| 1017 | 18 | FSED2100S | | 10 | | 0 | - 0050 | | | |
| 1018 | 19 | S | | 45 | | 0 | - 0050 | | | |
| 1019 | 20 | F | | 8 | h10 | 0 | - 0058 | 8 | | |
| 1020 | 21 | F | | 6 | h10 | 0 | - 0048 | | | + 0010 |
| 1021 | 22 | H | | 65 | | | | 65 | | |
| 1022 | 23 | GW176-S | WA180J6V | 10 | | | | | | |
| 1023 | 24 | G1-A | WA46K7V | 455 | | | | | | |
| 1024 | 25 | S | | 315 | | 0 | - 01 | 5 | | + 0090 |
| 1025 | 100 | | | 4 | | 0 | - 0001 | | | |

FIG. 83

| Lower Dimensional Difference ± | Lower Dimensional Difference | Length of Cutting Edge of Tool | Nominal Length | Segment | Specifications for Tip: Tip (1) Type | Tip (1) Taper/Angle | Tip (1) Tip Diameter (1) | Tip (1) Length of Tip Diameter (1) | Segment | Tip (2) Type | Tip (2) Taper/Angle | No. of Teeth | Direction of Rotation | XT/ZT | Reference Tip Point X ± | Reference Tip Point X | Reference Tip Point Z ± | Reference Tip Point Z | Rigidity of Tool: In X Direction (μm/N) | Rigidity of Tool: In Z Direction (μm/N) |
|---|---|---|---|---|---|---|---|---|---|---|---|---|---|---|---|---|---|---|---|---|
| | | 145 | 165 | 2 | | 120 | 19 | 145 | | | | 2 | R | 2 | | 0 | + | 165 | 0002 | |
| | | 3 | 65 | 2 | | 120 | 2 | 3 | 2 | | 60 | 2 | R | 2 | | 0 | + | 65 | | |
| | | 6 | 15 | 2 | | 120 | 4 | 6 | 2 | | 60 | 2 | R | 2 | | 0 | + | 15 | | |
| | | 140 | 160 | 2 | | 180 | 19 | 140 | | | | 2 | R | 2 | | 0 | + | 140 | 0002 | |
| | | 59 | 59 | 2 | | 120 | 48 | 59 | | | | 2 | R | 2 | | 0 | + | 59 | 255 | |
| | | 23 | 52 | 2 | | 90 | 5 | 21 | | | | 6 | R | 2 | | 0 | + | 52 | 4773 | |
| | | 54 | 54 | 2 | | 120 | 42 | 54 | | | | 2 | R | 2 | | 0 | + | 54 | 33395 | |
| | | 16 | 25 | 2 | | 90 | 5 | 14 | | | | 3 | R | 2 | | 0 | + | 25 | | |
| | | 25 | 35 | 2 | | 180 | 16 | 25 | | | | 2 | R | 1 | + | 35 | | 0 | | 0024 |
| | | 20 | 24 | 2 | | 180 | 10 | 20 | | | | 2 | R | 2 | | 0 | + | 24 | 0051 | |
| - | 0010 | | | | | | | | | | | 18 | R | 1 | + | 50 | | 0 | | |
| | | 11 | 11 | 2 | | 180 | 8 | 11 | | | | 2 | R | 2 | | 0 | + | 11 | 0022 | |
| | | 8 | 8 | 2 | | 180 | 6 | 8 | | | | 2 | R | 1 | + | 8 | | 0 | 0027 | |
| | | | | | | | | | | | | 10 | R | 1 | + | 325 | | 0 | 0008 | 0008 |
| | | 13 | 20 | 2 | | 180 | 10 | 13 | | | | | R | 2 | | 0 | + | 20 | 0204 | |
| | | 75 | | | | | | | | | | | R | 2 | | 0 | + | 75 | 0001 | |
| | 00 | | | | | | | | | | | 40 | R | 1 | | 1575 | | 0 | | |
| | | 4 | 150 | | | | | | | | | | | 2 | | 0 | + | 165 | | |

FIG. 84

TIP CLAMP

SEGMENT

MAX. CUT WITHSTANDING CAPACITY (N)

CUT WITHSTANDING CAPACITY (N)

SEGMENT

R/L

SEGMENT

| TIP CLAMP | LIMIT OF DEPTH OF CUT (mm) | | SEGMENT | LIMIT OF FEED (1; mm/rev, 2; mm/min) | | MAX. CUT WITHSTANDING CAPACITY (N) | ALLOWABLE LIMIT OF INTERMITTENT CUTTING OPERATION (1) | | | | TOOL MATERIAL | SPECIFICATIONS FOR THREAD CUTTING TOOL | | | (GEAR CUTTER) | |
|---|---|---|---|---|---|---|---|---|---|---|---|---|---|---|---|---|
| | MAX. VALUE | MIN. VALUE | | MAX. VALUE | MIN. VALUE | | CUT WITHSTANDING CAPACITY (N) | THRESHOLD FREQUENCY | MAX. DEPTH OF CUT | MAX. FEED (mm/rev) | | SEGMENT | PITCH | ACCURACY (R/L) | SEGMENT | SIZE OF M/DP |
| L | | | 1 | 05 | 001 | 2500 | 1000 | 60 | | 015 | SKH51 | | | | | |
| L | | | 1 | 008 | 001 | 250 | 100 | 40 | | 003 | SKH51 | | | | | |
| L | | | 1 | 015 | 001 | 750 | 300 | 50 | | 005 | SKH51 | | | | | |
| L | | | 1 | 05 | 001 | 2500 | 1000 | 60 | | 015 | SKH51 | | | | | |
| L | | | 1 | 015 | 001 | 750 | 250 | 40 | | 003 | SKH51 | | | | | |
| L | | | 1 | 15 | 05 | 750 | 300 | 50 | | 05 | SKH51 | | | | | |
| L | | | 1 | 015 | 001 | 650 | 250 | 45 | | 003 | SKH51 | | | | | |
| L | | | 1 | 08 | 08 | | | | | 08 | SKH51 | M | 08 | R | | |
| B | 16 | 005 | 1 | 02 | 005 | 600 | 250 | 60 | 8 | 015 | M20 | | | | | |
| L | 10 | 005 | 1 | 01 | 001 | 300 | 150 | 60 | 4 | 005 | M20 | | | | | |
| L | 85 | 002 | 1 | 036 | 018 | 9400 | 940 | 17 | 25 | 018 | SKH51 | | | | | |
| L | 8 | 005 | 1 | 003 | 001 | 220 | 110 | 60 | 25 | 001 | SKH51 | | | | | |
| L | 6 | 005 | 1 | 0015 | 001 | 185 | 90 | 60 | 2 | 001 | SKH51 | | | | | |
| L | 5625 | 001 | 1 | 005 | 001 | 625 | 300 | 60 | 08 | 01 | SKH55 | | | | M | 25 |
| B | 10 | 3 | 1 | 0001 | 0001 | 250 | 120 | 60 | 3 | 00005 | WA | | | | | |
| B | 75 | 5 | 1 | 0003 | 0001 | 5000 | 2000 | 30 | 75 | 0001 | WA | | | | | |
| B | | | 1 | 5 | 04 | | 5000 | 30 | 5 | 04 | SKH51 | | | | | |
| | | | | | | | | | | | M20 | | | | | |

FIG. 85

| PRESSURE ANGLE (SPECIFICATIONS FOR GEAR CUTTER) | CUTTER ADDENDUM | DEDENDUM (SEGMENT) | TOP CORNER RADIUS | ACCURACY | ADDENDUM MODIFICATION | R/F | SPECIALIZED MACHINE TOOL ID NO. | |
|---|---|---|---|---|---|---|---|---|
| | | | | | | R | XLD001 | |
| | | | | | | F | XLD001 | |
| | | | | | | F | XLD001 | |
| | | | | | | F | XLD001 | |
| | | | | | | R | XLD001 | |
| | | | | | | F | XLD001 | |
| | | | | | | R | XLD001 | |
| | | | | | | F | XLD001 | |
| | | | | | | F | XLD001 | |
| | | | | | | F | XLD001 | |
| | | | | | | F | XLD001 | |
| | | | | | | F | XLD001 | |
| | | | | | | F | XLD001 | |
| 20 | 3125 | 34251 | 0985 | JIS3 | 0 | F | XHB001 | |
| | | | | | | F | XGE001 | |
| | | | | | | F | XGI001 | |
| | | | | | | R | CSW001 | |
| | | | | | | F | XLD001 | XGE001, XGI001 INSPECTION AND MEASUREMENT PROBE |

DIFFERENCE BETWEEN ACTUALLY MEASURED DATA AND REFERENCE DIAMETER

| ACTUALLY MEASURED VALUES (THREE-POINT MEAN VALUE) | DIFFERENCES IN RELATION TO φ77.075 |
|---|---|
| φ66.943 | −10.132 |
| φ67.964 | − 9.111 |
| φ68.975 | − 8.100 |
| φ69.997 | − 7.078 |
| φ71.015 | − 6.060 |
| φ72.019 | − 5.055 |
| φ73.025 | − 4.050 |
| φ74.035 | − 3.040 |
| φ75.051 | − 2.024 |
| φ76.075 | − 1.000 |

FIG. 90

CENTER HOLE SHAPE FILE

| ANGLE | NOMINAL DIAMETER d | LARGE DIAMETER OF CENTER HOLE D | B CHAMFERING DIAMETER "B" D1 | C BORING DIAMETER "C" D2 | DEPTH OF NOMINAL DIAMETER l | C DEPTH OF BORE "C"b | B DEPTH OF CHAMFER "B"a | RADIUS (r) Max | RADIUS (r) Min |
|---|---|---|---|---|---|---|---|---|---|
| 60 | 1.6 | 3.35 | 5 | 5 | 2.8 | 0.6 | 0.47 | — | — |
| 60 | 2 | 4.25 | 6.3 | 6.3 | 3.3 | 0.8 | 0.59 | — | — |
| 60 | 2.5 | 5.3 | 8 | 8 | 4.1 | 0.9 | 0.78 | — | — |
| 60 | 4 | 8.5 | 12.5 | 12.5 | 6.2 | 1.3 | 1.15 | — | — |
| 75 | 1.6 | 4 | 6.3 | 6.3 | 2 | 0.6 | 0.67 | — | — |
| 75 | 2 | 5 | 8 | 8 | 2.5 | 0.8 | 0.87 | — | — |
| 75 | 2.5 | 6.3 | 10 | 10 | 3.2 | 0.9 | 1.06 | — | — |
| 75 | 4 | 10 | 14 | 14 | 5 | 1.2 | 1.15 | — | — |
| 90 | 1.6 | 4.5 | 6.3 | 8 | 1.8 | 0.6 | 0.52 | — | — |
| 90 | 2 | 5.6 | 8 | 10 | 2.2 | 0.8 | 0.69 | — | — |
| 90 | 2.5 | 7.1 | 10 | 12.5 | 2.8 | 1 | 0.84 | — | — |
| 90 | 4 | 11.2 | 16 | 18 | 4.5 | 1.4 | 1.39 | — | — |
| R | 1.6 | 3.35 | — | — | 4 | — | — | 5 | 4 |
| R | 2 | 4.25 | — | — | 5 | — | — | 6.3 | 5 |
| R | 2.5 | 5.3 | — | — | 6.3 | — | — | 8 | 6.3 |
| R | 4 | 8.5 | — | — | 9.9 | — | — | 12.5 | 10 |

KEYWAY SHAPE FILE

END-FACE KEYWAY SHAPE FILE

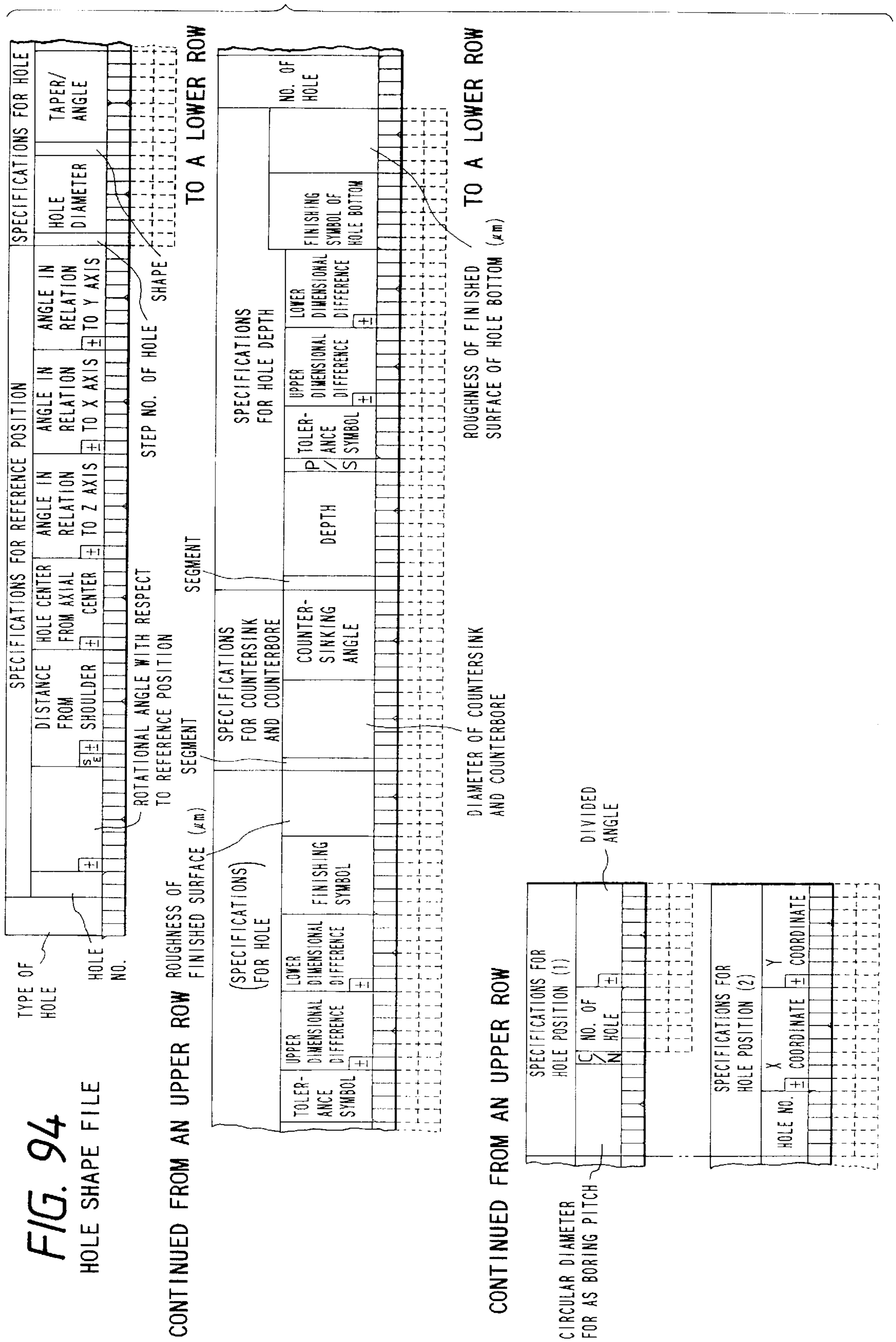

FIG. 94
HOLE SHAPE FILE
TYPE OF HOLE
HOLE NO.
SPECIFICATIONS FOR REFERENCE POSITION
DISTANCE FROM SHOULDER
HOLE CENTER FROM AXIAL CENTER
ANGLE IN RELATION TO Z AXIS
ANGLE IN RELATION TO X AXIS
ANGLE IN RELATION TO Y AXIS
SPECIFICATIONS FOR HOLE
HOLE DIAMETER
TAPER/ ANGLE
ROTATIONAL ANGLE WITH RESPECT TO REFERENCE POSITION
STEP NO. OF HOLE
SHAPE
TO A LOWER ROW
CONTINUED FROM AN UPPER ROW
ROUGHNESS OF FINISHED SURFACE (μm)
SEGMENT
(SPECIFICATIONS FOR HOLE)
TOLER-ANCE SYMBOL
UPPER DIMENSIONAL DIFFERENCE
LOWER DIMENSIONAL DIFFERENCE
FINISHING SYMBOL
SPECIFICATIONS FOR COUNTERSINK AND COUNTERBORE
COUNTER-SINKING ANGLE
DIAMETER OF COUNTERSINK AND COUNTERBORE
SPECIFICATIONS FOR HOLE DEPTH
DEPTH
P/S
TOLER-ANCE SYMBOL
UPPER DIMENSIONAL DIFFERENCE
LOWER DIMENSIONAL DIFFERENCE
FINISHING SYMBOL OF HOLE BOTTOM
NO. OF HOLE
ROUGHNESS OF FINISHED SURFACE OF HOLE BOTTOM (μm)
TO A LOWER ROW
CONTINUED FROM AN UPPER ROW
CIRCULAR DIAMETER FOR AS BORING PITCH
SPECIFICATIONS FOR HOLE POSITION (1)
C/N
NO. OF HOLE
DIVIDED ANGLE
SPECIFICATIONS FOR HOLE POSITION (2)
HOLE NO.
X COORDINATE
Y COORDINATE

TAPPED HOLE SHAPE FILE

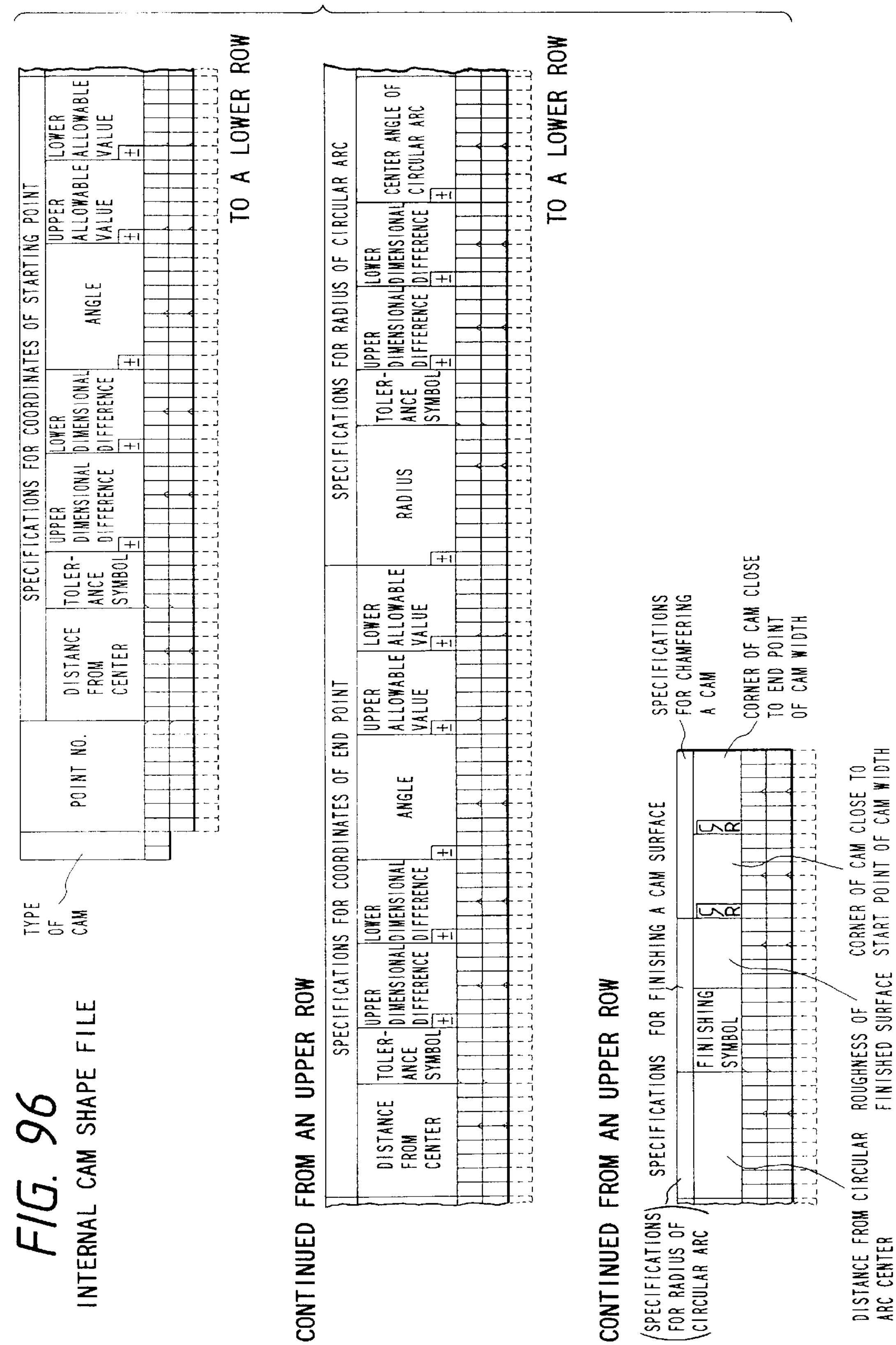
FIG. 96
INTERNAL CAM SHAPE FILE
TYPE OF CAM
POINT NO.
SPECIFICATIONS FOR COORDINATES OF STARTING POINT
DISTANCE FROM CENTER
TOLER-ANCE SYMBOL
UPPER DIMENSIONAL DIFFERENCE
LOWER DIMENSIONAL DIFFERENCE
ANGLE
UPPER ALLOWABLE VALUE
LOWER ALLOWABLE VALUE
TO A LOWER ROW
CONTINUED FROM AN UPPER ROW
SPECIFICATIONS FOR COORDINATES OF END POINT
DISTANCE FROM CENTER
TOLER-ANCE SYMBOL
UPPER DIMENSIONAL DIFFERENCE
LOWER DIMENSIONAL DIFFERENCE
ANGLE
UPPER ALLOWABLE VALUE
LOWER ALLOWABLE VALUE
SPECIFICATIONS FOR RADIUS OF CIRCULAR ARC
RADIUS
TOLER-ANCE SYMBOL
UPPER DIMENSIONAL DIFFERENCE
LOWER DIMENSIONAL DIFFERENCE
CENTER ANGLE OF CIRCULAR ARC
TO A LOWER ROW
CONTINUED FROM AN UPPER ROW
(SPECIFICATIONS FOR RADIUS OF CIRCULAR ARC)
SPECIFICATIONS FOR FINISHING A CAM SURFACE
FINISHING SYMBOL
SPECIFICATIONS FOR CHAMFERING A CAM
CORNER OF CAM CLOSE TO END POINT OF CAM WIDTH
CORNER OF CAM CLOSE TO START POINT OF CAM WIDTH
ROUGHNESS OF FINISHED SURFACE
DISTANCE FROM CIRCULAR ARC CENTER

END-FACE CAM SHAPE FILE

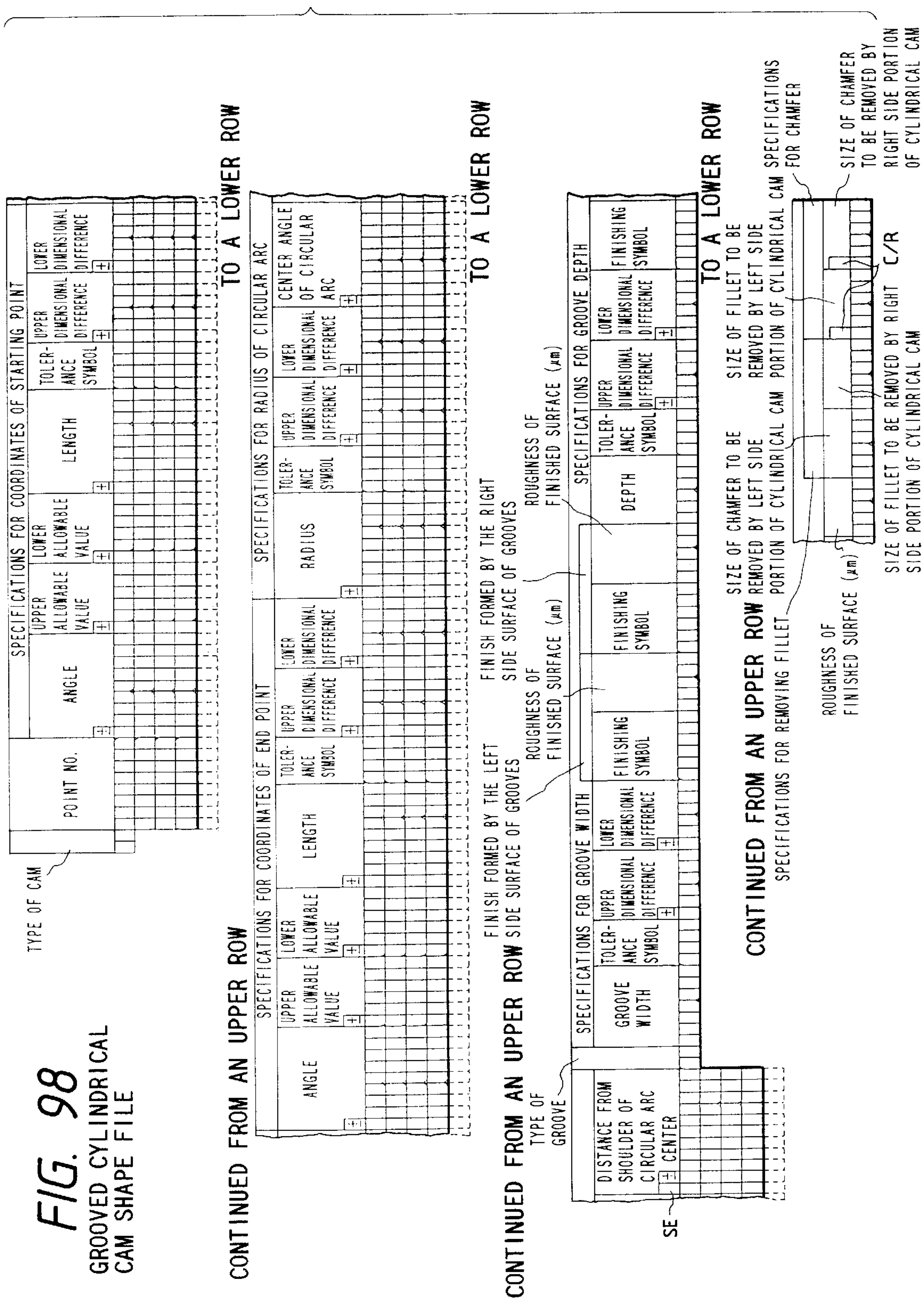
FIG. 98
GROOVED CYLINDRICAL CAM SHAPE FILE
TYPE OF CAM
POINT NO.
SPECIFICATIONS FOR COORDINATES OF STARTING POINT
ANGLE
UPPER ALLOWABLE VALUE
LOWER ALLOWABLE VALUE
LENGTH
TOLER-ANCE SYMBOL
UPPER DIMENSIONAL DIFFERENCE
LOWER DIMENSIONAL DIFFERENCE
TO A LOWER ROW
CONTINUED FROM AN UPPER ROW
SPECIFICATIONS FOR COORDINATES OF END POINT
ANGLE
UPPER ALLOWABLE VALUE
LOWER ALLOWABLE VALUE
LENGTH
TOLER-ANCE SYMBOL
UPPER DIMENSIONAL DIFFERENCE
LOWER DIMENSIONAL DIFFERENCE
SPECIFICATIONS FOR RADIUS OF CIRCULAR ARC
RADIUS
TOLER-ANCE SYMBOL
UPPER DIMENSIONAL DIFFERENCE
LOWER DIMENSIONAL DIFFERENCE
CENTER ANGLE OF CIRCULAR ARC
TO A LOWER ROW
CONTINUED FROM AN UPPER ROW
TYPE OF GROOVE
DISTANCE FROM SHOULDER OF CIRCULAR ARC CENTER
SE
SPECIFICATIONS FOR GROOVE WIDTH
GROOVE WIDTH
TOLER-ANCE SYMBOL
UPPER DIMENSIONAL DIFFERENCE
LOWER DIMENSIONAL DIFFERENCE
FINISH FORMED BY THE LEFT SIDE SURFACE OF GROOVES
ROUGHNESS OF FINISHED SURFACE (μm)
FINISHING SYMBOL
FINISH FORMED BY THE RIGHT SIDE SURFACE OF GROOVES
ROUGHNESS OF FINISHED SURFACE (μm)
FINISHING SYMBOL
ROUGHNESS OF FINISHED SURFACE (μm)
SPECIFICATIONS FOR GROOVE DEPTH
DEPTH
TOLER-ANCE SYMBOL
UPPER DIMENSIONAL DIFFERENCE
LOWER DIMENSIONAL DIFFERENCE
FINISHING SYMBOL
TO A LOWER ROW
CONTINUED FROM AN UPPER ROW
SPECIFICATIONS FOR REMOVING FILLET
SIZE OF CHAMFER TO BE REMOVED BY LEFT SIDE PORTION OF CYLINDRICAL CAM
SIZE OF FILLET TO BE REMOVED BY LEFT SIDE PORTION OF CYLINDRICAL CAM
SPECIFICATIONS FOR CHAMFER
SIZE OF CHAMFER TO BE REMOVED BY RIGHT SIDE PORTION OF CYLINDRICAL CAM
C/R
SIZE OF FILLET TO BE REMOVED BY RIGHT SIDE PORTION OF CYLINDRICAL CAM
ROUGHNESS OF FINISHED SURFACE (μm)

FILE FOR THE SHAPE OF GROOVE OF GROOVED CYLINDRICAL CAM

EXTERNAL CAM SHAPE FILE

FILE FOR SHAPE OF END-FACE GROOVED CAM

GROOVE SHAPE FILE FOR END-FACE GROOVED CAM

SHAPE FILE FOR
CYLINDRICAL OUTSIDE PLANE/
CYLINDRICAL OUTSIDE POLYGON

INTERNAL GEAR SHAPE FILE

EXTERNAL GEAR SHAPE FILE

FIG. 106

TAPER SHAPE FILE

| TYPE | TAPER | REFERENCE DIAMETER D | SMALLER DIAMETER (d) | ENTIRE LENGTH L |
|---|---|---|---|---|
| MT 0 | 005205 | 9045 | 6115 | 508 |
| MT 1 | 004988 | 12065 | 8972 | 54 |
| MT 2 | 004995 | 17780 | 14059 | 65 |
| MT 3 | 005019 | 23285 | 19132 | 81 |
| JT 1 | 007709 | 9754 | 8469 | 16669 |
| JT 2 | 008155 | 13940 | 12386 | 19050 |
| JT 3 | 005325 | 20599 | 18951 | 30956 |
| NT30 | 002917 | 31750 | | |
| NT35 | 002917 | 38100 | | |
| NT40 | 002917 | 44450 | | |
| NT45 | 002917 | 57150 | | |
| BT 40 | 004186 | 10221 | 8457 | 421 |
| BT 50 | 004180 | 13284 | 10667 | 556 |
| BT 60 | 004194 | 15215 | 12173 | 73 |
| BT 70 | 004178 | 18415 | 14677 | 897 |
| | | | | |
| | | | | |

FIG. 107

SPECIFIED INPUT FORMAT FOR MACHINING (INTERACTIVE INPUT)

| PRIORITY GIVEN TO COST/TIME | | PROCESS | REMOVING DIRECTION | | CUTTING METHOD | | TOOL | FIXTURE | CUTTING CONDI-TIONS | FINISHING ALLOWANCE | |
|---|---|---|---|---|---|---|---|---|---|---|---|
| DESIG-NATION | PRIOR-ITY | DESIG-NATION | DESIG-NATION | DIREC-TION | DESIG-NATION | CUTTING METHOD | DESIG-NATION | DESIG-NATION | DESIG-NATION | DESIGNATION OF CURRENT PROCESS | DESIGNATION OF ANOTHER PROCESS |
| 0 | COST (1) | 0 | 0 | X | 0 | UNIFORM CUTTING OF MATERIAL (1) | 0 | 0 | 0 | 0 | 0 |
| 1 | TIME (2) | 1 | 1 | Z | 1 | CUTTING OF MATE-RIAL TO CONSTANT DEPTH (2) | 1 | 1 | 1 | 1 | 1 |

INTERACTIVE INPUT

· THE BLOCK THAT IS FILLED WITH AN INPUT IS HIGHLIGHTED

0 : UNSPECIFIED
(AN ITEM WHICH HAS NO INPUT IS DEALT WITH AS BEING UNSPECIFIED)

1 : DESIGNATION

X, Z } ANY DESIGNATION (AN ITEM WHICH HAS NO INPUT IS DEALT WITH AS BEING UNSPECIFIED)

FIG. 108

SPECIFIED INPUT FORMAT FOR MACHINING (NONINTERACTIVE INPUT)

| PRIORITY GIVEN TO COST/TIME | | PROCESS | REMOVING DIRECTION | | CUTTING METHOD | | TOOL | FIXTURE | CUTTING CONDI-TIONS | FINISHING ALLOWANCE | |
|---|---|---|---|---|---|---|---|---|---|---|---|
| DESIG-NATION | PRIOR-ITY | DESIG-NATION | DESIG-NATION | DIREC-TION | DESIG-NATION | CUTTING METHOD | DESIG-NATION | DESIG-NATION | DESIG-NATION | DESIGNATION OF CURRENT PROCESS | DESIGNATION OF ANOTHER PROCESS |
| | | | | | | | | | | | |
| ↑ 0 OR 1 | ↑ 1 OR 2 | ↑ 0 OR 1 | ↑ 0 OR 1 | ↑ X OR Z | ↑ 0 OR 1 | ↑ 1 OR 2 | ↑ 0 OR 1 | ↑ 0 OR 1 | ↑ 0 OR 1 | ↑ 0 OR 1 | ↑ 0 OR 1 |

NONINTERACTIVE INPUT

0 OR 1 ; 0 : UNSPECIFIED 1 : SPECIFIED

1 OR 2 ; PRIORITY ( 1 : PRIORITY GIVEN TO COST
2 : PRIORITY GIVEN TO TIME

CUTTING METHOD ( 1 : UNIFORM CUTTING OF MATERIAL
2 : CUTTING OF MATERIAL TO UNIFORM DEPTH

FIG. 109

DESIGNATION OF PROCESS/PRESENCE OR ABSENCE OF SPECIFIED TOOL/FIXTURE NO./FORMAT FOR INPUTTING A FINISHING ALLOWANCE

| ORDER OF MACHINING PROCESS | 1 | 2 | 3 | 4 | 5 | 6 | 7 | |
|---|---|---|---|---|---|---|---|---|
| *NAME OF MACHINING PROCESS | | | | | | | | |
| *PRESENCE OR ABSENCE OF SPECIFIED TOOL | | | | | | | | |
| *FIXTURE NO. | | | | | | | | |
| *FINISHING ALLOWANCE FOR CURRENT PROCESS | | | | | | | | |
| *FINISHING ALLOWANCE FOR ANOTHER PROCESS | | | | | | | | |

INPUT A MACHINING PROCESS CODE

PRESENCE ; 1, ABSENCE ; 0

INPUT FIXTURE NO.

INPUT A VALUE IN MILLIMETERS

NOTE, *IS VALID ONLY WHEN THE ITEM WITH ASTERISK HAS A SPECIFIED INPUT

FIG. 110

DESIGNATION OF TOOL/CUTTING CONDITION INPUT FORMAT

| CUTTING ORDER | | 1 | 2 | 3 | 4 | 5 | 6 | |
|---|---|---|---|---|---|---|---|---|
| PICTORIAL PATTERN | | | | | | | | |
| LIMIT OF TOOL SIZE | | | | | | | | |
| *TOOL NO. | | | | | | | | |
| CUTTING CONDITIONS | CUTTING RATE | | | | | | | |
| | MAX. FEED | | | | | | | |
| | MIN. FEED | | | | | | | |
| FINISHING ALLOWANCE FOR CURRENT PROCESS | | | | | | | | |
| FINISHING ALLOWANCE FOR ANOTHER PROCESS | | | | | | | | |

INPUT A TOOL NO.

INPUT A VALUE IN METERS/MIN.

INPUT A VALUE IN MILLIMETERS/REV

INPUT A VALUE IN MILLIMETERS

NOTE, *IS VALID ONLY WHEN THE ITEM WITH ASTERISK HAS A SPECIFIED INPUT

FIG. 112

DIMENSIONAL TOLERANCE FILE ;
TABLE OF HOLE TYPE H

[UNIT ; mm]

| IN EXCESS OF THE SIZE SEGMENT: MORE THAN THE SIZE | EQUAL OR LESS THAN THE SIZE | UPPER/LOWER DIMENSIONAL DIFFERENCES / TYPE AND GRADE OF HOLE | H01 | … | H06 | H07 | H08 | … | H16 |
|---|---|---|---|---|---|---|---|---|---|
| – | 3 | UPPER DIMENSIONAL DIFFERENCE | +0.0003 | | +0.006 | +0.010 | +0.014 | | +0.600 |
| | | LOWER DIMENSIONAL DIFFERENCE | 0 | | 0 | 0 | 0 | | 0 |
| 3 | 6 | UPPER DIMENSIONAL DIFFERENCE | +0.0004 | | +0.008 | +0.012 | +0.018 | | +0.750 |
| | | LOWER DIMENSIONAL DIFFERENCE | 0 | | 0 | 0 | 0 | | 0 |
| 6 | 10 | UPPER DIMENSIONAL DIFFERENCE | +0.0004 | | +0.009 | +0.015 | +0.022 | | +0.900 |
| | | LOWER DIMENSIONAL DIFFERENCE | 0 | | 0 | 0 | 0 | | 0 |
| … | | | | | | | | | |
| 18 | 30 | UPPER DIMENSIONAL DIFFERENCE | +0.0006 | | +0.013 | +0.021 | +0.033 | | +1.300 |
| | | LOWER DIMENSIONAL DIFFERENCE | 0 | | 0 | 0 | 0 | | 0 |
| 30 | 50 | UPPER DIMENSIONAL DIFFERENCE | +0.0006 | | +0.016 | +0.025 | +0.039 | | +1.600 |
| | | LOWER DIMENSIONAL DIFFERENCE | 0 | | 0 | 0 | 0 | | 0 |
| … | | | | | | | | | |
| 400 | 500 | UPPER DIMENSIONAL DIFFERENCE | +0.004 | | +0.040 | +0.063 | +0.097 | | +4.000 |
| | | LOWER DIMENSIONAL DIFFERENCE | 0 | | 0 | 0 | 0 | | 0 |

FIG. 113

TABLE OF BASIC DEVIATION (OF HOLE)

[UNIT ; mm]

| BASIC DEVIATION | | LOWER DIMENSIONAL DIFFERENCE | | | | NONE | UPPER DIAMENSIONAL DIFFERENCE | | |
|---|---|---|---|---|---|---|---|---|---|
| TYPE OF HOLE | | A | B | C | H | Js | J | | K |
| GRADE OF HOLE | | 01～16 | | | | | 6 | 7 | 3 |
| MORE THAN THE SIZE | EQUAL OR LESS THAN SIZE SEGMENT | | | | | | | | |
| — | 3 | +0.270 | +0.140 | +0.060 | 0 | – | +0.002 | +0.004 | 0 |
| 3 | 6 | +0.270 | +0.140 | +0.070 | 0 | – | +0.005 | +0.006 | 0 |
| 18 | 24 | +0.300 | +0.160 | +0.100 | 0 | – | +0.008 | +0.012 | −0.0005 |
| 24 | 30 | +0.300 | +0.160 | +0.100 | 0 | – | +0.008 | +0.012 | −0.0005 |

IN EXCESS OF SIZE SEGMENT

FIG. 114

TABLE OF IT BASIC TOLERANCE

[UNIT ; mm]

| IN EXCESS OF SIZE SEGMENT: MORE THAN THE SIZE | EQUAL OR LESS THAN SIZE SEGMENT | GRADE: IT01 | IT 6 | IT 7 | IT 8 | IT16 |
|---|---|---|---|---|---|---|
| — | 3 | 0.0003 | 0.006 | 0.010 | 0.014 | 0.600 |
| 3 | 6 | 0.0004 | 0.008 | 0.012 | 0.018 | 0.750 |
| 18 | 30 | 0.0006 | 0.018 | 0.021 | 0.033 | 1.300 |
| 24 | 60 | 0.0006 | 0.016 | 0.025 | 0.039 | 1.600 |

FIG. 115

TABLE WITH REGARD TO DIFFERENCES IN IT TOLERANCE AMONG GRADES

[UNIT ; mm]

| IN EXCESS OF SIZE SEGMENT: MORE THAN THE SIZE | EQUAL OR LESS THAN SIZE SEGMENT | GRADE: 3 | 4 | 5 | 6 | 7 | 8 |
|---|---|---|---|---|---|---|---|
| — | 3 | 0 | 0 | 0 | 0 | 0 | 0 |
| 3 | 6 | 0.001 | 0.0015 | 0.001 | 0.003 | 0.004 | 0.006 |
| 18 | 24 | 0.0015 | 0.002 | 0.003 | 0.004 | 0.008 | 0.012 |
| 24 | 30 | 0.0015 | 0.002 | 0.003 | 0.004 | 0.006 | 0.012 |

FIG. 116

SCREW THREAD SHAPE FILE (MALE SCREW THREAD)

[UNIT ; mm]

| NOMINAL DESIGNATION OF SCREW THREAD | | PITCH OF SCREW THREAD | GRADE | OUTSIDE DIAMETER | | EFFECTIVE DIAMETER | | MIN. ROOT RADIUS | . . . . . . | . . . |
|---|---|---|---|---|---|---|---|---|---|---|
| SEGMENT | NOMINAL DIAMETER | | | UPPER DIMENSION | LOWER DIMENSION | UPPER DIMENSION | LOWER DIMENSION | | | |
| M | 24 | 1. | | 23, 974 | 23, 794 | 23, 324 | 23, 199 | 0. 125 | . . . | . . |
| | 25 | 2. | | 24, 962 | 24, 682 | 23, 663 | 23, 493 | 0. 250 | . . . | |
| | 25 | 1. 5 | | 24, 968 | 24, 732 | 23, 994 | 23, 844 | 0. 188 | | |
| | 25 | 1. | | 24, 974 | 24, 794 | 24, 324 | 24, 199 | 0. 125 | | |
| | 26 | 1. 5 | 6g | 25, 968 | 25, 732 | 24, 994 | 24, 844 | 0. 188 | | |
| M | 72 | 6 | | 71, 920 | 71, 320 | 68, 023 | 67, 743 | 0. 750 | | |
| | | 4 | | 71, 940 | 71, 465 | 69, 342 | 69, 106 | 0. 500 | | |
| | | 3 | | 71, 952 | 71, 577 | 70, 003 | 69, 791 | 0. 375 | | |
| | | 2 | 6g | 71, 962 | 71, 682 | 70, 663 | 70, 483 | 0. 250 | | |
| | | 1. 5 | | 71, 968 | 71, 732 | 70, 994 | 70, 834 | 0. 188 | | |
| | 75 | 4 | | 74, 940 | 74, 465 | 72, 342 | 72, 106 | 0. 500 | | |

FIG. 117

FILE FOR PRE-FORMED HOLE OF SCREW THREAD

[UNIT ; mm]

| NOMINAL DIAMETER OF SCREW THREAD | PITCH OF SCREW THREAD | PRE-FORMED HOLE DIAMETER | CHAMFER DIAMETER OF SCREW THREAD |
|---|---|---|---|
| M 1 | 0. 2 5 | 0. 7 | — |
| M 1. 2 | 0. 2 5 | 0. 9 | — |
| | | | |
| M 3 | 0. 5 | 2. 5 | 3. 5 |
| M 3. 5 | 0. 6 | 2. 9 | 4. 0 |
| M 4 | 0. 7 | 3. 3 | 4. 5 |
| M 5 | 0. 8 | 4. 2 | 5. 5 |
| M 6 | 1. 0 | 5. | 6. 5 |
| M 8 | 1. 2 5 | 6. 7 | 8. 7 |
| M 1 0 | 1. 5 | 8. 5 | 1 1. |
| M 1 2 | 1. 7 5 | 1 0. 3 | 1 3. |

FIG. 118

MACHINING METHOD SYMBOL FILE

| MACHINING METHOD SYMBOL / FINISHING SYMBOL | MACHINING METHOD AND EXTENT OF FINISH ROUGHNESS 0 | 1 | 2 | 3 | 4 | 5 | 6 | MACHINING METHOD |
|---|---|---|---|---|---|---|---|---|
| AM | 1 | 1 | 1 | 0 | 0 | – | – | MARKING |
| B | 0 | 1 | 1 | 1 | 0 | – | – | BORING |
| BR | 0 | 1 | 1 | 0 | 0 | – | – | BROACHING |
| C | 1 | 0 | 0 | 0 | 0 | – | – | CASTING |
| CMS | 0 | 0 | 1 | 1 | 0 | – | – | CENTERING |
| D | 0 | 1 | 0 | 0 | 0 | – | – | DRILLING |
| DR | 0 | 1 | 1 | 1 | 0 | – | – | REAMING |
| F | 1 | 0 | 0 | 0 | 0 | – | – | CASTING |
| FS | 0 | 0 | 1 | 1 | 0 | – | – | SCRAPING |
| G | 0 | 0 | 1 | 1 | 1 | – | – | GRINDING |
| GE | 0 | 0 | 1 | 1 | 1 | – | – | GRINDING OF OUTSIDE DIAMETER |
| GI | 0 | 0 | 1 | 1 | 1 | – | – | GRINDING OF INSIDE DIAMETER |
| GH | 0 | 0 | 0 | 1 | 1 | – | – | HONING |
| GL | 0 | 0 | 0 | 1 | 1 | – | – | LAPPING |
| GSP | 0 | 0 | 0 | 0 | 1 | – | – | SUPER FINISHING |
| HB | 0 | 0 | 1 | 1 | 0 | – | – | HOBBING |
| L | 0 | 1 | 1 | 1 | 0 | – | – | TURNING |
| M | 0 | 1 | 1 | 1 | 0 | – | – | MILLING |
| ME | 0 | 1 | 1 | 1 | 0 | – | – | END MILLING |
| MP | 0 | 1 | 1 | 1 | 0 | – | – | PLAIN MILLING |
| MPC | 0 | 1 | 1 | 1 | 0 | – | – | FACE MILLING |
| MSD | 0 | 1 | 1 | 0 | 0 | – | – | SIDE MILLING |
| P | 0 | 1 | 1 | 0 | 0 | – | – | PLANING |
| SPEC | 0 | 1 | 1 | 1 | 1 | – | – | ELECTRO-CHEMICAL MACHINING |
| SPED | 0 | 1 | 1 | 1 | 1 | – | – | ELECTRIC DISCHARGE MACHINING |
| SBLB | 0 | 1 | 1 | 0 | 0 | – | – | LASER BEAM MACHINING |
| SW | 0 | 1 | 0 | 0 | 0 | – | – | SAWING |
| T | 0 | 0 | 1 | 1 | 0 | – | – | TAPPING |

FIG. 119

FINISHING SYMBOL FILE

| FINISHING SYMBOL | SYMBOL USED IN DRAWING | ROUGHNESS (μm) |
|---|---|---|
| – | ∼ | – |
| 0 | ∼× | – |
| 1 | ▽ | LESS THAN 100S |
| 2 | ▽▽ | LESS THAN 25S |
| 3 | ▽▽▽ | LESS THAN 6.3S |
| 4 | ▽▽▽▽ | LESS THAN 0.8S |
| 5 | √ | INPUTTING OF NUMERICAL VALUE IS REQUIRED |
| 6 | ∀̸ | INPUTTING OF NUMERICAL VALUE IS REQUIRED |

FIG. 120

FINISHING ALLOWANCE FILE
(OUTSIDE DIAMETER, THERMAL REFINING ALLOWANCE WHICH IS NOT INCLUDED, FINISHING ALLOWANCE PER DIAMETER, AND GRINDING)

[UNIT ; mm]

| IN EXCESS OF DIAMETER D: MORE THAN THE SIZE | LESS THAN DIAMETER | LENGTH L: LESS THAN 25 | BETWEEN 25 AND 63 | BETWEEN 63 AND 250 | BETWEEN 250 AND 630 | BETWEEN 630 AND 1000 | BETWEEN 1000 AND 4000 |
|---|---|---|---|---|---|---|---|
| 3 | 6 | 0.1 | 0.1 | – | – | – | – |
| 6 | 10 | 0.1 | 0.2 | 0.2 | – | – | – |
| 10 | 30 | 0.1 | 0.2 | 0.2 | 0.3 | 0.3 | – |
| 30 | 80 | 0.2 | 0.2 | 0.2 | 0.3 | 0.3 | 0.4 |
| 80 | 250 | 0.2 | 0.2 | 0.2 | 0.3 | 0.3 | 0.4 |
| 250 | 500 | 0.3 | 0.3 | 0.3 | 0.3 | 0.3 | 0.4 |
| 500 | – | – | 0.4 | 0.4 | 0.4 | 0.5 | 0.5 |

FIG. 121

FINISHING ALLOWANCE FILE
(OUTSIDE DIAMETER, FINISHING ALLOWANCE INCLUDING THERMAL REFINING ALLOWANCE, AND GRINDING)

[UNIT ; mm]

| IN EXCESS OF DIAMETER D: MORE THAN THE SIZE | LESS THAN DIAMETER | LENGTH L: LESS THAN 25 | BETWEEN 25 AND 63 | BETWEEN 63 AND 250 | BETWEEN 250 AND 630 | BETWEEN 630 AND 1000 | BETWEEN 1000 AND 4000 |
|---|---|---|---|---|---|---|---|
| 3 | 6 | 0.2 | 0.2 | – | – | – | – |
| 6 | 10 | 0.2 | 0.3 | 0.3 | – | – | – |
| 10 | 30 | 0.2 | 0.3 | 0.3 | 0.4 | 0.4 | – |
| 30 | 80 | 0.3 | 0.3 | 0.3 | 0.4 | 0.4 | 0.5 |
| 80 | 250 | 0.3 | 0.3 | 0.3 | 0.4 | 0.4 | 0.5 |
| 250 | 500 | 0.4 | 0.4 | 0.4 | 0.4 | 0.4 | 0.5 |
| 500 | – | – | 0.5 | 0.5 | 0.5 | 0.6 | 0.6 |

FIG. 122

FINISHING ALLOWANCE FILE
(INSIDE DIAMETER, FINISHING ALLOWANCE WHICH DOES NOT INCLUDE THERMAL REFINING ALLOWANCE, FINISHING ALLOWANCE PER DIAMETER, AND GRINDING)

[UNIT ; mm]

| IN EXCESS OF DIAMETER D: MORE THAN THE SIZE | LESS THAN DIAMETER | LENGTH L: LESS THAN 25 | BETWEEN 25 AND 63 | BETWEEN 63 AND 100 | BETWEEN 100 AND 250 | BETWEEN 250 AND 400 | BETWEEN 400 AND 1000 |
|---|---|---|---|---|---|---|---|
| 6 | 10 | 0.2 | 0.2 | 0.3 | — | — | — |
| 10 | 30 | 0.2 | 0.2 | 0.3 | 0.3 | — | — |
| 30 | 80 | 0.2 | 0.2 | 0.3 | 0.3 | — | — |
| 80 | 250 | 0.3 | 0.3 | 0.3 | 0.3 | 0.4 | — |
| 250 | 400 | 0.4 | 0.4 | 0.4 | 0.3 | 0.4 | 0.5 |
| 400 | — | — | 0.5 | 0.5 | 0.4 | 0.4 | 0.5 |
| | | | | | 0.5 | 0.5 | 0.5 |

FIG. 123

FINISHING ALLOWANCE FILE (MACHINING OF ROD MATERIAL)

[UNIT ; mm]

| IN EXCESS OF FINISHING DIAMETER: MORE THAN THE SIZE | LESS THAN FINISHING DIAMETER | END-FACE FINISHING ALLOWANCE (ON ONE SIDE), LENGTH SEGMENT: LESS THAN 250 | BETWEEN 250 AND 1000 | BETWEEN 1000 AND 2000 | OUTSIDE-DIAMETER FINISHING ALLOWANCE (DIAMETER), LENGTH SEGMENT: LESS THAN 63 | BETWEEN 63 AND 160 | BETWEEN 160 AND 400 | BETWEEN 400 AND 1000 | BETWEEN 1000 AND 2000 |
|---|---|---|---|---|---|---|---|---|---|
| — | 6 | 0.5 | — | — | 2 | 2.5 | — | — | — |
| 6 | 10 | 0.5 | — | — | 2 | 2.5 | — | — | — |
| 10 | 18 | 1 | — | — | 2 | 3 | 3 | — | — |
| 18 | 30 | 1 | 1.5 | — | 3 | 3 | 3 | 4 | — |
| 30 | 50 | 1 | 1.5 | — | 3 | 3 | 4 | 5 | 6 |
| 50 | 80 | 1.5 | 2 | 2 | 4 | 4 | 4 | 5 | 6 |
| 80 | 120 | 1.5 | 2 | 2 | 4 | 5 | 5 | 6 | 7 |
| 120 | 180 | 2 | 2 | 2 | 5 | 5 | 5 | 6 | 7 |
| 180 | 200 | 2 | 2.5 | 3 | 6 | 6 | 6 | 7 | 8 |

FIG. 124

HEAT TREATMENT

MATERIAL FILE

| (JIS CODE) | | TENSILE STRENGTH ($N/mm^2$) OR MORE | HARDNESS HB | SPECIFIC CUTTING RESISTANCE ($N/mm^2$) | . . . | . . . | . . . |
|---|---|---|---|---|---|---|---|
| | | | | | . . . . | . . . . | . . . . |
| S09CK | H | 390 | 121–179 | 980 | . . . | . . . | . . . |
| S10C | N | 310 | 109–156 | 780 | . . . | . . . | . . . |
| S45C | N | 570 | 167–227 | 1150 | . . . . | . . . . | . . . . |
| S45C | H | 690 | 201–269 | 1400 | . . . | . . . | . . . |
| SCM440 | H | 980 | 285–352 | 1960 | . . . | . . . | . . . |
| SCM445 | H | 1030 | 302–363 | 2060 | . . . | . . . | . . . |

FIG. 125

TRANSLATION FILE OF TOOL MATERIAL
(CEMENTED CARBIDE TOOL) 1/3

| ISO CODE | MANUFAC-TURER'S CODE | ISO CODE | MANUFAC-TURER'S CODE | ISO CODE | MANUFAC-TURER'S CODE | ISO CODE | MANUFAC-TURER'S CODE | ISO CODE | MANUFAC-TURER'S CODE |
|---|---|---|---|---|---|---|---|---|---|
| P 0 1 | STi10T | P 2 0 | UTi20T | P 3 0 | K21 | M 1 0 | V-88 | M 4 0 | K21 |
| | K165 | | ST15E | | K420 | | K4H | | S6 |
| | V-01 | | ST20E | | S4 | | SU41 | | G27 |
| P 0 5 | K7H | | SMA | | V-01 | | V-01 | | V-1N |
| | S1G | | K4H | | V-88 | | V-88 | K 0 1 | STi05T |
| | V-01 | | S1F | | VN-8 | | VN-8 | | H2 |
| P 1 0 | STi10T | | S2 | | V-99 | | VN-5 | | H1 |
| | ST10P | | V-01 | P 3 5 | K21 | M 2 0 | UTi20T | | K11 |
| | S1P | | V-90 | | K420 | | U2 | | V-01 |
| | S10T | | V-88 | | S4 | | H13A | K 0 5 | K11 |
| | K7H | | VN-8 | | V-88 | | K4H | | V-01 |
| | K45 | | VN-5 | | VN-8 | | K2884 | | V-91 |
| | S1G | | V-99 | | V-99 | | SU41 | | V-88 |
| | S1F | P 2 5 | K21 | | V-1N | | G27 | K 1 0 | HTi10 |
| | V-01 | | K2884 | P 4 0 | UTi20T | | V-01 | | H1 |
| | V-90 | | S2 | | ST40E | | V-88 | | H10E |
| | V-88 | | S4 | | S6 | | VN-8 | | G10E |
| | VN-8 | | V-01 | | R4 | | VN-5 | | H1P |
| | VN-5 | | V-90 | | K420 | M 3 0 | UTi20T | | H10 |
| P 1 5 | K45 | | V-88 | | K21 | | A30 | | HM |
| | S1G | | VN-8 | | S6 | | H10F | | K68 |
| | S1F | | VN-5 | | V-99 | | K420 | | H13 |
| | S2 | | V-99 | | V-1N | | K21 | | V-01 |
| | V-01 | P 3 0 | UTi20T | M 0 5 | K7H | | V-01 | | V-91 |
| | V-90 | | A30 | | V-01 | | V-88 | | V-88 |
| | V-88 | | A30N | M 1 0 | UTi20T | | VN-8 | | VN-8 |
| | VN-8 | | ST30E | | U10E | M 4 0 | UTi20T | | VN-2 |
| | VN-5 | | S30T | | K45 | | A40 | K 1 5 | K68 |
| | | | SMA | | SU41 | | R4 | | H13 |
| | | | SM30 | | V-01 | | K420 | | HX |

FIG. 126

TRANSLATION TABLE OF TOOL MATERIAL (HARD METAL TOOL) 2/3

| ISO CODE | MANUFACTURER'S CODE | ISO CODE | MANUFACTURER'S CODE | ISO CODE | MANUFACTURER'S CODE | ISO CODE | MANUFACTURER'S CODE | ISO CODE | MANUFACTURER'S CODE |
|---|---|---|---|---|---|---|---|---|---|
| K15 | V-01 | CP05 | VC-8 | CP15 | TP25 | CP25 | AC815 | CP35 | S60M |
| | V-91 | | VC-76 | | TP35 | | AC720 | | VC-56 |
| | V-88 | CP10 | UC6010 | | S10M | | GC425 | CP40 | KC850 |
| | VN-8 | | U610 | | VC-76 | | GCM | | TP35 |
| K20 | HTi20T | | AC05 | | VC-6 | | GC135 | | S25M |
| | UTi20T | | AC10 | | VC-125 | | GC1025 | | S60M |
| | G2 | | AC15 | CP20 | UP35N | | KC810 | | VC-56 |
| | H13A | | GC415 | | NX55 | | KC850 | CM05 | KC910 |
| | SMA | | GC015 | | NX355 | | KC910 | | TP15 |
| | K6 | | KC801 | | NX99 | | TP15 | | TX10 |
| | H13 | | KC850 | | NX530 | | TP25 | CM10 | KC810 |
| | HX | | KC910 | | T130Z | | TP35 | | KC850 |
| | V-01 | | TP15 | | CT525 | | S10M | | KC910 |
| | V-91 | | TP25 | | T130A | | S25M | | TP15 |
| | V-88 | | S10M | | K2884 | | VC-5 | | TP25 |
| | VN-8 | | VC-7 | | KC810 | | VC-55 | | TX10 |
| | VN-2 | | VC-76 | | KC850 | | VC-125 | | VC-23 |
| K30 | UTi20T | | GP20N | | KC910 | CP30 | KC810 | CM15 | KC810 |
| | G3 | | NX22 | | TP15 | | KC850 | | KC850 |
| | H20 | | NX320 | | TP25 | | TP15 | | KC910 |
| | H10F | | T05A | | TP35 | | TP25 | | TP15 |
| | K1 | | T110Z | | S10M | | TP35 | | TP25 |
| | HX | | T110A | | S25M | | S25M | | TP35 |
| | VN-8 | | T12Z | | VC-6 | | VC-5 | | TX10 |
| | V-1N | | T12A | | VC-55 | | VC-55 | | S10M |
| CP01 | KC910 | | CT515 | | VC-125 | CP35 | KC810 | | VC-27 |
| | VC-83 | CP15 | KC810 | CP25 | UE6000 | | KC850 | | VC-23 |
| | VC-8 | | KC850 | | UE6025 | | TP25 | CM20 | KC810 |
| CP05 | KC910 | | KC910 | | U625 | | TP35 | | KC850 |
| | TP15 | | TP15 | | AC25 | | S25M | | KC910 |

FIG. 127

TRANSLATION TABLE OF TOOL MATERIAL
(HARD METAL TOOL, ETC.) 3/3

| ISO CODE | MANUFAC-TURER'S CODE | ISO CODE | MANUFAC-TURER'S CODE | ISO CODE | MANUFAC-TURER'S CODE | ISO CODE | MANUFAC-TURER'S CODE | ISO CODE | MANUFAC-TURER'S CODE |
|---|---|---|---|---|---|---|---|---|---|
| CM20 | TP15 | CK05 | KC210 | CK15 | VC-2 | | | | |
| | TP25 | | KC910 | | VC-24 | | | | |
| | TP35 | | TP15 | | VC-29 | | | | |
| | S10M | | TX10 | CK20 | KC210 | | | | |
| | S25M | | T15M | | KC250 | | | | |
| | S60M | | VC-3 | | KC910 | | | | |
| | VC-28 | CK10 | U410 | | TP15 | | | | |
| | VC-27 | | AC105 | | TP25 | | | | |
| | VC-24 | | U510 | | VC-2 | | | | |
| | VC-23 | | AC10G | | VC-29 | | | | |
| CM30 | KC850 | | GC315 | | VC-28 | | | | |
| | TP15 | | KC210 | | VC-24 | | | | |
| | TP25 | | KC910 | CK30 | KC250 | | | | |
| | TP35 | | TP15 | | VC-2 | | | | |
| | S10M | | TP25 | | VC-28 | | | | |
| | S25M | | TX10 | | VC-24 | | | | |
| | S60M | | T15M | | VC-1 | | | | |
| | VC-5 | CK15 | UP20M | | VC-111 | | | | |
| | VC-28 | | AC325 | | VC-101 | | | | |
| | VC-24 | | GC120 | S 1 | SKH2 | | | | |
| CM40 | TP35 | | F515 | S 2 | SKH58 | | | | |
| | S25M | | AC211 | S 3 | SKH58 | | | | |
| | VC-111 | | GC3015 | S 4 | SKH51 | | | | |
| | VC-101 | | GC320 | | SKH52 | | | | |
| CK01 | U505 | | KC210 | S 5 | SKH53 | | | | |
| | AC105 | | KC910 | S 6 | SKH4 | | | | |
| | UP10H | | TP15 | S 8 | SKH55 | | | | |
| | AC305 | | TP25 | | | | | | |
| | KC910 | | TX10 | | | | | | |
| | VC-3 | | T15M | | | | | | |

FIG. 128

CUTTING CONDITION FILE (TURNING)

| MATERIAL TO BE TURNED | TOOL MATE-RIAL | CUTTING RATE OF THE TOOL LIFE; 60 MIN. (m/min) | DEPTH OF CUT OF THE TOOL LIFE; 60 MIN. (mm) | FEED RATE OF THE TOOL LIFE; 60 MIN. (mm/rev) | .... | .... | .... |
|---|---|---|---|---|---|---|---|
| S09CKH | P10 | 195 | 1 | 0. 18 | .... | .... | .... |
| | CP10 | 290 | 1 | 0. 18 | .... | .... | .... |
| | CP20 | 190 | 4 | 0. 4 | .... | .... | .... |
| | CP30 | 150 | 8 | 0. 5 | .... | .... | .... |
| S10CN | P10 | 195 | 1 | 0. 18 | .... | .... | .... |
| S45CK | CP20 | 160 | 4 | 0. 4 | .... | .... | .... |
| | CP30 | 125 | 8 | 0. 5 | .... | .... | .... |
| S45CH | P10 | 150 | 1 | 0. 18 | .... | .... | .... |
| | P20 | 115 | 4 | 0. 5 | .... | .... | .... |
| | P30 | 90 | 8 | 0. 75 | .... | .... | .... |
| SCM440H | P10 | 135 | 1 | 0. 18 | .... | .... | .... |
| | P20 | 102 | 4 | 0. 4 | .... | .... | .... |
| | P30 | 82 | 8 | 0. 5 | .... | .... | .... |
| | P40 | — | — | — | .... | .... | .... |
| | CP10 | 175 | 1 | 0. 18 | .... | .... | .... |
| | CP20 | 135 | 4 | 0. 4 | .... | .... | .... |
| | CP30 | 105 | 8 | 0. 5 | .... | .... | .... |
| SCM445H | P10 | 115 | 1 | 0. 18 | .... | .... | .... |
| | P20 | 90 | 4 | 0. 4 | .... | .... | .... |

FIG. 129

CUTTING CONDITION FILE
(MACHINING USING A SIDE CUTTER)

| MATERIAL TO BE MACHINED | TOOL MATE-RIAL | DEPTH OF CUT mm | CUTTING CONDITIONS | |
|---|---|---|---|---|
| | | | CUTTING RATE m/min | FEED PER ONE BLADE mm/rev |
| S09CKH | S2 | 1 | 49 | 0.13 |
| | | 4 | 37 | 0.18 |
| | | 8 | 29 | 0.23 |
| | | | | |
| | | | | |
| | P20 | 1 | 150 | 0.13 |
| | P30 | 4 | 115 | 0.18 |
| | P40 | 8 | 81 | 0.23 |
| | | | | |
| | | | | |
| S10CN | S2 | 1 | 49 | 0.13 |
| | | | | |
| | | | | |
| S45CN | P20 | 1 | 120 | 0.13 |
| | | | | |
| | | | | |
| S45CH | S2 | 1 | 29 | 0.1 |
| | | 4 | 23 | 0.15 |
| | | 8 | 18 | 0.2 |
| | | | | |
| | | | | |
| SCM440H | S2 | 1 | 24 | 0.1 |
| | | 4 | 20 | 0.15 |
| | | 8 | 15 | 0.2 |
| | S3 | 1 | 24 | 0.1 |
| | | 4 | 20 | 0.15 |
| | | 8 | 15 | 0.2 |
| | | | | |
| | | | | |
| | P40 | 8 | 47 | 0.18 |
| SCM445H | S2 | 1 | 24 | 0.1 |
| | | 4 | 20 | 0.15 |
| | | 8 | 15 | 0.2 |
| | | | | |

FIG. 130

CUTTING CONDITION FILE (END MILLING)

| MATERIAL TO BE MILLED | TOOL MATE-RIAL | DEPTH OF RADIAL CUT mm | MILLING RATE m/min | FEED RATE (mm/BLADE) TOOL DIAME-TER;D 10 | 12 | 18 |
|---|---|---|---|---|---|---|
| S09CKH | S2 | 0.5 | 64 | 0.025 | 0.05 | 0.10 |
| | | 1.5 | 49 | 0.05 | 0.075 | 0.13 |
| | | D/4 | 43 | 0.025 | 0.05 | 0.10 |
| | | D/2 | 37 | 0.018 | 0.025 | 0.075 |
| | M20 | 0.5 | 160 | 0.038 | 0.089 | 0.15 |
| | | D/2 | 100 | 0.038 | 0.05 | 0.10 |
| S10CN | S2 | 0.5 | 64 | 0.025 | 0.05 | 0.10 |
| S45CN | M20 | D/2 | 90 | 0.038 | 0.05 | 0.10 |
| S45CH | S2 | 0.5 | 130 | 0.025 | 0.05 | 0.10 |
| | | 1.5 | 100 | 0.05 | 0.075 | 0.13 |
| SCM440H | S4 | 0.5 | 26 | 0.018 | 0.038 | 0.075 |
| | | 1.0 | 20 | 0.025 | 0.05 | 0.10 |
| | | D/4 | 17 | 0.018 | 0.038 | 0.075 |
| | | D/2 | 15 | 0.013 | 0.025 | 0.05 |
| | M20 | D/2 | 58 | 0.025 | 0.038 | 0.075 |
| SCM445H | S2 | 0.5 | 26 | 0.018 | 0.038 | 0.075 |

FIG. 131

CUTTING CONDITION FILE (DRILLING)

| MATERIAL TO BE DRILLED | TOOL MATE-RIAL | DRILLING RATE m/min | FEED RATE mm/rev DRILLING DIAMETER 1.5 | 3 | 6 | 12 | 18 |
|---|---|---|---|---|---|---|---|
| S09CKH | S2 | 23 | 0.025 | — | — | — | — |
| | | 26 | — | 0.075 | 0.13 | 0.23 | 0.3 |
| | S3 | 23 | 0.025 | — | — | — | — |
| | | 26 | — | 0.075 | 0.13 | 0.23 | 0.3 |
| S10CN | S2 | 23 | 0.025 | | | | |
| S45CN | S3 | 23 | — | 0.075 | 0.13 | 0.23 | 0.45 |
| S45CH | S2 | 18 | 0.025 | 0.05 | 0.10 | 0.18 | 0.25 |
| | S3 | 18 | 0.025 | 0.05 | 0.10 | 0.18 | 0.25 |
| SCM440H | S3 | 14 | — | 0.05 | 0.10 | 0.15 | 0.2 |
| | S4 | 14 | — | 0.05 | 0.10 | 0.15 | 0.2 |
| SCM445H | S2 | 14 | — | 0.05 | 0.10 | 0.15 | 0.2 |

FIG. 132

CUTTING CONDITION FILE (TAPPING)

| MATERIAL TO BE TAPPED | TOOL MATE-RIAL | TAPPING RATE m/min | | | |
|---|---|---|---|---|---|
| | | TAPPING PITCH, LESS THAN 1 mm | TAPPING PITCH, LESS THAN 1~1.5mm | TAPPING PITCH, LESS THAN 1.5~3mm | |
| S09CKH | S2 | 21 | 20 | 15 | |
| | S3 | 21 | 20 | 15 | |
| S10CN | S2 | 21 | 20 | 15 | |
| | | | | | |
| | | | | | |
| S45CN | S3 | 18 | 17 | 12 | |
| S45CH | S2 | 15 | 14 | 9 | |
| | S3 | 12 | 11 | 8 | |
| | | | | | |
| | | | | | |
| SCM440H | S3 | 8 | 6 | 5 | |
| | S4 | 8 | 6 | 5 | |
| SCM445H | S2 | 8 | 6 | 5 | |
| | | | | | |

FIG. 133

CUTTING CONDITION FILE (REAMING)

| MATERIAL TO BE REAMED | TOOL MATE-RIAL | REAMING RATE m/min | FEED RATE (mm/rev) | | | |
|---|---|---|---|---|---|---|
| | | | REAMER DIAMETER 3 | 6 | 12 | 25 |
| S09CKH | S2 | 12 | 0.15 | 0.25 | 0.4 | 0.6 |
| | S3 | 12 | 0.15 | 0.25 | 0.4 | 0.6 |
| | S4 | 12 | 0.15 | 0.25 | 0.4 | 0.6 |
| | K20 | 15 | 0.15 | 0.25 | 0.4 | 0.6 |
| S10CN | S2 | 12 | 0.15 | 0.25 | 0.4 | 0.6 |
| S45CN | K20 | 14 | 0.13 | 0.2 | 0.3 | 0.5 |
| S45CH | S2 | 9 | 0.10 | 0.18 | 0.25 | 0.4 |
| | S3 | 9 | 0.10 | 0.18 | 0.25 | 0.4 |
| SCM440H | S2 | 8 | 0.075 | 0.15 | 0.2 | 0.3 |
| | S3 | 8 | 0.075 | 0.15 | 0.2 | 0.3 |
| | S4 | 8 | 0.075 | 0.15 | 0.2 | 0.3 |
| | K20 | 11 | 0.10 | 0.15 | 0.2 | 0.3 |
| SCM445H | S2 | 8 | 0.075 | 0.15 | 0.2 | 0.3 |

FIG. 134

CUTTING CONDITION FILE (HOBBING)

| MATERIAL TO BE HOBBED | TOOL MATE-RIAL | HOBBING CONDITION ITEMS | MODULE SIZE | | | |
|---|---|---|---|---|---|---|
| | | | LESS THAN 0.5 | 0.5~1 | 1.5~2 | 2.5~12 |
| S09CKH | S2 | NUMBER OF HOBBING OPERATIONS | 2 | 1 | 1 | 1 |
| | | HOBBING RATE (m/min) | 67 | 64 | 60 | 58 |
| | | FEED PER ONE ROTATION OF WORKPIECE (mm/rev) | 0.75 | 1.25 | 1.5 | 1.8 |
| | S4 | FEED PER ONE ROTATION OF WORKPIECE (mm/rev) | 0.75 | 1.25 | 1.5 | 1.8 |
| S10CN | S2 | NUMBER OF HOBBING OPERATIONS | 2 | 1 | 1 | 1 |
| S45CN | S4 | FEED PER ONE ROTATION OF WORKPIECE (mm/rev) | 0.75 | 1.25 | 1.5 | 1.8 |
| S45CH | S2 | NO. OF HOBBING OPERATIONS | 2 | 1 | 1 | 1 |
| | | HOBBING RATE (m/min) | 53 | 50 | 46 | 38 |
| | | FEED PER ONE ROTATION OF WORKPIECE (mm/rev) | 0.75 | 1.25 | 1.25 | 1.25 |
| SCM440H | S2 | NO. OF HOBBING OPERATIONS | 2 | 1 | 1 | 1 |
| | | HOBBING RATE (m/min) | 37 | 34 | 32 | 29 |
| | | FEED PER ONE ROTATION OF WORKPIECE (mm/rev) | 0.75 | 1.15 | 1.15 | 1.15 |
| | S4 | FEED PER ONE ROTATION OF WORKPIECE (mm/rev) | 0.75 | 1.15 | 1.15 | 1.15 |
| SCM445H | S2 | NO. OF HOBBING OPERATIONS | 2 | 1 | 1 | 1 |

FIG. 135

CUTTING CONDITION FILE (OUTSIDE DIAMETER GRINDING)

| MATERIAL TO BE GROUND | GRIND-STONE MATERIAL | MATERIAL HARDNESS | PERIPHERAL VELOCITY OF GRINDSTONE m/sec | PERIPHERAL VELOCITY OF WORKPIECE m/min | RADIAL FEED mm/pass, dia | GRINDSTONE WIDTH IN ITS TRAVERSE DIRECTION rev·WORK | PLUNGING RATE mm/rev, dia | . . . |
|---|---|---|---|---|---|---|---|---|
| S09CKH S10CN . . . S45CN S45CH . . . | A60LV WA60LV | HRC MAX 50 | 30 (28～33) | 25 (21～30) | (ROUGH) 0.050 | 1/2 | 0.015 | . . . |
| | | | | | (FINISH) MAX 0.013 | 1/6 | 0.005 | . . . |
| | A60KV WA60KV | HRC MORE THAN 50 | 30 (28～33) | 25 (21～30) | (ROUGH) 0.050 | 1/4 | 0.010 | . . . |
| | | | | | (FINISH) MAX 0.013 | 1/8 | 0.004 | . . . |
| . . . SCM440H SCM445H . . . | A60LV WA60LV | HRC MAX 50 | 30 (28～33) | 25 (21～30) | (ROUGH) 0.050 | 1/2 | 0.015 | . . . |
| | | | | | (FINISH) MAX 0.013 | 1/6 | 0.005 | . . . |
| | A60KV WA60KV | HRC MORE THAN 50 | 25 (20～30) | 25 (21～30) | (ROUGH) 0.050 | 1/4 | 0.010 | . . . |
| | | | | | (FINISH) MAX 0.010 | 1/8 | 0.004 | . . . |

FIG. 136

CUTTING CONDITION FILE (INSIDE DIAMETER GRINDING)

| MATERIAL TO BE GROUND | GRIND-STONE MATERIAL | MATERIAL HARDNESS | PERIPHERAL VELOCITY OF GRINDSTONE m/sec | PERIPHERAL VELOCITY OF WORKPIECE m/min | RADIAL FEED mm/pass, dia | GRINDSTONE WIDTH IN ITS TRAVERSE DIRECTION rev·WORK | . . . |
|---|---|---|---|---|---|---|---|
| S09CKH<br>S10C<br>⋮ | A60MV<br>WA60MV | HRC<br>MAX 50 | 30<br>(25～33) | 40<br>(23～60) | (ROUGH)<br>0.013 | 1/3 | . . . |
| | | | | | (FINISH)<br>MAX 0.005 | 1/6 | . . . |
| S45CN<br>S45CH<br>⋮ | A60KV<br>WA60KV | HRC<br>MORE THAN 50 | 30<br>(25～33) | 40<br>(23～60) | (ROUGH)<br>0.013 | 1/3 | . . . |
| | | | | | (FINISH)<br>MAX 0.005 | 1/6 | . . . |
| ⋮<br>SCM440H<br>SCM445H | A60MV<br>WA60MV | HRC<br>MAX 50 | 30<br>(25～33) | 40<br>(23～60) | (ROUGH)<br>0.013 | 1/3 | . . . |
| | | | | | (FINISH)<br>MAX 0.005 | 1/6 | . . . |
| ⋮ | A60KV<br>WA60KV | HRC<br>MORE THAN 50 | 25<br>(20～30) | 40<br>(23～60) | (ROUGH)<br>0.013 | 1/3 | . . . |
| | | | | | (FINISH)<br>MAX 0.005 | 1/6 | . . . |

FIG. 137

SURFACE TREATMENT FILE

| SURFACE TREATMENT SYMBOL | JIS CODE | INCREMENTED DIMENSION (IN RADIAL DIRECTION) (μm) |
|---|---|---|
| 21AA010 | Ep−Fe/Cu10b/AT:D | 10 |
| 21AA020 | Ep−Fe/Cu20b/AT:D | 20 |
| 22AA002 | Ep−Fe/Ni2b/HB:C | 2 |
| 22AA005 | Ep−Fe/Ni5b/HB:C | 5 |
| | | |
| 46LA005 | Ep−Fe/Zn5Cr/HB:C | 5 |
| 46LA010 | Ep−Fe/Zn10Cr/HB:C | 10 |
| 46LA015 | Ep−Fe/Zn15Cr/HB:C | 15 |
| 46LA020 | Ep−Fe/Zn20Cr/HB:C | 20 |

FIG. 138

HEAT TREATMENT FILE

| HEAT TREATMENT SYMBOL | DETAILS OF HEAT TREATMENT | DESIGNATION OF HARDNESS | MATERIAL TO WHICH HEAT TRAETMENT IS APPLICABLE |
|---|---|---|---|
| AHT | ANNEALING | HARDNESS MAY BE DESIGNATED | S |
| AHT-L | STRESS RELIEVING | DITTO | S |
| LHT | STRESS RELIEVING ANNEALING AT LOW HUMIDITY | DITTO | S |
| NHT | NORMALIZING | DITTO | S |
| QHT | QUENCHING, TEMPERING | NECESSARY | S |
| SHT | SUBZERO TREATMENT | UNNECESSARY | S |
| KHT | SOLUTION TREATMENT | NECESSARY | S |
| MHT-T | TUFFTRIDE TREATMENT | NECESSARY | S |
| YHT-42 | SOLUTION HEAT TREATMENT | NECESSARY | A |
| YHT-62 | TEMPERING | NECESSARY | A |

FIG. 139

SHAPE AND POSITIONAL ACCURACY FILE

| | SYMBOL | NECESSITY OR UNNECESSITY OF REFERENCE PLANE | ACCURACY |
|---|---|---|---|
| (a) | — | LACK OF NECESSITY | STRAIGHTNESS |
| (b) | ▱ | LACK OF NECESSITY | FLATNESS |
| (c) | ○ | LACK OF NECESSITY | CIRCULARITY |
| (d) | /○/ | LACK OF NECESSITY | CYLINDRICALITY |
| (e) | // | NECESSITY | PARALLELISM |
| (f) | ⊥ | NECESSITY | PERPENDICULARITY |
| (g) | ◎ | NECESSITY | CONCENTRICITY |
| (h) | ↗ | NECESSITY | RUNOUT |

FIG. 140

COST FILE

| EXPENDITURE ITEMS | SYMBOL | HOURLY EXPENSES (YEN) | | | | |
|---|---|---|---|---|---|---|
| MACHINE ID NO. | | XLD001 | XHB001 | XGE001 | XGI001 | |
| WEDGE | Wo | 3, 285 | 3, 285 | 3, 285 | 3, 285 | |
| MACHINE CHARGE | Cm | 3, 126 | 2, 099 | 2, 623 | 1, 889 | |
| RUNNING CHARGE | Cr | 588 | 426 | 581 | 261 | |
| TOOL CHARGE | Ct | | 2, 875 | 2, 400 | 1, 200 | |
| (THROW-AWAY CHIP) | Cts | 1, 000 | | | | |
| (END MILL) | Cte | 900 | | | | |
| (DRILL) | Ctd | 460 | | | | |
| (TAP) | Ctt | 610 | | | | |
| (SIDE CUTTER) | Ctc | 3, 750 | | | | |
| (HOB) | Cth | | | | | |
| (REAMER) | Ctr | | | | | |
| (GRINDSTONE FOR GRINDING OUTSIDE DIAMETER) | Ctg | | | | | |
| (GRINDSTONE FOR GRINDING INSIDE DIAMETER) | Cti | | | | | |
| | | | | | | |
| | | | | | | |
| | | | | | | |
| OTHER EXPENDITURES | Co | | | | | |

FIG. 141

TABLE OF CONSTANTS USED IN TOOL LIFE EXPRESSION

| MATERIAL TO BE MACHINED \ TOOL MATERIAL | P10 | | P20 | | P30 | | P40 | | CP10 | | CP20 | | CP30 | | .... | |
|---|---|---|---|---|---|---|---|---|---|---|---|---|---|---|---|---|
| | S | n | S | n | S | n | S | n | S | n | S | n | S | n | .. | .. |
| S09CK | .. | .. | .. | .. | .. | .. | .. | .. | .. | .. | .. | .. | .. | .. | .. | .. |
| ...... | .. | .. | .. | .. | .. | .. | ... | .. | .. | .. | .. | .. | .. | .. | .. | .. |
| ...... | .. | .. | .. | ... | .. | .. | ... | .. | .. | .. | .. | .. | .. | | | |
| ...... | .. | .. | ... | ... | ... | ... | ... | | | | | | | | | |
| SCM440H | ... | ... | 284 | 0.25 | ... | ... | ... | ... | | | | | | | | |
| ........ | ... | ... | ... | ... | ... | ... | ... | ... | ... | | | | | | | |
| ........ | | | | | | | | | | | | | | | | |
| ........ | | | | | | | | | | | | | | | | |
| ...... . | | | | | | | | | | | | | | | | |

FIG. 144

CONTINUED FROM THE PREVIOUS PAGE

TO THE NEXT PAGE

| SPECIFICATIONS FOR COORDINATES OF END POINT | | | | SPECIFICATIONS FOR RADIUS OF CIRCULAR ARC | | | | CHAMFERING OF SUBSEQUENT CORNER | | | | CONFIGURATIONAL AND POSITIONAL ACCURACY | | SPECIFICATIONS FOR TAPER/ ANGLE/SLOPE | |
|---|---|---|---|---|---|---|---|---|---|---|---|---|---|---|---|
| ± LENGTH | TOLER-ANCE SYMBOL | ± UPPER DIMENSIONAL DIFFERENCE | ± LOWER DIMENSIONAL DIFFERENCE | ± SIZE | TOLER-ANCE SYMBOL | ± UPPER DIMENSIONAL DIFFERENCE | ± LOWER DIMENSIONAL DIFFERENCE | C/R | SIZE | FINISHING SYMBOL | ROUGHNESS OF FINISHED SURFACE (μm) | ALLOW-ABLE VALUE | REFERENCE STEP | TYPE | SIZE |
| 160 | | | | | | | | R | 04 | 2L | | | | | |
| 175 | | | | | | | | C | 1 | 3G | | | | | |
| ~~175~~ | | | | | | | | | | 2L | | | | | |
| 190 | | | | | | | | | | 2L | | | | | |
| ~~190~~ | | | | | | | | | | 2L | | | | | |
| 205 | | | | | | | | C | 1 | 2L | | | | | |
| ~~205~~ | | | | | | | | R | 04 | 2L | | | | | |
| 210 | | | | | | | | C | 05 | 2L | | | | | |
| ~~210~~ | | | | | | | | ~~C~~ | ~~05~~ | 2L | | | | | |
| 205 | | | | | | | | | | 2L | | | | | |
| ~~205~~ | | | | | | | | | | 2L | | | | | |
| 195 | | | | | | | | | | 2L | | | | | |
| ~~195~~ | | | | | | | | | | 2L | | | | | |
| 185 | | | | | | | | | | 2L | | | | | |
| ~~185~~ | | | | | | | | C | 05 | 2L | | | | | |
| 180 | | | | | | | | | | 2L | | | | | |
| ~~180~~ | | | | | | | | | | 2L | | | | | |
| 165 | | | | | | | | | | 2L | | | | | |
| ~~165~~ | | | | | | | | | | 2L | | | | | |
| 135 | | | | | | | | | | 3G | | ◎0003 | | | |
| 115 | | - | | 30 | | 0 | -0030 | | | 3L | 63S | | | | |

CONTINUED FROM THE PREVIOUS PAGE

FIG. 145

| SPECIFICATIONS FOR SCREW THREAD | | | | | | SPECIFICATIONS FOR THERMAL REFINING | | | SPECIFICATIONS FOR SURFACE TREATMENT | |
|---|---|---|---|---|---|---|---|---|---|---|
| SEGMENT | PITCH | R/L | ACCURACY | FINISHING SYMBOL | ROUGHNESS OF FINISHED SURFACE (μm) | THERMAL REFINING SYMBOL | HARDNESS RESULTING FROM THERMAL RIFINING | DEPTH | SURFACE TREATMENT SYMBOL | THICK-NESS (μm) |
| M | 15 | R | JIS6g | | | | | | | |

FIG. 146

TO THE NEXT PAGE

| SEQUENCE NO. | STEP NO. | C/R (CHAMFERING OF PREVIOUS CORNER) SIZE | SPECIFICATIONS FOR COORDINATES OF STARTING POINT DIAMETER | TOLER-ANCE SYMBOL | UPPER DIMENSIONAL DIFFERENCE ± | LOWER DIMENSIONAL DIFFERENCE ± | LENGTH ± | TOLER-ANCE SYMBOL | UPPER DIMENSIONAL DIFFERENCE ± | LOWER DIMENSIONAL DIFFERENCE ± | SPECIFICATIONS FOR COORDINATES OF END POINT DIAMETER | TOLER-ANCE SYMBOL | UPPER DIMENSIONAL DIFFERENCE ± | LOWER DIMENSIONAL DIFFERENCE ± |
|---|---|---|---|---|---|---|---|---|---|---|---|---|---|---|
| 37 | 22 | | 80 | h6 | 00 | - 0019 | 115 | | | | 84 | h6 | 00 | - 0022 |
| 38 | 23 | | 84 | h6 | 00 | - 0022 | 95 | | | | 84 | h6 | 00 | 0022 |
| 39 | 24 | | 84 | h6 | 00 | - 0022 | 75 | | | | 90 | | | |
| 40 | 25 | | 90 | | | | 75 | | | | 90 | | | |
| 41 | 26 | | 90 | | | | 70 | | | | 110 | | | |
| 42 | 27 | | 110 | | | | 70 | | | | 110 | | | |
| 43 | 28 | | 110 | | | | 60 | | | | 40 | | | |
| 44 | 29 | | 40 | | | | 60 | | | | 40 | | | |
| 45 | 30 | | 40 | | | | 50 | | | | 525 | | 00 | - 005 |
| 46 | 31 | | 525 | | 00 | - 005 | 50 | | | | 525 | | 00 | 005 |
| 47 | 32 | | 525 | | 00 | - 005 | 40 | | | | 40 | | | |
| 48 | 33 | | 40 | | | | 40 | | | | 40 | | | |
| 49 | 34 | | 40 | | | | 35 | | | | 30 | m5 | + 0017 | + 0008 |
| 50 | 35 | | 30 | m5 | + 0017 | + 0008 | 35 | | | | 30 | m5 | + 0017 | + 0008 |
| 51 | 36 | | 30 | m5 | + 0017 | + 0008 | 15 | | | | 25 | | | |
| 52 | 37 | | 25 | | | | 15 | | | | 25 | | | |
| 53 | 38 | | 25 | | | | 0 | | | | 0 | | | |

FIG. 147

CONTINUED FROM THE PREVIOUS PAGE

| SPECIFICATIONS FOR COORDINATES OF END POINT | | | | | SPECIFICATIONS FOR RADIUS OF CIRCULAR ARC | | | | CHAMFERING OF SUBSEQUENT CORNER | | | | CONFIGURATIONAL AND POSITIONAL ACCURACY | | SPECIFICATIONS FOR TAPER/ANGLE/SLOPE | |
|---|---|---|---|---|---|---|---|---|---|---|---|---|---|---|---|---|
| ± | LENGTH | TOLERANCE SYMBOL | ± UPPER DIMENSIONAL DIFFERENCE | ± LOWER DIMENSIONAL DIFFERENCE | ± SIZE | TOLERANCE SYMBOL | ± UPPER DIMENSIONAL DIFFERENCE | ± LOWER DIMENSIONAL DIFFERENCE | C/R | SIZE | FINISHING SYMBOL | ROUGHNESS OF FINISHED SURFACE (μm) | ALLOWABLE VALUE | REFERENCE STEP | TYPE | SIZE |
| | 95 | | | | | | | | | | 3L | 63S | | | | |
| | 75 | | | | | | | | | | 3G | 63S | ◎ 0005 | 2 | | |
| | 75 | | | | | | | | C | 05 | 2L | | | | | |
| | 70 | | | | | | | | R | 04 | 2L | | | | | |
| | 70 | | | | | | | | C | 05 | 3L | 63S | ∕ 0005 | 28 | | |
| - | 10 | | 0 | - 005 | | | | | C | 05 | 3G | | | | | |
| | 60 | | | | | | | | R | 1 | 3L | | | | | |
| | 50 | | | | | | | | R | 1 | 2L | | | | | |
| | 50 | | | | | | | | C | 1 | 2L | | | | | |
| | 40 | | | | | | | | C | 1 | 2L | | | | | |
| | 40 | | | | | | | | R | 1 | 2L | | | | | |
| | 35 | | | | | | | | C | 1 | 2L | | | | | |
| | 35 | | | | | | | | R | 1 | 3L | | | | | |
| | 15 | | | | | | | | | | 3G | | | | | |
| | 15 | | | | | | | | | | 2L | | | | | |
| | 0 | | | | | | | | | | 2L | | | | | |
| | 0 | | | | | | | | | | 2L | | | | | |

TO THE NEXT PAGE

FIG. 161

FINALLY FINISHED SHAPE

TO THE FOLLOWING PAGE

| SEQUENCE | STAGE NO. | CHAMFERING OF PREVIOUS CORNER C/R | CHAMFERING OF PREVIOUS CORNER SIZE | SPECIFICATIONS FOR COORDINATES OF STARTING POINT DIAMETER | SPECIFICATIONS FOR COORDINATES OF STARTING POINT LENGTH ± | SPECIFICATIONS FOR COORDINATES OF END POINT DIAMETER | SPECIFICATIONS FOR COORDINATES OF END POINT LENGTH ± | RADIUS OF CIRCULAR ARC SIZE ± | CHAMFERING SUBSEQUENT CORNER C/R | CHAMFERING SUBSEQUENT CORNER SIZE | FINISHING SYMBOL | ROUGHNESS OF FINISHED SURFACE (μm) |
|---|---|---|---|---|---|---|---|---|---|---|---|---|
| 16 | 1 | | | 0 | 159975 | 20011 | 159975 | | R | 04 | 2L | |
| 17 | 2 | | | 20011 | 159975 | 20011 | 175 | | C | 1 | 3G | |
| 18 | 3 | | | 20011 | 175 | 22 | 175 | | | | 2L | |
| 19 | 4 | | | 22 | 175 | 22 | 190 | | | | 2L | |
| 20 | 5 | | | 22 | 190 | 24125 | 190 | | | | 2L | |
| 21 | 6 | | | 24125 | 190 | 24125 | 205 | | C | 1 | 2L | |
| 22 | 7 | | | 24125 | 205 | 31013 | 205 | | R | 04 | 2L | |
| 23 | 8 | | | 31013 | 205 | 31013 | 210 | | C | 05 | 2L | |
| 24 | 9 | | | 31013 | 210 | 48875 | 210 | | C | 05 | 2L | |
| 25 | 10 | | | 48875 | 210 | 48875 | 205 | | | | 2L | |
| 26 | 11 | | | 48875 | 205 | 5257 | 205 | | | | 2L | |
| 27 | 12 | | | 5257 | 205 | 5257 | 195 | | | | 2L | |
| 28 | 13 | | | 5257 | 195 | 53 | 195 | | | | 2L | |
| 29 | 14 | | | 53 | 195 | 53 | 185 | | | | 2L | |
| 30 | 15 | | | 53 | 185 | 69 | 185 | | C | 05 | 2L | |
| 31 | 16 | | | 69 | 185 | 69 | 180 | | | | 2L | |
| 32 | 17 | | | 69 | 180 | 7185 | 180 | | | | 2L | |
| 33 | 18 | | | 7185 | 180 | 7185 | 165 | | | | 2L | |
| 34 | 19 | | | 7185 | 165 | 72985 | 165 | | | | 2L | |
| 35 | 20 | | | 72985 | 165 | 72985 | 135 | | | | 3G | |
| 36 | 21 | | | 72985 | 135 | 79989 | 115 | 29985 | | | 3L | 63S |
| 37 | 22 | | | 79990 | 115 | 83989 | 95 | | | | 3L | 63S |
| 38 | 23 | | | 83989 | 95 | 83989 | 75 | | | | 3G | 63S |
| 39 | 24 | | | 83989 | 75 | 90 | 75 | | C | 05 | 2L | |
| 40 | 25 | | | 90 | 75 | 90 | 7004 | | R | 04 | 2L | |
| 41 | 26 | | | 90 | 7004 | 110 | | | | | | |

FIG. 162

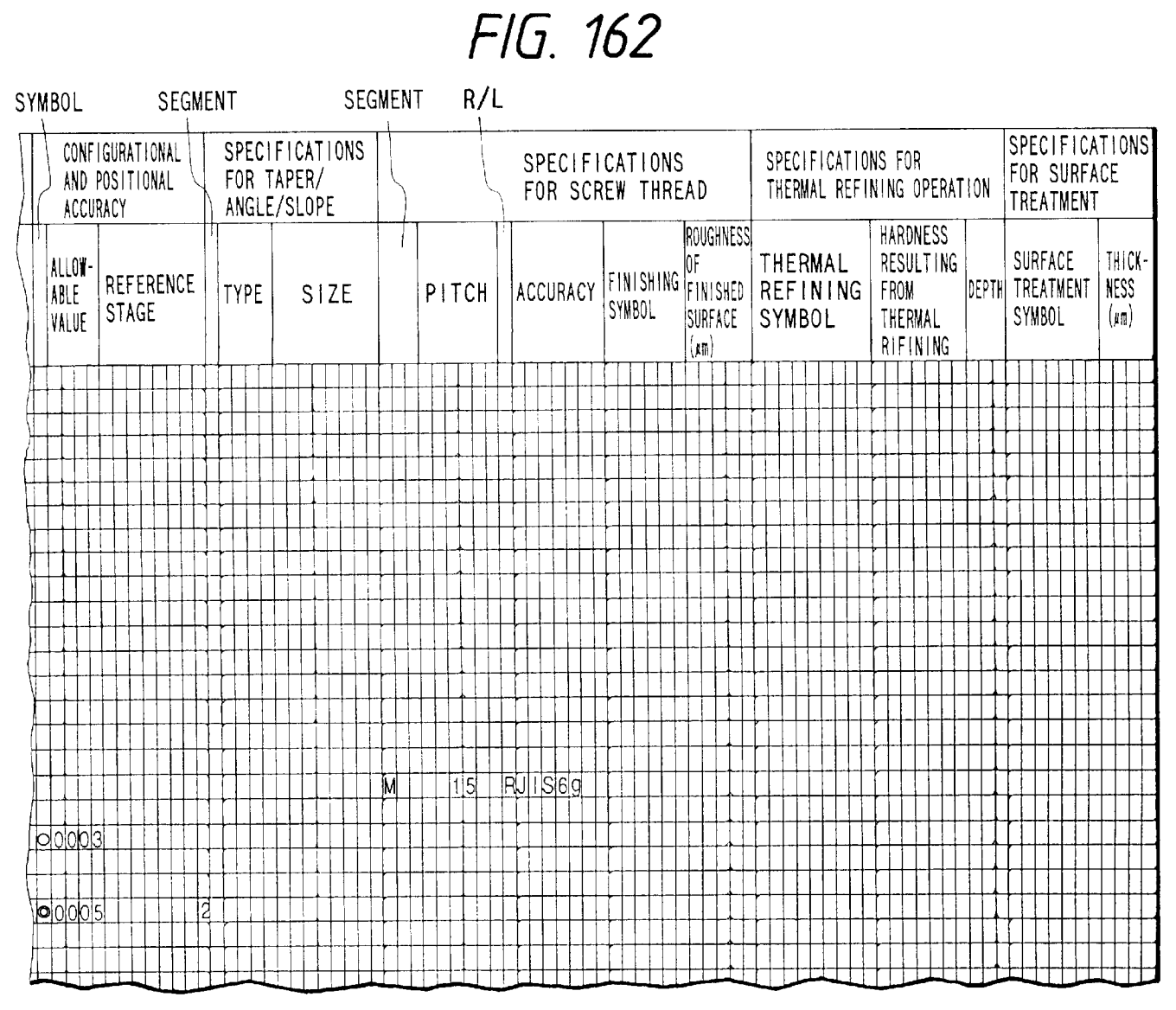

| SYMBOL | CONFIGURATIONAL AND POSITIONAL ACCURACY | | SEGMENT | SPECIFICATIONS FOR TAPER/ANGLE/SLOPE | | SEGMENT | SPECIFICATIONS FOR SCREW THREAD | R/L | | | | SPECIFICATIONS FOR THERMAL REFINING OPERATION | | | SPECIFICATIONS FOR SURFACE TREATMENT | |
|---|---|---|---|---|---|---|---|---|---|---|---|---|---|---|---|---|
| | ALLOW-ABLE VALUE | REFERENCE STAGE | | TYPE | SIZE | | PITCH | | ACCURACY | FINISHING SYMBOL | ROUGHNESS OF FINISHED SURFACE (μm) | THERMAL REFINING SYMBOL | HARDNESS RESULTING FROM THERMAL RIFINING | DEPTH | SURFACE TREATMENT SYMBOL | THICK-NESS (μm) |
| | | | | | | M | 15 | R | JIS6g | | | | | | | |
| ○ | 0003 | | | | | | | | | | | | | | | |
| ◎ | 0005 | | 2 | | | | | | | | | | | | | |

FIG. 163

FINALLY FINISHED SHAPE

| SEQUENCE | STAGE NO. | C/R | CHAMFERING PREVIOUS CORNER SIZE | SPECIFICATIONS FOR COORDINATES OF STARTING POINT DIAMETER | SPECIFICATIONS FOR COORDINATES OF STARTING POINT LENGTH | SPECIFICATIONS FOR COORDINATES OF END POINT DIAMETER | SPECIFICATIONS FOR COORDINATES OF END POINT LENGTH | RADIUS OF CIRCULAR ARC SIZE | C/R | CHAMFERING SUBSEQUENT CORNER SIZE | FINISHING SYMBOL | ROUGHNESS OF FINISHED SURFACE (μm) |
|---|---|---|---|---|---|---|---|---|---|---|---|---|
| 41 | 26 | | | 90. | 70.04 | 110. | 70.04 | | C | 0.5 | 3L | 63S |
| 42 | 27 | | | 110. | 70.04 | 110. | -9.975 | | C | 0.5 | 3G | |
| 43 | 28 | | | 110. | 60.015 | 40. | 60.015 | | R | 1. | 3L | |
| 44 | 29 | | | 40. | 60.015 | 40. | 50. | | R | 1. | 2L | |
| 45 | 30 | | | 40. | 50. | 52.475 | 50. | | C | 1. | 2L | |
| 46 | 31 | | | 52.475 | 50. | 52.475 | 40. | | C | 1. | 2L | |
| 47 | 32 | | | 52.475 | 40. | 40. | 40. | | R | 1. | 2L | |
| 48 | 33 | | | 40. | 40. | 40. | 35. | | C | 1. | 2L | |
| 49 | 34 | | | 40. | 35. | 30.013 | 35. | | R | 1. | 3L | |
| 50 | 35 | | | 30.013 | 35. | 30.013 | 15. | | | | 3G | |
| 51 | 36 | | | 30.013 | 15. | 25. | 15. | | | | 2L | |
| 52 | 37 | | | 25. | 15. | 24.850 | 0. | | | | 2L | |
| 53 | 38 | | | 24.850 | 0. | 0. | 0. | | | | 2L | |

FIG. 165

LENGTH EXTENDING OVER STAGES

| SEQUENCE | REFERENCE STAGE | S/E | DESIGNATED STAGE TO BE MACHINED | SPECIFIED POSITION ± | LENGTH |
|---|---|---|---|---|---|
| 54 | 1 | E | 9 | + | 50025 |
| 55 | 9 | E | 28 | - | 14995 |

GROOVING

| SEQUENCE | GROOVE NO. | REFERENCE STAGE (S/E) | DESIGNATED STAGE TO BE GROOVED (S/E) | DISTANCE FROM SHOULDER S/E | ± | SIZE | GROOVE TYPE | SPECIFICATIONS FOR GROOVE BOTTOM: DIAMETER | ROUGHNESS OF FINISHED SURFACE (μm) | FINISHING SYMBOL | GROOVE WIDTH | FINISHING OF END FACE ON THE STARTING POINT SIDE OF GROOVE: ROUGHNESS OF FINISHED SURFACE (μm) | FINISHING SYMBOL |
|---|---|---|---|---|---|---|---|---|---|---|---|---|---|
| 57 | 1 | 4S | 4S | | | 0 | | 31 | 2L | | 5 | 2L | |
| 58 | 2 | 6S | 6S | | | 0 | | 34 | 1L | | 5 | 2L | |
| 59 | 3 | 18S | 18 | E | - | 15 | | 6945 | 2L | | 5 | 2L | |
| 60 | 4 | 23S | 23 | E | - | 25 | | 8385 | 2L | | 5 | 2L | |

TO A LOWER ROW

CONTINUED FROM AN UPPER ROW

| FINISHING OF END FACE ON THE END POINT SIDE OF GROOVE: ROUGHNESS OF FINISHED SURFACE (μm) | FINISHING SYMBOL | SPECIFICATIONS FOR REMOVING FILLET OF GROOVE: SIZE OF FILLET TO BE REMOVED FROM THE AREA ON THE STARTING POINT SIDE OF GROOVE | SIZE OF FILLET TO BE REMOVED FROM THE AREA ON THE END POINT SIDE OF GROOVE | SPECIFICATIONS FOR CHAMFERING GROOVE: C/R | SIZE OF CORNER TO BE REMOVED FROM THE AREA ON THE STARTING POINT SIDE OF GROOVE | C/R | SIZE OF CORNER TO BE REMOVED FROM THE AREA ON THE END POINT SIDE OF GROOVE |
|---|---|---|---|---|---|---|---|
| 2L | | 0.4 | 0.4 | | 0 | C | 1 |
| 2L | | 0.4 | 0.4 | | 0 | C | 1 |
| 2L | | 0.4 | 0.4 | | 0 | | 0 |
| 2L | | 0.4 | 0.4 | | 0 | | 0 |

FIG. 167

HOLE

HOLE NO. / SPECIFICATIONS FOR HOLE

| SEQUENCE | MACHINING ORDER | HOLE NO. | DESIGNATED STAGE TO BE BORED | TYPE OF HOLE | SPECIFICATIONS FOR REFERENCE POSITION: HOLE NO. | ± | ROTATIONAL ANGLE WITH RESPECT TO REFERENCE POSITION | S/E | ± | DISTANCE FROM SHOULDER | ± | CENTER POSITION OF HOLE WITH RESPECT TO AXIAL CENTER | ± | ANGLE IN RELATION TO Z AXIS | ± | ANGLE IN RELATION TO X AXIS | ± | ANGLE IN RELATION TO Y AXIS | SPECIFICATIONS FOR HOLE: HOLE NO. | HOLE DIAMETER |
|---|---|---|---|---|---|---|---|---|---|---|---|---|---|---|---|---|---|---|---|---|
| 64 | 1 | 1 | 9 | DR | 1 | - | 90 | | | | | | | | | | | | 1 | 5009 |

TO A LOWER ROW

CONTINUED FROM AN UPPER ROW

SPECIFICATIONS FOR COUNTERBORE / COUNTERSINK
SPECIFICATIONS FOR HOLE DEPTH

| SHAPE | SPECIFICATIONS FOR HOLE: TAPER / ANGLE | FINISHING SYMBOL | ROUGHNESS OF FINISHED SURFACE (μm) | SEGMENT | DIAMETER OF COUNTERBORE / COUNTERSINK | COUNTER SINKING ANGLE | SEGMENT | DEPTH | P/S | FINISHING SYMBOL OF HOLE BOTTOM | ROUGHNESS OF FINISHED SURFACE OF HOLE BOTTOM (μm) | NO. OF HOLE | SPECIFICATIONS FOR HOLE POSITION: CIRCULAR DIAMETER FOR BORING PITCH | C/N | NO. OF HOLE | ± | FLUTE SPACING ANGLE |
|---|---|---|---|---|---|---|---|---|---|---|---|---|---|---|---|---|---|
| | | 3DR | | S | 6 | 90 | D | 5 | S | | | 1 | 40 | | 1 | | 0 |

TAPPED HOLE

SPECIFICATIONS FOR TAPPED HOLE (a)

| SEQUENCE | MACHINING ORDER | TAPPED HOLE NO. | DESIGNATED STAGE TO BE TAPPED | TYPE OF TAPPED HOLE | TAPPED HOLE NO. | ± | SPECIFICATIONS FOR REFERENCE POSITION: ROTATIONAL ANGLE WITH RESPECT TO REFERENCE POSITION | S/E | ± | DISTANCE FROM SHOULDER | ± | CENTER POSITION OF HOLE WITH RESPECT TO AXIAL CENTER | ± | ANGLE IN RELATION TO Z AXIS | ± | ANGLE IN RELATION TO X AXIS | ± | ANGLE IN RELATION TO Y AXIS | TAP DIAMETER |
|---|---|---|---|---|---|---|---|---|---|---|---|---|---|---|---|---|---|---|---|
| 65 | 1 | 1 | 9 | M | 1 | - | 45 | | | | | | | | | | | | 5 |
| 66 | 2 | 2 | 9 | M | 1 | | 0 | | | | | | | | | | | | 5 |

TO A LOWER ROW

CONTINUED FROM AN UPPER ROW

SPECIFICATIONS FOR TAPPED HOLE (b)
COUNTERBORE LENGTH
SPECIFICATIONS FOR TAPPED HOLE DEPTH

| SPECIFICATIONS FOR TAPPED HOLE (a): TAPPING PITCH | R/L | NO. OF TAPPED HOLE | SPECIFICATIONS FOR TAPPED HOLE POSITION (1): CIRCULAR DIAMETER FOR TAPPING PITCH | C/N | NO. OF TAP | ± | FLUTE SPACING ANGLE | SHAPE | TAPER / ANGLE | SPECIFICATIONS FOR COUNTERBORE / COUNTERSINK: C/S | DIAMETER OF COUNTERBORE / COUNTERSINK | COUNTER SINKING ANGLE | COUNTERBORE DEPTH | DEPTH | SPECIFICATIONS FOR PRE-FORMED TAPPED HOLE: P/S | PRE-FORMED HOLE DIAMETER | PRE-FORMED DEPTH |
|---|---|---|---|---|---|---|---|---|---|---|---|---|---|---|---|---|---|
| 08 | R | 4 | 40 | C | 1 | - | 90 | S | | S | 52 | 90 | | 7 | S | 42 | 105 |
| 08 | R | 2 | 40 | C | 1 | - | 180 | S | | S | 52 | 90 | | 7 | S | 42 | 105 |

FIG. 168

INTERNAL CAM

| SEQUENCE | CAM NO. | DESIGNATED STAGE TO BE MACHINED | SPECIFICATIONS FOR THE REFERENCE OF INTERNAL CAM: ± | REFERENCE ANGLE | REFERENCE CIRCLE | TYPE OF CAM | POINT NO. | SPECIFICATIONS FOR COORDINATES OF STARTING POINT: DISTANCE FROM CENTER | ± | ANGLE | SPECIFICATIONS FOR COORDINATES OF END POINT: DISTANCE FROM CENTER | ± | ANGLE |
|---|---|---|---|---|---|---|---|---|---|---|---|---|---|
| 67 | 1 | 4 | | 0 | 22 | | 1 | 11006 | | 0 | 19007 | − | 180 |
| 68 | | | | | | | 2 | 19007 | | | 11006 | − | 180 |

TO A LOWER ROW

CONTINUED FROM AN UPPER ROW

| SPECIFICATIONS FOR RADIUS OF CIRCULAR ARC: ± | RADIUS | ± | CENTER ANGLE OF CIRCULAR ARC | DISTANCE FROM CIRCULAR ARC CENTER | SPECIFICATIONS FOR FINISHING CAM SURFACE: FINISHING SYMBOL | ROUGHNESS OF FINISHED SURFACE (μ m) | SPECIFICATIONS FOR CHAMFERING CAM: C/R | CAM WIDTH IN DIREC-TION OF STARTING POINT | C/R | CAM WIDTH IN DIREC-TION OF END POINT |
|---|---|---|---|---|---|---|---|---|---|---|
| − | 15006 | | | | 2M | | | | C | 05 |
| − | 15006 | | | | 2M | | | | C | 05 |

END-FACE CAM

| SEQUENCE | CAM NO. | DESIGNATED STAGE TO BE MACHINED | SPECIFICATIONS FOR REFERENCE OF END-FACE CAM: ± | REFERENCE ANGLE | REFERENCE CIRCLE | REFERENCE STAGE | TYPE OF CAM | POINT NO. | SPECIFICATIONS FOR COORDINATES OF STARTING POINT: ± | ANGLE | S/E | ± | DISTANCE FROM SHOULDER | SPECIFICATIONS FOR COORDINATES OF END POINT: ± | ANGLE |
|---|---|---|---|---|---|---|---|---|---|---|---|---|---|---|---|
| 69 | 2 | 15 | | 0 | 61 | 9 | | 1 | | 0 | E | − | 24990 | − | 90 |
| 70 | | | | | | | | 2 | − | 90 | E | − | 24990 | − | 180 |
| 71 | | | | | | | | 3 | − | 180 | E | − | 30 | − | 270 |
| 72 | | | | | | | | 4 | − | 270 | E | − | 30 | − | 360 |

TO A LOWER ROW

CONTINUED FROM AN UPPER ROW

| (SPECIFICATIONS FOR COORDINATES OF END POINT): C/E | ± | DISTANCE FROM SHOULDER | SPECIFICATIONS FOR RADIUS OF CIRCULAR ARC: ± | RADIUS | ± | CENTER ANGLE OF CIRCULAR ARC | S/E | ± | DISTANCE FROM SHOULDER OF CIRCULAR ARC CENTER | SPECIFICATIONS FOR FINISHING A CAM SURFACE: FINISHING SYMBOL | ROUGHNESS OF FINISHED SURFACE (μ m) | SPECIFICATIONS FOR CHAMFERING CAM: C/R | SIZE OF THE AREA TO BE CHAMFERED FROM THE OUTER PERIPHERY OF CAM | C/R | SIZE OF THE AREA TO BE CHAMFERED FROM THE INTERNAL PERIPHERY OF CAM |
|---|---|---|---|---|---|---|---|---|---|---|---|---|---|---|---|
| E | − | 24990 | | | | | | | | 2M | | C | 05 | | |
| E | − | 30 | | | | | | | | 2M | | C | 05 | | |
| E | − | 30 | | | | | | | | 2M | | C | 05 | | |
| E | − | 24990 | | | | | | | | 2M | | C | 05 | | |

FIG. 170

EXTERNAL CAM

| SEQUENCE | CAM NO. | STAGE DESIGNATED SO AS TO BE MACHINED | SPECIFICATIONS FOR REFERENCE OF EXTERNAL CAM: ± | REFERENCE ANGLE | REFERENCE CIRCLE | TYPE OF CAM | POINT NO. | SPECIFICATIONS FOR COORDINATES OF STARTING POINT: DISTANCE FROM CENTER | ± | ANGLE | SPECIFICATIONS FOR COORDINATES OF END POINT: DISTANCE FROM CENTER | ± | ANGLE |
|---|---|---|---|---|---|---|---|---|---|---|---|---|---|
| 77 | 4 | 27 | | 0 | 110 | | 1 | 55 | | 0 | 45 | + | 180 |
| 78 | | | | | | | 2 | 45 | + | 180 | 55 | + | 360 |

TO A LOWER ROW

CONTINUED FROM AN UPPER ROW

| SPECIFICATIONS FOR RADIUS OF CIRCULAR ARC: ± | RADIUS | ± | CENTER ANGLE OF CIRCULAR ARC | DISTANCE FROM CIRCULAR ARC CENTER | SPECIFICATIONS FOR FINISHING CAM SURFACE: FINISHING SYMBOL | ROUGHNESS OF FINISHED SURFACE (μm) | SPECIFICATIONS FOR CHAMFERING CAM: C/R | CAM WIDTH IN DIRECTION OF STARTING POINT | C/R | CAM WIDTH IN DIRECTION OF END POINT |
|---|---|---|---|---|---|---|---|---|---|---|
| − | 49992 | | | | 3G | | C | 05 | C | 05 |
| − | 49992 | | | | 3G | | C | 05 | C | 05 |

END-FACE GROOVED CAM

| SEQUENCE | CAM NO. | DESIGNATED STAGE TO BE MACHINED | INTERNAL / EXTERNAL | TYPE OF CAM | POINT NO. | SPECIFICATIONS FOR COORDINATES OF STARTING POINT: DISTANCE FROM CENTER | ± | ANGLE | SPECIFICATIONS FOR COORDINATES OF END POINT: DISTANCE FROM CENTER | ± | ANGLE | SPECIFICATIONS FOR CIRCULAR ARC: ± | RADIUS | CENTER POSITION OF CIRCULAR ARC (1): DISTANCE BETWEEN THE CENTER AND THE CENTER OF RADIUS |
|---|---|---|---|---|---|---|---|---|---|---|---|---|---|---|
| 79 | 5 | 28 | | Q | 1 | 49 | | 0 | 39 | + | 180 | − | 43991 | |
| 80 | | | | | 2 | 39 | | 180 | 49 | + | 360 | − | 43991 | |

TO A LOWER ROW

CONTINUED FROM AN UPPER ROW

| CENTER POSITION OF CIRCULAR ARC (1): ± | CENTER ANGLE OF CIRCULAR ARC WITH REGARD TO REFERENCE POINT | TYPE OF GROOVE | SPECIFICATIONS FOR GROOVE OF CAM: GROOVE WIDTH | FINISH MADE BY A SURFACE WITH SMALL CORE DIAMETER: FINISHING SYMBOL | ROUGHNESS OF FINISHED SURFACE (μm) | FINISH MADE BY A SURFACE WITH LARGE CORE DIAMETER: FINISHING SYMBOL | ROUGHNESS OF FINISHED SURFACE (μm) | SPECIFICATIONS FOR CAM GROOVE DEPTH: DEPTH | FINISHING SYMBOL | ROUGHNESS OF FINISHED SURFACE (μm) | SPECIFICATIONS FOR REMOVING FILLET AT GROOVE BOTTOM: SIZE OF FILLET TO BE REMOVED BY THE PART OF THE CAM HAVING SMALL CORE DIAMETER | SIZE OF FILLET TO BE REMOVED BY THE PART OF THE CAM HAVING A LARGE CORE DIAMETER | SPECIFICATIONS FOR CHAMFERING GROOVE: C/R | CAM WIDTH IN DIRECTION OF STARTING POINT | C/R | CAM WIDTH IN DIRECTION OF END POINT |
|---|---|---|---|---|---|---|---|---|---|---|---|---|---|---|---|---|
| | | | 8009 | 2M | | 2M | | 405 | 2M | | 05 | 05 | C | 05 | | 05 |
| | | | | | | | | | | | | | | | | |

EXTERNAL GEAR

FIG. 173

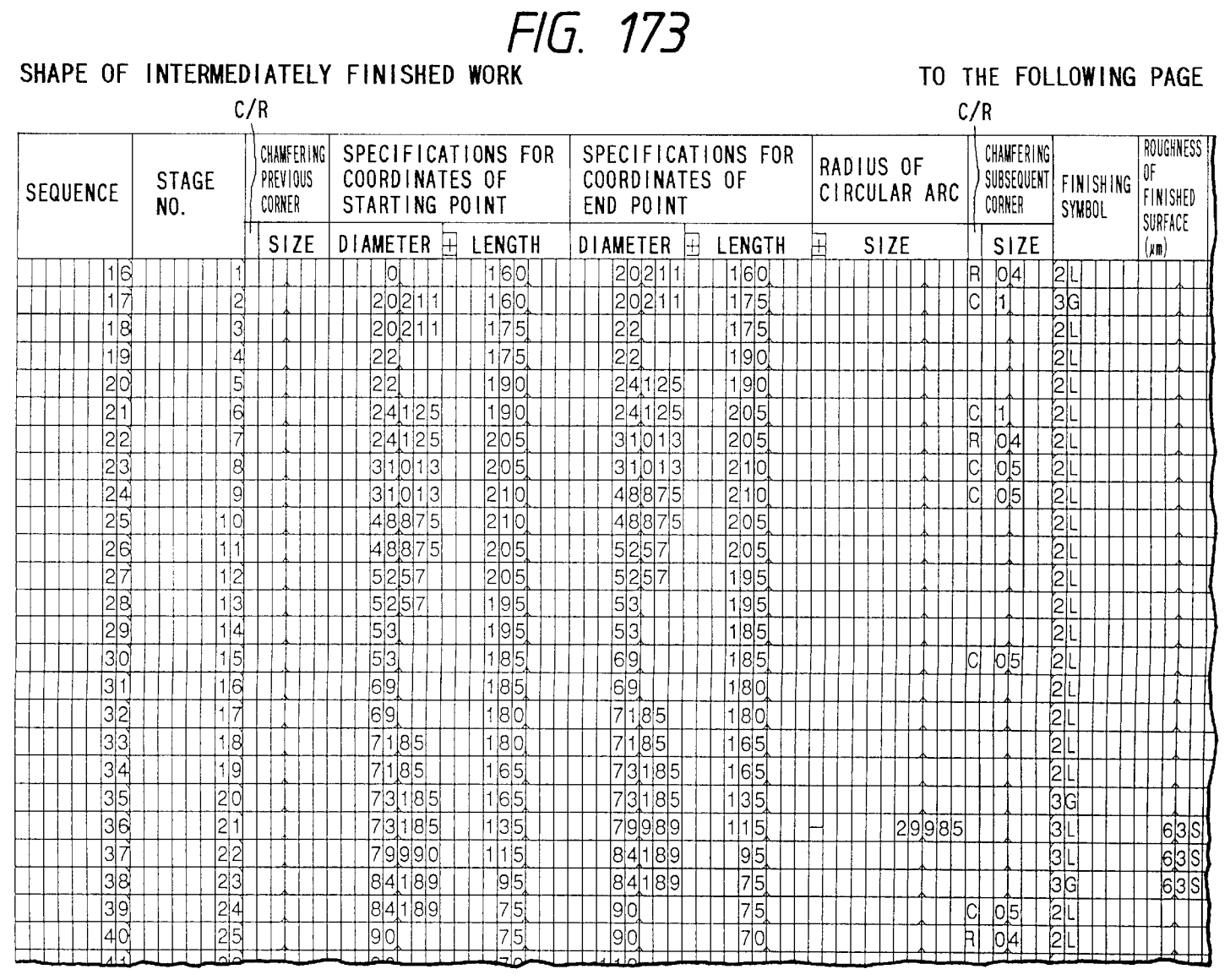

SHAPE OF INTERMEDIATELY FINISHED WORK

TO THE FOLLOWING PAGE

| SEQUENCE | STAGE NO. | CHAMFERING PREVIOUS CORNER C/R | CHAMFERING PREVIOUS CORNER SIZE | STARTING POINT DIAMETER | STARTING POINT ± | STARTING POINT LENGTH | END POINT DIAMETER | END POINT ± | END POINT LENGTH | RADIUS OF CIRCULAR ARC ± | RADIUS OF CIRCULAR ARC SIZE | CHAMFERING SUBSEQUENT CORNER C/R | CHAMFERING SUBSEQUENT CORNER SIZE | FINISHING SYMBOL | ROUGHNESS OF FINISHED SURFACE (μm) |
|---|---|---|---|---|---|---|---|---|---|---|---|---|---|---|---|
| 16 | 1 | | | 0 | | 160 | 20211 | | 160 | | | R | 04 | 2L | |
| 17 | 2 | | | 20211 | | 160 | 20211 | | 175 | | | C | 1 | 3G | |
| 18 | 3 | | | 20211 | | 175 | 22 | | 175 | | | | | 2L | |
| 19 | 4 | | | 22 | | 175 | 22 | | 190 | | | | | 2L | |
| 20 | 5 | | | 22 | | 190 | 24125 | | 190 | | | | | 2L | |
| 21 | 6 | | | 24125 | | 190 | 24125 | | 205 | | | C | 1 | 2L | |
| 22 | 7 | | | 24125 | | 205 | 31013 | | 205 | | | R | 04 | 2L | |
| 23 | 8 | | | 31013 | | 205 | 31013 | | 210 | | | C | 05 | 2L | |
| 24 | 9 | | | 31013 | | 210 | 48875 | | 210 | | | C | 05 | 2L | |
| 25 | 10 | | | 48875 | | 210 | 48875 | | 205 | | | | | 2L | |
| 26 | 11 | | | 48875 | | 205 | 5257 | | 205 | | | | | 2L | |
| 27 | 12 | | | 5257 | | 205 | 5257 | | 195 | | | | | 2L | |
| 28 | 13 | | | 5257 | | 195 | 53 | | 195 | | | | | 2L | |
| 29 | 14 | | | 53 | | 195 | 53 | | 185 | | | | | 2L | |
| 30 | 15 | | | 53 | | 185 | 69 | | 185 | | | C | 05 | 2L | |
| 31 | 16 | | | 69 | | 185 | 69 | | 180 | | | | | 2L | |
| 32 | 17 | | | 69 | | 180 | 7185 | | 180 | | | | | 2L | |
| 33 | 18 | | | 7185 | | 180 | 7185 | | 165 | | | | | 2L | |
| 34 | 19 | | | 7185 | | 165 | 73185 | | 165 | | | | | 2L | |
| 35 | 20 | | | 73185 | | 165 | 73185 | | 135 | | | | | 3G | |
| 36 | 21 | | | 73185 | | 135 | 79989 | | 115 | − | 29985 | | | 3L | 63S |
| 37 | 22 | | | 79990 | | 115 | 84189 | | 95 | | | | | 3L | 63S |
| 38 | 23 | | | 84189 | | 95 | 84189 | | 75 | | | | | 3G | 63S |
| 39 | 24 | | | 84189 | | 75 | 90 | | 75 | | | C | 05 | 2L | |
| 40 | 25 | | | 90 | | 75 | 90 | | 70 | | | R | 04 | 2L | |

FIG. 175

SHAPE OF INTERMEDIATELY FINISHED WORK

| SEQUENCE | STAGE NO. | CHAMFERING PREVIOUS CORNER C/R | CHAMFERING PREVIOUS CORNER SIZE | STARTING POINT DIAMETER | STARTING POINT ± | STARTING POINT LENGTH | END POINT DIAMETER | END POINT ± | END POINT LENGTH | RADIUS OF CIRCULAR ARC ± | RADIUS OF CIRCULAR ARC SIZE | CHAMFERING SUBSEQUENT CORNER C/R | CHAMFERING SUBSEQUENT CORNER SIZE | FINISHING SYMBOL | ROUGHNESS OF FINISHED SURFACE (μm) |
|---|---|---|---|---|---|---|---|---|---|---|---|---|---|---|---|
| 41 | 26 | | | 90 | | 70 | 1102 | | 70 | | | C | 05 | 3L | 63S |
| 42 | 27 | | | 1102 | | 70 | 1102 | - | 9975 | | | C | 05 | 3G | |
| 43 | 28 | | | 1102 | | 60 | 40 | | 60 | | | R | 1 | 3L | |
| 44 | 29 | | | 40 | | 60 | 40 | | 50 | | | R | 1 | 2L | |
| 45 | 30 | | | 40 | | 50 | 52475 | | 50 | | | C | 1 | 2L | |
| 46 | 31 | | | 52475 | | 50 | 52475 | | 40 | | | C | 1 | 2L | |
| 47 | 32 | | | 52475 | | 40 | 40 | | 40 | | | R | 1 | 2L | |
| 48 | 33 | | | 40 | | 40 | 40 | | 35 | | | C | 1 | 2L | |
| 49 | 34 | | | 40 | | 35 | 30213 | | 35 | | | R | 1 | 3L | |
| 50 | 35 | | | 30213 | | 35 | 30213 | | 15 | | | | | 3G | |
| 51 | 36 | | | 30213 | | 15 | 25 | | 15 | | | | | 2L | |
| 52 | 37 | | | 25 | | 15 | 24850 | | 0 | | | | | 2L | |
| 53 | 38 | | | 24850 | | 0 | 0 | | 0 | | | | | 2L | |

FIG. 177

VOLUME TO BE REMOVED (UNIT ; cm³)

| STAGE NO. | SHAPE | VOLUME TO BE REMOVED FROM MATERIAL | VOLUME TO BE REMOVED FROM ROD MATERIAL WHICH HAS A DIAMETER OF φ 115 | COMMENT |
|---|---|---|---|---|
| 1～8 | INSIDE | 25.124 | 25.124 | |
| 9 | END FACE | 5.284 | 20.773 | |
| 10～37 | OUTSIDE | 271.591 | 1426.804 | |
| 38 | END FACE | 5.284 | 20.774 | |
| (TOTAL OF TURNING SHAPE) | | 307.283 | 1493.476 | |
| 35～38 | KEYWAY | 1.734 | 1.734 | |
| 8～10 | KEY SLOT | 0.576 | 0.576 | |
| 9 | HOLE | 0.098 | 0.098 | |
| 9 | TAPPED HOLE | 0.330 | 0.330 | |
| 4 | INTERNAL CAM | 3.267 | 3.267 | |
| 15 | END CAM | 3.833 | 3.833 | |
| 20 | CIRCULAR/GROOVED CAM | 6.626 | 6.626 | |
| 27 | GROOVED END CAM | 16.493 | 16.493 | |
| 28 | END GROOVED CAM | 8.042 | 8.042 | |
| 11～12 | CYLINDRICAL OUTSIDE POLYGON | 0.768 | 0.768 | |
| 6 | INTERNAL GEAR | 1.272 | 1.272 | |
| 31 | EXTERNAL GEAR | 3.731 | 3.731 | |
| (TOTAL OF NUMBER OF SPECIAL SHAPES) | | 46.770 | 46.770 | |
| TOTAL | | 354.053 | 1540.246 | |

FIG. 178

VOLUME TO BE REMOVED BY TURNING/
A PRODUCT OF THE VOLUME TO BE REMOVED
AND A MEAN RADIUS

[UNIT ; $cm^3/cm^4$]

| STAGE NO. | SHAPE | MATERIAL SHAPES | | ROD MATERIAL OF φ 115 (OR 115mm DIAMETER) | |
|---|---|---|---|---|---|
| | | VOLUME TO BE REMOVED | PRODUCT OF THE VOLUME TO BE REMOVED AND MEAN RADIUS | VOLUME TO BE REMOVED | VOLUME TO BE REMOVED AND A MEAN RADIUS |
| 2 | INSIDE | 4.712 | 4.712 | 4.712 | 4.712 |
| 4 | INTERNAL GROOVE | 3.774 | 5.850 | 3.774 | 5.850 |
| | INSIDE | 3.801 | 4.181 | 3.801 | 4.181 |
| 6 | INTERNAL GROOVE | 4.540 | 7.718 | 4.540 | 7.718 |
| | INSIDE | 4.524 | 5.429 | 4.524 | 5.429 |
| 8 | INSIDE | 3.774 | 5.850 | 3.774 | 5.850 |
| INSIDE DIAMETER: SUBTOTAL | | 25.124 | 33.740 | 25.124 | 33.740 |
| 9 | END | 5.284 | 15.324 | 20.774 | 119.451 |
| 10 | OUTSIDE | 14.463 | 88.947 | 42.506 | 348.549 |
| 12 | OUTSIDE | 26.078 | 170.250 | 82.164 | 688.411 |
| 14 | OUTSIDE | 25.722 | 168.479 | 81.807 | 687.179 |
| 16 | OUTSIDE | 5.195 | 38.183 | 33.238 | 305.790 |
| 18 | OUTSIDE | 7.069 | 53.018 | 63.154 | 590.490 |
| | EXTERNAL GROOVE | 4.293 | 31.661 | 32.966 | 304.111 |
| 20 | OUTSIDE | 17.789 | 134.307 | 186.045 | 1748.823 |
| 21 | OUTSIDE | 12.410 | 98.039 | 115.747 | 1108.278 |
| 22 | OUTSIDE | 13.273 | 112.156 | 102.097 | ✡ 1005.655 |
| 23 | OUTSIDE | * 13.587 | ✡ 117.528 | * 96.902 | 964.175 |
| 25 | OUTSIDE | 10.230 | 94.628 | 20.126 | 206.292 |
| OUTSIDE DIAMETER ON THE FIRST SIDE: SUBTOTAL | | 156.023 | 1122.520 | 877.526 | 8059.204 |
| 27 | OUTSIDE | 8.836 | 99.405 | 8.836 | 99.405 |
| 29 | GROOVE | 29.344 | 143.786 | 91.303 | 707.598 |
| 31 | OUTSIDE | 4.773 | 26.371 | 82.221 | 688.601 |
| 33 | OUTSIDE | 6.927 | 33.942 | 45.651 | 353.795 |
| 35 | OUTSIDE | 38.704 | 170.298 | 193.601 | 1403.607 |
| 37 | OUTSIDE | 32.268 | 133.912 | 148.440 | 1039.08 |
| 38 | END | 5.284 | 15.324 | 20.774 | 119.451 |
| OUTSIDE DIAMETER ON THE SECOND SIDE: SUBTOTAL | | 126.136 | 623.038 | 590.826 | 4411.537 |
| OUTSIDE DIAMETER: SUBTOTAL | | 282.159 | 1745.558 | 1468.352 | 12470.741 |
| TOTAL | | 307.283 | 1779.298 | 1493.476 | 12504.481 |

FIG. 179

CROSS SECTIONAL AREA OF TURNING ALLOWANCE OF ROD MATERIAL, AND LENGTH OF THE TURNING ALLOWANCE IN THE DIRECTION OF TURNING

| STAGE NO. | SHAPE | CROSS SECTION OF TURNING ALLOWANCE OF ROD MATERIAL ($cm^2$) | LENGTH IN Z DIRECTION (cm) | LENGTH IN X DIRECTION (cm) | COMMENT |
|---|---|---|---|---|---|
| 2 | INSIDE | 1.5 | 1.5 | 1.0 | |
| 4 | INTERNAL GROOVE | 0.775 | 0.5 | 1.55 | |
| | INSIDE | 1.65 | 1.0 | 1.65 | |
| 6 | INTERNAL GROOVE | 0.85 | 0.5 | 1.7 | |
| | INSIDE | 1.2 | 1.0 | 1.2 | |
| 8 | INSIDE | 0.775 | 0.5 | 1.55 | |
| 9 | END | 0.865 | 0.15 | 5.75 | |
| 10 | OUTSIDE | 1.65 | 0.5 | 3.3 | |
| 12 | OUTSIDE | 3.125 | 1.0 | 3.125 | |
| 14 | OUTSIDE | 3.1 | 1.0 | 3.1 | |
| 16 | OUTSIDE | 1.15 | 0.5 | 3.3 | |
| 18 | OUTSIDE | 2.15 | 1.0 | 2.15 | |
| 20 | OUTSIDE | 6.3 | 3.0 | 2.1 | |
| 21 | OUTSIDE | 3.85 | 2.0 | 1.925 | |
| 22 | OUTSIDE | 3.3 | 2.0 | 1.65 | |
| 23 | OUTSIDE | 3.1 | 2.0 | 1.55 | |
| 25 | OUTSIDE | 0.625 | 0.5 | 1.25 | |
| 27 | OUTSIDE | 0.25 | 1.0 | 0.25 | |
| 29 | GROOVE | 3.75 | 1.0 | 3.75 | |
| 31 | OUTSIDE | 3.125 | 1.0 | 3.125 | |
| 33 | OUTSIDE | 1.875 | 0.5 | 3.75 | |
| 35 | OUTSIDE | 8.5 | 2.0 | 4.25 | |
| 37 | OUTSIDE | 6.75 | 1.0 | 6.75 | |
| 38 | END | 0.8625 | 0.15 | 5.75 | |
| TOTAL | | 61.0525 | 23.8 | 65.475 | |
| | | | 2.564 | 0.932 | |

TOTAL AVERAGED TURNING ALLOWANCE

TOTAL OF CROSS SECTIONAL AREA TURNED BY FIRST MACHINING OPERATION (stages 2 to 27):
- CROSS SECTIONAL AREA 35.965$cm^2$
- LENGTH IN Z DIRECTION 17.15cm
- LENGTH IN X DIRECTION 37.85cm
- MEAN ALLOWANCE IN X DIRECTION 2.097cm
- MEAN ALLOWANCE IN Z DIRECTION 0.9502cm TOTAL OF CROSS SECTIONAL AREA TURNED BY SECOND MACHINING OPERATION (stages 29 to 38):
- CROSS SECTIONAL AREA 25.0875$cm^2$
- LENGTH IN Z DIRECTION 6.65cm
- LENGTH IN X DIRECTION 27.625cm
- MEAN ALLOWANCE IN X DIRECTION 3.773cm
- MEAN ALLOWANCE IN Z DIRECTION 0.908cm

FIG. 180

CROSS SECTIONAL AREA OF TURNING ALLOWANCE OF PICTORIAL INPUT OF MATERIAL, AND LENGTH OF THE TURNING ALLOWANCE IN THE DIRECTION OF TURNING

| STAGE NO. | SHAPE | CROSS SECTION OF MACHINING ALLOWANCE OBTAINED ON THE BASIS OF MATERIAL DRAWING ($cm^2$) | LENGTH IN Z DIRECTION (cm) | LENGTH IN X DIRECTION (cm) | COMMENT |
|---|---|---|---|---|---|
| 2 | INSIDE | 1.5 | 1.5 | 1 | |
| 4 | INTERNAL GROOVE | 0.775 | 0.5 | 1.55 | |
| | INSIDE | 1.65 | 1.0 | 1.65 | |
| 6 | INTERNAL GROOVE | 0.85 | 0.5 | 1.7 | |
| | INSIDE | 1.2 | 1.0 | 1.2 | |
| 8 | INSIDE | 0.775 | 0.5 | 1.55 | |
| 9 | END | 0.7 | 3.5 | 0.2 | |
| 10 | OUTSIDE | 0.575 | 0.5 | 1.15 | |
| 12 | OUTSIDE | 1.272 | 1.0 | 1.272 | |
| 14 | OUTSIDE | 1.25 | 1.0 | 1.25 | |
| 16 | OUTSIDE | 0.225 | 0.5 | 0.45 | |
| 18 | OUTSIDE | 0.45 | 1.5 | 0.3 | |
| 20 | OUTSIDE | 0.75 | 3.0 | 0.25 | |
| 21 | OUTSIDE | 0.5 | 2.0 | 0.25 | |
| 22 | OUTSIDE | 0.5 | 2.0 | 0.25 | |
| 23 | OUTSIDE | 0.5 | 2.0 | 0.25 | |
| 24 | END | 0.06 | 0.3 | 0.2 | |
| 25 | OUTSIDE | 0.125 | 0.5 | 0.25 | |
| 26 | END | 0.25 | 1.0 | 0.25 | |
| 27 | OUTSIDE | 0.25 | 1.0 | 0.25 | |
| 28 | END | 0.57 | 2.85 | 0.2 | |
| 29 | GROOVE | 0.625 | 1.0 | 0.625 | |
| 31 | OUTSIDE | 0.27 | 1.0 | 0.275 | |
| 33 | OUTSIDE | 0.45 | 0.5 | 0.9 | |
| 35 | OUTSIDE | 3.5 | 2.5 | 1.4 | |
| 37 | OUTSIDE | 2.475 | 1.5 | 1.65 | |
| 38 | END | 0.31 | 1.55 | 0.2 | |
| | | 18.467 | 24.5 | 0.754 | |
| | | 3.365 | 11.2 | 0.3 | |

TOTAL OF CROSS SECTIONAL AREA TURNED BY FIRST MACHINING OPERATION (stages 2–26):

- OUTSIDE·INSIDE BORE: CROSS SECTIONAL AREA 11.522; LENGTH TO BE MACHINED 18; MEAN MACHINING ALLOWANCE 0.64
- END·GROOVE: CROSS SECTIONAL AREA 1.86; LENGTH TO BE MACHINED 5.8; MEAN MACHINING ALLOWANCE 0.32

TOTAL OF CROSS SECTIONAL AREA TURNED BY SECOND MACHINING OPERATION (stages 27–38):

- OUTSIDE·INSIDE BORE: CROSS SECTIONAL AREA 6.945; LENGTH TO BE MACHINED 6.5; MEAN MACHINING ALLOWANCE 1.068
- END·GROOVE: CROSS SECTIONAL AREA 1.505; LENGTH TO BE MACHINED 5.4; MEAN MACHINING ALLOWANCE 0.279

TOTAL OF AREA MACHINED BY OUTSIDE AND INSIDE MACHINING OPERATIONS (row 18.467)

TOTAL OF AREA MACHINED BY END PROCESSING AND GROOVING (row 3.365)

MACHINING METHOD USING NUMERICAL CONTROL APPARATUS

BACKGROUND OF THE INVENTION

1. Field of the Invention

The present invention relates to a machining method for use in the field of machining.

2. Description of the Related Art

As have been well known, a series of operations, such as deciding on machining procedures, the selection of tools, the preparation of a machine program, the actual machining operation, and inspection, are carried out in the following manner according to a conventional machining method when machining is carried out using a numerically controlled machine tool.

The machining procedures are decided by engineers having a high-level of technical understanding and highly skilled technicians. The engineers and technicians also select tools taking into account material to be machined, machining tools, and machining accuracy.

The preparation of a machine program requires extensive knowledge acquired through experience. A tool travel path is computed in the order of machining operations according to the shape of the workpiece after various factors have been determined, for example, a machine tool to be used, the workpiece material, a mounting method, tools to be used, machining steps, and machining conditions. The machine program is prepared by punching holes in a tape in accordance with an NC format. The machining is automated by a numerically controlled apparatus, but it does not include a high degree of processing to cope with a variety of variations in conditions. Although it can be said that a high degree of skill becomes unnecessary, technicians capable of judging or coping with a variety of variations in conditions for the machine program are still required.

Technicians inspect a finished workpiece to determine whether or not the workpiece satisfactorily conforms to a specified shape and has sufficient dimensional accuracy, using a variety of measuring devices and measuring methods.

As regards a method for preparing a machine program using an automatic program, Unexamined Japanese Patent Publn. No. Sho-59(1984)-30109 discloses an NC program automatic preparation apparatus which makes a part of a menu consisting of queries easy to see using an interactive CRT display. Specifically, in this NC program automatic preparation apparatus, a program preparation menu is displayed on a graphics display screen, and an NC program is automatically prepared by sequentially processing input data in accordance with the displayed menu. The NC program automatic preparation apparatus is provided with memory means for storing data necessary to graphically display a part of the program preparation menu, and display means for reading data stored in the memory means and displaying the thus read data on a graphics display screen.

Unexamined Japanese Patent Publn. No. Sho-59(1984)-161704 discloses an electric discharge machine which displays an NC process format and permits an input to fill necessary data items. Specifically, the electric discharge machine is controlled by a program using a control system which consists of an input unit, a display unit, and a numerical control unit. In such an electric discharge machine, the display unit is provided with a CRT display, and a process sheet format screen appears on this CRT display. This process sheet format screen is filled in with data items.

Unexamined Japanese Patent Publn. No. Sho-61(1986)-105612 discloses a method of inputting machining information into a numerically controlled machine tool in which information necessary to machine a workpiece is displayed in the form of a pattern. In this input method, a program input screen of a control unit is divided into two areas, namely, an input area and a HELP information area for a workpiece machine program. As a result of selection of the type of machining, information necessary to machine a workpiece is displayed in the HELP information area in the form of a pattern while a format guide consisting of item names to be input which are listed in order of input are constantly displayed in the input area of the workpiece machine program.

Unexamined Japanese Patent Publn. No. Hei-4(1992)-85605 discloses a system in which a tolerance is input for each of a number of shape elements forming a shape to be machined, or for each group of a plurality of shape elements when a finished shape to be obtained by machining is input, whereby machining route information is prepared in such a way that the dimensions of a workpiece obtained as a result of machining falls within the required tolerance.

Unexamined Japanese Patent Publn. No. Hei-4(1992)-148306 discloses a system in which any one of information items such as X coordinates of the start and end of an end face slot, the depth of the end face slot, the bore of the end face slot, the length of the end face slot, and an angle with respect to the reference line in the C axis is input through a menu-driven system.

Unexamined Japanese Patent Publn. No. Hei-4(1992)-331038 discloses a system using means which inputs an intended finished shape by measuring a master workpiece.

Unexamined Japanese Patent Publn. No. Hei-4(1992)-352006 discloses a system in which a dimension line, a dimension, and a tolerance are input via a CRT screen.

Unexamined Japanese Patent Publn. No. Hei-5(1993)-146943 discloses a system in which the contents of a file, which holds tool codes, appear on a display, and the tool codes are sequentially input.

Unexamined Japanese Patent Publn. No. Hei-5(1993)-158523 discloses a system which graphically provides an indication for inputting a tolerance for each constituent shape.

Unexamined Japanese Patent Publn. No. Hei-5(1993)-329744 discloses a system which uses the type of element, shape data, a plane of projection, names of parts, and names of shapes are used when inputting a shape to be machined.

Unexamined Japanese Patent Publn. No. Hei-2(1990)-306308 discloses a system which permits selection of shapes and menus, and allows verification of an input result by use symbolic keys in pictorial input.

Unexamined Japanese Patent Publn. No. Hei-4(1992)-370808 discloses a system in which pictorial shapes are input and displayed in the form of X, Z, SR, and R on a CRT screen.

As regards a system which employs the technique of preparing a program by means of accumulation of knowledge and inference, Unexamined Japanese Patent Publn. No. Sho-62(1987)-226267 (Inference System and Automated Manufacturing Process Designing System) discloses an expert system which is incorporated in the design process between CAD and CAM.

Unexamined Japanese Patent Publn. No. Hei-4(1992)-148306 discloses a system which prepares NC data based on queries about material, the shape of a part, and tools, and answers to the queries.

Unexamined Japanese Patent Publn. No. Hei-2(1990)-306308 discloses a system provided with machining pattern input means which inputs a pattern to be machined by a plurality of machine tools and machine assignment means which analyzes the input pattern to be machined and assigns a predetermined machining tool to each line segment. The system automatically prepares an NC program which is necessary for each machine tool to machine a predetermined line segment on the basis of the assigned information.

Unexamined Japanese Patent Publn. No. Hei-4(1992)-76707 discloses an NC lathe with an automatic programming function that is provided with means for measuring the dimension of material to be machined while it is fitted to the NC lathe. The measured shape data of the material to be machined are input to an automatic programming unit.

Unexamined Japanese Patent Publn. No. Hei-6(1994)-63841 discloses a method of automatically determining the extent of machining for each spindle on the basis of input shapes of workpieces and materials in such a way that machining time required by a plurality of spindles becomes equal. The method comprises the steps of:

setting parting points and directions which can be set within the extent of machining, determining the order in which the parting points and directions have been adopted;

determining the extent of machining based on the parting points and directions in the order in the order in which they have been adopted;

determining a machining process for each spindle;

calculating the machining time required for each machining process;

comparing the machining processes with each other with respect to machining time;

judging results of the comparison about the machining time with reference to allowable machining time of the input data which brings the machining time in balance;

checking the presence or absence of other parting points and directions which can be set;

repeating the above processing steps; and searching for the best parting method from among parting methods as a result of the calculation unless the allowable machining time is attained.

Unexamined Japanese Patent Publn. No. Hei-3(1990)-119206 discloses a system in which a program is automatically prepared by inputting a program in accordance with a guidance displayed on a screen or machining data in accordance with program preparing procedures, and by automatically selecting a pattern which minimizes a travel distance within a group.

As regards the technique of preparing a program by integration of machining elements, Unexamined Japanese Patent Publn. No. Sho-58(1983)-46408 discloses a method of controlling a numerically controlled machine tool which prevents erroneous input of machining information into a program by classifying shapes to be finished shown in drawings according to predetermined specific machining operations, and by inputting machining information.

Unexamined Japanese Patent Publn. No. Sho-59(1984)-75307 discloses a system which prepares a parting program by combination of sub programs for respective processing processes and a main program for invoking each of the sub programs in the order of machining.

Unexamined Japanese Patent Publn. No. Sho-58(1983)-46408 discloses a system in which machining elements, i.e., points, lines, and surfaces, which are obtained as a result of breaking down machining operation into elements are further divided into machining modes, and the modes are also broken down for each single machining unit.

Unexamined Japanese Patent Publn. Nos. Sho-60(1985)-127947, 127949, and 127951, which relate to the selection of tools, disclose systems which automatically select a tool without causing interference to a workpiece.

Unexamined Japanese Patent Publn. No. Sho-62(1987)-181853 discloses a system which automatically chooses a tool with the maximum diameter from among tools registered according to type and shape of bore, when boring is required.

Unexamined Japanese Patent Publn. No. Hei-2(1990)-36046 discloses a numerically controlled interactive system which provides interactive selection of a tool as a programming method. Automatic selection and decision of a tool most suitable for machining from among tools having limited life spans renders an operator's judgement and operation unnecessary, which prevents erroneous operation and results in improved operability.

Unexamined Japanese Patent Publn. No. Sho-62(1987)-181854 discloses automatic selection of a tool for machining a pre-formed hole.

Unexamined Japanese Patent Publn. No. Hei-1(1989)-188249 discloses the selection of a broaching tool through inference using a production rule.

Unexamined Japanese Patent Publn. No. Hei-2(1990)-109657 discloses an automatic tool selecting method which automatically selects a tool requiring the minimum machining time by the steps of: reading tools from a machining condition file which corresponds to a shape to be machined; reading machining conditions from machining condition files of the tools as well as workpiece material data; calculating machining time for each tool; and selecting a tool which requires the minimum machining time from the tools.

Examined Japanese Patent Publn. No. Hei-2(1990)-58052 discloses a grooving tool selecting method for use in automatic programming. According to this method, the width of each grooving tip is previously stored. A tool with the maximum tip width is selected from among tools whose tip widths are less than the maximum groove of one or more grooves included in a specified shape of a component.

Examined Japanese Patent Publn. No. Hei-1(1989)-58017 discloses a threading tool selecting method for use in automatic programming. Automatic selection of a tool can be implemented by previously storing available shape data and the names of available machining steps for each of tools; and selecting a threading tool on the basis of the depth of a thread and a pitch between the threads which are obtained from shape data of a specific component.

Examined Japanese Patent Publn. No. Hei-1(1989)-60388 discloses a tool selecting method for use in automatic programming. In this method, a tool data file including the named of machining processes and tool shape data is previously registered for each of tools, and a tool which does not interfere with a workpiece can be automatically selected from a specified file, thereby resulting in improved operability.

Unexamined Japanese Patent Publn. No. Hei-3(1991)-294146 discloses a system in which elements, such as a machining direction, an area to be machined, and shape, are used for a rule which automatically decides the type of machining, a tool to be used, and the extent of machining. A tool is selected from among tools held by the system by comparing an included angle with a finishing angle.

Unexamined Japanese Patent Publn. No. Hei-4(1992)-54506 discloses a numerical control data preparation system which divides the extent of machining using previously registered tool data of tools. In this system, a machining step suitable for each of tools is decided by using a registered tool in preference to other tools.

Unexamined Japanese Patent Publn. No. Hei-4(1992)-75850 discloses an interactive screen for selecting a tool to be used. This screen provides several steps, that is, steps of inputting of a tool having a desired diameter, retrieval within a magazine, retrieval within a file, and searching for an alternative tool.

Unexamined Japanese Patent Publn. No. Hei-4(1992)-331038 discloses a system which calculates the amount of a workpiece to be removed by comparing an intended cutting shape with the shape of a workpiece being machined, and selects a cutting tool from a tool master file which corresponds to the amount of a workpiece to be removed.

Unexamined Japanese Patent Publn. No. Hei-5(1993)-208340 discloses a method comprising the steps of:

preparing a table which sets judgement criteria for selecting a tool;

selecting tools on the basis of the criteria;

displaying tool data on a CRT according to a result of the selection of the tools, in the order precedence in which the tools are judged as being suitable for machining; and specifying the tool which an operator judged as most suitable.

Unexamined Japanese Patent Publn. No. Hei-5(1993)-228786 discloses a system for selecting a tool satisfying two conditions, i.e., the outer circumferential diameter of a cutting edge which is less than twice the radius of a concave portion of the minimum curvature radius (more preferably less than half the radius of the concave portion of the minimum curvature radius), and which is capable of passing through a narrow portion having the minimum width.

Unexamined Japanese Patent Publn. No. Hei-5(1993)-277892 discloses a method of integrating a plurality of tools for use in boring processes into one unit. According to this method, boring steps are compared with each other with respect to the diameter and depth of boring, and it is judged whether or not the tools are integrated into one unit.

Unexamined Japanese Patent Publn. No. Hei-1(1989)-234135 discloses a method comprising the steps of:

storing a subroutine which decides available corresponding machining data from among a machine tool database, general boundary condition data on specific characteristics of machining tools, the properties of a workpiece, the characteristics of a cutting tool, a machining method, and the machining of a workpiece, and storage data including data on the grade of bit materials suitable for use with a specific machine tool and the shapes of bits;

artificially inputting information about the material of the workpiece, the type of cutting tool, and the desired surface quality of the workpiece;

deciding the suitability of a cutting bit material, the suitability of the size of the cutting tool, and the suitability of the combination of sets of machining data with respect to the workpiece material, using the subroutine; and controlling the machine tool in accordance with an output display of the machining data and one set of a group of display data.

Unexamined Japanese Patent Publn. No. Hei-3(1990)-251907 discloses a grooving method which selects a grooving tool by means of finishing symbols and the recognition of a groove.

Unexamined Japanese Patent Publn. No. Hei-2(1990)-167647 discloses a system for deciding the order in which tools are used. In this system, proximity evaluating means rearranges the order of using the tools determined by first order deciding means in such a way that the amount of travel of a workpiece is minimized without changing the order, whereby the number of manufacturing preparation processes and manufacturing processes is reduced.

Unexamined Japanese Patent Publn. No. Sho-62(1987)-57852 discloses the technique of deciding a machining order discloses a method which decides a machining order on the basis of machining precision data in such a way that machining which requires a high degree of precision is carried out last.

Unexamined Japanese Patent Publn. No. Hei-2(1990)-139158 discloses a machining method deciding system for use in the preparation of a numerical control function. This system recognizes an external area to be shaped and an area to be bored on the basis of the input shapes of materials and parts. The system automatically divides each area to be bored into a forward machining area to be forwardly machined and a reverse machining area to be reversely machined at the optimum points, based on the shape of the area to be machined.

Unexamined Japanese Patent Publn. No. Hei-3(1991)-166039 discloses a system which extracts an area to be machined from among areas to be bored on the basis of their shape element data, and which automatically decides the type of process to be used for machining a characteristic area and the extent of machining for each type of process.

Unexamined Japanese Patent Publn. No. Hei-5(1993)-119821 discloses a system which stores data on a plurality of pre-registered machining processes and a plurality of procedures corresponding to the machining processes. The system decides a tool to be used and machining conditions by specification of machining processes and procedures.

Unexamined Japanese Patent Publn. No. Hei-5(1993)-146943 discloses a system for setting the order in which machining processes are carried out by specifying a tool code.

Unexamined Japanese Patent Publn. No. Hei-3(1991)-179509 discloses a system which separates an area to be shaped into areas corresponding to one machining process or a plurality of machining processes, using tool information which includes at least angles of insertion of tools into a workpiece. Numerical control information is prepared on the basis of the area corresponding to the machining process.

As regards a system which allows for order of tools after the order of machining has been decided, Unexamined Japanese Patent Publn. Nos. Sho-61(1986)-251906 and 251907 disclose systems which allows for the order of tools after the order of machining operations has been changed for specific reasons.

Another example of the system that allows for the order of tools after the machining order has been decided is disclosed in Unexamined Japanese Patent Publn. No. Sho-61(1986)-251907. This publication discloses a system which allows for the order of tools after the order of machining operations has been changed for specific reasons.

Unexamined Japanese Patent Publn. No. Hei-3(1991)-184740 discloses a system which extracts shape elements for which grooving is designated, and which automatically decides the type and order of processes and the extent of machining needed when grooving is carried out on the basis of the shape of a groove and the characteristics of adjacent shape elements.

Unexamined Japanese Patent Publn. No. Sho-62(1987)-251046 discloses a system, wherein the order of machining operations reflects the result of a comparison between an efficiency allowing for the order of tools and an efficiency without consideration of the order of tools.

Unexamined Japanese Patent Publn. No. Sho-58(1983)-82646 discloses the technique of determining machining conditions which stores cutting conditions such as a cutting speed and a feed rate in the form of a numerical table, and which decides optimum cutting conditions by comparing the numerical table with input data such as the material and shape of a workpiece.

Unexamined Japanese Patent Publn. No. Sho-58(1983)-126039 discloses a system which displays a machined surface roughness menu and decides machining conditions based on the result of the selection of items in the menu.

Unexamined Japanese Patent Publn. No. Hei-2(1990)-15904 discloses a machine tool which automatically machines a workpiece at appropriate rotation and biting speeds by extracting data from storage means, which holds rotating and biting speed data, using machining bit selecting means and workpiece specifying means, and by controlling a motor on the basis of the thus extracted data.

Unexamined Japanese Patent Publn. No. Hei-2(1990)-172653 discloses a cutting condition decision system for use with a numeric control information preparing apparatus. The system automatically changes the amount of a workpiece to be removed in accordance with a coefficient for changing the amount of a workpiece to be removed which was obtained from the diameter and thickness of material. Numerical control information for rough cutting purposes is prepared by use of the changed amount of a workpiece to be removed. As a result, the amount of a workpiece to be removed can be automatically changed according to material and a shape to be machined.

Unexamined Japanese Patent Publn. No. Hei-3(1991)-256645 discloses an NC automatic programming system. When defining boring, the system prepares a table which holds coefficients used for deciding machining conditions for each of materials to be machined, types of hole, and diameters of tools. Defined hole shapes are previously registered and stored. When one of registered hole shapes is selected, coefficients, cutting conditions, and a feed rate relevant to the cutting conditions are read from the table on the basis of the type of hole and the diameter of a tool. Machining conditions are then set based on these coefficients, cutting conditions, and the feed rate.

Unexamined Japanese Patent Publn. No. Hei-4(1992)-310347 discloses a system which holds a machining condition table, a tool table, an end mill coefficient table, and a table of feeding coefficients which correspond to a workpiece cutting rate and the diameter of an end mill. Of an arbitrary group of input data items consisting of tool IDs, cutting widths, scallop heights, and cutting depths, a variety of storage data corresponding to input data are used for obtaining non-input data. A feed rate and the number of rotations of the main spindle are obtained, and the thus obtained results are displayed.

Unexamined Japanese Patent Publn. No. Hei-5(1993)-146944 discloses a cutting allowance decision method. According to this method, the optimum number of rotations of a spindle and the maximum depth of cut are calculated for an area having the minimum diameter. The diameter is sequentially increased by only the depth of cut, and the optimum number of rotations of the main spindle corresponding to the increased bore is also sequentially obtained. These operations are repeated until the diameter becomes maximum, whereby a cutting allowance is determined.

Unexamined Japanese Patent Publn. No. Hei-5(1993)-245739 discloses a system which separates a machining allowance of a workpiece into several levels of the amount to be removed. Of combinations of the preset number of rotations of a main spindle and a feed rate, the optimum combination is displayed for each cutting operation depending on a cutting tool to be used and the amount to be removed.

Unexamined Japanese Patent Publn. No. Hei-5(1993)-277892 discloses a system which reads and decides a cutting condition table on the basis of diameter and length.

Unexamined Japanese Patent Publn. NO. Hei-6(1994)-39677 discloses a system which decides the feeding of a tool in such a way that a machining load becomes always constant corresponding to the shape of material which is continuously changing throughout the course of machining.

As regards the technique of deciding a tool path, Unexamined Japanese Patent Publn. No. Sho-61(1986)-250706 discloses a system provided with a shape input section and a computing section. The shape input section distinguishes a line from a circular arc, and holds specifications about a starting point and an endpoint for the line as well as specifications about the circular arc. For a certain shape without definite interrelationship with an adjacent line or circular arc, the computing section regards the shape as being in contact with the line or circular arc, and also regards a tool as advancing solely in a forward direction at the point of contact between the shape and the line or circular arc. In this way, the computing section automatically calculates required tool path information.

Unexamined Japanese Patent Publn. No. Sho-62(1987)-115504 discloses a three-dimensional machining system. This system comprises a database holding information about the shape of a workpiece to be machined and machining information, or a database holding models to be presented in the form of a BEZIE curved surface. It also comprises an optimum locus determination unit which determines the optimum machining locus of a machining tool on the workpiece based on the foregoing information, and a teaching unit which determines a variety of control parameter of the machining tool on the basis of the locus determined by the optimum locus determination unit or the locus of the tool obtained by calculating the shortest distance between two points on the BEZIE curve defined as a result of approximating the BEZIE curved surface with a polyhedron. The system further comprises a control unit which controls the machining tool using the data of the teaching unit.

Unexamined Japanese Patent Publn. No. Sho-62(1987)-221004 discloses a two-dimensional tool path locus generating method. This method comprises the steps of drawing a shape to be machined in the form of a line;

generating and storing an offset line suitable for a contouring tool which contours a workpiece along the shape to be machined;

adding a first identification mark to pixels which form the offset line;

adding a second identification mark to pixels forming a peak and a single line on the offset line;

counting the number of pixels which a scanning line crosses when the shape to be machined is scanned in a certain direction;

identifying the pixels as being located within an area to be machined when a resultant count is odd and as being located outside the area to be machined when the count is even;

identifying the area where the count of the pixels becomes odd as the area to be machined; and drawing a two-dimensional locus in one stroke based on the amount of offset and overlap of a machining tool which machines the area to be machined other than the contour.

Unexamined Japanese Patent Publn. No. Sho-63(1988)-24305 discloses a tool path data preparation method. This method comprises the steps of:

converting data on surfaces to be machined, which consist of shape model data, into data on a plurality of tangential planes forming a triangle;

preparing a table which defines a correspondence between a given preset area map and the tangential plane data;

obtaining predetermined tangential plane data from the table and the area map that includes the area occupied by a tool holder for holding tools;

checking interference between the tool holder and the tangential plane data; and preparing and correcting tool path data in such a way that the tool holder avoids the tangential planes which may interfere with the tool holder.

Unexamined Japanese Patent Publn. No. Sho-63(1988)-24306 discloses a tool path data preparing method. This method comprises the steps of:

converting data on surfaces to be machined, which consist of shape model data, into data on a plurality of tangential planes forming a triangle;

classifying the tangential plane data into a plurality of divisions according to a preset two-dimensional area map;

obtaining predetermined tangential plane data from the divisions that include a machining section; and preparing tool path data in such a way as to prevent a tool from interfering with the tangential planes.

The same publication also discloses the determining of a work surface machining path. Based on efficiency and accuracy, it is decided whether the surface of a workpiece is planed by moving the tool in only one direction, moving it back and forth, or moving it in one stroke. Further, a starting point and an endpoint for the machining path are also decided on the basis of efficiency and accuracy.

Unexamined Japanese Patent Publn. No. Hei-2(1990)-30458 discloses a system that determines an area which a grooving tool can groove into a desired finished shape and defines a tool path suitable for grooving that area.

Unexamined Japanese Patent Publn. No. Sho-62(1987)-107305 discloses a numerically controlled system with a fixed composite cycle function which automatically defines a cyclic travel path of a tool for rough cutting a workpiece until the workpiece assumes a finished shape on the basis of finishing shape data of the workpiece and cut depth data which decide the depth of cut into the workpiece made by a tool at a certain height. This system is further provided with included angle correcting means which corrects data for each block of the finishing shape data corresponding to included angle input data which represents finishing shape data and an included angle of a tool. The finishing shape data corrected by the included angle correcting means and the cut depth data are used for defining the optimum travel path.

Unexamined Japanese Patent Publn. No. Hei-4(1992)-85605 discloses a system which inputs a tolerance for each shape element, or each group of shape elements, forming a shape to be machined when a finished shape is input. Machining path information is prepared so as to prevent the dimension of a workpiece obtained as a result of machining from exceeding the tolerance.

Unexamined Japanese Patent Publn. No. Hei-5(1993)-228786 discloses a system for preparing a tool path which prevents the occurrence of interference of a tool utilizing the diameter of a selected tool and CAD data.

Unexamined Japanese Patent Publn. No. Hei-5(1993)-329744 discloses a system which calculates a tool path for an NC machine based on machining shape data and machining step data.

As regards the technique of deciding a tool path allowing for the shape of a tool, Unexamined Japanese Patent Publn. No. Sho-62(1987)-15607 discloses a system which automatically selects a corresponding amount of offset from a data file using a fitting tolerance name and specified dimensional data.

Unexamined Japanese Patent Publn. No. Sho-63(1988)-6605 discloses a system which checks whether or not a tool to be used interferes with surroundings when offset processing is carried out.

Unexamined Japanese Patent Publn. No. Hei-5(1993)-274021 discloses a machining system which machines a workpiece in a numerically controlled manner using a machine tool by:

receiving tool offset shape data which are delivered from tool offset shape data preparation means and are divided into segments for each machining step;

temporarily storing the thus received tool offset shape data into buffer memory;

preparing tool path data from the tool offset data and a specified tool travel path;

preparing an NC program suitable for a numerically controlled machine tool to be used from the tool path data, and specified cutting conditions using a post processor; and converting the NC program sequentially transferred from the post processor into an operation instruction by means of a numerical control section.

As regards the technique of defining a cyclic machining path using only a final contour input, Examined Japanese Patent Publn. No. Sho-52(1977)-35158 discloses a system which automatically defines a repeated rough cutting path when the shapes of material and products are input.

Unexamined Japanese Patent Publn. No. Hei-5(1993)-80829 discloses a cutting path preparation system. By virtue of a cutting path prepared by this system, the shape of material is shifted in a cutting direction by only the depth of cut which is one of a variety of cutting conditions. If the shape of the material and the shape of a workpiece cross each other, the extent of cutting is divided at the intersection between the shapes of the material and the workpiece. If the thus divided extent of cutting in which the shape of the shifted material resides within the shape of the workpiece, a cutting path is defined in which the material is cut into the shape of the workpiece. However, if the shape of the shifted material resides outside the shape of the workpiece, another cutting path is defined in which the material is sequentially machined by the foregoing depth of cut.

As regards a cyclic machining path preparing method, Unexamined Japanese Patent Publn. No. Hei-5(1993)-146944 discloses a cutting allowance decision method. According to this method, the optimum number of rotations of a spindle and the maximum depth of cut are calculated for an area having the minimum diameter. The diameter is sequentially increased by only the depth of cut, and the optimum number of rotations of the main spindle corresponding to the increased bore is also sequentially obtained. These operations are repeated until the diameter becomes maximum, whereby a cutting allowance is determined.

As regards the technique of determining the setting, division, and machining of an area, Unexamined Japanese Patent Publn. Nos. Sho-60(1985)-12752 and 17953 disclose systems which machine an outline curve and an area (a projection) sandwiched between at least two closed curves within the outline curve. Two more curves are defined while being shifted from the closed two curves by only the amount of offset of a tool diameter. The remaining area of the projection other than an intersection between the defined two curves is continuously machined (if the tool enter the intersection, another projection will be excessively machined).

Unexamined Japanese Patent Publn. No. Sho-61(1986)-178148 discloses a system which automatically determines the extent of machining for each of different machining processes when data on the shapes of workpieces and materials are input.

Unexamined Japanese Patent Publn. No. Sho-62(1987)-19909 discloses a system which prepares a tool path for each of areas to be machined which are broadly divided into PG1 and PG2.

Unexamined Japanese Patent Publn. No. Sho-62(1987)-140741 discloses an automatic machining tool which divides an area to be machined depending on each of machining methods through interactive and automatic processing of work design data on an output screen. The automatic machining tool is provided with reference data memory which prepares criteria for judging and setting the division of the area to be machined; a stepped hole machining area determination section which determines a stepped hole using the machining setting data; a pocket machining area determination section which determines a pocket using the machining setting data; a recessed area dividing section; a division judgement section which provides the stepped hole area with an identification code if the stepped hole area further includes an area to be subjected to another machining process such as center machining or reaming; a flag processing section; a plurality of shape element determination sections which determine the area to be machined in stages according to the shape and kind required by each machining method, on the basis of the judgement criteria applied to the area of the workpiece to be machined; and a plurality of shape element dividing sections which register the areas divided on the basis of the result of the judgement so as to correspond to preset standards.

Unexamined Japanese Patent Publn. No. Hei-3(1991)-156506 discloses a system which decides parting points in such a way that a first area to be machined and a second area to be machined become equal to each other using the overall area to be machined.

Unexamined Japanese Patent Publn. No. Hei-4(1992)-369006 discloses a machining system provided with determination means. This determination means automatically determines a process comprising the steps of:

- calculating the minimum inner diameter to be machined for one pre-registered boring tool or each of a plurality of pre-registered boring tools;
- determining whether or not the boring tool interferes with a workpiece when an area to be bored is machined; and
- using a drill or an end mill as the boring tool if the boring tool interferes with the workpiece, or machining the workpiece by dividing the area to be machined into one region or several regions on the basis of the diameter to be machined if the boring tool does not interfere with the workpiece.

Unexamined Japanese Patent Publn. No. Hei-5(1993)-80829 discloses a cutting path preparation system. By virtue of a cutting path prepared by this system, the shape of material is shifted in a cutting direction by only the depth of cut which is one of a variety of cutting conditions. If the shape of the material and the shape of a workpiece cross each other, the extent of cutting is divided at the intersection between the shapes of the material and the workpiece. If the thus divided extent of cutting in which the shape of the shifted material resides within the shape of the workpiece, a cutting path is defined in which the material is cut into the shape of the workpiece. However, if the shape of the shifted material resides outside the shape of the workpiece, another cutting path is defined in which the material is sequentially machined by the foregoing depth of cut.

Unexamined Japanese Patent Publn. No. Hei-5(1993)-104396 discloses a system which carries out the division of a workpiece and the machining of the workpiece using the volume to be removed.

Unexamined Japanese Patent Publn. No. Hei-1(1989)-234135 discloses a machine tool control method which is very comprehensive and covers the above described techniques. This method allows an inexperienced operator to carry out the optimum cutting operation by storing a database comprising machine tool data, workpiece data, cutting tool data and specific processing methods, and machining data in a data processor.

As well as the above described techniques, Unexamined Japanese Patent Publn. No. Hei-2(1990)-59252 discloses control means of a computer-controlled machine tool. The control means establishes operating conditions for the machine tool on the basis of input workpiece parameters and stored data, and a tool control unit is activated under the thus established operating conditions. As a result, the workpiece is evenly processed with accuracy without the need for experience.

Unexamined Japanese Patent Publn. No. Hei-3(1991)-46007 discloses an NC information preparation system. This system displays operating procedures in an interactive manner, as well as outputting the details of input data in the form of a list. In this way, it becomes possible for an operator to easily obtain highly reliable NC information.

Unexamined Japanese Patent Publn. No. Hei-3(1991)-60953 discloses a numerically controlled apparatus with a roughing volume. If a roughing step is necessary during the course of manufacturing a product from material, the apparatus automatically controls the roughing of a workpiece, thereby reducing machining time.

Unexamined Japanese Patent Publn. No. Hei-3(1991)-92245 discloses a method of preparing NC data for machining the side of a workpiece. The shape of the side of a workpiece to be roughed is prepared by deleting the shapes of cut into the finished shape of the side. NC data for roughing purposes are prepared by use of the shape of the side of the workpiece to be roughed. As a result, the amount of the inputting of the side shape and errors associated with the input operation are reduced, which in turn contributes to the significant reduction of the time required to input the side shapes.

Unexamined Japanese Patent Publn. No. Hei-3(1991)-161245 discloses a method of automatically determining the extent of turning. According to this method, as a consequence of inputting the finished shape of a workpiece and the shape of material which are used for turning operation, one or a plurality of areas of a workpiece which are to be used to chuck the workpiece until the finished shape of the workpiece is obtained, and areas to be turned during the chucking operations, are automatically determined by one operation or determined taking into account the use of means for determining the extent of machining.

Examined Japanese Patent Publn. No. Hei-3(1991)-51547 discloses a machining information preparation system. The system defines an area to be machined with respect to each plane to be machined, and provides the thus defined area with technical information such as graphic information, positional information, a size tolerance, and surface roughness. The thus defined area is arranged in each plane to be machined. Consequently, it becomes possible to immediately change machining information responsive to changes in product design.

Unexamined Japanese Patent Publn. No. Hei-4(1992)-352006 discloses a system provided with means for inputting information about the shape of a workpiece, dimensional information, and tolerance information. Work dimensions which meet tolerance are obtained on the basis of these information items, i.e., the information about the shape of the workpiece, the dimensional information, and the tolerance information.

Unexamined Japanese Patent Publn. No. Hei-6(1994)-4119 discloses a system which determines the optimum machining method. The method is determined by the steps of:

- automatically determining a target machining value which is a median of dimensions to be machined on the basis of dimensional tolerance and a coordinate value for each of points forming the shape of a workpiece to be contoured by a machine tool;
- preparing machining data; and
- determining the optimum machining method from the dimensional tolerance as a result of recognition of an area to be machined with high precision.

Unexamined Japanese Patent Publn. No. Hei-6(1994)-39677 discloses a system which stores a variety of data items, such as material data and tool data, in files.

Unexamined Japanese Patent Publn. No. Hei-3(1991)-3008 discloses a controlled expert system. This system is provided with: monitoring means for monitoring a target system by means of simple processing; transient verifying means which is activated only when the monitoring means has detected changes in the state of the target system, and which checks whether or not the changes are correct; transient information preparation means which is activated only when the verifying means has checked as the changes are correct, and which analyzes the changes and generates control information corresponding to a result of the analysis; and control means which respectively controls the various means.

As regards an automatic process design processing system for use in machining which was developed from a different viewpoint, Unexamined Japanese Patent Publn. No. Hei-2 (1990)-15949 discloses a process design processing system for use in machining. This system is provided with a machining mode determination section for determining constraint conditions (a machining mode) between areas to be machined, a reference plane determination section which determines a reference plane for machining from parts models, and a process planning and verification section. Efficient error-free process work design is implemented.

The above described conventional techniques have a lot of drawbacks despite their advantageous features. Hence, these techniques leave much to be improved upon in order to realize easy, rapid, and high-precision machining in a more productive manner.

The main drawback that encompasses a variety of the drawbacks associated with the foregoing conventional techniques is the lack of accurate determination of machining processes, machine tools, machining procedures, and machining conditions, using various items such as the shapes of material, shapes to be finished, the number of workpieces to be machined in one batch, and precision of machining, and data for each of these items.

With reference to a workpiece which is turned in an initial stage, the drawback will be more specifically described.

For example, the conventional techniques provided neither an inputting system which uses a patterned tabular form nor a system which enables tolerance symbols to be input together with tolerances in the same form. For these reasons, the conventional input system was complicated and needed input of form segments. Further, it was impossible for the conventional input system to input a variety of conditions such as machining methods/roughness of a finished surface associated with finishing symbols, the accuracy of forms, positional accuracy, specifications of screws, refining processing, surface treatment, keyways, cams, cylindrical outside planes/cylindrical outside polygons, gears, center holes, and machining processes. Thus, the conventional input system was inconvenient, and it was also impossible for the conventional input system to cope with the omission of an input using a work shape file and the automatic correction of an input of the shape of material.

Furthermore, it was impossible for the conventional system to select or set a variety of machining processes and methods, namely, a machining method based on finishing symbols/roughness of a finished surface, a machining process based on the accuracy of form and position, a machining process based on data on specifications of screws, a machining process based on refining data, a machining process on the basis of surface treatment data, an accurate machining method and process on the basis of input data on grooves, an accurate machining method and process on the basis of input data on keyways, a cam machining process on the basis of input data on cams, a machining process on the basis of input data on cylindrical outside planes/polygons, a machining process on the basis of input data on gears, automatic and specified inputs during the course of determination of a machining process, a machining process on the basis of the length of material and the length to be finished, a machining process on the basis of the shape of material, a process on the basis of an input of a center hole, chucking and centering operations on the basis of a ratio of the diameter to the length of material, and a working process on the basis of tolerance symbols and tolerances.

Conventionally, it was impossible to either select or set a machine tool most suitable for a workpiece, for reasons of the insufficient data on machine tool type. Moreover, the absence of data corresponding to the type of a machine tool made it impossible to select or set a machine tool responding to a process.

It was also impossible for the conventional techniques to carry out the selection of a specified input or automatic decision and the optimization of determination, the automatic determination of areas to be machined in such a way as to realize balanced time for machining both sides of a workpiece which is necessary to reduce the machining time, automatic separation of areas to be machined, and the selection of a tool or the shape of a workpiece or the determination of which to have the order of priority over the other.

Further, it was impossible for the conventional techniques to carry out automatic determination of machining procedures on the basis of a machining allowance, automatic determination of a machining sequence on the basis of shape and dimension, automatic determination of a machining sequence on the basis of the accuracy of shape and position, automatic determination of a machining sequence on the basis of a tolerance, automatic determination of a machining sequence on the basis of a finishing symbol/roughness of a finished surface, and automatic determination of a machining sequence on the basis of thermal refining and surface treatment.

With respect to the drawbacks relating to the selection of a tool, it was impossible to carry out a specified input for each process, the selection of a specified input and automatic determination for each process, the selection of a tool on the basis of productivity, and the selection of a tool to minimize the number of tools to be used.

With regard to the drawbacks associated with machining conditions, it was impossible to carry out selection and determination of machining conditions on the basis of a finishing symbol/roughness of a finished surface, designated input of a finishing allowance and machining conditions for each process, automatic determination of machining conditions, and selection of a designated input.

As to the tool path, it was impossible to carry out the determination of a tool path on the basis of the volume of a tool, the application of a variable machining allowance to roughing or finishing operation, the determination of a tool path capable of correcting warpage resulting from machining (for each of a machinery system, a tool system, and a workpiece system), the determination of a tool path on the basis of the strength of a workpiece, the selection and generation of a tool path on the basis of the shape of a machining allowance of material, and the selection of a tool path corresponding to variations in the shape of material.

With respect to the generation of data, it was impossible to carry out the reading of a tolerance from a file based on a tolerance symbol, the selection and determination of a machining method and machining conditions on the basis of a finishing symbol/roughness of a finished surface, the determination of a machining process on the basis of the accuracy of shape and position, the optimum determination of a machining allowance on the basis of an input of thermal refining, the setting of an accurate machining dimension on the basis of a surface treatment input, the determination of an accurate machining method and process on the basis of input data on grooves, and the determination of an accurate machining method and process on the basis of input data on keyways. Further, input data on cams, cylindrical outside planes/cylindrical outside polygons, and gears were not available in the prior art.

SUMMARY OF THE INVENTION

The present invention is conceived to solve the above mentioned drawbacks in the prior art. The present invention relates to a machining method which uses at least machine tool information, tool information, cutting condition information, material information, machining method symbol information, finishing symbol information, finishing allowance information, surface treatment information, information about thermal refining, and cost information. The machining method also employs a numerically controlled apparatus which carries out a series of operations required when a numerically controlled machine tool effects a machining operation using input graphics and process information, namely, the determination of machining procedures, the selection of a tool, the preparation of a workpiece and inspection programs, machining operation, and inspection.

A first object of the present invention is to obtain the machining method which further uses a numerical control unit capable of registering a variety of information files and of efficiently carrying out high-precision machining operations by deciding whether to measure material on the basis of input workpiece graphics data and whether to effect the measurement of the workpiece on the machine.

A second object of the present invention is to obtain a machining method which uses a numerical control unit capable of efficiently effecting high-precision machining operations by further judging the necessity for statistically processing material, judging whether or not a statistical processing review number has been achieved, the magnitude of variations in material, and the need for the repetition of machining of workpieces having the same shape.

A third object of the present invention is to obtain a machining method which uses a numerical control unit which reduces the number of errors associated with the registration of data by registering data to each of a variety of information files while judging a result of comparison between the data and specific data.

A fourth object of the present invention is to obtain a machining method which uses a numerical control unit capable of improving the efficiency of machining operations and the inputting of data by standardizing the inputting of data to a variety of information files.

A fifth object of the present invention is to obtain a machining method which uses a numerical control unit designed so as to make the quality of machining uniform even when data inherent to the user is input, by standardizing data of various kinds of information files and by converting the input data into a standard value.

A sixth object of the present invention is to obtain a machining method which uses a numerical control unit capable of effecting highly reliable machining operations by forming data of various kinds of tool information files from tool identification numbers, specifications of tools, and machine tool identification numbers.

A seventh object of the present invention is to obtain a machining method which uses a highly productive and reliable numerical control unit capable of calculating machining conditions on the basis of various costs in consideration of machining costs, and which is also capable of using the thus calculated machining conditions.

An eighth object of the present invention is to obtain a machining method which uses a numerical control unit capable of effecting highly reliable machining operations by interpolating discontinuous input data.

A ninth object of the present invention is to obtain a machining method which uses a numerical control unit capable of effecting highly reliable machining operations by determining machining specifications on the basis of the inputting of various types of accuracy used in drawings and symbols used for processing.

A tenth object of the present invention is to obtain a machining method which uses a numerical control unit capable of estimating the life of tools with high precision on the basis of materials of workpieces and tools.

An eleventh object of the present invention is to obtain a machining method which uses a highly reliable numerical control unit designed so as to reduce data input errors by simplifying the inputting of data in tabular form or by standardizing data input procedures.

A twelfth object of the present invention is to obtain a machining method which uses a numerical control unit capable of effecting highly reliable machining operations by automatically calculating the final shape and size and a finishing allowance from input data.

A thirteenth object of the present invention is to obtain a machining method which uses a numerical control unit capable of machining material into even a complicated shape in a highly reliable manner by identifying a pictorial pattern and pictorial space from input data.

A fourteenth object of the present invention is to obtain a machining method which uses a numerical control unit capable of efficiently effecting highly reliable machining operations, even if an operator is not highly skilled, by automatically deciding a machining process from input data.

A fifteenth object of the present invention is to obtain a machining method which uses a numerical control unit capable of efficiently effecting highly reliable machining operations.

A sixteenth object of the present invention is to obtain a machining method which uses a numerical control unit capable of effecting highly reliable machining operations by determining a residual machining process in consideration of the volume to be removed, the degree of surface treatment, and machining costs.

A seventeenth object of the present invention is to obtain a machining method which uses a numerical control unit capable of effecting highly reliable machining operations by selecting a machine tool from workpiece material data in the optimum way.

An eighteenth object of the present invention is to obtain a machining method which uses a numerical control unit capable of effecting highly reliable machining operations in a more productive way by determining a tool which satisfies given conditions on the basis of input data.

A nineteenth object of the present invention is to obtain a machining method which uses a numerical control unit capable of determining a highly productive machining process in consideration of variations in the form of material.

A twentieth object of the present invention is to obtain a machining method which uses a numerical control unit capable of effecting high-precision working operation by selecting a machining rate suitable for the kind of a machining operation on the basis of input data.

A twenty-first object of the present invention is to obtain a machining method which uses a numerical control unit capable of efficiently carrying out high-precision machining operations by determining correction and reworking conditions on the basis of a result of measurement.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has finished undergoing another process, the identification of a pattern, the decision with regard to a machining process, the decision with regard to the necessity for measuring material, the decision as to whether or not the generation of a per-process machine program and on-machine measurement are possible if the measurement of material is judged to be unnecessary, and processes such as the machining of a workpiece in each process, the on-machine measurement, correction, reworking of a workpiece if the workpiece is defective, and the measurement of the workpiece after it has been reworked if the on-machine measurement is judged to be possible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the generation of a per-process machine program and on-machine measurement are possible if the measurement of material is judged to be unnecessary, and processes such as the machining of a workpiece in each process, off-machine measurement, correction, reworking of a workpiece if the workpiece is defective, and the measurement of the workpiece after it has been reworked if the on-machine measurement is judged to be impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not on-machine measurement is possible if the statistical processing of material is judged to be unnecessary, and processes such as the generation of a machine program having a per-process material measurement function, machining of a workpiece in each process, on-machine measurement, correction, reworking of a workpiece if the workpiece is defective, and the measurement of the workpiece after it has been reworked if the on-machine measurement is judged to be possible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not on-machine measurement is possible if the statistical processing of material is judged to be unnecessary, and processes such as the generation of a machine program a per-process off-machine material measurement function, machining of a workpiece in each process, off-machine measurement, correction, reworking of a workpiece if the workpiece is defective, and the measurement of the workpiece after it has been reworked if the on-machine measurement is judged to be impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical measurement review number has been achieved if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are judged as to be outside the tolerances, and processes such as the generation of a machine program having a per-process material measurement function, the machining of a workpiece in each process, the on-machine measurement, correction, reworking of a workpiece if the workpiece is defective, and the measurement of the workpiece after it has been reworked if the on-machine measurement is judged to be possible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are judged as to be outside the tolerances, and processes the generation of a machine program having a per-process off-machine material measurement function, machining of a workpiece in each process, the off-machine measurement, correction, reworking of a workpiece if the workpiece is defective, and the measurement of the workpiece after it has been reworked if the on-machine measurement is judged to be impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are within the tolerances, the decision as to whether or not a workpiece having the same shape is repeatedly machined if the on-machine measurement is judged to be possible, and processes such as the generation of a machine program having a per-process statistical material processing function and an on-machine measurement function, machining of a workpiece in each process, the on-machine measurement, correction, reworking of a workpiece if the workpiece is defective, and the measurement of the workpiece after it has been reworked if the workpiece having the same shape is judged as not to be repeatedly machined.

In a machining method using a numerical control unit according to the present invention, the following processes are carried out employing electronic calculators, which include a numerical control unit, a FA system, and a personal computer, a series of data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, a decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are within the tolerances, the decision as to whether or not a workpiece having the same shape is repeatedly machined if the on-machine measurement is judged to be possible, and processes such as the machining of a workpiece in each process, the on-machine measurement, correction, reworking of a workpiece if the workpiece is defective, and the measurement of the workpiece after it has been reworked if the workpiece having the same shape is judged to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data, variations in material fall within tolerances if the statistical processing review number has been reached, the decision as to whether or not on-machine measurement is possible if the results and variations are within the tolerances, the decision as to whether or not a workpiece having the same shape is repeatedly machined if the on-machine measurement is judged to be impossible, and processes such as the generation of a machine program having a per-process statistical material processing function and an off-machine measurement function, machining of a workpiece in each process, the off-machine measurement, correction, reworking of a workpiece if the workpiece is defective, and the measurement of the workpiece after it has been reworked if the workpiece having the same shape is judged not to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are within the tolerances, the decision as to whether or not a workpiece having the same shape is repeatedly machined if the on-machine measurement is judged to be impossible, and processes such as the machining of a workpiece in each process, off-machine measurement, correction, reworking of a workpiece if the workpiece is defective, and the measurement of the workpiece after it has been reworked if the workpiece having the same shape is judged to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing review number has not been reached, the decision as to whether or not a workpiece having the same shape is repeatedly machined if the on-machine measurement is judged to be possible, and processes such as the generation of a machine program having a per-process statistical material processing function and an on-machine measurement function, machining of a workpiece in each process, the on-machine measurement, correction, reworking of a workpiece if the workpiece is defective, and the measurement of the workpiece after it has been reworked if the workpiece having the same shape is judged not to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing number has not been reached, the decision as to whether or not a workpiece having the same shape is repeatedly machined if the on-machine measurement is judged to be possible, and processes such as the machining of a workpiece in each process, the on-machine measurement, correction, reworking of a workpiece if the workpiece is defective, and the measurement of the workpiece after it has been reworked if the workpiece having the same shape is judged to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing review number has not been reached, the decision as to whether or not a workpiece having the same shape is repeatedly machined if the on-machine measurement is judged to be impossible, and processes such as the generation of a machine program having a per-process statistical material processing function and an off-machine measurement function, machining of a workpiece in each process, the off-machine measurement, correction, reworking of a workpiece if the workpiece is defective, and the measurement of the workpiece after it has been reworked if the workpiece having the same shape is judged not to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing review number has not been reached, the decision as to whether or not a workpiece having the same shape is repeatedly machined if the on-machine measurement is judged to be impossible, and processes such as the machining of a workpiece in each process, the off-machine measurement, correction, reworking of a workpiece if the workpiece is defective, and the measurement of the workpiece after it has been reworked if the workpiece having the same shape is judged as repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the same shape is repeatedly machined if the on-machine measurement is judged to be possible, and processes such as the generation of a machine program having a per-process statistical material processing function and an on-machine measurement function, machining of a workpiece in each process, the on-machine measurement, correction, reworking of a workpiece if the workpiece is defective, and the measurement of the workpiece after it has been reworked if the workpiece having the same shape is judged not to be repeatedly machined.

In a machining method using a numerical control unit according to the present invention, the following processing is carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the same shape is repeatedly machined if the on-machine measurement is judged to be possible, and processes such as the machining of a workpiece in each process, the on-machine measurement, correction, reworking of a workpiece if the workpiece is defective, and the measurement of the workpiece after it has been reworked if the workpiece having the same shape is judged to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the same shape is repeatedly machined if the on-machine measurement is judged to be impossible, and processes such as the generation of a machine program having a per-process statistical material processing function and an off-machine measurement function, machining of a workpiece in each process, the off-machine measurement, correction, reworking of a workpiece if the workpiece is defective, and the measurement of the workpiece after it has been reworked if the workpiece having the same shape is judged not to be repeatedly machined.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, forming of a judgement as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the same shape is repeatedly machined if the on-machine measurement is judged to be impossible, and processes such as the machining of a workpiece in each process, off-machine measurement, correction, reworking of a workpiece if the workpiece is defective, and the measurement of the workpiece after it has been reworked if the workpiece having the same shape is judged to be repeatedly machined.

With respect to any one of the above mentioned methods, at least a variety of files are registered, and machining pattern data are checked against a registered file after the machining pattern data have been input. If it is impossible to process the data because of a discrepancy between the machining pattern input data and the registered file, a warning for the addition of a various kinds of files is provided to prompt the operator to carry out the re-registration of the data.

If another workpiece having a different pattern is selected after the workpieces having the same pattern have all been used, the workpiece is machined by determining a similarity between the patterns.

For the registration of a tool information file, there are procedures with respect to at least, the inputting of tool data, the processing of the tool data, and the registration of a tool information file. In the processing of the tool data, the following processing is carried out, namely, the discrimination of stationary and rotary tools, the classification of the rotary tools, the arrangement of the tools in order of diameter, the reading of tool angles, a reference tip point and a shank size, the determination of segments which are machined by the major cutting edge and segments which are machined by the minor cutting edge, the calculation of machining angles of the major and minor cutting edges, the determination, or filling out, of segments of roughing tools and finishing tools, the calculation of the function of a tool, and the recording of processing results into a storage section.

With regard to the inputting of the tool data, the stationary tools have at least the following input items; namely, a sequence number, a tool identification number, a shank identification number, a chip identification number, specifications of a breaker (the width of the breaker (at its tip), the width of the breaker (at its dedendum), the height of a breaker (at its tip), the height of the breaker (at its dedendum), and the angle of the breaker), the hand of the cutting edge (L/R), specifications for the major cutting edge (a clearance angle $\alpha_0$, a side rake $\gamma_f$, a back rake $\gamma_p$, a nose radius, and a cutting angle $\kappa 1$), specifications of a minor cutting edge (1) (an angle of the minor cutting edge $\kappa'_1$, and a clearance angle $\alpha\kappa'_1$) specifications of a minor cutting edge (2) (an angle of the minor cutting edge $\kappa'_2$, and a clearance angle $\alpha\kappa'_2$), specifications of a minor cutting edge (3) (a distance from the reference tip point which serves as the starting point: X and Z, an angle of the minor cutting edge $\kappa'_3$, a clearance angle $\alpha\kappa'_3$), the size of a shank (/ identification of a shank, radius/width, height), segments of XT/ZT (a segment of a tool attached in the direction of X and a segment of a tool attached in the direction of Z), a reference tip point, the length of projection from a tool holder, an angle of the projection from the tool holder, a mounting angle of the tool holder, the rigidity of a tool (the rigidity obtained when a load is imposed on the tool in the direction of X and the rigidity obtained when a load is imposed on the tool in the direction of Z), a tip clamping method, a depth of cutting limit (an automatic input and a manual input), a feeding limit, the maximum cut proof stress, the permissible limits of intermittent cutting (a cut proof stress, a threshold frequency, the maximum depth of cut, and the maximum feed), a side rake of a minor cutting edge ($\gamma_f \kappa'_1$, $\gamma_f \kappa'_2$, and $\gamma_f \kappa'_3$), a back rake of a minor cutting edge ($\gamma_p$ $\kappa'_1$, $\gamma_p$ $\kappa'_2$, and $\gamma_p$ $\kappa'_3$), the material of a tool, segments of roughing tools/finishing tools (R/F), and specifications for grooving tools (the widths of the grooving tools, and the depths of grooves made by the tools).

With regard to the inputting of the tool data, the stationary tools are registered by linking at least tool identification numbers to machine identification numbers.

With regard to the inputting of the tool data, the angle of a cutting edge is input at least with a plus or minus sign. On the assumption that the axis which extends from an intersection between the axis of a shank and the reference tip point along a line between the tip and the shank is set to an angle of 0-degrees, a cutting edge twisted in the counterclockwise direction with respect to the zero axis is designated with a plus sign, and a cutting edge twisted in the clockwise direction with respect to the zero axis is designated with a minus sign.

With regard to the inputting of the tool data, the stationary tools are input after having been divided into a segment of major cutting edges and a segment of minor cutting edges. Functional definitions and machining patterns are prepared using these input values.

With regard to the inputting of the tool data, the volume of a throw-away stationary tool is input for a segment of an area to be cut by the major cutting edge and for a segment of an area to be cut by the minor cutting edge on the basis of cutting limits (the maximum depth of cut and the minimum depth of cut) and feeding limits (the maximum feed and the minimum feed), using at least a cutting edge angle, the reference inscribed circle, an apex angle, a nose radius, the maximum feed factor, a clearance angle, and a clearance angle margin.

With regard to the inputting of the tool data, the permissible limit of intermittent cutting of the stationary tool specifies at least a cut proof stress, a threshold frequency, and the minimum depth of cut.

With regard to the inputting of the tool data, the tool has a conversion table for its material, and means for converting an ISO code into a manufacturer code, and vice versa. The table and the means complement non standardized codes.

Of the input tool data, a segment of an area to be cut by the major cutting edge is identified by at least the direction of attachment of the cutting edge in either the X or Z direction, the presence or absence of an input shank diameter, a cutting edge angle, a reference tip point, and the presence or absence of a recess diameter of a shank width. The areas to be cut by the major cutting edge are provided with segments related to a boring tool, a boring and end-face cutting tool, an internal diameter turning tool, an internal diameter turning and end-face cutting tool, an internal diameter turning tool or an end-face cutting tool, an external diameter grooving tool, an internal diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank.

Of the input tool data, the segment of an area to be cut by the minor cutting edge is identified by at least the direction of attachment of the cutting edge in either the X or Z direction, the presence or absence of an input shank diameter, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank.

Of the input tool data, the segment of an area to be cut by the major cutting edge and the segment of an area to be cut by the minor cutting edge are identified by at least dimensional conditions with the exception of configurational conditions of the shank, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank.

Of the input tool data, the segment of an area to be cut by the major cutting edge and the segment of an area to be cut by the minor cutting edge are identified by at least the direction of attachment of the cutting edges in either the X or Z direction, the presence or absence of an input shank diameter, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside diameter grooving tool, an inside diameter grooving tool, and an end-face grooving tool. Segment codes for the areas to be cut by the tools are defined as follows:

I—a boring tool
I & IF—a boring and end-face cutting tool
IG—an inside-diameter grooving tool
IH—an internal threading tool
E—a diameter turning tool
E & EF—a diameter turning and end-face cutting tool
EG—an outside-diameter grooving tool
EH—an external threading tool
F—an end-face cutting tool
FG—an end-face grooving tool
FH—an end-face threading tool Machining start and end angles corresponding to the segment of the area to be worked by a tool are calculated, and a result of the calculation is stored in the data processor.

If the tool is identified as a throw-away tip by the segment of an area to be worked and a tip code, the tool is further divided into a roughing tool and a finishing tool according to a nominal symbol of the throw-away tip. If the tool is not identified as a throw-away tip, the tool is further divided into a roughing tool and a finishing tool using input data, thereby completing the tool function.

If the input tool data relate to a rotary tool, any tools having F as the first symbol of the tool identification number are further divided into a face milling cutter and an end mill according to the diameter of the tool and the length of a cutting edge of the tool. The tools are arranged in ascending order for each classification according to the diameter of the tool. The thus classified tools are registered in the tool file.

With regard to the inputting of the tool data, data on drills of the rotary tool consist of at least sequence numbers, tool identification numbers, shank identification numbers, tip identification numbers, specifications for the diameters of tools, specifications for tips, the number of tooth, the directions of rotation, segments of tools in the X or Z direction (XT/ZT), reference tip points, the rigidity of tools, tip clamping methods, feeding limits, the maximum cut proof stress, the permissible limits of intermittent cutting, materials of tools, segments of roughing/finishing tools (R/F), and machine identification numbers.

With regard to the inputting of the tool data, data on reamers of the rotary tool consist of at least sequence numbers, tool identification numbers, shank identification numbers, tip identification numbers, specifications for the diameters of tools, the lengths of cutting edges of tools, a nominal length, specifications for tips, the number of teeth, the directions of rotation, segments of tools in the X or Z direction (XT/ZT), reference tip points, the rigidity of tools, tip clamping methods, feeding limits, the maximum cut proof stress, the permissible limits of intermittent cutting, materials of tools, segments of roughing/finishing tools (R/F), and machine identification numbers.

With regard to the inputting of the tool data, data on taps of the rotary tool consist of at least sequence numbers, tool identification numbers, shank identification numbers, tip identification numbers, specifications of the diameters of tools, the lengths of cutting edges of tools, a nominal length, specifications for tips, the number of teeth, the directions of rotation, segments of tools in the X or Z direction (XT/ZT), reference tip points, the rigidity of tools, tip clamping methods, feeding limits, the maximum cut proof stress, the permissible limits of intermittent cutting, the materials of tools, segments of roughing/finishing tools (R/F), and machine identification numbers.

With regard to the inputting of the tool data, data on end mills of the rotary tool consist of at least sequence numbers, tool identification numbers, shank identification numbers, tip identification numbers, specifications for the diameters of tools, the lengths of cutting edges of tools, a nominal length, specifications of tips, the number of teeth, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers.

With regard to the inputting of the tool data, data on side cutters of the rotary tool consist of at least sequence numbers, tool identification numbers, shank identification numbers, tip identification numbers, specifications for the diameters of tools, the widths of tools, the number of teeth, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers.

With regard to the inputting of the tool data, data on gear hobs of the rotary tool consist of at least sequence numbers, tool identification numbers, shank identification numbers, tip identification numbers, specifications for the diameters of tools, the widths of tools, the number of teeth, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, specifications for gear shaping tools, segments of roughing/finishing tools (R/F), and machine identification numbers.

With regard to the inputting of the tool data, data on grinding wheel for internal grinding purposes of the rotary tool consist of at least sequence numbers, tool identification numbers, shank identification numbers, tip identification numbers, specifications for the diameters of tools, the lengths of cutting edges of tools, a nominal length, specifications for tips, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers.

With regard to the inputting of the tool data, data on grinding wheels for external grinding purposes of the rotary tool consist of at least sequence numbers, tool identification numbers, shank identification numbers, tip identification numbers, specifications for the diameters of tools, the lengths of cutting edges of tools, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers.

Registered data of the machine tool information file comprises at least data relating to sequence numbers of machine tools, machining volume, machine identification numbers, machining method symbols, a machining process for each of machine tools, center hole supporting and machining processes, chucking and turning processes, a grinding process, segments of absolute values and increments, machinable dimensions, center-to-center distances, specifications for the tapering of a hole, permissible machining weights, specifications for the output and speed of the main spindle, segments of the main spindle for a workpiece and a tool, mechanical efficiency, the rigidity and allowable loads of the main spindle, the rigidity and allowable loads of a tailstock, specifications for gearshifts, specifications about replacement of tools, specifications for mechanical accuracy, segments of finish allowance volume, standard machine operation time, fixture replacement time, tool preparation time, workpiece replacement time, tool replacement time, a master relating to grinding machines, a master relating to drilling and tapping machines, a master relating to milling machines, a master relating to allowable sizes of fixtures, and data on operation and time of machine tools.

Data of the fixture file within the machine tool information file are classified into data on a turning operation, data on a milling operation, and data on a grinding operation. The data comprise at least sequence numbers, chucking volume, machine identification numbers, the maximum/minimum chucking dimensions, the number of chucking pawls, segments of equal/unequal intervals of the pawls, the stroke of pawls (on one side), segments of synchronous/asynchronous movement of pawls, a shift of the positions of pawls, the direction of a pawl which specifies the direction of shift of the pawl, a distance between the mechanical standard position and the pawl standard position, the widths of pawls, the heights of pawls, specifications for through-holes, segments of pawls by shape, size, and volume, the positions of pawls in a pressing method, pressing directions, and fixture identification numbers.

The data on a turning operation within the fixture file comprise at least sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications of through-holes, segments of pawls by shape, size, and volume, the positions of pawls in a pressing method, pressing directions, and fixture identification numbers.

The data on a milling operation within the fixture file comprise at least sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications of through-holes, segments of pawls by shape, size, and volume, the positions of pawls in a pressing method, pressing directions, and fixture identification numbers.

The data on a grinding operation in the fixture file comprises sequence numbers, chucking volume, machine identification numbers, the maximum/minimum chucking dimensions, and fixture identification numbers in the case where a cylindrical workpiece has its center supported at both ends thereof.

On the other hand, if a chucked workpiece is internal or external diameter turned, the data comprises sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications for through-holes, segments of pawls by shape, size, and volume, the positions of pawls in a pressing method, pressing directions, and fixture identification numbers.

Data relating to the cost information file comprises at least machine identification numbers, personnel costs, machine tool costs, running costs, and costs of tools.

Data of a cost information file comprise at least the cost for purchasing machine tools, initial costs, a variety of annual expenses, and working conditions (annual uptime, the presence or absence of working shifts, a working shift pattern, and a pattern of days off). Costs are obtained using an expression for calculating hourly expenses which is based on the file containing the above mentioned data.

Data of a finishing allowance information file is provided with a format capable of discriminating at least between an outer diameter and an inner diameter and between a workpiece including a refining allowance and a workpiece without a refining allowance. The format is arranged so as to assign a finishing allowance to the inside of a segment composed of combinations of diameters and lengths, and it is also capable of reading a grinding allowance per diameter. A finishing allowance of a rod material requires an end face and an outer diameter finishing allowance depending on the length of a finished product and a finished diameter.

In consideration of input items such as at least shapes of materials, finished shapes, and materials, data of a file related to a machining method which automatically determines a cutting path are prepared on the basis of determination data on the direction of removal with reference to a machining method having a proven track record for a particular machining operation, a ratio of diameter to length, an allowance in the X direction, an allowance in the Z direction, the direction of removal, data on the shapes of materials, and data on finished shapes.

Data of a file relating to the cutting condition information are arranged in such a way that a variety of items, i.e., a cut rate, the depth of cut, and a feed, are filed as data using at least the materials of workpieces and tools as keywords. The machining conditions can be read by use of the materials of the workpieces and tools and the diameters of the tools. The materials of the tools are displayed in compliance with ISO, and the materials of the tools that use original symbols of manufacturers and users are converted into an ISO display. Using fuzzy logic, cutting conditions are obtained by substituting a given numerical value of a sequence of points, from among specific numerical values of conditions, into an interpolation equation or an expression for calculating the life of a tool. Original workpiece and tool material symbols of manufacturers and users are converted into standard symbols using a conversion table.

Data of a surface treatment information file are made up of at least the JIS codes and variable dimensions. A procedure for processing the JIS codes and variable dimensions are obtained using input surface treatment symbols. Finished dimensions and process setting are processed using the thus obtained procedure and the dimensions.

Data of a thermally refining operation information file are designed in such a way that the details of heat treatment, the presence and absence of the designation of hardness, and material to be used are selected using at least heat treatment symbols as keywords. The setting of a process, erroneous input of the specification of hardness, the checking of an error in the used material, and the selection of machining conditions are carried out.

Data of a graphics information file are classified according to at least dimensional tolerance, the shape of a screw, and a pattern.

As to the dimensional tolerance, basic numerical values corresponding to tolerance symbols, dimensions, and tolerance grades are prepared as data of the file using data on basic tolerance differences (upper or lower deviations), basic IT tolerance, and differences in the grade of the IT tolerance. The tolerance is calculated from the basic numerical values that serve as a reference with respect to input tolerance symbols, input dimensions, and input tolerance grades of a section to be machined, using a tolerance difference calculation equation.

The data of the graphics information file are classified according to at least dimensional tolerance, the shape of a screw, and a pattern.

Data of a screw shape file comprise at least segments for the nominal designation of screws, nominal diameters of screws, pitches, grades, an upper dimension of an outer diameter, a lower dimension of the outer diameter, an upper dimension of an effective diameter, a lower dimension of the effective diameter, and the minimum root radius.

The data of the graphics information file are classified according to at least dimensional tolerance, the shape of a screw, and a pattern.

Data of the pre-formed hole file comprise at least nominal diameters of screws, pitches, the diameters of pre-formed holes, and the diameter of a chamfer of a screw.

The data of the graphics information file are classified according to at least dimensional tolerance, the shape of a screw, and a pattern.

A variety of items of data of a shape file are formed in compliance with at least a data input format. An input format of each data item is provided with a standardized pattern and a shape identification code.

Data of a groove shape file comprise at least the type of groove, specifications for the bottom of a groove, specifications for groove width, a finish of a groove end face, specifications for the removal of the corners of a groove, and specifications for the chamfering of a groove.

Data of a center hole shape file comprise at least an angle of a center hole, a nominal diameter of the center hole, a larger diameter of the center hole, the diameter of a chamfer, the diameter of a counterbore, the depth of a nominal diameter, the depth of a counterbore, the depth of a chamfer, and the radius from the center of a round.

Data of a keyway shape file comprise at least the segments of keyways, specifications for the widths of the keyways, the total lengths of the keyways, specifications for the depths of the keyways, the type of the keyway, specifications for cutters, and specifications for the reference positions of the keyways.

Data of a file relating to the shape and type of a keyway comprise at least the type of groove and specifications for cutters.

Data of a file relating to the shape of a key slot comprise at least segments of key slots, specifications for the widths of the key slots, the total lengths of the key slots, specifications for the depths of the key slots, the type of key slot, and specifications for the reference positions of the key slots.

Data of a file relating to the shape of a hole comprise at least specifications for the reference positions of holes, specifications for the holes, specifications for a countersink, specifications for the depths of the holes, the number of the holes, and specifications for the positions of the holes.

Data of a file relating to the shape of a tapped hole comprise at least the type of tapped holes, specifications for the reference positions of the tapped holes, specifications for the tapped holes, the number of the tapped holes, specifications for the positions of the tapped holes, specifications for countersinks, specifications for the depths of the tapped holes, and specifications for pre-formed holes.

Data of a file relating to the shape of an internal cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of an end cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of a grooved cylindrical cam comprise at least the type of cam, point numbers, specifications for the coordinates of the starting point, specifications for the coordinates of the end point, the dimension of the radius of a circular arc, the type of groove, and specifications for the depths of grooves.

Data of a file relating to the shape of a groove of a grooved cylindrical cam comprise the type of groove, specifications for the widths of grooves, and specifications for the depths of the grooves.

Data of a file relating to the shape of an external cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of an end-face grooved cam comprise at least the type of cam, point numbers, specifications for the coordinates of the starting point, specifications for the coordinates of the end point, specifications for circular arcs, the center positions of the circular arcs, the type of groove, specifications for cam grooves, the finishing of a groove surface, specifications of the depths of cam grooves, specifications for the removal of corners at the bottom of a groove, and specifications for chamfering the grooves.

Data of a file relating to the shape of grooves of an end-face grooved cam comprise at least the types of groove, specifications for cam grooves, the finish of groove surfaces, specifications for the depths of cam grooves, specifications for the removal of corners at the bottom of the groove, and specifications for the chamfering the groove corners.

Data of a file relating to the shape of a cylindrical outside plane/a cylindrical polygon comprise the type of plane, specifications for planes, and specifications for the depths of cylindrical outside planes.

Data of a file relating to the shape of an internal gear comprise at least the type of gear, specifications for gears, specifications for base tangent length, specifications for overpins, and finishing specifications.

Data of a file relating to the shape of an external gear comprise at least the type of gear, specifications for gears, specifications for base tangent length, specifications for overpins, and finishing specifications.

Data of a machining method symbol information file comprise at least machining method symbols, a machining method, and the extent of roughing.

Data of a finishing symbol information file comprise at least finishing symbols, symbols used for a drawing, and roughness.

Data of a material information file comprise at lest JIS codes, heat treatment symbols, tensile strength, hardness, and a specific cutting force.

Data of a positional and configurational accuracy information file comprise configurational and positional accuracy codes, the necessity or lack of necessity of a reference plane, and the designation of accuracy.

Data on constants used in the tool life equation are defined for each of segments classified according to at least the material of a workpiece and the material of a tool.

Data on the finished shape of a workpiece displayed according to the metric system comprise at least a workpiece specification input format which is included in a sequence 1 of a data input format in a tabular form. The data are arranged in such a way as to make it possible to input:

- workpiece identification numbers capable of using a variable block input system;
- workpiece material identification numbers which are used as keywords for automatically complementing material data read from a file into the shape of material; and
- the name of a workpiece, the total length of a workpiece, the total width of the workpiece when it is input for milling, the diameter of a rod material, the material of a workpiece, the hardness of a workpiece material, the presence or absence of the heat treatment of a workpiece, the weight of a workpiece material (per one workpiece), the dimensions of a workpiece material, a machining process which the workpiece has already undergone, specifications for the finish of a workpiece which is not included in an entry (a finishing symbol and finished surface roughness), the necessity or lack of necessity of measured data for each process, the designated number of workpieces to be machined, the number of finished workpieces, revision of data used when previously input data are changed, an implementor, date, and comments. The same characters as are described in drawings are directly used as input data.

The initial value of the sequence number is one. The next sequence number is automatically generated every time the inputting of one input line has been completed.

The input format of the material shape data is used for inputting at least a sequence number, a step number, a previous C/R chamfer (C/R and size), specifications for the coordinates of the starting point (diameter and length), specifications for the coordinates of the end point (diameter and length), the radius of a circular arc, a subsequent C/R chamfer (C/R and size), and specifications for a taper/an angle/an inclination (segments, type, and size) in tabular form.

The material shape data are input with respect to the left end surface of the material and the center line of the material which serve as the point of origin. The inputting of an upper half of the drawing starts from the point of origin in a counterclockwise direction with respect to the center line.

The finished shape data are input with respect to the left end surface of the material and the center line of the material which serve as the point of origin. The inputting of an upper half of the drawing starts from the point of origin in a counterclockwise direction with respect to the center line.

At least a stage number is automatically counted up when the material shape data are input, which makes the inputting of the stage number unnecessary. If the coordinates of the end point and the coordinates of the starting point match with each other, the coordinates of the next starting point will be automatically input in a complementary manner even when the inputting of them is omitted.

The itemized data, which were at least automatically counted up and input in a complementary manner when the material shape data were input, are displayed in a discernible way in the form of combinations of, for example, a reversed display and a crosshatched display, a reversed blue display and a crosshatched black display, displays in different colors, and ornamental characters.

The itemized data, which were at least automatically counted up and input in a complementary manner when the finished shape data were input, are displayed in a discernible way in the form of combinations of, for example, a reversed display and a crosshatched display, a reversed blue display and a crosshatched blue display, a reversed blue display and a reversed black display, displays in different colors, and ornamental characters.

If the automatic inputting of data, the automatic counting up of the stage number, and the inputting of the coordinates of the end point on the current stage are carried out at the time of inputting the data, the coordinates of the end point of the previous stage are automatically quoted for the coordinates of the starting point of the current stage. If the input coordinates of the starting point do not match with the coordinates of the end point of the previous stage, a stage will be automatically added, and items for diameter and length will be automatically complemented.

An increment of length is input together with a sign at the time of the inputting of the length. If length is input without the ± sign, the input is identified as the input of the absolute value.

In the inputting of the radius of a circular arc, a plus sign denotes that the circular arc starts from the coordinates of the staring point to the coordinates of the end point in a counterclockwise direction, whereas a minus sign denotes that the circular arc starts from the coordinates of the starting point to the coordinates of the end point in a clockwise direction.

A taper is designated by T, an angle is designated by A, and a slope is designated by S.

The type of taper is designated by four alphanumerics. The first two characters show the type of taper, and the following two characteristics show the size of the taper.

The sizes of a taper and a slope are input in the form of a series of digits including a decimal point. The digits to the left of the decimal point show a numerator, and the digits to the right of the decimal point show a denominator.

A data format for inputting finished shapes has at least the following items arranged in a tabular form, namely, a sequence number, a previous C/R chamfer (C/R and size), specifications for the coordinates of the starting point (diameter and length), specifications for the coordinates of the end point (diameter and length), the radius of a circular arc, a subsequent C/R chamfer (C/R and size), specifications for a taper/an angle/an inclination (segments, type, and size), tolerance symbols, difference between an upper dimension and a lower dimension, finishing symbols, the roughness of a finished surface, the accuracy of shape and position, specifications for screws, specifications for a thermal refining operation, and specifications for surface treatment.

In the inputting of data, a skip for skipping a data input is executed by use of a special key or a soft menu key set to skipping;

backspacing is carried out by use of a special key or a soft menu key set to backspacing;

quotation of data on an upper stage when the same data are used is carried out by use of a special key or a soft menu key set to quotation;

a machining method symbol is input while being added to a finishing symbol, and a decision as to whether or not machining is possible on the basis of the machining method symbol and the finishing symbol is made using a finishing symbol and a machining method symbol of a machining method symbol file;

configurational and positional accuracy data are input using at least three elements, that is, a symbol, a reference plane, and accuracy, and each of the elements is checked by verifying the elements against a configurational and positional accuracy file, whereby it is confirmed if the symbol is correct and if the reference plane is necessary;

a decision as to whether or not the inputting of a heat treatment symbol, hardness designation, and material to be used is correct, is carried out by checking them with a refining file data, and an alarm sounds if the inputting is correct;

the inputting of specifications extending over stages comprises the inputting of at least a reference stage, segments of the starting and end shoulders of a reference position, stages for which machining is designated, length and dimension with respect to the reference position, tolerance symbols, an upper deviation, and a lower deviation;

the inputting of grooving data comprises the inputting of at least groove numbers, a reference stage, segment (S/E) from the starting and end shoulders, stages for which grooving is designated, segments (S/E) of groove ends with reference to a specified position, specifications for dimensions with respect to the shoulders, the types of groove, specifications for the bottom of the groove, specifications for the widths of the grooves, the finishing of the starting-point side end face of the groove, the finishing of the end-point side end face of the groove, specifications for the removal of corners of the groove, and specifications for the chamfering of the groove;

the inputting of keyway data comprises the inputting of at least keyway numbers, a previous stage, a subsequent stage, segments of the keyways, specifications for the widths of the keyways, the total lengths of the keyways, specifications for the depths of the keyways, the type of keyway, specifications for cutters, and specifications for the reference position of the keyway;

the inputting of key slot data comprises the inputting of at least key slot numbers, a previous stage, a subsequent stage, segments of the key slots, specifications for the widths of the key slots, the total lengths of the key slots, specifications for the depths of the key slots, the type of key slot, specifications for cutters, and specifications for the reference position of the key slot;

the inputting of reamed hole data comprises the inputting of at least the order of machining, hole numbers, stages for which reaming is designated, the type of reamed hole, specifications for the reference position, specifications for the reamed holes, specifications for countersinks, specifications for the depths of the reamed holes, the number of the reamed holes, and specifications for the positions of the reamed holes;

the inputting of tapped hole data comprises the inputting of at least the order of screwing, tapped hole numbers, stages for which tapping is designated, the type of tapped hole, specifications for the reference position, specifications for the tapped holes, the number of the tapped holes, specifications for the positions of the tapped holes, tapped hole numbers, flute spacing angles, counterbores, specifications for countersinks, specifications for the depths of tapped holes, and specifications for pre-tapped holes;

the inputting of internal cam data comprises the inputting of at least cam numbers, stages for which machining is designated, specifications for the standards of internal cams, the types of internal cam, point numbers, specifications for the coordinates of a starting point, specifications for the coordinates of an end point, specifications for the radius of a circular arc, specifications for the finishing of a cam surface, and specifications for chamfering the internal cam, or the inputting of an angle of the center of the circular arc instead of the radius of the circular arc and the coordinates of the center of the circular arc specified by a distance from the circular arc to its center;

the inputting of end cam data comprises the inputting of at least cam numbers, stages for which machining is designated, specifications for end cams, the type of cam, point numbers, specifications for the coordinates of the starting point, specifications for the coordinates of the end point, specifications for the radius of a circular arc, specifications for the finishing of a cam surface, and specifications for chamfering the cam, or inputting of the radius of the circular arc, an angle of the center of the circular arc, and a curved surface of the circular arc specified using a dimension from the shoulder of the center of the circular arc;

the inputting of grooved cylindrical cam data comprises the inputting of at least cam numbers, stages for which machining is designated, specifications for the standards of cylindrical cams, the types of grooved cylindrical cam, point numbers, specifications for the coordinates of the starting point, specifications for the coordinates of the end point, specifications for the radius of a circular arc, the types of groove, specifications for the widths of the grooves, specifications for the depths of the grooves, specifications for the removal of corners of the cam, and specifications for chamfering the cam, or the inputting of the radius of the circular arc, an angle of the center of the circular arc, and the inputting of a curved surface of the circular arc specified by a dimension from the shoulder of the center of the circular arc;

the inputting of outer cam data comprises the inputting of at least cam numbers, stages for which machining is designated, specifications for the standards of outer cams, the type of the outer cam, point numbers, specifications for the coordinates of the starting point, specifications for the coordinates of the end point, specifications for the radius of a circular arc, specifications for the finish of a cam surface, specifications for the chamfering of a cam on the starting point side in a widthwise direction, and specifications for chamfering the cam on the end point side in the widthwise direction, or the inputting of the radius of the circular arc, an angle of the center of the circular arc, and a curved surface of an arbitrary circular arc specified by a dimension from the shoulder of the center of the circular arc;

the inputting of a grooved end cam comprises the inputting of at least cam numbers, stages for which machining is designated, the type of the grooved end cam, segments of the grooved end cams, point numbers, specifications for the coordinates of the starting point, specifications for the coordinates of the end point, specifications for the radius of a circular arc, specifications of the center of the circular radius, the types of groove, specifications for grooves of the cam, the finish of a grooved surface in which the grooves have a small diameter, the finish of a grooved surface in which the grooves have a large diameter, specifications for the depths of the grooves of the cam, specifications for the removal of corners at the bottom of the groove, and specifications for chamfering the grooves, or the specification of the center position of the circular arc comprises the specified inputting of a curved surface of an arbitrary circular arc using a distance from the radius center of the circular arc, an angle of the center of the circular arc with respect to the reference point, or the X and Y coordinates;

the inputting of regular polygon data comprises the inputting of at least plane numbers, specifications for the reference position, the type of plane, the number of planes, specifications for the planes, and specifications for the depths of cylindrical outside planes;

the inputting of internal gear data comprises the inputting of at least internal gear numbers, specifications for the reference position of the internal gear, the type of the internal gear, specifications for the internal gears, specifications for overpins, and specifications for the finishing of an internal gear, or the inputting of specifications for base tangent lengths for use in a specifying method which measures the thickness of teeth of a gear, tolerance symbols, an upper deviation, and a lower deviation; and the inputting of external gear data comprises the inputting of at least external gear numbers, specifications for the reference position, the type of gear, specifications for the external gears, specifications for base tangent length, and specifications for the finish of the external gears, or the inputting of specifications for overpins for use in a specifying method which measures the thickness of teeth of a gear.

The processing of a finished pattern is calculated from data which comprise at least a diameter, a length, a radius, a width, a depth, an angle, a nominal dimension of a screw, and tolerance symbols or tolerance (an upper deviation and a lower deviation). The shape and dimension of a workpiece to be machined are decided. If surface treatment is specified, data are read from a surface treatment data file, whereby the shape and dimension of the workpiece before being subjected to surface treatment are calculated.

In the processing of a finished shape of a screw, upper and lower dimensions of an external or internal diameter and upper and lower dimensions of an effective diameter of a female or male screw are read from a screw shape data file. Finished shape and dimension are obtained by averaging the thus read data.

In the graphical processing of a workpiece before having finished undergoing another process, a finishing allowance of each part is read from a finishing allowance data file on the basis of at least a finishing symbol of each part, finished surface roughness, and refining data, using diameter and length as keywords. The thus read finishing allowance is added to the final shape and dimension of the workpiece before undergoing surface treatment.

An external diameter, an internal diameter, an end face, and a groove are identified using at least information about the starting point and the end point. The direction of input data is calculated, and the sizes of the input data are compared with each other on the basis of the coordinates of the end and starting points, whereby signs of the data are determined. The reference of constituent line segments is represented by a line segment of X+ which serves as the reference line. A phase angle in a counterclockwise direction with respect to the reference line, that is, the line segment of X+, has a plus sign. A phase angle θ of the constituent line segments of the drawing is obtained by the following expression.

$$\theta=\tan^{-1}[\{(\text{coordinates of end point; }X)-(\text{coordinates of starting point; }X)\}/\{(\text{coordinates of end point; }Z)-(\text{coordinates of starting point; }Z)\}]-90°$$

The discrimination of a pictorial pattern and the discrimination of pictorial space are carried out by combination of the constituent line segments.

Pattern discrimination comprises at least the steps of:

judging whether or not the coordinates of the Z end point on a Z+ stage are the maximum values in a data sequence, and determining data up to the current stage as an internal diameter if the coordinates of the Z end point are the maximum values of a pattern;

judging whether or not the coordinates of the Z starting point on a Z− stage are the maximum values of the pattern if the coordinates of the Z end point have been judged as not being the maximum values of the pattern, and determining data following the current stage as an external diameter if the coordinates of the Z starting point have been judged to be the maximum values of the pattern;

judging whether the data sequence is Z+, X+, and Z± when the coordinates of the if the coordinates of the Z starting point on the Z− stage have been judged as not being the maximum values of the pattern, and judging whether or not the coordinates of the Z end point on the Z+ stage are the maximum values of the pattern if the data sequence is not Z+, X+, and Z±, and determining that the data on the X+ stage relate to an end face if the coordinates of the Z end point have been judged as not being the maximum values of the pattern;

determining that the data on the X+ stage relate to a Z+ side end face if the coordinates of the Z end point on the Z+ stage have been judged as being the maximum values;

judging whether or not the data sequence is Z−, X−, and Z± if the data sequence has been judged as not being Z+, Z+, and Z±, and judging whether or not the coordinates of the Z end point on the previous Z− stage are the minimum values of the pattern if the data sequence has been judged as being Z−, Z−, and Z±, and determining that the data on the X− stage relate to an end face;

determining that the data on the X− stage relate to a Z0 side end face if the coordinates of the Z end point on the previous Z− stage are the minimum values of the pattern;

judging whether or not the data sequence is X+, Z+, and X− if the data sequence has been judged as not being Z−, X−, and Z±, and judging whether or not data sequences before and after the current data sequence relate to grooves if the data sequence is X+, Z+, and X−;

identifying the extent of reversal of data as a groove by removing a difference in the size of reversed X data in the case of a multistage groove, and identifying similar multistage grooves in subsequent stages by replacing the X data with pictorial data of the multistage grooves;

determining the pattern as a one-stage groove having an inner diameter if the data sequence is not X+, Z+, and X−;

determining a groove as a multistage groove having an inner diameter if the data sequences before and after the current data sequence are judged as the groove;

judging whether or not the data sequence is X−, Z−, and X+ if the data sequence has been judged as not being X+, Z+, and X−, and judging whether or not the data sequences before and after the current data sequence relate to a groove if the data sequence is X−, Z−, and X+, and determining the groove as one-stage groove having an external diameter if the data sequences before and after the current data sequence do not relate to the groove;

determining the groove as a multistage groove having an external diameter if the data sequences before and after the current data sequence are judged as the groove;

judging whether or not the data sequence is Z−, X+, and Z+ if the data sequence is judged as not to be X−, Z−, and X+, and judging whether or not the data sequences before and after the current sequence relate to a groove if the data sequence is Z−, X+, and Z+, and determining the groove as one-stage groove of the Z+ side end face if the data sequences before and after the current data sequence do not relate to the groove;

recognizing pictorial space of the data sequence and identifying a multistage groove of the Z+ side end face if the data sequences before and after the current data sequence are judged as a groove;

judging whether or not the data sequence is Z+, X−, and Z− if the data sequence has been judged as not being Z−, X+, and Z+, and judging whether or not the data sequences before and after the current data sequence relate to a groove if the data sequence is judged as Z+, X−, and Z−, and determining the groove as one-stage groove on the Z− side end face if the data sequences before and after the current data sequence have been judged as not being the groove;

determining the groove as a multistage groove on the Z− side end face if the data sequences before and after the current data sequence are judged as the groove;

adding an identification label to each of analyzed data stages; and judging absence or presence of the remaining data if the data sequence has been judged as not being Z+, X−, and Z−, and deleting the data at the beginning of the analyzed data sequence if the remaining data exist, and reading the next data and incrementing that data by one stage, and repeating these operations until there are no remaining data.

A machining process is determined by identifying the final machining process using at least data on the discrimination of machines in one sequence, the discrimination of processes, the entire length, the diameter of material, materials to be machined, workpiece materials, heat treatment, the sizes of the workpiece materials, a process which material has finished undergoing, and the number of finished workpieces, or data on center holes, tolerance symbols, upper and lower deviations, finishing symbols, finished surface roughness, configurational and positional information, the accuracy of a screw, thermally refining symbols, hardness, specifications for surface treatment, grooves, keyways, key slots, bored keyways, holes, tapped holes, internal cams, end cams, grooved cylindrical cams, external cams, grooved end cams, cylindrical outside planes, cylindrical outside polygons, internal gears, and external gears.

The processing of the machining process is determined by at least the steps of:

determining the presence or absence of a process which material has finished undergoing;

determining the presence or absence of heat treatment of the material using heat treatment data if there is no process which the material has finished undergoing, and judging from an input or information of a machine master file whether one piece or a plurality of pieces of workpiece material are formed if the material is subjected to heat treatment;

judging whether or not the material has double center holes if it is judged that one piece of workpiece material is to be formed, and judging from input pictorial data, in view of the diameter and length of the material, whether or not the material can be chucked in a cantilever fashion if the workpiece material has a single center hole;

determining whether or not the size of the workpiece material>(the entire length of a workpiece+2×a finishing allowance);

setting a process of cutting the material one by one if the size of the workpiece material>(the entire length of a workpiece+2×a finishing allowance);

issuing an alarm if it is judged that the size of the workpiece material≦(the entire length of a workpiece+2×a finishing allowance);

comparing the capacity of a thermally refining furnace with the size of the workpiece material if a plurality of pieces of workpiece material are to be obtained;

issuing an alarm if there is no description of the size of the workpiece material;

judging whether or not the machine is a bar feeding machine if it is judged that (the capacity of the material thermal refining furnace)≧(the size of the workpiece material), and calculating the maximum value of dead-weight deflection (δmax) from the entire length of the material if the machine is judged as the bar feeding machine;

determining δmax≦k, and setting a process of forming a plurality of pieces of workpiece material if δmax≦k; issuing an alarm if δmax>k;

judging whether the machine is a bar feeding machine if the capacity of the thermally refining furnace is smaller than the size of the workpiece material, and determining Lc which satisfies the following three expressions if the machine is judged as not being the bar feeding machine, that is, $$Lc=(8\times E\times I\times \delta\max/W)^{1/3}+\text{jaws hold length},$$

$$Lc\geqq(\text{the entire length of a workpiece+a cutting allowance})\times N+\text{jaws hold length},$$

and $$Lc<(\text{the capacity of a material thermal refining furnace}),$$

where N is an integer and δmax is the maximum value of dead-weight deflection;

setting a cutting process for forming a plurality of pieces of workpiece material while the material is chucked in a cantilever fashion;

calculating δmax on the basis of the entire length of the material if the machine is judged to be a bar feeding machine;

judging whether or not δmax≦k, and calculating the length of the material to be cut by use of the following three expressions if δmax≦k, that is, $$(\text{capacity of material thermally refining furnace})\geqq\{\text{entire length of workpiece material+cutting allowance+(2×finishing allowance)}\}\times N+\text{jaws hold length},$$

$$Lb\geqq\{\text{entire length of a workpiece+cutting allowance+(2×finishing allowance)}\}\times N+\text{jaws hold length},$$

and $$Lb\geqq(\text{capacity of material thermally refining furnace}),$$

where Lb is the length of a workpiece when the material is cut into a plurality of pieces of workpiece material while being fed on the bar feeding machine, and setting a process of cutting the material into a plurality of pieces of workpiece material while being fed on the bar feeding machine;

issuing an alarm if it is judged as δmax>k, setting the material thermally refining process;

storing the process in which the material has finished undergoing processing;

determining the presence or absence of the heat treatment of material using the heat treatment data;

judging from an input or information of the machine master file whether one piece or a plurality of pieces of workpiece material are formed, and judging whether or not the workpiece material has double center holes if it is judged that one piece of workpiece material is to be formed, and judging from the input pictorial data and data on the height of a pawl of a fixture file and the diameter to be chucked whether or not the material can be chucked in a cantilever fashion if the workpiece material has a single center hole;

determining whether or not the size of the workpiece material≧(the entire length of a workpiece+2×a finishing allowance) if the material can be chucked in a cantilever fashion;

setting a process of cutting the material one by one if the size of the workpiece material≧(the entire length of a workpiece+2×a finishing allowance);

issuing an alarm if it is judged that the size of the workpiece material<(the entire length of the workpiece+2×a finishing allowance);

judging whether or not the machine is a bar feeding machine if it is judged that a plurality of pieces of workpiece material are to be obtained, and calculating δmax from the entire length of the material if the machine is judged to be the bar feeding machine;

determining δmax≧k, and setting a process of forming a plurality of pieces of workpiece material if δmax≦k;

issuing an alarm if δmax>k; and determining Lc, which is a length of the material to be cut while being chucked in a cantilever fashion, using the following two expressions on the basis of δmax≦k if the machine is judged as not to be the bar feeding machine, that is, $$Lc=(8\times E\times I\times \delta\max/w)^{1/3}+\text{jaws hold length},$$

and

Lc≧(the entire length of a workpiece+a cutting allowance)×N+jaws hold length, where N is an integer and w is a uniform load.

The processing of the process for cutting the material one by one comprises at least the steps of:

choosing all of machines which possess cutting processes from among machines which are registered as ones to be use for cutting in a machine tool file according to material and the diameter of the material;

calculating a per-unit tentative machining time and cost by reading preparation time, preparation cost, a cross-sectional area to be hourly machined depending on material, and machining cost from a data file which includes the number of pieces of material to be machined and the selected machines; and arranging the selected machines in order of precedence of cost and in order of precedence of per-unit machining time, and recording the thus determined order of the selected machines into a cutting process file.

The determination of the machining process comprises at least the steps of:

identifying the number of center holes;

judging whether or not the machining process includes a turning operation if workpiece material has a single center hole;

issuing a warning so that the material can be subjected to double center hole machining by inputting a tentative center hole pattern if the machining operation includes the turning operation;

determining a change of process from a single center hole machining process to a single center hole turning process if the machining process does not include the turning operation;

determining a change of process from a double center hole machining process to a double center hole supported machining process if the workpiece material is supported at its double center holes;

employing a chucked turning process if the workpiece material has no center holes;

judging, from the entire length, a finishing symbol, the roughness of a finished surface, and the position of the center, whether or not the current process is a single center hole supported turning process;

selecting all of machines which machine the center hole in another process from among machines which are registered as ones to be used in a single center hole machining process in a machine tool file according to the entire length of the machines and the diameter of material if the current process is the single center hole supported machining process, and reading preparation time, preparation costs, an hourly removal capacity, and machining costs from the file of the selected machines on the basis of the number of workpieces to be machined and the volume of the center hole to be removed, and calculating per-unit tentative machining time and tentative machining costs from the thus read data;

arranging the selected machines in order of precedence of cost and in order of precedence of per-unit machining time, and recording the thus arranged machines in the single center hole process file; and setting a process in which the center hole is formed in the workpiece material by turning while being chucked together with the execution of another machining operation if the current process is judged as not to be the single center hole supported machining process.

The processing of the single center hole supported turning process comprises at least the steps of:

choosing all of machines which machine the center hole in another process from among machines which are registered as ones to be used in a single center hole supported turning process in the machine tool file according to the entire length of the machines, the diameter of material, the number of workpieces to be machined, tolerance symbols, upper and lower deviations, finishing symbols, the roughness of a finished surface, configurational and positional accuracy, and the accuracy of a screw;

reading preparation time, preparation costs, an hourly removal capacity, and machining costs from the file of the selected machines on the basis of the number of workpieces to be machined and the volume of the material to be removed as a result of a turning operation, and calculating per-unit tentative machining time and tentative machining costs from the thus read data;

arranging the selected machines in order of precedence of cost and in order of precedence of per-unit machining time, and recording the thus arranged machines in a single center hole supported turning process file.

The selection of a machine for use in a double center hole machining process comprises at least the steps of:

judging from the entire length of a workpiece material, a finishing symbol, the roughness of a finished surface, and the position of the center hole whether or not the current process is the double center hole supported machining process;

checking the process with a file possessing data on the presence or absence of special specifications of the center hole if the current process is the double center hole supported machining process;

choosing all of machines which machine double center holes in another process from among machines which are registered as ones to be used in a standard double center hole machining process in the machine tool file if the center holes do not have any special specifications;

reading preparation time, preparation costs, an hourly removal capacity, and machining costs from the file of the selected machines on the basis of the number of workpieces to be machined and the volume of the material to be removed as a result of machining, and calculating per-unit tentative machining time and tentative machining costs from the thus read data;

arranging the selected machines in order of precedence of cost and in order of precedence of per-unit machining time, and recording the thus arranged machines in a double center hole drilling process file;

discriminating between the single center hole machining process and the chucked machining process if the current process is judged as not to be the double center hole supported machining process from the position of the center hole;

choosing all of machines which machine double center holes in another process from among machines which are registered as ones to be used in a special double center hole machining process in the machine tool file if the center holes are identified as having special specifications;

reading preparation time, preparation costs, an hourly removal capacity, and machining costs from the file of the selected machines on the basis of the number of workpieces to be machined and the volume of the material to be removed as a result of machining, and calculating per-unit tentative machining time and tentative machining costs from the thus read data; and arranging the selected machines in order of precedence of cost and in order of precedence of per-unit machining time, and recording the thus arranged machines in a special double center hole drilling process file.

The processing of the double center hole supported turning process comprises at least the steps of:

choosing all of machines which machine the center hole in another process from among machines which are registered as ones to be used in a double center hole supported turning process in the machine tool file according to the entire length of the machines, the diameter of material, the number of workpieces to be machined, tolerance symbols, upper and lower deviations, finishing symbols, the roughness of a finished surface, configurational and positional accuracy, and the accuracy of a screw;

reading preparation time, preparation costs, an hourly removal capacity, and machining costs from the file of the selected machines on the basis of the number of workpieces to be machined and the volume of the material to be removed as a result of a turning operation, and calculating per-unit tentative machining time and tentative machining costs from the thus read data;

arranging the selected machines in order of precedence of cost and in order of precedence of per-unit machining time, and recording the thus arranged machines in a double center hole supported turning process file.

The process of turning material while chucking it comprises at least the steps of:

choosing all of machines, which are registered as ones to be used in turning material while chucking it, in the machine tool file, according to the entire length of material, the diameter of the material, the number of workpieces to be formed from the material, tolerance symbols, upper and lower deviations, finishing symbols, the roughness of a finished surface, configurational and positional accuracy, and degrees of the accuracy of a screw;

calculating tentative machining time and cost per single workpiece on the basis of the number of workpieces to be produced and the volume to be removed as a result of turning, by reading preparation time, preparation cost, per-hour removing volume, machining costs, and the like, from the file of the selected machines;

calculating the volume to be removed which is used for determining an area to be machined, as well as the product of the volume to be removed and the averaged diameter of the material;

handling the product of the volume to be removed and the averaged diameter of the material as a coefficient which includes a time factor at the time of machining and is produced by obtaining an average radius between the radius of the material and the radius of the finished material in each stage, and by multiplying the volume to be removed in each stage by the average radius in each stage;

defining an area of the material between its maximum outside and minimum inside diameters, setting the maximum outside diameter and the minimum inside diameter on respective sides of the material in such a way to be equal to half the product of the volume to be removed and the average diameter, and taking either of the sides which resultantly has a larger product as a first side to be machined;

identifying whether or not the first side to be machined has a chucking allowance, and calculating tentative machining time and cost required to machine the workpiece material up to the coordinates representing the area that requires the maximum outside chucking diameter or up to the coordinates representing the area that requires the minimum inside chucking diameter, if the first side has a chucking allowance;

roughing half the material in the first machining step and the other half of the workpiece material in the second machining step, if the product of the volume to be removed and the average diameter with regard to the maximum outside diameter or the minimum inside diameter is twice or more as large as the product of the volume to be removed and the average diameter with regard to another outside diameter or the inside diameter;

finishing the workpiece material by one operation in the second machining step if it is judged from the finishing symbols and designation of the roughness of a finished surface that certain accuracy cannot be ensured by machining the workpiece material in several steps, or dividing the operation for finishing the workpiece material into several steps if the accuracy can be ensured, machining the area to be machined in the second machining step prior to the area to be machined in the first step irrespective of the result of the above processing procedures, if the area continued from the area to be machined in the first step will become a tapered portion having an acute cone angle or a screw thread and no chucking allowance will be available as a result of machining operation in the first step, and then machining the area to be machined in the first step;

calculating tentative machining time and cost required to machine the workpiece material up to the coordinates representing the opposite side of the workpiece material that has the maximum outside diameter in relation to the side of the workpiece material that is chucked, or tentative machining time and cost required to machine the workpiece material up to the coordinates representing the opposite side of the workpiece material that has the minimum inside diameter in relation to the side of the workpiece material that is chucked, if it is judged that no chucking allowance is available; and setting the machines in order according to cost and in order according to machining time, respectively, and record the prioritized machines in a file.

Processing carried out after it has been decided whether or not areas to be machined still remain comprises at least the steps of:

identifying whether or not there is a process for machining remaining areas on the basis of finishing symbols and the roughness of a finished surface;

identifying the presence or absence of a process file if there still remains an area to be machined;

calculating the volume to be machined for each remaining area to be machined, and the thus calculated volumes in descending order of size;

arranging a turning operation, a honing operation, a super finishing operation, and a variety of special finishing operations in descending order of degree of the roughness of a surface finished by each operation, and arranging the process, after these two elements, that is, the order of the size of the volume and the order of the degree of the roughness, have been combined together, in such a way that the priority is given to the finished surface roughness;

- identifying the extent to which the inputting of data to a process has been completed if it is judged that there is a process file, and continuing the processing in order of process file if designated data input with regard to all of the processes has already been completed; and
- calculating the volume to be removed for the remaining area to be machined, if data input with regard to the process has been partially finished.

A process for selecting a machine to be used in each process for machining a remaining area comprises at least the steps of:

- identifying whether or not there is a remaining process;
- selecting a machine to be used in machining the area which is used to be machined in a predetermined order from the input data, if there is a remaining process;
- calculating tentative machining time and cost per single workpiece material from the number of workpiece materials to be machined and the volume to be removed, by reading preparation time and cost, per-hour removing volume, and machining costs from the file related to the selected machines; and
- setting the machines in order according to cost and in order according to machining time per single workpiece material, respectively, and recording the prioritized machines in an n-th process file.

A final machining process is determined by identifying and quoting machining processes, utilizing input drawings, designated processes, a process file, a fixture file, a tool file, a cost file, a drawing file, and data items unarchived from these files.

In machining process determination processing for determining the selection of a machine to be used in a machining process, at least one of several requirements, that is, requirements for minimizing the number of machine tools, requirements for giving priority to machining cost, and requirements for making the availability factor uniform, is taken into consideration, and a machine tool is selected by adding requirements of a tool of a machine having a graphic processing volume to any one of the above requirements.

Procedures for determining a process comprises at least:

- identifying whether the priority is given to machining cost or machining time;
- reading minimum machining cost processes defined between the first to the n-th process from a file, which is prioritized according to machining cost, in a machining process file, if the priority is given to machining cost;
- reading minimum machining time processes defined between the first to the n-th process from a file, which is prioritized according to machining time, in the machining process file, if the priority is given to machining time;
- identifying whether or not an identical machine is chosen for the selected processes;
- identifying whether or not the processes can be grouped by chucking and machining directions if the identical machine is chosen, and grouping the processes only when the processes are included in the identical chucking or machining process;
- grouping the processes if tools having the identical machining function, tools having a similar function, and finishing symbols and finished surface roughness related to areas machined by these tools are less than the identical rank;
- separating the processes into different processes if thermal refining processing, roughing associated with another machine, and measurement are included between the processes of the selected machines;

- listing the processes that have been selected in the processing prior to the current processing, and determining and setting processes in order according to machining cost or machining time;
- obtaining a cutting rate ($V_{min}$) which minimizes cutting cost from the following expression if the priority is given to cost, and obtaining a cutting rate ($V_{pmax}$) which minimizes machining cost from the following expression $$V_{min}=S\{C_w/((1/n)-1)(C_w \cdot t_{tc}+C_t)\}^n$$

$$V_{pmax}S/\{((1/n)-1)t_{tc}\}^n;$$

and

- deciding a machining order according to a descending order of volume to be removed, a descending order of tolerance width, and an ascending order of finishing symbol.

A per-process machine program comprises the steps of:

- utilizing the machining drawing used in the previous machining process as a material drawing for the current process;
- identifying whether or not the direction of removing has been designated;
- determining the removing direction in the turning operation by evaluating the productivity in the direction of removing, which was calculated from a cross sectional area of a cutting allowance, the cutting allowance, a machining length ratio obtained from a machining length ratio of the length in the Z (axis) direction to the length in the X direction (in the direction of the end face) in combination with the maximum depth of cut, mechanical rigidity, and tool rigidity, using the machining time;
- retrieving a tool file using a graphic code obtained as a result of processing graphical input data, and searching for all tools that have a match with regard to graphical processing function codes;
- selecting and determining tools best suited to processing on the basis of the maximum and minimum productivity determined by the number of tools;
- retrieving fixtures of a machine tool file, which are input for each of the machine tools associated with the n-th process, from input drawings using the area to be chucked as a key; and
- selecting a fixture, which has the most approximate chucking diameter on each side to be machined, from the selected and aligned fixtures, and determining a fixture, which can be commonly used for machining all of the sides, as the best suited fixture.

A machine program for use in a cutting process, which uses the entire length and diameter of material and the size of workpiece material, comprises at least the steps of:

- subjecting the material to processing of a bar feeding machine if the material is a long material such as a polishing material and a rod material, and cutting the rod material into a single piece if the bar feeding machine is not registered in the program;
- cutting the rod material to a less than a predetermined value if the size of the workpiece material is in excess of the workpiece material;
- reading the diameter and entire length of the material, from a file relating to a finishing allowance used in turning the rod material, as variables; and reading a corresponding machine from a machine tool file, using data based on the entire and diameter of the material and the size of the workpiece material.

A machine program for use in a turning process uses data of a variety of files relating to; for example, a drawing of a workpiece before it has finished undergoing another process, which was calculated in the graphical processing of the workpiece before it has finished undergoing another process by utilization of, at least, input data with regard to a row material and a finish (a file relating to the shape of a workpiece while it undergoes an intermediate finishing process); machine tool information; tool information; cutting condition information; material information, machining method symbol information; finishing symbol information; finishing allowance information; surface treatment information; thermal refining information; and cost information.

A method of determining a removing direction in the turning process comprises at least:

retrieving temporal tools from a tool file, and reading tool conditions from the same file;

retrieving a universal roughing tool having the maximum tool rigidity, a universal roughing tool capable of producing the maximum depth of cut, a universal roughing tool having the maximum feed, and a tool having the minimum projection with respect to a tool holder from the tool file, and reading tool ID numbers, the tool rigidity, the maximum depth of cut, the maximum feed, and the projection of the tool from the tool holder;

reading specific cutting force from a material file using a workpiece material as a keyword;

adopting the interpolating method based on fuzzy logic;

calculating a ratio of the radial rigidity to the axial rigidity of the tool;

calculating the maximum cutting load using the following expression

Max. cutting load=Max. depth of cut×Max. feed×specific cutting force;

calculating the maximum load from the size of the tool shank and the projection of the tool from the tool holder, both being obtained from the tool file, and a variety of numerical values which have already been given, using the following expression, namely, $P_r=3\times E\times I\times\delta\max/L^3$, where δmax is the maximum allowable deflection;

comparing the maximum allowable load obtained from the tool rigidity with the maximum cutting load obtained from the product of the depth of cut, the feed, and the specific cutting force, and taking a smaller load as the allowable cutting load;

calculating the maximum allowable cutting load in each of the radial and axial directions, and obtaining a ratio between them;

reading the rigidity of a machine tool from a machine tool file, and obtaining a ratio of the radial rigidity to the axial rigidity of the machine tool in order to compare the volume of feeding material in the X direction (in the radial direction) to the volume of feeding material in the Z direction (in the axial direction) with regard to the machine tool;

reading data relating to the rigidity of the main spindle (the maximum allowable load), the maximum depth of cut, and the maximum feed from the machine tool file;

calculating the maximum cutting load from the specific cutting force corresponding to the workpiece material, using the following expression, namely, Max. cutting load=Max. depth of cut×Max. feed×specific cutting force;

calculating the maximum radial cutting load and the maximum axial cutting load respectively from the maximum depth of cut and the maximum feed, and comparing the thus obtained maximum radial and axial cutting loads with the maximum allowable value obtained from machine tool file, and then using a lower value as the maximum allowable load;

calculating a machine condition ratio from a ratio of the maximum radial allowable load to the maximum axial allowable load;

calculating the rigidity of a workpiece from the radial and axial rigidity of the workpiece using the following expression, namely, $$\text{Radial rigidity (deflection)}=P_r\times L^3/(3\times E\times I)$$

$$\text{Axial rigidity (torsion)}=32\times P_r\times L\times r^2/\pi d^4G;$$

comparing the radial rigidity with the axial rigidity (torsional rigidity) of the workpiece, and obtaining a ratio of radial deflection to radial deflection of the workpiece;

judging and determining the volume of the machine tool to cut the material in the X direction while feeding it in the Z direction, the volume of the machine tool to cut the material in the Z direction while feeding it in the X direction, and the maximum machining load;

determining the maximum allowable load condition and a feeding direction by combination of the maximum cutting load ratio of the tool, the rigidity ratio of the machine tool, and the rigidity ratio of the workpiece;

obtaining the temporary maximum depth of cut which is to be used in a cutting operation, by calculating the limit rigidity value from the tool material and an input material to be machined using the cutting rate and the feed obtained from the cutting condition file and the specific cutting force;

executing the processing and decision of the machining direction which beings with the decision of material;

deciding whether or not the material is a rod material based on the size of an input workpiece material, and calculating a machining allowance on each stage number if the material is a rod material, and calculating a sum of machining allowances on each side to be machined and the total sum of the machining allowances;

calculating a mean machining allowance obtained by dividing the total sum of cross sectional areas of the machining allowances on each of the sides to be machined by the length of cut in each direction on each side to be machined, and calculating the macroscopic number of times the material is cut by dividing the mean machining allowance by the maximum tentative depth of cut of the tentative tool, and calculating the length of the material to be machined in the Z direction from a product of the length of the material in the Z direction and the number of times the material is cut in the X direction;

calculating the mean machining allowance obtained by dividing the total sum of cross sectional areas of the machining allowances on each of the sides to be machined by the length of cut in each direction on each side to be machined, and calculating the macroscopic number of times the material is cut by dividing the mean machining allowance by the maximum tentative depth of cut of the tentative tool, and calculating the length of the material to be machined in the X direction from a product of the length of the material in the X direction and the number of times the material is cut in the Z direction;

deciding whether to feed the material in the X direction or in the Z direction on the basis of the length over which the material fed in the feeding direction and the number of times the material is cut;

dealing with the material as a material input if the material is not a rod material, and calculating a cutting allowance in each of the X and Z directions on each stage using data relating to the material and a finished pattern;

calculating the number of times the material is cut and the length of the material to be machined on each stage for each of the following machining ways, namely, feeding of the material in the X direction in which the material is cut in the Z (axial) direction while being fed in the −X (radial) direction, feeding of the material in the Z direction in which the material is cut in the X (radial) direction while being fed in the −Z direction (axial), and feeding of material in the X and Z directions in combination in which the material is cut in the Z (axial) direction while being fed in the −X (radial) direction in order to machine end faces and grooves, and the material is cut in the X (radial) direction while being fed in the −Z (axial) direction in order to machine the outside and inside diameters of the material;

boring and forming grooves in the internal periphery of the bore based on the assumption that the tip of the tool can enter so far as the center of the bore, if the bore is not pre-formed;

grooving the material while the tool is covered with a lid if the groove is to be formed perpendicular to the direction of the feeding of the material, and adding to the machining condition file the number of times the material is to be additionally grooved again and the length of the material to be grooved;

comparing the previously mentioned machining ways with each other with regard to the number of times the material is cut and the length over which the material is fed, and arranging them in order;

deciding whether or not the feeding of material in the X and Z directions in combination which qualitatively takes a much shorter machining time is best in terms of the number of times the material is cut and the machining length over which the material is fed;

deciding which the feeding of material in the X direction or in the Z direction is superior;

calculating tentative machining time;

reading operating time of the machine tool (the time required to position material so as to be quickly fed in the X direction, the time required to position material so as to be quickly fed in the Z direction, the speed for quickly feeding material in the X direction, and the speed for quickly feeding material in the Z direction) from the machine tool file;

calculating tentative positioning time, rapid traverseing time, and time for feeding material while machining it, for each of feeding directions using the following expressions Sum of positioning time=(positioning time)×2×(the number of times material is cut), Rapid traverse time=[{a length of material to be machined/(the number of times the material is cut×a rapid traverse rate)}+(positioning time)]×the number of times the material is cut Time for feeding material while cutting it=length of material to be machined/feed rate/min. during machining;

and comparing the thus obtained three pieces of tentative machining time with each other, and deciding the best machining way.

Selection of a tool for use in a turning operation comprises at least the steps of:

dividing an area to be machined into several categories, such as a bore, an end face, an external circumferential surface, a groove formed in the internal circumferential surface of the bore, a groove formed in the external circumferential surface, and a groove formed in the end face, using a tool file and pictorial codes of input data, and retrieving a tool and checking it against these categories;

retrieving a tool with addition of a tool for pre-forming a hole depending on whether or not the bore is pre-formed;

using the maximum graphic processing tool used in deciding the removal direction as a part of a turning tool;

retrieving a tool with multiple functions in order to minimized the number of tools to be used;

sounding an alarm if no roughing tool matches with an input drawing, and thereafter using a finishing tool as a roughing tool;

sounding an alarm unless a tool required by the input drawing is included in the tool file;

selecting a tool sufficiently capable of machining the material according to the shapes and sizes described in the input drawing, that is, bores, depths, groove widths, and groove depths, and giving the top priority to rigidity and the second priority to versatility during the course of the selection of a tool with largest emphasis on productivity;

reading specifications for each groove from a finally finished shape file, and determining whether or not the groove can be formed by checking grooving a tool against the specifications; and adopting one of the following three steps as conditions for selecting a tool, namely, (1) a tool should be, in principle, selected so as to minimize the total number of tools, (2) a tool should be selected taking into consideration of the number of workpieces per one lot, prerequisites, and absolute requirements, and (3) a decision as to selection of a tool is made by selecting a tool having the maximum cutting volume for each area, supposing A which is the sum of machining time and ATC time and B which is the sum of the machining time and the ATC time obtained using a method for minimizing the number of tools, and comparing A with B.

Designation of a tool comprises at least the steps of:

deciding whether or not a tool designation entry, with regard to the designation and input of a tool for machining, is filled with a tool;

selecting manual designation of a tool for each process by specifying and inputting a tool and cutting conditions or automatic determination of a tool;

disclosing the limit size of a tool by combination of the tool and cutting conditions specified and input for each process with a pictorial pattern, and specifying a tool using a tool number registered in a tool file;

sounding such an alarm that it will be impossible for the specified tool to machine material or it will be difficult for the tool to machine the material completely for reasons of the consistency between the tool and the input drawing obtained as a result of computation, if a tool is specified when a drawing is input; and determining a roughing tool as not to be used for finishing purposes and a finishing tool as to be used for roughing purposes as circumstances demand.

The selection and determination of a fixture comprises the steps of:

pairing up the diameter and length of an area of material which is determined, as it can be chucked, from input material and finishing drawings;

retrieving a fixture in a machine tool file input for each machine tool using the pair of parameters, that is, the diameter and length; and selecting and determining a fixture on the general rule that a portion of the material very close to the area to be machined should be fixed.

Generation and determination of an n-th process processing path for each processing order comprises at least the steps of:

changing the depth of cut corresponding to variations in a cutting allowance;

correcting an input relating to the shape of material used in the turning process, by estimating variations in the material shape using statistical processing means;

measuring materials to be cast and forged in order to obtain data on the shape of practical materials, correcting the input data on the shape of material, and determining a machining cycle and the depth of cut from a difference between the corrected input data and a finished pattern;

measuring the shape of the material, and statistically processing the data obtained as a result of feeding a plurality of pieces of material, so that a mean value and variations are obtained; and determining whether the material should be processed while it is measured each time or while utilizing statistical data by comparing the sum between measuring time and machining time with machining time obtained by means of the statistical method.

Measurement and processing of material in an n-th process comprises at least the steps of:

identifying whether or not workpieces having the identical pattern are repeated;

using the machining drawing employed in the previous machining process as a material drawing in the current processing process if the workpieces have different patterns;

identifying whether or not the direction of removing is specified;

selecting a tool for use in the n-th process;

selecting a fixture for use in the n-th process;

measuring the material used in the n-th process and generating a machine program;

identifying whether or not the material should be measured in the n-th process;

identifying whether or not the workpieces having the identical pattern are repeated if the material must be measured;

executing the tracing method or generating a travel path for measurement use having equivalent intervals from the input material data if the workpieces have different patterns;

initializing a repeat counter for counting the number of workpieces to be machined to $n_1=0$ and a group repeat counter to $n_2=0$;

incrementing the repeat counter for counting workpieces to $n_1=n_1+1$, measuring the material using the tracing method or equivalent intervals and measuring time, and storing measured dimensional data and the measuring time in a data region;

exchanging the material size with the measured size;

calculating a cutting allowance and generating and determining a machining pattern, using the result of the exchange;

identifying whether or not the material has already been measured in the n-th process, if the measurement of the material in the n-th process is judged as not to be necessary;

initializing the repeat counter for measuring the number of workpieces to $n_1=0$ and the group repeat counter to $n_2=0$, if the material has already been measured; and incrementing the repeat counter for counting the number of workpieces to $n_1=n_1+1$.

A method of processing a workpiece in an n-th process which includes on-machine measurement, correction, and reworking operations comprises at least:

roughing processing which includes the steps of sequentially reducing the number of revolutions of the main spindle to 80% if machining power is in excess of an allowable value, and sequentially reducing a feed rate to 50% if the power is still in excess of a critical value, sounding an alarm if the power is still in excess of the critical value, and stopping the machining of the workpiece at a break between blocks to be machined, sequentially increasing the feed rate up to 200% if the cutting power does not satisfy the allowable value, and sequentially increasing a cutting rate up to 150% if the cutting power still fails to satisfy the allowable value; and finishing processing which includes the steps of determining the critical number of revolutions allowing for the lifespan of the tool on the assumption that the feed rate corresponds to variations in the number of revolutions of the main spindle, measuring all the areas of the workpiece designated by a tolerance and a tolerance symbol after the workpiece has been machined, correcting the positions of the tool and machine using expected values in such a way that the positions fall within allowable values at the time of the next processing, increasing the number of measurement points using the range of tolerance and the length of the workpiece as parameters, correcting a difference between a mean value obtained as a result of computation and the center of designated tolerance by combination of a tool position correction operation and a machine position correction operation, if the workpiece was machined with the identical tip of the identical tool, sounding an alarm as erroneous process selection if a difference between the maximum measured value and the minimum measured value is in excess of two-third of the range of tolerance at each of the designated areas, identifying whether or not there is a remaining finishing allowance in the workpiece if the workpiece has been judged as to be defective, identifying whether or not the remaining finishing allowance is within the removing volume of an n-th process machine tool if there is a remaining finishing allowance, determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, sounding an alarm if it has been judged that there is no machine tool capable of removing the remaining finishing allowance, identifying whether or not the decision process through which the machine tool capable of removing the remaining finishing allowance was selected is an unexecuted processing, identifying whether or not the process is a new machining process if that process is the unexecuted processing, incrementing an n-th process storage number by one if the unexecuted processing has been judged as to be a new machining process, and additionally storing associated process data into a storage section, reading a measured material data file and calculating the mean value, maximum value, and minimum value of the shape of the material by means of a statistical processing technique such as the least square method and 3$\sigma$ method, calculating a machining path and machining time for the maximum size of the material, adding mean processing time to the time required to measure material when the material is measured each time and then machined, and comparing the thus obtained time with the time required to machine the material into a shape and a size using the statistical processing technique, so that processing which needs fewer machining time is adopted, reading a count value of the group repeat counter if it takes a long time to machine the material using the statistical processing technique, and identifying whether or not there is statistical processing, measuring the material each time using the tracing method if the statistical processing is not selected, exchanging the input size of the material with the measured data, generating and determining a machining path, machining the workpiece, measuring the thus machined workpiece on the machine, and correcting the workpiece, storing the data on the decision to select the statistical processing if the statistical processing is selected into the storage section, determining whether or not the workpiece is nondefective using the result of the measurement, identifying whether or not there is a remaining finishing allowance in the workpiece if the workpiece has been judged as to be defective, identifying whether or not the remaining finishing allowance is within the removing volume of the n-th process machine tool, if there is a remaining finishing allowance, identifying whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, sounding an alarm if it has been judged that there is no machine tool table of removing the remaining finishing allowance, identifying whether or not the decision process through which the machine tool capable of removing the remaining finishing allowance was selected is an unexecuted processing, if it has been judged that there is a machine tool capable of removing the remaining finishing allowance, identifying whether or not the process is a new machining process if that process has been judged as to be the unexecuted processing, and incrementing an n-th process storage number by one if the unexecuted processing has been judged as to be a new machining process, and additionally storing associated process data into the storage section.

Generation of a turning processing path comprises at least the steps of:

determining whether to designate any one of the following combinations based on a cutting method specified in an input item concerning machining or to automatically decide it using productivity, the elimination of chips, the life span of a tool, and the material of the tool, namely, a combination of a method to equally divide the depth of cut made as a result of roughing among stages and a method using a constant finishing allowance, and a combination of a method to form the constant depth of cut by roughing and a method using a variable finishing allowance;

determining the evaluation of productivity, with regard to the case of the constant depth of cut or the case of the equivalently divided depth of cut, by simulating machining time using the number of positioning times and the length of a path over which a turning machine travels;

dealing with a machining path associated with the constantly cutting method as a simple path method in which material is machined so far as the point where the material can be continuously machined even if a finishing allowance is ensured in the material without changing the depth of cut formed in the material;

adopting a cutting method called a variable cutting method in which the depth of cut made as a result of roughing is divided among stages, in order to improve the machining productivity;

subtracting a finishing allowance from a cutting allowance of the material, dividing the thus obtained cutting allowance by the maximum depth of cut, rounding up the result of the division to obtain the number of times the material is cut, subtracting a finishing allowance from a cutting allowance on each stage, dividing the thus obtained cutting allowance on each stage by the number of times the material is cut, as a result of which the depth of cut is equally divided among the stages, and using the thus obtained depth of cut as a cutting allowance on each stage in each cycle;

adopting a variable finishing allowance method based on the constant cutting method in which the material is roughed to a constant depth, in order to improve the machining productivity; and correcting displacement corresponding to the finishing allowance, wherein the correction of displacement comprises the step of:

obtaining an approximate calculation expression from the actually measured data, and calculating the amount of correction using the depth of cut, a feed, the strength of material, and the entire length of a workpiece; or calculating a deficiency of the actually measured raw data using approximate interpolation, and calculating the amount of correction by means of interpolation using the actually measured data, the approximately interpolated data, and the strength of material and the entire length of a workpiece which act as variables; or calculating and correcting the amount of correction using an arithmetic expression which employs a broaching load, material, the entire length of a workpiece, a supporting method, and load points as variables.

A path for turning a rod material comprises at least the steps of:

selecting either an absolute value or an increment for the position of a machine based on a designation item of the machine tool;

calculating a cutting rate from the material of a workpiece and the material of a tool;

determining the direction of revolution of the main spindle on the basis of the rotation of a tool associated with a tool ID number; and setting a feed rate to an allowable value determined by the limit of depth of cut, a feed, the limit of a machine tool, and the limit of a workpiece which are read from a tool file as well as by the depth of cut and a feed read from a cutting condition file, the path further comprising a calculation method for equally dividing the depth of cut which includes the steps of calculating a roughing allowance on each stage, the maximum allowable depth of cut on each stage, the theoretical number of times material is cut using the following expressions Roughing allowance on each stage={diameter of material−(designated diameter+finishing allowance)}, Max. depth of cut on each stage=Max. machining load/feed×specific cutting force Theoretical number of times material is cut=(roughing allowance on each stage)/(2×allowable maximum depth of cut on each stage), setting the direction of the allowable maximum depth of cut to the direction of the cut associated with one of a workpiece, a machine tool, and a tool that has the largest minimum value, calculating the depth of cut, which is based on a critical value for the limit of rigidity, with regard to the maximum depth of cut used in the turning operation by calculating a specific cutting force from the materials of a tool and an input workpiece, and by reading a cutting rate from the cutting condition file, and obtaining the size of a workpiece before it will be finished by adding a finishing allowance to the shape of the workpiece on each stage read from a file related to finally finished shapes, obtaining the number of times the workpiece is cut by dividing the length of the workpiece by the maximum depth of cut, rounding up the result of the division in order to obtain the equally divided depth of cut, and determining the directions of cut and feed;

carrying out processing so as to prevent the depth of cut in the Z direction from increasing by use of the depth of cut in the Z direction used in machining the previous stage if the depth of cut in the Z direction increases in the course of the execution of processing when a machine program is generated using the equally divided depth of cut, or carrying out processing so as to prevent the depth of cut in the X direction from increasing by use of the depth of cut in the X direction used in machining the previous stage if the depth of cut in the X direction increases in the course of the execution of processing;

a method for calculating a program for use with a constant cutting method which includes the steps of setting the direction of the allowable maximum depth of cut to the direction of the cut associated with one of a workpiece, a machine tool, and a tool that has the largest minimum value, calculating the depth of cut, which is based on a critical value for the limit of rigidity, with regard to the maximum depth of cut used in the turning operation by calculating a specific cutting force from the materials of a tool and an input workpiece, and by reading a cutting rate from the cutting condition file, calculating a machining path along which the workpiece is turned in the Z direction while it is fed in the X direction, in which the workpiece is fed to the point at which a finishing allowance and a finishing allowance for another processing are added to the finally finished shape file every time the material is machined, and calculating a machining path, for a remaining portion of the material which was not machined in the previous turning processing, in which the workpiece is turned in the Z+ or Z− direction while being fed to the X− direction, and the thus turned workpiece is repeatedly returned to the point from which the previous turning processing started and again undergoes the turning processing, obtaining the size of the workpiece before it will be finished by adding a finishing allowance to the shape of the workpiece on each stage read from the finally finished shape file, and obtaining the number of times the workpiece is cut by dividing the length of the workpiece by the maximum depth of cut and the remainder of the workpiece which is to be machined together with the machining of another portion on the subsequent machining stage, calculating a roughing allowance on each stage using the following expression Roughing allowance on each stage={diameter of material−(designated diameter+finishing allowance)}, retrieving exchangeable material from a tool material translation table file if tool material which is not included in the cutting condition file is specified, and retrieving machining conditions applicable to the material of the workpiece and a tool diameter from the cutting condition file using the equivalent tool material, setting a finishing allowance of a bore to one-third of the maximum depth of cut which the tool can form and a finishing allowance of an end face to half a finishing allowance in the diametrical direction of the workpiece, calculating an approximate value by computing the correction of machining deflection based on the assumption that the radius of the material and the depth of cut are proportional to each other according to a linear expression, using a turning variation plot which shows a remainder of the workpiece on each stage occurring as a result of turning the workpiece to a constant depth, a difference between the actually measured data and the reference diameter of the workpiece, and a plot which illustrates variations in the workpiece radius, and then generating a machine program by correcting values of machine program data, calculating the feed of a grooving tool from the shank size of the tool, the length of a projection of the tool, the rigidity of the tool, the (Max. and Min.) limits of a feed of the tool (in the X and Z directions), the maximum cut withstanding volume of the tool, all being read from the tool file, as well as the material of the workpiece, taking into consideration of the specific cutting force of material of the workpiece, calculating the maximum allowable load by dividing the limit of allowable deflection by the tool rigidity, and calculating a feed rate using the following expression $F$=2×max. cut withstanding volume/(specific cutting force×groove width) [mm/rev.], calculating the time during which the tool is in a dwell state at the groove bottom from the number of revolutions of the tool while it is in a dwell state, the cutting speed calculated from the materials of the tool and the workpiece, and the diameter of the groove bottom, using the following expression $t$=(the number of revolutions of the tool while it is in a dwell state)/(cutting speed/(60×π×bottom diameter)) [sec.], selecting rapid traverse mode of the tool if the tip of the tool has come out of contact with the workpiece and then it has get outside of the outer circumference of the workpiece by means of the radius of the tool tip, when the tool comes to a quick return position for grooving purposes;

determining a finishing feed rate on the basis of a finishing method symbol;

calculating the finish feeding rate associated with the turning processing from the roughness of a finish defined by a finishing symbol, a relational expression between the roughness of a finished surface and the feed of the workpiece, and the radius of the tool tip (i.e., the nose-radius of the tool) read from the tool file, using the following expression $$H\text{max}=f^2/8R$$

$$f^2=8R\times H$$

$$f=(8R\times H)^{1/2}\times 0.8,$$

setting the finishing feed rate of the end face of the workpiece, which is required when the workpiece is fed in the X direction while the tool is actuated in the Z direction, to 1/2.5 the feed rate of the tool in the Z direction;

a threading method which includes the steps of selecting a cutting method from among a driving method, a relieving method, and a combined driving method, as well as selecting a method for determining the depth of cut from among a method for cutting material into an equivalent cross section and a method for cutting material at equivalent intervals, depending on the material and hardness of a workpiece, mechanical rigidity, and the material, rigidity, and characteristics of a tool, and calculating the depth of cut, the width of an opening in the thread, and the width of a top land using the following expressions Depth of cut={(means outside diameter)−(minor diameter to be machined)}/2

Width of top land=2×nose radius of a determined tool×[{(1/sin (half of a thread angle)}−1]×tan (half the included angle)

Width of an opening in a thread=($P$/2)+(mean outside diameter−effective mean diameter)×tan (half the included angle);

and a method of dividing the depth of cut, for use in cutting material into an equivalent cross section, which includes the steps of determining the number of times material is cut by dividing a total cutting load, which is a product of a cross section of a thread and a specific cutting force, by an allowable contact load calculated from the mechanical rigidity and the tool rigidity, so that substantial number of times material is cut is obtained, and by multiplying the substantial number of times material is cut by a safety factor, calculating the specific cutting force from the material of a workpiece using a material file, and calculating the total cutting load from the thus obtained specific cutting force using the following equation Total cutting load=specific cutting force×total cross section of cut made by a thread, calculating the tool rigidity, the limit of depth of cut, and the maximum cut withstanding volume using the tool file, setting the limit of the tool rigidity to half the tool rigidity obtained at the time of roughing on condition that material is threaded, dividing the limit of allowable deflection by the tool rigidity in order to obtain the allowable cutting load, and obtaining the integral number of times material is cut by dividing the total cutting load by the allowable cutting load and subsequently rounding up the result of the division, obtaining the divided depth of cut by expanding the following expression Cross section of thread/number of division ($n$)=top land width×($h_n - h_{(n-1)}$)+2×(½)×{$(h_n)^2$×tan (half of a thread angle)−$(h_{(n-1)})^2$×tan (half of a thread angle)}=top land width×($h_n - h_{(n-1)}$)+tan (half of a tread angle)×{$(h_n)^2-(h_{(n-1)})^2$}, calculating the distance, in a lateral direction, over which the tool travels in the case of the relieving method or the combined driving method, using the following equation Travel distance in a lateral direction ($\Lambda z_n$)=($h_n - h_{(n-1)}$)×tan (half of a thread angle), and calculating cutting points for use in the combined driving method in the reverse order of machining with respect to the final position.

Selection of a tool and setting of cutting conditions comprise at least the steps of:

selecting a rotating tool for grooving purposes by retrieving a tool using the width of a groove to be formed in material as a keyword, and selecting a tool ID number if the diameter and nominal length of the tool matches with the groove width;

retrieving a cutting rate from a cutting condition file based on the materials of a workpiece and the tool, and calculating the number of revolutions of the tool using the tool diameter;

determining the depth of cut based on the tool rigidity, calculating the number of times material is cut from the thus obtained the depth of cut, and cyclically cutting the material into predetermined depth;

complementing a feed rate using the diameters of tools before and after the applicable tool which satisfies a predetermined tool quality, a predetermined workpiece material, a predetermined cutting rate, and a predetermined feed rate, if data relating to the applicable tool are not available; and complementing a feed rate of an end mill in such a way as to be proportional to the force power of its diameter; and complementing a feed rate of a drill in such a way as to be proportional to its diameter.

A program for reaming a hole uses data on inputs, a size of a finally finished workpiece, a type of twist, a rotating angle with regard to the reference position, steps of a hole, a diameter, finishing symbols, countersinks/counterbores, a counter sinking angle, a depth, and the number and positions of holes.

A reaming program comprises at least the steps of:

retrieving and selecting a pre-forming drill using a reamer diameter and the depth of a reamed hole;

obtaining a reaming rate from a cutting condition file based on the material of a tool, which is read from the tool file, and the material of a workpiece, and determining the number of revolutions of the tool by calculating the cutting rate;

reading feed rates of pre-forming drills which have similar diameters from the cutting condition file, and calculating a feed rate of a pre-forming drill by interpolation in such a way that the feed rate is in proportion to the diameter of the pre-forming drill; and retrieving a reamer using the diameter and depth of a reamed hole as key codes, and selecting a reamer.

A program for machining a grooved end cam comprises at least the steps of:

retrieving and selecting a tool using the width of a groove formed in a cam and the depth of a cam, that is, a major cutting edge as key codes;

obtaining a cutting rate on the basis of the materials of a workpiece and the tool, and determining the number of revolutions of the tool by calculating the cutting rate; and reading feed rates of tools which have similar diameters from the cutting condition file, and calculating a feed rate for machining a grooved end cam by interpolation in such a way that the feed rate is in proportion to the square of the diameter of the tool.

A program for finishing the outer circumference of material comprises at least the steps of:

obtaining at least finished surface roughness designated by a finishing method symbol utilizing specifications for a finally finished shape, and calculating a feed rate which satisfies the thus obtained finished surface roughness utilizing a relational expression between the finished surface roughness and a feed rate, the tip radius of a tool (i.e., the nose-radius of a tool), and a safety factor;

selecting a grooving tool and a feed rate based on specifications for a groove having a finally finished shape, with regard to the finishing of a groove; and calculating the chamfering of the bottom of a groove using the tip radius of the grooving tool (i.e., the nose-radius of the grooving tool).

A keyway machine program executes a machining operation based on, at least, an input drawing for a keyway and specifications for a finally finished shape pattern (keyway numbers, a previous stage, a subsequent stage, a keyway width, a tolerance, finishing symbols, the entire length of a keyway, stages designated so as to be machined, a depth, a type of groove, a cutter diameter, a step of the reference shoulder, and an angle with regard to the reference position).

The keyway machine program comprises at least the selection of a keyway machining tool, and the keyway machining tool including the steps of:

retrieving and selecting a cutter for machining a keyway, using the diameter and width of the cutter as key codes;

obtaining a cutting rate and a feed rate per one blade from the materials of a tool and a workpiece, and calculating keyway cutting conditions from the thus obtained cutting and feed rates using the number of revolutions and teeth of the cutter; and calculating a feeding speed of a side cutter from the number of revolutions and teeth of the cutter and its feed rate.

An external gear hobbing program generates specifications for hobbing an external gear on the basis of, at least, a finally finished pattern (external gear numbers, the reference position, an angle, specifications for a gear, a tooth profile, a module (M), a pressure angle (PA), the number of teeth, a helix angle, a tooth width, a base tangential length, a finishing method, and finishing symbols).

The external gear hobbing program comprises at least a step of selecting a tool, the tool selecting step further including the steps of:

selecting a hobbing tool on the basis of specifications for a gear, a tooth profile, and a pressure angle;

calculating a tool diameter and a cutter addendum, and deciding whether or not the hobbing of a gear is feasible;

sounding an alarm if the hobbing of a gear is impossible;

calculating a helix angle from the tool diameter and the cutter addendum; and obtaining a cutting rate and a feed rate on the basis of the materials of the tool and a workpiece, calculating the theoretical number of revolutions of the main spindle from the cutting rate and the feed rate, calculating the number of revolutions of a workpiece by dividing the theoretical number of revolutions of the main spindle by the number of teeth and rounding up the result of the division, and calculating the number of revolutions of the main spindle by multiplying the number of revolutions of a workpiece by the number of teeth.

An outside diameter turning program comprises at least a step of selecting a tool, the tool selection step further including the steps of:

selecting the material of a grinding wheel on the basis of the material and hardness of a workpiece;

selecting a machining method from a radially feeding method, a traverse grinding method, and a plunge cutting method by comparing the width of an area to be machined and the major cutting edge (grinding wheel width) on the basis of the material and hardness (translated hardness) of the workpiece, and determining cutting conditions (the peripheral velocity of the grinding wheel, the peripheral velocity of the workpiece, and the depth of cut) on the basis of the selected machining method;

calculating the number of revolutions of the grinding wheel from the diameter and peripheral velocity of the grinding wheel;

calculating the number of revolutions of the workpiece from the peripheral velocity of the workpiece corresponding to the workpiece which is to be machined; and generating a machining path from inputs, a finally finished shape, and the shape of a workpiece which has been finished in another process.

An internal grinding program comprises at least the step of selecting a boring tool, the boring tool section step further including the steps of:

selecting the material of a grinding wheel on the basis of the material and hardness of a workpiece;

selecting a machining method from a radially feeding method, a traverse grinding method, and a plunge cutting method by comparing the width of an area to be machined and the major cutting edge (grinding wheel width) on the basis of the material and hardness (translated hardness) of the workpiece, and determining cutting conditions (the peripheral velocity of the grinding wheel, the peripheral velocity of the workpiece, and the depth of cut) on the basis of the selected machining method;

calculating the number of revolutions of the grinding wheel from the diameter and peripheral velocity of the grinding wheel;

calculating the number of revolutions of the workpiece from the peripheral velocity of the workpiece corresponding to the workpiece which is to be machined;

determining a chopping rate in the Z direction which is employed in roughing and finishing operations, in relation to the width of the grinding wheel per one revolution of the workpiece; and generating a machining path from inputs, a finally finished shape, and the shape of a workpiece which has been finished in another process.

A method of processing a workpiece in an n-th process which includes on-machine measurement, correction, and reworking operations comprises at least the steps of:

measuring the workpiece on the machine tool after the machining of the workpiece has been completed, and correcting the position of the machine tool or a tool;

identifying whether or not the result of the measurement of the corrected workpiece is acceptable;

identifying whether or not there is a remaining finishing allowance in the workpiece if the workpiece has been judged as to be defective;

identifying whether or not the remaining finishing allowance is within the removing volume of an n-th process machine tool if there is a remaining finishing allowance;

repeating the processing procedures from the finishing step if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool;

sounding an alarm if it has been judged that there is no machine tool capable of removing the remaining finishing allowance;

identifying whether or not the decision process through which the machine tool capable of removing the remaining finishing allowance was selected is an unexecuted processing;

identifying whether or not the process is a new machining process if that process is the unexecuted processing; and incrementing an n-th process storage number by one if the unexecuted processing has been judged as to be a new machining process, and additionally storing associated process data into a storage section.

Adaptive processing applied to cutting power during the course of machining processing comprises at least the steps of:

in the case of a roughing operation, sequentially reducing the number of revolutions of the main spindle to 80% if machining power is in excess of an allowable value;

sequentially reducing a feed rate to 50% if the power is still in excess of a critical value;

sounding an alarm if the power is still in excess of the critical value, and stopping the machining of the workpiece at a break between blocks to be machined;

sequentially increasing the feed rate up to 200% if the cutting power does not satisfy the allowable value, and sequentially increasing a cutting rate up to 150% if the cutting power still fails to satisfy the allowable value;

in the case of a finishing operation, making the feed rate adaptable solely to the number of revolutions of the main spindle, and sequentially reducing the number of revolutions of the main spindle to 80% if the cutting power exceeds the allowable value;

sequentially reducing the feed rate to 50% if the power is still in excess of a critical value;

sounding an alarm if the power is still in excess of the critical value, and stopping the machining of the workpiece at a break between blocks to be machined; and sequentially increasing the feed rate up to 150% if the cutting power does not satisfy the allowable value.

A method of processing a workpiece in an n-th process which includes off-machine measurement, correction, and reworking operations comprises at least the steps of:

measuring the workpiece off a machine tool in the n-th process after the machining of the workpiece has been completed, and correcting the position of the machine tool or a tool;

identifying whether or not the result of the measurement of the corrected workpiece is acceptable;

identifying whether or not there is a remaining finishing allowance in the workpiece if the workpiece has been judged as to be defective, identifying whether or not the remaining finishing allowance is within the removing volume of an n-th process machine tool if there is a remaining finishing allowance, attaching the workpiece to the machine tool, and repeating the processing procedures from the finishing step if the remaining finishing allowance is within the removing volume of the n-th process machine tool;

sounding an alarm if it has been judged that the remaining finishing allowance is outside the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool; and sounding an alarm if it has been judged that there is no machine tool capable of removing the remaining finishing allowance.

Measurement and correction of a workpiece after it has been machined comprises at least the steps of:

measuring all the areas of the workpiece designated by a tolerance and a tolerance symbol after the workpiece has been machined;

correcting the positions of the tool and machine using expected values in such a way that the positions fall within allowable values at the time of the next processing;

changing measurement points on the basis of the range of tolerance;

calculating a difference between a mean value, the maximum value, and the minimum value which were obtained as a result of the measurement of the workpiece;

correcting a difference between the mean value and the center of the designated tolerance which was obtained as a result of the calculation by combination of the correction of the tool machine position and the correction of the tool position, if the workpiece has been machined with the identical tip of the identical tool; and sounding an alarm as erroneous process selection if a difference between the maximum measured value and the minimum measured value is in excess of two-third of the range of tolerance at each of the designated areas.

A machine program which includes off-machine material measurement for an n-th process comprises at least the steps of:

identifying whether or not workpieces having the identical pattern are repeated, and arranging material drawings and machining patterns associated with the n-th process if the workpieces having the identical pattern are not repeated;

selecting a previous machining pattern as a material pattern of the current process, and arranging machining drawings of each process;

identifying whether or not the direction of removing has been designated;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

retrieving fixtures of a machine tool file, which are input for each of the machine tools associated with the n-th process, from input drawings using the area to be chucked as a key;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

measuring the material outside the machine tool in the n-th process;

identifying whether or not the material should be measured in the n-th process;

identifying whether or not workpieces having the identical pattern are repeated;

initializing a repeat counter for counting the number of workpieces to be machined and a group repeat counter;

incrementing the repeat counter for counting the number of workpieces to be machined, and measuring the material outside the machine tool;

exchanging the material size with the measured size;

calculating a cutting allowance, and determining the generation of a machining pat, using the result of the exchange;

identifying whether or not the material should be measured in the n-th process, identifying whether or not the material has already been measured if it is judged that the measurement of the material in the n-th process is unnecessary, and initializing the repeat counter for measuring the number of workpieces and the group repeat counter, if it is judged that the material has already been measured;

incrementing the repeat counter for counting the number of workpieces;

executing the machining, off-machine measurement, correction, and reworking of the workpiece of the n-th process;

measuring the time required to machine the workpiece, and store the measured machining time in a file region;

identifying whether or not there is a remaining finishing allowance in the workpiece if the workpiece has been judged as to be defective as a result of the off-machine measurement in the n-th process;

identifying whether or not the remaining finishing allowance is within the removing volume of an n-th process machine tool if there is a remaining finishing allowance, and attaching the workpiece to the machine tool again if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet;

incrementing an n-th process storage number by one if the unexecuted processing has been judged as to be a new machining process, and additionally storing associated process data into a storage section;

incrementing the group repeat counter by one if the repeat counter for counting the number of workpieces to be machined has already counted up to a predetermined value;

reading a measured material data file for predetermined number of times, and calculating the mean value, maximum value, and minimum value of the shape of the material by means of a statistical processing technique such as the least square method and 3σ method;

calculating a machining path and machining time for the maximum size of the material;

adding mean processing time to the time required to measure material when the material is measured each time and then machined, and comparing the thus obtained time with the time required to machine the material into a shape and a size using the statistical processing technique, so that processing which needs fewer machining time is adopted;

identifying whether or not the group repeat counter has counted up to a predetermined value if it takes much time to machine a workpiece using the statistical method, and stopping the execution of the statistical processing associated with the remainder of the machining operations if the group repeat counter has not counted up to the predetermined value;

measuring the material outside the machine tool each time if the counter has counted up to the predetermined value, exchanging the input material size with the measured data, and determining the generation of a machining path;

machining the workpiece;

identifying whether or not there is a remaining finishing allowance in the workpiece if the workpiece has been judged as to be defective as a result of the measurement;

identifying whether or not the remaining finishing allowance is within the removing volume of the n-th process machine tool, if there is a remaining finishing allowance;

attaching the workpiece to the machine tool again, and repeating finishing of the workpiece if the remaining finishing allowance is within the removing volume of the n-th process machine tool;

identifying whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing, if it has been judged that there is a machine tool capable of removing the remaining finishing allowance, and identifying whether or not the process is a new machining process if that process has been judged as to be the unexecuted processing; and incrementing an n-th process storage number by one if the unexecuted processing has been judged as to be a new machining process, and additionally storing associated process data into the storage section.

A machine program, which includes the function of statistically processing material in an n-th process and the function of measuring the material on a machine tool, comprises at least the steps of:

as a method of arranging a statistically processed material drawing and a machining pattern associated with the n-th process, arranging a machining pattern of each process by using a previous machining pattern as a material pattern of the current machining process;

identifying whether or not the direction of removing has been designated;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

retrieving fixtures of a machine tool file, which are input for each of the machine tools associated with the n-th process, from input drawings using the area to be chucked as a key;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

selecting and determining a fixture best suited to each machining process if there is no fixture which can be commonly used for machining all the sides; and generating a machine program which includes the measurement of material on the machine tool in the n-th process.

A machine program which includes the on-machine measurement, correction, and reworking of a workpiece comprises at least the steps of:

identifying whether or not there is a remaining finishing allowance in the workpiece if the workpiece has been judged as to be defective as a result of the on-machine measurement after the machining of the workpiece has been completed, and identifying whether or not the remaining finishing allowance is within the removing volume of an n-th process machine tool if there is a remaining finishing allowance;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet; and incrementing an n-th process storage number by one if the unexecuted processing has been judged as to be a new machining process, and additionally storing associated process data into a storage section.

A machine program, which includes the function of statistically processing material in an n-th process and the function of measuring the material off a machine tool, comprises at least the steps of:

as a method of arranging a statistically processed material drawing and a machining pattern associated with the n-th process, arranging a machining pattern of each process by using a previous machining pattern as a material pattern of the current machining process;

identifying whether or not the direction of removing has been designated;

selecting a tool for use in the n-th process;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

selecting a fixture for use in the n-th process;

retrieving fixtures of a machine tool file, which are input for each of the machine tools associated with the n-th process, from input drawings using the area to be chucked as a key;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

selecting and determining a fixture best suited to each machining process if there is no fixture which can be commonly used for machining all the sides; and generating a machine program which includes the measurement of material outside the machine tool in the n-th process.

A machine program which includes the off-machine measurement, correction, and reworking of a workpiece comprises at least the steps of:

determining whether or not the result of the measurement of the workpiece is acceptable, and identifying whether or not there is a remaining finishing allowance in the workpiece if the workpiece has been judged as to be defective;

identifying whether or not the remaining finishing allowance is within the removing volume of an n-th process machine tool if there is a remaining finishing allowance;

attaching the workpiece to the machine tool again and repeating the machining procedures from a finishing step if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet; and incrementing an n-th process storage number by one if the unexecuted machining has been judged as to be a new machining process, and additionally storing associated process data into a storage section.

If the data which are directly read by means of a tool diameter and specifications for a tool shank are not registered in the cutting condition file, a series of processing items are automatically executed; namely, reading more than three data items from the cutting condition file with regard to tool diameters and specifications for tool shanks which are adjacent to the specifications for the tool to be used, on the basis of the tool diameter and shank; analyzing the group of data items with use of the tool diameter and the specifications for the tool shank as parameters, whereby an approximate calculation expression is obtained; substituting the diameter of a tool to be used and specifications for the shank of that tool into the approximate calculation expression, so that cutting conditions are calculated; and storing the thus calculated cutting conditions in the machine program.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has finished undergoing another process, the identification of a pattern, the decision with regard to a machining process, the decision with regard to the necessity for measuring material, the decision as to whether or not the generation of a per-process machine program and on-machine measurement are possible if the measurement of material is judged to be unnecessary, and processes such as the machining of a workpiece in each process, the on-machine measurement, correction, reworking of a workpiece if the workpiece is defective, and the measurement of the workpiece after it has been reworked if the on-machine measurement is judged to be possible. As a result, material is measured on condition that the measurement of the material is unnecessary, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the generation of a per-process machine program and on-machine measurement are possible if the measurement of material is judged to be unnecessary, and processes such as the machining of a workpiece in each process, off-machine measurement, correction, reworking of a workpiece if the workpiece is defective, and the measurement of the workpiece after it has been reworked if the on-machine measurement is judged to be impossible. As a result, material is machined on condition that the measurement of the material is unnecessary, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not on-machine measurement is possible if the statistical processing of material is judged to be unnecessary, and processes such as the generation of a machine program having a per-process material measurement function, machining of a workpiece in each process, on-machine measurement, correction, reworking of a workpiece if the workpiece is defective, and the measurement of the workpiece after it has been reworked if the on-machine measurement is judged to be possible. As a result, material is machined on condition that the measurement of the material is necessary, that the material is measured in each process, that the statistical processing of the material is unnecessary, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not on-machine measurement is possible if the statistical processing of material is judged to be unnecessary, and processes such as the generation of a machine program a per-process off-machine material measurement function, machining of a workpiece in each process, off-machine measurement, correction, reworking of a workpiece if the workpiece is defective, and the measurement of the workpiece after it has been reworked if the on-machine measurement is judged to be impossible. As a result, material is machined on condition that the measurement of the material is necessary, that the material is measured in each process, that the statistical processing of the material is unnecessary, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical measurement review number has been achieved if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are judged as to be outside the tolerances, and processes such as the generation of a machine program having a per-process material measurement function, the machining of a workpiece in each process, the on-machine measurement, correction, reworking of a workpiece if the workpiece is defective, and the measurement of the workpiece after it has been reworked if the on-machine measurement is judged to be possible. As a result, material is machined on condition that the measurement of the material is necessary, that the material is measured in each process, that the statistical processing of the material is necessary, that a statistical processing review number has been reached, that variations in the material are outside the tolerance, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are judged as to be outside the tolerances, and processes the generation of a machine program having a per-process off-machine material measurement function, machining of a workpiece in each process, the off-machine measurement, correction, reworking of a workpiece if the workpiece is defective, and the measurement of the workpiece after it has been reworked if the on-machine measurement is judged to be impossible. As a result, material is machined on condition that the measurement of the material is necessary, that the material is measured in each process, that the statistical processing of the material is necessary, that a statistical processing review number has been reached, that variations in the material are outside the tolerance, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are within the tolerances, the decision as to whether or not a workpiece having the same shape is repeatedly machined if the on-machine measurement is judged to be possible, and processes such as the generation of a machine program having a per-process statistical material processing function and an on-machine measurement function, machining of a workpiece in each process, the on-machine measurement, correction, reworking of a workpiece if the workpiece is defective, and the measurement of the workpiece after it has been reworked if the workpiece having the same shape is judged as not to be repeatedly machined. As a result, workpieces having different shapes are machined on condition that the measurement of the material is necessary, that the material is measured in each process, that the statistical processing of the material is necessary, that a statistical processing review number has been reached, that variations in the material are outside the tolerance, and that the on-machine measurement of the material is feasible.

In a machining method using a numerical control unit according to the present invention, the following processes are carried out employing electronic calculators, which include a numerical control unit, a FA system, and a personal computer, a series of data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, a decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are within the tolerances, the decision as to whether or not a workpiece having the identical shape is repeatedly machined if the on-machine measurement is judged to be possible, and processes such as the machining of a workpiece in each process, the on-machine measurement, correction, reworking of a workpiece if the workpiece is defective, and the measurement of the workpiece after it has been reworked if the workpiece having the identical shape is judged to be repeatedly machined. As a result, workpieces having the identical shape are repeatedly machined on condition that the measurement of the material is necessary, that the material is measured in each process, that the statistical processing of the material is necessary, that a statistical processing review number has been reached, that variations in the material are outside the tolerance, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data, variations in material fall within tolerances if the statistical processing review number has been reached, the decision as to whether or not on-machine measurement is possible if the results and variations are within the tolerances, the decision as to whether or not a workpiece having the identical shape is repeatedly machined if the on-machine measurement is judged to be impossible, and processes such as the generation of a machine program having a per-process statistical material processing function and an off-machine measurement function, machining of a workpiece in each process, the off-machine measurement, correction, reworking of a workpiece if the workpiece is defective, and the measurement of the workpiece after it has been reworked if the workpiece having the identical shape is judged not to be repeatedly machined. As a result, workpieces having different shapes are machined on condition that the measurement of the material is necessary, that the material is measured in each process, that the statistical processing of the material is necessary, that a statistical processing review number has been reached, that variations in the material are within the tolerance, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not results of the measurement of material and the arrangement of data and variations in material fall within tolerances if the statistical processing review number has been reached, the decision as to whether or not on-machine measurement is possible if the results and variations are within the tolerances, the decision as to whether or not a workpiece having the identical shape is repeatedly machined if the on-machine measurement is judged to be impossible, and processes such as the machining of a workpiece in each process, off-machine measurement, correction, reworking of a workpiece if the workpiece is defective, and the measurement of the workpiece after it has been reworked if the workpiece having the identical shape is judged to be repeatedly machined. As a result, workpieces having the identical shape are repeatedly machined on condition that the measurement of the material is necessary, that the material is measured in each process, that the statistical processing of the material is necessary, that a statistical processing review number has been reached, that variations in the material are within the tolerance, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing review number has not been reached, the decision as to whether or not a workpiece having the identical shape is repeatedly machined if the on-machine measurement is judged to be possible, and processes such as the generation of a machine program having a per-process statistical material processing function and an on-machine measurement function, machining of a workpiece in each process, the on-machine measurement, correction, reworking of a workpiece if the workpiece is defective, and the measurement of the workpiece after it has been reworked if the workpiece having the identical shape is judged not to be repeatedly machined. As a result, workpieces having different shapes are machined on condition that the measurement of the material is necessary, that the material is measured in each process, that the statistical processing of the material is necessary, that a statistical processing review number has not been reached yet, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing number has not been reached, the decision as to whether or not a workpiece having the identical shape is repeatedly machined if the on-machine measurement is judged to be possible, and processes such as the machining of a workpiece in each process, the on-machine measurement, correction, reworking of a workpiece if the workpiece is defective, and the measurement of the workpiece after it has been reworked if the workpiece having the identical shape is judged to be repeatedly machined. As a result, workpieces having the identical shape are repeatedly machined on condition that the measurement of the material is necessary, that the material is measured in each process, that the statistical processing of the material is necessary, that a statistical processing review number has not been reached yet, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing review number has not been reached, the decision as to whether or not a workpiece having the identical shape is repeatedly machined if the on-machine measurement is judged to be impossible, and processes such as the generation of a machine program having a per-process statistical material processing function and an off-machine measurement function, machining of a workpiece in each process, the off-machine measurement, correction, reworking of a workpiece if the workpiece is defective, and the measurement of the workpiece after it has been reworked if the workpiece having the identical shape is judged not to be repeatedly machined. As a result, workpieces having different shapes are machined on condition that the measurement of the material is necessary, that the material is measured in each process, that the statistical processing of the material is necessary, that a statistical processing review number has not been reached yet, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not statistical processing of material is necessary if the measurement of material in the process is judged to be necessary, the decision as to whether or not a statistical processing review number has been reached if the statistical processing of material is judged to be necessary, the decision as to whether or not on-machine measurement of material is possible if the statistical processing review number has not been reached, the decision as to whether or not a workpiece having the identical shape is repeatedly machined if the on-machine measurement is judged to be impossible, and processes such as the machining of a workpiece in each process, the off-machine measurement, correction, reworking of a workpiece if the workpiece is defective, and the measurement of the workpiece after it has been reworked if the workpiece having the identical shape is judged as repeatedly machined. As a result, workpieces having the identical shape are repeatedly machined on condition that the measurement of the material is necessary, that the material is measured in each process, that the statistical processing of the material is necessary, that a statistical processing review number has not been reached yet, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the identical shape is repeatedly machined if the on-machine measurement is judged to be possible, and processes such as the generation of a machine program having a per-process statistical material processing function and an on-machine measurement function, machining of a workpiece in each process, the on-machine measurement, correction, reworking of a workpiece if the workpiece is defective, and the measurement of the workpiece after it has been reworked if the workpiece having the identical shape is judged not to be repeatedly machined. As a result, workpieces having different shapes are machined on condition that the measurement of the material is necessary, that the measurement of the material carried out in each process is unnecessary, and that the on-machine measurement of the material is impossible.

In a machining method using a numerical control unit according to the present invention, the following processing is carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the identical shape is repeatedly machined if the on-machine measurement is judged to be possible, and processes such as the machining of a workpiece in each process, the on-machine measurement, correction, reworking of a workpiece if the workpiece is defective, and the measurement of the workpiece after it has been reworked if the workpiece having the identical shape is judged to be repeatedly machined. As a result, workpieces having the identical shape are repeatedly machined on condition that the measurement of the material is necessary, that the measurement of the material carried out in each process is unnecessary, and that the on-machine measurement of the material is feasible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, the decision as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the identical shape is repeatedly machined if the on-machine measurement is judged to be impossible, and processes such as the generation of a machine program having a per-process statistical material processing function and an off-machine measurement function, machining of a workpiece in each process, the off-machine measurement, correction, reworking of a workpiece if the workpiece is defective, and the measurement of the workpiece after it has been reworked if the workpiece having the identical shape is judged not to be repeatedly machined. As a result, workpieces having different shapes are machined on condition that the measurement of the material is necessary, that the measurement of the material carried out in each process is unnecessary, and that the on-machine measurement of the material is impossible.

In a machining method using a numerical control unit according to the present invention, the following processes are carried out employing electronic calculators, which include a numerical control unit, a FA system, and a personal computer, a series of other data processing units, machine tools, and the like; namely, the registration of a variety of information files, the inputting of machining pattern data, the processing of a finished pattern, the processing of a machining pattern before a workpiece has undergone another process, the identification of a pattern, the decision with regard to a machining process, the decision with regard to the necessity for measuring material, forming of a judgement as to whether or not the measurement of material in the process is necessary if the measurement of material is judged to be necessary, the decision as to whether or not on-machine measurement of material is possible if the measurement of the material in the process is judged to be unnecessary, the decision as to whether or not a workpiece having the identical shape is repeatedly machined if the on-machine measurement is judged to be impossible, and processes such as the machining of a workpiece in each process, off-machine measurement, correction, reworking of a workpiece if the workpiece is defective, and the measurement of the workpiece after it has been reworked if the workpiece having the identical shape is judged to be repeatedly machined. As a result, workpieces having the identical shape are repeatedly machined on condition that the measurement of the material is necessary, that the measurement of the material carried out in each process is unnecessary, and that the on-machine measurement of the material is impossible.

With respect to any one of the above mentioned methods, at least a variety of files are registered, and machining pattern data are checked against a registered file after the machining pattern data have been input. If it is impossible to process the data because of a discrepancy between the machining pattern input data and the registered file, a warning for the addition of a various kinds of files is provided to prompt the operator to carry out the re-registration of the data. As a result, the operator is informed that there is a discrepancy between the input machining pattern data and the data of the registered file.

If another workpiece having a different pattern is selected after the workpieces having the identical pattern have all been used, the workpiece is machined by determining a similarity between the patterns. Workpieces are machined while data on dissimilar workpieces are added to the file.

For the registration of a tool information file, there are procedures with respect to at least, the inputting of tool data, the processing of the tool data, and the registration of a tool information file. In the processing of the tool data, the following processing is carried out, namely, the discrimination of stationary and rotary tools, the classification of the rotary tools, the arrangement of the tools in order of diameter, the reading of tool angles, a reference tip point and a shank size, the determination of segments which are machined by the major cutting edge and segments which are machined by the minor cutting edge, the calculation of machining angles of the major and minor cutting edges, the determination, or filling out, of segments of roughing tools and finishing tools, the calculation of the function of a tool, and the recording of processing results into a storage section. The registration of data to the tool file is automatically determined and executed by means of the tool data.

With regard to the inputting of the tool data, the stationary tools have at least the following input items; namely, a sequence number, a tool identification number, a shank identification number, a chip identification number, specifications of a breaker (the width of the breaker (at its tip), the width of the breaker (at its dedendum), the height of a breaker (at its tip), the height of the breaker (at its dedendum), and the angle of the breaker), the rotation of the cutting edge (L/R), specifications for the major cutting edge (a clearance angle $\alpha_0$, a side rake $\gamma_f$, a back rake $\gamma_p$, and a nose radius), specifications of a minor cutting edge (1) (an angle of the minor cutting edge $\kappa'_1$, and a clearance angle $\alpha\kappa'_1$) specifications of a minor cutting edge (2) (an angle of the minor cutting edge $\kappa'_2$, and a clearance angle $\alpha\kappa'_2$), specifications of a minor cutting edge (3) (a distance from the reference tip point which serves as the starting point: X and Z, an angle of the minor cutting edge $\kappa'_3$, a clearance angle $\alpha\kappa'_3$), the size of a shank (□/○ identification of a shank, radius/width, height), segments of XT/ZT (a segment of a tool attached in the direction of X and a segment of a tool attached in the direction of Z), a reference tip point, the length of projection from a tool holder, an angle of the projection from the tool holder, a mounting angle of the tool holder, the rigidity of a tool (the rigidity obtained when a load is imposed on the tool in the direction of X and the rigidity obtained when a load is imposed on the tool in the direction of Z), a tip clamping method, a cutting limit (an automatic input and a manual input), a feeding limit, the maximum cut proof stress, the permissible limits of intermittent cutting (a cut proof stress, a threshold frequency, the maximum depth of cut, and the maximum feed), a side rake of a minor cutting edge ($\gamma_f\kappa'_1$, $\gamma_f\kappa'_2$, and $\gamma_f\gamma'_3$), a back rake of a minor cutting edge ($\gamma_p\kappa'_1$, $\gamma_p\kappa'_2$, and $\gamma_p\kappa'_3$), the material of a tool, segments of roughing tools/finishing tools (R/F), and specifications for grooving tools (the widths of the grooving tools, and the depths of grooves made by the tools). As a result, the input of the stationary tool data can be standardized.

With regard to the inputting of the tool data, the stationary tools are registered by linking at least tool identification numbers to machine identification numbers, whereby the tools and the machines are correlated with each other.

With regard to the inputting of the tool data, the angle of a cutting edge $\kappa$ is input at least with a plus or minus sign. On the assumption that the axis which extends from an intersection between the axis of a shank and the reference tip point along a line between the tip and the shank is set to an angle of 0-degrees, a cutting edge twisted in the counter-clockwise direction with respect to the zero axis is designated with a plus sign, and a cutting edge twisted in the clockwise direction with respect to the zero axis is designated with a minus sign. As a result, the direction in which the pattern is input and the direction in which the tool is input agree with each other, which in turn reduces the number of times the data are converted.

With regard to the inputting of the tool data, the stationary tools are input after having been divided into a segment of major cutting edges and a segment of minor cutting edges. Functional definitions and machining patterns are prepared using these input values. Accordingly, tools corresponding to the patterns input as a result of internal processing are selected.

With regard to the inputting of the tool data, the volume of a throw-away stationary tool is input for a segment of an area to be cut by the major cutting edge and for a segment of an area to be cut by the minor cutting edge on the basis of cutting limits (the maximum depth of cut and the minimum depth of cut) and feeding limits (the maximum feed and the minimum feed), using at least a cutting edge angle, the reference inscribed circle, an apex angle, a nose radius, the maximum feed factor, a clearance angle, and a clearance angle margin. Consequently, the volume of the tool is calculated by means of internal processing, using the input tool data.

With regard to the inputting of the tool data, the permissible limit of intermittent cutting of the stationary tool specifies at least a cut proof stress, a threshold frequency, the maximum depth of cut, and the minimum depth of cut. As a result, the extent to which a tool can be safely used is calculated by internal processing.

With regard to the inputting of the tool data, the tool has a translation table for its material, and means for translating an ISO code into a manufacturer code, and vice versa. The table and the means complement non standardized codes. Tool material codes of the tool data which have not been standardized yet are translated into standard values.

Of the input tool data, a segment of an area to be cut by the major cutting edge is identified by at least the direction of attachment of the cutting edge in either the X or Z direction, the presence or absence of an input shank diameter, a cutting edge angle, a reference tip point, and the presence or absence of a recess diameter of a shank width. The areas to be cut by the major cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank. Of the tool data, the segment with regard to the areas to be cut by the major cutting edge os identified by the input data, and a segment with regard to a tool and its cutting angle are calculated.

Of the input tool data, the segment of an area to be cut by the minor cutting edge is identified by at least the direction of attachment of the cutting edge in either the X or Z direction, the presence or absence of an input shank diameter, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank. The segments of the areas to be cut by the minor cutting edge are identified by the input data, and a segment with regard to a tool and its cutting angle are calculated for each minor cutting edge.

Of the input tool data, the segment of an area to be cut by the major cutting edge and the segment of an area to be cut by the minor cutting edge are identified by at least dimensional conditions with the exception of configurational conditions of the shank, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank. Segments with regard to the areas to be cut by the major cutting edge and the minor cutting edge and their cutting angles are calculated from a cutting edge angle, a rake angle, a clearance angle, the reference tip point, and the shape and size of a shank.

Of the input tool data, the segment of an area to be cut by the major cutting edge and the segment of an area to be cut by the minor cutting edge are identified by at least the direction of attachment of the cutting edges in either the X or Z direction, the presence or absence of an input shank diameter, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside diameter grooving tool, an inside diameter grooving tool, and an end-face grooving tool. Segment codes for the areas to be cut by the tools are defined as follows:

I—a boring tool
I & IF—a boring and end-face cutting tool
IG—an inside-diameter grooving tool
IH—an internal threading tool
E—a diameter turning tool
E & EF—a diameter turning and end-face cutting tool
EG—an outside-diameter grooving tool
EH—an external threading tool
F—an end-face cutting tool
FG—an end-face grooving tool
FH—an end-face threading tool As a result, the areas to be machined by tools and symbols of those tools are correlated with each other.

Machining start and end angles corresponding to the segment of an area to be machined by a tool are calculated, and a result of the calculation is stored in the data processor. Consequently, the machining start and end angles corresponding to the segment of the area to be machined are stored as data.

If the tool is identified as a throw-away tip by the segment of an area to be machined and a tip code, the tool is further divided into a roughing tool and a finishing tool according to a nominal symbol of the throw-away tip. If the tool is not identified as a throw-away tip, the tool is further divided into a roughing tool and a finishing tool using input data, thereby completing the tool function. Accordingly, the tools are divided into segments by discriminating between a throw-away tip and a tip which is not a throw-away type.

If the input tool data relate to a rotary tool, any tools having F as the first symbol of the tool identification number are further divided into a face milling cutter and an end mill according to the diameter of the tool and the length of a cutting edge of the tool. The tools are arranged in ascending order for each classification according to the diameter of the tool. The thus classified tools are registered in the tool file. Consequently, the tools judged as rotary tools are registered in the tool file in ascending order of diameter for each classification.

With regard to the inputting of the tool data, data on drills of the rotary tool consist of at least sequence numbers, tool identification numbers, shank identification numbers, tip identification numbers, specifications for the diameters of tools, specifications for tips, the number of tooth, the directions of rotation, segments of tools in the X or Z direction (XT/ZT), reference tip points, the rigidity of tools, tip clamping methods, feeding limits, the maximum cut withstanding volume, the permissible limits of intermittent cutting, materials of tools, segments of roughing/finishing tools (R/F), and machine identification numbers. As a result, the data relating to the drills of the rotary tool comprise the tool identification numbers, specifications for the drills, and the machine identification numbers.

With regard to the inputting of the tool data, data on reamers of the rotary tool consist of at least sequence numbers, tool identification numbers, shank identification numbers, tip identification numbers, specifications for the diameters of tools, the lengths of cutting edges of tools, a nominal length, specifications for tips, the number of teeth, the directions of rotation, segments of tools in the X or Z direction (XT/ZT), reference tip points, the rigidity of tools, tip clamping methods, feeding limits, the maximum cut withstanding volume, the permissible limits of intermittent cutting, materials of tools, segments of roughing/finishing tools (R/F), and machine identification numbers. Accordingly, the data relating to the reamers of the rotary tool comprise the tool identification numbers, the specifications for the reamers, and the machine identification numbers.

With regard to the inputting of the tool data, data on taps of the rotary tool consist of at least sequence numbers, tool identification numbers, shank identification numbers, tip identification numbers, specifications of the diameters of tools, the lengths of cutting edges of tools, a nominal length, specifications for tips, the number of teeth, the directions of rotation, segments of tools in the X or Z direction (XT/ZT), reference tip points, the rigidity of tools, tip clamping methods, feeding limits, the maximum cut withstanding volume, the permissible limits of intermittent cutting, the materials of tools, segments of roughing/finishing tools (R/F), and machine identification numbers. The data relating to the taps of the rotary tool comprise the tool identification numbers, the specifications for the taps, and the machine identification numbers.

With regard to the inputting of the tool data, data on end mills of the rotary tool consist of at least sequence numbers, tool identification numbers, shank identification numbers, tip identification numbers, specifications for the diameters of tools, the lengths of cutting edges of tools, a nominal length, specifications of tips, the number of teeth, the directions of rotation, segments of tools in the X or Z direction (XT/ZT), reference tip points, the rigidity of tools, tip clamping methods, cutting limits, feeding limits, the maximum cut withstanding volume, the permissible limits of intermittent cutting, the materials of tools, segments of roughing/finishing tools (R/F), and machine identification numbers. Accordingly, the data relating to the end mills of the rotary tool comprise the tool identification numbers, the specifications for the end mills, and the machine identification numbers.

With regard to the inputting of the tool data, data on side cutters of the rotary tool consist of at least sequence numbers, tool identification numbers, shank identification numbers, tip identification numbers, specifications for the diameters of tools, the widths of tools, the number of teeth, the directions of rotation, segments of tools in the X or Z direction (XT/ZT), reference tip points, the rigidity of tools, tip clamping methods, cutting limits, feeding limits, the maximum cut withstanding volume, the permissible limits of intermittent cutting, the materials of tools, segments of roughing/finishing tools (R/F), and machine identification numbers. Accordingly, the data relating to the side cutters of the rotary tool comprise the tool identification numbers, the specifications for the side cutters, and the machine identification numbers.

With regard to the inputting of the tool data, data on gear hobs of the rotary tool consist of at least sequence numbers, tool identification numbers, shank identification numbers, tip identification numbers, specifications for the diameters of tools, the widths of tools, the number of teeth, the directions of rotation, segments of tools in the X or Z direction (XT/ZT), reference tip points, the rigidity of tools, tip clamping methods, cutting limits, feeding limits, the maximum cut withstanding volume, the permissible limits of intermittent cutting, the materials of tools, specifications for gear shaping tools, segments of roughing/finishing tools (R/F), and machine identification numbers. Accordingly, the data relating to the hobs of the rotary tool comprise the tool identification numbers, the specifications for the hobs, and the machine identification numbers.

With regard to the inputting of the tool data, data on grinding wheels for inside diameter grinding purposes of the rotary tool consist of at least sequence numbers, tool identification numbers, shank identification numbers, tip identification numbers, specifications for the diameters of tools, the lengths of cutting edges of tools, a nominal length, specifications for tips, the directions of rotation, segments of tools in the X or Z direction (XT/ZT), reference tip points, the rigidity of tools, tip clamping methods, cutting limits, feeding limits, the maximum cut withstanding volume, the permissible limits of intermittent cutting, the materials of tools, segments of roughing/finishing tools (R/F), and machine identification numbers. Accordingly, the data relating to the grinding wheels of the rotary tool for inside diameter grinding purposes comprise the tool identification numbers, the specifications for the grinding wheels, and the machine identification numbers.

With regard to the inputting of the tool data, data on grinding wheels for outside diameter grinding purposes of the rotary tool consist of at least sequence numbers, tool identification numbers, shank identification numbers, tip identification numbers, specifications for the diameters of tools, the lengths of cutting edges of tools, the directions of rotation, segments of tools in the X or Z direction (XT/ZT), reference tip points, the rigidity of tools, tip clamping methods, cutting limits, feeding limits, the maximum cut withstanding volume, the permissible limits of intermittent cutting, the materials of tools, segments of roughing/finishing tools (R/F), and machine identification numbers. Accordingly, the data relating to the grinding wheels of the rotary tool for outside diameter grinding purposes comprise the tool identification numbers, the specifications for the grinding wheels, and the machine identification numbers.

Registered data of the machine tool information file comprises at least data relating to sequence numbers of machine tools, machining volume, machine identification numbers, machining method symbols, a machining process for each of machine tools, center hole supporting and machining processes, chucking and turning processes, a grinding process, segments of absolute values and increments, machinable dimensions, center-to-center distances, specifications for the tapering of a hole, permissible machining weights, specifications for the output and speed of the main spindle, segments of the main spindle for a workpiece and a tool, mechanical efficiency, the rigidity and allowable loads of the main spindle, the rigidity and allowable loads of a tailstock, specifications for gearshifts, specifications about replacement of tools, specifications for mechanical accuracy, segments of finish allowance volume, standard machine operation time, fixture replacement time, tool preparation time, workpiece replacement time, tool replacement time, a master relating to grinding machines, a master relating to drilling and tapping machines, a master relating to milling machines, a master relating to allowable sizes of fixtures, and data on operation and time of machine tools. Accordingly, input items of the machine tool information file are standardized.

Data of the fixture file within the machine tool information file are classified into data on a turning operation, data on a milling operation, and data on a grinding operation. The data comprise at least sequence numbers, chucking volume, machine identification numbers, the maximum/minimum chucking dimensions, the number of chucking pawls, segments of equal/unequal intervals of the pawls, the stroke of pawls (on one side), segments of synchronous/asynchronous movement of pawls, a shift of the positions of pawls, the direction of a pawl which specifies the direction of shift of the pawl, a distance between the mechanical standard position and the pawl standard position, the widths of pawls, the heights of pawls, specifications for through-holes, segments of pawls by shape, size, and volume, the positions of pawls in a pressing method, pressing directions, and fixture identification numbers. Accordingly, the data on the fixture file are classified into the data on the turning operation, the data on the milling operation, and the data on the grinding operation, and thereafter the data are standardized.

Data of a fixture file which relates to a turning operation comprise at least sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications of through-holes, segments of pawls by shape, size, and volume, the positions of pawls in a pressing method, pressing directions, and fixture identification numbers. Accordingly, the data of the fixture file that relates to the turning operation comprise input items such as the chucking volume, the machine identification numbers, and the fixture identification numbers.

Data of a fixture file which relates to a milling operation comprise at least sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications of through-holes, segments of pawls by shape, size, and volume, the positions of pawls in a pressing method, pressing directions, and fixture identification numbers. Accordingly, the data of the fixture file that relates to the milling operation comprise the chucking volume, the machine identification numbers, and the fixture identification numbers.

With regard to the cylindrical grinding of a workpiece while being supported at its double center holes, data of a fixture file which relates to a grinding operation comprise sequence numbers, chucking volume, machine identification numbers, the maximum/minimum chucking dimensions, and fixture identification numbers. On the other hand, with regard to the boring of a workpiece to create inside diameter while chucking it in a cantilever fashion or the turning of a workpiece to create outside diameter while chucking it in a cantilever fashion, the data comprises sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications for through-holes, segments of pawls by shape, size, and volume, the positions of pawls in a pressing method, pressing directions, and fixture identification numbers. Accordingly, the data of the fixture file that relates to the grinding operation comprise input items, such as the chucking volume, the machine identification numbers, and the fixture identification numbers, irrespective of the cylindrical grinding of a workpiece while being supported at its double center holes, the boring of a workpiece to create inside diameter while chucking it in a cantilever fashion, and the boring of a workpiece to create outside diameter while chucking it in a cantilever fashion.

Data relating to the cost information file comprises at least machine identification numbers, personnel costs, machine tool costs, running costs, and costs of tools. Accordingly, input items of the cost information file become standardized.

Data of a cost information file comprise at least the cost for purchasing machine tools, initial costs, a variety of annual expenses, and working conditions (annual uptime, the presence or absence of work shifts, a working shift pattern, and a pattern of days off). Costs are obtained using an expression for calculating hourly expenses which is based on the file containing the above mentioned data. Accordingly, the hourly expenses are calculated taking into consideration a variety of expenditures.

Data of a finishing allowance information file is provided with a format capable of discriminating at least between an outer diameter and an inner diameter and between a workpiece including a refining allowance and a workpiece without a refining allowance. The format is arranged so as to assign a finishing allowance to the inside of a segment composed of combinations of diameters and lengths, and it is also capable of reading a grinding allowance per diameter. A finishing allowance of a rod material requires an end face and an outer diameter finishing allowance depending on the length of a finished product and a finished diameter. Accordingly, the data on the finishing allowance are divided into segments depending on the length and diameter of a workpiece to be machined, and the thus divided data are standardized.

In consideration of input items such as at least shapes of materials, finished shapes, and materials, data of a file related to a machining method which automatically determines a cutting path are prepared on the basis of determination data on the direction of removal with reference to a machining method having a proven track record for a particular machining operation, a ratio of diameter to length, an allowance in the X direction, an allowance in the Z direction, the direction of removal, data on the shapes of materials, and data on finished shapes. Accordingly, the data are prepared on the basis of the determination data on the removing direction, referring to the machining method having a proven track record for a particular machining operation.

Data of a file relating to the cutting condition information are arranged in such a way that a variety of items, i.e., a cut rate, the depth of cut, and a feed, are filed as data using at least the materials of workpieces and tools as keywords. The machining conditions can be read by use of the materials of the workpieces and tools and the diameters of the tools. The materials of the tools are displayed in compliance with ISO, and the materials of the tools that use original symbols of manufacturers and users are translated into an ISO display. Using fuzzy logic, cutting conditions are obtained by substituting a given numerical value of a sequence of points, from among specific numerical values of conditions, into an interpolation equation or an expression for calculating the life of a tool. Original workpiece and tool material symbols of manufacturers and users are converted into standard symbols using a translation table. Accordingly, the data on the cutting conditions are prepared by translating the input tool material into a standard value, and by interpolating discontinuities in the input data.

Data of a surface treatment information file are made up of at least the JIS codes and variable dimensions. A procedure for processing the JIS codes and variable dimensions are obtained using input surface treatment symbols. Finished dimensions and process setting are processed using the thus obtained procedure and the dimensions. Accordingly, the pictorially input surface treatment symbol is converted into the standardized procedures and dimensions in compliance with the JIS codes.

Data of a thermally refining operation information file are designed in such a way that the details of heat treatment, the presence and absence of the designation of hardness, and material to be used are selected using at least heat treatment symbols as keywords. The setting of a process, erroneous input of the specification of hardness, the checking of an error in the used material, and the selection of machining conditions are carried out. Accordingly, a variety of heat treatment conditions are determined on the basis of the heat treatment symbols.

Data of a graphics information file are classified according to at least dimensional tolerance, the shape of a screw, and a pattern. As to the dimensional tolerance, basic numerical values corresponding to tolerance symbols, dimensions, and tolerance grades are prepared as data of the file using data on basic tolerances (upper or lower tolerances), basic IT tolerance, and differences in the grade of the IT tolerance. The tolerance is calculated from the basic numerical values that serve as a reference with respect to input tolerance symbols, input dimensions, and input tolerance grades of an area to be machined, using a tolerance calculation equation. Accordingly, the data on the tolerance are determined on the basis of the input tolerance symbol, dimensions, and tolerance grade.

The data of the graphics information file are classified according to at least dimensional tolerance, the shape of a screw, and a pattern. Data of a screw shape file comprise at least segments for the nominal designation of screws, nominal diameters of screws, pitches, grades, an upper dimension of an outer diameter, a lower dimension of the outer diameter, an upper dimension of an effective diameter, a lower dimension of the effective diameter, and the minimum root radius. Accordingly, threading specifications are determined on the basis of input data with regard to the shape of a screw thread.

The data of the graphics information file are classified according to at least dimensional tolerance, the shape of a screw, and a pattern. Data of the pre-formed hole file comprise at least nominal diameters of screws, pitches, the diameters of pre-formed holes, and the diameter of a chamfer of a screw. Accordingly, pre-forming specifications are determined on the basis of the input data on a pre-formed hole of a screw thread.

The data of the graphics information file are classified according to at least dimensional tolerance, the shape of a screw, and a pattern. A variety of items of data of a shape file are formed in compliance with at least a data input format. An input format of each data item is provided with a standardized pattern and a shape identification code. Data of a groove shape file comprise at least the type of groove, specifications for the bottom of a groove, specifications for groove width, a finish of a groove end face, specifications for the removal of the corners of a groove, and specifications for the chamfering of a groove. Data of a center hole shape file comprise at least an angle of a center hole, a nominal diameter of the center hole, a larger diameter of the center hole, the diameter of a chamfer, the diameter of a counterbore, the depth of a nominal diameter, the depth of a counterbore, the depth of a chamfer, and the radius from the center of a round.

Data of a keyway shape file comprise at least the segments of keyways, specifications for the widths of the keyways, the total lengths of the keyways, specifications for the depths of the keyways, the type of the keyway, specifications for cutters, and specifications for the reference positions of the keyways.

Data of a file relating to the shape and type of a keyway comprise at least the type of groove and specifications for cutters.

Data of a file relating to the shape of a key slot comprise at least segments of key slots, specifications for the widths of the key slots, the total lengths of the key slots, specifications for the depths of the key slots, the type of key slot, and specifications for the reference positions of the key slots.

Data of a file relating to the shape of a hole comprise at least specifications for the reference positions of holes, specifications for the holes, specifications for a countersink, specifications for the depths of the holes, the number of the holes, and specifications for the positions of the holes.

Data of a file relating to the shape of a tapped hole comprise at least the type of tapped holes, specifications for the reference positions of the tapped holes, specifications for the tapped holes, the number of the tapped holes, specifications for the positions of the tapped holes, specifications for countersinks, specifications for the depths of the tapped holes, and specifications for pre-formed holes.

Data of a file relating to the shape of an internal cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of an end cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of a grooved cylindrical cam comprise at least the type of cam, point numbers, specifications for the coordinates of the starting point, specifications for the coordinates of the end point, the dimension of the radius of a circular arc, the type of groove, and specifications for the depths of grooves.

Data of a file relating to the shape of a groove of a grooved cylindrical cam comprise the type of groove, specifications for the widths of grooves, and specifications for the depths of the grooves.

Data of a file relating to the shape of an external cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of an end-face grooved cam comprise at least the type of cam, point numbers, specifications for the coordinates of the starting point, specifications for the coordinates of the end point, specifications for circular arcs, the center positions of the circular arcs, the type of groove, specifications for cam grooves, the finishing of a groove surface, specifications of the depths of cam grooves, specifications for the removal of corners at the bottom of a groove, and specifications for chamfering the grooves.

Data of a file relating to the shape of grooves of an end-face grooved cam comprise at least the types of groove, specifications for cam grooves, the finish of groove surfaces, specifications for the depths of cam grooves, specifications for the removal of corners at the bottom of the groove, and specifications for the chamfering the groove corners.

Data of a file relating to the shape of a cylindrical outside plane/a cylindrical polygon comprise the type of plane, specifications for planes, and specifications for the depths of cylindrical outside planes.

Data of a file relating to the shape of an internal gear comprise at least the type of gear, specifications for gears, specifications for base tangent length, specifications for oversize pins, and finishing specifications.

Data of a file relating to the shape of an external gear comprise at least the type of gear, specifications for gears, specifications for base tangent length, specifications for oversize pins, and finishing specifications. Accordingly, data formats of a variety of pattern files are standardized.

Data of a machining method symbol information file comprise at least machining method symbols, a machining method, and the extent of roughing. Accordingly, a machining method and associated specifications are determined on the basis of the machining method symbol.

Data of a finishing symbol information file comprise at least finishing symbols, symbols used for a drawing, and roughness. Accordingly, a finishing method and associated specifications are determined on the basis of the finishing symbol.

Data of a material information file comprise at lest JIS codes, heat treatment symbols, tensile strength, hardness, and a specific cutting force. Accordingly, a machining method and associated specifications are determined on the basis of the JIS code and the heat treatment symbol.

Data of a positional and configurational accuracy information file comprise configurational and positional accuracy codes, the necessity or lack of necessity of a reference plane, and the designation of accuracy. Accordingly, a machining method and associated specifications are determined on the basis of the configurational and positional accuracy code, the necessity or lack of necessity of a reference plane, and the designation of accuracy.

Data on constants used in the tool life equation are defined for each of segments classified according to at least the material of a workpiece and the material of a tool. Accordingly, the data on constants are determined according to the materials of the workpiece and the tool.

Data on the finished shape of a workpiece displayed according to the metric system comprise at least a workpiece specification input format which is included in a sequence 1 of a data input format in a tabular form. The data are arranged in such a way as to make it possible to input:

- workpiece identification numbers capable of using a variable block input system;
- workpiece material identification numbers which are used as keywords for automatically complementing material data read from a file into the shape of material; and
- the name of a workpiece, the total length of a workpiece, the total width of the workpiece when it is input for milling, the diameter of a rod material, the material of a workpiece, the hardness of a workpiece material, the presence or absence of the heat treatment of a workpiece, the weight of a workpiece material (per one workpiece), the dimensions of a workpiece material, a machining process which the workpiece has already undergone, specifications for the finish of a workpiece which is not included in an entry (a finishing symbol and finished surface roughness), the necessity or lack of necessity of measured data for each process, the designated number of workpieces to be machined, the number of finished workpieces, revision of data used when previously input data are changed, an implementor, date, and comments. The same characters as are described in drawings are directly used as input data. Accordingly, the data on the finished shape of the workpiece displayed according to the metric system are input in a tabular form, thereby rendering the inputting of the data simple.

The initial value of the sequence number is one. The next sequence number is automatically generated every time the inputting of one input line has been completed. Accordingly, the data are input in an interactive manner.

The input format of the material shape data is used for inputting at least a sequence number, a step number, a previous C/R chamfer (C/R and size), specifications for the coordinates of the starting point (diameter and length), specifications for the coordinates of the end point (diameter and length), the radius of a circular arc, a subsequent C/R chamfer (C/R and size), and specifications for a taper/an angle/an inclination (segments, type, and size) in a tabular form. Accordingly, the material shape data are input in a tabular form, thereby rendering the inputting of the data simple.

The material shape data are input with respect to the left end surface of the material and the center line of the material which serve as the point of origin. The inputting of an upper half of the drawing starts from the point of origin in a counterclockwise direction with respect to the center line. Accordingly, data input procedures are standardized.

The finished shape data are input with respect to the left end surface of the material and the center line of the material which serve as the point of origin. The inputting of an upper half of the drawing starts from the point of origin in a counterclockwise direction with respect to the center line. Accordingly, data input procedures are standardized.

At least a stage number is automatically counted up when the material shape data are input, which makes the inputting of the stage number unnecessary. If the coordinates of the end point and the coordinates of the starting point match with each other, the coordinates of the next starting point will be automatically input in a complementary manner even when the inputting of them is omitted. Accordingly, the coordinates of the next starting point are automatically complemented if the coordinates of the end point and the coordinates of the next starting point match with each other.

The itemized data, which were at least automatically counted up and input in a complementary manner when the material shape data were input, are displayed in a discernible way in the form of combinations of, for example, a reversed display and a crosshatched display, a reversed blue display and a crosshatched black display, displays in different colors, and ornamental characters. Accordingly, the items are displayed so that the operator can discern the data that are automatically input in a complementary manner from other data items.

The itemized data, which were at least automatically counted up and input in a complementary manner when the finished shape data were input, are displayed in a discernible way in the form of combinations of, for example, a reversed display and a crosshatched display, a reversed blue display and a crosshatched blue display, a reversed blue display and a reversed black display, displays in different colors, and ornamental characters. Accordingly, the items are displayed so that the operator can discern the data that are automatically input in a complementary manner from other data items.

If the automatic inputting of data, the automatic counting up of the stage number, and the inputting of the coordinates of the end point on the current stage are carried out at the time of inputting the data, the coordinates of the end point of the previous stage are automatically quoted for the coordinates of the starting point of the current stage. If the input coordinates of the starting point do not match with the coordinates of the end point of the previous stage, a stage will be automatically added, and items for diameter and length will be automatically complemented. An increment of length is input together with a ± sign at the time of the inputting of the length. If length is input without the ± sign, the input is identified as the input of the absolute value.

In the inputting of the radius of a circular arc, a plus sign denotes that the circular arc starts from the coordinates of the staring point to the coordinates of the end point in a counterclockwise direction, whereas a minus sign denotes that the circular arc starts from the coordinates of the starting point to the coordinates of the end point in a clockwise direction. A taper is designated by T, an angle is designated by A, and a slope is designated by S. The type of taper is designated by four alphanumerics. The first two characters show the type of taper, and the following two characteristics show the size of the taper. The sizes of a taper and a slope are input in the form of a series of digits including a decimal point. The digits to the left of the decimal point show a numerator, and the digits to the right of the decimal point show a denominator. Accordingly, procedures for inputting data with regard to a length and the radius of a circular and rules for inputting taper data are standardized.

A data format for inputting finished shapes has at least the following items arranged in a tabular form, namely, a sequence stage number, a previous C/R chamfer (C/R and size), specifications for the coordinates of the starting point (diameter and length), specifications for the coordinates of the end point (diameter and length), the radius of a circular arc, a subsequent C/R chamfer (C/R and size), specifications for a taper/an angle/an inclination (segments, type, and size), tolerance symbols, difference between an upper dimension and a lower dimension, finishing symbols, the roughness of a finished surface, the accuracy of shape and position, specifications for screws, specifications for a thermal refining operation, and specifications for surface treatment. Accordingly, the data input is standardized.

In the inputting of data, a skip for skipping a data input is executed by use of a special key or a soft menu key set to skipping;

backspacing is carried out by use of a special key or a soft menu key set to backspacing;

quotation of data on an upper stage when the same data are used is carried out by use of a special key or a soft menu key set to quotation;

a machining method symbol is input while being added to a finishing symbol, and a decision as to whether or not machining is possible on the basis of the machining method symbol and the finishing symbol is made using a finishing symbol and a machining method symbol of a machining method symbol file;

configurational and positional accuracy data are input using at least three elements, that is, a symbol, a reference plane, and accuracy, and each of the elements is checked by verifying the elements against a configurational and positional accuracy file, whereby it is confirmed if the symbol is correct and if the reference plane is necessary;

a decision as to whether or not the inputting of a heat treatment symbol, hardness designation, and material to be used is correct, is carried out by checking them with a refining file data, and an alarm sounds if the inputting is correct;

the inputting of specifications extending over stages comprises the inputting of at least a reference stage, segments of the starting and end shoulders of a reference position, stages for which machining is designated, length and dimension with respect to the reference position, tolerance symbols, an upper tolerance, and a lower tolerance;

the inputting of grooving data comprises the inputting of at least groove numbers, a reference stage, segment (S/E) from the starting and end shoulders, stages for which grooving is designated, segments (S/E) of groove ends with reference to a specified position, specifications for dimensions with respect to the shoulders, the types of groove, specifications for the bottom of the groove, specifications for the widths of the grooves, the finishing of the starting-point side end face of the groove, the finish of the end-point side end face of the groove, specifications for the removal of corners of the groove, and specifications for the chamfering of the groove;

the inputting of keyway data comprises the inputting of at least keyway numbers, a previous stage, a subsequent stage, segments of the keyways, specifications for the widths of the keyways, the total lengths of the keyways, specifications for the depths of the keyways, the type of keyway, specifications for cutters, and specifications for the reference position of the keyway;

the inputting of key slot data comprises the inputting of at least key slot numbers, a previous stage, a subsequent stage, segments of the key slots, specifications for the widths of the key slots, the total lengths of the key slots, specifications for the depths of the key slots, the type of key slot, specifications for cutters, and specifications for the reference position of the key slot;

the inputting of reamed hole data comprises the inputting of at least the order of machining, hole numbers, stages for which reaming is designated, the type of reamed hole, specifications for the reference position, specifications for the reamed holes, specifications for countersinks, specifications for the depths of the reamed holes, the number of the reamed holes, and specifications for the positions of the reamed holes;

the inputting of tapped hole data comprises the inputting of at least the order of screwing, tapped hole numbers, stages for which tapping is designated, the type of tapped hole, specifications for the reference position, specifications for the tapped holes, the number of the tapped holes, specifications for the positions of the tapped holes, tapped hole numbers, flute spacing angles, counterbores, specifications for countersinks, specifications for the depths of tapped holes, and specifications for pre-tapped holes;

the inputting of internal cam data comprises the inputting of at least cam numbers, stages for which machining is designated, specifications for the standards of internal cams, the types of internal cam, point numbers, specifications for the coordinates of a starting point, specifications for the coordinates of an end point, specifications for the radius of a circular arc, specifications for the finishing of a cam surface, and specifications for chamfering the internal cam, or the inputting of an angle of the center of the circular arc instead of the radius of the circular arc and the coordinates of the center of the circular arc specified by a distance from the circular arc to its center;

the inputting of end cam data comprises the inputting of at least cam numbers, stages for which machining is designated, specifications for end cams, the type of cam, point numbers, specifications for the coordinates of the starting point, specifications for the coordinates of the end point, specifications for the radius of a circular arc, specifications for the finishing of a cam surface, and specifications for chamfering the cam, or inputting of the radius of the circular arc, an angle of the center of the circular arc, and a curved surface of the circular arc specified using a dimension from the shoulder of the center of the circular arc;

the inputting of grooved cylindrical cam data comprises the inputting of at least cam numbers, stages for which machining is designated, specifications for the standards of cylindrical cams, the types of grooved cylindrical cam, point numbers, specifications for the coordinates of the starting point, specifications for the coordinates of the end point, specifications for the radius of a circular arc, the types of groove, specifications for the widths of the grooves, specifications for the depths of the grooves, specifications for the removal of corners of the cam, and specifications for chamfering the cam, or the inputting of the radius of the circular arc, an angle of the center of the circular arc, and the inputting of a curved surface of the circular arc specified by a dimension from the shoulder of the center of the circular arc;

the inputting of outer cam data comprises the inputting of at least cam numbers, stages for which machining is designated, specifications for the standards of outer cams, the type of the outer cam, point numbers, specifications for the coordinates of the starting point, specifications for the coordinates of the end point, specifications for the radius of a circular arc, specifications for the finish of a cam surface, specifications for the chamfering of a cam on the starting point side in a widthwise direction, and specifications for chamfering the cam on the end point side in the widthwise direction, or the inputting of the radius of the circular arc, an angle of the center of the circular arc, and a curved surface of an arbitrary circular arc specified by a dimension from the shoulder of the center of the circular arc;

the inputting of a grooved end cam comprises the inputting of at least cam numbers, stages for which machining is designated, the type of the grooved end cam, segments of the grooved end cams, point numbers, specifications for the coordinates of the starting point, specifications for the coordinates of the end point, specifications for the radius of a circular arc, specifications of the center of the circular radius, the types of groove, specifications for grooves of the cam, the finish of a grooved surface in which the grooves have a small diameter, the finish of a grooved surface in which the grooves have a large diameter, specifications for the depths of the grooves of the cam, specifications for the removal of corners at the bottom of the groove, and specifications for chamfering the grooves, or the specification of the center position of the circular arc comprises the specified inputting of a curved surface of an arbitrary circular arc using a distance from the radius center of the circular arc, an angle of the center of the circular arc with respect to the reference point, or the X and Y coordinates;

the inputting of regular polygon data comprises the inputting of at least plane numbers, specifications for the reference position, the type of plane, the number of planes, specifications for the planes, and specifications for the depths of cylindrical outside planes;

the inputting of internal gear data comprises the inputting of at least internal gear numbers, specifications for the reference position of the internal gear, the type of the internal gear, specifications for the internal gears, specifications for oversize pins, and specifications for the finishing of an internal gear, or the inputting of specifications for base tangent lengths for use in a specifying method which measures the thickness of teeth of a gear, tolerance symbols, an upper tolerance, and a lower tolerance; and the inputting of external gear data comprises the inputting of at least external gear numbers, specifications for the reference position, the type of gear, specifications for the external gears, specifications for base tangent length, and specifications for the finish of the external gears, or the inputting of specifications for oversize pins for use in a specifying method which measures the thickness of teeth of a gear. Accordingly, the inputting of a variety of data items is standardized.

The processing of a finished pattern is calculated from data which comprise at least a diameter, a length, a radius, a width, a depth, an angle, a nominal dimension of a screw, and tolerance symbols or tolerance (an upper tolerance and a lower tolerance). The shape and dimension of a workpiece to be machined are decided. If surface treatment is specified, data are read from a surface treatment data file, whereby the shape and dimension of the workpiece before being subjected to surface treatment are calculated. Accordingly, the final shape and dimension of the workpiece are determined on the basis the input data.

In the processing of the shape of a workpiece finished by a screw thread, upper and lower dimensions of an external or internal diameter and upper and lower dimensions of an effective diameter of a female or male screw are read from a screw shape data file. The shape and dimension of a finished workpiece are obtained by averaging the thus read data. Accordingly, the shape and dimension of the finished workpiece are determined by averaging the data with regard to screw shapes.

In the graphical processing of a workpiece before having finished undergoing another process, a finishing allowance of each part is read from a finishing allowance data file on the basis of at least a finishing symbol of each part, finished surface roughness, and refining data, using diameter and length as keywords. The thus read finishing allowance is added to the final shape and dimension of the workpiece before undergoing surface treatment. Accordingly, a finishing allowance of each part is automatically added to the final shape and dimension of a workpiece before undergoing surface treatment.

An external diameter, an internal diameter, an end face, and a groove are identified using at least information about the starting point and the end point. The direction of input data is calculated, and the sizes of the input data are compared with each other on the basis of the coordinates of the end and starting points, whereby signs of the data are determined. The reference of constituent line segments is represented by a line segment of X+ which serves as the reference line. A phase angle in a counterclockwise direction with respect to the reference line, that is, the line segment of X+, has a plus sign. A phase angle θ of the constituent line segments of the drawing is obtained by the following expression.

$$\theta=\tan^{-1}[\{(\text{coordinates of end point; } X)-(\text{coordinates of starting point; } X)\}/\{(\text{coordinates of end point; } Z)-(\text{coordinates of starting point; } Z)\}]-90^\circ$$

The discrimination of a pictorial pattern and the discrimination of pictorial space are carried out by combination of the constituent line segments. Accordingly, the pictorial pattern and the pictorial space are discriminated from each other by analyzing the input data.

Pattern discrimination comprises at least the steps of:

judging whether or not the coordinates of the Z end point on a Z+ stage are the maximum values in a data sequence, and determining data up to the current stage as an internal diameter if the coordinates of the Z end point are the maximum values of a pattern;

judging whether or not the coordinates of the Z starting point on a Z− stage are the maximum values of the pattern if the coordinates of the Z end point have been judged as not being the maximum values of the pattern, and determining data following the current stage as an external diameter if the coordinates of the Z starting point have been judged to be the maximum values of the pattern;

judging whether the data sequence is Z+, X+, and Z± when the coordinates of the if the coordinates of the Z starting point on the Z− stage have been judged as not being the maximum values of the pattern, and judging whether or not the coordinates of the Z end point on the Z+ stage are the maximum values of the pattern if the data sequence is Z+, X+, and Z±, and determining that the data on the X+ stage relate to an end face if the coordinates of the Z end point have been judged as not being the maximum values of the pattern;

determining that the data on the X+ stage relate to a Z+ side end face if the coordinates of the Z end point on the Z+ stage have been judged as being the maximum values;

judging whether or not the data sequence is Z−, X−, and Z± if the data sequence has been judged as not being Z+, X+, and Z±, and judging whether or not the coordinates of the Z end point on the previous Z− stage are the minimum values of the pattern if the data sequence has been judged as being Z−, X−, and Z±, and determining that the data on the X− stage relate to an end face;

determining that the data on the X− stage relate to a Z0 side end face if the coordinates of the Z end point on the previous Z− stage are the minimum values of the pattern;

judging whether or not the data sequence is X+, Z+, and X− if the data sequence has been judged as not being Z−, X−, and Z±, and judging whether or not data sequences before and after the current data sequence relate to grooves if the data sequence is X+, Z+, and X−;

identifying the extent of reversal of data as a groove by removing a difference in the size of reversed X data in the case of a multistage groove, and identifying similar multistage grooves in subsequent stages by replacing the X data with pictorial data of the multistage grooves;

determining the pattern as a one-stage groove having an inner diameter if the data sequence is not X+, Z+, and X−;

determining a groove as a multistage groove having an inner diameter if the data sequences before and after the current data sequence are judged as the groove;

judging whether or not the data sequence is X−, Z−, and X+ if the data sequence has been judged as not being X+, Z+, and X−, and judging whether or not the data sequences before and after the current data sequence relate to a groove if the data sequence is X−, Z−, and X+, and determining the groove as one-stage groove having an external diameter if the data sequences before and after the current data sequence do not relate to the groove;

determining the groove as a multistage groove having an external diameter if the data sequences before and after the current data sequence are judged as the groove;

judging whether or not the data sequence is Z−, X+, and Z+ if the data sequence is judged as not to be X−, Z−, and X+, and judging whether or not the data sequences before and after the current sequence relate to a groove if the data sequence is Z−, X+, and Z+, and determining the groove as one-stage groove of the Z+ side end face if the data sequences before and after the current data sequence do not relate to the groove;

recognizing pictorial space of the data sequence and identifying a multistage groove of the Z+ side end face if the data sequences before and after the current data sequence are judged as a groove;

judging whether or not the data sequence is Z+, X−, and Z− if the data sequence has been judged as not being Z−, X+, and Z+, and judging whether or not the data sequences before and after the current data sequence relate to a groove if the data sequence is judged as Z+, X−, and Z−, and determining the groove as one-stage groove on the Z− side end face if the data sequences before and after the current data sequence have been judged as not being the groove;

determining the groove as a multistage groove on the Z− side end face if the data sequences before and after the current data sequence are judged as the groove;

adding an identification label to each of analyzed data stages; and judging absence or presence of the remaining data if the data sequence has been judged as not being Z+, X−, and Z−, and deleting the data at the beginning of the analyzed data sequence if the remaining data exist, and reading the next data and incrementing that data by one stage, and repeating these operations until there are no remaining data. Accordingly, the data with regard to several stages are compared and analyzed, and a pattern name and a pattern code are provided to each line segment. The creation, selection, and determination of a tool shape, and a decision with regard to the position of the tool are carried out on the basis of the result of the pattern identification.

A machining process is determined by identifying the final machining process using at least data on the discrimination of machines in one sequence, the discrimination of processes, the entire length, the diameter of material, materials to be machined, workpiece materials, heat treatment, the sizes of the workpiece materials, a process which material has finished undergoing, and the number of finished workpieces, or data on center holes, tolerance symbols, upper and lower tolerances, finishing symbols, finished surface roughness, configurational and positional information, the accuracy of a screw, thermally refining symbols, hardness, specifications for surface treatment, grooves, keyways, key slots, bored keyways, holes, tapped holes, internal cams, end cams, grooved cylindrical cams, external cams, grooved end cams, cylindrical outside planes, cylindrical outside polygons, internal gears, and external gears. A machining process is automatically determined on the basis of the input data.

The processing of the machining process is determined by at least the steps of:

determining the presence or absence of a process which material has finished undergoing;

determining the presence or absence of heat treatment of the material using heat treatment data if there is no process which the material has finished undergoing, and judging from an input or information of a machine master file whether one piece or a plurality of pieces of workpiece material are formed if the material is subjected to heat treatment;

judging whether or not the material has double center holes if it is judged that one piece of workpiece material is to be formed, and judging from input pictorial data, in view of the diameter and length of the material, whether or not the material can be chucked in a cantilever fashion if the workpiece material has a single center hole;

determining whether or not the size of the workpiece material>(the entire length of a workpiece+2×a finishing allowance);

setting a process of cutting the material one by one if the size of the workpiece material>(the entire length of a workpiece+2×a finishing allowance);

sounding an alarm if it is judged that the size of the workpiece material≦(the entire length of a workpiece+2×a finishing allowance);

comparing the capacity of a thermally refining furnace with the size of the workpiece material if a plurality of pieces of workpiece material are to be obtained;

sounding an alarm if there is no description of the size of the workpiece material;

judging whether or not the machine is a bar feeding machine if it is judged that (the capacity of the material thermal refining furnace)≧(the size of the workpiece material), and calculating the maximum value of dead-weight deflection (δmax) from the entire length of the material if the machine is judged as the bar feeding machine;

determining δmax≦k, and setting a process of forming a plurality of pieces of workpiece material if δmax≦k;

sounding an alarm if δmax>k;

judging whether the machine is a bar feeding machine if the capacity of the thermally refining furnace is smaller than the size of the workpiece material, and determining Lc which satisfies the following three expressions if the machine is judged as not being the bar feeding machine, that is, $Lc=(8\times E\times I\times \delta max/W)^{1/3}$+a tong hold, Lc>(the entire length of a workpiece+a cutting allowance)×N+a tong hold, and Lc<(the capacity of a material thermal refining furnace), where N is an integer and δmax is the maximum value of dead-weight deflection;

setting a cutting process for forming a plurality of pieces of workpiece material while the material is chucked in a cantilever fashion;

calculating δmax on the basis of the entire length of the material if the machine is judged to be a bar feeding machine;

judging whether or not δmax≦k, and calculating the length of the material to be cut by use of the following three expressions if δmax≦k, that is, (capacity of material thermally refining furnace)≧{entire length of workpiece material+cutting allowance+(2×finishing allowance)}×$N$+tong hold, $$Lb \geqq \{\text{entire length of a workpiece+cutting allowance+(2×finishing allowance)}\} \times N\text{+tong hold},$$

and $$Lb<\text{(capacity of material thermally refining furnace)},$$

where Lb is the length of a workpiece when the material is cut into a plurality of pieces of workpiece material while being fed on the bar feeding machine, and setting a process of cutting the material into a plurality of pieces of workpiece material while being fed on the bar feeding machine;

sounding an alarm if it is judged as δmax>k, setting the material thermally refining process;

storing the process in which the material has finished undergoing processing;

determining the presence or absence of the heat treatment of material using the heat treatment data;

judging from an input or information of the machine master file whether one piece or a plurality of pieces of workpiece material are formed, and judging whether or not the workpiece material has double center holes if it is judged that one piece of workpiece material is to be formed, and judging from the input pictorial data and data on the height of a pawl of a fixture file and the diameter to be chucked whether or not the material can be chucked in a cantilever fashion if the workpiece material has a single center hole;

determining whether or not the size of the workpiece material≧(the entire length of a workpiece+2×a finishing allowance) if the material can be chucked in a cantilever fashion;

setting a process of cutting the material one by one if the size of the workpiece material≧(the entire length of a workpiece+2×a finishing allowance);

sounding an alarm if it is judged that the size of the workpiece material<(the entire length of the workpiece+2×a finishing allowance);

judging whether or not the machine is a bar feeding machine if it is judged that a plurality of pieces of workpiece material are to be obtained, and calculating δmax from the entire length of the material if the machine is judged to be the bar feeding machine;

determining δmax≦k, and setting a process of forming a plurality of pieces of workpiece material if δmax≦k;

sounding an alarm if δmax>k; and determining Lc, which is a length of the material to be cut while being chucked in a cantilever fashion, using the following two expressions on the basis of δmax≦k if the machine is judged as not to be the bar feeding machine, that is, $$Lc=(8\times E\times I\times \delta\text{max}/w)^{1/3}\text{+tong hold},$$

and

Lc≧(the entire length of a workpiece+a cutting allowance)×N+a tong hold, where N is an integer and w is a uniform load. Accordingly, a machining process is selected and determined on the basis of the input data of a workpiece to be machined.

The processing of the process for cutting the material one by one comprises at least the steps of:

choosing all of machines which possess cutting processes from among machines which are registered as ones to be use for cutting in a machine tool file according to material and the diameter of the material;

calculating a per-unit tentative machining time and cost by reading preparation time, preparation cost, a cross-sectional area to be hourly machined depending on material, and machining cost from a data file which includes the number of pieces of material to be machined and the selected machines; and arranging the selected machines in order of precedence of cost and in order of precedence of per-unit machining time, and recording the thus determined order of the selected machines into a cutting process file. Accordingly, the machine best suited to cut material into a single workpiece is determined.

The determination of the machining process comprises at least the steps of:

identifying the number of center holes;

judging whether or not the machining process includes a turning operation if workpiece material has a single center hole;

issuing a warning so that the material can be subjected to double center hole machining by inputting a tentative center hole pattern if the machining operation includes the turning operation;

determining a change of process from a single center hole machining process to a single center hole turning process if the machining process does not include the turning operation;

determining a change of process from a double center hole machining process to a double center hole supported machining process if the workpiece material is supported at its double center holes;

employing a chucked turning process if the workpiece material has no center holes;

judging, from the entire length, a finishing symbol, the roughness of a finished surface, and the position of the center, whether or not the current process is a single center hole supported turning process;

selecting all the machines that machine the center hole in another process from among machines which are registered as ones to be used in a single center hole machining process in a machine tool file according to the entire length of the machines and the diameter of material if the current process is the single center hole supported machining process, and reading preparation time, preparation costs, an hourly removal capacity, and machining costs from the file of the selected machines on the basis of the number of workpieces to be machined and the volume of the center hole to be removed, and calculating per-unit tentative machining time and tentative machining costs from the thus read data;

arranging the selected machines in order of precedence of cost and in order of precedence of per-unit machining time, and recording the thus arranged machines in the single center hole process file; and setting a process in which the center hole is formed in the workpiece material by turning while being chucked together with the execution of another machining operation if the current process is judged as not to be the single center hole supported machining process. Accordingly, machining processes are selected from the conditions with regard to the center hole machining and the turning, and a suitable machining process is determined taking into consideration the machining cost or time.

The processing of the single center hole supported turning process comprises at least the steps of:

choosing all of machines which machine the center hole in another process from among machines which are registered as ones to be used in a single center hole supported turning process in the machine tool file according to the entire length of the machines, the diameter of material, the number of workpieces to be machined, tolerance symbols, upper and lower tolerances, finishing symbols, the roughness of a finished surface, configurational and positional accuracy, and the accuracy of a screw;

reading preparation time, preparation costs, an hourly removal capacity, and machining costs from the file of the selected machines on the basis of the number of workpieces to be machined and the volume of the material to be removed as a result of a turning operation, and calculating per-unit tentative machining time and tentative machining costs from the thus read data;

arranging the selected machines in order of precedence of cost and in order of precedence of per-unit machining time, and recording the thus arranged machines in a single center hole supported turning process file. Accordingly, the machine best suited to turning of a workpiece while being supported at its single center hole is determined on the basis of the input data and the machining cost or time.

The selection of a machine for use in a double center hole machining process comprises at least the steps of:

judging from the entire length of a workpiece material, a finishing symbol, the roughness of a finished surface, and the position of the center hole whether or not the current process is the double center hole supported machining process;

checking the process with a file possessing data on the presence or absence of special specifications of the center hole if the current process is the double center hole supported machining process;

choosing all of machines which machine double center holes in another process from among machines which are registered as ones to be used in a standard double center hole machining process in the machine tool file if the center holes do not have any special specifications;

reading preparation time, preparation costs, an hourly removal capacity, and machining costs from the file of the selected machines on the basis of the number of workpieces to be machined and the volume of the material to be removed as a result of machining, and calculating per-unit tentative machining time and tentative machining costs from the thus read data;

arranging the selected machines in order of precedence of cost and in order of precedence of per-unit machining time, and recording the thus arranged machines in a double center hole drilling process file;

discriminating between the single center hole machining process and the chucked machining process if the current process is judged as not to be the double center hole supported machining process from the position of the center hole;

choosing all of machines which machine double center holes in another process from among machines which are registered as ones to be used in a special double center hole machining process in the machine tool file if the center holes are identified as having special specifications;

reading preparation time, preparation costs, an hourly removal capacity, and machining costs from the file of the selected machines on the basis of the number of workpieces to be machined and the volume of the material to be removed as a result of machining, and calculating per-unit tentative machining time and tentative machining costs from the thus read data; and arranging the selected machines in order of precedence of cost and in order of precedence of per-unit machining time, and recording the thus arranged machines in a special double center hole drilling process file. Accordingly, the machine best suited to the machining of a workpiece while being supported at its double center holes is determined on the basis of the input data and the machining cost or time.

The processing of the double center hole supported turning process comprises at least the steps of:

choosing all of machines which machine the center hole in another process from among machines which are registered as ones to be used in a double center hole supported turning process in the machine tool file according to the entire length of the machines, the diameter of material, the number of workpieces to be machined, tolerance symbols, upper and lower tolerances, finishing symbols, the roughness of a finished surface, configurational and positional accuracy, and the accuracy of a screw;

reading preparation time, preparation costs, an hourly removal capacity, and machining costs from the file of the selected machines on the basis of the number of workpieces to be machined and the volume of the material to be removed as a result of a turning operation, and calculating per-unit tentative machining time and tentative machining costs from the thus read data;

arranging the selected machines in order of precedence of cost and in order of precedence of per-unit machining time, and recording the thus arranged machines in a double center hole supported turning process file. Accordingly, the machine best suited to the turning of a workpiece while being supported at its double center holes is determined on the basis of the input data and the machining cost or time.

The process of turning material while chucking it comprises at least the steps of:

choosing all the machines, which are registered as ones to be used in turning material while chucking it, in the machine tool file, according to the entire length of material, the diameter of the material, the number of workpieces to be formed from the material, tolerance symbols, upper and lower tolerances, finishing symbols, the roughness of a finished surface, configurational and positional accuracy, and degrees of the accuracy of a screw;

calculating tentative machining time and cost per single workpiece on the basis of the number of workpieces to be produced and the volume to be removed as a result of turning, by reading preparation time, preparation cost, per-hour removing volume, machining costs, and the like, from the file of the selected machines;

calculating the volume to be removed which is used for determining an area to be machined, as well as the product of the volume to be removed and the averaged diameter of the material;

handling the product of the volume to be removed and the averaged diameter of the material as a coefficient which includes a time factor at the time of machining and is produced by obtaining an average radius between the radius of the material and the radius of the finished material in each stage, and by multiplying the volume to be removed in each stage by the average radius in each stage;

defining an area of the material between its maximum outside and minimum inside diameters, setting the maximum outside diameter and the minimum inside diameter on respective sides of the material in such a way as to be equal to half the product of the volume to be removed and the average diameter, and taking that one of the sides which has a larger product of the volume to be removed and the average diameter as a first side to be machined;

identifying whether or not the first side to be machined has a chucking allowance, and calculating tentative machining time and cost required to machine the workpiece material up to the coordinates representing the area that requires the maximum outside chucking diameter or up to the coordinates representing the area that requires the minimum inside chucking diameter, if the first side has a chucking allowance;

roughing half the material in the first machining step and the other half of the workpiece material in the second machining step, if the product of the volume to be removed and the average diameter with regard to the maximum outside diameter or the minimum inside diameter is twice or more as large as the product of the volume to be removed and the average diameter, with regard to another outside diameter or the inside diameter;

finishing the workpiece material by one operation in the second machining step if it is judged from the finishing symbols and designation of the roughness of a finished surface that a certain accuracy cannot be ensured by machining the workpiece material in several steps, or dividing the operation for finishing the workpiece material into several steps if the accuracy can be ensured, machining the area to be machined in the second machining step prior to the area to be machined in the first step irrespective of the result of the above processing procedures, if the area continued from the area to be machined in the first step will become a tapered portion having an acute cone angle or a screw thread, and no chucking allowance will be available as a result of the machining operation in the first step, and then machining the area to be machined in the first step;

calculating tentative machining time and cost required to machine the workpiece material up to the coordinates representing the opposite side of the workpiece material that has the maximum outside diameter in relation to the side of the workpiece material that is chucked, or tentative machining time and cost required to machine the workpiece material up to the coordinates representing the opposite side of the workpiece material that has the minimum inside diameter in relation to the side of the workpiece material that is chucked, if it is judged that no chucking allowance is available; and setting the machines in order according to cost and in order according to machining time, respectively, and record the prioritized machines in a file. Accordingly, the machine best suited to the turning of a workpiece while being chucked in a cantilever fashion is determined on the basis of the input data, the volume to be removed as a result of the machining operation, the machining cost and time, and machining procedures.

Processing carried out after it has been decided whether or not areas to be machined still remain comprises at least the steps of:

identifying whether or not there is a process for machining remaining areas on the basis of finishing symbols and the roughness of a finished surface;

identifying the presence or absence of a process file if an area to be machined still remains;

calculating the volume to be machined for each remaining area to be machined, and arranging the thus calculated volumes in descending order of size;

arranging a turning operation, a honing operation, a super finishing operation, and a variety of special finishing operations in descending order of degree of the roughness of a surface finished by each operation, and arranging the process, after these two elements, that is, the order of the size of the volume and the order of the degree of the roughness, have been combined together, in such a way that the priority is given to the finished surface roughness;

identifying the extent to which the inputting of data to a process has been completed if it is judged that there is a process file, and continuing the processing in order of process file if designated data input with regard to all of the processes has already been completed; and calculating the volume to be removed for the remaining area to be machined, if data input with regard to the process has been partially finished. Accordingly, processing associated with the remaining machining process is determined on the basis of the volume to be removed and the roughness of a finished surface.

A process for selecting a machine to be used in each process for machining a remaining area comprises at least the steps of:

identifying whether or not there is a remaining process;

selecting a machine to be used when machining the area, which is used to be machined in a predetermined order, from the input data, if there is a remaining process;

calculating tentative machining time and cost per single workpiece material from the number of workpiece materials to be machined and the volume to be removed, by reading preparation time and cost, per-hour removing volume, and machining costs from the file related to the selected machines; and setting the machines in order according to cost and in order according to machining time per single workpiece material, respectively, and recording the prioritized machines in an n-th process file. Accordingly, a machine which is used in executing the remaining machining process is determined on the volume to be removed and the machining cost and time.

A final machining process is determined by identifying and quoting machining processes, utilizing input drawings, designated processes, a process file, a fixture file, a tool file, a cost file, a drawing file, and data items unarchived from these files. Accordingly, the final machining process is determined on the basis of the standardized data.

In machining process determination processing for determining the selection of a machine to be used in a machining process, at least one of several requirements, that is, requirements for minimizing the number of machine tools, requirements for giving priority to machining cost, and requirements for making the availability factor uniform, is taken into consideration, and a machine tool is selected by adding requirements of a tool of a machine having a graphic processing volume to any one of the above requirements. Accordingly, the machine used in the machining process is determined so as to improve the productivity of the process.

Procedures for determining a process comprises at least:

identifying whether priority is given to machining cost or machining time;

reading minimum machining cost processes defined between the first to the n-th process from a file, which is prioritized according to machining cost, in a machining process file, if priority is given to machining cost;

reading minimum machining time processes defined between the first to the n-th process from a file, which is prioritized according to machining time, in the machining process file, if priority is given to machining time;

identifying whether or not an identical machine is chosen for the selected processes;

identifying whether or not the processes can be grouped by chucking and machining directions if the identical machine is chosen, and grouping the processes only when the processes are included in the identical chucking or machining process;

grouping the processes if tools having the identical machining function, tools having a similar function, and finishing symbols and the roughness of finished surfaces which are related to these tools, are ranked equal or below a certain level;

separating the processes into different processes if thermal refining processing, roughing associated with another machine, and measurement are included between the processes of the selected machines;

listing the processes that have been selected in the processing prior to the current processing, and determining and setting processes in order according to machining cost or machining time;

obtaining a cutting rate ($V_{min}$) which minimizes cutting cost from the following expression if the priority is given to cost, and obtaining a cutting rate ($V_{pmax}$) which minimizes machining cost from the following expression $$V_{min}=S\{C_w/((1/n)-1)(C_w \cdot t_{tc}+C_t)\}^n$$

$$V_{pmax}=S/\{((1/n)-1)t_{tc}\};$$

and deciding a machining order according to a descending order of volume to be removed, a descending order of tolerance width, and an ascending order of finishing symbol. Accordingly, the machining process is determined in such a way that the optimum machining time or cost is obtained.

A per-process machine program comprises the steps of:

utilizing the machining drawing used in the previous machining process as a material drawing for the current process;

identifying whether or not the direction of removing has been designated;

determining the direction of removing during the turning operation by evaluating the productivity associated with the removing direction, which was calculated from the cross sectional area of a cutting allowance, the cutting allowance, a machining length ratio obtained from a machining length ratio of the length in the Z (axis) direction to the length in the X direction (in the direction of the end face) in combination with the maximum depth of cut, mechanical rigidity, and tool rigidity, using the machining time;

retrieving a tool file using a graphic code obtained as a result of processing graphical input data, and searching for all tools that have a match with regard to graphical processing function codes;

selecting and determining tools best suited to processing on the basis of the maximum and minimum productivity determined by the number of tools;

retrieving a fixture of a machine tool file, which are input for each machine tool in the n-th process, from input drawings using the area to be chucked as a key item; and determining the optimum fixture common to processing by selecting a fixture which most closely fits the chucking diameter for each area to be machined, from the selected and aligned fixtures. Accordingly, a machining operation in each process is determined on the basis of the conditions with regard to the tools and the fixtures.

A machine program for use in a cutting process, which uses the entire length and diameter of material and the size of workpiece material, comprises at least the steps of:

subjecting the material to processing of a bar feeding machine if the material is a long material such as a polishing material and a rod material, and cutting the rod material into a single piece if the bar feeding machine is not registered in the program;

cutting the rod material to a less than a predetermined value if the size of the workpiece material is in excess of the workpiece material;

reading the diameter and entire length of the material, from a file relating to a finishing allowance used in turning the rod material, as variables; and reading a corresponding machine from a machine tool file, using data based on the entire and diameter of the material and the size of the workpiece material. Accordingly, a machine used to cut a workpiece is determined on the basis of the dimension of the workpiece and the presence or absence of the bar feeding machine.

A machine program for use in a turning process uses data of a variety of files relating to; for example, a drawing of a workpiece before it has finished undergoing another process, which was calculated in the graphical processing of the workpiece before it has finished undergoing another process by utilization of, at least, input data with regard to a row material and a finish (a file relating to the shape of a workpiece while it undergoes an intermediate finishing process); machine tool information; tool information; cutting condition information; material information, machining method symbol information; finishing symbol information; finishing allowance information; surface treatment information; thermal refining information; and cost information. Machining is carried out on the basis of the standardized data.

A method of determining a removing direction in the turning process comprises at least:

retrieving temporal tools from a tool file, and reading tool conditions from the same file;

retrieving a universal roughing tool having the maximum tool rigidity, a universal roughing tool capable of producing the maximum depth of cut, a universal roughing tool having the maximum feed, and a tool having the minimum projection with respect to a tool holder from the tool file, and reading tool ID numbers, the tool rigidity, the maximum depth of cut, the maximum feed, and the projection of the tool from the tool holder;

reading specific cutting force from a material file using a workpiece material as a keyword;

adopting the interpolating method based on fuzzy logic;

calculating a ratio of the radial rigidity to the axial rigidity of the tool;

calculating the maximum cutting load using the following expression

Max. cutting load=Max. depth of cut×Max. feed×specific cutting force;

calculating the maximum load from the size of the tool shank and the projection of the tool from the tool holder, both being obtained from the tool file, and a variety of numerical values which have already been given, using the following expression, namely, $P_r=3\times E\times I\times\delta max/L^3$, where δmax is the maximum allowable deflection;

comparing the maximum allowable load obtained from the tool rigidity with the maximum cutting load obtained from the product of the depth of cut, the feed, and the specific cutting force, and taking a smaller load as the allowable cutting load;

calculating the maximum allowable cutting load in each of the radial and axial directions, and obtaining a ratio between them;

reading the rigidity of a machine tool from a machine tool file, and obtaining a ratio of the radial rigidity to the axial rigidity of the machine tool in order to compare the volume of feeding material in the X direction (in the radial direction) to the volume of feeding material in the Z direction (in the axial direction) with regard to the machine tool;

reading data relating to the rigidity of the main spindle (the maximum allowable load), the maximum depth of cut, and the maximum feed from the machine tool file;

calculating the maximum cutting load from the specific cutting force corresponding to the workpiece material, using the following expression, namely, Max. cutting load=Max. depth of cut×Max. feed×specific cutting force;

calculating the maximum radial cutting load and the maximum axial cutting load respectively from the maximum depth of cut and the maximum feed, and comparing the thus obtained maximum radial and axial cutting loads with the maximum allowable value obtained from machine tool file, and then using a lower value as the maximum allowable load;

calculating a machine condition ratio from a ratio of the maximum radial allowable load to the maximum axial allowable load;

calculating the rigidity of a workpiece from the radial and axial rigidity of the workpiece using the following expression, namely, Radial rigidity (deflection)=$P_r\times L^3/(3\times E\times I)$ Axial rigidity (torsion)=$32\times P_r\times L\times r^2/\pi d^4G$:

comparing the radial rigidity with the axial rigidity (torsional rigidity) of the workpiece, and obtaining a ratio of radial deflection to axial deflection of the workpiece;

judging and determining the volume of the machine tool to cut the material in the X direction while feeding it in the Z direction, the volume of the machine tool to cut the material in the Z direction while feeding it in the X direction, and the maximum machining load;

determining the maximum allowable load condition and a feeding direction by combination of the maximum cutting load ratio of the tool, the rigidity ratio of the machine tool, and the rigidity ratio of the workpiece;

obtaining the temporary maximum depth of cut which is to be used in a cutting operation, by calculating the limit rigidity value from the tool material and an input material to be machined, using the cutting rate and the feed obtained from the cutting condition file and the specific cutting force;

executing the processing and decision of the machining direction which beings with the decision of material;

deciding whether or not the material is a rod material based on the size of an input workpiece material, and calculating a machining allowance on each stage number if the material is a rod material, and calculating a sum of machining allowances on each side to be machined and the total sum of the machining allowances;

calculating a mean machining allowance obtained by dividing the total sum of cross sectional areas of the machining allowances on each of the sides to be machined by the length of cut in each direction on each side to be machined, and calculating the macroscopic number of times the material is cut by dividing the mean machining allowance by the maximum tentative depth of cut of the tentative tool, and calculating the length of the material to be machined in the Z direction from a product of the length of the material in the Z direction and the number of times the material is cut in the X direction;

calculating the mean machining allowance obtained by dividing the total sum of cross sectional areas of the machining allowances on each of the sides to be machined by the length of cut in each direction on each side to be machined, and calculating the macroscopic number of times the material is cut by dividing the mean machining allowance by the maximum tentative depth of cut of the tentative tool, and calculating the length of the material to be machined in the X direction from a product of the length of the material in the X direction and the number of times the material is cut in the Z direction;

deciding whether to feed the material in the X direction or in the Z direction on the basis of the length over which the material fed in the feeding direction and the number of times the material is cut;

dealing with the material as a material input if the material is not a rod material, and calculating a cutting allowance in each of the X and Z directions on each stage using data relating to the material and a finished pattern;

calculating the number of times the material is cut and the length of the material to be machined on each stage for each of the following machining methods, namely, feeding of the material in the X direction in which the material is cut in the Z (axial) direction while being fed in the −X (radial) direction, feeding of the material in the Z direction in which the material is cut in the X (radial) direction while being fed in the −Z direction (axial), and feeding of material in the X and Z directions in combination in which the material is cut in the Z (axial) direction while being fed in the −X (radial) direction in order to machine end faces and grooves, and the material is cut in the X (radial) direction while being fed in the −Z (axial) direction in order to machine the outside and inside diameters of the material;

boring and forming grooves in the internal periphery of the bore based on the assumption that the tip of the tool can enter as far as the center of the bore, if the bore is not pre-formed;

grooving the material while the tool is covered with a lid if the groove is to be formed perpendicular to the direction of the feeding of the material, and adding to the machining condition file the number of times the material is to be additionally grooved again, and the length of the material to be grooved;

comparing the previously mentioned machining methods with each other with regard to the number of times the material is cut and the length over which the material is fed, and arranging them in order;

deciding whether or not the feeding of material in the X and Z directions in combination, which qualitatively requires much shorter machining time, is best in terms of the number of times the material is cut and the machining length over which the material is fed;

deciding which of feeding the material in the X direction or feeding in the Z direction is superior;

calculating tentative machining time;

reading operating time of the machine tool (the time required to position material so as to be quickly fed in the X direction, the time required to position material so as to be quickly fed in the Z direction, the speed for quickly feeding material in the X direction, and the speed for quickly feeding material in the Z direction) from the machine tool file;

calculating tentative positioning time, rapid traverseing time, and time for feeding material while machining it, for each of feeding directions using the following expressions Sum of positioning time=(positioning time)×2×(the number of times material is cut), Rapid traverse time=[{a length of material to be machined/(the number of times the material is cut×a rapid traverse rate)}+(positioning time)]×the number of times the material is cut Time for feeding material while cutting it=length of material to be machined/feed rate/min. during machining:

and comparing the thus obtained three tentative machining times with each other, and deciding the best machining method. Accordingly, an optimum removing direction for the turning process is determined taking into consideration the tool requirements, the cutting load, and the time required to turn a workpiece.

Selection of a tool for use in a turning operation comprises at least the steps of:

dividing an area to be machined into several categories, such as a bore, an end face, an external circumferential surface, a groove formed in the internal circumferential surface of the bore, a groove formed in the external circumferential surface, and a groove formed in the end face, using a tool file and pictorial codes of input data, and retrieving a tool and checking it against these categories;

retrieving a tool with addition of a tool for pre-forming a hole if a pre-formed hole is made in a workpiece;

using the maximum graphic processing tool used in deciding the removal direction as a part of a turning tool;

retrieving a tool with multiple functions in order to minimize the number of tools to be used;

sounding an alarm if no roughing tool matches with an input drawing, and thereafter using a finishing tool as a roughing tool;

sounding an alarm unless a tool required by the input drawing is included in the tool file;

selecting a tool sufficiently capable of machining the material according to the shapes and sizes described in the input drawing, that is, bores, depths, groove widths, and groove depths, and giving the top priority to rigidity and the second priority to versatility during the course of the selection of a tool, with the greatest emphasis on productivity;

reading specifications for each groove from a file for intended finally finished shapes, and determining whether or not the groove can be formed by checking the grooving of a tool against the specifications; and adopting one of the following three steps as conditions for selecting a tool, namely, (1) a tool should be selected, in principle, so as to minimize the total number of tools, (2) a tool should be selected taking into consideration the number of workpieces per one lot, prerequisites, and absolute requirements, and (3) a decision as to selection of a tool is made by selecting a tool having the maximum cutting volume for each area, supposing that A is the sum of machining time and ATC time and B is the sum of the machining time and the ATC time obtained using a method for minimizing the number of tools, and comparing A with B. Accordingly, tools are selected and determined taking into consideration the presence or absence of tools corresponding to input drawings, the direction of removal, the number of tools used in the machining process, and the time required to machine a workpiece.

Designation of a tool comprises at least the steps of:

making a decision as to whether or not a tool designation entry, with regard to the designation and input of a tool for machining, is filled with a tool;

selecting manual designation of a tool for each process by specifying and inputting a tool and cutting conditions, or automatic determination of a tool;

disclosing the limit size of a tool by combination of the tool and cutting conditions specified and input for each process with a pictorial pattern, and specifying a tool using a tool number registered in a tool file;

sounding an alarm to inform that the area which a tool cannot machine or the area which will be left unprocessed will occur for reasons of the consistency between a tool and a pattern as a result of computation, if the tool is specified at the time of inputting the pattern; and determining a roughing tool as one not to be used for finishing purposes and a finishing tool as one to be used for roughing purposes, as circumstances demand.

Accordingly, the operator selects either the manual designation of a tool or the automatic designation of a tool. If the manual designation of the tool is chosen, the operator designates a tool for each process using a tool number.

The selection and determination of a fixture comprises the steps of:

pairing up the diameter and length of an area of material which is determined, as it can be chucked, from input material and finishing drawings;

retrieving a fixture in a machine tool file input for each machine tool using the pair of parameters, that is, the diameter and length; and selecting and determining a fixture on the general rule that a portion of the material very close to the area to be machined should be fixed. Accordingly, an optimum area for chucking is determined on the basis of the input data.

Generation and determination of an n-th process processing path for each processing order comprises at least the steps of:

changing the depth of cut corresponding to variations in a cutting allowance;

correcting an input relating to the shape of material used in the turning process, by estimating variations in the material shape using statistical processing means;

measuring materials to be cast and forged in order to obtain data on the shape of practical materials, correcting the input data on the shape of the material, and determining a machining cycle and the depth of cut from a difference between the corrected input data and a finished pattern;

measuring the shape of the material, and statistically processing the data obtained as a result of feeding a plurality of pieces of material, so that a mean value and variations are obtained; and determining whether the material should be processed while it is measured each time, or while utilizing statistical data by comparing the sum between measuring time and machining time with machining time obtained by means of the statistical method. Accordingly, a highly productive n-th process machining path is determined by comparing machining time with measured time, taking into consideration variations in the shape of material.

Measurement and processing of material in an n-th process comprises at least the steps of:

identifying whether or not workpieces having the identical pattern are repeated;

using the machining drawing employed in the previous machining process as a material drawing in the current processing process if the workpieces have different patterns;

identifying whether or not the direction of removing is specified;

selecting a tool for use in the n-th process;

selecting a fixture for use in the n-th process;

measuring the material used in the n-th process and generating a machine program;

identifying whether or not the material should be measured in the n-th process;

identifying whether or not the workpieces having the identical pattern are repeated if the material must be measured;

executing the tracing method or generating a travel path for measurement use having equivalent intervals from the input material data if the workpieces have different patterns;

initializing a repeat counter for counting the number of workpieces to be machined to $n_1=0$ and a group repeat counter to $n_2=0$;

incrementing the repeat counter for counting workpieces to $n_1=n_1+1$, measuring the material using the tracing method or equivalent intervals and measuring time, and storing measured dimensional data and the measuring time in a data region;

exchanging the material size with the measured size;

calculating a cutting allowance and generating and determining a machining pat, using the result of the exchange;

identifying whether or not the material has already been measured in the n-th process, if the measurement of the material in the n-th process is judged as not to be necessary;

initializing the repeat counter for measuring the number of workpieces to $n_1=0$ and the group repeat counter to $n_2=0$, if the material has already been measured; and incrementing the repeat counter for counting the number of workpieces to $n_1=n_1+1$. Accordingly, a method for measuring and machining material in an n-th process is determined taking into consideration whether or not workpieces having the identical pattern are repeated, the necessity or the lack of necessity of the measurement of material, and time required to machine and measure the material.

A method of processing a workpiece in an n-th process which includes on-machine measurement, correction, and reworking operations comprises at least:

roughing processing which includes the steps of sequentially reducing the number of revolutions of the main spindle to 80% if machining power is in excess of an allowable value, and sequentially reducing a feed rate to 50% if the power is still in excess of a critical value, sounding an alarm if the power is still in excess of the critical value, and stopping the machining of the workpiece at a break between blocks to be machined, sequentially increasing the feed rate up to 200% if the cutting power does not satisfy the allowable value, and sequentially increasing a cutting rate up to 150% if the cutting power still fails to satisfy the allowable value; and finishing processing which includes the steps of determining the critical number of revolutions allowing for the lifespan of the tool on the assumption that the feed rate corresponds to variations in the number of revolutions of the main spindle, measuring all the areas of the workpiece designated by a tolerance and a tolerance symbol after the workpiece has been machined, correcting the positions of the tool and machine using expected values in such a way that the positions fall within allowable values at the time of the next processing, increasing the number of measurement points using the range of tolerance and the length of the workpiece as parameters, correcting a difference between a mean value obtained as a result of computation and the center of designated tolerance by combination of a tool position correction operation and a machine position correction operation, if the workpiece was machined with the identical tip of the identical tool, sounding an alarm indicating erroneous process selection if a difference between the maximum measured value and the minimum measured value is in excess of two-third of the range of tolerance at each of the designated areas, identifying whether or not there is a remaining finishing allowance in the workpiece if the workpiece has been judged as to be defective, identifying whether or not the remaining finishing allowance is within the removing volume of an n-th process machine tool if there is a remaining finishing allowance, determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, sounding an alarm if it has been judged that there is no machine tool capable of removing the remaining finishing allowance, identifying whether or not the decision process through which the machine tool capable of removing the remaining finishing allowance was selected is an unexecuted processing, identifying whether or not the process is a new machining process if that process is the unexecuted processing, incrementing an n-th process storage number by one if the unexecuted processing has been judged as being a new machining process, and additionally storing associated process data into a storage section, reading a measured material data file and calculating the mean value, maximum value, and minimum value of the shape of the material by means of a statistical processing technique such as the least squares method and 3σ method, calculating a machining path and machining time at the maximum size of the material, adding mean processing time to the time required to measure material when the material is measured each time and then machined, and comparing the thus obtained time with the time required to machine the material into a shape and a size using the statistical processing technique, so that processing which needs fewer machining time is adopted, reading a count value of the group repeat counter if it takes a long time to machine the material using the statistical processing technique, and identifying whether or not there is statistical processing, measuring the material each time using the tracing method, if the statistical processing is not selected, exchanging the input size of the material with the measured data, generating and determining a machining path, machining the workpiece, measuring the thus machined workpiece on the machine, and correcting the workpiece, storing the data on the decision in order to select the statistical processing if the statistical processing is selected into the storage section, determining whether or not the workpiece is nondefective using the result of the measurement, identifying whether or not there is a remaining finishing allowance in the workpiece if the workpiece has been judged as to be defective, identifying whether or not the remaining finishing allowance is within the removing volume of the n-th process machine tool, if there is a remaining finishing allowance, identifying whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, sounding an alarm if it has been judged that no machine tool table is available for removing the remaining finishing allowance, identifying whether or not the decision process through which the machine tool capable of removing the remaining finishing allowance was selected is an unexecuted processing, if it has been judged that there is a machine tool capable of removing the remaining finishing allowance, identifying whether or not the process is a new machining process if that process has been judged as to be the unexecuted processing, and incrementing an n-th process storage number by one if the unexecuted processing has been judged as being a new machining process, and additionally storing associated process data into the storage section. Accordingly, a workpiece is roughed while the rotating speed of the main spindle and a feed rate are being changed. In a finishing operation, requirements for correction and reworking are determined on the basis of the result of the measurement of the machined workpiece.

Generation of a turning processing path comprises at least the steps of:

determining whether to designate any one of the following combinations based on a cutting method specified in an input item concerning machining or to automatically select one from the combinations using productivity, the elimination of chips, the life span of a tool, and the material of the tool, namely, a combination of a method to equally divide the depth of cut made as a result of roughing among stages and a method using a constant finishing allowance, and a combination of a method to form the constant depth of cut by roughing and a method using a variable finishing allowance;

determining the evaluation of productivity, with regard to the case of the constant depth of cut or the case of the equivalently divided depth of cut, by simulating machining time using the number of positioning times and the length of a path over which a turning machine travels;

dealing with a machining path associated with the method for cutting material into a constant depth, as a simple path method in which material is machined as far as the point where the material can be continuously machined even if a finishing allowance is ensured in the material without changing the depth of cut formed in the material;

adopting a cutting method called a variable cutting method in which the depth of cut made as a result of roughing is divided among stages, in order to improve the machining productivity;

subtracting a finishing allowance from a cutting allowance of the material, dividing the thus obtained cutting allowance by the maximum depth of cut, rounding up the result of the division to obtain the number of times the material is cut, subtracting a finishing allowance from a cutting allowance on each stage, dividing the thus obtained cutting allowance on each stage by the number of times the material is cut, as a result of which the depth of cut is equally divided among the stages, and using the thus obtained depth of cut as a cutting allowance on each stage in each cycle;

adopting a variable finishing allowance method based on the constant cutting method in which the material is roughed to a constant depth, in order to improve the machining productivity; and correcting displacement corresponding to the finishing allowance, wherein the correction of displacement comprises the step of:

obtaining an approximate calculation expression from the actually measured data, and calculating the amount of correction using the depth of cut, a feed, the strength of material, and the entire length of a workpiece; or calculating a deficiency of the actually measured raw data using approximate interpolation, and calculating the amount of correction by means of interpolation using the actually measured data, the approximately interpolated data, and the strength of material and the entire length of a workpiece which act as variables; or calculating and correcting the amount of correction using an arithmetic expression which employs a broaching load, material, the entire length of a workpiece, a supporting method, and load points as variables. Accordingly, a path for cutting a workpiece during a roughing operation is determined taking into consideration the productivity of the machining operation and a method employed for cutting the workpiece.

A path for turning a rod material comprises at least the steps of:

selecting either an absolute value or an increment for the position of a machine based on a designation item of the machine tool;

calculating a cutting rate from the material of a workpiece and the material of a tool;

determining the direction of revolution of the main spindle on the basis of the rotation of a tool associated with a tool ID number; and setting a feed rate to an allowable value determined by the limit of depth of cut, a feed, the limit of a machine tool, and the limit of a workpiece which are read from a tool file as well as by the depth of cut and a feed rate read from a cutting condition file, the path further comprising a calculation method for equally dividing the depth of cut which includes the steps of calculating a roughing allowance on each stage, the maximum allowable depth of cut on each stage, the theoretical number of times material is cut using the following expressions Roughing allowance on each stage={diameter of material−(designated diameter+finishing allowance)}, Max. depth of cut on each stage=Max. machining load/feed×specific cutting force Theoretical number of times material is cut=(roughing allowance on each stage)/(2×allowable maximum depth of cut on each stage), setting the direction of the allowable maximum depth of cut to the direction of the cut associated with that one of a workpiece, a machine tool, and a tool which has the largest minimum value, calculating the depth of cut, which is based on a critical value for the limit of rigidity, with regard to the maximum depth of cut used in the turning operation by calculating a specific cutting force from the materials of a tool and an input workpiece, and by reading a cutting rate from the cutting condition file, and obtaining the size of a workpiece before it will be finished by adding a finishing allowance to the shape of the workpiece on each stage read from a file related to intended finally finished shapes, obtaining the number of times the workpiece is cut by dividing the length of the workpiece by the maximum depth of cut, rounding up the result of the division in order to obtain the equally divided depth of cut, and determining the directions of cut and feed;

carrying out processing so as to prevent the depth of cut in the Z direction from increasing by use of the depth of cut in the Z direction used in machining the previous stage if the depth of cut in the Z direction increases during the course of the execution of processing when a machine program is generated using the equally divided depth of cut, or carrying out processing so as to prevent the depth of cut in the X direction from increasing by use of the depth of cut in the X direction used in machining the previous stage if the depth of cut in the X direction increases in the course of the execution of processing;

a method for calculating a program for use with a constant cutting method which includes the steps of setting the direction of the allowable maximum depth of cut to the direction of the cut associated with one of a workpiece, a machine tool, and a tool that has the largest minimum value, calculating the depth of cut, which is based on a critical value for the limit of rigidity, with regard to the maximum depth of cut used in the turning operation by calculating a specific cutting force from the materials of a tool and an input workpiece, and by reading a cutting rate from the cutting condition file, calculating a machining path along which the workpiece is turned in the Z direction while it is fed in the X direction, in which the workpiece is fed to the point at which a finishing allowance and a finishing allowance for another processing are added to the intended finally finished shape file every time the material is machined, and calculating a machining path, for a remaining portion of the material which was not machined in the previous turning processing, in which the workpiece is turned in the Z+ or Z− direction while being fed in the X− direction, and the thus turned workpiece is repeatedly returned to the point from which the previous turning processing started and again undergoes the turning processing, obtaining the size of the workpiece before it will be finished by adding a finishing allowance to the shape of the workpiece on each stage read from the intended finally finished shape file, and obtaining the number of times the workpiece is cut by dividing the length of the workpiece by the maximum depth of cut and the remainder of the workpiece which is to be machined together with the machining of another portion on the subsequent machining stage, calculating a roughing allowance on each stage using the following expression Roughing allowance on each stage={diameter of material−(designated diameter+finishing allowance)}, retrieving exchangeable material from a tool material translation table file if tool material which is not included in the cutting condition file is specified, and retrieving machining conditions applicable to the material of the workpiece and a tool diameter from the cutting condition file using the equivalent tool material, setting a finishing allowance of a bore to one-third of the maximum depth of cut which the tool can form and a finishing allowance of an end face to half a finishing allowance in the diametrical direction of the workpiece, calculating an approximate value by computing the correction of machining deflection based on the assumption that the radius of the material and the depth of cut are proportional to each other according to a linear expression, using a turning variation plot which shows a remainder of the workpiece on each stage occurring as a result of turning the workpiece to a constant depth, a difference between the actually measured data and the reference diameter of the workpiece, and a plot which illustrates variations in the workpiece radius, and then generating a machine program by correcting values of machine program data, calculating the feed rate of a grooving tool from the shank size of the tool, the length of a projection of the tool, the rigidity of the tool, the (Max. and Min.) limits of a feed of the tool (in the X and Z directions), the maximum cut withstanding volume of the tool, all being read from the tool file, as well as the material of the workpiece, taking into consideration the specific cutting force of material of the workpiece, calculating the maximum allowable load by dividing the limit of allowable deflection by the tool rigidity, and calculating a feed rate using the following expression $F$=2×max. cut withstanding volume/(specific cutting force×groove width) [mm/rev.], calculating the time during which the tool is in a dwell state at the groove bottom from the number of revolutions of the tool while it is in a dwell state, the cutting speed calculated from the materials of the tool and the workpiece, and the diameter of the groove bottom, using the following expression $t$=(the number of revolutions of the tool while it is in a dwell state)/(cutting speed/(60×π×bottom diameter)) [sec.], selecting rapid traverse mode of the tool if the tip of the tool has come out of contact with the workpiece and it has then get outside of the outer circumference of the workpiece by means of the radius of the tool tip, when the tool comes to a quick return position for grooving purposes;

determining a finishing feed rate on the basis of a finishing method symbol;

calculating the finish feeding rate associated with the turning processing from the roughness of a finish defined by a finishing symbol, a relational expression between the roughness of a finished surface and the feed of the workpiece, and the radius of the tool tip (i.e., the nose-radius of the tool) read from the tool file, using the following expression $$H\max=f^2/8R$$

$$f^2=8R\times H$$

$$f=(8R\times H)^{1/2}\times 0.8,$$

setting the finishing feed rate of the end face of the workpiece, which is required when the workpiece is fed in the X direction while the tool is actuated in the Z direction, to 1/2.5 the feed rate of the tool in the Z direction;

a threading method which includes the steps of selecting a cutting method from among a driving method, a relieving method, and a combined driving method, as well as selecting a method for determining the depth of cut from among a method for cutting material into an equivalent cross section and a method for cutting material at equivalent intervals, depending on the material and hardness of a workpiece, mechanical rigidity, and the material, rigidity, and characteristics of a tool, and calculating the depth of cut, the width of an opening in the thread, and the width of a top land using the following expressions Depth of cut={(mean outside diameter)−(minor diameter to be machined)}/2

Width of top land=2×nose radius of a determined tool×[{(1/sin (half of a thread angle)}−1]×tan (half the included angle)

Width of an opening in a thread=($P$/2)+(mean outside diameter−effective mean diameter)×tan (half the included angle);

and a method of dividing the depth of cut, for use in cutting material into an equivalent cross section, which includes the steps of determining the number of times material is cut by dividing a total cutting load, which is a product of a cross section of a thread and a specific cutting force, by an allowable contact load calculated from the mechanical rigidity and the tool rigidity, so that substantially the number of times material is cut is obtained, and by multiplying the substantial number of times material is cut by a safety factor, calculating the specific cutting force from the material of a workpiece using a material file, and calculating the total cutting load from the thus obtained specific cutting force using the following equation Total cutting load=specific cutting force×total cross section of cut made by a thread, calculating the tool rigidity, the limit of depth of cut, and the maximum cut withstanding volume using the tool file, setting the limit of the tool rigidity to half the tool rigidity obtained at the time of roughing on condition that material is threaded, dividing the limit of allowable deflection by the tool rigidity in order to obtain the allowable cutting load, and obtaining the integral number of times material is cut by dividing the total cutting load by the allowable cutting load and subsequently rounding up the result of the division, obtaining the divided depth of cut by expanding the following expression $$\text{Cross section of thread/number of division } (n) = \text{top land width} \times (h_n - h_{(n-1)}) + 2 \times (\tfrac{1}{2}) \times \{(h_n)^2 \times \tan(\text{half of a thread angle}) - (h_{(n-1)})^2 \times \tan(\text{half of a thread angle})\} = \text{top land width} \times (h_n - h_{(n-1)}) + \tan(\text{half of a thread angle}) \times \{(h_n)^2 - (h_{(n-1)})^2\},$$

calculating the distance, in a lateral direction, over which the tool travels in the case of the relieving method or the combined driving method, using the following equation $$\text{Travel distance in a lateral direction } (\Lambda z_n) = (h_n - h_{(n-1)}) \times \tan(\text{half of a thread angle}),$$

and calculating cutting points for use in the combined driving method in the reverse order of machining with respect to the final position. Accordingly, a path for turning a rod material is determined on the basis of the allowable depth of cut, the feed rate, the finishing allowance, the tool data, and the material data.

Selection of a tool and setting of cutting conditions comprise at least the steps of:

selecting a rotating tool for grooving purposes by retrieving a tool using the width of a groove to be formed in material as a keyword, and selecting a tool ID number if the diameter and nominal length of the tool matches with the groove width;

retrieving a cutting rate from a cutting condition file based on the materials of a workpiece and the tool, and calculating the number of revolutions of the tool using the tool diameter;

determining the depth of cut based on the tool rigidity, calculating the number of times material is cut from the thus obtained the depth of cut, and cyclically cutting the material into predetermined depth;

complementing a feed rate using the diameters of tools before and after the applicable tool which satisfies a predetermined tool quality, a predetermined workpiece material, a predetermined cutting rate, and a predetermined feed rate, if data relating to the applicable tool are not available; and complementing a feed rate of an end mill in such a way as to be proportional to the fourth power of its diameter; and complementing a feed rate of a drill in such a way as to be proportional to its diameter. Accordingly, where a rotating tool for grooving purposes is used, machining settings are determined taking into consideration the width of a groove formed in an area to be grooved, and the materials of a tool and a workpiece.

A program for reaming a hole uses data on inputs, an intended finally finished size, a type of twist, a rotating angle with regard to the reference position, steps of a hole, a diameter, finishing symbols, countersinks/counterbores, a counter sinking angle, a depth, and the number and positions of holes. Accordingly, standardized input data are used.

A reaming program comprises at least the steps of:

retrieving and selecting a pre-forming drill using a reamer diameter and the depth of a reamed hole;

obtaining a reaming rate from a cutting condition file based on the material of a tool, which is read from the tool file, and the material of a workpiece, and determining the number of revolutions of the tool by calculating the cutting rate;

reading feed rates of pre-forming drills which have similar diameters from the cutting condition file, and calculating a feed rate of a pre-forming drill by interpolation in such a way that the feed rate is in proportion to the diameter of the pre-forming drill; and retrieving a reamer using the diameter and depth of a reamed hole as key codes, and selecting a reamer. Accordingly, a drill to pre-form a hole, associated cutting conditions, and a reamer are selected in an optimum way.

A program for machining a grooved end cam comprises at least the steps of:

retrieving and selecting a tool using the width of a groove formed in a cam and the depth of a cam, that is, a major cutting edge as key codes;

obtaining a cutting rate on the basis of the materials of a workpiece and the tool, and determining the number of revolutions of the tool by calculating the cutting rate; and reading feed rates of tools which have similar diameters from the cutting condition file, and calculating a feed rate for machining a grooved end cam by interpolation in such a way that the feed rate is in proportion to the square of the diameter of the tool. Accordingly, a tool for grooving a workpiece and grooving conditions are selected in an optimum way.

A program for finishing the outer circumference of material comprises at least the steps of:

obtaining at least finished surface roughness designated by a finishing method symbol utilizing specifications for an intended finally finished shape, and calculating a feed rate which satisfies the thus obtained finished surface roughness utilizing a relational expression between the finished surface roughness and a feed rate, the tip radius of a tool (i.e., the nose-radius of a tool), and a safety factor;

selecting a grooving tool and a feed rate based on specifications for a groove having an intended finally finished shape, with regard to the finishing of a groove; and calculating the chamfering of the bottom of a groove using the tip radius of the grooving tool (i.e., the nose-radius of the grooving tool). Accordingly, a tool and a cutting rate used in a finishing operation are determined on the basis of a finishing method symbol and an intended finally finished shape.

A keyway machine program executes a machining operation based on, at least, an input drawing for a keyway and specifications for an intended finally finished shape pattern (keyway numbers, a previous stage, a subsequent stage, a keyway width, a tolerance, finishing symbols, the entire length of a keyway, stages designated so as to be machined, a depth, a type of groove, a cutter diameter, a step of the reference shoulder, and an angle with regard to the reference position). Accordingly, input data are standardized.

The keyway machine program comprises at least the selection of a keyway machining tool, and the keyway machining tool including the steps of:

retrieving and selecting a cutter for machining a keyway, using the diameter and width of the cutter as key codes;

obtaining a cutting rate and a feed rate per one blade from the materials of a tool and a workpiece, and calculating keyway cutting conditions from the thus obtained cutting and feed rates using the number of revolutions and teeth of the cutter; and calculating a feeding speed of a side cutter from the number of revolutions and teeth of the cutter and its feed rate. Accordingly, an optimum tool and optimum cutting conditions are determined.

An external gear hobbing program generates specifications for hobbing an external gear on the basis of, at least, an intended finally finished pattern (external gear numbers, the reference position, an angle, specifications for a gear, a tooth profile, a module (M), a pressure angle (PA), the number of teeth, a helix angle, a tooth width, a base tangential length, a finishing method, and finishing symbols). Accordingly, input data are standardized.

The external gear hobbing program comprises at least a step of selecting a tool, the tool selecting step further including the steps of:

selecting a hobbing tool on the basis of specifications for a gear, a tooth profile, and a pressure angle;

calculating a tool diameter and a cutter addendum, and deciding whether or not the hobbing of a gear is feasible;

sounding an alarm if the hobbing of a gear is impossible;

calculating a helix angle from the tool diameter and the cutter addendum; and obtaining a cutting rate and a feed rate on the basis of the materials of the tool and a workpiece, calculating the theoretical number of revolutions of the main spindle from the cutting rate and the feed rate, calculating the number of revolutions of a workpiece by dividing the theoretical number of revolutions of the main spindle by the number of teeth and rounding up the result of the division, and calculating the number of revolutions of the main spindle by multiplying the number of revolutions of a workpiece by the number of teeth. Accordingly, an optimum tool and optimum cutting conditions are determined.

An outside diameter turning program comprises at least a step of selecting a tool, the tool selection step further including the steps of:

selecting the material of a grinding wheel on the basis of the material and hardness of a workpiece;

selecting a machining method from a radially feeding method, a traverse grinding method, and a plunge cutting method by comparing the width of an area to be machined and the major cutting edge (grinding wheel width) on the basis of the material and hardness (translated hardness) of the workpiece, and determining cutting conditions (the peripheral velocity of the grinding wheel, the peripheral velocity of the workpiece, and the depth of cut) on the basis of the selected machining method;

calculating the number of revolutions of the grinding wheel from the diameter and peripheral velocity of the grinding wheel;

calculating the number of revolutions of the workpiece from the peripheral velocity of the workpiece corresponding to the workpiece which is to be machined; and generating a machining path from inputs, an intended finally finished shape, and the shape of a workpiece which has been finished in another process. Accordingly, an optimum tool and optimum cutting conditions are determined.

A boring program comprises at least the step of selecting a boring tool, the boring tool section step further including the steps of:

selecting the material of a grinding wheel on the basis of the material and hardness of a workpiece;

selecting a machining method from a radially feeding method, a traverse grinding method, and a plunge cutting method by comparing the width of an area to be machined and the major cutting edge (grinding wheel width) on the basis of the material and hardness (translated hardness) of the workpiece, and determining cutting conditions (the peripheral velocity of the grinding wheel, the peripheral velocity of the workpiece, and the depth of cut) on the basis of the selected machining method;

calculating the number of revolutions of the grinding wheel from the diameter and peripheral velocity of the grinding wheel;

calculating the number of revolutions of the workpiece from the peripheral velocity of the workpiece corresponding to the workpiece which is to be machined;

determining a chopping rate in the Z direction which is employed in roughing and finishing operations, in relation to the width of the grinding wheel per one revolution of the workpiece; and generating a machining path from inputs, an intended finally finished shape, and the shape of a workpiece which has been finished in another process. Accordingly, an optimum tool and optimum cutting conditions are determined.

A method of processing a workpiece in an n-th process which includes on-machine measurement, correction, and reworking operations comprises at least the steps of:

measuring the workpiece on the machine tool after the machining of the workpiece has been completed, and correcting the position of the machine tool or a tool;

identifying whether or not the result of the measurement of the corrected workpiece is acceptable;

identifying whether or not there is a remaining finishing allowance in the workpiece if the workpiece has been judged as to be defective;

identifying whether or not the remaining finishing allowance is within the removing volume of an n-th process machine tool if there is a remaining finishing allowance;

repeating the processing procedures from the finishing step if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool;

sounding an alarm if it has been judged that there is no machine tool capable of removing the remaining finishing allowance;

identifying whether or not the decision process through which the machine tool capable of removing the remaining finishing allowance was selected is an unexecuted processing;

identifying whether or not the process is a new machining process if that process is the unexecuted processing; and incrementing an n-th process storage number by one if the unexecuted processing has been judged as to be a new machining process, and additionally storing associated process data into a storage section. Accordingly, conditions for correction and reworking are determined on the basis of the result of the measurement of a machined workpiece.

Adaptive processing applied to cutting power during the course of machining processing comprises at least the steps of:

in the case of a roughing operation, sequentially reducing the number of revolutions of the main spindle to 80% if machining power is in excess of an allowable value;

sequentially reducing a feed rate to 50% if the power is still in excess of a critical value;

sounding an alarm if the power is still in excess of the critical value, and stopping the machining of the workpiece at a break between blocks to be machined;

sequentially increasing the feed rate up to 200% if the cutting power does not satisfy the allowable value, and sequentially increasing a cutting rate up to 150% if the cutting power still fails to satisfy the allowable value;

in the case of a finishing operation, making the feed rate adaptable solely to the number of revolutions of the main spindle, and sequentially reducing the number of revolutions of the main spindle to 80% if the cutting power exceeds the allowable value;

sequentially reducing the feed rate to 50% if the power is still in excess of a critical value;

sounding an alarm if the power is still in excess of the critical value, and stopping the machining of the workpiece at a break between blocks to be machined; and sequentially increasing the feed rate up to 150% if the cutting power does not satisfy the allowable value. Accordingly, a workpiece is roughed while the rotating speed of the main spindle and a feed rate are being changed. When the workpiece is finished, the finishing of the workpiece is carried out in an optimum way by changing solely the rotating speed of the main spindle.

A method of processing a workpiece in an n-th process which includes off-machine measurement, correction, and reworking operations comprises at least the steps of:

measuring the workpiece outside a machine tool in the n-th process after the machining of the workpiece has been completed, and correcting the position of the machine tool or a tool;

identifying whether or not the result of the measurement of the corrected workpiece is acceptable;

identifying whether or not there is a remaining finishing allowance in the workpiece if the workpiece has been judged as to be defective, identifying whether or not the remaining finishing allowance is within the removing volume of an n-th process machine tool if there is a remaining finishing allowance, attaching the workpiece to the machine tool, and repeating the processing procedures from the finishing step if the remaining finishing allowance is within the removing volume of the n-th process machine tool;

sounding an alarm if it has been judged that the remaining finishing allowance is outside the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool; and sounding an alarm if it has been judged that there is no machine tool capable of removing the remaining finishing allowance. Accordingly, conditions for correction and reworking are determined on the basis of the result of the measurement of a machined workpiece.

Measurement and correction of a workpiece after it has been machined comprises at least the steps of:

measuring all the areas of the workpiece designated by a tolerance and a tolerance symbol after the workpiece has been machined;

correcting the positions of the tool and machine using expected values in such a way that the positions fall within allowable values at the time of the next processing;

changing measurement points on the basis of the range of tolerance;

calculating a difference between a mean value, the maximum value, and the minimum value which were obtained as a result of the measurement of the workpiece;

correcting a difference between the mean value and the center of the designated tolerance which was obtained as a result of the calculation by combination of the correction of the tool machine position and the correction of the tool position, if the workpiece has been machined with the identical tip of the identical tool; and sounding an alarm as erroneous process selection if a difference between the maximum measured value and the minimum measured value is in excess of two-third of the range of tolerance at each of the designated areas. Accordingly, the positions of a tool and a machine are corrected on the basis of the result of measurement using expected values in such a way that the positions fall within the tolerance at the next machining operation.

A machine program which includes off-machine material measurement for an n-th process comprises at least the steps of:

identifying whether or not workpieces having the identical pattern are repeated, and arranging material drawings and machining patterns associated with the n-th process if the workpieces having the identical pattern are not repeated;

selecting a previous machining pattern as a material pattern of the current process, and arranging machining drawings of each process;

identifying whether or not the direction of removing has been designated;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

retrieving a fixture of a machine tool file, which was input for each machine tool in the n-th process, from input drawings using the area to be chucked as a key item;

selecting the diameter and limit length of each side to be machine as key elements, selecting fixtures which have lengths less than the limit of length, and arranging the thus selected fixtures in order of length from shortest to longest;

determining the optimum fixture common to processing by selecting a fixture which most closely fits the chucking diameter for each area to be machined, from the selected and aligned fixtures;

measuring the material outside the machine tool in the n-th process;

identifying whether or not the material should be measured in the n-th process;

identifying whether or not workpieces having the identical pattern are repeated;

initializing a repeat counter for counting the number of workpieces to be machined and a group repeat counter;

incrementing the repeat counter for counting the number of workpieces to be machined, and measuring the material outside the machine tool;

exchanging the material size with the measured size;

calculating a cutting allowance, and determining the generation of a machining pat, using the result of the exchange;

identifying whether or not the material should be measured in the n-th process, identifying whether or not the material has already been measured if it is judged that the measurement of the material in the n-th process is unnecessary, and initializing the repeat counter for measuring the number of workpieces and the group repeat counter, if it is judged that the material has already been measured;

incrementing the repeat counter for counting the number of workpieces;

executing the machining, off-machine measurement, correction, and reworking of the workpiece of the n-th process;

measuring the time required to machine the workpiece, and store the measured machining time in a file region;

identifying whether or not there is a remaining finishing allowance in the workpiece if the workpiece has been judged as to be defective as a result of the off-machine measurement in the n-th process;

identifying whether or not the remaining finishing allowance is within the removing volume of an n-th process machine tool if there is a remaining finishing allowance, and attaching the workpiece to the machine tool again if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet;

incrementing an n-th process storage number by one if the unexecuted processing has been judged as being a new machining process, and additionally storing associated process data into a storage section;

incrementing the group repeat counter by one if the repeat counter for counting the number of workpieces to be machined has already counted up to a predetermined value;

reading a measured material data file for predetermined number of times, and calculating the mean value, maximum value, and minimum value of the shape of the material by means of a statistical processing technique such as the least squares method and 3σ method;

calculating a machining path and machining time at the maximum size of the material;

adding mean processing time to the time required to measure material when the material is measured each time and then machined, and comparing the thus obtained time with the time required to machine the material into a shape and a size using the statistical processing technique, so that processing which needs fewer machining time is adopted;

identifying whether or not the group repeat counter has counted up to a predetermined value if it takes much time to machine a workpiece using the statistical method, and stopping the execution of the statistical processing associated with the remainder of the machining operations if the group repeat counter has not counted up to the predetermined value;

measuring the material outside the machine tool each time if the counter has counted up to the predetermined value, exchanging the input material size with the measured data, and determining the generation of a machining path;

machining the workpiece;

identifying whether or not there is a remaining finishing allowance in the workpiece if the workpiece has been judged as to be defective as a result of the measurement;

identifying whether or not the remaining finishing allowance is within the removing volume of the n-th process machine tool, if there is a remaining finishing allowance;

attaching the workpiece to the machine tool again, and repeating finishing of the workpiece if the remaining finishing allowance is within the removing volume of the n-th process machine tool;

identifying whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing, if it has been judged that there is a machine tool capable of removing the remaining finishing allowance, and identifying whether or not the process is a new machining process if that process has been judged as to be the unexecuted processing; and incrementing an n-th process storage number by one if the unexecuted processing has been judged as being a new machining process, and additionally storing associated process data into the storage section. Accordingly, a tool and a fixture are selected on the basis of pictorially input data, and conditions for correction and reworking are determined on the result of the measurement of a machined workpiece.

A machine program, which includes the function of statistically processing material in an n-th process and the function of measuring the material on a machine tool, comprises at least the steps of:

as a method of arranging a statistically processed material drawing and a machining pattern associated with the n-th process, arranging a machining pattern of each process by using a previous machining pattern as a material pattern of the current machining process;

identifying whether or not the direction of removing has been designated;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

retrieving fixtures of a machine tool file, which are input for each of the machine tools associated with the n-th process, from input drawings using the area to be chucked as a key item;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

selecting and determining a fixture best suited to each machining process if there is no fixture which can be commonly used for machining all the sides; and generating a machine program which includes the measurement of material on the machine tool in the n-th process. Accordingly, tools which are chosen according to a pattern code and a removing direction are further determined on the basis of the number of tools and productivity that are necessary for machining. An optimum fixture for machining is selected from fixtures selected by an input pattern.

A machine program which includes the on-machine measurement, correction, and reworking of a workpiece comprises at least the steps of:

identifying whether or not there is a remaining finishing allowance in the workpiece if the workpiece has been judged as to be defective as a result of the on-machine measurement after the machining of the workpiece has been completed, and identifying whether or not the remaining finishing allowance is within the removing volume of an n-th process machine tool if there is a remaining finishing allowance;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet; and incrementing an n-th process storage number by one if the unexecuted processing has been judged as to be a new machining process, and additionally storing associated process data into a storage section. Accordingly, conditions for correction and reworking are determined on the basis of the result of the measurement of a machined workpiece.

A machine program, which includes the function of statistically processing material in an n-th process and the function of measuring the material outside a machine tool, comprises at least the steps of:

as a method of arranging a statistically processed material drawing and a machining pattern associated with the n-th process, arranging a machining pattern of each process by using a previous machining pattern as a material pattern of the current machining process;

identifying whether or not the direction of removing has been designated;

selecting a tool for use in the n-th process;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

selecting a fixture for use in the n-th process;

retrieving fixtures of a machine tool file, which are input for each of the machine tools associated with the n-th process, from input drawings using the area to be chucked as a key item;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

selecting and determining a fixture best suited to each machining process if there is no fixture which can be commonly used for machining all the sides; and generating a machine program which includes the measurement of material outside the machine tool in the n-th process. Accordingly, tools which are chosen according to a pattern code and a removing direction are further determined on the basis of the number of tools and productivity that are necessary for machining. An optimum fixture for machining is selected from fixtures selected by an input pattern.

A machine program which includes the off-machine measurement, correction, and reworking of a workpiece comprises at least the steps of:

determining whether or not the result of the measurement of the workpiece is acceptable, and identifying whether or not there is a remaining finishing allowance in the workpiece if the workpiece has been judged as to be defective;

identifying whether or not the remaining finishing allowance is within the removing volume of an n-th process machine tool if there is a remaining finishing allowance;

attaching the workpiece to the machine tool again and repeating the machining procedures from a finishing step if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet; and incrementing an n-th process storage number by one if the unexecuted machining has been judged as to be a new machining process, and additionally storing associated process data into a storage section. Accordingly, conditions for correction and reworking are determined on the basis of the result of the measurement of a machined workpiece.

If the data which are directly read by means of a tool diameter and specifications for a tool shank are not registered in the cutting condition file, a series of processing items are automatically executed; namely, reading more than three data items from the cutting condition file with regard to tool diameters and specifications for tool shanks which are adjacent to the specifications for the tool to be used, on the basis of the tool diameter and shank; analyzing the group of data items with use of the tool diameter and the specifications for the tool shank as parameters, whereby an approximate calculation expression is obtained; substituting the diameter of a tool to be used and specifications for the shank of that tool into the approximate calculation expression, so that cutting conditions are calculated; and storing the thus calculated cutting conditions in the machine program. Accordingly, optimum cutting conditions are also determined analogously with regard to tools which are not registered in the file.

The above and other objects and features of the present invention will be more apparent from the following description taken in conjunction with the accompanying drawings.

BRIEF DESCRIPTION OF THE DRAWINGS

FIG. 12 is an explanatory view for illustrating the result of the pattern identification carried out, with regard to step 8 of the embodiment of the present invention;

FIG. 47 is a cross section taken along line B—B (shown in FIG. 44) with regard to the finished shape of the workpiece according to the embodiment of the present invention;

FIG. 48 is a cross section taken along line C—C (shown in FIG. 44) with regard to the finished shape of the workpiece according to the embodiment of the present invention;

FIG. 57 is a cross section taken along line J—J (shown in FIG. 44) with regard to the finished shape of the workpiece according to the embodiment of the present invention;

FIG. 58 is a descriptive drawing showing the data entry of a machine tool file (1/15) according to one embodiment of the present invention;

FIG. 59 is a descriptive drawing showing the data entry of a machine tool file (2/15) according to the embodiment of the present invention;

FIG. 60 is a descriptive drawing showing the data entry of a machine tool file (3/15) according to the embodiment of the present invention;

FIG. 61 is a descriptive drawing showing the data entry of a machine tool file (4/15) according to the embodiment of the present invention;

FIG. 62 is a descriptive drawing showing the data entry of a machine tool file (5/15) according to the embodiment of the present invention;

FIG. 63 is a descriptive drawing showing the data entry of a machine tool file (6/15) according to the embodiment of the present invention;

FIG. 64 is a descriptive drawing showing the data entry of a machine tool file (7/15) according to the embodiment of the present invention;

FIG. 65 is a descriptive drawing showing the data entry of a machine tool file (8/15) according to the embodiment of the present invention;

FIG. 66 is a descriptive drawing showing the data entry of a machine tool file (9/15) according to the embodiment of the present invention;

FIG. 67 is a descriptive drawing showing the data entry of a machine tool file (10/15) according to the embodiment of the present invention;

FIG. 68 is a descriptive drawing showing the data entry of a machine tool file (11/15) according to the embodiment of the present invention;

FIG. 69 is a descriptive drawing showing the data entry of a machine tool file (12/15) according to the embodiment of the present invention;

FIG. 70 is a descriptive drawing showing the data entry of a machine tool file (13/15) according to the embodiment of the present invention;

FIG. 71 is a descriptive drawing showing the data entry of a machine tool file (14/15) according to the embodiment of the present invention;

FIG. 72 is a descriptive drawing showing the data entry of a machine tool file (15/15) according to the embodiment of the present invention;

FIG. 73 is a descriptive drawing showing the data entry of an attaching method (1/4) according to one embodiment of the present invention;

FIG. 74 is a descriptive drawing showing the data entry of an attaching method (2/4) according to the embodiment of the present invention;

FIG. 75 is a descriptive drawing showing the data entry of an attaching method (3/4) according to the embodiment of the present invention;

FIG. 77 is a schematic representation showing a process file according to one embodiment of the present invention;

FIG. 78 is a descriptive drawing showing the data entry of a stationary tool file (1/4) according to one embodiment of the present invention;

FIG. 79 is a descriptive drawing showing the data entry of a stationary tool file (2/4) according to the embodiment of the present invention;

FIG. 80 is a descriptive drawing showing the data entry of a stationary tool file (3/4) according to the embodiment of the present invention;

FIG. 81 is a descriptive drawing showing the data entry of a stationary tool file (4/4) according to the embodiment of the present invention;

FIG. 82 is a descriptive drawing showing the data entry of a rotary tool file (1/4) according to one embodiment of the present invention;

FIG. 83 is a descriptive drawing showing the data entry of a rotary tool file (2/4) according to the embodiment of the present invention;

FIG. 84 is a descriptive drawing showing the data entry of a rotary tool file (3/4) according to the embodiment of the present invention;

FIG. 85 is a descriptive drawing showing the data entry of a rotary tool file (4/4) according to the embodiment of the present invention;

FIG. 90 is a descriptive drawing showing a center hole pattern file according to one embodiment of the present invention;

FIG. 94 is a descriptive drawing showing a hole pattern file format according to one embodiment of the present invention;

FIG. 96 is a descriptive drawing showing an internal cam pattern file format according to one embodiment of the present invention;

FIG. 98 is a descriptive drawing showing a pattern file format of a grooved cylindrical cam according one embodiment of the present invention;

FIG. 106 is a descriptive drawing showing a pattern file of a taper according to one embodiment of the present invention;

FIG. 107 is a descriptive drawing showing a designated entry (interactive entry) format with regard to a machining operation according to one embodiment of the present invention;

FIG. 108 is a descriptive drawing showing a designated entry (noninteractive entry) format with regard to a machining operation according to one embodiment of the present invention;

FIG. 109 is a descriptive drawing showing an input format with regard to process designation/presence or absence of designation of a tool/a fixture number/a finishing allowance according to one embodiment of the present invention;

FIG. 110 is a descriptive drawing showing an input format with regard to the designation of a tool/cutting conditions according to one embodiment of the present invention;

FIG. 112 is a descriptive drawing showing a tolerance file (for a hole of type H) according to one embodiment of the present invention;

FIG. 113 is a descriptive drawing showing a basic tolerance file (a basic tolerance (for hole)) according to one embodiment of the present invention;

FIG. 114 is a descriptive drawing showing a basic tolerance file (IT fundamental tolerance) according to one embodiment of the present invention;

FIG. 115 is a descriptive drawing showing a basic tolerance file (a difference between grades of IT tolerance) according to one embodiment of the present invention;

FIG. 116 is a descriptive drawing showing a screw pattern file (for a male screw) according to one embodiment of the present invention;

FIG. 117 is a descriptive drawing showing a file for a pre-formed hole of a screw according to one embodiment of the present invention;

FIG. 118 is a descriptive drawing showing a machining method symbol file according to one embodiment of the present invention;

FIG. 119 is a descriptive drawing showing a finishing symbol file according to one embodiment of the present invention;

FIG. 120 is a descriptive drawing showing a finishing allowance file (outside diameter, a thermally finishing allowance which is not included, a finishing allowance per diameter, and a turning operation) according to one embodiment of the present invention;

FIG. 121 is a descriptive drawing showing a finishing allowance file (outside diameter, a thermally finishing allowance which is included, a finishing allowance per diameter, and a turning operation) according to one embodiment of the present invention;

FIG. 122 is a descriptive drawing showing a finishing allowance file (inside diameter, a thermally finishing allowance which is not included, a finishing allowance per diameter, and a turning operation) according to one embodiment of the present invention;

FIG. 123 is a descriptive drawing showing a finishing allowance file (with regard to the machining of a rod material) according to one embodiment of the present invention;

FIG. 124 is a descriptive drawing showing a material file according to one embodiment of the present invention;

FIG. 125 is a descriptive drawing showing a translation table (1/3) of tool material according to one embodiment of the present invention;

FIG. 126 is a descriptive drawing showing a translation table (2/3) of tool material according to one embodiment of the present invention;

FIG. 127 is a descriptive drawing showing a translation table (3/3) of tool material according to one embodiment of the present invention;

FIG. 128 is a descriptive drawing of a cutting condition file (for a turning operation) according to one embodiment of the present invention;

FIG. 129 is a descriptive drawing of a cutting condition file (for a machining operation using a side cutter) according to one embodiment of the present invention;

FIG. 130 is a descriptive drawing of a cutting condition file (for an end milling operation) according to one embodiment of the present invention;

FIG. 131 is a descriptive drawing of a cutting condition file (for a drilling operation) according to one embodiment of the present invention;

Figure 142:
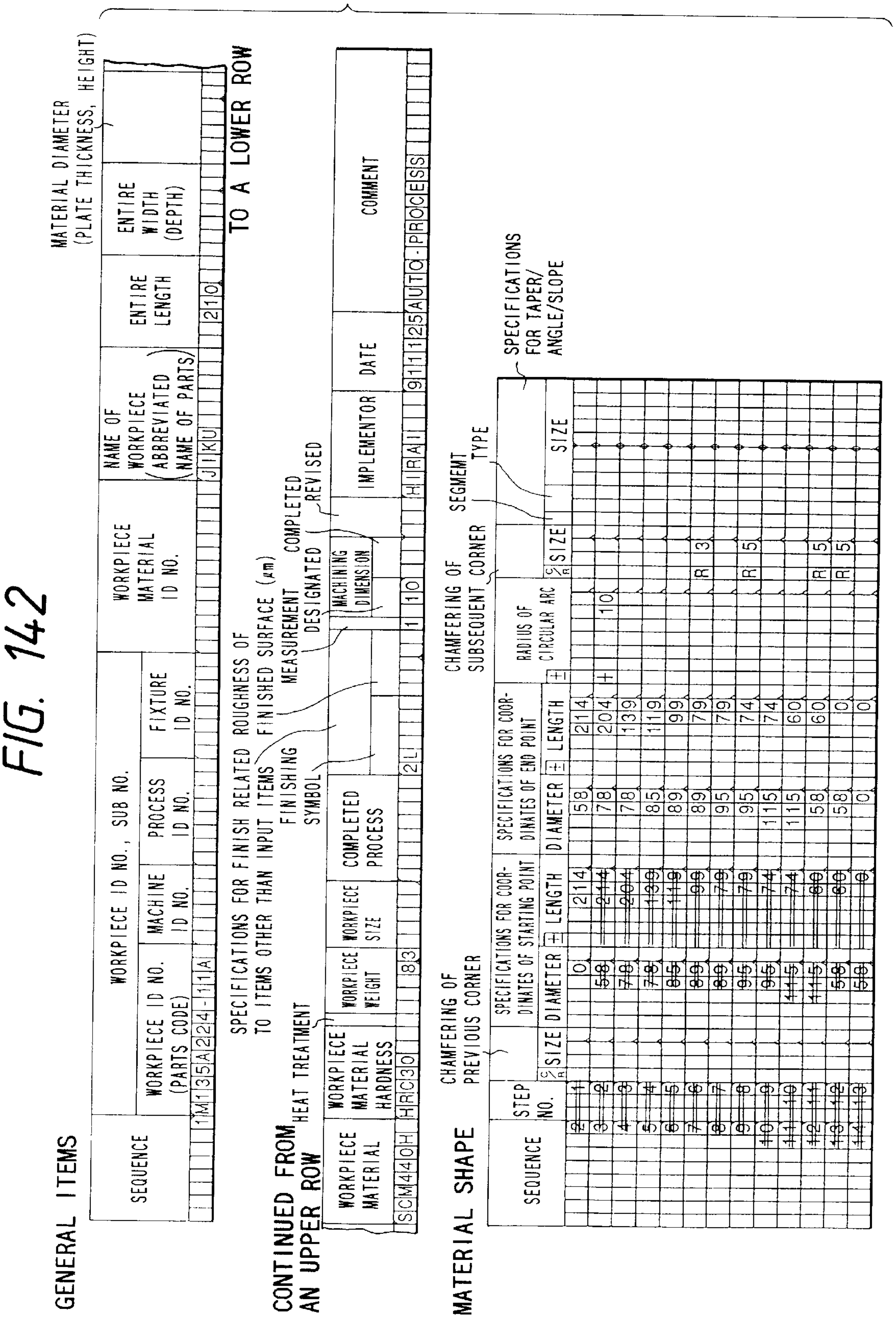
Figure 143:
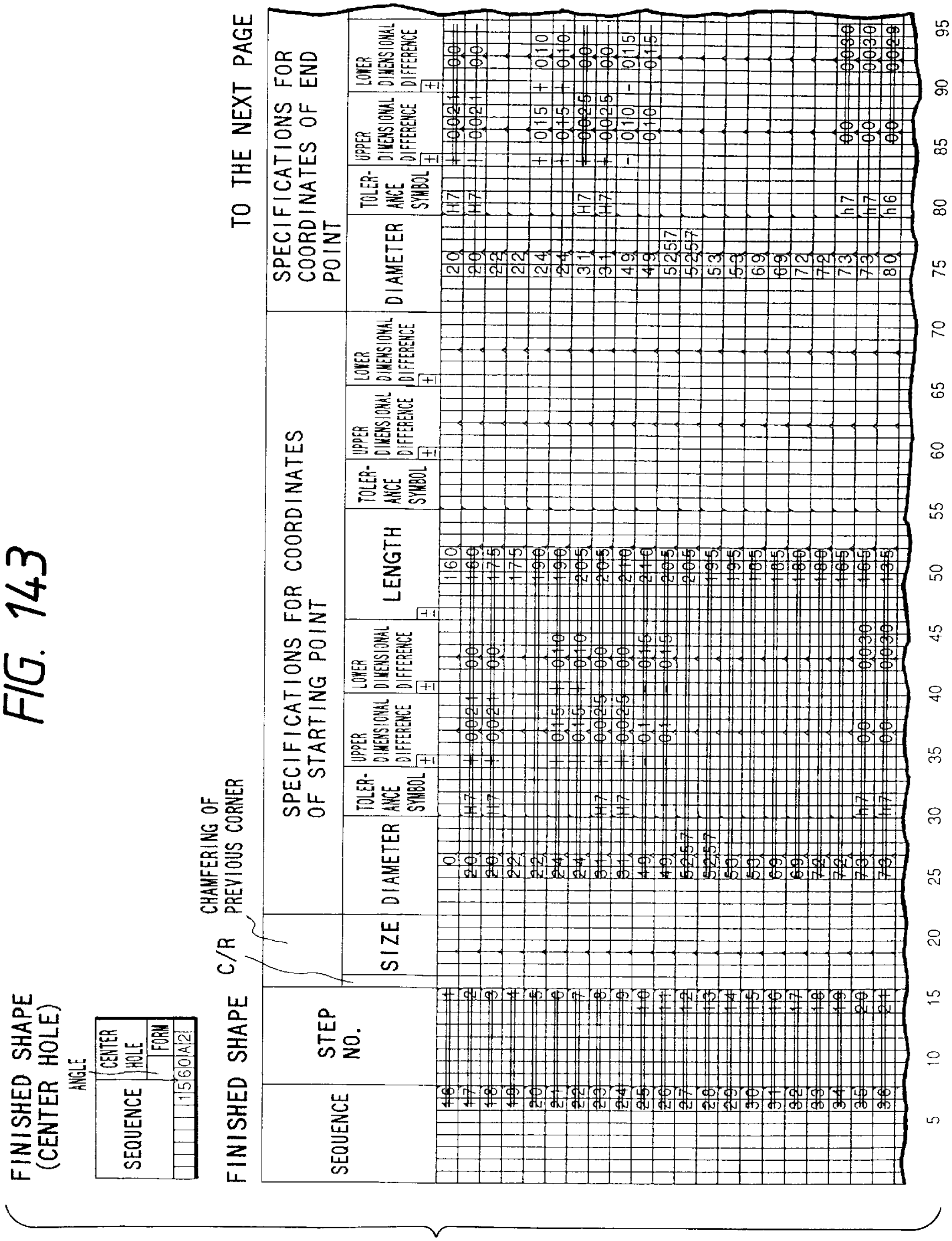
Figure 148:
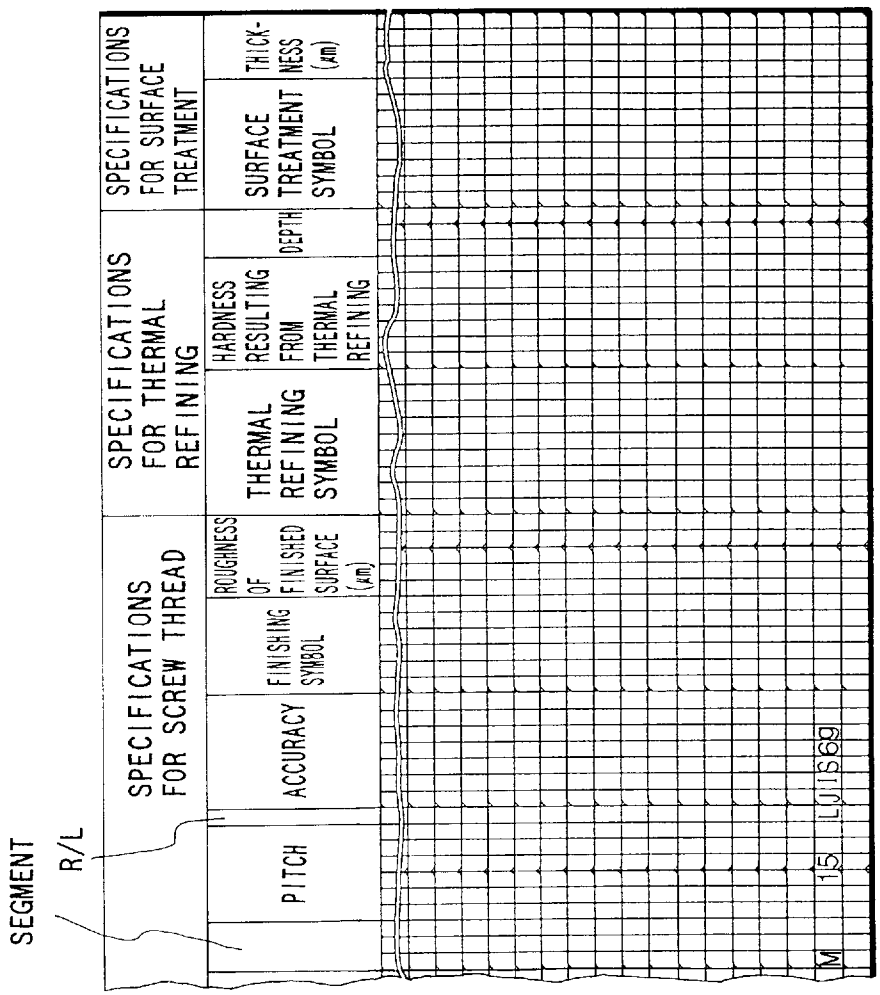
Figure 149:
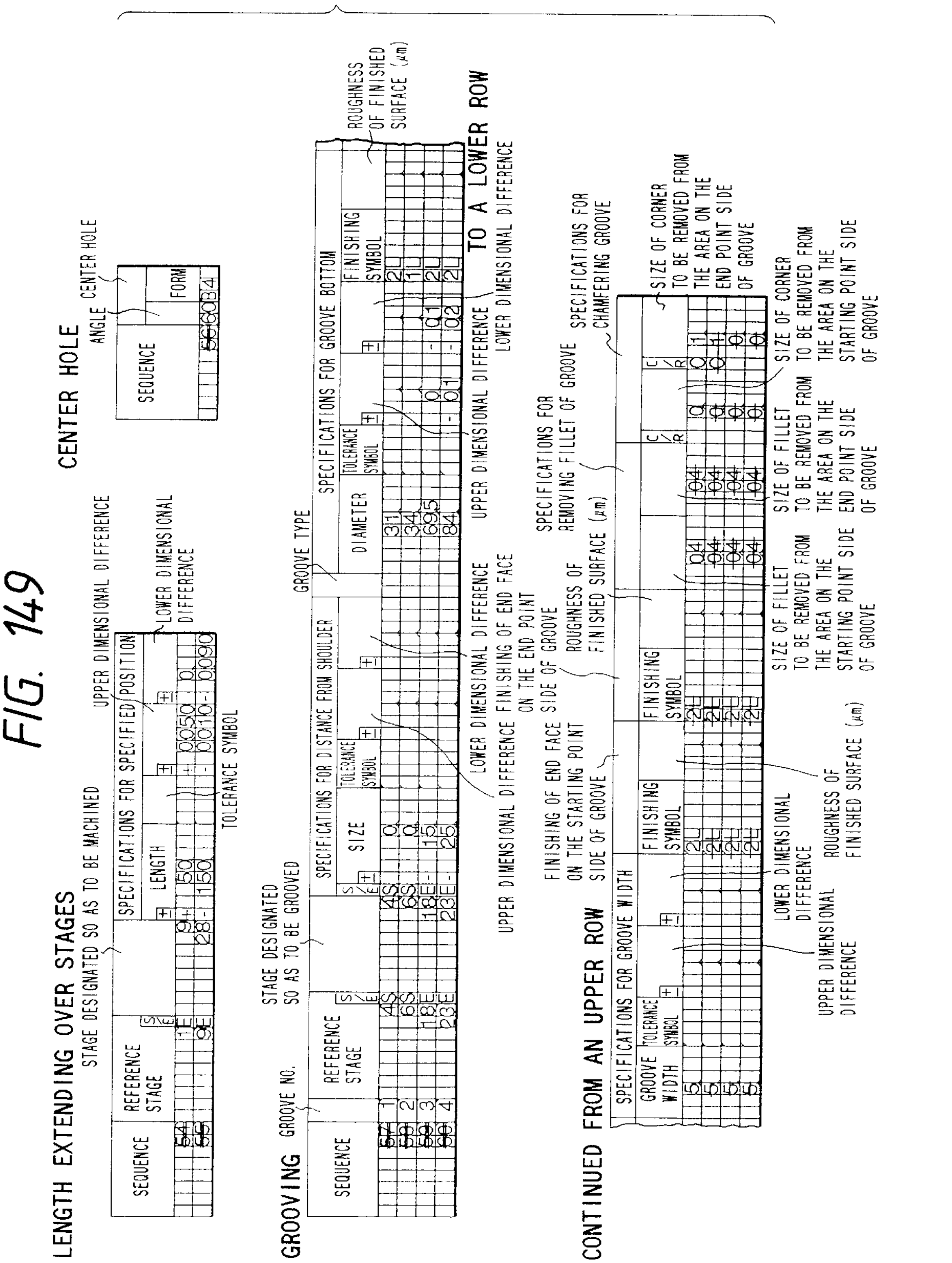
Figure 150:
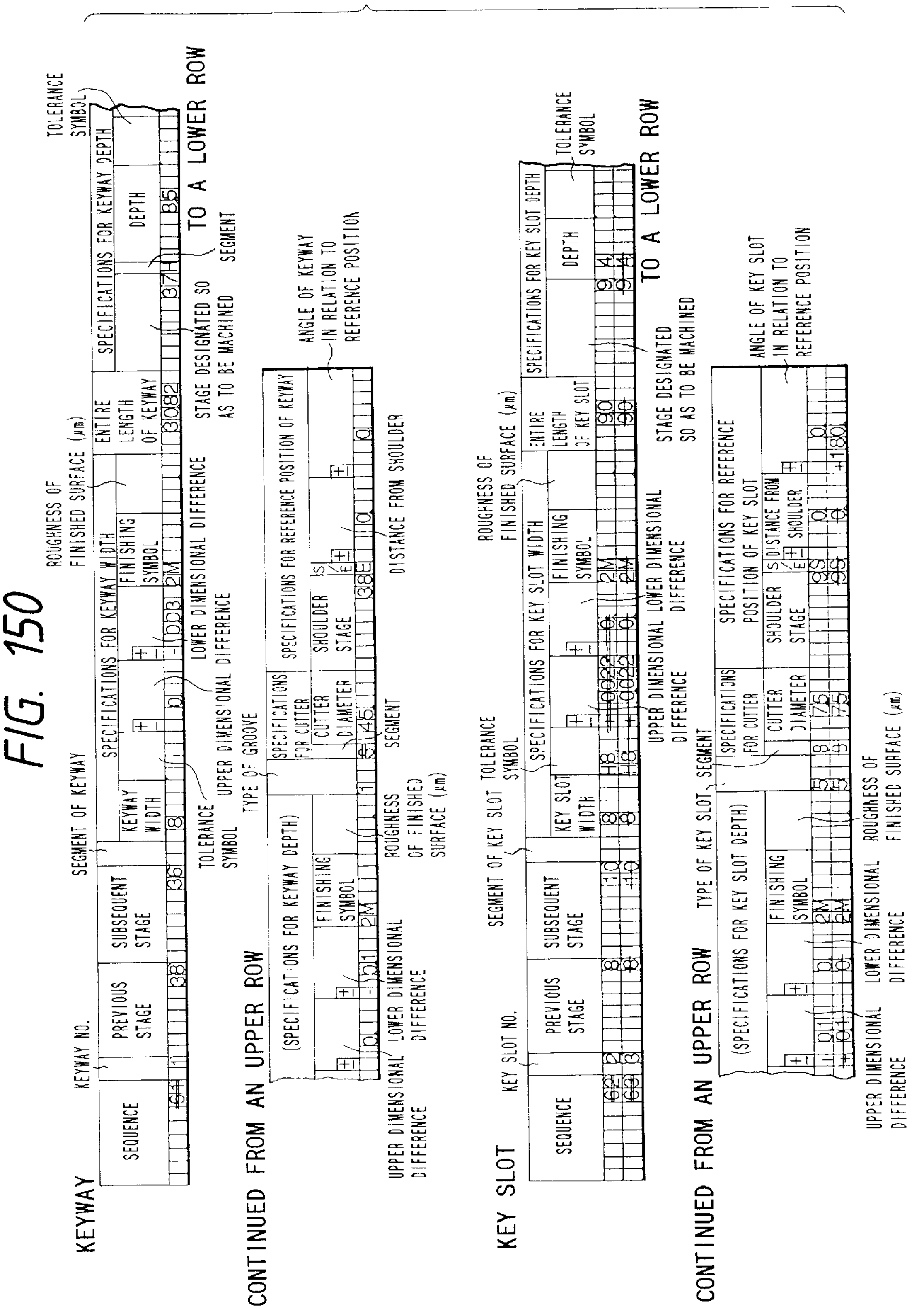
Figure 151:
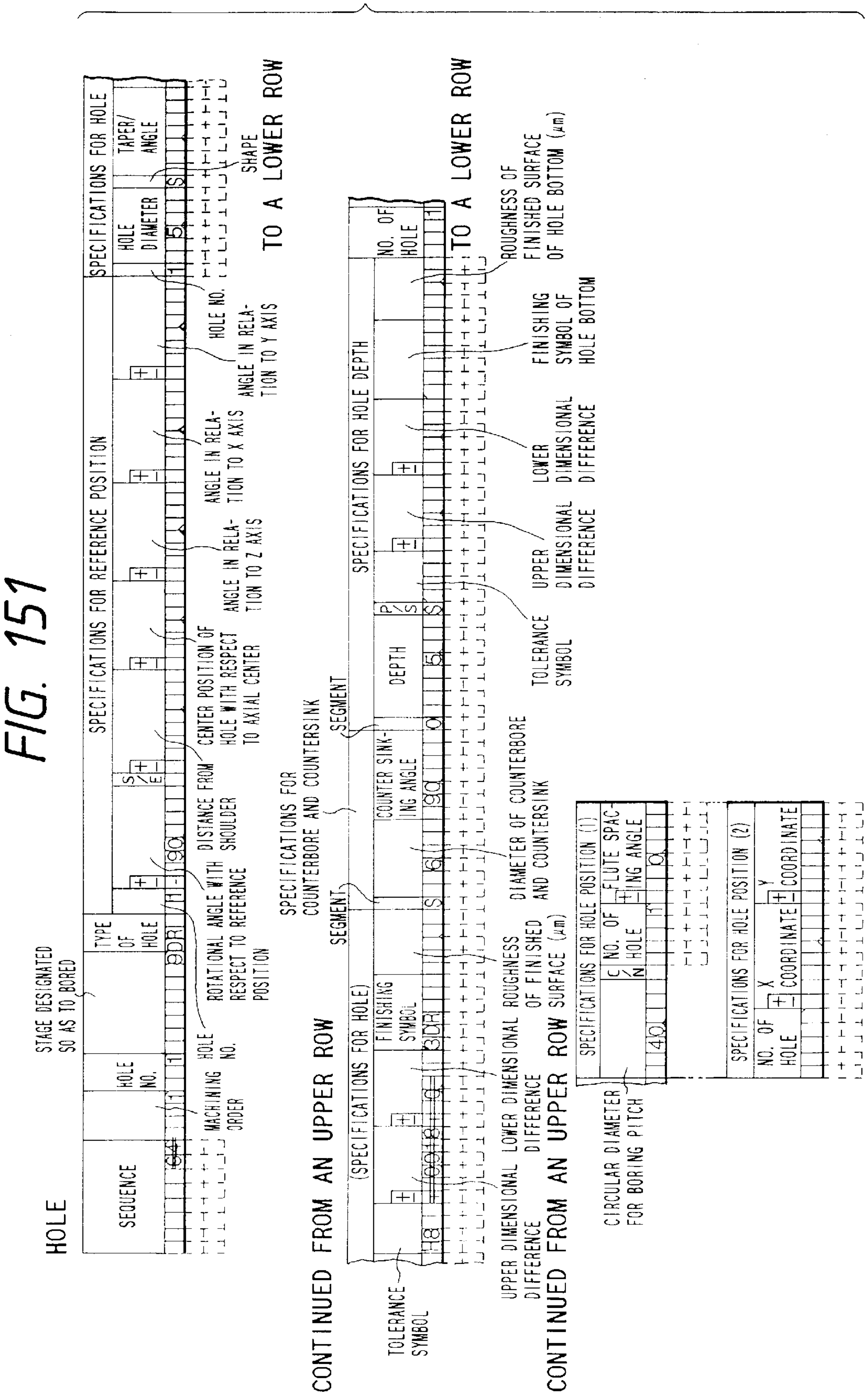
Figure 152:
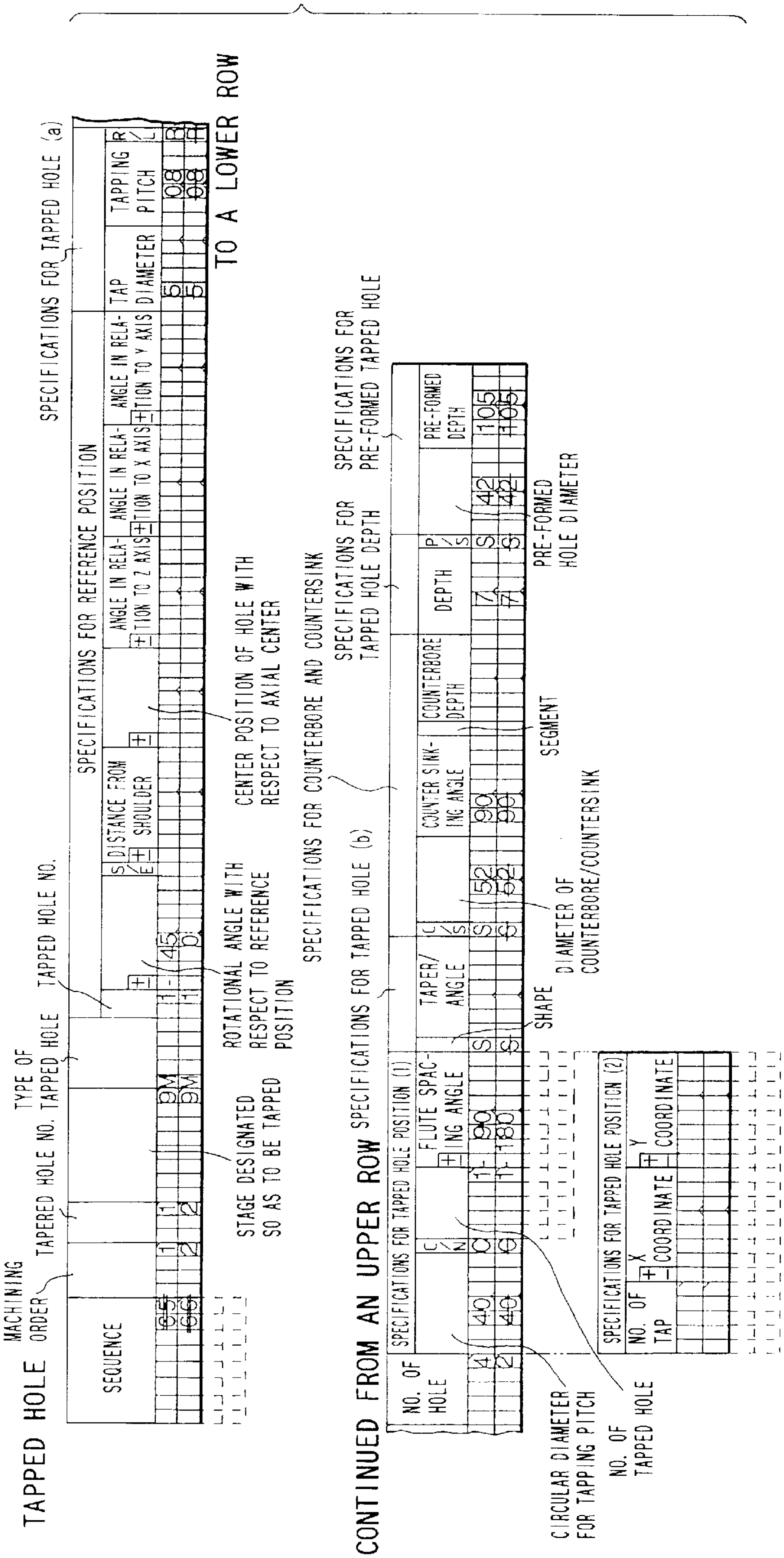
Figure 153:
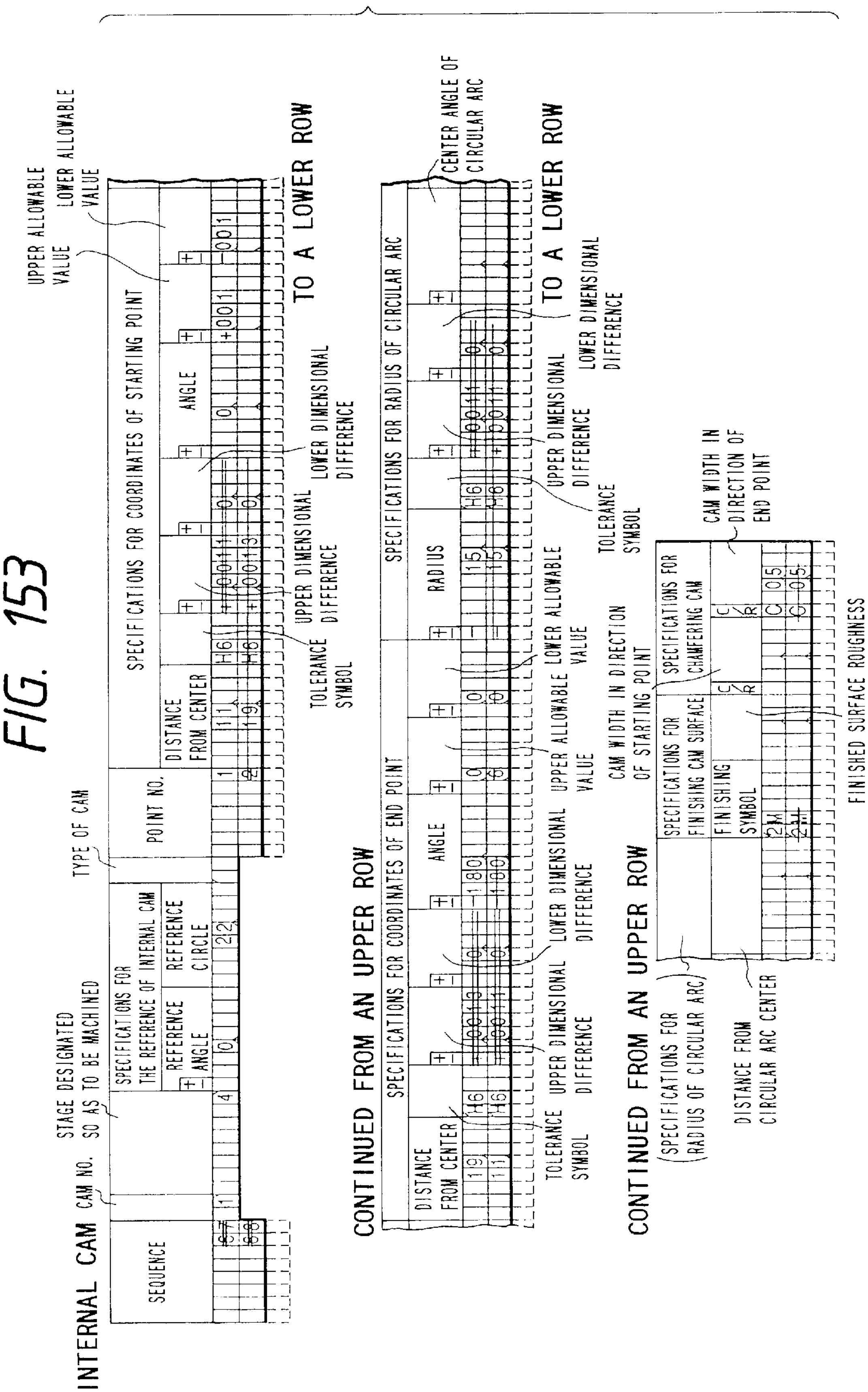
Figure 154:
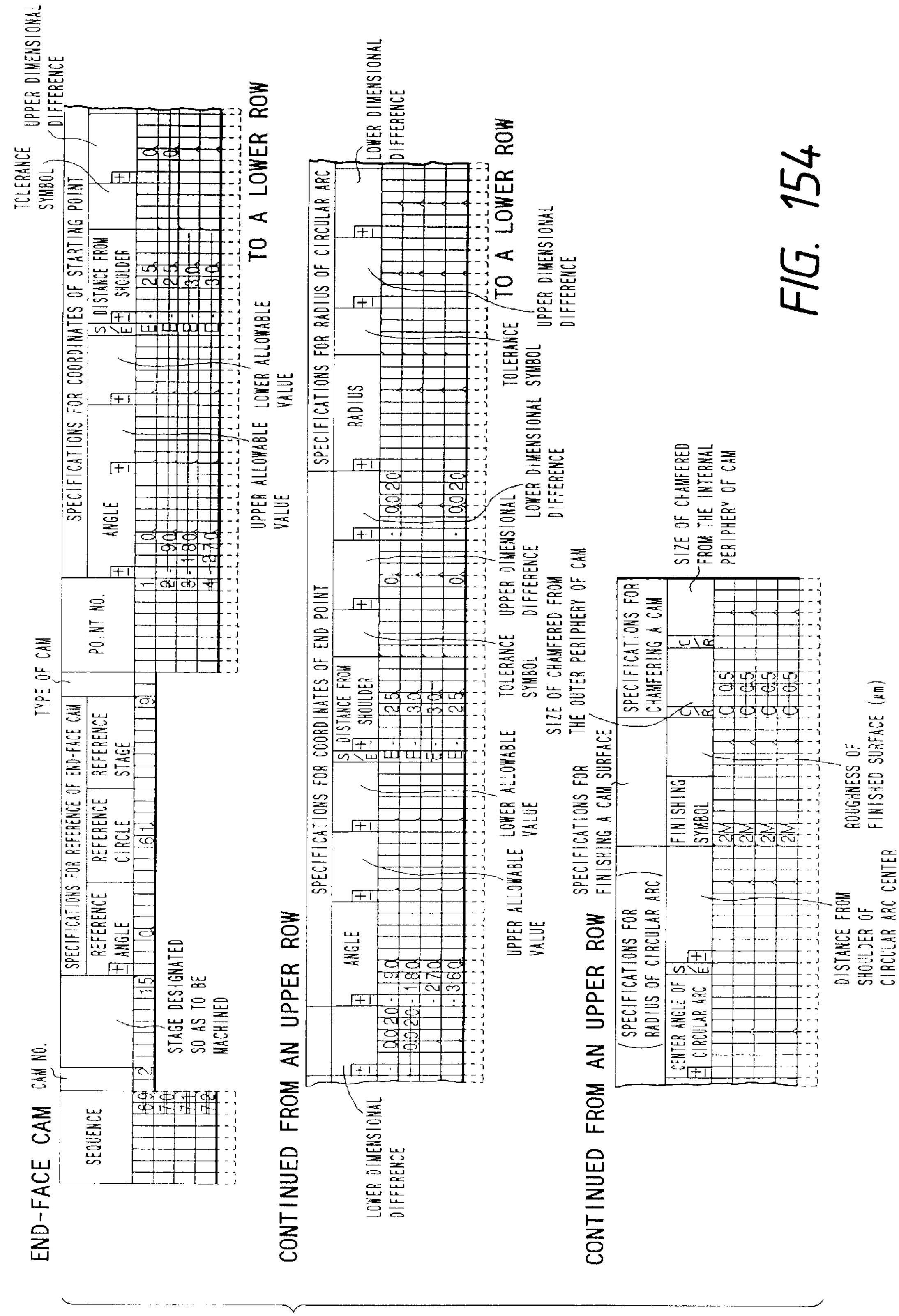
Figure 155:
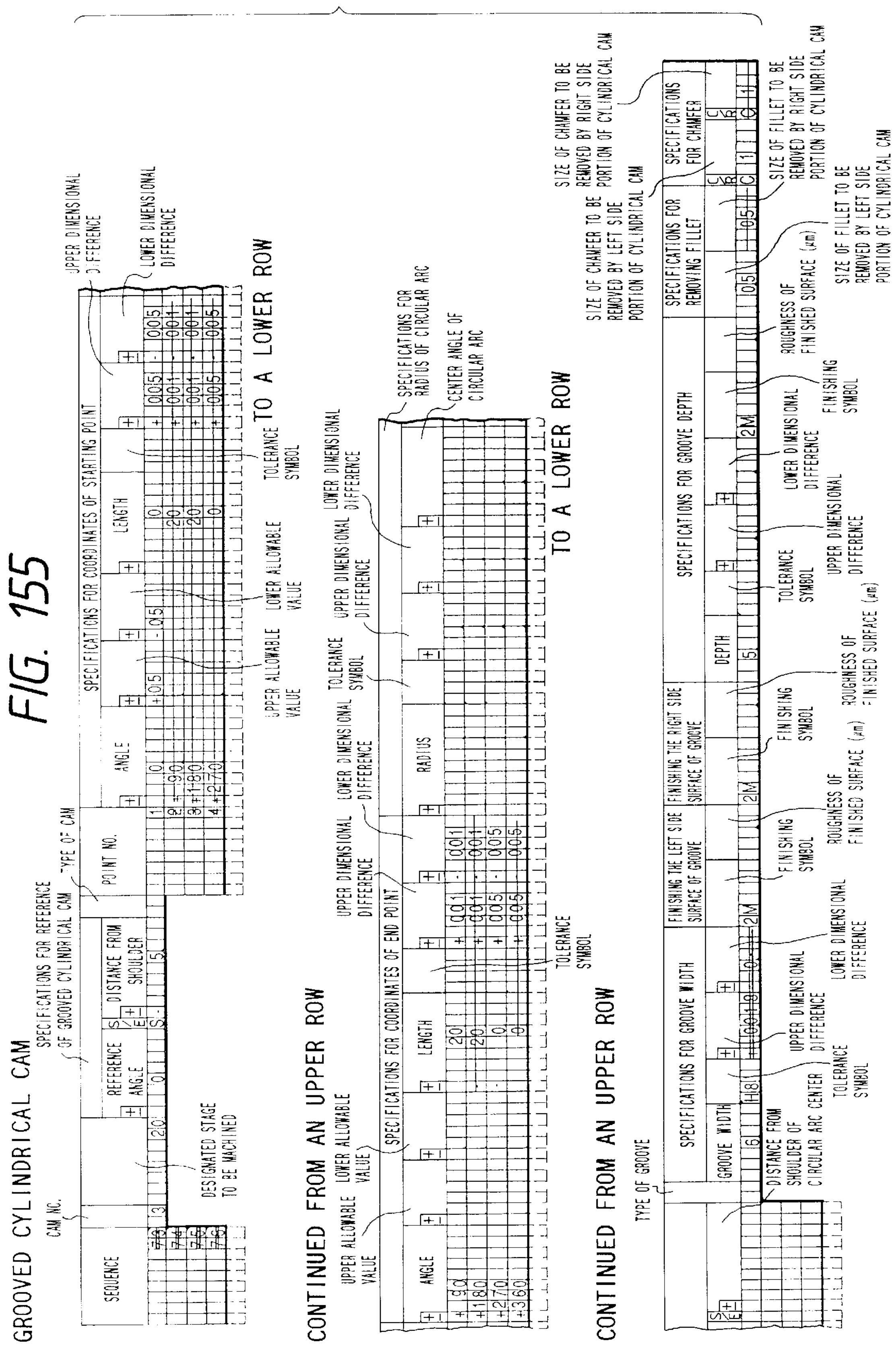
Figure 156:
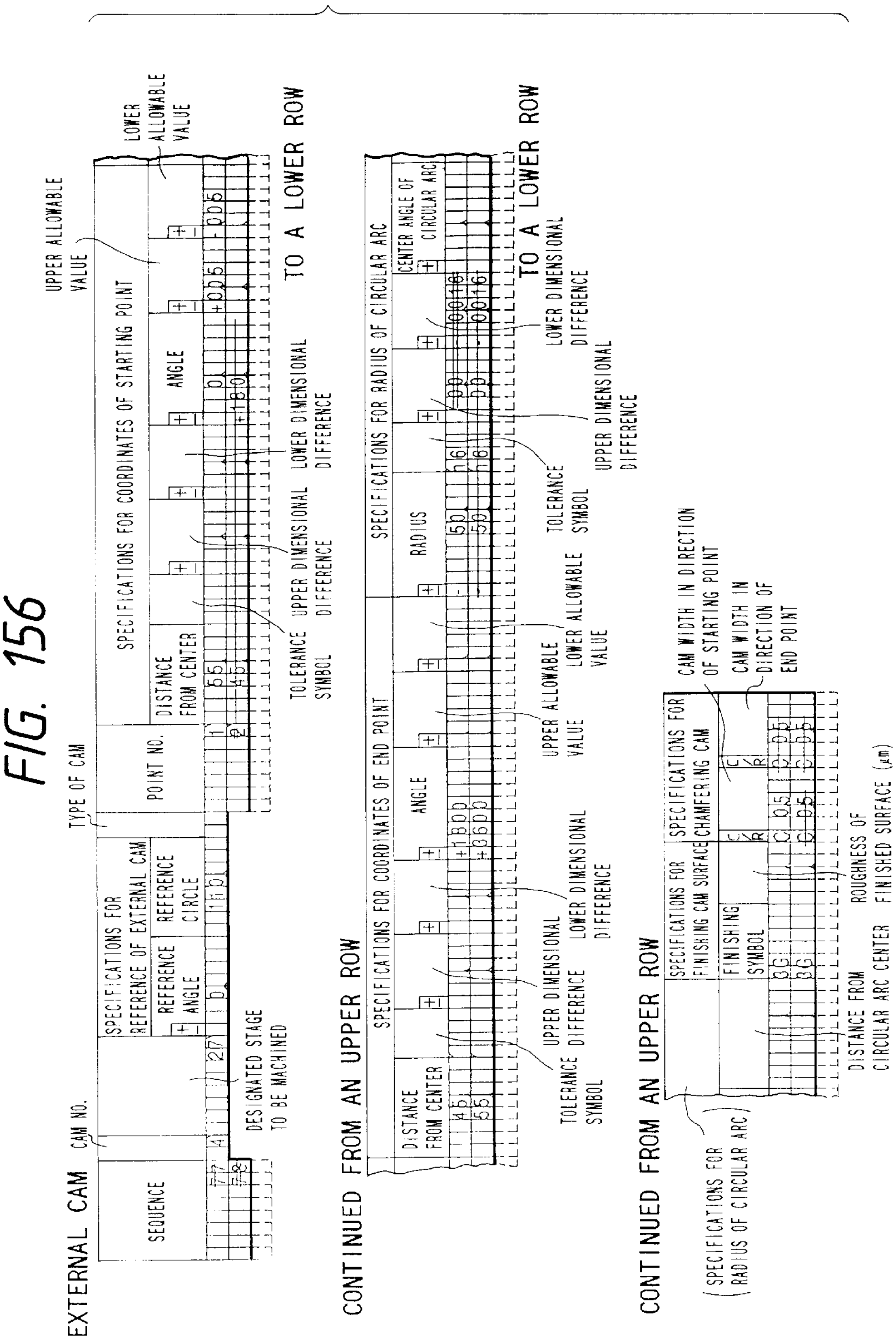
Figure 157:
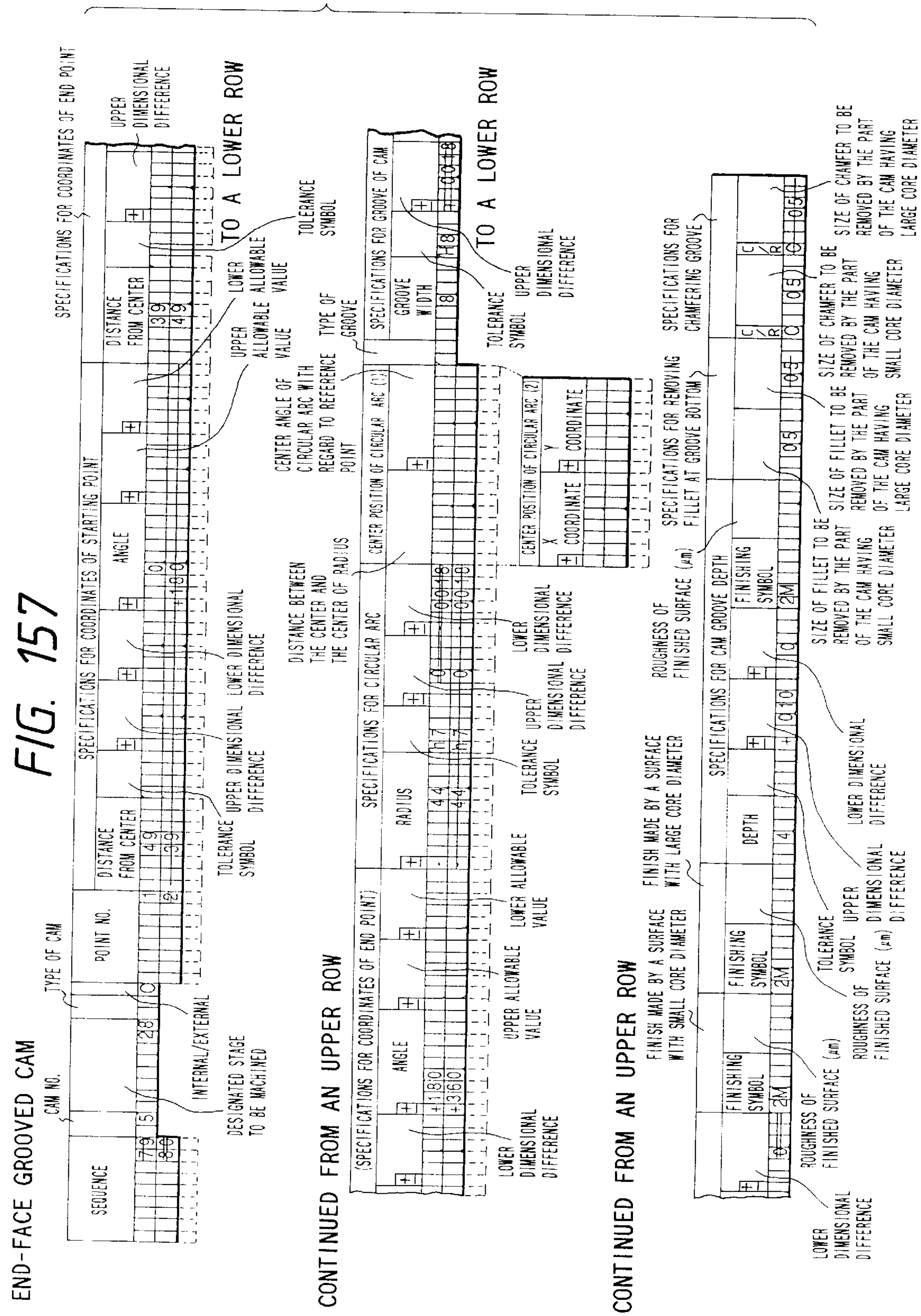
Figure 158:
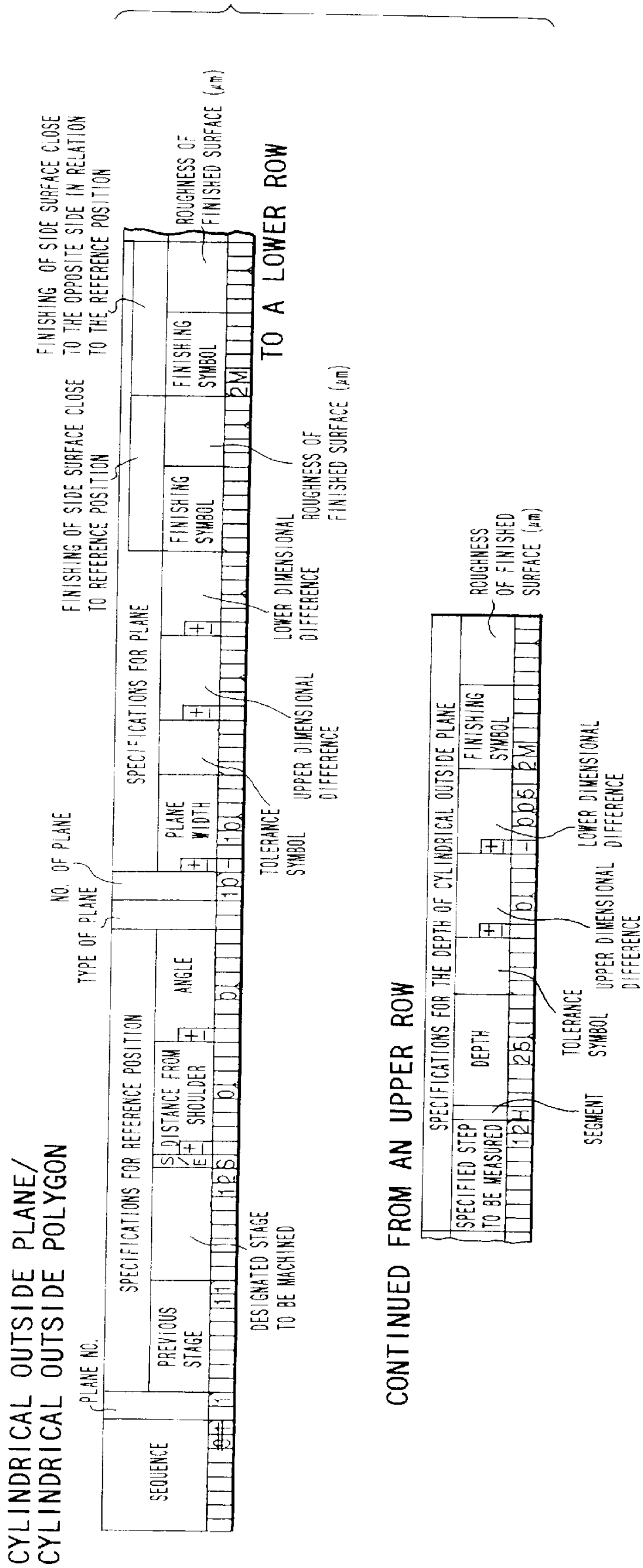
Figure 159:
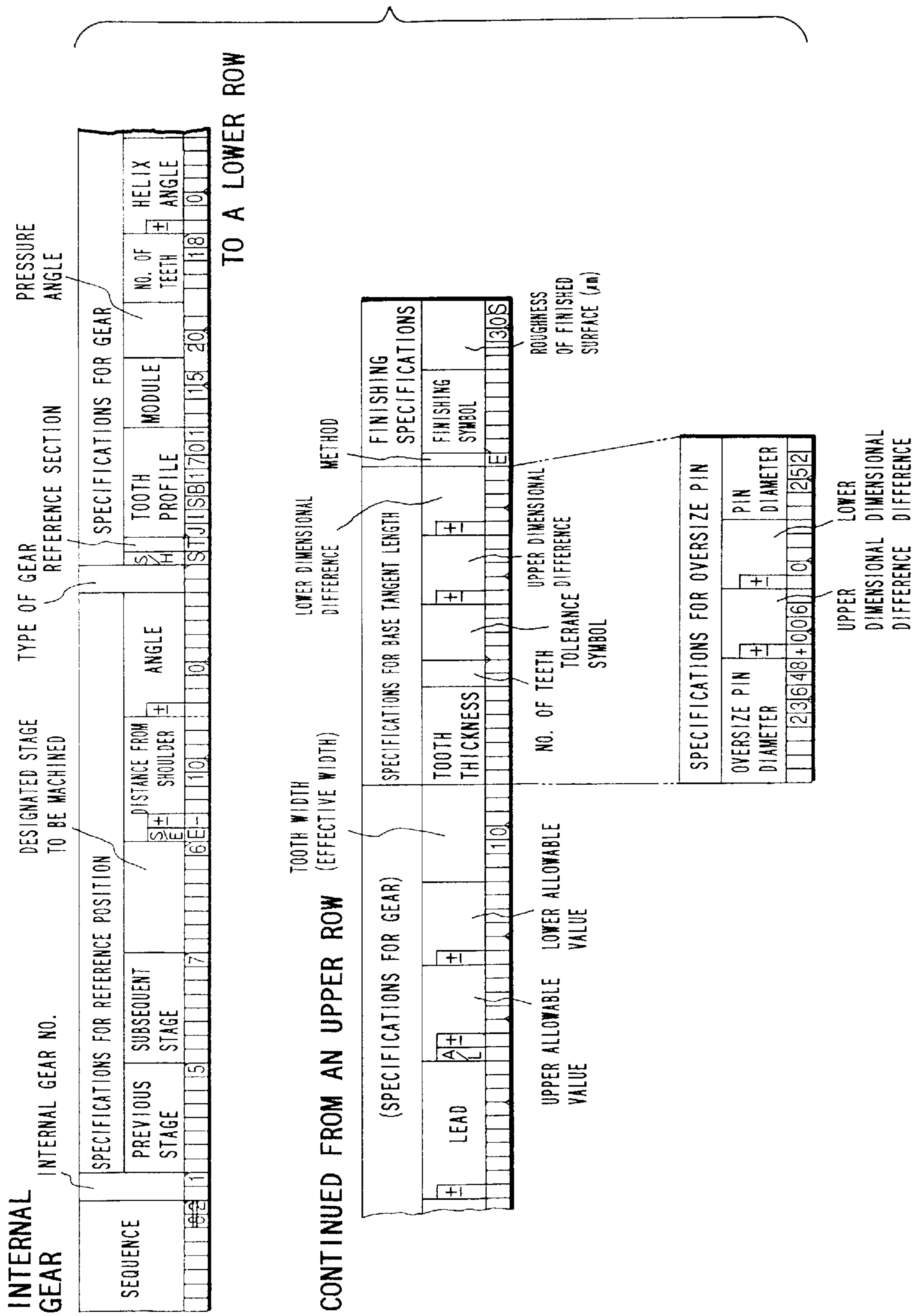
Figure 160:
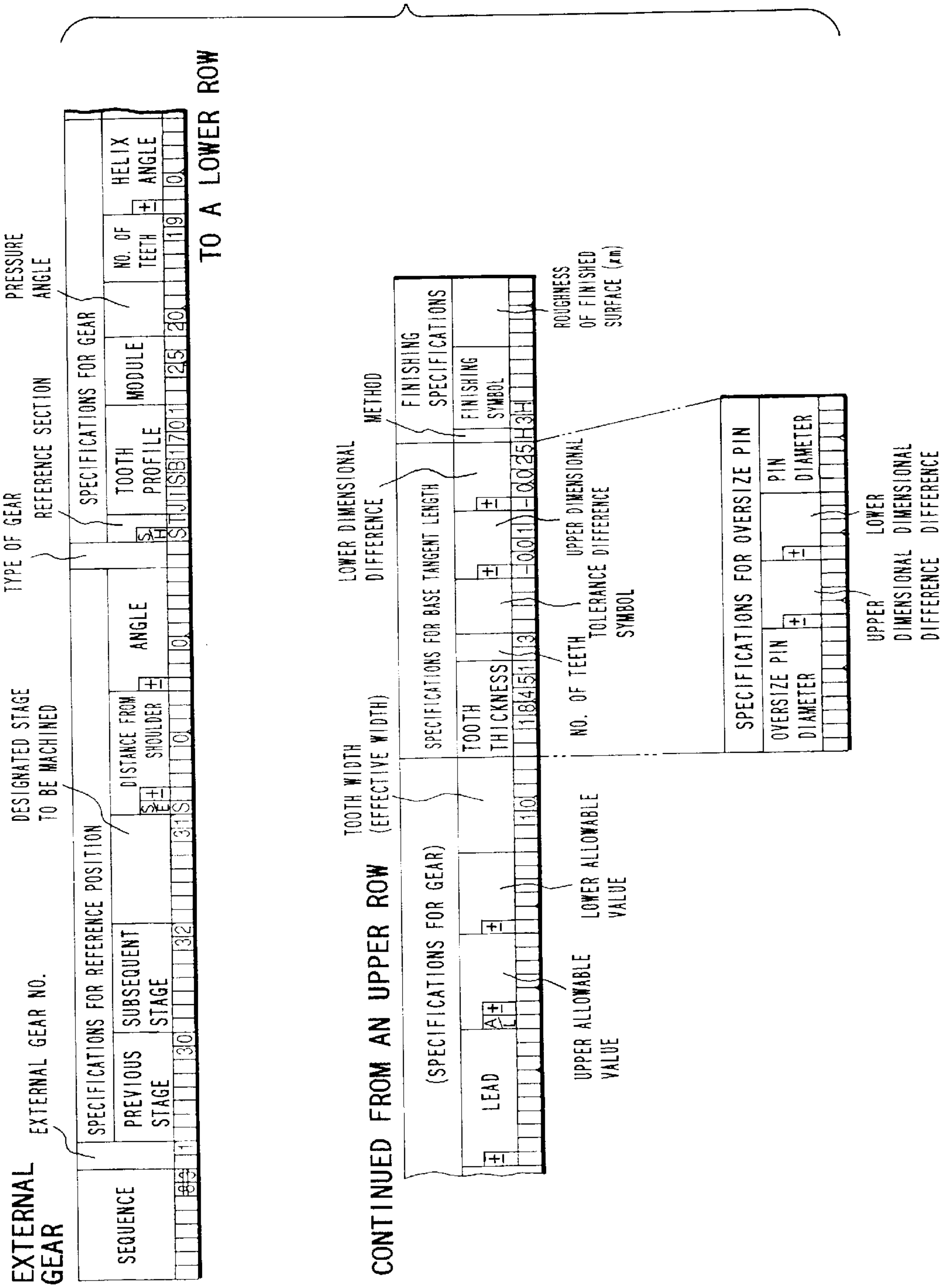
Figure 164:
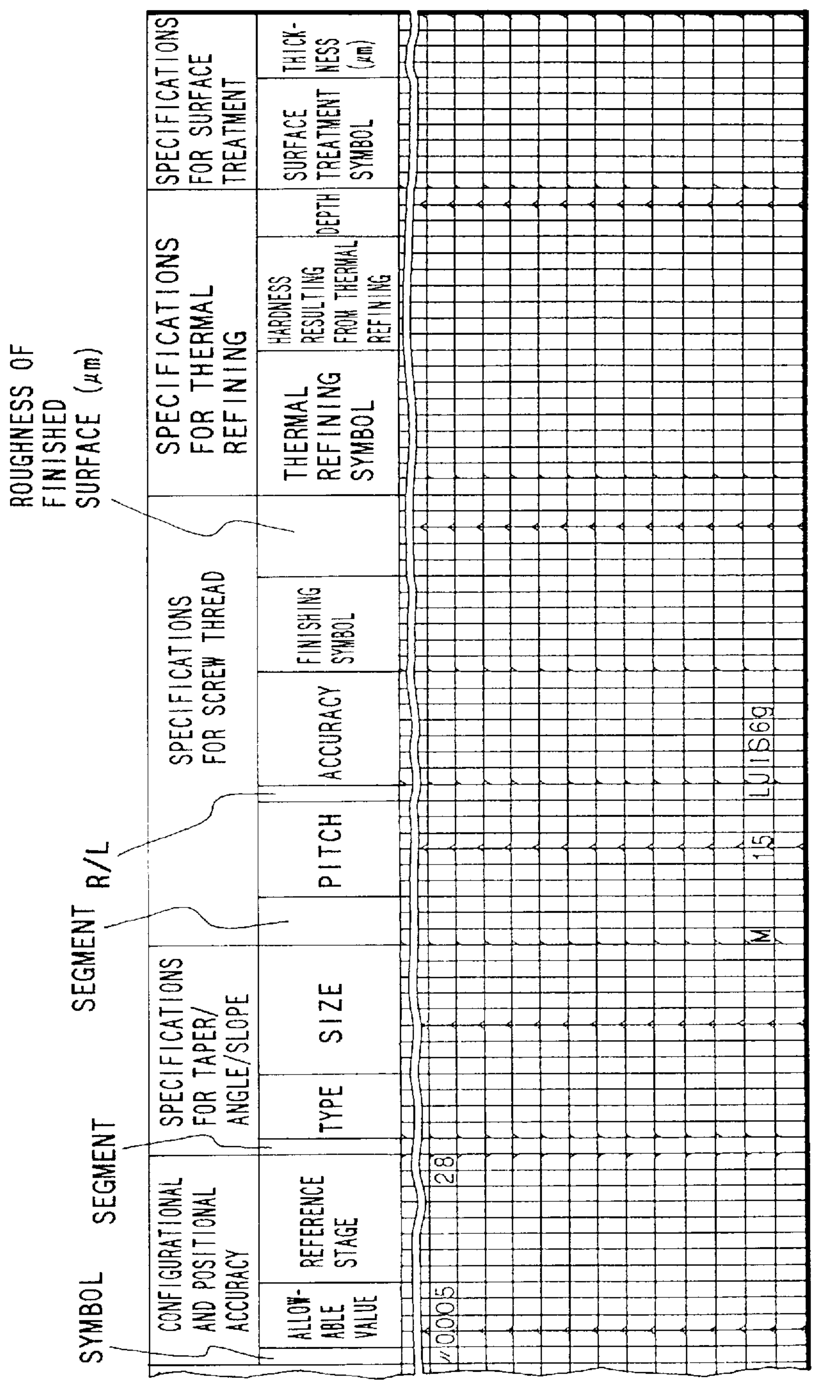
Figure 166:
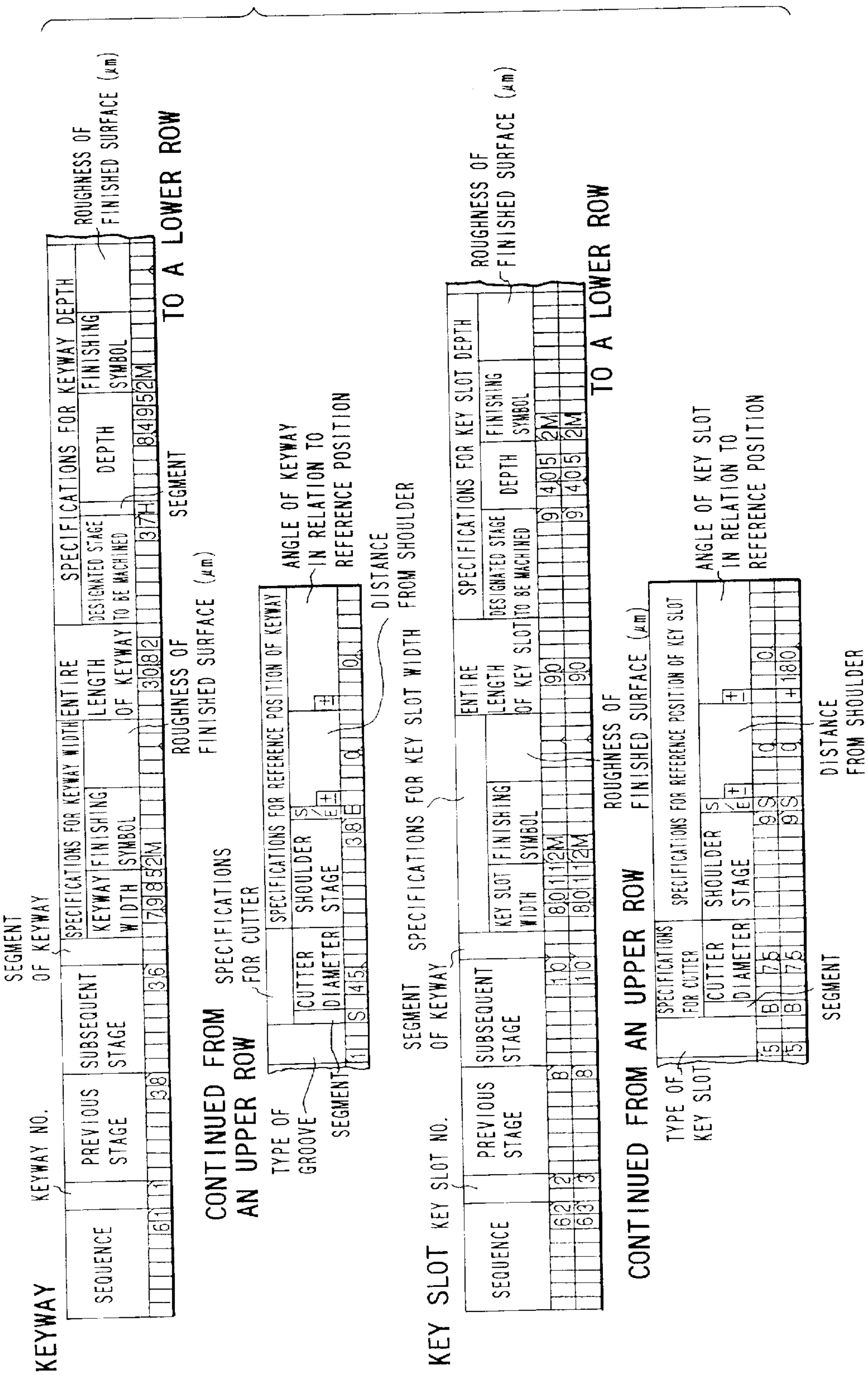
Figure 169:
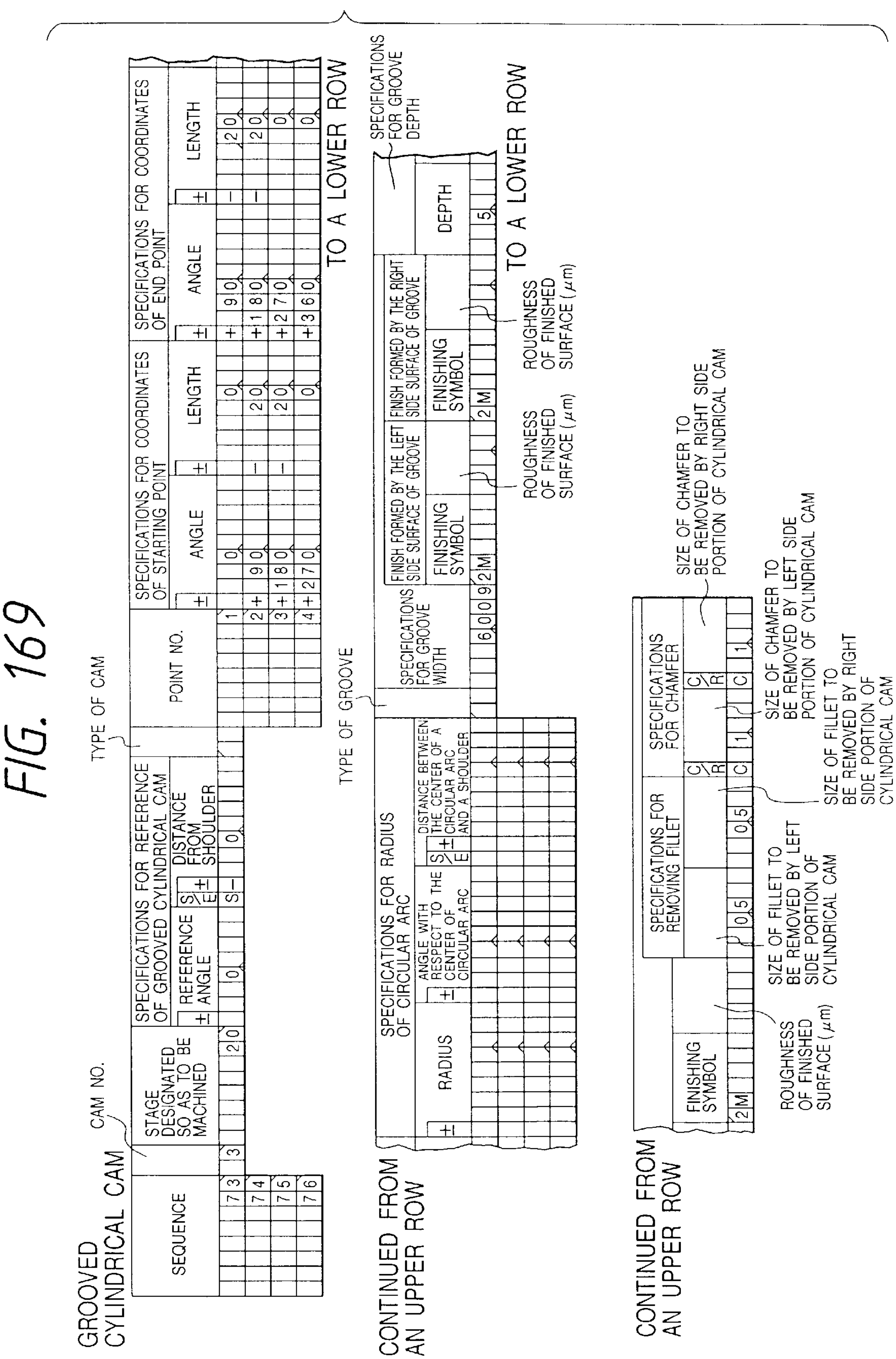
Figure 171:
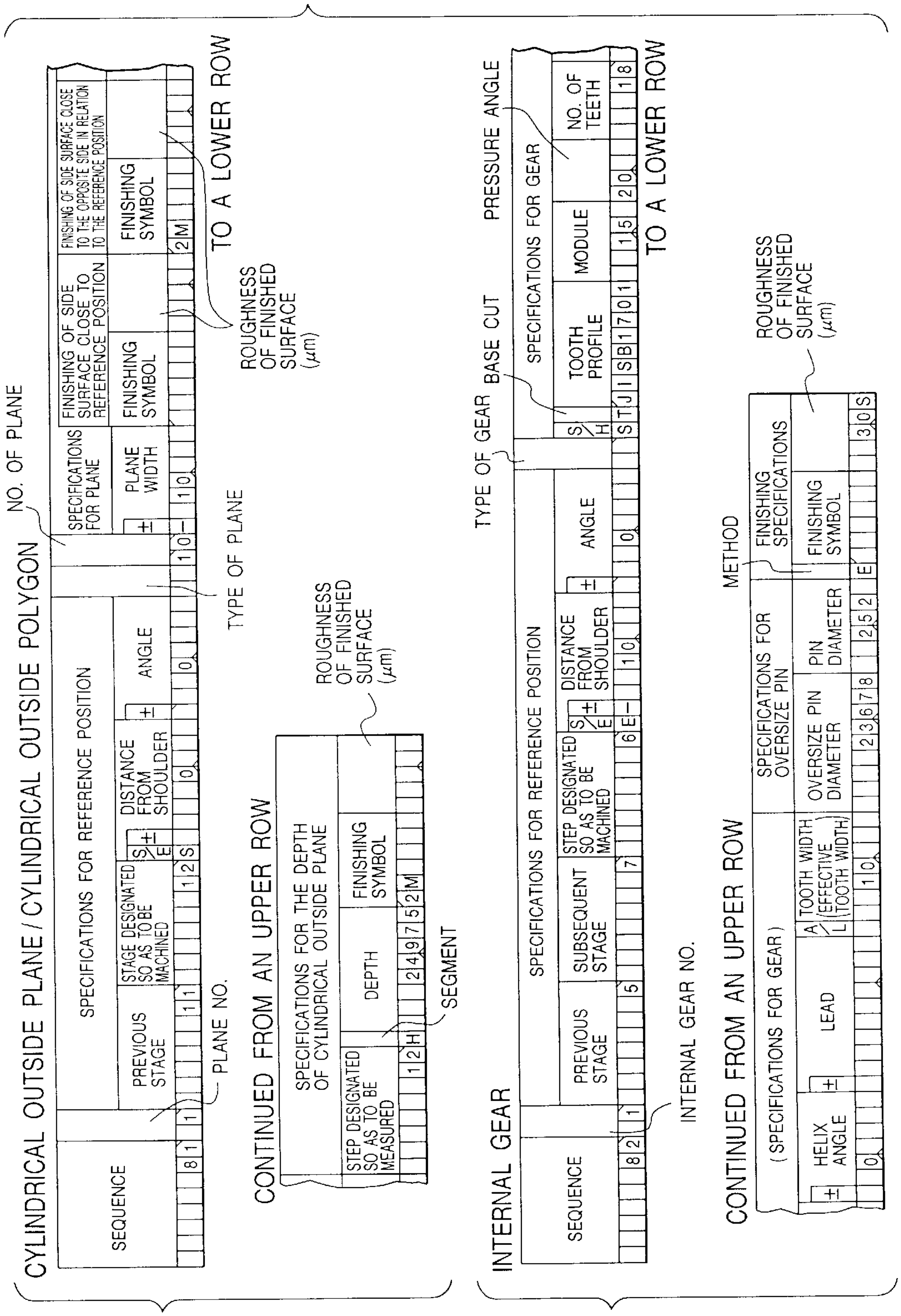
Figure 172:
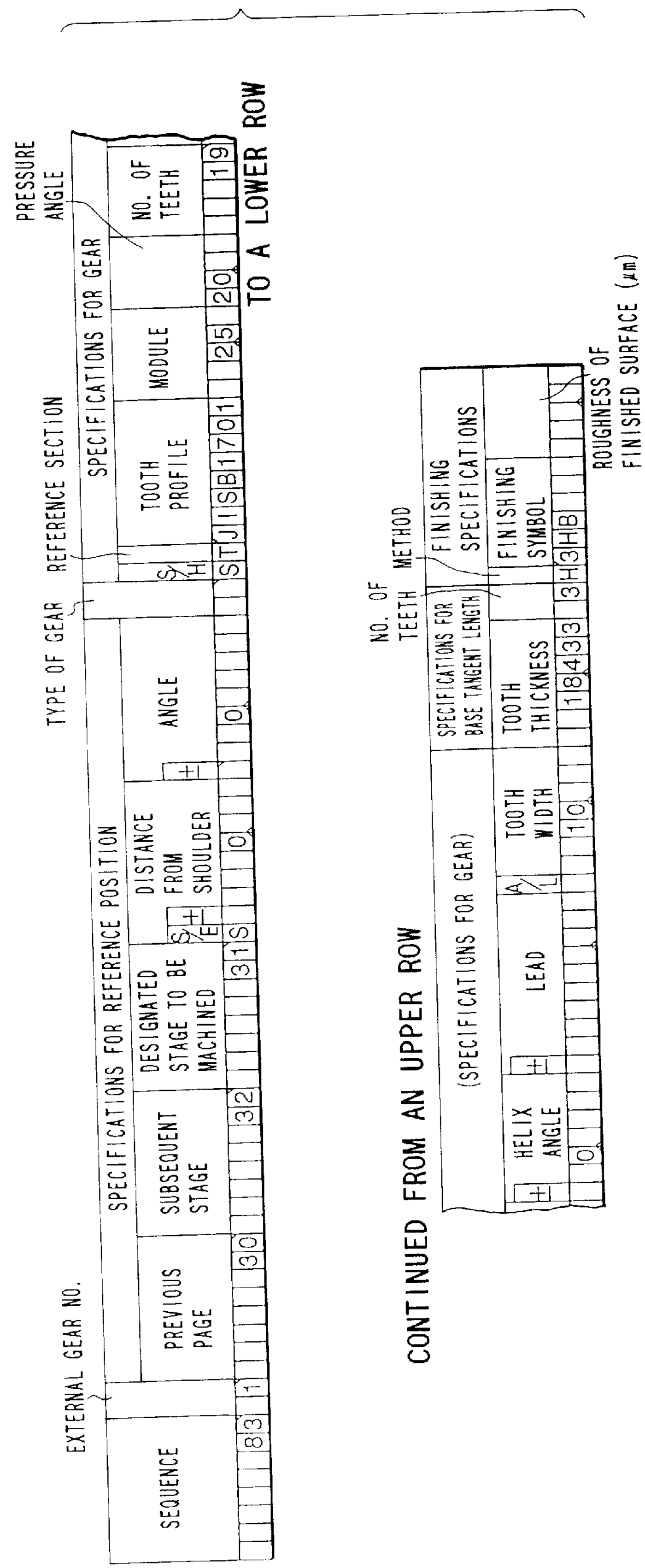
Figure 174:
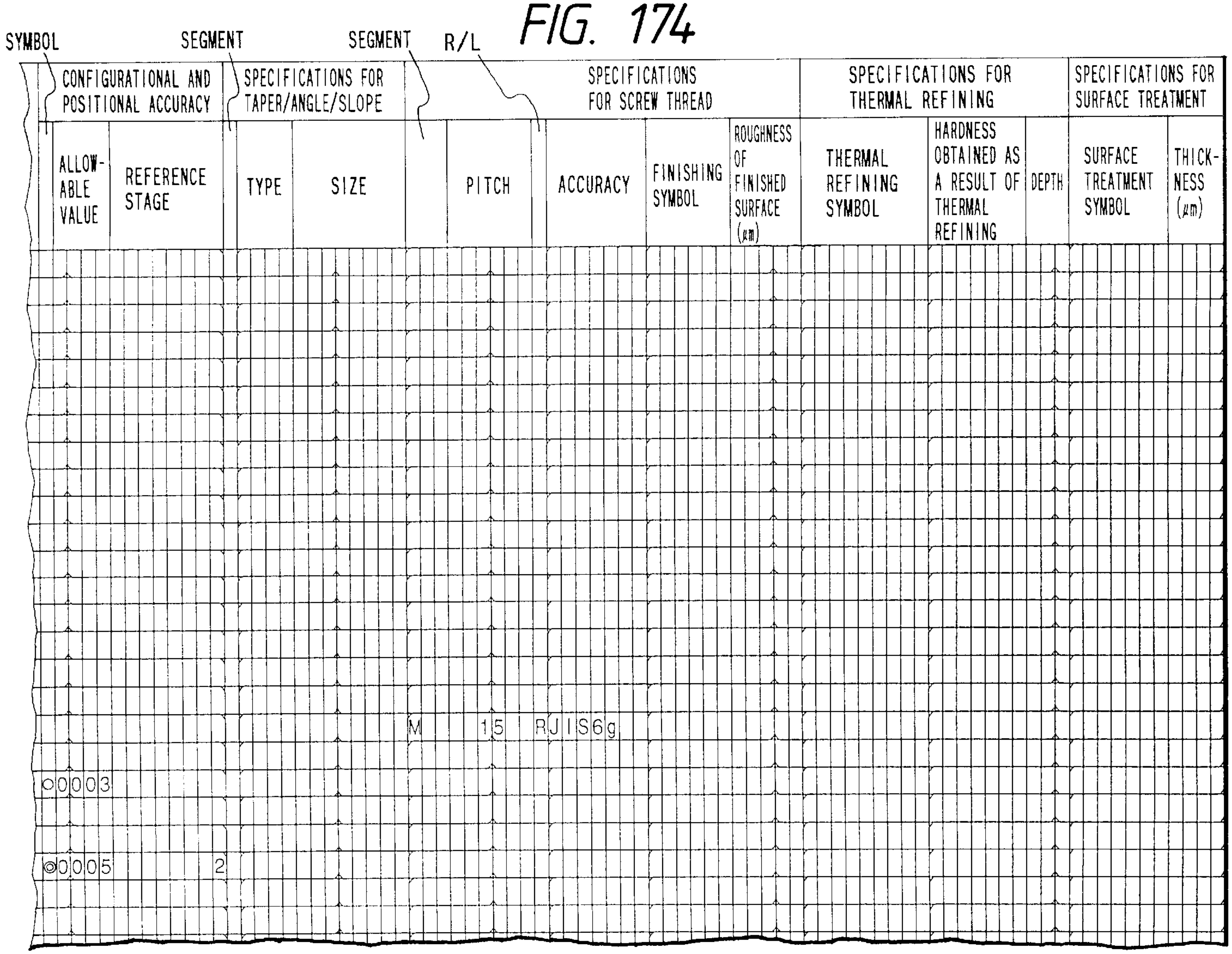
Figure 176:
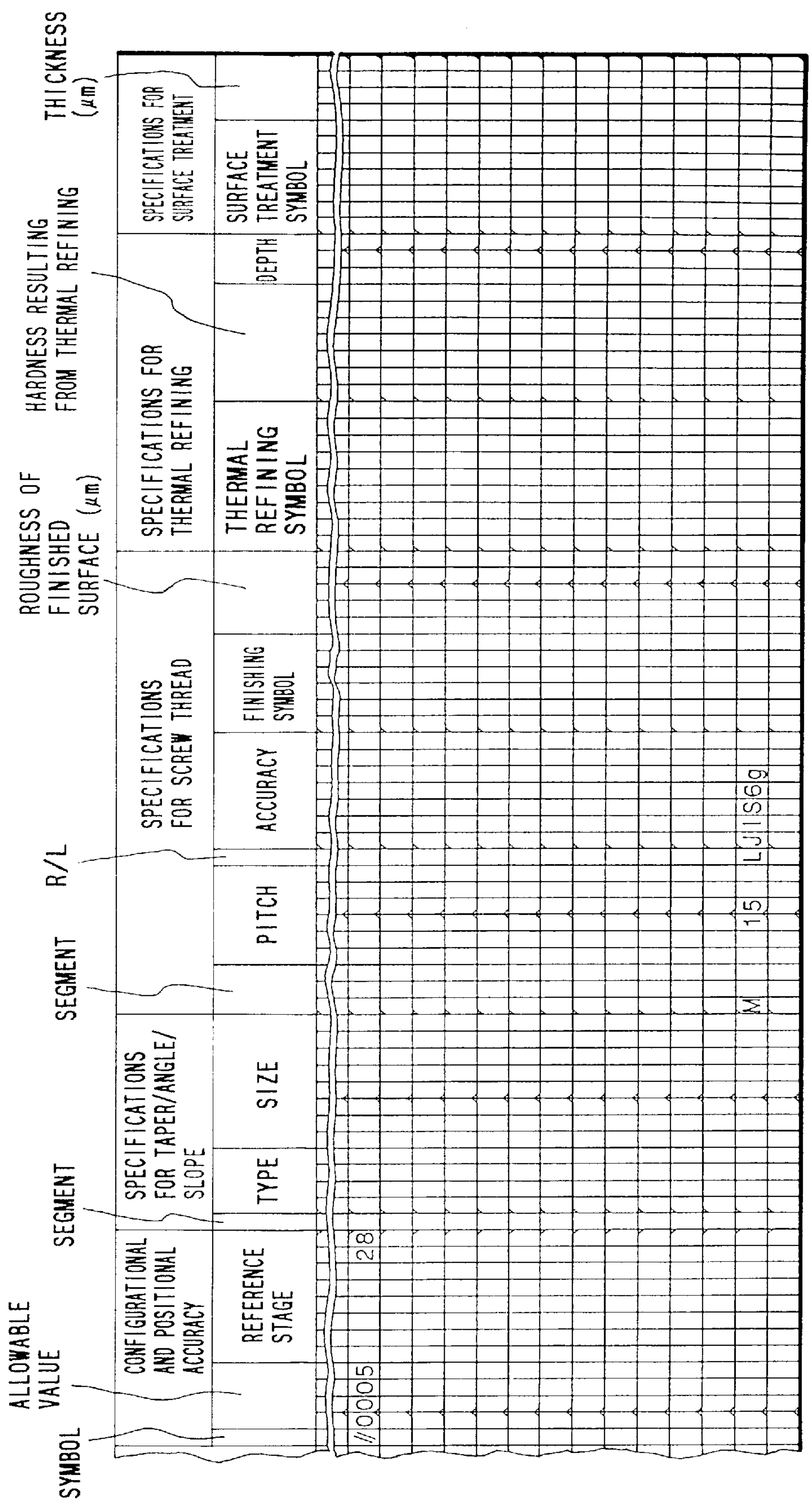

FIG. 132 is a descriptive drawing of a cutting condition file (for a tapping operation) according to one embodiment of the present invention;

FIG. 133 is a descriptive drawing of a cutting condition file (for a reaming operation) according to one embodiment of the present invention;

FIG. 134 is a descriptive drawing of a cutting condition file (for a hobbing operation) according to one embodiment of the present invention;

FIG. 135 is a descriptive drawing of a cutting condition file (for an outside diameter turning operation) according to one embodiment of the present invention;

FIG. 136 is a descriptive drawing of a cutting condition file (for an inside diameter boring operation) according to one embodiment of the present invention;

FIG. 137 is a descriptive drawing of a surface treatment file according to one embodiment of the present invention;

FIG. 138 is a descriptive drawing of a thermal refining file according to one embodiment of the present invention;

FIG. 139 is a descriptive drawing of a configurational and positional accuracy file according to one embodiment of the present invention;

FIG. 140 is a descriptive drawing of a cost file according to one embodiment of the present invention;

FIG. 141 is a table of constants used in a tool lifespan expression according to one embodiment of the present invention;

FIG. 142 is a descriptive drawing of a data entry format with regard to general matters and the shape of material according to one embodiment of the present invention;

FIG. 143 is a descriptive drawing of a data entry format (1/3) for a finished shape (sequence numbers 16 to 36) according to one embodiment of the present invention;

FIG. 144 is a descriptive drawing of a data entry format (2/3) for a finished shape (sequence numbers 16 to 36) according to one embodiment of the present invention;

FIG. 145 is a descriptive drawing of a data entry format (3/3) for a finished shape (sequence numbers 16 to 36) according to one embodiment of the present invention;

FIG. 146 is a descriptive drawing of a data entry format (1/3) for a finished shape (sequence numbers 37 to 53) according to one embodiment of the present invention;

FIG. 147 is a descriptive drawing of a data entry format (2/3) for a finished shape (sequence numbers 37 to 53) according to one embodiment of the present invention;

FIG. 148 is a descriptive drawing of a data entry format (3/3) for a finished shape (sequence numbers 37 to 53) according to one embodiment of the present invention;

FIG. 149 is a descriptive drawing of a data entry format for a finished shape (of a finished pattern extending over stages, and grooving of a center hole) according to one embodiment of the present invention;

FIG. 150 is a descriptive drawing of a data entry format for a finished shape (of a keyway and a key slot) according to one embodiment of the present invention;

FIG. 151 is a descriptive drawing of a data entry format for a finished shape (of a hole) according to one embodiment of the present invention;

FIG. 152 is a descriptive drawing of a data entry format for a finished shape (of a tapped hole) according to one embodiment of the present invention;

FIG. 153 is a descriptive drawing of a data entry format for a finished shape (of an internal cam) according to one embodiment of the present invention;

FIG. 154 is a descriptive drawing of a data entry format for a finished shape (of an end cam) according to one embodiment of the present invention;

FIG. 155 is a descriptive drawing of a data entry format for a finished shape (of a grooved cylindrical cam) according to one embodiment of the present invention;

FIG. 156 is a descriptive drawing of a data entry format for a finished shape (of an external cam) according to one embodiment of the present invention;

FIG. 157 is a descriptive drawing of a data entry format for a finished shape (of an end-face grooved cam) according to one embodiment of the present invention;

FIG. 158 is a descriptive drawing of a data entry format for a finished shape (of a cylindrical outside plane/a cylindrical outside polygon) according to one embodiment of the present invention;

FIG. 159 is a descriptive drawing of a data entry format for a finished shape (of an internal gear) according to one embodiment of the present invention;

FIG. 160 is a descriptive drawing of a data entry format for a finished shape (of an external gear) according to one embodiment of the present invention;

FIG. 161 is a descriptive drawing of a file (1/2) for a finally finished shape (sequence numbers 16–40) according to one embodiment of the present invention;

FIG. 162 is a descriptive drawing of a file (2/2) for a finally finished shape (sequence numbers 16–40) according to one embodiment of the present invention;

FIG. 163 is a descriptive drawing of a file (1/2) for a finally finished shape (sequence numbers 41–53) according to one embodiment of the present invention;

FIG. 164 is a descriptive drawing of a file (2/2) for a finally finished shape (sequence numbers 41–53) according to one embodiment of the present invention;

FIG. 165 is a descriptive drawing of a file for a finally finished shape (sequence numbers 54–60) according to one embodiment of the present invention;

FIG. 166 is a descriptive drawing of a file for a finally finished shape (sequence numbers 61–63) according to one embodiment of the present invention;

FIG. 167 is a descriptive drawing of a file for a finally finished shape (sequence numbers 64–66) according to one embodiment of the present invention;

FIG. 168 is a descriptive drawing of a file for a finally finished shape (sequence numbers 67–72) according to one embodiment of the present invention;

FIG. 169 is a descriptive drawing of a file for a finally finished shape (sequence numbers 73–76) according to one embodiment of the present invention;

FIG. 170 is a descriptive drawing of a file for a finally finished shape (sequence numbers 77–80) according to one embodiment of the present invention;

FIG. 171 is a descriptive drawing of a file for a finally finished shape (sequence numbers 81–82) according to one embodiment of the present invention;

FIG. 172 is a descriptive drawing of a file for a finally finished shape (a sequence number 83) according to one embodiment of the present invention;

FIG. 173 is a descriptive drawing of a file (1/2) for an intermediately finished shape (sequence numbers 16–40) according to one embodiment of the present invention;

FIG. 174 is a descriptive drawing of a file (2/2) for an intermediately finished shape (sequence numbers 16–40) according to one embodiment of the present invention;

FIG. 175 is a descriptive drawing of a file (1/2) for an intermediately finished shape (sequence numbers 41–53) according to one embodiment of the present invention;

FIG. 176 is a descriptive drawing of a file (2/2) for an intermediately finished shape (sequence numbers 41–53) according to one embodiment of the present invention;

FIG. 177 is a descriptive drawing showing a volume to be removed as a result of a turning operation according to one embodiment of the present invention;

FIG. 178 is a descriptive drawing showing a product of (the volume to be removed as a result of a turning operation/ the volume to be removed) and a mean radius according to one embodiment of the present invention;

FIG. 179 is a descriptive drawing showing the cross section of a turning allowance and the length of the turning allowance in the direction of removing, which are obtained on the basis of a rod material, according to one embodiment of the present invention; and FIG. 180 is a descriptive drawing showing the cross section of a turning allowance and the length of the turning allowance in the direction of removing, which are obtained on the basis of an input material drawing, according to one embodiment of the present invention.

DETAILED DESCRIPTION OF THE PREFERRED EMBODIMENTS

First Embodiment

Taking a workpiece, which requires a turning operation in an initial stage, as an example, the present invention will be specifically described hereinbelow.

Figure 1:
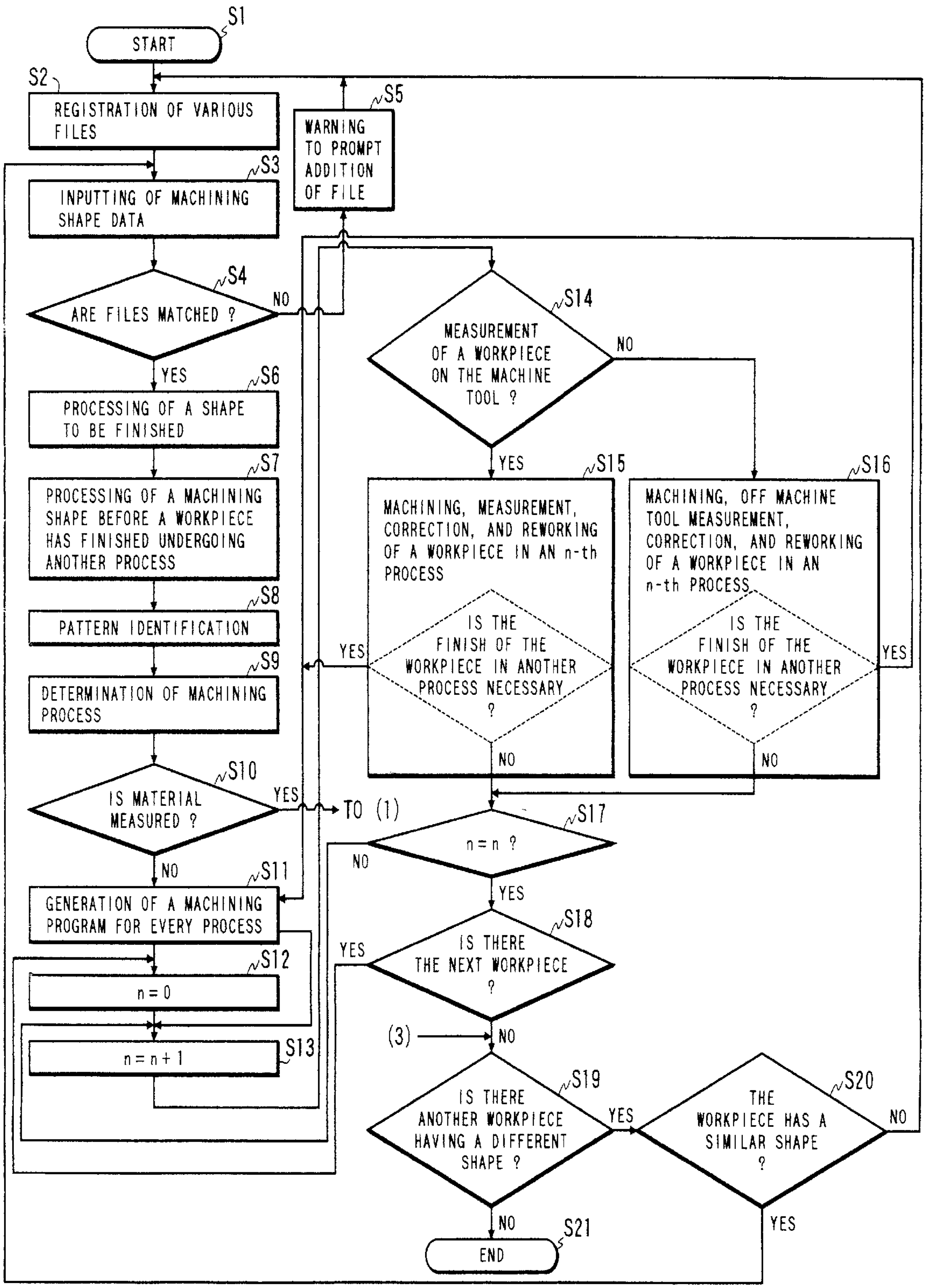
FIG. 1 is a flowchart showing a processing method according to one embodiment of the present invention.
Figure 2:
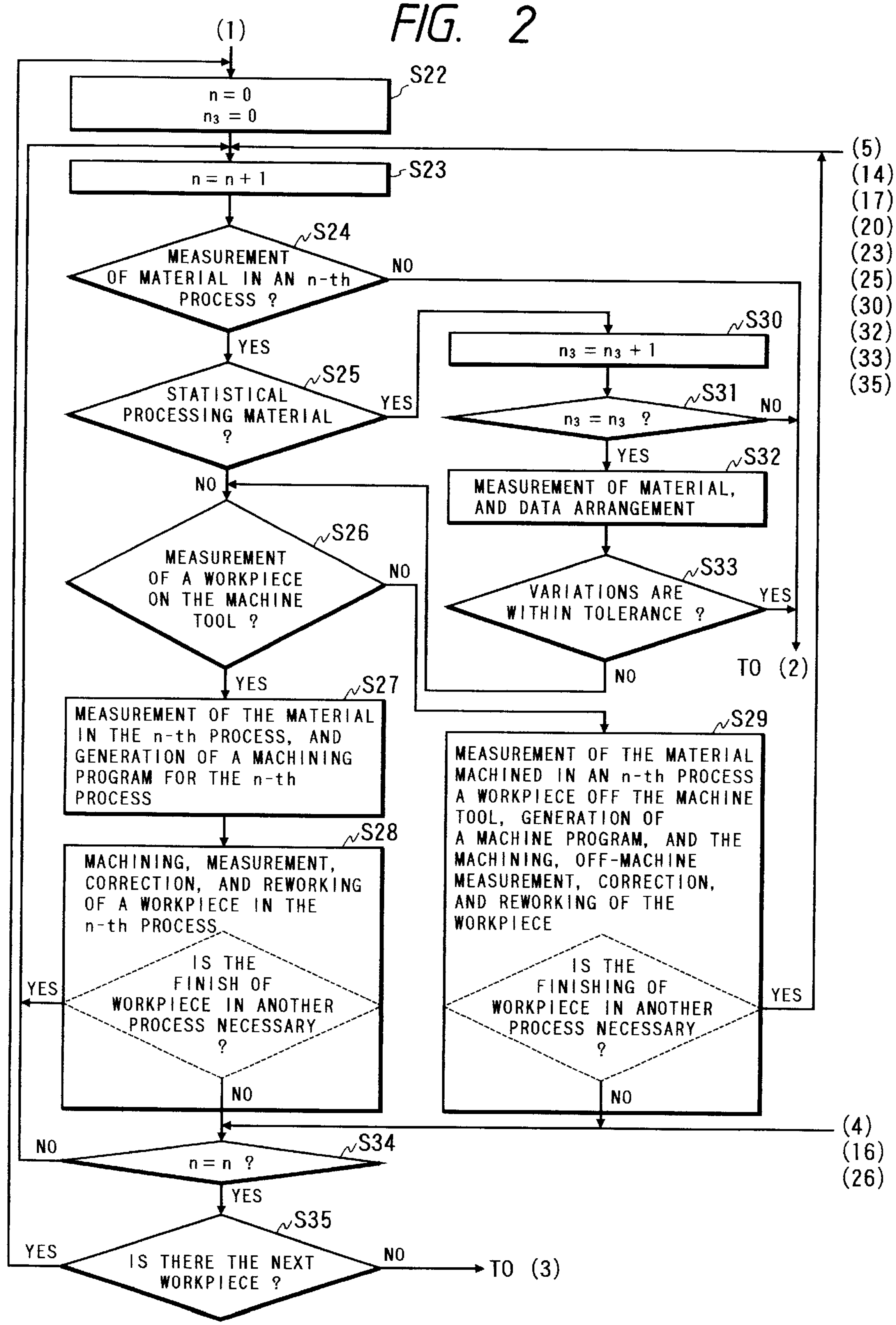
FIG. 2 is a flowchart continued from FIG. 1 which shows the processing method according to the embodiment of the present invention.
Figure 3:
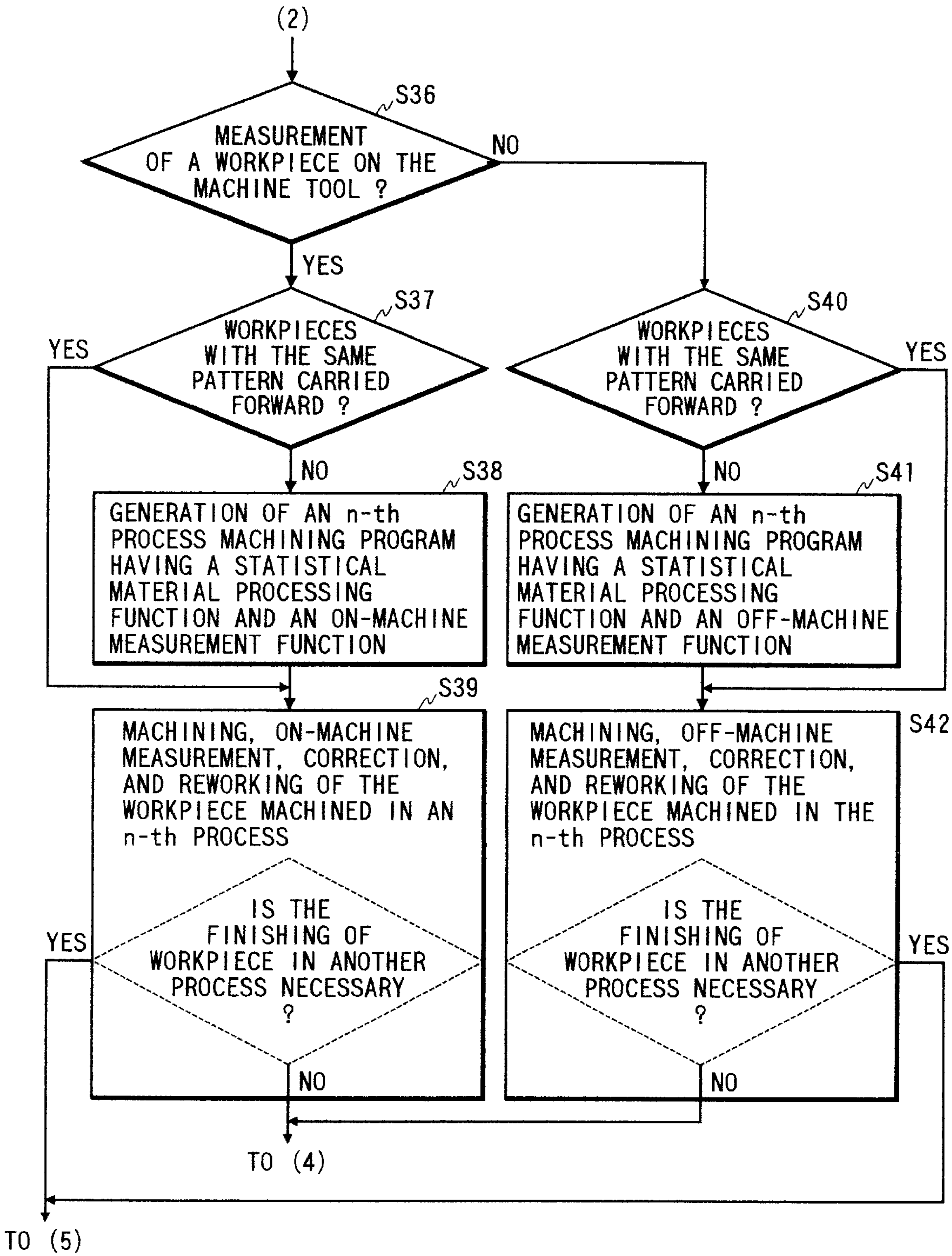
FIG. 3 is a flowchart continued from FIG. 2 which shows the processing method according to the embodiment of the present invention.

FIGS. 1, 2, and 3 are exemplary flowcharts of a machining method according to the present invention.

The outline of the machining method of these flowcharts will be described as follows:

Processing starts in step 1. A variety of files are registered in step 2. Machining data are input in step 3 (in this step 3, data entry is facilitated by the use of the files, and this data entry will be described later). In step 4, the machining data are checked against the files. If there is no match between the machining data and the files, a warning is sounded to request further addition of files in step 5. The processing then returns to step 2, and an operator adds files to the system. On the other hand, if there is a match between the machining data and the files as a result of the checking operation in step 4, a finished pattern is processed in step 6, and a machining pattern before a workpiece undergoes another process is processed in step 7. The machining pattern is then identified in step 8, and a machining process is determined in step 9. In step 10, it is decided whether or not material should be measured. If the material needs measuring (1), the processing proceeds to step 22 via (1) shown in FIG. 2. However, if it is not necessary to measure the material, a machine program is generated for each process in step 11, and a machining operation starts from step 12.

In the machining operation, a process number is initialized to n=0 in step 12. In step 13, the process number is counted using n=n+1. A machining operation is started from the first process.

It is decided in step 14 whether or not a workpiece can be measured on a machine. In step 15, if the workpiece can be measured on the machine, the workpiece associated with an n-th process is machined, and the machined workpiece is measured and corrected. The workpiece is then reworked, as needed. If it is unnecessary to finish the workpiece in another process, the processing proceeds to step 17. On the contrary, if the workpiece needs finishing in another process, the processing returns to step 11, and the procedures are repeated from the generation of a finishing program for another process.

If it has been judged in step 14 that it is impossible to measure the workpiece on the machine, the workpiece associated with the n-th process is machined in step 16. The workpiece is then measured outside the machine, and it is corrected and reworked as required. If the workpiece does not need finishing in another process, the processing proceeds to step 17. However, if the workpiece needs finishing in another process, the processing returns to step 11 and the procedures are repeated from the generation of a finishing program for another process.

It is decided in step 17 whether or not the final processing of the process number has been completed, and the processing returns to step 13 and the procedures are repeated unless the final processing is not finished.

If the final processing of the process number has been completed in step 17, it is determined whether or not there is another identical workpiece in step 18. If there is another identical workpiece, the processing returns to step 12. On the other hand, if there is no identical workpiece, it is decided whether or not there is a workpiece having a different shape. If there is a workpiece having a different shape, it is determined whether or not the workpiece is similar to the workpieces which have been machined so far. If the workpiece is similar to the workpieces that have been machined so far, the processing returns to step 3 and the procedures are repeated. On the other hand, if the workpiece is not similar to any other workpieces, the processing returns to step 2 and the procedures are repeated.

If a workpiece having a different shape is not available in step 19, the processing terminates in step 21.

If it is judged that the material should be measured (1) in step 10, the processing proceeds to step 22 via (1) shown in FIG. 2. In step 22, the process number and the sampling number are initialized to n=0 and $n_3$=0, respectively. In step 23, the process number is counted by n=n+1, and it is determined in step 24 whether or not the material should be measured in the n-th process. If the material should be measured in the n-th process, it is determined in step 25 whether or not the material can be statistically measured. If it is impossible to statistically measure the material, it is determined in step 26 whether or not the material can be measured on the machine. In step 27, if the material can be measured on the machine, the material is measured in the n-th process, and a machine program is generated.

In step 28, a workpiece associated with the n-th process is machined, and the thus machined workpiece is measured on the machine. The measured workpiece is then corrected and reworked, as required. If the workpiece needs finishing in another process, the processing returns to step 23 and the procedures are repeated. On the other hand, if the workpiece does not need finishing, it is determined in step 34 whether or not the final processing of the process number has been completed. If the final processing has not been completed yet, the processing returns to step 23 and the procedures are repeated.

If the final processing of the process number has been completed in step 34, it is determined in step 35 whether or not there is another identical workpiece. If there is another identical workpiece, the processing returns to step 22 and the procedures are repeated. On the other hand, if there is no identical workpiece (3), the processing proceeds to step 19 via (3) shown in FIG. 1 (the processing following step 19 has already been described).

On the other hand, if it has been judged that it is not necessary to measure the material in the n-th process, in step 24 (2), the processing proceeds to step 36 via (2) shown in FIG. 3.

If it has been judged that the material should be statistically processed, in step 25, the number of samples is counted in step 30 using $n_3=n_3+1$. In step 31, it is determined whether or not the counter has counted up to the sampling number. If the counter has counted up to the sampling number, the material is measured and resultant data on the result of the measurement are arranged in step 32. In step 33, a decision whether or not variations in the material fall within a tolerance is made depending on the data. If the variations are within the tolerance (2), the processing proceeds to step 36 via (2) shown in FIG. 3. On the contrary, if the variations are outside the tolerance, the processing proceeds to step 26 (the processing following step 26 has already been described).

If the counter has not yet counted up to the sampling number in step 31 (2), the processing proceeds to step 36 via (2) shown in FIG. 3.

On the other hand, if it has been judged in step 26 that it is impossible to measure the material on the machine, the material is measured outside the machine in step 29. Further, in step 29, the preparation of a machine program and the machining of a workpiece are carried out. The machined workpiece is measured outside the machine, and it is then corrected and reworked, as required, in step 29. If the workpiece needs finishing in another process as a result of the processing in step 29, the processing proceeds to step 23 and the procedures are repeated. On the other hand, if it is not necessary to finish the workpiece in another process, the processing returns to step 34 and the procedures are repeated.

The processing proceeds to step 36 via (2) shown in FIG. 3 in any of the following cases: where it has been judged that it is not necessary to measure the material in the n-th process in step 24 that has already been described; where the counter has not counted up to the sampling number in step 31; and where variations are within the tolerance in step 33.

The following procedures follow step 36.

It is determined in step 36 whether or not the workpiece can be measured on the machine. If it is possible to measure the workpiece on the machine, it is determined in step 37 whether or not the workpiece having the identical shape is repeated. If the workpiece having the identical shape is repeated, the workpiece piece associated with the n-th process is machined and the thus machined workpiece is measured on the machine. The workpiece is then corrected and reworked, as required. If the workpiece does not need finishing in another process (4), the processing proceeds to step 34 via (4) shown in FIG. 2. On the contrary, if the workpiece needs finishing in another process (5), the processing proceeds to step 23 via (5) shown in FIG. 2 and the procedures are repeated.

If it has been judged in step 37 that the identical workpiece is not repeated, a machine program, which statistically processes the material in the n-th process and measures the material on the machine, is produced in step 38. Upon completion of this processing, the processing of the system proceeds to step 39.

If it has been judged in step 36 that the material cannot be measured on the machine, it is further determined in step 40 whether or not the workpiece having the identical shape is repeated. If the workpiece having the identical shape is repeated, the workpiece is machined in the n-th process and the thus machined workpiece is measured outside the machine. The workpiece is corrected and reworked, as required, in step 42. If the workpiece does not need finishing in another process (4), the processing proceeds to step 34 via (4) shown in FIG. 2. If the workpiece needs finishing in another process (5), the processing proceeds to step 23 via (5) shown in FIG. 2 and the procedures are repeated.

If it has been judged in step 40 that the identical workpiece is not repeated, a machine program, which statistically processes the material in the n-th process and measures the material outside the machine, is prepared in step 41. Upon completion of this processing, the processing of the system proceeds to step 42 (the processing following step 42 has already been described).

In step 2, a variety of files are registered, for example, a tool file, a machine tool file (comprising a machining time file and a file relating to an attaching method), a pattern file, a screw shape file, a file for a pre-formed hole of a screw, a dimensional tolerance file, a machining method symbol file, a finishing symbol file, a finishing allowance file, a material file, a cutting condition file, a surface treatment file, a thermal refining file, a configurational and positional accuracy file, a cost file, a process file, and a machining method file.

The tool file comprises various data items relating to tools which are stored in such a format as shown in FIGS. 78 to 85.

The tool file is stored together with the machine tool file. Working conditions of the tools (for example, the maximum and minimum depths of cut, the maximum and minimum feed rates, and an allowable extent of intermittent cutting) are automatically determined through logical operation using the tool file and the machine tool file. The result of this logical operation is used as the tool working condition corresponding to an intended machine tool when cutting conditions are determined.

The tool file employs a format similar to the known EXAPT format. The format is expanded, and values are input in this format in such a way that values relating to the major cutting edge and values relating to the minor cutting edge are separated from each other (further, a plurality of values, such as a first value, a second value, etc., can be input with regard to the minor cutting edge). These input values are processed inside a numerically controlled system, whereby functional definitions, which include volume definitions, and machining patterns are created. These definitions and patterns are used when a tool is selected by comparing an input pattern with the patterns.

FIGS. 78–81 show an example of an input of a stationary tool.

In FIGS. 78–81,

Sequence numbers starting from a sequence number 1000 show an example of an input of a turning tool.

A sequence number 1000 designates a cutting tool,

Tool identification number; 1,

The JIS shank identification number is used as a shank identification number;

CCLNL2525M1204W,

Tip identification number; CNMG120404,

Specifications for a breaker;

Breaker width (at the tip): 1.5 mm, breaker width (at the dedendum): 1.5 mm, breaker height (at the tip): 0.5 mm, breaker height (at the dedendum): 0.5 mm, breaker angle: 0 degrees Rotation of cutting tool (L/R); L, Specifications for the major cutting edge;

An axis which extends from an intersection between the tip and the shank is set to an angle of 0-degrees, a cutting edge twisted in the counterclockwise direction with respect to the zero axis is designated with a plus sign, and a cutting edge twisted in the clockwise direction with respect to the zero axis is designated with a minus sign: +5 degrees, "Although this inputting method differs from the inputting method defined by the JIS, the unification of inputs with regard to all the tools facilitates the processing of data in a computer, thereby resulting in significant advantages."

A clearance angle $\alpha_0$: 5 degrees, a side rake $\kappa_f$: −5 degrees, a back rake $\gamma_p$: −5 degrees, a nose radius: 0.4, Specifications for a minor cutting edge (1); a minor cutting edge angle $\kappa'_1$: +85 degrees, a clearance angle $\alpha\kappa'_1$: 5 degrees.

Specifications for a minor cutting edge (2); a minor cutting edge angle $\gamma'_2$: skipped (A skip will be hereinafter used to designate the lack of input data. A skipping operation will be implemented in a control unit by use of a special key or a soft menu key set to skip), a clearance angle $\alpha\kappa'_2$: skipped.

Specifications for a minor cutting edge (3); all the specifications are skipped (a distance from the reference tip point that serves as the starting point, X, Z, a minor cutting edge angle $\kappa'_3$, and a clearance angle $\alpha\kappa'_3$).

Shank size; / are used for distinguishing the shapes of a shank, wherein designates a rectangular shank: 1, and designates a circular shank: 2. Since a rectangular shank is used in the present embodiment, 1 is input. Diameter/width; the diameter of the shank is input for a circular shank, and the width of the shank is input for a rectangular shank.

In the present embodiment, 25 mm, height; the height of the shank is input only for the rectangular shank. In the present embodiment, 25 mm are input.

XT/ZT is a column for the entry of each of the segments of tools to be attached in the X direction and Z direction. One designates a tool having its longer side attached in the X direction, and two designates a tool having its longer side attached in the Z direction. One is input in the present embodiment, and hence the longer side of the shank is attached in the X direction.

Depending on the state of the tip of a tool, a tool having its longer side attached in the X direction can perform a machining operation in both X and Z directions. Similarly, a tool having its longer side attached in the Z direction can perform a machining operation in both Z and X directions depending on the state of the tool tip. The decision as to whether or not the tool can perform a machining in both X and Z directions is made during the registration of a tool file.

The distance between the reference position of a tool holder and the reference point of the tip is input in the column designated by the reference tip point. In the present embodiment, X: +105 mm and Z: +7 mm are input.

The length of a projection of a tool from the tool holder is input in the column designated by the length of a projection from the tool holder. In the present embodiment, X: 25 mm and Z: 0 mm are input.

An angle of the projection in relation to the tool holder is input when the tool is attached to the tool holder. In the present embodiment, the projection angle is skipped.

An inclination angle of the tool holder is an entry column used when a tool holder containing tools is attached to a machine at an inclined angle. In the present embodiment, this column is skipped.

Tool rigidity is represented by the amount of deflection of a tool under a load, and it is input in units of micrometers per Newton for the respective cases where the tool undergoes a load in the X direction and where the tool undergoes a load in the Z direction. In the present embodiment, X: 0.001 $\mu$m/N, Z: 0.001 $\mu$m/N are input as the tool rigidity.

"It is also possible to calculate the tool rigidity by use of a static load expression for use with a cantilever or a finite element method. However, if the tool has a complicated shape, a lot of automatic decision steps are required, which in turn results in an enormous volume of descriptions. To prevent this, in the present embodiment, only the calculation results are input without the description of specific examples of the automatic calculation."

To ensure higher accuracy, it may be possible to input the result of practical measurement of the tool without the use of calculation.

If automatic calculation is executed, an expression is expanded from the following expression $$\delta_{max}=W\times L^3/(3\times E-I) \quad (1)$$

Inputs for a tip clamp are classified into a clamp-on type tip clamp: C, a single plane constrained type pin-locking tip clamp: E, a double plane constrained type pin-locking tip clamp: P, an inserted tip clamp: I, a brazed tip clamp: B, a screwed tip clamp: S, a solid tip clamp: L, a plane constrained type double clamp-on or pin-locking tip clamp: M, and a wedge lock tip clamp: W.

A grinding wheel employing a bonding method or a welding method is handled as a brazed tip clamp: B.

Since a clamp-on type tip clamp is used in the present embodiment, C is input.

Figure 5:
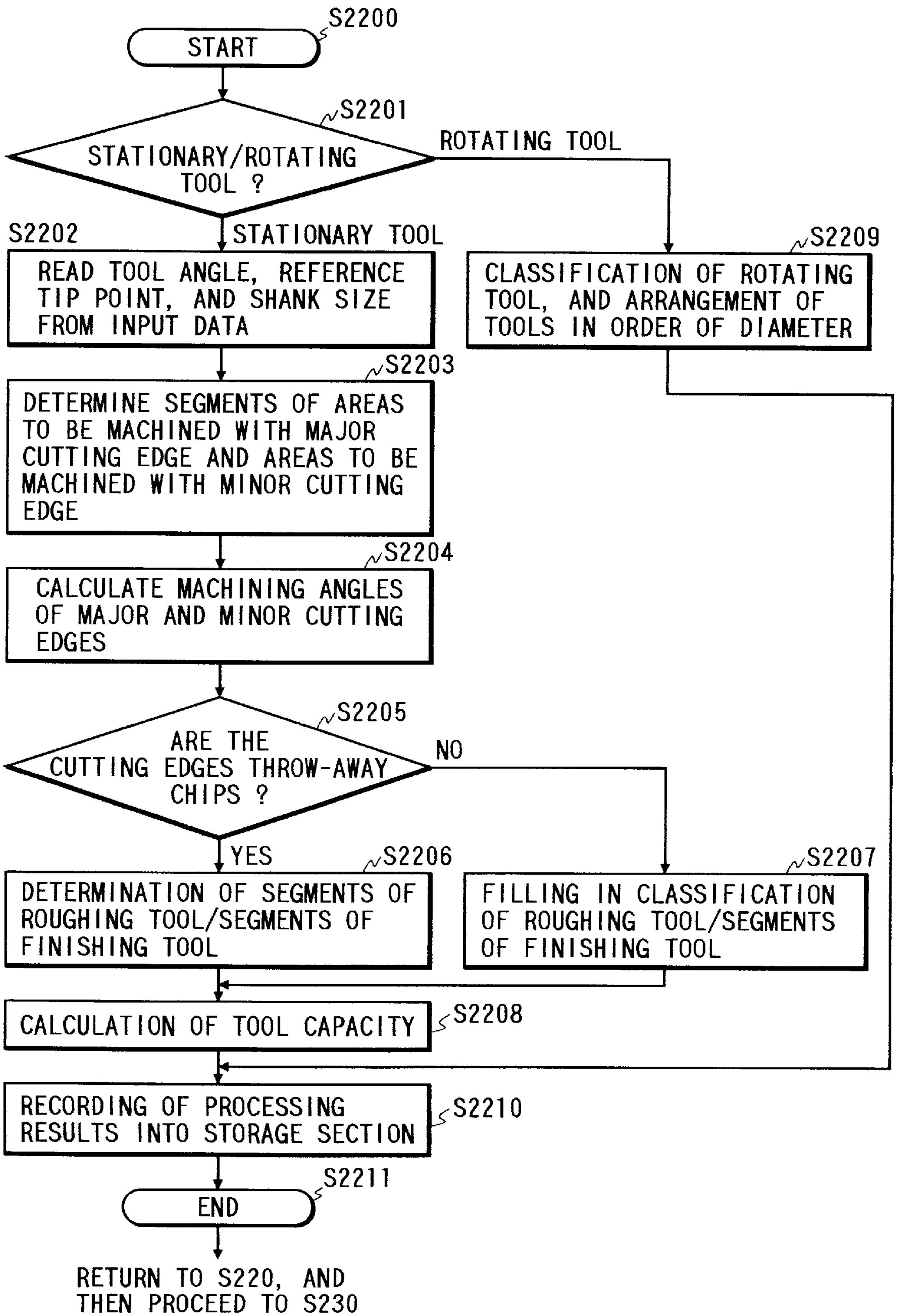
FIG. 5 is a flowchart for processing tool data with regard to step 220 according to the embodiment of the present invention.

Limit of depth of cut;

The limit of depth of cut with regard to a throw-away type tip clamp is automatically calculated and input by means of the processing of the tool data that are obtained as a result of the calculation of a tool volume in step 2208 shown in FIG. 5. In the present embodiment, the maximum depth of cut of 12.43 mm and the minimum depth of cut of R: 0.4 mm are obtained as a result of the calculation. These values are input as the limit of depth of cut.

In the case of a brazed tip clamp and a solid tip clamp, it is impossible to input the limit of the depth of cut by automatic calculation. Therefore, the limit of the depth of cut must be manually input.

Limit of feed rate;

The limit of a feed rate is automatically calculated and input by means of the processing of the tool data that are obtained as a result of the calculation of the tool capacity in step 2208. In the present embodiment the maximum feed rate: 0.39 mm and the minimum feed rate: 0.01 mm are obtained as a result of the calculation. These values are input as the limit of the feed rate.

It may be possible to manually input the maximum and minimum feed rates without execution of an automatic calculation and input operation. Manual entry of the maximum and minimum feed rates take priority over the automatic calculation and input of the maximum and minimum feed rates.

The maximum cut withstanding volume is determined by the rigidity of each tool. The maximum cut withstanding volume which makes the tool flex by 5 $\mu$m is used in the present embodiment.

Allowable limit of intermittent cutting;

The allowable limit of intermittent cutting specifies a cut withstanding volume, a threshold frequency, the maximum depth of cut, and the minimum depth of cut, taking into consideration safety when the tool is used. Values obtained through experience are input for the allowable limit of the intermittent cutting. In the present embodiment, a cut withstanding volume: 666.6N, a threshold frequency: 80 Hz, the maximum depth of cut: 1.2 mm, and the maximum feed rate: 0.25 mm are input for the allowable limit of the intermittent cutting.

Side rake of a minor cutting edge; $\gamma_f\kappa'_1$: −5 degrees, $\gamma_f\kappa'_2$: skipped, and $\gamma_f\kappa'_3$: skipped Back rake of the minor cutting edge; $\gamma_p\kappa'_1$: −5 degrees, $\gamma_p\kappa'_2$: skipped, and $\gamma_p\kappa'_3$: skipped Tool Material A standardized abbreviation is input for tool material, together with a code defined by the JIS, ISO or a manufacturer's standard. In the present embodiment, JISP20 is input.

The tool material column is provided with a translation table which allows the translation of a code from an ISO code into a manufacturer's code, and vice versa. An inconsistency between codes is complemented by means of the translation table when data of a variety of files are read. FIGS. 125 to 127 show an example of the translation table of the tool material column.

An input tool material which is described in a code of each manufacturer can be translated into a tool material of the cutting condition file by means of the translation table, which in turn provides a degree of freedom in preparing the tool file. The identical processing is executed with regard to the tool material.

Segment of a roughing tool/finishing tool (R/F);

In the case of a throw-away tip, a roughing tool and a finishing tool are distinguished from each other by a symbol for a throw-away tip. However, in the case of a brazed tip or a solid tip, it is impossible to discern the roughing tool from the finishing tool, and therefore the operator specifies the tool.

R is input as an identification code to designate a roughing tool, and F is input as an identification to designate a finishing tool. In the present embodiment, R is input.

Specifications for a grooving tool;

Grooving tool width: skipped, and depth of a groove made by a tool: skipped

A machine identification number is registered while it is linked to the tool identification number, and therefore a machine tool identification number which is used in a limited manner is entered.

In the present embodiment, XLD001 is input to the machine identification number entry column. Through the above described inputting operations, the entry of the tool identification number: 1 is now completed.

Similarly, tool identification numbers: 2 and 3 are input for sequence numbers 1001 and 1002 shown in FIG. 78.

Subsequently, the entry of a grooving tool with a tool identification number 4 will now be described.

Sequence number: 1003,

Tool identification number: 4,

Shank identification number: JIS43-4,

Tip identification number: JIS4194-08-04,

Specifications for a breaker: skipped,

Rotation of a cutting edge (L/R): R,

Specifications for a major cutting edge;

Major cutting edge angle $\kappa$: +90 degrees, a clearance angle $\alpha_0$: 6 degrees, a side rake $\gamma_f$: 0 degrees, and a back rake $\gamma_p$: 6 degrees, Nose radius: 0.4 mm, Specifications for a minor cutting edge (1);

Minor cutting edge angle $\kappa'_1$: −1 degrees, and a clearance angle $\alpha\kappa'_1$: 1 degrees, Specifications for a minor cutting edge (2);

Minor cutting edge angle $\kappa'_2$: +1 degrees, and a clearance angle $\alpha\kappa'_2$: 1 degrees, Specifications for a minor cutting edge (3); skipped, Shank size;

/: 1, diameter/width: 19 mm, and height: 25 mm,

Segment of a tool in the X direction/a tool in the Z direction (XT/ZT): 1

Reference tip point;

X: 110 mm, and Z: 0,

Length of a projection from a tool holder;

X: 30 mm, and Z: 0,

Angle of the projection from the tool holder: 0 degrees

Inclination angle of the tool holder: 0 degrees

Tool Rigidity;

X; 0.002 $\mu$m/N, and Z: 0.168 $\mu$m/N,

Tip clamp: B,

Limit of depth of cut; skipped,

Limit of a feed rate; the maximum feed rate: 0.18 mm/rev., and the minimum feed rate: 0.01 mm/rev., Maximum cut withstanding volume: 714.3N, Allowable limit of intermittent cutting: a cut withstanding volume: 285.7N, a threshold frequency: 40 Hz, the maximum depth of cut: skipped, and the maximum feed rate: 0.07 mm/rev., Side rake of a minor cutting edge;

$\gamma_f\kappa'_1$: 0, $\gamma_f\kappa'_2$: 0, and $\gamma_f\kappa'_3$: skipped, Back rake of the minor cutting edge;

$\gamma_p\kappa'_1$: 0, $\gamma_p\kappa'_2$: 0, and $\gamma_p\kappa'_3$: skipped, Tool material; JISP20, Segment of roughing tool/finishing tool (R/F): F Specifications for a grooving tool;

Grooving tool width: 5.015 mm, and the depth of a groove made by the tool: 20 mm, A machine identification number is registered while it is linked to the tool identification number, and therefore a machine tool identification number which is used in a limited manner is entered.

In the present embodiment, XLD001 is input. The entry of the grooving tool with a tool identification number 4 is now completed.

Subsequently, the entry of a threading tool with a tool identification number 5 will now be described.

Sequence number: 1004,

Tool identification number: 5,

Shank identification number: JIS49-4,

Tip identification number: JIS4104-05-04,

Specifications for a breaker: skipped,

Rotation of a cutting edge (L/R): R,

Specifications for a major cutting edge; a major cutting edge angle $\kappa$: −30 degrees, a clearance angle $\alpha_0$: 6 degrees, a side rake $\gamma_f$: 0 degrees, and a back rake $\gamma_p$: 6 degrees, Nose radius: 0.2 mm, Specifications for a minor cutting edge (1);

Minor cutting edge angle $\kappa'_1$: +30 degrees, and clearance angle $\alpha\kappa'_1$: 6 degrees, Specifications for a minor cutting edge (2); skipped, Specifications for a minor cutting edge (3); skipped, Shank size;

/: 1, diameter/width: 25 mm, and height: 25 mm,

Segment of a tool in the X direction/a tool in the Z direction (XT/ZT): 1

Reference tip point;

X: +123 mm, and Z: −4.5 mm,

Length of a projection from a tool holder;

X: 43 mm, and Z: 0 mm,

Angle of the projection from a tool holder: 0 degrees

Inclination angle of a tool holder: 0 degrees

Tool Rigidity;

X; 0.004 $\mu$m/N, and Z: 0.004 $\mu$m/N,

Tip clamp: B,

Limit of depth of cut; the maximum depth of cut: 1 mm, and the minimum depth of cut: 0.01 mm, Limit of a feed rate; the maximum feed rate: 0.18 mm/rev., and the minimum feed rate: 0.01 mm/rev., Maximum cut withstanding volume: 714.3N, Allowable limit of intermittent cutting: a cut withstanding volume: 285.7N, a threshold frequency: 40 Hz, the maximum depth of cut: skipped, and the maximum feed rate: 0.07 mm/rev., Side rake of a minor cutting edge;

$\gamma_f\kappa'_1$: 0, $\gamma_f\kappa'_2$: 0, and $\gamma_f\kappa'_3$: skipped, Back rake of the minor cutting edge;

$\gamma_p\kappa'_1$: 0, $\gamma_p\kappa'_2$: 0, and $\gamma_p\kappa'_3$: skipped, Tool material; JISP20, Segment of roughing tool/finishing tool (R/F): F Specifications for a grooving tool;

Grooving tool width: 9 mm, and depth of a thread made by the tool: 16 mm,

A machine identification number is registered while it is linked to the tool identification number, and therefore a machine tool identification number which is used in a limited manner is entered.

In the present embodiment, XLD001 is input. The entry of the threading tool with a tool identification number 5 is now completed.

The entry of a threading tool with a tool identification number 6 will now be described.

Sequence number: 1005,

Tool identification number: 6,

Shank identification number: JIS50-5

The entry of this tool will be further carried out according to the entry of the threading tool having the tool identification number 5. Since there is only a difference with regard to the rotation of a cutting tool, L, between the entries of these threading tools, their explanations will be omitted.

A machine identification number is registered while it is linked to the tool identification number, and therefore a machine tool identification number which is used in a limited manner is entered.

In the present embodiment, XLD001 is input to the machine tool identification number entry column. The entry of the threading tool with a tool identification number 6 is now completed.

The entry of a boring tool with a tool identification number 7 will now be described.

Sequence number: 1006,

Tool identification number: 7,

Shank identification number: JIS48-S,

Tip identification number: JISB4104-03-01,

Specifications for a breaker: breaker width (at the tip): 1.5 mm, breaker width (at the dedendum): 1.5 mm, breaker height (at the tip): 0.5 mm, breaker height (at the dedendum): 0.5 mm, breaker angle: 0 degrees Rotation of a cutting edge (L/R): L, Specifications for a major cutting edge; major cutting edge angle $\kappa$: 273 degrees, clearance angle $\alpha_0$: 6 degrees, side rake $\gamma_f$: 3 degrees, and back rake $\gamma_p$: 0 degrees, Nose radius: 0.4 mm, Specifications for a minor cutting edge (1); minor cutting edge angle $\kappa'_1$: −3 degrees, and clearance angle $\alpha\kappa'_1$: 6 degrees, Specifications for a minor cutting edge (2); skipped, Specifications for a minor cutting edge (3); skipped, Shank size; /: 2, diameter/width: 9 mm, and height: skipped, Segment of a tool in the X direction/a tool in the Z direction (XT/ZT): 2, Reference tip point; X: −20 mm, and Z: 55 mm, Length of a projection from a tool holder; X: 0 mm, and Z: 55 mm, Angle of the projection from tool holder: 0 degrees Inclination angle of tool holder: 0 degrees Tool Rigidity;

X; 0.094 $\mu$m/N, and Z: 0.094 $\mu$m/N,

Tip clamp: B,

Limit of depth of cut; the maximum depth of cut: 0.5 mm, and a minimum depth of cut: 0.1 mm, Limit of a feed rate; the maximum feed rate: 0.15 mm/rev., and the minimum feed rate: 0.01 mm/rev., Maximum cut withstanding volume: 55N, Allowable limit of intermittent cutting: a cut withstanding volume: 22N, a threshold frequency: 20 Hz, the maximum depth of cut: 0.2, and the minimum depth of cut: 0.05, Side rake of a minor cutting edge; skipped, Back rake of the minor cutting edge; skipped, Tool material; JISP10, Segment of roughing tool/finishing tool (R/F): F Specifications for a grooving tool; skipped, A machine identification number is registered while it is linked to the tool identification number, and therefore a machine tool identification number which is used in a limited manner is entered.

In the present embodiment, XLD001 is input to the machine tool identification number entry column. The entry of the boring tool with a tool identification number 7 is now completed.

The entry of a boring tool with a tool identification number 8 will now be described.

Sequence number: 1006,

Tool identification number: 8,

Shank identification number: JIS52-S,

Tip identification number: JISB4104-08-07,

Specifications for a breaker: skipped,

Rotation of a cutting edge (L/R): L,

Specifications for a major cutting edge; major cutting edge angle $\kappa$: 0 degrees, clearance angle $\alpha_0$: 6 degrees, side rake $\gamma_f$: 0 degrees, and back rake $\gamma_p$: 6 degrees, Nose radius: 0.4 mm, Specifications for a minor cutting edge (1); minor cutting edge angle $\kappa'_1$: +273 degrees, and clearance angle $\alpha\kappa'_1$: 6 degrees, Specifications for a minor cutting edge (2); minor cutting edge angle $\kappa'_2$: +273 degrees, and clearance angle $\alpha\kappa'_2$: 6 degrees, Specifications for a minor cutting edge (3); skipped, Shank size; /: 2, diameter/width: 13 mm, and height: skipped, Segment of a tool in the X direction/a tool in the Z direction (XT/ZT): 2, Reference tip point; X: −20 mm, and Z: 45 mm, Length of a projection from a tool holder; X: 0 mm, and Z: 45 mm, Angle of the projection from tool holder: 0 degrees Inclination angle of tool holder: 0 degrees Tool Rigidity; X; 0.022 μm/N, and Z: 0.022 μm/N, Tip clamp: B, Limit of depth of cut; since the boring tool is a grooving tool, the depth of cut made by the boring tool becomes equal to the width of a groove. For this reason, the entry of this column is skipped.

Limit of a feed rate; the maximum feed rate: 0.15 mm/rev., and the minimum feed rate: 0.01 mm/rev., Maximum cut withstanding volume: 227N, Allowable limit of intermittent cutting: a cut withstanding volume: 91N, a threshold frequency: 20 Hz, the maximum depth of cut: skipped, and the minimum depth of cut: skipped, Side rake of a minor cutting edge; skipped, Back rake of the minor cutting edge; skipped, Tool material; JISP10, Segment of roughing tool/finishing tool (R/F): F Specifications for a grooving tool; a grooving tool width: 5 mm, and the depth of a bore made by the tool: 5.5 mm.

A machine identification number is registered while it is linked to the tool identification number, and therefore a machine tool identification number which is used in a limited manner is entered.

In the present embodiment, XLD001 is input to the machine tool identification number entry column. The entry of the boring tool with a tool identification number 8 is now completed.

FIGS. 82 to 85 show an example of the entry of a rotating tool.

In FIGS. 82 to 85, a tool identification number 9 designates an example of the entry of a drill. A difference between the drill and a stationary tool will be described.

Sequence: 1008,

Tool identification number: 9,

Shank identification number: DMT2, (the first alphanumeric symbol D designates a drill, and alphanumeric symbols MT2 following the first symbol designate the second drill shank of a morse taper)

Tip identification number: skipped,

Specifications for a tool diameter;

The specifications for a tool diameter comprise a tool diameter, a tolerance symbol, an upper tolerance, and a lower tolerance. It is possible to input a tool diameter, a tool diameter tolerance symbol of the tool, an upper tolerance of a tolerance, and a lower tolerance of the tolerance into this entry column.

It is not necessary to input the upper and lower tolerances of the tolerance so long as the tolerance symbol is input. This is attributable to such a function of the system as reading the upper and lower tolerances using the tool diameter and the tolerance symbol, as well as an input pattern, as keywords when a tool is read to use after a dimensional file has been registered in the same manner as inputting a drawing, or to such a function as complementing the upper and lower tolerances by executing a calculation using the thus read data.

In the present embodiment, a tool diameter: 19 mm, a tolerance symbol: skipped, an upper tolerance: skipped, and a lower tolerance: skipped are input.

Specifications for tool width; the drill does not require any entry in this column, and hence this entry column is skipped.

Major cutting edge length: 145 mm,

Nominal length: 165 mm,

Specifications for a tip:

This entry column is provided with a format which permits the entry of up to a two-staged tip. The specifications comprise:

Tip (1),

Segment of a taper/angle; 1 is input for a taper, and 2 is input for an angle.

Type of taper/angle; a standardized symbol which serves as a standard is input.

For example, MT2 is input for the second morse taper.

Degree of taper/angle; tip radius, the length of tip radius,

Tip (2),

Segment of taper/angle,

Type of taper/angle, and a degree of taper/angle.

In the present embodiment,

Tip (1); segment of taper/angle: 2 (angle), type of taper/angle: skipped, a degree of taper/angle: 118 degrees, tip radius: 19 mm, and the length of the tip radius: 145 mm, and Tip (2); segment of taper/angle: skipped, type of taper/angle: skipped, and a degree of taper/angle: skipped, are input into the column for the tip specifications.

Number of teeth: a standard two-flute drill is used in the present embodiment, and hence 2 is input.

Direction of revolution: R is input for rotation in a clockwise direction, and L is input for rotation in a counterclockwise direction. In the present embodiment, R is input.

Segment of a tool in the X direction/a tool in the Z direction (XT/ZT): 2,

Reference tip point; X: 0, and Z: +165 mm,

Tool rigidity; in the X direction: 0.002 μm/N, and in the Z direction: skipped.

It is possible to calculate the rigidity of the drill in the Z direction using a single-sided fixed column expression or the infinite element method. However, the interrelationship between the rigidity and the cutting volume of the drill makes it difficult to render the current tool conditions uniform.

For this reason, the tool rigidity is eliminated.

Tip clamping method: L,

Limit of depth of cut; the drill does not require any entry in this column, and hence this entry column is skipped.

Limit of feed rate:

Segment: the maximum and minimum millimeters per minute or the maximum and minimum millimeters per revolution are input. In the present embodiment, the maximum feed rate is 0.5 mm/rev., and the minimum feed rate is 0.01 mm/rev., Maximum cut withstanding volume; 2500N, Allowable limit of intermittent cutting (1);

Cut withstanding volume: 1000N, a threshold frequency: 60 Hz, the maximum depth of cut: skipped, and the maximum feed rate: 0.05 mm/rev., Tool material: SKH51, Specifications for a threading tool; the drill does not require any entry in this column, and hence this column is skipped.

Specifications for a gear shaper; the drill does not require any entry in this column, and hence this column is skipped.

Segment of a roughing tool/a finishing tool (R/F): R, A machine identification number is registered while it is linked to the tool identification number, and therefore a machine tool identification number which is used in a limited manner is entered.

In the present embodiment, XLD001 is input the machine tool identification number. The entry of the drill with a tool identification number 9 is now completed.

The entry of a center hole drill with a tool identification number 10 will now be described.

Sequence: 1009,

Tool identification number: 10,

Shank identification number: DA2-JISB4303, where the first alphanumeric symbol D designates a drill, and alphanumeric symbols A2 following the first symbol designate a center hole drill A2 designated by JISB4304.

Tip identification number: skipped,

Specifications for a tool diameter; a tool diameter: 5 mm, a tolerance symbol: h9, an upper tolerance: 0, and a lower tolerance: −0.030 (the upper and lower tolerances represent complemented results)

Specifications for tool width: skipped,

Major cutting edge length: 3 mm,

Nominal length: 65 mm,

Specifications for a tip:

Tip (1),

Segment of taper/angle; 2,

Type of taper/angle; skipped,

A degree of taper/angle; 118 degrees, a tip radius: 2 mm, and the length of the tip radius: 3 mm, Tip (2), Segment of taper/angle; 2, type of taper/angle; skipped, and a degree of taper/angle; 60 degrees, Number of teeth: 2, Direction of revolution: R (rotation in a clockwise direction)

Segment of a tool in the X direction/a tool in the Z direction (XT/ZT): 2 (ZT),

Reference tip point; X: 0, and Z: +65 mm,

Tool rigidity; in the X direction: skipped, and in the Z direction: skipped.

Tip clamping method: L,

Limit of depth of cut; the drill does not require any entry in this column, and hence this entry column is skipped.

Limit of feed rate:

Segment: segment of the maximum and minimum millimeters per minute or the maximum and minimum millimeters per revolution: 1, the maximum feed rate is 0.08 mm/rev., and the minimum feed rate is 0.01 mm/rev., Maximum cut withstanding volume; 250N, Allowable limit of intermittent cutting (1);

Cut withstanding volume: 100N, a threshold frequency: 40 Hz, the maximum depth of cut: skipped, and the maximum feed rate: 0.03 mm/rev., Tool material: SKH51, Specifications for a threading tool; the drill does not require any entry in this column, and hence this column is skipped.

Specifications for a gear shaper; the drill does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number. The entry of the center hole drill with a tool identification number 10 is now completed.

The entry of a center hole drill with a tool identification number 11 is made according to the entry of the A2 center hole drill having a sequence number 1009 and a tool identification number 10.

Sequence: 1010,

Tool identification number: 11,

Shank identification number: DB4-JISB4304, where the first alphanumeric symbol D designates a drill, and alphanumeric symbols B4 following the first symbol designate a center hole drill B4 designated by JISB430.

Tip identification number: skipped,

Specifications for a tool diameter; a tool diameter: 8.5 mm, a tolerance symbol: h9, an upper tolerance: 0, and a lower tolerance: −0.043 (The upper and lower tolerances represent complementary results, and the same applies to any counterparts in the following descriptions)

Specifications for tool width: skipped,

Major cutting edge length: 6 mm,

Nominal length: 15 mm,

Specifications for a tip:

Tip (1),

Segment of taper/angle; 2, type of taper/angle; skipped, a degree of taper/angle; 118 degrees, a tip radius: 4 mm, and the length of the tip radius: 6 mm, Tip (2), Segment of taper/angle; 2, type of taper/angle; skipped, and a degree of taper/angle; 60 degrees, Number of teeth: 2, Direction of revolution: R (rotation in a clockwise direction)

Segment of a tool in the X direction/a tool in the Z direction (XT/ZT): 2 (ZT),

Reference tip point; X: 0, and Z: +15 mm,

Tool rigidity; in the X direction: skipped, and in the Z direction: skipped.

Tip clamping method: L,

Limit of depth of cut; the drill does not require any entry in this column, and hence this entry column is skipped.

Limit of feed rate:

Segment: segment of the maximum and minimum millimeters per minute or the maximum and minimum millimeters per revolution: 1, the maximum feed rate is 0.15 mm/rev., and the minimum feed rate is 0.01 mm/rev., Maximum cut withstanding volume; 750N, Allowable limit of intermittent cutting (1);

Cut withstanding volume: 300N, a threshold frequency: 50 Hz, the maximum depth of cut: skipped, and the maximum feed rate: 0.05 mm/rev., Tool material: SKH51, Specifications for a threading tool; the drill does not require any entry in this column, and hence this column is skipped.

Specifications for a gear shaper; the drill does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number. The entry of the center hole drill with a tool identification number 10 is now completed.

It is possible to obtain specifications for a shape B and the diameter and depth of a chamfer of the shape B from a nominal diameter d: 4 mm by reading a center hole shape file using the center hole drill B4 as a keyword.

The entry of a space drill with a tool identification number 12 will be described hereinbelow.

Sequence: 1011,

Tool identification number: 12,

Shank identification number: DMT2,

Tip identification number: skipped,

Specifications for a tool diameter; a tool diameter: 19 mm, a tolerance symbol: skipped, an upper tolerance: skipped, and a lower tolerance: skipped, Specifications for tool width: skipped, Major cutting edge length: 140 mm, Nominal length: 160 mm, Specifications for a tip:

Tip (1),

Segment of taper/angle; 2, type of taper/angle; skipped, a degree of taper/angle; 180 degrees, a tip radius: 19 mm, and the length of the tip radius: 140 mm, Tip (2), Segment of taper/angle; 2, type of taper/angle; skipped, and a degree of taper/angle; skipped, Direction of revolution: R (rotation in a clockwise direction)

Number of teeth: 2,

Reference tip point; X: 0, and Z: 140 mm,

Tool rigidity; in the X direction: 0.002 μm/N, and in the Z direction: skipped.

Tip clamping method: L,

Limit of depth of cut; the space drill does not require any entry in this column, and hence this entry column is skipped.

Limit of feed rate:

Segment: segment of the maximum and minimum millimeters per minute or the maximum and minimum millimeters per revolution: 1, the maximum feed rate is 0.5 mm/rev., and the minimum feed rate is 0.01 mm/rev., Maximum cut withstanding volume; 2500N, Allowable limit of intermittent cutting (1);

Cut withstanding volume: 1000N, a threshold frequency: 60 Hz, the maximum depth of cut: skipped, and the maximum feed rate: 0.15 mm/rev., Tool material: SKH51, Specifications for a threading tool; the space drill does not any entry in this column, and hence this column is skipped.

Specifications for a gear shaper; the space drill does not require any entry in column, and hence this column is skipped.

Segment of a roughing tool/a finishing tool (R/F): R,

A machine identification number is registered while it is linked to the tool identification number, and therefore a machine tool identification number which is used in a limited manner is entered.

In the present embodiment, XLD001 is input to the machine tool identification number entry column. The entry of the space drill with a tool identification number 12 is now completed.

The entry of a drill with a tool identification number 13 will be described hereinbelow.

Sequence: 1012,

Tool identification number: 13,

Shank identification number: D,

Tip identification number: skipped,

Specifications for a tool diameter; a tool diameter: 4.9 mm, a tolerance symbol: skipped, an upper tolerance: skipped, and a lower tolerance: skipped, Specifications for tool width: skipped, Major cutting edge length: 59 mm, Nominal length: 59 mm, Specifications for a tip:

Tip (1),

Segment of taper/angle; 2, type of taper/angle; skipped, a degree of taper/angle; 118 degrees, a tip radius: 4.8 mm, and the length of the tip radius: 59 mm, Tip (2), Segment of taper/angle; skipped, type of taper/angle; skipped, and a degree of taper/angle; skipped, Number of teeth: 2, Direction of revolution: R (rotation in a clockwise direction)

Reference tip point; X: 0, and Z: 59 mm,

Tool rigidity; in the X direction: 25.5 μm/N, and in the Z direction: skipped.

Tip clamping method: L,

Limit of depth of cut; the drill does not require any entry in this column, and hence this entry column is skipped.

Limit of feed rate:

Segment: segment of the maximum and minimum millimeters per minute or the maximum and minimum millimeters per revolution: 1, the maximum feed rate is 0.15 mm/rev., and the minimum feed rate is 0.01 mm/rev., Maximum cut withstanding volume; 750N, Allowable limit of intermittent cutting (1);

Cut withstanding volume: 250N, a threshold frequency: 50 Hz, the maximum depth of cut: skipped, and the maximum feed rate: 0.03 mm/rev., Tool material: SKH51, Specifications for a threading tool; the drill does not require any entry in this column, and hence this column is skipped.

Specifications for a gear shaper; the drill does not require any entry in this column, and hence this column is skipped.

Segment of a roughing tool/a finishing tool (R/F): R,

A machine identification number is registered while it is linked to the tool identification number, and therefore a machine tool identification number which is used in a limited manner is entered.

In the present embodiment, XLD001 is input to the machine tool identification number entry column. The entry of the drill with a tool identification number 13 is now completed.

The entry of a reamer with a tool identification number 14 will be described hereinbelow.

Sequence: 1013,

Tool identification number: 14,

Shank identification number: R,

Tip identification number: skipped,

Specifications for a tool diameter; a tool diameter: 5 mm, a tolerance symbol: m5, an upper tolerance: +0.009, and a lower tolerance: +0.004, Specifications for tool width: skipped, Major cutting edge length: 23 mm, Nominal length: 52 mm, Specifications for a tip:

Tip (1),

Segment of taper/angle; 2, type of taper/angle; skipped, a degree of taper/angle; 90 degrees, a tip radius: 5 mm, and the length of the tip radius: 21 mm, Tip (2), Segment of taper/angle; skipped, type of taper/angle; skipped, and a degree of taper/angle; skipped, Number of teeth: 6, Direction of revolution: R (rotation in a clockwise direction)

Segment of a reamer in the X direction/a reamer in the Z direction (XT/ZT): 2,

Reference tip point; X: 0, and Z: +52 mm,

Tool rigidity; in the X direction: 47.73 μm/N, and in the Z direction: skipped.

Tip clamping method: L,

Limit of depth of cut; the reamer does not require any entry in this column, and hence this entry column is skipped.

Limit of feed rate:

Segment: segment of the maximum and minimum millimeters per minute or the maximum and minimum millimeters per revolution: 1, the maximum feed rate is 1.5 mm/rev., and the minimum feed rate is 0.5 mm/rev., Maximum cut withstanding volume; 750N, Allowable limit of intermittent cutting (1);

Cut withstanding volume: 30N, a threshold frequency: 50 Hz, the maximum depth of cut: skipped, and the maximum feed rate: 0.5 mm/rev., Tool material: SKH51, Specifications for a threading tool; the reamer does not require any entry in this column, and hence this column is skipped.

Specifications for a gear shaper; the reamer does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the reamer with a tool identification number 14 is now completed.

The entry of a drill with a tool identification number 15 will be described hereinbelow.

Sequence: 1014,

Tool identification number: 15,

Shank identification number: D,

Tip identification number: skipped,

Specifications for a tool diameter; a tool diameter: 4.2 mm, a tolerance symbol: skipped, an upper tolerance: skipped, and a lower tolerance: skipped, Specifications for tool width: skipped, Major cutting edge length: 54 mm, Nominal length: 54 mm, Specifications for a tip:

Tip (1),

Segment of taper/angle; 2, type of taper/angle; skipped, a degree of taper/angle; 118 degrees, a tip radius: 4.2 mm, and the length of the tip radius: 54 mm, Tip (2), Segment of taper/angle; skipped, type of taper/angle; skipped, and a degree of taper/angle; skipped, Number of teeth: 2, Direction of revolution: R (rotation in a clockwise direction)

Segment of a drill in the X direction/a drill in the Z direction (XT/ZT): 2,

Reference tip point; X: 0, and Z: +54 mm,

Tool rigidity; in the X direction: 33.395 μm/N, and in the Z direction: skipped.

Tip clamping method: L,

Limit of depth of cut; the drill does not require any entry in this column, and hence this entry column is skipped.

Limit of feed rate:

Segment: segment of the maximum and minimum millimeters per minute or the maximum and minimum millimeters per revolution: 1, the maximum feed rate is 0.15 mm/rev., and the minimum feed rate is 0.01 mm/rev., Maximum cut withstanding volume; 650N, Allowable limit of intermittent cutting (1);

Cut withstanding volume: 250N, a threshold frequency: 45 Hz, the maximum depth of cut: slipped, and the maximum feed rate: 0.03 mm/rev., Tool material: SKH51, Specifications for a threading tool; the drill does not require any entry in this column, and hence this column is skipped.

Specifications for a gear shaper; the drill does not require any entry in this column, and hence this column is skipped.

Segment of a roughing tool/a finishing tool (R/F): R,

A machine identification number is registered while it is linked to the tool identification number, and therefore a machine tool identification number which is used in a limited manner is entered.

In the present embodiment, XLD001 is input to the machine tool identification number entry column. The entry of the drill with a tool identification number 15 is now completed.

The entry of a tap with a tool identification number 16 will be described hereinbelow.

Sequence: 1015,

Tool identification number: 16,

Shank identification number: T,

Tip identification number: skipped,

Specifications for a tool diameter; a tool diameter: 5 mm, a tolerance symbol: skipped, an upper tolerance: skipped, and a lower tolerance: skipped, Specifications for tool width: skipped, Major cutting edge length: 16 mm, Nominal length: 25 mm, Specifications for a tip:

Tip (1),

Segment of taper/angle; 2, type of taper/angle; skipped, a degree of taper/angle; 90 degrees, a tip radius: 5 mm, and the length of the tip radius: 14 mm, Tip (2); skipped, Number of teeth: 2, Direction of revolution: R (rotation in a clockwise direction)

Segment of a reamer in the X direction/a reamer in the Z direction (XT/ZT): 2,

Reference tip point; X: 0, and Z: +25 mm,

Tool rigidity; the tap does not require any entry in this column, and hence this column is skipped.

Tool rigidity in the X direction: skipped, and tool rigidity in the Z direction: skipped, Tip clamping method: L, Limit of depth of cut; the tap does not require any entry in this column, and hence this entry column is skipped.

Limit of feed rate:

Segment: segment of the maximum and minimum millimeters per minute or the maximum and minimum millimeters per revolution: 1, the maximum feed rate is 0.8 mm/rev., and the minimum feed rate is 0.8 mm/rev. (the tap has neither the maximum feed rate nor the minimum feed rate, and hence the feed rate that is the same as the pitch is input to both entry items), Maximum cut withstanding volume; the tap has no cut withstanding volume, and hence it is possible to input a torsional rigidity in this entry column or to omit entry into this column.

Allowable limit of intermittent cutting (1);

Cut withstanding volume: skipped, a threshold frequency: skipped, the maximum depth of cut: skipped, and the maximum feed rate: 0.8 mm/rev., Tool material: SKH51, Specifications for a threading tool; abbreviations are input depending on the type of a screw thread, that is, a metric screw thread: M, a Whitworth screw thread: W, a unified screw thread: UNC and UNF, a parallel pipe thread: G, a taper pipe thread: R, Rc, and Rp, or the like. Modal is designated by M. A metric screw thread is used in the present embodiment, and hence M is input.

Pitch: 0.8 mm, segment of a right-hand thread/a left-hand thread: R (a right-hand thread), and accuracy: skipped, Specifications for a gear shaper; the tap does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the tap with a tool identification number 16 is now completed.

The entry of a cemented carbide end mill with a tool identification number 17 will be described hereinbelow.

Sequence: 1016,

Tool identification number: 17,

Shank identification number: FBED2160S,

Tip identification number: skipped,

Specifications for a tool diameter; a tool diameter: 16 mm, a tolerance symbol: skipped, an upper tolerance: 0, and a lower tolerance: −0.050, Specifications for tool width: skipped, Major cutting edge length: 25 mm, Nominal length: 35 mm, Specifications for a tip:

Tip (1),

Segment of taper/angle; 2, type of taper/angle; skipped, a degree of taper/angle; 180 degrees, a tip radius: 16 mm, and the length of the tip radius: 25 mm, Tip (2), Segment of taper/angle; skipped, type of taper/angle; skipped, and a degree of taper/angle; skipped, Number of teeth: 2, Direction of revolution: R (rotation in a clockwise direction)

Segment of a drill in the X direction/a drill in the Z direction (XT/ZT): 1,

Reference tip point; X: 35 mm, and Z: 0,

Tool rigidity; in the X direction: skipped, and in the Z direction: 0.024 $\mu$m/N, Tip clamping method: B, Limit of depth of cut; the maximum depth of cut: 16 mm, and the minimum depth of cut: 0.05 mm, Limit of feed rate:

Segment: segment of the maximum and minimum millimeters per minute or the maximum and minimum millimeters per revolution: 1, the maximum feed rate is 0.2 mm/rev., and the minimum feed rate is 0.05 mm/rev., Maximum cut withstanding volume; 600N, Allowable limit of intermittent cutting (1);

Cut withstanding volume: 250N, a threshold frequency: 60 Hz, the maximum depth of cut: 8 mm, and the maximum feed rate: 0.15 mm/rev., Tool material: M20, Specifications for a threading tool; the end mill does not require any entry in this column, and hence this column is skipped.

Specifications for a gear shaper; the end mill does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the cemented carbide end mill with a tool identification number 17 is now completed.

The entry of a cemented carbide end mill with a tool identification number 18 will be described hereinbelow.

Sequence: 1017,

Tool identification number: 18,

Shank identification number: FSED2100S,

Tip identification number: skipped,

Specifications for a tool diameter; a tool diameter: 10 mm, a tolerance symbol: skipped, an upper tolerance: 0, and a lower tolerance: −0.050, Specifications for tool width: skipped, Major cutting edge length: 20 mm, Nominal length: 24 mm, Specifications for a tip:

Tip (1),

Segment of taper/angle; 2, type of taper/angle; skipped, a degree of taper/angle; 180 degrees, a tip radius: 10 mm, and the length of the tip radius: 20 mm, Tip (2), Segment of taper/angle; skipped, type of taper/angle; skipped, and a degree of taper/angle; skipped, Number of teeth: 2, Direction of revolution: R (rotation in a clockwise direction)

Segment of a drill in the X direction/a drill in the Z direction (XT/ZT): 2,

Reference tip point; X: 0, and Z: +24 mm,

Tool rigidity; in the X direction: 0.051 $\mu$m/N, and in the Z direction: skipped, Tip clamping method: L, Limit of depth of cut; the maximum depth of cut: 10 mm, and the minimum depth of cut: 0.05 mm, Limit of feed rate:

Segment: segment of the maximum and minimum millimeters per minute or the maximum and minimum millimeters per revolution: 1, the maximum feed rate is 0.1 mm/rev., and the minimum feed rate is 0.01 mm/rev., Maximum cut withstanding volume; 300N, Allowable limit of intermittent cutting (1);

Cut withstanding volume: 150N, a threshold frequency: 60 Hz, the maximum depth of cut: 4 mm, and the maximum feed rate: 0.05 mm/rev., Tool material: M20, Specifications for a threading tool; the end mill does not require any entry in this column, and hence this column is skipped.

Specifications for a gear shaper; the end mill does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the cemented carbide end mill with a tool identification number 18 is now completed.

The entry of a side cutter with a tool identification number 19 will be described hereinbelow.

Sequence: 1018,

Tool identification number: 19,

Shank identification number: S,

Tip identification number: since the side cutter is made of solid high speed steel, this entry column is skipped.

Specifications for a tool diameter; a tool diameter: 45 mm, a tolerance symbol: skipped, an upper tolerance: 0, and a lower tolerance: −0.050, Specifications for tool width: tool width: 45 mm, a tolerance symbol: skipped, an upper tolerance: +0.09, and a lower tolerance: 0.0, Major cutting edge length: the side cutter does not require any entry in this column, and hence this entry column is skipped.

Nominal length: the side cutter does not require any entry in this column, and hence this entry column is skipped.

Specifications for a tip: the side cutter does not require any entry in this column, and hence this entry column is skipped.

Number of teeth: 18,

Direction of revolution: R (rotation in a clockwise direction)

Segment of a drill in the X direction/a drill in the Z direction (XT/ZT): 1,

Reference tip point; X: +50 mm, and Z: 0,

Tool rigidity; in the X direction: 0.006 $\mu$m/N, and in the Z direction: 0.006 $\mu$m/N, Tip clamping method: L, Limit of depth of cut; the maximum depth of cut: 8.5 mm, and the minimum depth of cut: 0.02 mm, Limit of feed rate:

Segment: segment of the maximum and minimum millimeters per minute or the maximum and minimum millimeters per revolution: 1, the maximum feed rate is 0.36 mm/rev., and the minimum feed rate is 0.18 mm/rev., Maximum cut withstanding volume; 9400N, Allowable limit of intermittent cutting (1);

Cut withstanding volume: 940N, a threshold frequency: 17 Hz, the maximum depth of cut: 2.5 mm, and the maximum feed rate: 0.18 mm/rev., Tool material: SKH55, Specifications for a threading tool; the side cutter does not require any entry in this column, and hence this column is skipped.

Specifications for a gear shaper; the side cutter does not require any entry in column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the side cutter with a tool identification number 19 is now completed.

The entry of an end mill with a tool identification number 20 will be described hereinbelow.

Sequence: 1019,

Tool identification number: 20,

Shank identification number: F,

Tip identification number: the end mill is of a solid type, and hence this entry column is skipped.

Specifications for a tool diameter; a tool diameter: 8 mm, a tolerance symbol: h10, an upper tolerance: 0, and a lower tolerance: −0.058, Specifications for tool width: the end mill does not require any entry in this column, and this entry column is skipped, Major cutting edge length: 11 mm, Nominal length: 11 mm, Specifications for a tip:

Tip (1),

Segment of taper/angle; 2, type of taper/angle; skipped, a degree of taper/angle; 180 degrees, a tip radius: 8 mm, and the length of the tip radius: 11 mm, Tip (2), Segment of taper/angle; skipped, type of taper/angle; skipped, and a degree of taper/angle; skipped, Number of teeth: 2, Direction of revolution: R (rotation in a clockwise direction)

Segment of a drill in the X direction/a drill in the Z direction (XT/ZT): 2,

Reference tip point; X: 0, and Z: 11 mm,

Tool rigidity; in the X direction: 0.022 μm/N, and in the Z direction: skipped,

Tip clamping method: L,

Limit of depth of cut; the maximum depth of cut: 8 mm, and the minimum depth of cut: 0.05 mm, Limit of feed rate:

Segment: segment of the maximum and minimum millimeters per minute or the maximum and minimum millimeters per revolution: 1, the maximum feed rate is 0.03 mm/rev., and the minimum feed rate is 0.01 mm/rev., Maximum cut withstanding volume; 220N, Allowable limit of intermittent cutting (1);

Cut withstanding volume: 110N, a threshold frequency: 60 Hz, the maximum depth of cut: 2.5 mm, and the maximum feed rate: 0.01 mm/rev., Tool material: SKH51, Specifications for a threading tool; the end mill does not require any entry in this column, and hence this column is skipped.

Specifications for a gear shaper; the end mill does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the cemented carbide end mill with a tool identification number 20 is now completed.

The entry of an end mill with a tool identification number 21 will be described hereinbelow.

Sequence: 1020,

Tool identification number: 21,

Shank identification number: F,

Tip identification number: the end mill is of a solid type, and hence this entry column is skipped.

Specifications for a tool diameter; a tool diameter: 6 mm, a tolerance symbol: h10, an upper tolerance: 0, and a lower tolerance: −0.048, Specifications for tool width: the end mill has no relevance to this entry column, and this entry column is skipped, Major cutting edge length: 8 mm, Nominal length: 8 mm, Specifications for a tip:

Tip (1),

Segment of taper/angle; 2, type of taper/angle; skipped, a degree of taper/angle; 180 degrees, a tip radius: 6 mm, and the length of the tip radius: 8 mm, Tip (2), Segment of taper/angle; skipped, type of taper/angle; skipped, and a degree of taper/angle; skipped, Number of teeth: 2, Direction of revolution: R (rotation in a clockwise direction)

Segment of a drill in the X direction/a drill in the Z direction (XT/ZT): 1,

Reference tip point; X: +8 mm, and Z: 0,

Tool rigidity; in the X direction: 0.027 μm/N, and in the Z direction: skipped,

Tip clamping method: L,

Limit of depth of cut; the maximum depth of cut: 6 mm, and the minimum depth of cut: 0.05 mm, Limit of feed rate:

Segment: segment of the maximum and minimum millimeters per minute or the maximum and minimum millimeters per revolution: 1, the maximum feed rate is 0.015 mm/rev., and the minimum feed rate is 0.01 mm/rev., Maximum cut withstanding volume; 185N, Allowable limit of intermittent cutting (1);

Cut withstanding volume: 90N, a threshold frequency: 60 Hz, the maximum depth of cut: 2 mm, and the maximum feed rate: 0.01 mm/rev., Tool material: SKH51, Specifications for a threading tool; the end mill does not require any entry in this column, and hence this column is skipped.

Specifications for a gear shaper; the end mill does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XLD001 is input to the machine tool identification number entry column. The entry of the cemented carbide end mill with a tool identification number 21 is now completed.

The entry of a gear hob with a tool identification number 22 will be described hereinbelow.

Sequence: 1021,

Tool identification number: 22,

Shank identification number: H,

Tip identification number: the end mill is of a solid type, and hence this entry column is skipped.

Specifications for a tool diameter; a tool diameter: 65 mm, a tolerance symbol: skipped, an upper tolerance: skipped, and a lower tolerance: skipped, Specifications for tool width: tool width: 65 mm, a tolerance symbol: skipped, an upper tolerance: skipped, and a lower tolerance: skipped, Major cutting edge length: skipped, Nominal length: skipped, Specifications for a tip: skipped, Number of teeth: 1, Direction of revolution: R (rotation in a clockwise direction)

Segment of a drill in the X direction/a drill in the Z direction (XT/ZT): 1,

Reference tip point; X: 3.25 mm, and Z: 0,

Tool rigidity; in the X direction: 0.008 μm/N, and in the Z direction: 0.008 μm/N, Tip clamping method: L, Limit of depth of cut; the maximum depth of cut: 5.625 mm, and the minimum depth of cut: 0.01 mm, Limit of feed rate:

Segment: segment of the maximum and minimum millimeters per minute or the maximum and minimum millimeters per revolution: 1, the maximum feed rate is 0.05 mm/rev., and the minimum feed rate is 0.05 mm/rev., Maximum cut withstanding volume; 625N, Allowable limit of intermittent cutting (1);

Cut withstanding volume: 300N, a threshold frequency: 60 Hz, the maximum depth of cut: 0.8 mm, and the maximum feed rate: 0.1 mm/rev., Tool material: SKH55, Specifications for a threading tool; the gear hob does not require any entry in this column, and hence this column is skipped.

Specifications for a gear shaper; segment of a module/a diametral pitch: M is input for a module, and D is input for a diametral pitch. A module is employed in the present embodiment, M is input.

M/DP: 2.5, a pressure angle: 20 degrees, a cutter dedendum: 3.125 mm, and a dedendum: 3.125 mm, Segment of a non-topping type: 1, a semi-topping type: 2, and a topping type: 3; since the gear hob employed in the present embodiment is of a non-topping type, one is input.

Top corner radius: 0.985 mm,

Accuracy: the entry of a grade in compliance with the JIS or ISO: JIS3,

Addendum modification: 0,

Segment of a roughing tool/a finishing tool (R/F): F,

A machine identification number is registered while it is linked to the tool identification number, and therefore a machine tool identification number which is used in a limited manner is entered.

In the present embodiment, XHB001 is input to the machine tool identification number entry column. The entry of the gear hob with a tool identification number 22 is now completed.

The entry of an inside diameter grinding wheel with a tool identification number 23 will be described hereinbelow.

Sequence: 1022,

Tool identification number: 23,

Shank identification number: GW176-S,

Tip identification number: WA180J6V,

Specifications for a tool diameter; a tool diameter: 10 mm, a tolerance symbol: skipped, an upper tolerance: skipped, and a lower tolerance: skipped, Specifications for tool width: the inside diameter grinding wheel does not require any entry in this column, and hence this entry column is skipped.

Major cutting edge length: 13 mm,

Nominal length: 20 mm,

Specifications for a tip:

Tip (1); a segment of a taper/angle: 2, the type of taper/angle: skipped, the degree of taper/angle: 180 degrees, a tip radius: 10 mm, and the length of the tip radius: 13 mm, Tip (2); skipped, Number of teeth: the inside diameter grinding wheel is cylindrical, and hence this entry column is skipped.

Direction of revolution: R (rotation in a clockwise direction)

Segment of a drill in the X direction/a drill in the Z direction (XT/ZT): 2,

Reference tip point; X: 0, and Z: 20 mm,

Tool rigidity; in the X direction: 0.204 $\mu$m/N, and in the Z direction: skipped, Tip clamping method: B, Limit of depth of cut; since the depth of cut made by the inside diameter grinding wheel is different from the depth of cut made by a mill, the width of a contact area of the grinding wheel is input instead of the depth of cut. The maximum width of the contact area of the grinding wheel: 10 mm, and the minimum width of the contact area of the grinding wheel: 3 mm, Limit of feed rate:

Segment: segment of the maximum and minimum millimeters per minute or the maximum and minimum millimeters per revolution: 1, the maximum feed rate is 0.001 mm/rev., and the minimum feed rate is 0.001 mm/rev., Maximum cut withstanding volume; 250N, Allowable limit of intermittent cutting (1);

Cut withstanding volume: 125N, a threshold frequency: 60 Hz, the maximum depth of cut: 3 mm, and the maximum feed rate: 0.0005 mm/rev., Tool material: WA, Specifications for a threading tool; the inside diameter grinding wheel does not require any entry in this column, and hence this column is skipped.

Specifications for a gear shaper; the inside diameter grinding wheel does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XGI001 is input to the machine tool identification number entry column. The entry of the inside diameter grinding wheel with a tool identification number 23 is now completed.

The entry of an outside diameter grinding wheel with a tool identification number 24 will be described hereinbelow.

Sequence: 1023,

Tool identification number: 24,

Shank identification number: G1-A,

Tip identification number: WA46K7V,

Specifications for a tool diameter; a tool diameter: 455 mm, a tolerance symbol: skipped, an upper tolerance: skipped, and a lower tolerance: skipped, Specifications for tool width: the outside diameter grinding wheel does not require any entry in this column, and hence this entry column is skipped.

Major cutting edge length: 75 mm,

Nominal length: the outside diameter grinding wheel does not require any entry in this column, and hence this entry column is skipped.

Specifications for a tip: the outside diameter grinding wheel does not require any entry in this column, and hence this entry column is skipped. Number of teeth: the inside diameter grinding wheel is cylindrical, and hence this entry column is skipped.

Direction of revolution: R (rotation in a clockwise direction)

Segment of a drill in the X direction/a drill in the Z direction (XT/ZT): 2,

Reference tip point; X: 0, and Z: 75 mm,

Tool rigidity; in the X direction: 0.001 $\mu$m/N, and in the Z direction: skipped, Tip clamping method: B, Limit of depth of cut; since the depth of cut made by the outside diameter grinding wheel is different from the depth of cut made by a mill, the width of a contact area of the grinding wheel is input instead of the depth of cut. The maximum width of the contact area of the grinding wheel: 75 mm, and the minimum width of the contact area of the grinding wheel: 5 mm, Limit of feed rate:

Segment: segment of the maximum and minimum millimeters per minute or the maximum and minimum millimeters per revolution: 1, the maximum feed rate is 0.003 mm/rev., and the minimum feed rate is 0.001 mm/rev., Maximum cut withstanding volume; 5000N, Allowable limit of intermittent cutting (1);

Cut withstanding volume: 2000N, a threshold frequency: 30 Hz, the maximum depth of cut: 75 mm, and the maximum feed rate: 0.001 mm/rev., Tool material: WA, Specifications for a threading tool; the outside diameter grinding wheel does not require any entry in this column, and hence this column is skipped.

Specifications for a gear shaper; the outside diameter grinding wheel does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, XGE001 is input to the machine tool identification number entry column. The entry of the outside diameter grinding wheel with a tool identification number 24 is now completed.

The entry of a side cutter (a circular saw) with a tool identification number 25 will be described hereinbelow.

Sequence: 1024,

Tool identification number: 25,

Shank identification number: S,

Tip identification number: since the side cutter is made of solid high speed steel, this entry column is skipped.

Specifications for a tool diameter; a tool diameter: 315 mm, a tolerance symbol: skipped, an upper tolerance: 0, and a lower tolerance: −0.1, Specifications for tool width: tool width: 5 mm, a tolerance symbol: skipped, an upper tolerance: +0.09, and a lower tolerance: 0.0, Major cutting edge length: the side cutter does not require any entry in this column, and hence this entry column is skipped.

Nominal length: the side cutter has does not require any entry in this column, and hence this entry column is skipped.

Specifications for a tip: the side cutter does not require any entry in this column, and hence this entry column is skipped.

Number of teeth: 40,

Direction of revolution: R (rotation in a clockwise direction)

Segment of a drill in the X direction/a drill in the Z direction (XT/ZT): 1,

Reference tip point; X: +157.5 mm, and Z: 0,

Tool rigidity; in the X direction: μm/N, and in the Z direction: μm/N,

Tip clamping method: B,

Limit of depth of cut; the maximum depth of cut: mm, and the minimum depth of cut: mm, Limit of feed rate:

Segment: segment of the maximum and minimum millimeters per minute or the maximum and minimum millimeters per revolution: 1, the maximum feed rate is 5 mm/rev., and the minimum feed rate is 0.4 mm/rev., Maximum cut withstanding volume; N, Allowable limit of intermittent cutting (1);

Cut withstanding volume: 5000N, a threshold frequency: 30 Hz, the maximum depth of cut: 5 mm, and the maximum feed rate: 0.4 mm/rev., Tool material: SKH51, Specifications for a threading tool; the side cutter does not require any entry in this column, and hence this column is skipped.

Specifications for a gear shaper; the side cutter does not require any entry in this column, and hence this column is skipped.

Segment of a roughing tool/a finishing tool (R/F): F,

A machine identification number is registered while it is linked to the tool identification number, and therefore a machine tool identification number which is used in a limited manner is entered.

In the present embodiment, CSW001 is input to the machine tool identification number entry column. The entry of the side cutter with a tool identification number 25 is now completed.

The machine tool file comprises a variety of data items relating to the specifications for, and performance of, machine tools stored in such a file format as shown in FIGS. 58 to 76.

FIGS. 58 to 76 show an example of a facilitated entry, for purposes of explanation, based on the assumption that a workpiece pattern according to the present embodiment is machined. However, this example does not encompass all the machine tool files that can hypothetically be used in a factory.

A general inputting method will be described before the explanation of the example of data entry.

In this example, the sequence of the machine tool starts from 2000.

Machine identification numbers, for example, identification symbols associated with a plan number, are used to designate machining functions. However, the machining function has not yet been subdivided into segments, and therefore the machining function segment is formed by adding subdivided segments to the machining method symbols (shown in FIG. 118).

For instance, the turning operation is subdivided into a process of machining a workpiece while it is being fed by a bar feeding machine: LB, a process of machining the workpiece while being supported at its double center holes: LC, a process of machining the workpiece while being supported at its special double center holes: LCS, a process of turning the workpiece while being chucked: LF, a process of grinding the outside diameter of the workpiece: GE, and a process of grinding the inside diameter of the workpiece: GI.

A plant number, or the like, is used as the machine identification number so as to prevent confusion between the numbers.

A segment is switched between the absolute value and an increment (Abs/Inc) by preset segments of coordinates using G codes (G90; the absolute value, and G91; an increment) among 1: an increment, 2: the absolute value, and 3.

The least input increment is input in units of 0.001 μm/deg. for each control axis.

The maximum travel distance is input in millimeters per degree for each system and each control axis.

The fixed origin is input in millimeters per degree for each system and each control axis.

The maximum and minimum machinable dimensions are input in millimeters for each system and each control axis.

The maximum and minimum center-to-center distances are input in millimeters only for a machine tool capable of machining a workpiece while being supported at its double center holes.

The limit of a gradient is input to display the volume of a machine tool to machine a gradient hole.

For the limit of machining a gradient hole in the X direction, the extent of an inclined angle is input in degrees for each of Z, Y, and (A).

For the limit of machining a gradient hole in the Z direction, the extent of an inclined angle is input in degrees for each of X, Y, and C.

For the limit of machining a gradient hole in the Y direction, the extent of an inclined angle is input in degrees for each of Z, X, and (B).

For the maximum allowable machining weight, the maximum weight of material that the machine tool can carry is input in units of Newtons.

For the volume of the main spindle (1), segments of a first main spindle of a workpiece: W and a main spindle of a tool: T are input, and the volume of each of the spindles is input.

Segments of a constant torque: T and a constant output: W with regard to the first region are input, and the extent of a rotating speed (the maximum rotating speed and the minimum rotating speed) and an output power (kW) are also input.

Segments of a constant torque: T and a constant output: W with regard to the first region are input, and the extent of a rotating speed (the maximum rotating speed and the minimum rotating speed) and an output power (kW) are also input.

For the volume of the main spindle (2), segments of a second main spindle of a workpiece: W and a main spindle of a tool: T are input, and the volume of each of the spindles are input.

Segments of a constant torque: T and a constant output: W with regard to the second region are input, and the extent of a rotating speed (the maximum rotating speed and the minimum rotating speed) and an output power (kW) are input.

Segments of a constant torque: T and a constant output: W with regard to the second region are input, and the extent of a rotating speed (the maximum rotating speed and the minimum rotating speed) and an output power (kW) are input.

The power efficiency of the first and second main spindles (1) and (2) is input for the mechanical efficiency.

For the rigidity of a first main spindle (1), the maximum allowable load (N) and the rigidity (μm/N) of the main spindle in the axial direction and the maximum allowable load (N) and the rigidity (μm/N) of the main spindle in the radial direction are input.

For the rigidity of a second main spindle (2), the maximum allowable load (N) and the rigidity (μm/N) of the main spindle in the axial direction and the maximum allowable load (N) and the rigidity (μm/N) of the main spindle in the radial direction are input.

For the rigidity of a first tailstock (1), the maximum allowable load (N) and the rigidity (μm/N) of the tailstock in the axial direction and the maximum allowable load (N) and the rigidity (μm/N) of the tailstock in the radial direction are input.

For the rigidity of a second tailstock (2), the maximum allowable load (N) and the rigidity (μm/N) of the tailstock in the axial direction and the maximum allowable load (N) and the rigidity (μm/N) of the tailstock in the radial direction are input.

For the product of the maximum allowable depth of cut and a feed rate, the depth of cut (mm) and a feed rate per revolution (mm/rev.) of the first main spindle (1) and the depth of cut (mm) and a feed rate per revolution (mm/rev.) of the second main spindle are input.

Specifications for the number of revolutions of the first main spindle (1);

Upon entry of the previous number of revolutions of the main spindle, the previous maximum and minimum number of revolutions of the main spindle are automatically copied and input to an entry column with regard to the maximum and minimum number of revolutions of the first main spindle (1).

For a decision as to whether a gearshift is present, either absent 1 or present 2 is input.

For a decision as to whether the gearshift is an automatic gearshift or a manual gearshift, either automatic 1 or manual 2 is input.

The range of the gearshift is subdivided into U, M, L, and S, and the maximum and minimum number of revolutions of the spindle are input for each of these subdivisions.

Specifications for the number of revolutions of the second main spindle (2) are input in the same manner as the specifications of the first main spindle (1).

For the first rapid traverse speed (1), the maximum rapid traverse speed (m/min., or $\times 10^3$ deg./min.) of each axis of a first system is input.

For the second rapid traverse speed (2), the maximum rapid traverse speed (m/min., or $\times 10^3$ deg./min.) of each axis of a second system is input.

For the first minimum cutting speed (1) and the second minimum cutting speed (2), the minimum cutting speed (m/min., or $\times 10^3$ deg./min.) of each axis of the respective first and second systems is input.

For the first maximum cutting speed (1) and the second maximum cutting speed (2), the maximum cutting speed (m/min., or $\times 10^3$ deg./min.) of each axis of the respective first and second systems is input.

For the first feed power·efficiency (1), a feed power: kW and an efficiency: η of each axis of the first system are input.

For the second feed power·efficiency (2), a feed power: kW and an efficiency: η of each axis of the second system are input.

For a segment (1) of the first unit of feeding, either mm/rev.: 1 or mm/min.: 2 is input as a unit of feeding material along each axis of the first system.

For a segment (2) of the second unit of feeding, either mm/rev.: 1 or mm/min.: 2 is input as a unit of feeding material along each axis of the second system.

For the first tool replacement (1), either a pot number: P used in invoking a tool of the first system or a tool number: N, and the number of tools are input.

For the first tool replacement (2), either a pot number: P used in invoking a tool of the second system or a tool number: N, and the number of tools are input.

For the accuracy of a machine, details of the volume of a machine tool are input, namely, the extent of a tolerance, a finishing symbol, the roughness of a finished surface, a straightness, a flatness, a circularity, a cylindricity, a parallelism, a perpendicularity, a concentricity, and a runout. They are input in millimeters, and only the roughness of a finished surface is input in micrometers.

For the special (conditional) accuracy of a machine, details of the conditional volume of a machine tool are input, namely, a tolerance (requirements; the depth of cut, a feed rate, and a nose-radius of a tool), a finishing symbol (requirements; the depth of cut, the feed rate, and the nose-radius of the tool), the roughness of a finished surface (requirements; the depth of cut, the feed rate, and the nose-radius of the tool), and a configurational and positional accuracy symbol and volume values (requirements; the depth of cut, the feed rate, the nose-radius of the tool, the number of revolutions of the tool, and the radius of the tool).

To distinguish a finishing allowance volume, either a random finishing allowance method: 1 or a fixed finishing allowance method: 2 is input.

For standard operation time of a machine tool, the time required to replace a fixture with another one, the time required to set the coordinates of a workpiece, the time required to set a tool, the time required to replace the workpiece with another one, the time required to replace the tool with another one, and the time required to replace a tip with another one, are input in hours.

For a master file relating to a cutting machine; a special master file relating to a cutting operation, the width of a grinding wheel and the minimum width to be cut are input in millimeters for respective segments of cutting a workpiece into a constant size, indirectly cutting the workpiece into a constant size, and cutting the workpiece with a stopping motion.

For a master file relating to a drilling/tapping machine; a special master file related to a drilling/tapping operation, the maximum drill diameter and the maximum tap diameter are input.

For a master file relating to a milling cutter; a special master file relating to a milling cutter, the maximum diameter of an end mill, the maximum diameter of a face milling cutter, and the maximum diameter of a side cutter are input in millimeters.

Allowable dimensions, that is, the maximum diameter and length, of a fixture are input in millimeters.

The file relating to the operating time is represented by the standard operation time and the standard operating time of a machine tool in the machine tool file. The standard operating time of the machine tool comprises:

starting/stopping time of the main spindle (1 and 2), positioning time for rapid traverse (1; X, Y, Z, 2; X, Y, Z), tailstock operating time (forward travel; 1 and 2, and backward travel; 1 and 2), and cooling unit starting/stopping time (1 and 2). These times are input in units of 0.00001 hrs. The numerals 1 and 2 used for these times designate the first main spindle and the second main spindle, respectively. The same applies to any counterparts in the following descriptions.

An example of the entry of the machine tool file will be described referring to FIG. 58.

As previously mentioned, the machine tool file starts from a sequence number 2000. To begin with, an example of the entry of a cutting function file with a sequence number 2000 will be described.

Machining function: SW (a cutter),

Machine identification number: CSW001 (a circular sawing machine),

Distinction between the absolute value and an increment (Abs/Inc): 3 (the absolute value), Least input increment; X: 1 μm, Y: skipped (In the following descriptions, if no data are available for an input item, nothing is input to the file in the same manner as the entry of the tool file. A skip is used in the following descriptions to designate the lack of the entry of data.), Z: 1 μm, A: skipped, B: skipped, and C: skipped, Maximum travel distance; X: 200 mm, Y: 150 mm, Z: 1500 mm, A: skipped, B: skipped, and C: skipped, Fixed origin; X: −50 mm, Y: +150 mm, Z: 0, A: skipped, B: skipped, and C: skipped, Machinable dimensions; Max. X: 150 mm, Min. X: 10 mm, Max. Y: 150 mm, Min. Y: 0 mm, Max. Z: 1500 mm, Min. Z: 10 mm, A: skipped, B: skipped, and C: skipped, Center-to-center distance; skipped, Limit of machining a gradient hole in the X direction; skipped, Limit of machining a gradient hole in the Z direction; skipped, Limit of machining a gradient hole in the Y direction; skipped, Maximum allowable machining weight: 7740N, Volume of a main spindle (1); WS/TS (a distinction between the main spindle for a workpiece and the main spindle for a tool): T, Distinction between a constant torque/a constant output with regard to a first region; T, The number of revolutions of the spindle/output; the minimum number of revolutions; 30 rev./mm, Maximum number of revolutions of the spindle: 500 rev./mm, and an output: 22.5 kW, Second region; skipped, Volume of a main spindle (2); skipped, Mechanical efficiency; (1): 0.85, and (2): skipped, Rigidity of the main spindle (1);
in the axial direction: skipped,
in the radial direction: maximum allowable load: 8000N, and
rigidity: 0.001 μm/N, Rigidity of the main spindle (2); skipped, Rigidity of a tailstock (1); skipped, and rigidity of a tailstock (2); skipped, Maximum allowable depth of cut×feed rate;
the main spindle (1): the width of cut:
8 mm, a feed rate per revolution: 5 mm, the main spindle (2): skipped, Upon entry of the previous number of revolutions of the main spindle, the previous maximum and minimum number of revolutions of the main spindle are automatically copied and input to an entry column with regard to the maximum and minimum number of revolutions of the first main spindle (1).

Maximum number of revolutions: 500 rev./mm, minimum number of revolutions: 30 rev./mm A decision as to whether or not a gearshift is present: 1, a distinction between an automatic gearshift/a manual gearshift: skipped, U range: skipped, M range: skipped, L range: skipped, and S range: skipped, Number of revolutions of main spindle (2); skipped, Rapid traverse speed (1); X: 5 m/min., Y: 5 m/min., Z: 20 m/min., A:skipped, B:skipped, and C:skipped, Rapid traverse speed (2); skipped, Minimum cutting speed (1); X: 0.05 m/min., Y: 0.05 m/min., Z: 0.05 m/min., A: skipped, B: skipped, and C: skipped, Minimum cutting speed (2); skipped, Maximum cutting speed (1); X: 5 m/min., Y: 5 m/min., Z: 6 m/min., A:skipped, B: skipped, and C: skipped, Maximum cutting speed (2); skipped, Feed power·efficiency (1); X: 2 kW, 0.95η, Y: skipped, Z: 5 kW, 0.95η, A: skipped, B: skipped, and C: skipped, Feed power·efficiency (2); skipped, Unit of feeding: a distinction between mm/rev. or mm/min. (1); X: 2, Y: 2, and Z: 2, A: skipped, B: skipped, and C: skipped, Unit of feeding: a distinction between mm/rev. or mm/min. (2); skipped, Tool replacement (1); replacement of a pot number/a tool number: N, and the number of tools: 1, Tool replacement (2); skipped, Accuracy of a machine; the extent of a tolerance: 0.05 mm, a finishing symbol: 2M, the roughness of a finished surface: 25 μm, straightness: skipped, flatness: 0.05 mm, circularity: skipped, cylindricity: skipped, parallelism: 0.005 mm, perpendicularity: skipped, concentricity: skipped, and runout: skipped, Special (conditional) accuracy of the machine; skipped, Segment of a finishing allowance volume: skipped, Standard operation time of a machine tool; the time required to replace a fixture with another one: skipped, the time required to set the coordinates of a workpiece: 0.025 hrs, the time required to set a tool: 0.1 hrs, the time required to replace the workpiece with another one: 0.05 hrs, and the time required to replace the tool with another one: 0.02 hrs, Tip replacement: skipped, Special master file relating to a cutting operation; skipped, Special master file relating to a drill/a tap; skipped, Special master file relating to a milling operation; the maximum diameter of an end mill: skipped, the maximum diameter of a face milling cutter: skipped, and the maximum diameter of a side cutter: 315 mm, Allowable size of a fixture; maximum diameter: 400 mm, and maximum length: 15 mm, Starting/stopping time of the main spindle (1 and 2): Since a saw is kept rotating from when it has been made ready for operation to when it has finished operation, the starting/stopping time becomes zero. Thus, the starting/stopping time has no influence upon a machining cycle, and hence this entry section is skipped. Positioning time for rapid traverse (1; X: 0.00006 hrs, Y: 0.00006 hrs, Z: 0.00006 hrs, and 2; skipped), tailstock operating time (forward travel of a work clamp; 1: 0.0006 hrs, 2: skipped, and backward travel of the work clamp; 1: 0.0006 hrs, 2: skipped), cooling unit starting/stopping time (The cooling unit continues to cool a saw from when the saw has been made ready for operation to when the saw has finished operation. The cooling unit starting/stopping time has no effect on the machining cycle, and hence this entry column is skipped.)

The entry of the cutter is now completed.

The entry of a composite lathe will now be described. The composite lathe has a plurality of machining functions. Overlaps will arise as a result of the entry of each item of the file, and hence the explanation of the overlaps are omitted here for brevity.

Sequence number: 2001,

Machining function: L,

Machine identification number: XLD001,

Distinction between the absolute value and an increment (Abs/Inc): 1,

Least input increment; X: 1 μm, Y: 1 μm, Z: 1 μm, A: 0.001 degrees, B: 0.001 degrees, and C: 0.001 degrees, Maximum travel distance; X: 400 mm, Y: 150 mm, Z: 1500 mm, A: ±30 degrees, B: ±30 degrees, and C: ±360 degrees, Fixed origin; X: +300 mm, Y: +75 mm, Z: +1500 mm, A: 0 degrees, B: 0 degrees, and C: 0 degrees, Machinable dimensions; Max. X: 300 mm, Min. X: 0, Max. Y: 75 mm, Min. Y: 0, Max. Z: 1500 mm, Min. Z: 0, Max. A: 30 degrees, Min. A: 0, Max. B: 30 degrees, Min. B: 0, and Max. C: 360 degrees, Min. C: 0, Center-to-center distance; Max. X: 1550 mm, Min. Z: 0, Input items (that is, the limit of machining a gradient hole in the X direction, the limit of machining a gradient hole in the Z direction, and the limit of machining a gradient hole in the Y direction) relate to machining functions B, D, DR, ME, and T. Therefore, the entry of these items is skipped.

Maximum allowable machining weight: 4000N,

Volume of a main spindle (1); WS/TS (a distinction between the main spindle for a workpiece and the main spindle for a tool): W, Distinction between a constant torque/a constant output with regard to a first region; T, The number of revolutions of the spindle/output; the minimum number of revolutions; 0, Maximum number of revolutions of the spindle: 1000 rpm, and an output: 15 kW, Distinction between a constant torque/a constant output with regard to a second region; W, The number of revolutions of the spindle/output; the minimum number of revolutions; 1000 rpm, Maximum number of revolutions of the spindle: 6000 rpm, and an output: 15 kW, Volume of a main spindle (2); WS/TS (a distinction between the main spindle for a workpiece and the main spindle for a tool): T, Distinction between a constant torque/a constant output with regard to a first region; T, The number of revolutions of the spindle/output; the minimum number of revolutions; 0, Maximum number of revolutions of the spindle: 1500 rpm, and an output: 3 kW, Distinction between a constant torque/a constant output with regard to a second region; W, The number of revolutions of the spindle/output; the minimum number of revolutions; 1500 rpm, Maximum number of revolutions of the spindle: 1000 rpm, and an output: 3 kW, Mechanical efficiency; (1): 0.85, and (2): 0.95, Rigidity of the main spindle (1);

in the axial direction: maximum allowable load: 30000N, and rigidity: 0.001 μm/N, in the radial direction; maximum allowable load: 6000N, and rigidity: 0.001 μm/N, Rigidity of the main spindle (2);

in the axial direction: maximum allowable load: 10000N, and rigidity: 0.001 μm/N, in the radial direction; maximum allowable load: 2000N, and rigidity: 0.001 μm/N, Rigidity of a tailstock (1); maximum allowable load in the axial direction: 15000N, rigidity in the axial direction: 0.01 μm/N, and maximum allowable load in the radial direction: 3000N, and rigidity in the radial direction: 0.001 μm/N, Rigidity of a tailstock (2); skipped, Maximum allowable depth of cut×feed rate;

the main spindle (1): the depth of cut: 7 mm, a feed rate per revolution: 0.7 mm/rev., the main spindle (2): the depth of cut: 2 mm, and a feed rate per revolution: 0.2 mm/rev, Upon entry of the previous number of revolutions of the main spindle, the previous maximum and minimum number of revolutions of the main spindle are automatically copied and input to an entry column with regard to the maximum and minimum number of revolutions of the first main spindle (1).

Maximum number of revolutions: 6000 rpm, minimum number of revolutions: 0,

Presence/absence of a gearshift: 1,

Since the machine has no gearshift, the following input items are skipped (that is, a distinction between an automatic gearshift/a manual gearshift, U range: maximum and minimum number of revolutions, M range: maximum and minimum number of revolutions, L range: maximum and minimum number of revolutions, and S range: maximum and minimum number of revolutions), Upon entry of the previous number of revolutions of the main spindle, the previous maximum and minimum number of revolutions of the main spindle are automatically copied and input to an entry column with regard to the maximum and minimum number of revolutions of the second main spindle (2).

Maximum number of revolutions: 10000 rpm, minimum number of revolutions: 0,

Presence/absence of a gearshift: 1,

Since the machine has no gearshift, the following input items are skipped (that is, a distinction between an automatic gearshift/a manual gearshift, U range: maximum and minimum number of revolutions, M range: maximum and minimum number of revolutions, L range: maximum and minimum number of revolutions, and S range: maximum and minimum number of revolutions, Rapid traverse speed (1); X: 15 m/min., Y: 10 m/min., Z: 15 m/min., A: $10\times10^3$ degrees/min., B: $10\times10^3$ degrees/min., and C: $10\times10^3$ degrees/min., Rapid traverse speed (2); skipped, Minimum cutting speed (1); X: 0, Y: 0, Z: 0, A: 0, B: 0, and C: 0, Minimum cutting speed (2); skipped, Maximum cutting speed (1); X: 5 m/min., Y: 5 m/min., Z: 5 m/min., A: $5\times10^3$ degrees/min., B: $5\times10^3$ degrees/min., and C: $5\times10^3$ degrees/min., Maximum cutting speed (2); skipped, Feed power·efficiency (1); X: 2 kW, η: 0.95, Y: 1 kW, η: 0.95, Z: 2 kW, η: 0.95, A: 0.5 kW, η: 0.95, B: 0.5 kW, η: 0.95, and C: 2 kW, 0.95, Feed power·efficiency (2); skipped, Unit of a feed: a distinction between mm/rev. or mm/min. (1); X: 1, Y: 1, and Z: 1, A: 2, B: 2, and C: 2, Unit of a feed: a distinction between mm/rev. or mm/min. (2); skipped, Tool replacement (1); replacement of a pot number/a tool number: N, and the number of tools: 64, Tool replacement (2); skipped, Accuracy of a machine; the extent of a tolerance: 0.010 mm, a finishing symbol: 3L, the roughness of a finished surface: 6.3 μm, straightness: skipped, flatness: 0.005 mm, circularity: 0.003 mm, cylindricity: 0.010 mm, parallelism: 0.005 mm, perpendicularity: 0.003 mm, concentricity: 0.003 mm, and runout: 0.006 mm, Special (conditional) accuracy of the machine;

Extent of a tolerance: skipped,

Finishing symbol: 4L, the depth of cut: 0.1 mm, a feed rate: 0.05 mm/rev., and a nose-radius of a tool: 0.4 mm, Roughness of a finished surface: 0.8 μm, the depth of cut: 0.1 mm, and a feed rate: 0.05 mm/rev., the nose-radius of a tool: 0.4 mm, Configurational and positional accuracy symbol: see FIG. 139*e*, a volume value: 0.003 mm, the depth of cut: 0.1 mm, a feed rate: 0.05 mm/rev., the nose-radius of a tool: 0.4 mm, and the number of revolutions: 400 rpm, (Tool diameter: skipped)

Configurational and positional accuracy symbol: skipped, the input items from the volume value to the nose-radius of the tool are skipped, Segment of finishing allowance volume: 1 (a random finishing allowance), Standard operation time of a machine tool; the time required to replace a fixture with another one: 0.1 hrs, the time required to set the coordinates of a workpiece: 0.05 hrs, the time required to set a tool: 0.2 hrs, the time required to replace the workpiece with another one: 0.03 hrs, and the time required to replace the tool with another one: 0.005 hrs, Tip replacement: 0.005 hrs, Special master file relating to a cutting operation; skipped, Special master file relating to a drill/a tap; skipped, Special master file relating to a milling operation; skipped, Allowable size of a fixture; maximum diameter: 80 mm, and maximum length: 300 mm, Starting/stopping time of the main spindle (1: 0.0012 hrs, and 2: skipped): Positioning time for rapid traverse (1; X: 0.00006 hrs, Y: 0.00006 hrs, Z: 0.00006 hrs, and 2; skipped, A: skipped, B: skipped, and C: skipped), tailstock operating time (forward travel of a work clamp; 1: 0.0006 hrs, 2: skipped, and backward travel of the work clamp; 1: 0.0006 hrs, 2: skipped), cooling unit starting/stopping time (a: 0.0006 hrs, and 2: skipped)

The entry of the turning function file of the composite lathe is now completed.

An example of the entry of a drilling function file having a sequence number 2002 will now be described.

Sequence number: 2002,

Machining function: D,

Machine identification number: XLD001,

Distinction between the absolute value and an increment (Abs/Inc): 1,

Least input increment; X: 1 μm, Y: 1 μm, Z: 1 μm, A: 0.001 degrees, B: 0.001 degrees, and C: 0.001 degrees, Maximum travel distance; X: 400 mm, Y: 150 mm, Z: 1500 mm, A: ±30 degrees, B: ±30 degrees, and C: ±360 degrees, Fixed origin; X: +300 mm, Y: +75 mm, Z: +1500 mm, A: 0 degrees, B: 0 degrees, and C: 0 degrees, Machinable dimensions; Max. X: 300 mm, Min. X: 0, Max. Y: 75 mm, Min. Y: 0, Max. Z: 1500 mm, Min. Z: 0, Max. A: 30 degrees, Min. A: 0, Max. B: 30 degrees, Min. B: 0, and Max. C: 360 degrees, Min. C: 0, Center-to-center distance; Max. X: 1550 mm, Min. Z: 0, Limit of machining a gradient hole in the X direction;

the limit in the +Z direction: 30 degrees, the limit in the −Z direction: 30 degrees, the limit in the +Y direction: 30 degrees, the limit in the −Y direction: 30 degrees, the limit in the +A direction: 30 degrees, and the limit in the −A direction: 30 degrees, Limit of machining a gradient hole in the Z direction; the limit in the +X direction: 30 degrees, the limit in the −X direction: 30 degrees, the limit in the +Y direction: 30 degrees, the limit in the −Y direction: 30 degrees, the limit in the +C direction: 30 degrees, and the limit in the −C direction: 30 degrees, Limit of machining a gradient hole in the Y direction; the limit in the +Z direction: 30 degrees, the limit in the −Z direction: 30 degrees, the limit in the +X direction: 30 degrees, the limit in the −X direction: 30 degrees, the limit in the +B direction: 30 degrees, and the limit in the −B direction: 30 degrees, Maximum allowable machining weight: 4000N, Volume of a main spindle (1); WS/TS (a distinction between the main spindle for a workpiece and the main spindle for a tool): W, Distinction between a constant torque/a constant output with regard to a first region; T, The number of revolutions of the spindle/output; the minimum number of revolutions; 0, Maximum number of revolutions of the spindle: 1000 rpm, and an output: 15 kW, Distinction between a constant torque/a constant output with regard to a second region; W, The number of revolutions of the spindle/output; the minimum number of revolutions; 1000 rpm, Maximum number of revolutions of the spindle: 6000 rpm, and an output: 15 kW, Volume of a main spindle (2); WS/TS (a distinction between the main spindle for a workpiece and the main spindle for a tool): T, Distinction between a constant torque/a constant output with regard to a first region; T, The number of revolutions of the spindle/output; the minimum number of revolutions; 0, Maximum number of revolutions of the spindle: 1500 rpm, and an output: 3 kW, Distinction between a constant torque/a constant output with regard to a second region; W, The number of revolutions of the spindle/output; the minimum number of revolutions; 1500 rpm, Maximum number of revolutions of the spindle: 1000 rpm, and an output: 3 kW, Mechanical efficiency; (1): 0.85, and (2): 0.95, Rigidity of the main spindle (1);

in the axial direction: maximum allowable load: 30000N, and rigidity: 0.001 μm/N, in the radial direction; maximum allowable load: 6000N, and rigidity: 0.001 μm/N, Rigidity of the main spindle (2);

in the axial direction: maximum allowable load: 10000N, and rigidity: 0.001 μm/N, in the radial direction; maximum allowable load: 2000N, and rigidity: 0.001 μm/N, Rigidity of a tailstock (1); maximum allowable load in the axial direction: 15000N, rigidity in the axial direction: 0.01 μm/N, and maximum allowable load in the radial direction: 3000N, and rigidity in the radial direction: 0.001 μm/N, Rigidity of a tailstock (2); skipped, Maximum allowable depth of cut×feed rate;

the main spindle (1): skipped, the main spindle (2): the depth of cut: 2 mm, and a feed rate per revolution: 0.2 mm/rev, Upon entry of the previous number of revolutions of the main spindle, the previous maximum and minimum number of revolutions of the main spindle are automatically copied and input to an entry column with regard to the maximum and minimum number of revolutions of the first main spindle (1).

Maximum number of revolutions: 6000 rpm, minimum number of revolutions: 0,

Presence/absence of a gearshift: 1,

Since the machine has no gearshift, the following input items are skipped (that is, a distinction between an automatic gearshift/a manual gearshift, U range: maximum and minimum number of revolutions, M range: maximum and minimum number of revolutions, L range: maximum and minimum number of revolutions, and S range: maximum and minimum number of revolutions), Upon entry of the previous number of revolutions of the main spindle, the previous maximum and minimum number of revolutions of the main spindle are automatically copied and input to an entry column with regard to the maximum and minimum number of revolutions of the second main spindle (2).

Maximum number of revolutions: 10000 rpm, minimum number of revolutions: 0,

Presence/absence of a gearshift: 1,

Since the machine has no gearshift, the following input items are slipped (that is, a distinction between an automatic gearshift/a manual gearshift, U range: maximum and minimum number of revolutions, M range: maximum and minimum number of revolutions, L range: maximum and minimum number of revolutions, and S range: maximum and minimum number of revolutions, Rapid traverse speed (1); X: 15 m/min., Y: 10 m/min., Z: 15 m/min., A: $10\times10^3$ degrees/min., B: $10\times10^3$ degrees/min., and C: $10\times10^3$ degrees/min., Rapid traverse speed (2); skipped, Minimum cutting speed (1); X: 0, Y: 0, Z: 0, A: 0, B: 0, and C: 0, Minimum cutting speed (2); skipped, Maximum cutting speed (1); X: 5 m/min., Y: 5 m/min., Z: 5 m/min., A: $5\times10^3$ degrees/min., B: $5\times10^3$ degrees/min., and C: $5\times10^3$ degrees/min., Maximum cutting speed (2); skipped, Feed power·efficiency (1); X: 2 kW, η: 0.95, Y: 1 kW, η: 0.95, Z: 2 kW, η: 0.95, A: 0.5 kW, η: 0.95, B: 0.5 kW, η: 0.95, and C: 2 kW, η: 0.95, Feed power·efficiency (2); skipped, Unit of feeding: a distinction between mm/rev. or mm/min. (1); X: 2, Y: 2, and Z: 2, A: 2, B: 2, and C: 2, Unit of feeding: a distinction between mm/rev. or mm/min. (2); skipped, Tool replacement (1); replacement of a pot number/a tool number: N, and the number of tools: 64, where the number of tools is 64, by summing all the functional tools.

Tool replacement (2); skipped,

Accuracy of a machine; the extent of a tolerance: 0.05 mm, a finishing symbol: 1D, the roughness of a finished surface: 100 μm, straightness: skipped, flatness: skipped, circularity: skipped, cylindricity: skipped, parallelism: skipped, perpendicularity: skipped, concentricity: skipped, and runout: skipped, Special (conditional) accuracy of the machine; skipped, Segment of finishing allowance volume: skipped, Standard operation time of a machine tool; the time required to replace a fixture with another one: 0.1 hrs, the time required to set the coordinates of a workpiece: 0.05 hrs, the time required to set a tool: 0.2 hrs, the time required to replace the workpiece with another one: 0.03 hrs, and the time required to replace the tool with another one: 0.005 hrs, Tip replacement: skipped, Special master file relating to a cutting operation; skipped, Special master file relating to a drill/a tap; maximum diameter of a drill: 25 mm, Special master file relating to a milling operation; skipped, Allowable size of a fixture; maximum diameter: 80 mm, and maximum length: 300 mm, Starting/stopping time of the main spindle (1: 0.0012 hrs, and 2: skipped): Positioning time for rapid traverse (1; X: 0.00006 hrs, Y: 0.00006 hrs, Z: 0.00006 hrs, and 2; skipped, A: 0.00006 hrs, B: 0.00006 hrs, and C: 0.00006 hrs), tailstock operating time (forward travel of a work clamp; 1: 0.0006 hrs, 2: skipped, and backward travel of the work clamp; 1: 0.0006 hrs, 2: skipped), cooling unit starting/stopping time (a: 0.0006 hrs, and 2: skipped)

The entry of the drilling function file of the composite lathe is now completed.

An example of the entry of a reamed hole finishing file with a sequence number 2003 will now be described.

Sequence number: 2003,

Machining function: DR,

Machine identification number: XLD001,

The input items other than the following descriptions are the same as those of the machining function: D having a sequence number 2002, and hence their explanations will be omitted.

Accuracy of a machine; the extent of a tolerance: 0.005 mm, a finishing symbol: 3DR, the roughness of a finished surface: 6.3 μm, straightness: skipped, flatness: skipped, circularity: 0.005 mm, cylindricity: 0.010 mm, parallelism: skipped, perpendicularity: 0.003 mm, concentricity: skipped, and runout: skipped, Special master file relating to a milling operation; the maximum diameter of an end mill: 25 mm, the maximum diameter of a face milling cutter: 80 mm, and the maximum diameter of a side cutter: 80 mm, The entry of the reamed hole finishing file of the composite lathe is now completed.

An example of the entry of a milling file with a sequence number 2004 will now be described.

Sequence number: 2004,

Machining function: M,

Machine identification number: XLD001,

The input items other than the following descriptions are the same as those of the machining function: D having a sequence number 2002, and hence their explanations will be omitted.

Accuracy of a machine; the extent of a tolerance: 0.020 mm, a finishing symbol: 2M, the roughness of a finished surface: 12 μm, straightness: skipped, a flatness: 0.010 mm, circularity: skipped, cylindricity: skipped, parallelism: 0.010, perpendicularity: 0.010 mm, concentricity: skipped, and runout: skipped, Special master file relating to a milling operation; the maximum diameter of an end mill: 25 mm, the maximum diameter of a face milling cutter: 80 mm, and the maximum diameter of a side cutter: 80 mm, The entry of the milling file of the composite lathe is now completed.

An example of the entry of a side cutter machining function file with a sequence number 2005 will now be described.

Sequence number: 2005,

Machining function: MSD,

Machine identification number: XLD001,

The input items other than the following descriptions are the same as those of the machining function: D having a sequence number 2002, and hence their explanations will be omitted.

Accuracy of a machine; the extent of a tolerance: 0.015 mm, a finishing symbol: 2M, the roughness of a finished surface: 12 μm, straightness: skipped, flatness: 0.010 mm, circularity: skipped, cylindricity: skipped, parallelism: 0.008, perpendicularity: 0.010 mm, concentricity: 0.008 mm, and runout: skipped, Special master file relating to a milling operation; the maximum diameter of an end mill: skipped, the maximum diameter of a face milling cutter: skipped, and the maximum diameter of a side cutter: 80 mm, The entry of the side cutter machining file of the composite lathe is now completed.

An example of the entry of a tapping function file with a sequence number 2006 will now be described.

Sequence number: 2006,

Machining function: T,

Machine identification number: XLD001,

The input items other than the following descriptions are the same as those of the machining function: D having a sequence number 2002, and hence their explanations will be omitted.

Special master file relating to drilling/tapping operations; the maximum drill diameter: skipped, and the maximum tap diameter: 25 mm, The entry of the tapping file of the composite lathe is now completed.

An example of the entry of a boring function file with a sequence number 2007 will now be described.

Sequence number: 2007,

Machining function: B,

Machine identification number: XLD001,

The input items other than the following descriptions are the same as those of the machining function: D having a sequence number 2002, and hence their explanations will be omitted.

Accuracy of a machine; the extent of a tolerance: 0.005 mm, a finishing symbol: 3L, the roughness of a finished surface: 6.3 μm, straightness: skipped, flatness: skipped, circularity: 0.005 mm, cylindricity: 0.010 mm, parallelism: skipped, perpendicularity: 0.003 mm, concentricity: skipped, and runout: skipped, The entry of the boring file of the composite lathe is now completed.

An example of the entry of a hobbing function file having a sequence number 2008 will now be described.

Sequence number: 2008,

Machining function: H,

Machine identification number: XHB001,

Distinction between the absolute value and an increment (Abs/Inc): 3,

Least input increment; X: 0.1 $\mu$m, Y: 0.1 $\mu$m, Z: 0.1 $\mu$m, A: 0.001 degrees, B: 0.001 degrees, and C: 0.001 degrees, Maximum travel distance; X: 350 mm, Y: 150 mm, Z: 300 mm, A: ±360 degrees, B: skipped, and C: ±∞degree, Fixed origin; X: +300 mm, Y: +75 mm, Z: +300 mm, A: +60 degrees, B: skipped, and C: 0 degrees, Machinable dimensions; Max. X: 300 mm, Min. X: 0, Max. Y: skipped, Min. Y: skipped, Max. Z: 300 mm, Min. Z: 0, Max. A: 60 degrees, Min. A: 0, Max. B: skipped, Min. B: skipped, and Max. C: ∞degree, Min. C: 0, Center-to-center distance; Max. X: 350 mm, Min. Z: 0, Limit of machining a gradient hole in the X direction; skipped, Limit of machining a gradient hole in the Z direction; skipped, Limit of machining a gradient hole in the Y direction; skipped, Maximum allowable machining weight: 4000N, Volume of a main spindle (1); WS/TS (a distinction between the main spindle for a workpiece and the main spindle for a tool): W, Distinction between a constant torque/a constant output with regard to a first region; T, The number of revolutions of the spindle/output; the minimum number of revolutions; 0, Maximum number of revolutions of the spindle: 600 rpm, and an output: 7.5 kW, Distinction between a constant torque/a constant output with regard to a second region; skipped, Volume of a main spindle (2); WS/TS (a distinction between the main spindle for a workpiece and the main spindle for a tool): T, Distinction between a constant torque/a constant output with regard to the first region; T, The number of revolutions of the spindle/output; the minimum number of revolutions; 10 rpm, Maximum number of revolutions of the spindle: 1000 rpm, and an output: 3.7 kW, Distinction between a constant torque/a constant output with regard to the second region; skipped, Mechanical efficiency; (1): 0.85, and (2): 0.95, Rigidity of the main spindle (1);

in the axial direction: maximum allowable load: 8000N, and rigidity: 0.001 $\mu$m/N, in the radial direction; maximum allowable load: 4000N, and rigidity: 0.001 $\mu$m/N, Rigidity of the main spindle (2);

in the axial direction: maximum allowable load: 3000N, and rigidity: 0.001 $\mu$m/N, in the radial direction; maximum allowable load: 3000N, and rigidity: 0.001 $\mu$m/N, Rigidity of a tailstock (1); maximum allowable load in the axial direction: 4000N, rigidity in the axial direction: 0.001 $\mu$m/N, and maximum allowable load in the radial direction: 4000N, and rigidity in the radial direction: 0.001 $\mu$m/N, Rigidity of a tailstock (2); skipped, Maximum allowable depth of cut×feed rate;

the main spindle (1): the depth of cut: 2 mm, and a feed rate per revolution: 1.5 mm/rev., and the main spindle (2): skipped, Specifications for the number of revolutions of the main spindle (1);

Upon entry of the previous number of revolutions of the main spindle, the previous maximum and minimum number of revolutions of the main spindle are automatically copied and input to an entry column with regard to the maximum and minimum number of revolutions of the first main spindle (1).

Maximum number of revolutions: 600 rpm, and minimum number of revolutions: 0,

Presence/absence of a gearshift: 1,

Distinction between the automatic gearshift and the manual gearshift: skipped,

Specifications for the number of revolutions of the main spindle (2);

Upon entry of the previous number of revolutions of the main spindle, the previous maximum and minimum number of revolutions of the main spindle are automatically copied and input to an entry column with regard to the maximum and minimum number of revolutions of the second main spindle (2).

Maximum number of revolutions: 1000 rpm, and minimum number of revolutions: 10 rpm, Presence/absence of a gearshift: 1, Rapid traverse speed (1); X: 0.05 m/min., Y: 0.05 m/min., Z: 0.05 m/min., A: 5 degrees/min., B: skipped, and C: 0 degrees/min., Rapid traverse speed (2); skipped, Minimum cutting speed (1); X: 0.05 m/min., Y: 0.05 m/min., Z: 0.05 m/min., A: 5 degrees/min., B: skipped, and C: 0 degrees/min., Minimum cutting speed (2); skipped, Maximum cutting speed (1); X: 5 m/min., Y: 5 m/min., Z: 5 m/min., A: $10\times10^3$ degrees/min., B: skipped, and C: $216\times10^3$ degrees/min., Maximum cutting speed (2); skipped, Feed power·efficiency (1); X: 1 kW, 0.951η, Y: 1 kW, 0.95η, Z: 2 kW, 0.95η, A: 0.5 kW, 0.95η, B: skipped, and C: 1 kW, 0.95η, Feed power·efficiency (2); skipped, Unit of feeding: a distinction between mm/rev. or mm/min. (1); X: 2, Y: 2, and Z: 1, A: 2, B: skipped, and C: 2, Unit of feeding: a distinction between mm/rev. or mm/min. (2); skipped, Tool replacement (1); replacement of a pot number/a tool number: N, and the number of tools: 5, Tool replacement (2); skipped, Accuracy of a machine; the extent of a tolerance: 0.008 mm, a finishing symbol: 3H, the roughness of a finished surface: 6.3 $\mu$m, straightness: skipped, flatness: skipped, circularity: skipped, cylindricity: 0.010 mm, parallelism: skipped, perpendicularity: skipped, concentricity: 0.005 mm, and runout: 0.005 mm, Special (conditional) accuracy of the machine; skipped, Segment of finishing allowance volume: skipped, Standard operation time of a machine tool; the time required to replace a fixture with another one: 0.1 hrs, the time required to set the coordinates of a workpiece: 0.05 hrs, the time required to set a tool: 0.2 hrs, the time required to replace the workpiece with another one: 0.03 hrs, and the time required to replace the tool with another one: 0.001 hrs, Tip replacement: skipped, Special master file relating to a cutting operation; skipped, Special master file relating to a drill/a tap; maximum diameter of a drill: skipped, Special master file relating to a milling operation; skipped, Allowable size of a fixture; maximum diameter: 75 mm, and maximum length: 150 mm, Starting/stopping time of the main spindle (1: 0.0012 hrs, and 2: skipped): Positioning time for rapid traverse (1; X: 0.00006 hrs, Y: 0.00006 hrs, Z: 0.00006 hrs, and 2; skipped, A: 0.00006 hrs, B: 0.00006 hrs, and C: skipped), tailstock operating time (forward travel of a work clamp; 1: 0.0006 hrs, 2: skipped, and backward travel of the work clamp; 1: 0.0006 hrs, 2: skipped), cooling unit starting/stopping time (a: 0.0006 hrs, and 2: skipped)

The entry of the hobbing function file is now completed.

An example of the entry of a file having a sequence number 2009 with regard to an outside diameter grinding operation will now be described.

Sequence number: 2009,

Machining function: GE,

Machine identification number: XGE001,

Distinction between the absolute value and an increment (Abs/Inc): 1 (selection of the G code), Least input increment; X: 0.1 μm, Y: 0.1 μm, Z: 0.1 μm, A: skipped, B: skipped, and C: 0.001 degrees, Maximum travel distance; X: 400 mm, Y: 150 mm, Z: 1500 mm, A: skipped, B: skipped, and C: ±∞degree, Fixed origin; X: +300 mm, Y: +75 mm, Z: +1500 mm, A: skipped, B: skipped, and C: 0 degrees, Machinable dimensions; Max. X: 300 mm, Min. X: 0, Max. Y: 75 mm, Min. Y: 0, Max. Z: 1500 mm, Min. Z: 0, Max. A: skipped, Min. A: skipped, Max. B: skipped, Min. B: skipped, and Max. C: ∞degree, Min. C: 0, Center-to-center distance; Max. X: 1500 mm, Min. Z: 0, Limit of machining a gradient hole in the X direction; skipped, Limit of machining a gradient hole in the Z direction; skipped, Limit of machining a gradient hole in the Y direction; skipped, Maximum allowable machining weight: 4000N, Volume of a main spindle (1); WS/TS (a distinction between the main spindle for a workpiece and the main spindle for a tool): W, Distinction between a constant torque/a constant output with regard to a first region; T, The number of revolutions of the spindle/output; the minimum number of revolutions; 10 rpm, Maximum number of revolutions of the spindle: 100 rpm, and an output: 2.2 kW, Distinction between a constant torque/a constant output with regard to a second region; W, The number of revolutions of the spindle/output; the minimum number of revolutions; 100 rpm, Maximum number of revolutions of the spindle: 800 rpm, and an output: 2.2 kW, Volume of a main spindle (2); WS/TS (a distinction between the main spindle for a workpiece and the main spindle for a tool): T, Distinction between a constant torque/a constant output with regard to the first region; W, The number of revolutions of the spindle/output; the minimum number of revolutions; 990 rpm, Maximum number of revolutions of the spindle: 4000 rpm, and an output: 45 kW, Distinction between a constant torque/a constant output with regard to the second region; skipped, Mechanical efficiency; (1): 0.85, and (2): 0.98, Rigidity of the main spindle (1);

in the axial direction: maximum allowable load: 6000N, and rigidity: 0.001 μm/N, in the radial direction; maximum allowable load: 30000N, and rigidity: 0.001 μm/N, Rigidity of the main spindle (2);

in the axial direction: maximum allowable load: 6000N, and rigidity: 0.001 μm/N, in the radial direction; maximum allowable load: 30000N, and rigidity: 0.001 μm/N, Rigidity of a tailstock (1); maximum allowable load in the axial direction: 6000N, rigidity in the axial direction: 0.001 μm/N, and maximum allowable load in the radial direction: 30000N, and rigidity in the radial direction: 0.001 μm/N, Rigidity of a tailstock (2); skipped, Maximum allowable depth of cut×feed rate;

the main spindle (1): skipped, and the main spindle (2): skipped,

Specifications for the number of revolutions of the main spindle (1);

Upon entry of the previous number of revolutions of the main spindle, the previous maximum and minimum number of revolutions of the main spindle are automatically copied and input to an entry column with regard to the maximum and minimum number of revolutions of the first main spindle (1).

Maximum number of revolutions: 800 rpm, and minimum number of revolutions: 10 rpm, Presence/absence of a gearshift: 1, and Distinction between the automatic gearshift and the manual gearshift: skipped, Specifications for the number of revolutions of the main spindle (2);

Upon entry of the previous number of revolutions of the main spindle, the previous maximum and minimum number of revolutions of the main spindle are automatically copied and input to an entry column with regard to the maximum and minimum number of revolutions of the second main spindle (2).

Maximum number of revolutions: 4000 rpm, and minimum number of revolutions: 990 rpm, Presence/absence of a gearshift: 1, and Distinction between the automatic gearshift and the manual gearshift: skipped, Rapid traverse speed (1); X: 5 m/min., Y: 5 m/min., Z: 15 m/min., A: skipped., B: skipped, and C: $288\times10^3$ degrees/min., Rapid traverse speed (2); skipped, Minimum cutting speed (1); X: 0 m/min., Y: 0 m/min., Z: 0 m/min., A: skipped., B: skipped, and C: 0 degrees/min., Maximum cutting speed (1); X: 5 m/min., Y: 5 m/min., Z: 15 m/min., A: skipped, B: skipped, and C: $288\times10^3$ degrees/min., Minimum cutting speed (2); skipped, Maximum cutting speed (2); skipped, Feed power·efficiency (1); X: 3 kW, 0.95η, Y: 1 kW, 0.95η, Z: 3 kW, 0.95η, A: skipped, B: skipped, and C: 2 kW, 0.95η, Feed power·efficiency (2); skipped, Unit of feeding: a distinction between mm/rev. or mm/min. (1); X: 1, Y: 1, and Z: 1, A: skipped, B: skipped, and C: 1, Unit of feeding: a distinction between mm/rev. or mm/min. (2); skipped, Tool replacement (1); replacement of a pot number/a tool number: N, and the number of tools: 5, Tool replacement (2); skipped, Accuracy of a machine; the extent of a tolerance: 0.001 mm, a finishing symbol: 4G, the roughness of a finished surface: 0.8 μm, straightness: skipped, flatness: skipped, circularity: 0.001 mm, cylindricity: 0.005 mm, parallelism: skipped, perpendicularity: skipped, concentricity: 0.002 mm, and runout: 0.005 mm, Special (conditional) accuracy of the machine; skipped, Segment of finishing allowance volume: skipped, Standard operation time of a machine tool; the time required to replace a fixture with another one: 0.1 hrs, the time required to set the coordinates of a workpiece: 0.05 hrs, the time required to set a tool: 0.2 hrs, the time required to replace the workpiece with another one: 0.03 hrs, and the time required to replace the tool with another one: 0.1 hrs, Tip replacement: skipped, Special master file relating to a cutting operation;

Grinding wheel width; 75 mm,

Minimum cutting width; a constant size cutting operation: 5 mm, an indirect constant size cutting operation: 1 mm, and a cutting operation with a stopping motion: 1 mm, Special master file relating to a drill/a tap; maximum diameter of a drill: skipped, Special master file relating to a milling operation; skipped, Allowable size of a fixture; maximum diameter: 500 mm, and maximum length: 100 mm, Starting/stopping time of the main spindle (1: 0.0012 hrs, and 2: skipped): Positioning time for rapid traverse (1; X: 0.00006 hrs, Y: skipped, Z: 0.00006 hrs, and 2; skipped, A: skipped, B: skipped, and C: skipped), tailstock operating time (forward travel of a work clamp; 1: skipped, 2: skipped, and backward travel of the work clamp; 1: skipped, 2: skipped), cooling unit starting/stopping time (a: 0.0006 hrs, and 2: skipped)

The entry of the file with regard to the outside diameter grinding operation is now completed.

An example of the entry of a file having a sequence number 2010 with regard to an inside diameter grinding operation will now be described.

Sequence number: 2010,

Machining function: GI,

Machine identification number: XGI001,

Distinction between the absolute value and an increment (Abs/Inc): 1 (selection of the G code), Least input increment; X: 0.1 μm, Y: 0.1 μm, Z: 0.1 μm, A: skipped, B: skipped, and C: 0.001 degrees, Maximum travel distance; X: 200 mm, Y: 100 mm, Z: 1500 mm, A: skipped, B: skipped, and C: ±∞degree, Fixed origin; X: +150 mm, Y: +50 mm, Z: +1500 mm, A: skipped, B: skipped, and C: 0 degrees, Machinable dimensions; Max. X: 150 mm, Min. X: 0, Max. Y: 50 mm, Min. Y: 0, Max. Z: 750 mm, Min. Z: 0, Max. A: skipped, Min. A: skipped, Max. B: skipped, Min. B: skipped, and Max. C: ∞degree, Min. C: 0, Center-to-center distance; skipped, Limit of machining a gradient hole in the X direction; skipped, Limit of machining a gradient hole in the Z direction; skipped, Limit of machining a gradient hole in the Y direction; skipped, Maximum allowable machining weight: 1000N, Volume of a main spindle (1); WS/TS (a distinction between the main spindle for a workpiece and the main spindle for a tool): W, Distinction between a constant torque/a constant output with regard to a first region; T, The number of revolutions of the spindle/output; the minimum number of revolutions; 0 rpm, Maximum number of revolutions of the spindle: 150 rpm, and an output: 2.2 kW, Distinction between a constant torque/a constant output with regard to a second region; W, The number of revolutions of the spindle/output; the minimum number of revolutions; 150 rpm, Maximum number of revolutions of the spindle: 800 rpm, and an output: 2.2 kW, Volume of a main spindle (2); WS/TS (a distinction between the main spindle for a workpiece and the main spindle for a tool): T, Distinction between a constant torque/a constant output with regard to the first region; W, The number of revolutions of the spindle/output; the minimum number of revolutions; 990 rpm, Maximum number of revolutions of the spindle: 6000 rpm, and an output: 7 kW, Distinction between a constant torque/a constant output with regard to the second region; W, The number of revolutions of the spindle/output; the minimum number of revolutions; 6000 rpm, Maximum number of revolutions of the spindle: 40000 rpm, and an output: 15 kW, Distinction between a constant torque/a constant output with regard to the second region; skipped, Mechanical efficiency; (1): 0.85, and (2): 0.98, Rigidity of the main spindle (1);
- in the axial direction: maximum allowable load: 6000N, and rigidity: 0.001 μm/N,
- in the radial direction; maximum allowable load: 6000N, and rigidity: 0.001 μm/N, Rigidity of the main spindle (2);
- in the axial direction: maximum allowable load: 3000N, and rigidity: 0.001 μm/N,
- in the radial direction; maximum allowable load: 1500N, and rigidity: 0.001 μm/N, Rigidity of a tailstock (1); skipped, and Rigidity of a tailstock (2); skipped, Maximum allowable depth of cut×feed rate;
- the main spindle (1): skipped, and
- the main spindle (2): skipped, Upon entry of the previous number of revolutions of the main spindle, the previous maximum and minimum number of revolutions of the main spindle are automatically copied and input to an entry column with regard to the maximum and minimum number of revolutions of the first main spindle (1).

Maximum number of revolutions: 800 rpm, and minimum number of revolutions: 0 rpm, Presence/absence of a gearshift: 1, and Distinction between the automatic gearshift and the manual gearshift: skipped, Upon entry of the previous number of revolutions of the main spindle, the previous maximum and minimum number of revolutions of the main spindle are automatically copied and input to an entry column with regard to the maximum and minimum number of revolutions of the second main spindle (2).

Maximum number of revolutions: 40000 rpm, and minimum number of revolutions: 3000 rpm, Presence/absence of a gearshift: 1, and Distinction between the automatic gearshift and the manual gearshift: skipped, Rapid traverse speed (1); X: 5 m/min., Y: 5 m/min., Z: 15 m/min., A: skipped., B: skipped, and C: $288\times10^3$ degrees/min., Rapid traverse speed (2); skipped, Minimum cutting speed (1); X: 0 m/min., Y: 0 m/min., Z: 0 m/min., A: skipped., B: skipped, and C: 0 degrees/min., Minimum cutting speed (2); skipped, Maximum cutting speed (1); X: 5 m/min., Y: 5 m/min., Z: 15 m/min., A: skipped, B: skipped, and C: $288\times10^3$ degrees/min., Maximum cutting speed (2); skipped, Feed power·efficiency (1); X: 2 kW, 0.95η, Y: 1 kW, 0.95η, Z: 2 kW, 0.95η, A: skipped, B: skipped, and C: 2 kW, 0.95η, Feed power·efficiency (2); skipped, Unit of feeding: a distinction between mm/rev. or mm/min. (1); X: 1, Y: 1, and Z: 1, A: skipped, B: skipped, and C: 1, Unit of feeding: a distinction between mm/rev. or mm/min. (2); skipped, Tool replacement (1); replacement of a pot number/a tool number: N, and the number of tools: 5, Tool replacement (2); skipped, Accuracy of a machine; the extent of a tolerance: 0.001 mm, a finishing symbol: 4G, the roughness of a finished surface: 0.8 μm, straightness: skipped, flatness: skipped, circularity: 0.001 mm, cylindricity: 0.003 mm, parallelism: skipped, perpendicularity: skipped, concentricity: 0.002 mm, and runout: 0.005 mm, Special (conditional) accuracy of the machine; skipped, Segment of finishing allowance volume: skipped, Standard operation time of a machine tool; the time required to replace a fixture with another one: 0.1 hrs, the time required to set the coordinates of a workpiece: 0.05 hrs, the time required to set a tool: 0.2 hrs, the time required to replace the workpiece with another one: 0.03 hrs, and the time required to replace the tool with another one: 0.1 hrs, Tip replacement: skipped, Special master file relating to a cutting operation;

Grinding wheel width; 13 mm,

Minimum cutting width; a constant size cutting operation: skipped, an indirect constant size cutting operation: 1 mm, and a cutting operation with a stopping motion: 1 mm, Special master file relating to a drill/a tap; maximum diameter of a drill: skipped, Special master file relating to a milling operation; skipped, Allowable size of a fixture; maximum diameter: 50 mm, and maximum length: 750 mm, Starting/stopping time of the main spindle (1: 0.0012 hrs, and 2: skipped): Positioning time for rapid traverse (1; X: 0.00006 hrs, Y: 0.00006 hrs, Z: 0.00006 hrs, and 2; skipped, A: skipped, B: skipped, and C: 0.00006 hrs), tailstock operating time (forward travel of a work clamp; 1: skipped, 2: skipped, and backward travel of the work clamp; 1: skipped, 2: skipped), cooling unit starting/stopping time (a: 0.0006 hrs, and 2: skipped)

The entry of the file with regard to the inside diameter grinding operation is now completed.

File relating to a mounting method:

The file relating to a mounting method is classified into a fixture file for a turning system, a fixture file for a milling system, and a fixture file for a cutting system. In the present embodiment, fixture files including a file for the turning system, the file for the milling system, and a file for the cutting system (external cutting/internal cutting) will be described.

As shown in FIGS. 73 to 76, an input format of the fixture file comprises a sequence number, chucking volume [classification of pawls into segments according to their volume (The chucking volume is displayed by combination of an area to be chucked with a decision as to whether the chucking portion rotates or is stationary. For example, the chucking volume is designated as RE: rotary pawls for chucking the external circumference of a workpiece. Symbols and their functions are as follows: R: rotary pawls/S: stationary pawls, E: pawls that chuck the external circumference of a workpiece, I: pawls that chuck the internal circumference of a workpiece, P: pawls using a metal presser, and D: pawls using a driving pin)], a machine identification number, the maximum/minimum chucking sizes, the number of chucking pawls, a distinction between equally spaced pawls/inequally spaced pawls, split angles (1, 2, 3, and 4) between inequally spaced pawls, which are applicable only to the inequally spaced pawls, a stroke of the pawl (a single pawls of the pawls), a distinction between the synchronous/asynchronous actuation of the pawls, the amount of positional shift of the pawls, the directions of the pawls (i.e., the directions in which the pawls are actuated), the distances between the reference position of the machine and the reference positions of the pawls (in the X, Y, and Z directions), a pawl width, a pawl height, through-hole specifications (a hole diameter, and the depth of the hole), classification of the pawls into segments according to their shape, size, and volume [i.e., X; the coordinates of the starting point, the coordinates of the end point, and volume (a segment of volume), Z; the coordinates of the starting point, and the coordinates of the end point. If the directions of the pawls, that is, the directions in which the pawls are actuated, are specified, X; the coordinates of the starting and end points, and the volume of the pawls which are the same as they are described in the input format, Y: a difference obtained as a result of subtracting X from Y, and Z: a difference obtained as a result of subtracting Y from Z, and a difference obtained as a result of subtracting X from Z], the positions of the pawls and the direction in which the pawls are actuated to press an object, according to a pressing method using metal pressers (i.e., the directions in which the pawls are actuated, and the reference positions of the pawls: X, Z), and a fixture identification number.

If there are a number of fixtures having an identical machine identification number, the respective sequence numbers of the fixtures are changed to new ones, and the thus updated sequence numbers are input. Tools are selected by means of the segment of the chucking volume and the maximum/minimum chucking size, using a graphical input as a keyword.

The file for the turning system requires entry in such items as shown in FIGS. 73 to 76, namely, a sequence number, chucking volume [classification of pawls into segments according to their chucking volume (that is, R: rotary pawls, S: stationary pawls, E: pawls that chuck the external circumference of a workpiece, I: pawls that chuck the internal circumference of a workpiece, P: pawls using a metal presser, and D: pawls using a driving pin)], a machine identification number, the maximum/minimum chucking sizes, the number of chucking pawls, a distinction between equally spaced pawls/unequally spaced pawls, split angles between the unequally spaced pawls (1, 2, 3, and 4), a stroke of the pawl (a single pawl of the pawls), a distinction between the synchronous/asynchronous actuation of the pawls, the amount of positional shift of the pawls, the direction of the pawls (i.e., the directions in which the pawls are actuated), the distance (X, Y, and Z) between the reference position of the machine and the reference positions of the pawls, a pawl width, a pawl height, through-hole specifications (diameter and depth of the hole), classification of the pawls into segments according to their shape, size, and volume [i.e., X; the coordinates of the starting point, the coordinates of the end point, the volume of the pawls (a segment of volume), Z; the coordinates of the starting point, and the coordinates of the end point], the positions of the pawls and the directions in which the pawls are actuated to press an object, according to a pressing method using metal pressers (i.e., the directions of the pawls, and the reference positions of the pawls: X, Z), and a fixture identification number.

The result of the entry of these items is shown in FIGS. 73 to 76.

The file for the milling system requires entry in such items as shown in FIGS. 73 to 76, namely, a sequence number, chucking volume [classification of pawls into segments according to their chucking volume (that is, R: rotary pawls, S: stationary pawls, E: pawls that chuck the external circumference of a workpiece, I: pawls that chuck the internal circumference of a workpiece, P: pawls using a metal presser, and D: pawls using a driving pin)], a machine identification number, the maximum/minimum chucking sizes, the number of chucking pawls, a distinction between equally spaced pawls/unequally spaced pawls, split angles between the unequally spaced pawls (1, 2, 3, and 4), a stroke of the pawl (i.e., a single piece of the pawls), a distinction between the synchronous/asynchronous actuation of the pawls, the amount of positional shift of the pawls, the directions of the pawls (that is, the directions in which the pawls are actuated), the distances between the reference position of the machine and the reference positions of the pawls (in the X, Y, and Z directions), a pawl width, a pawl height, through-hole specifications (the diameter and depth of the hole), classification of the pawls into segments according to their shape, size, and volume [i.e., X; the coordinates of the starting point, the coordinates of the end point, and the volume of the pawls (a segment of volume), Z; the coordinates of the starting point, and the coordinates of the end point], the positions of the pawls and the directions in which the pawls are actuated according to a pressing method using a metal presser (the directions of the pawls, and the reference positions of the pawls: X, Z), and a fixture identification number.

The result of the entry of these items is shown in FIGS. 73 to 76.

In the case of cylindrical machining a workpiece while being supported at its double center holes, the file for the cutting system requires entry in such items as shown in FIGS. 73 to 76, namely, a sequence number, chucking volume [classification of pawls into segment according to their chucking volume (i.e., R: rotary pawls, and D: pawls using a driving pin)), a machine identification number, the maximum/minimum chucking sizes, and a fixture identification number.

In the case of grinding the internal or external diameter of the workpiece while being chucked, the file requires entry in such items as shown in FIGS. 73 to 76, namely, a sequence number, chucking volume [classification of pawls into segments according to their chucking volume (i.e., R: rotary pawls, S: stationary pawls, E: pawls that chuck the external circumference of a workpiece, I: pawls that chuck the inside circumference of a workpiece, P: pawls using a metal presser, and D: pawls using a driving pin)], a machine identification number, the maximum/minimum chucking sizes, the number of chucking pawls, a distinction between equally spaced pawls/unequally spaced pawls, split angles between the unequally spaced pawls (1, 2, 3, and 4), a stroke of the pawl (i.e., a single pawl of the pawls), a distinction between the synchronous/asynchronous actuation of the pawls, the amount of positional shift of the pawls, the directions of the pawls (the directions in which the pawls are actuated), the distances between the reference position of the machine and the reference positions of the pawls (in the X, Y, and Z directions), a pawl width, a pawl height, through-hole specifications (the diameter and depth of the hole), classification of the pawls into segments according to their shape, size, and volume [i.e., X; the coordinates of the starting point, the coordinates of the end point, and the volume of the pawls (a segment of volume), Z; the coordinates of the starting point, and the coordinates of the end point], the positions of the pawls and the directions in which the pawls are actuated, according to a pressing method using a metal presser (the directions of the pawls, and the reference positions of the pawls: X, Z), and a fixture identification number.

The result of the entry of these items is shown in FIGS. 73 to 76.

Cost File:

A cost file is used as basic data when calculating machining costs. An example of the basic data are shown in FIG. 140.

The details of the cost file are as follows:

a machine identification number, a personnel cost; wedge: Wo, a machine tool cost; a machine charge: Cm, a running cost; a running charge: Cr, a tool cost; a tool charge: Ct, a "throw-away tip": Cts, an end mill: Ctd, a drill: Ctd, a side cutter: Cts, a hob, Cth, a reamer, Ctr, a grinding wheel for machining an external diameter: Ctg, a grinding wheel for machining an internal diameter: Cti, and other expenditures. Co, This cost file comprises results obtained as a result of converting the costs into hourly expenses.

According to another method, initial costs such as the cost for purchasing machine tools, annual expenses, and working conditions (for example, annual uptime, the presence or absence of working shifts, a working shift pattern, and a pattern of days off) are added to the above mentioned items, and they are input in a tabular form. Using an expression for calculating hourly expenses, costs are obtained on the basis of the data in the file.

An example of the data is shown in FIG. 140.

Material File:

As shown in FIG. 124, a material file comprises items such as the JIS codes, the presence or absence of heat treatment, a tensile strength, a hardness, and the resistance of a workpiece. The entry for this file according to the present example is shown in the drawing. This file has a format which makes it possible to read numerical values of a variety of items using the JIS codes as keywords.

File with regard to Finishing Allowance (Cutting allowance, and finishing allowance):

FIGS. 120 to 123 show specific examples of a finishing allowance. The finishing allowance is classified whether or not a workpiece includes an external diameter, an internal diameter, and a thermal refining allowance. The file is provided with a format which makes it possible to read a cutting allowance per diameter by means of the combinations of a diameter and a length.

With regard to a finishing allowance of rod material, it is possible to obtain the finished length of a product, end faces corresponding to the diameter of the finished product, and a finishing allowance for an external machining.

Machining Method File (A file or an automatic cutting path determination method which automatically determines a cutting path):

As a result of macroscopic evaluation of an input material shape, a finished shape, and material, the machining method that has a proven track record for a particular machining operation is read from the file on the basis of determination data on the direction of removal. The thus read machining method is used.

The machining method file holds a ratio of D/L (a ratio of a diameter to a length), a cutting allowance in the X direction, a cutting allowance in the Z direction, the direction of removal, material shape data, and finished shape data. Data on machining methods associated with these data items are stored in this file.

Threading methods: a driving method, a relieving method, and a combined driving method A threading method comprises methods for forming a screw-thread on material, such as a driving method, a relieving method, and a combined driving method.

According to the driving method, cuts, which are identical with the cut already made in material to form a spiral ridge, is created in a screw thread in the direction orthogonal to the traverse direction of the ridge (for example, in the case of an external thread, cuts are formed in the ridges in the X axis). Each of the cuts is set so as to provide the ridge with an equivalent cross sectional area.

According to the relieving method, a cut is spirally formed in material while a front cutting edge faces the front end of the material and is inclined at a rear half angle with respect to the traverse direction of material to be threaded in the direction of the front end of the material. Finally, the thread formed at the rear half angle is finished while a tool is moved to the front end of the material.

Needless to say, the cut is formed so as to provide the ridge with an equivalent cross sectional area even in the case of this method.

The combined driving method comprises the features of both the driving method and the relieving method. A thread is formed in material while the cutting edge is alternatively inclined at a front half angle and a rear half angle with respect to the traverse direction of the material in the front end direction of the same.

Even in the case of this method, the cut is formed so as to provide the ridge with an equivalent cross sectional area.

Cutting Condition File:

FIGS. 128 to 136 show an example of a cutting condition file corresponding to an input pattern. As shown in the drawings, a variety of conditions, such as a cut rate, the depth of cut, and a feed rate, are stored in this file with regard to a turning operation, a side cutting operation, an end milling operation, a drilling operation, a tapping operation, a reaming operation, and a hobbing operation. In this file, the respective materials of a workpiece and a tool are used as keywords. The cutting condition file is arranged in such a way as to make it possible to read machining conditions using the workpiece material and the tool material.

As regards the tool materials of the cutting condition file, it is extremely difficult for the cutting condition file to cope with all types of tool code for each manufacturer. For this reason, the tool materials of the cutting condition file are displayed in compliance with the ISO.

Input tool materials are translated into tool materials in compliance with the cutting condition file by the cutting condition file even if codes defined by each manufacture are used. This provides a certain degree of freedom when preparing a tool file.

To encompass all the continuous numerical values, it is necessary for the cutting condition file to have an enormous storage capacity. To prevent this, the file is provided with only specific conditional numerical values. Using Fuzzy Logic, cutting conditions are obtained by substituting given numerical values of a sequence of points into an interpolation equation or a tool life calculation expression. It is desirable that standardized codes be used as workpiece material codes and tool material codes in the cutting condition file. Hence, if it is necessary to use specific codes in the file, the cutting condition file is provided with a translation table so as to be able to cope with all the possible standards. In this way, in the present example, the cutting condition file is provided with a translation table, which allows manufacturers or end users to freely prepare material data and to change, modify, and add the contents of the file.

These operations are as follows:

A desired file is selected on a screen, and a cursor is moved to a column which requires modification. Unnecessary data are deleted, and updated data are input to the column. Thus, the change, modification, and addition of the contents of the file are carried out by repeating the updating action or by inputting additional data into a blank column.

Surface Treatment File:

As exemplarily shown in FIG. 137, a surface treatment file comprises the JIS codes and items, such as dimensions which change as a result of the surface treatment, and surface treatment symbols are used as keywords in this file.

The data of this surface treatment file make it possible to obtain a suitable JIS processing procedure and variable sizes by means of a pictorially input surface treatment symbol, and the thus obtained procedure and the sizes are used when processing a finishing size or when setting a process.

Thermal Refining File:

As exemplarily shown in FIG. 138, the thermal refining file comprises the details of thermal treatment, the designation of a hardness, and applicable materials. In this file, heat treatment symbols are used as keywords.

This thermal refining file is used in setting a process, checking an erroneous hardness input and errors in an applicable material, and in selecting machining conditions.

Graphics File:

A graphics file is classified into a dimensional tolerance file, a screw shape file, and a shape file.

Figure 111:
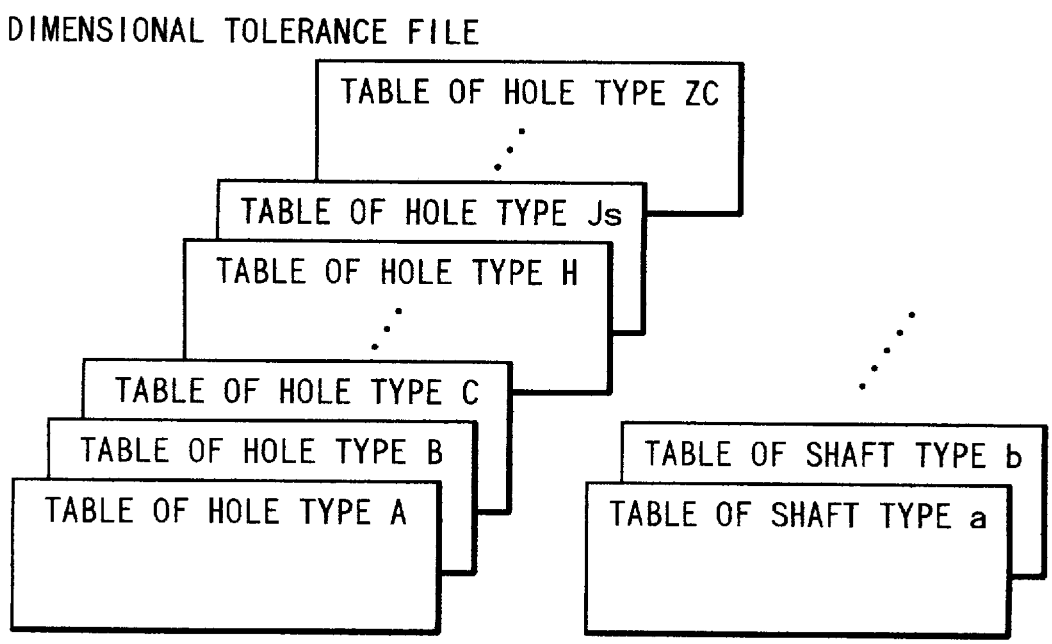
FIG. 111 is a descriptive drawing showing a tolerance file according to one embodiment of the present invention.

Dimensional Tolerance File:

FIGS. 111 and 112 show an example of the dimensional tolerance file. FIGS. 113 to 115 show an example of a basic tolerance file according to another method. An example of a tolerance calculation equation is shown by expressions (2) to (8) which will be described later.

The dimensional tolerance file comprises upper tolerances and lower tolerances, and tolerance symbols in compliance with the ISO standard are used as keywords.

A basic file and a file used with the tolerance calculation equation are made up of: a table of basic tolerances (upper tolerances or lower tolerances) shown in FIG. 113, an IT basic tolerance table shown in FIG. 114, and a table of IT tolerance grade differences shown in FIG. 115. Basic numerical values that provide a reference are stored in this file by means of tolerance symbols, dimensions, and tolerance grades.

Figure 89:
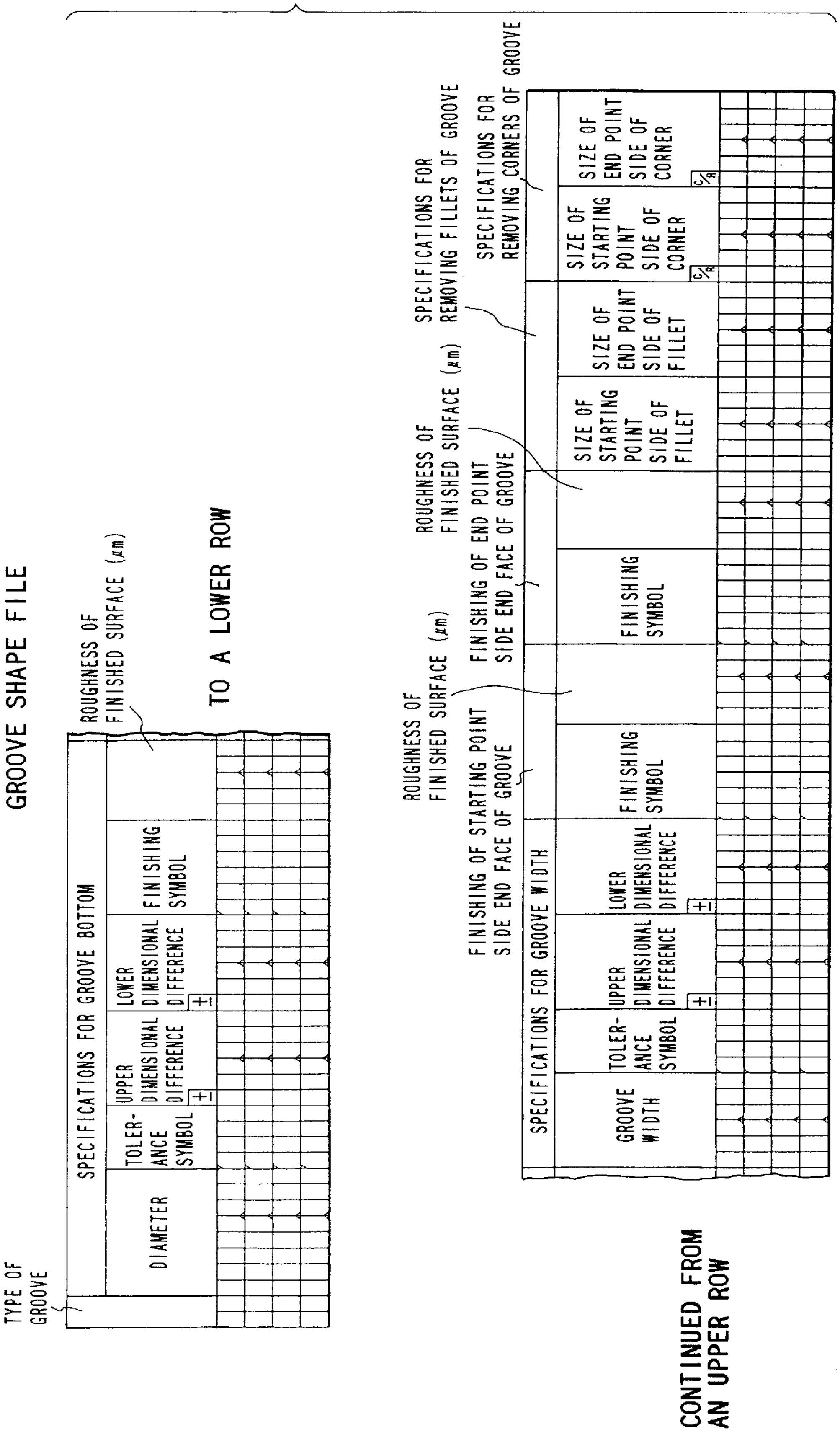
FIG. 89 is a descriptive drawing showing a groove pattern file format according to one embodiment of the present invention.
Figure 91:
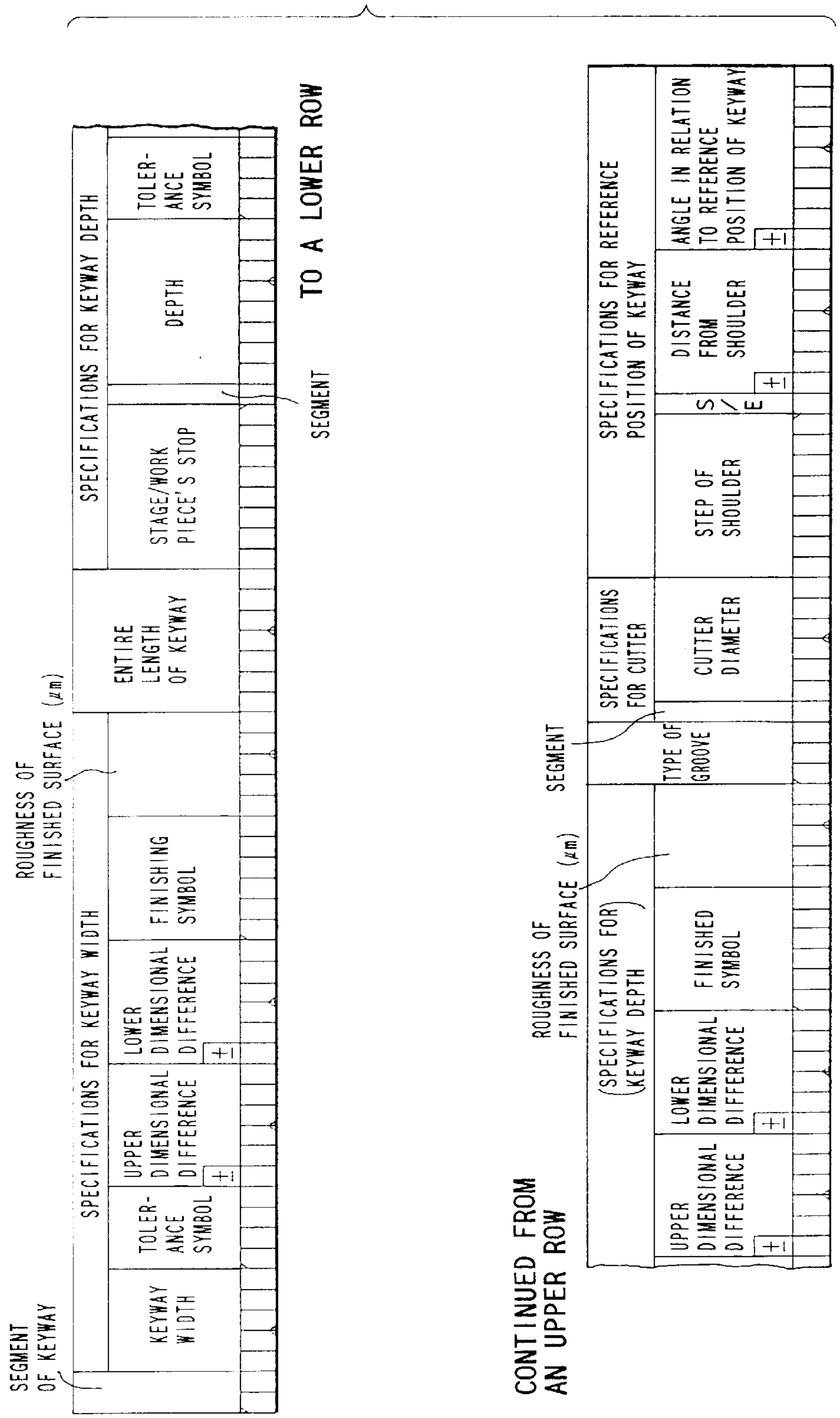
FIG. 91 is a descriptive drawing showing a keyway pattern file format according to one embodiment of the present invention.
Figure 92:
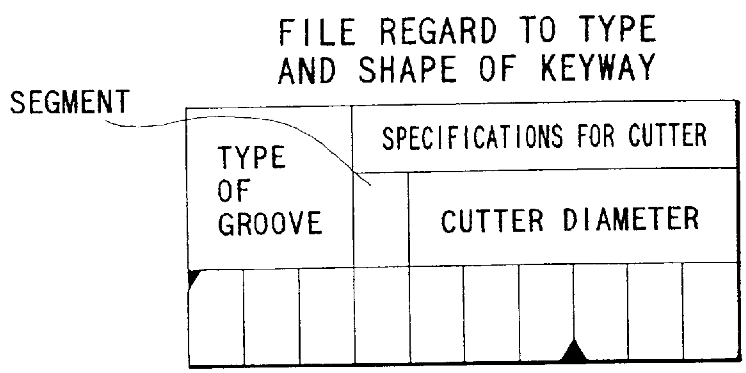
FIG. 92 is a descriptive drawing showing a pattern file format of the type and shape of a keyway according to one embodiment of the present invention.
Figure 93:
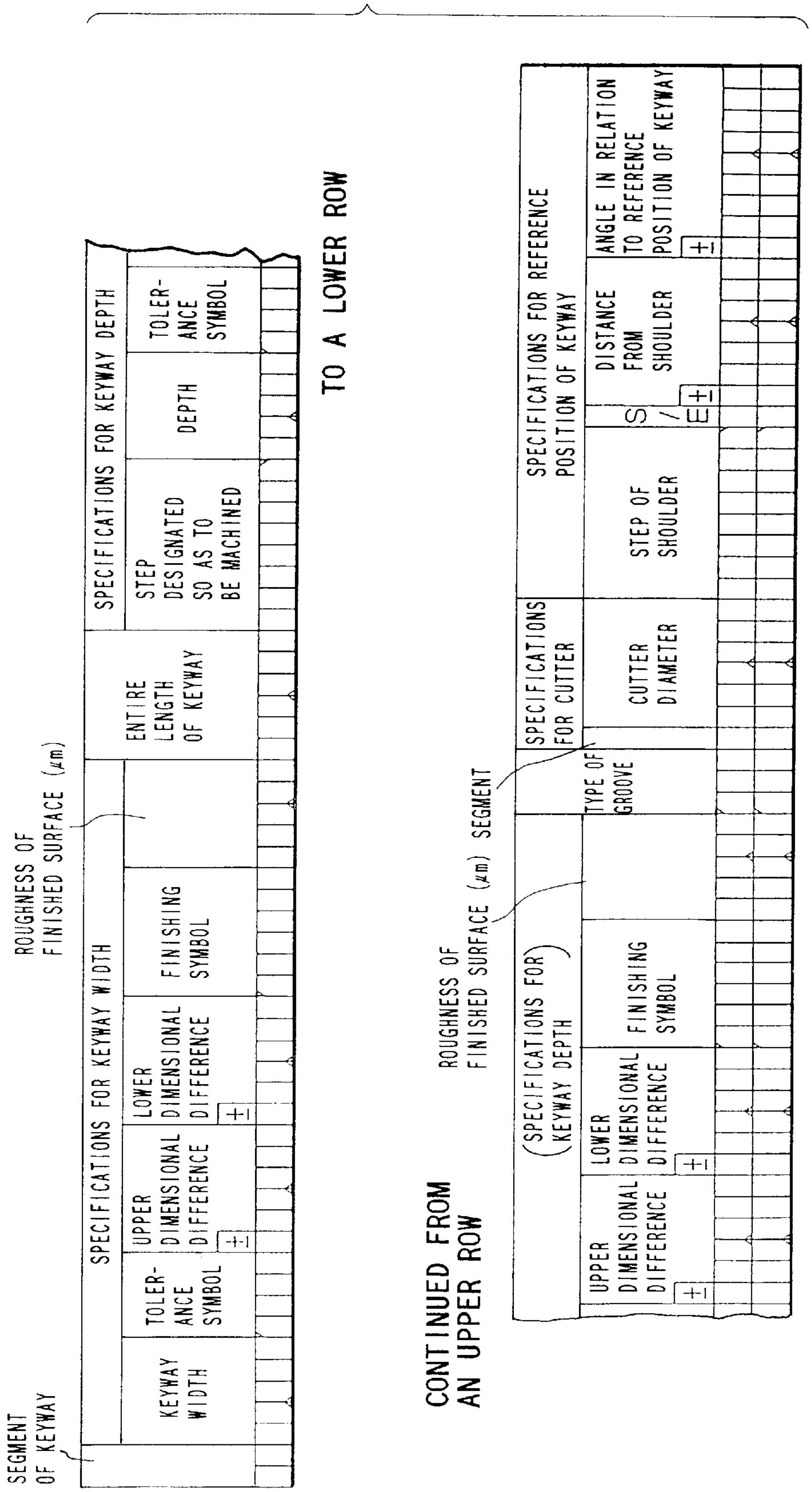
FIG. 93 is a descriptive drawing showing an end-face keyway pattern file format according to one embodiment of the present invention.
Figure 95:
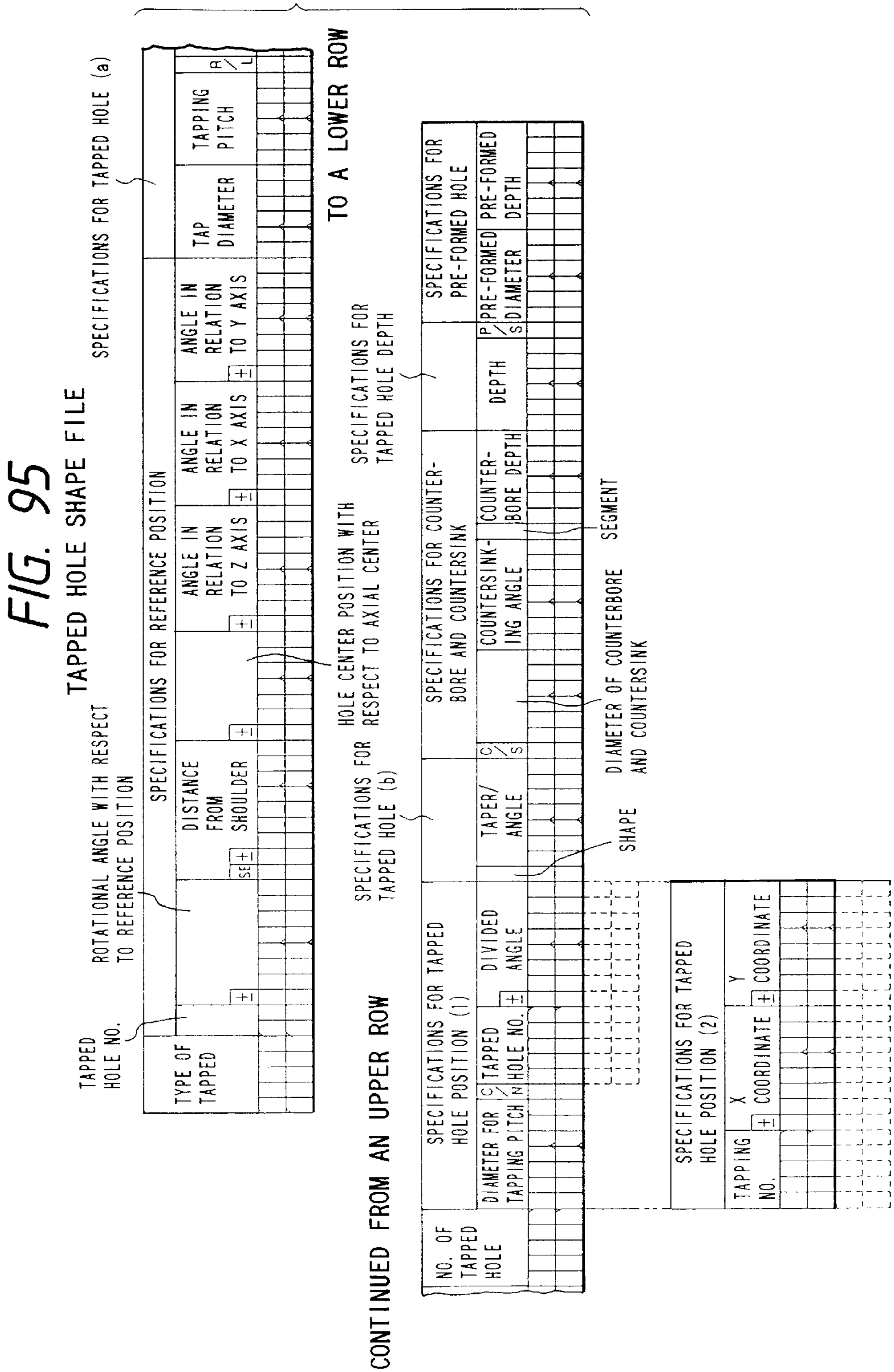
FIG. 95 is a descriptive drawing showing an internal cam pattern file format according to one embodiment of the present invention.
Figure 97:
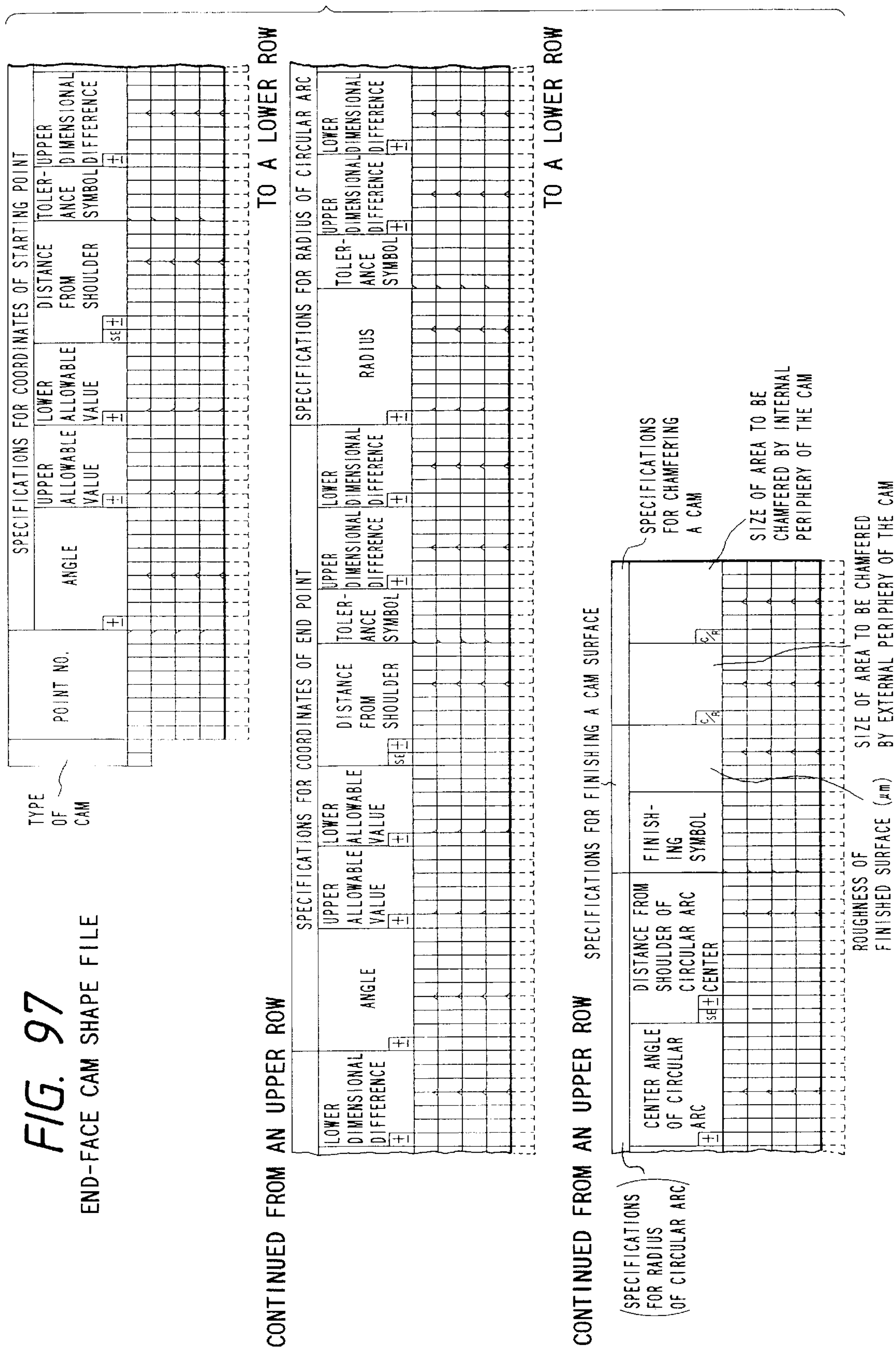
FIG. 97 is a descriptive drawing showing an end-face cam pattern file format according to one embodiment of the present invention.
Figure 99:
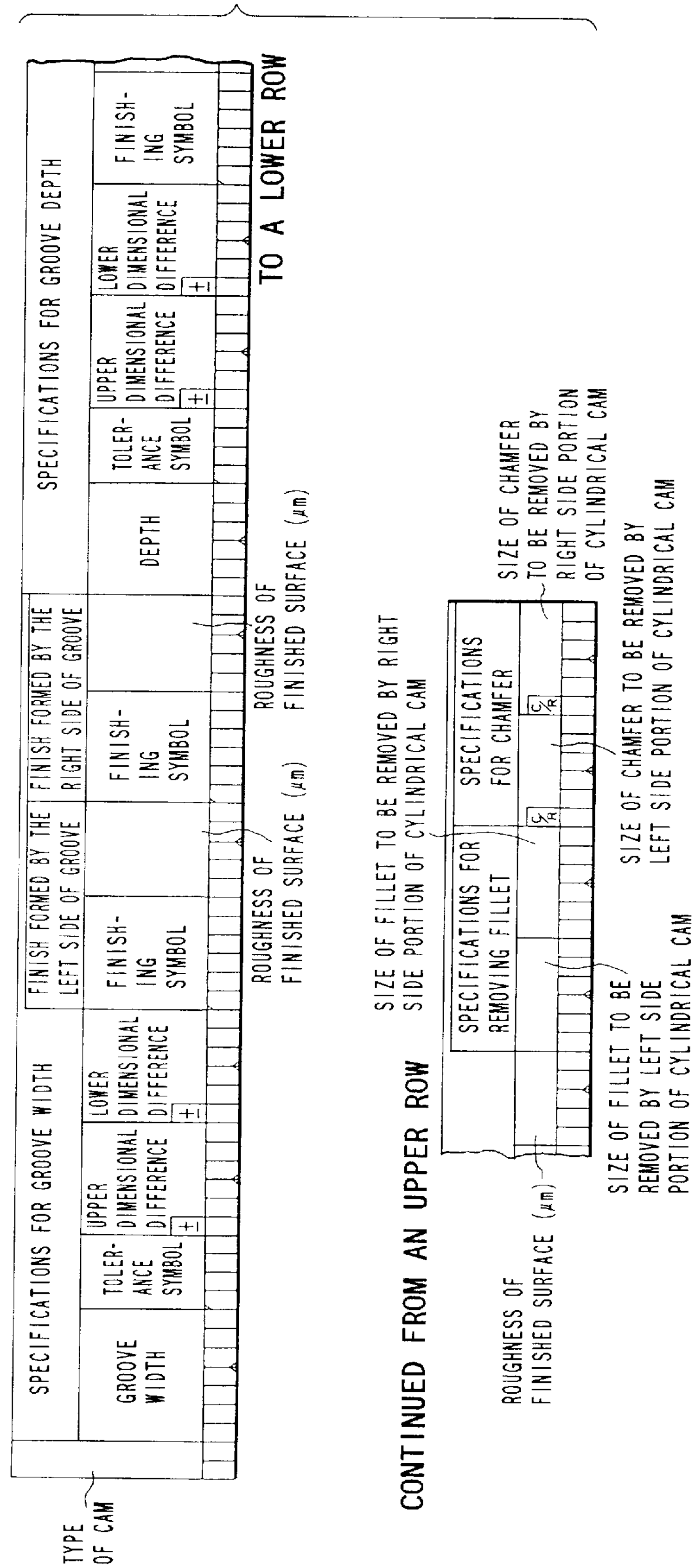
FIG. 99 is a descriptive drawing showing a groove pattern file format of a grooved cylindrical cam according to one embodiment of the present invention.
Figure 100:
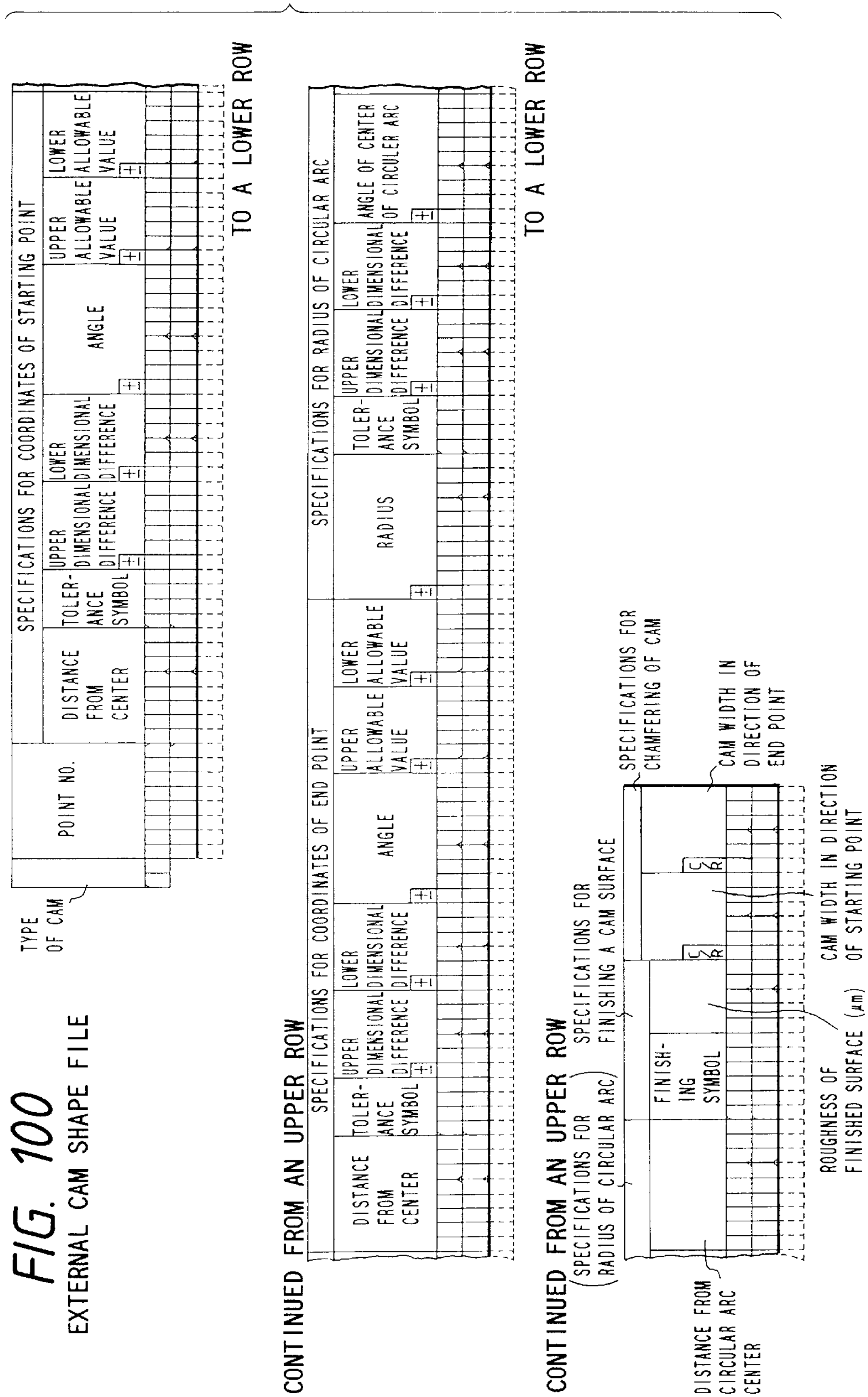
FIG. 100 is a descriptive drawing showing a pattern file format of an external cam according to one embodiment of the present invention.
Figure 101:
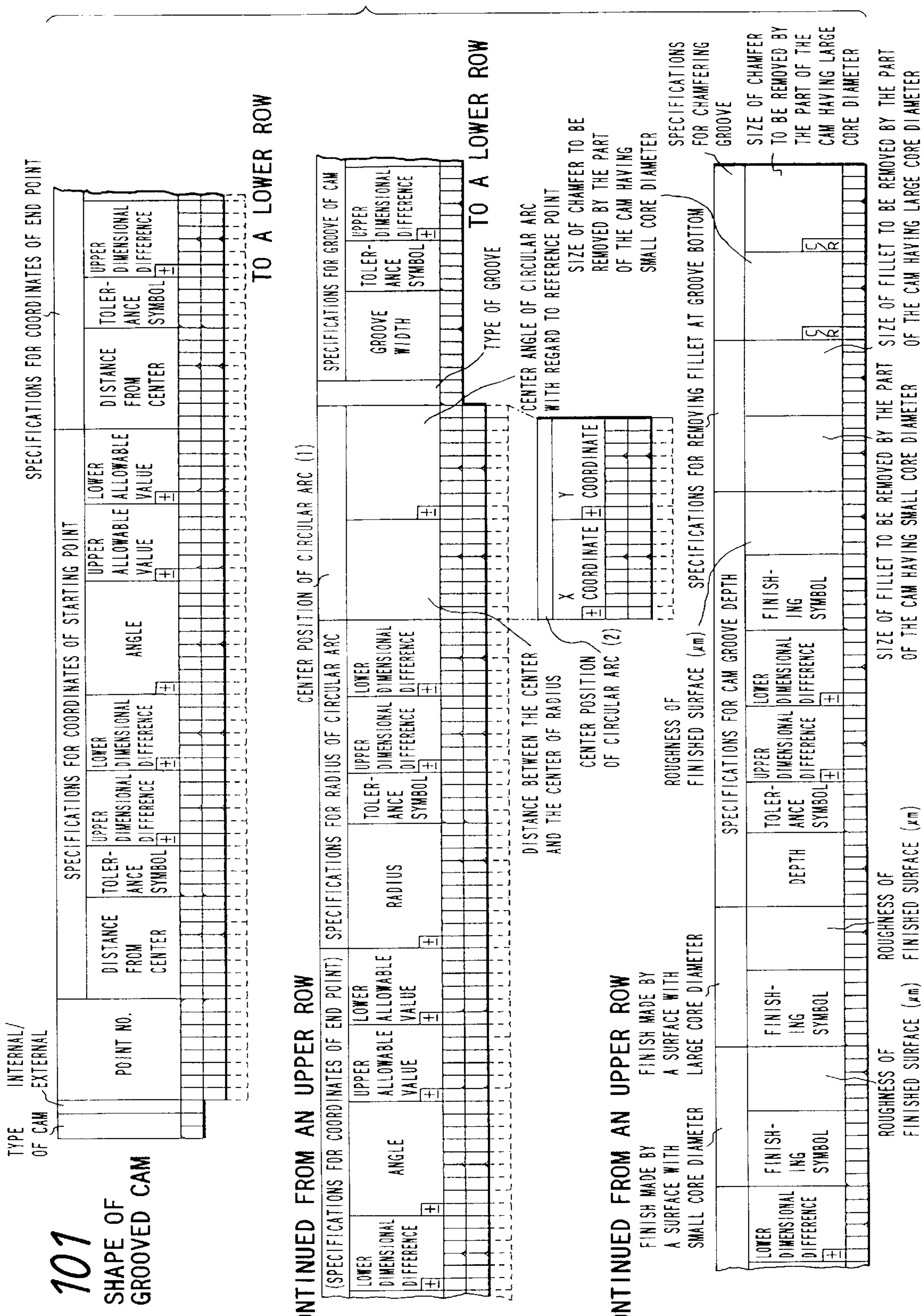
FIG. 101 is a descriptive drawing showing a pattern file format of an end-face grooved cam according to one embodiment of the present invention.
Figure 102:
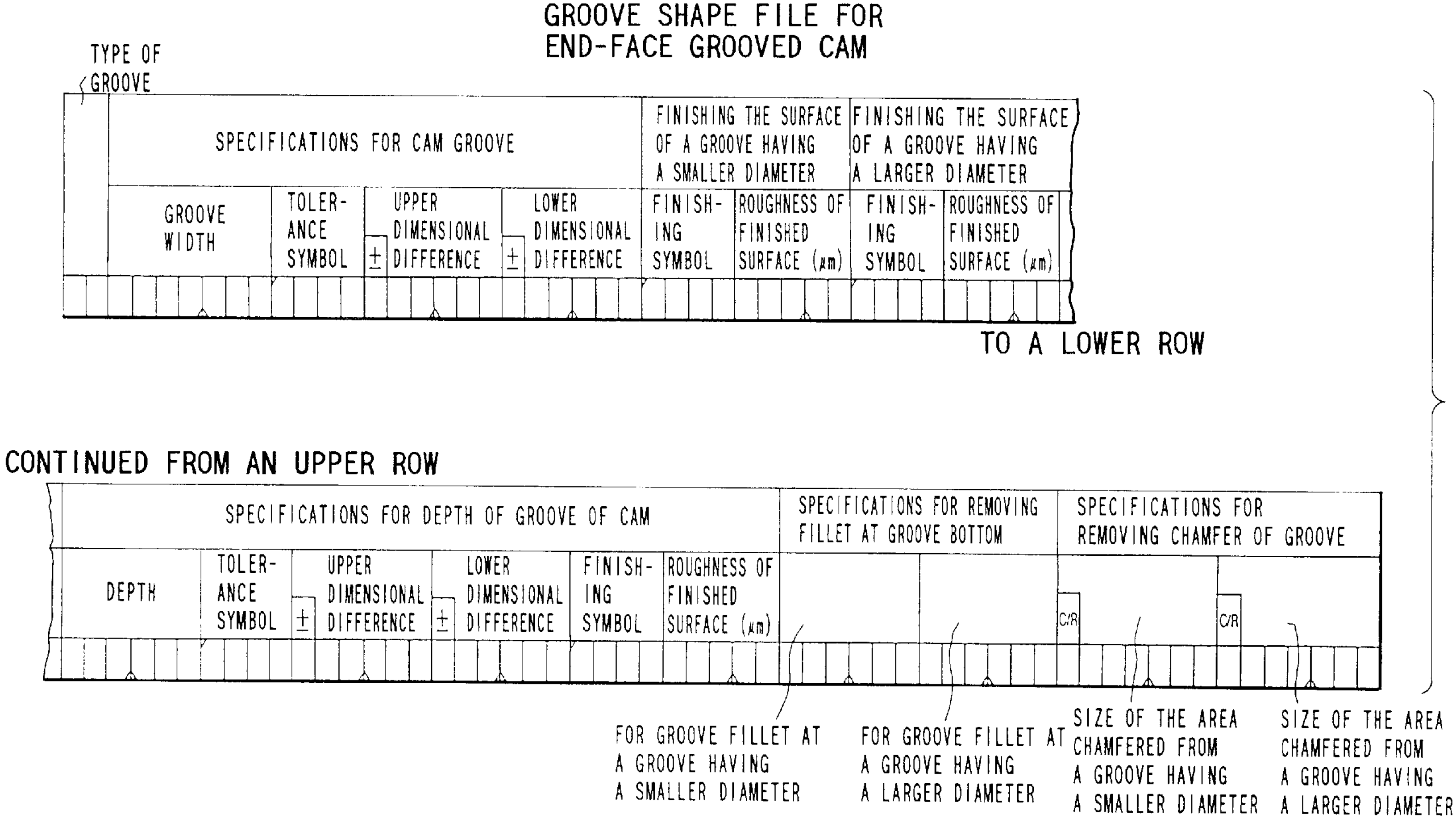
FIG. 102 is a descriptive drawing showing a groove pattern file format of an end-face groove cam according to one embodiment of the present invention.
Figure 103:
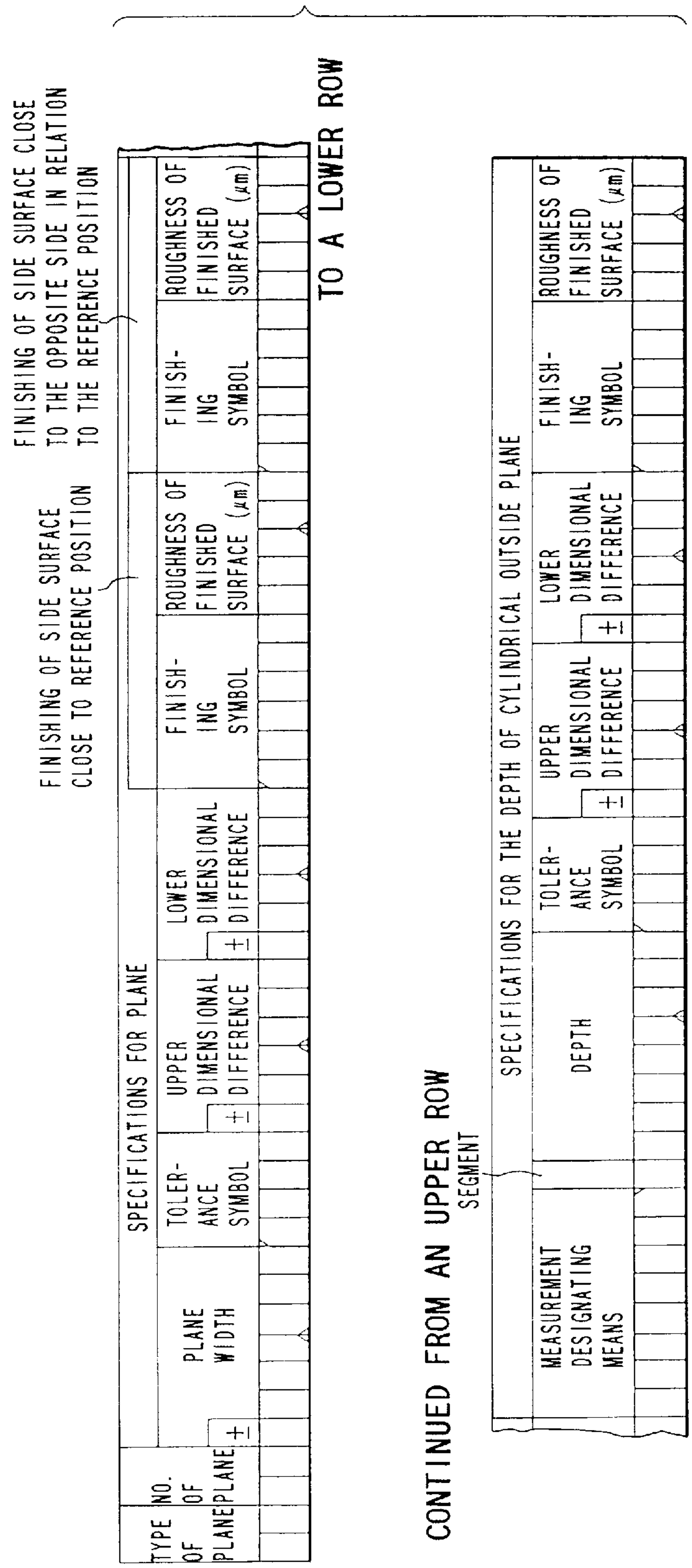
FIG. 103 is a descriptive drawing showing a pattern file format of a cylindrical outside plane/a cylindrical polygon according to one embodiment of the present invention.
Figure 104:
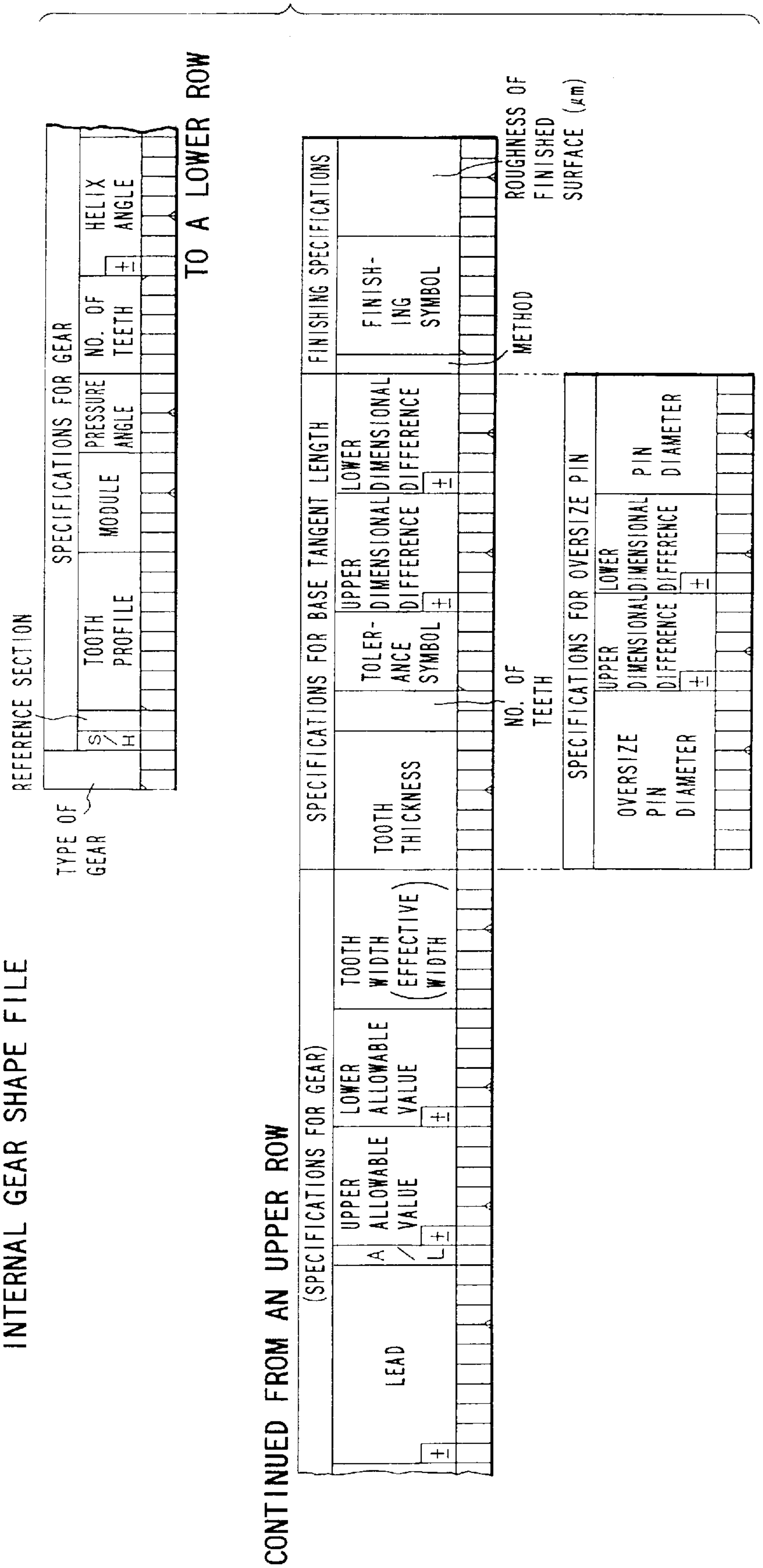
FIG. 104 is a descriptive drawing showing a pattern file format of an internal gear according to one embodiment of the present invention.
Figure 105:
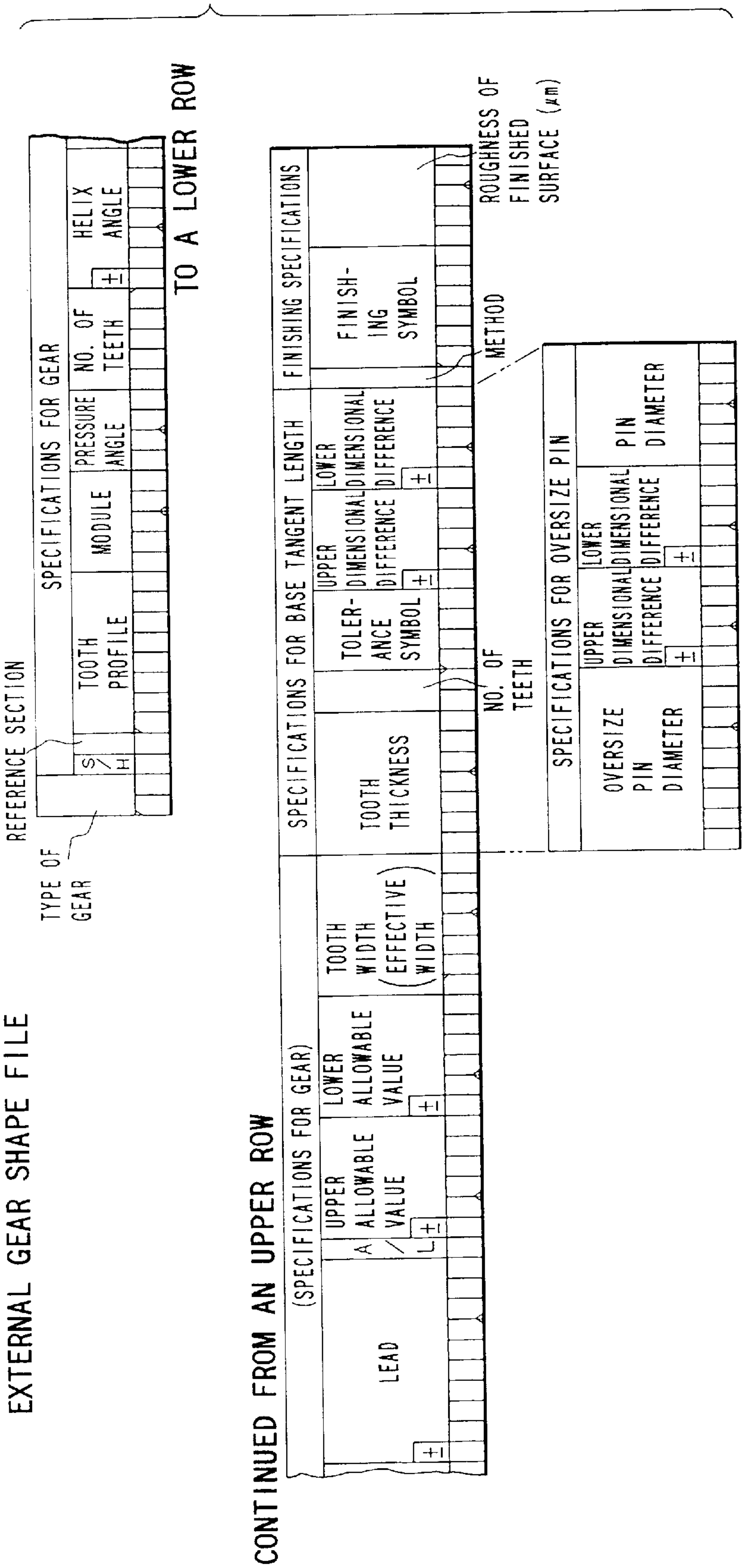
FIG. 105 is a descriptive drawing showing a pattern file format of an external gear according to one embodiment of the present invention.

Items of the pattern file are formed according to an input format. FIG. 89 shows an example of a groove shape file; FIG. 90 shows an example of a center hole shape file; FIG. 91 shows an example of a keyway shape file; FIG. 92 shows an example of a file relating to the type and shape of keyways; FIG. 93 shows an example of a key slot shape file; FIG. 94 shows an example of a hole shape file; FIG. 95 shows an example of a tapped hole shape file; FIG. 96 shows an example of internal cam shape file; FIG. 97 shows an example of end face cam shape file; FIG. 98 shows an example of a grooved cylindrical cam shape file; FIG. 99 shows an example of a groove shape file for the grooved cylindrical cam; FIG. 100 shows an example of an external cam shape file; FIG. 101 shows an example of an end face grooved cam shape file; FIG. 102 shows an example of a groove shape file for the end face grooved cam; FIG. 103 shows an example of a cylindrical outside plane/cylindrical outside polygon shape file; FIG. 104 shows an example of an internal gear shape file; and FIG. 105 shows an example of an external gear shape file.

Taper Shape File:

FIG. 106 shows an example of a taper shape file. In the present embodiment, the taper shape file is formed so as to make it possible to obtain a taper, a reference diameter, a smaller diameter, and the entire length of a taper by using the type of taper as a keyword.

Screw Thread (Male Thread) Shape File:

FIG. 116 shows an example of a screw thread shape file. This example shows male threads in compliance with the metric system. The screw thread shape file is arranged in such a way as to make it possible to obtain an outside diameter, an effective diameter, an upper tolerance, a lower tolerance, and the minimum root radius, using a segment of a screw thread, a nominal diameter, a pitch of the screw threads, and a grade of the screw thread as keywords.

In addition to the above described items, the screw thread shape file comprises, for example, a screw shape file, a tapered screw shape file, a radial thread relief shape file, a grinding undercut shape file, a bolt, a nut, a knurl (S1019). It is possible to prepare a file by entering information thereto, as required.

File relating to Pre-formed Hole of Screw Thread:

FIG. 117 shows an example of a file relating to a pre-formed hole of a screw thread. In the present embodiment, the file is arranged in such a way as to make it possible to obtain a pre-formed hole diameter and the diameter of a chamfer of a screw using a nominal diameter and a pitch of the screw thread as keywords.

Each shape file can be arranged in such a way that the end user can optionally obtain this shape file.

In the case of a company that has implemented a high level of standardization, the creation of the shape file leads to considerable reduction of the number of entries, which in turn results in improved entry efficiency.

With regard to a standardized item, it is possible to arbitrarily rewrite the item in the input menu by means an automatic complementing operation after an entry to that item has been completed through an automatic complementing operation. If the item has been rewritten, a key code of a quoted shape file on the input display screen is automatically deleted.

The file is standardized into a file format which enables the use of the file even in the case where not all of the items, but only some of items are required.

Where an inessential item is left blank, the inputting operation is continuously performed. However, where an essential item is left blank, an alarm is sounded.

Material Shape File:

If it is possible to obtain a plurality of finished shapes from one material shape, the use of the material shape file allows the omission of entry of the identical material.

The material file should be formed into the same file format as a material entry format. A workpiece identification number is used as an identification number of the material shape file.

File relating to Roughness of Finished Surface:

FIG. 119 shows a file relating to the roughness of a finished surface as an example of a finishing symbol file.

This file comprises the range of surface roughness and symbols used in a drawing, and a finishing symbol is used a keyword. This file is used when deciding the necessity or the lack of necessity of a finishing process by means of a finishing symbol number, and when converting roughness data. Machining conditions are calculated and decided on the basis of surface roughness obtained as a result of converting the roughness data.

Shape Error File:

FIG. 139 shows a shape error file as an example of a configurational and positional accuracy file. This file comprises the necessity or the lack of necessity of a reference plane and accuracy. Configurational and positional accuracy symbols are used as keywords.

This file is used when checking erroneous entry of a configurational and positional accuracy symbol and error of the reference plane.

Machining Method Symbol File:

FIG. 118 shows an example of a machining method symbol file.

This machining method symbol file is arranged so as to obtain the details of a machining operation using a machining method symbol as a keyword.

This file is used when checking a machining method symbol against a machine tool file, as well as when deciding a machining process. An alarm is sounded if a machining method symbol which is not registered in the file is specified, or if a machining method symbol which is not registered in the machine tool file is specified.

Figure 4:
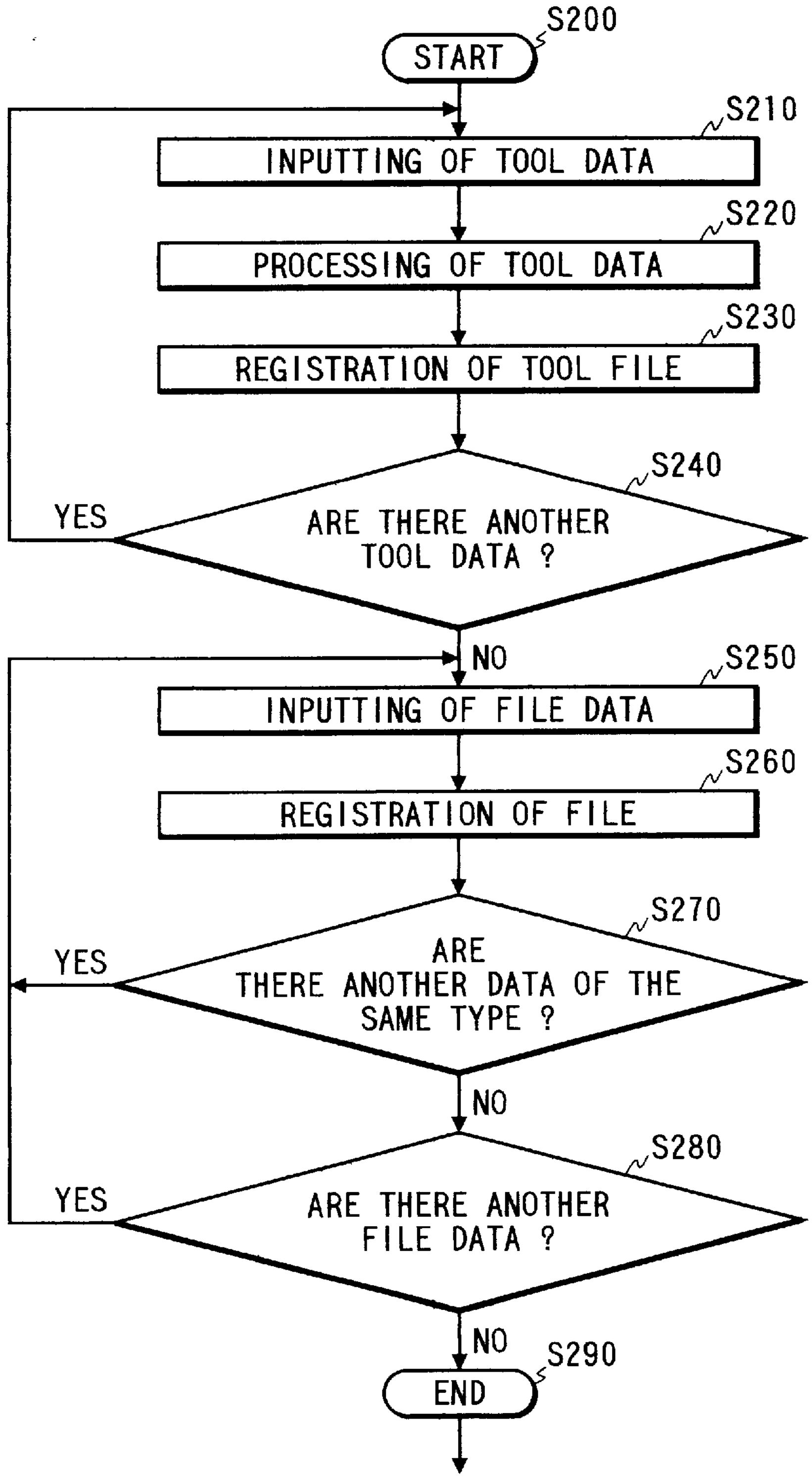
FIG. 4 is a flowchart for registering files with regard to step 2 of the processing method according to the embodiment of the present invention.

FIG. 4 shows a flowchart used for registering files.

The processing starts from step 200, and tool data are entered in step 210. FIGS. 78–81 show an example of an input format of stationary tool data, and FIGS. 82 to 85 show an example of an input format of rotary tool data.

The stationary tool data require entry of a tool identification number, a shank identification number, a tip identification number, specifications for a breaker, specifications for a major cutting edge, a nose radius, specifications for a minor cutting edge, etc. The example shows the entry of the tool data based on the JIS, and the input format used in this example is further provided with a format which compensates for problems or deficiencies in the JIS.

The rotary tool data require entry of specifications such as a tool identification number, a shank identification number, the sizes of a tool (namely, a tool diameter, a major cutting edge, the entire length of the tool, a point angle, and the number of cutting edges), tool material, etc.

The specific example of entry of these data items has already been described.

The tool data are processed in step 220, and the data are registered in the tool file in step 230. A decision is made in step 240 as to whether or not there are any other tool data. If there are other tool data, the processing returns to step 210. Then, the procedures from step 210 to 240 are repeated. On the contrary, if there are no other tool data, the processing proceeds to step 250.

It may be possible to combine steps 210 and 220 together, and the tool data may be sequentially processed while tool data are input into the file. Alternatively, all the tools are input in step 210, and the tool data on all of the tools are processed in step 220. All the tools are registered in the tool file, and the thus registered tools are batch processed in step 230.

FIG. 5 shows the details of the processing of the tool data in step 220.

Tool data are processed in step 220 in the following manner.

The function of a tool is judged, calculated, selected, and determined on the basis of the tool shape data, which in turn eliminates the function being entered on the basis of an operator's judgement. As a result, erroneous data entry and the limited entry of the function are prevented, and a file is formed which makes the maximum function of a tool available.

Processing starts in step 2200, and it is judged in step 2201 whether the tool is a stationary tool or a rotary tool, by reading the first symbol of the tool identification number.

The first symbol of the tool identification number is defined as follows: A rotary tool has D, R, T, F, B, A, S, H, or G as the first symbol. Any symbols other than these are used for a stationary tool. A symbol O denotes another tool.

D: drills,

R: reamers,

T: taps,

F: milling cutters (end milling cutters, and face milling cutters),

B: boring machines,

A: facing machines,

S: side cutters,

H: gear hobs, and

G: grinding wheels.

If it has been judged in step 2201 that the tool is a stationary tool, various tool angles of the input data, for example, a major cutting edge, a minor cutting edge, a cutting edge angle (an included angle, and an inclined angle), a rake angle, a clearance angle, the reference tip point, and the shape and size of the shank are read in step 2202.

A distinction between an area to be machined by the major cutting edge and an area to be machined by the minor cutting edge, as well as respective machining angles of the major and minor cutting edges, are calculated from the angle of the cutting edges, a rake angle, a clearance angle, the reference tip point, and the shape and size of a shank in step 2203.

The distinction between the area to be machined by the major cutting edge and the area to be machined by the minor cutting edge depends on an angle at which the shank is attached to a turret. The distinction is determined on the assumption that the shank is attached to an ordinary rectangular tool rest. For this reason, if the shank is attached to the tool rest at a different angle, the area to be machined by the major cutting edge, the area to be machined by the minor cutting edge, and respective machining angles of the major and minor cutting edges will be different from case to case.

As has been described above, an entry column XT/ZT designates a segment of a tool attached in the X direction and a segment of a tool attached in the Z direction. If 1 is input into this column, the shank is attached to a tool rest in such a way that its longitudinal portion is aligned in the X direction. If 2 is input to this column, the shank is attached to the tool rest in such a way that its longitudinal portion is aligned in the Z direction.

The result of the entry into the column XT/ZT is directly used when deciding the area to be machined by the tool.

The area to be machined having the highest-priority by the major cutting edge is determined.

As a result, with regard to the tool shank, an internal machining tool, the tool is classified as any one of a number of categories: namely, an internal and end-face machining tool, an external machining tool, an external and end-face machining tool, an external machining tool or an end-face machining tool, an external grooving tool, an internal grooving tool, and an end-face grooving tool (a trapezoidal screw threading tool is classified as the end-face grooving tool) are determined. In some cases, a plurality of areas are machined using only one tool. The result of determination of the tool is stored in a region of the storage section which is reserved for the areas to be machined with tools.

If 2 is entered in the XT/ZT column (that is, a tool having a longitudinal portion of its shank attached to a tool rest in the Z direction), and if a value is input to a shank diameter column, the tool is taken to be an internal machining tool. The tool is further classified as either an internal machining tool or an internal and end-face machining tool depending on whether a cutting angle is positive or negative.

If 1 is input to the XT/ZT column (that is, a tool having a longitudinal portion of its shank attached to the tool rest in the X direction), and if the shank diameter column is left blank, the tool is classified as any one of categories, namely, an external machining tool, an external and end-face machining tool, an external machining tool or an end-face machining tool, an external grooving tool, an internal grooving tool, and an end-face grooving tool, according to whether the cutting edge angle is positive or negative, and the reference tip point.

Even when the shank diameter column has an entry, the tool can be also used as a tool attached in the X direction if 1 is input to the XT/ZT column (that is, a tool having a longitudinal portion of its shank attached to a tool rest in the X direction). For this reason, the tool is classified in the same manner as it is classified in the case where the shank diameter column is left blank.

A general tool (a triangular screw is classified in this category) has one minor cutting edge angle. If a tool has two minor cutting edge angles, that tool is taken to be a grooving tool. If a tool has more than three minor cutting edge angles, that tool is taken to be a special tool.

Figure 6:
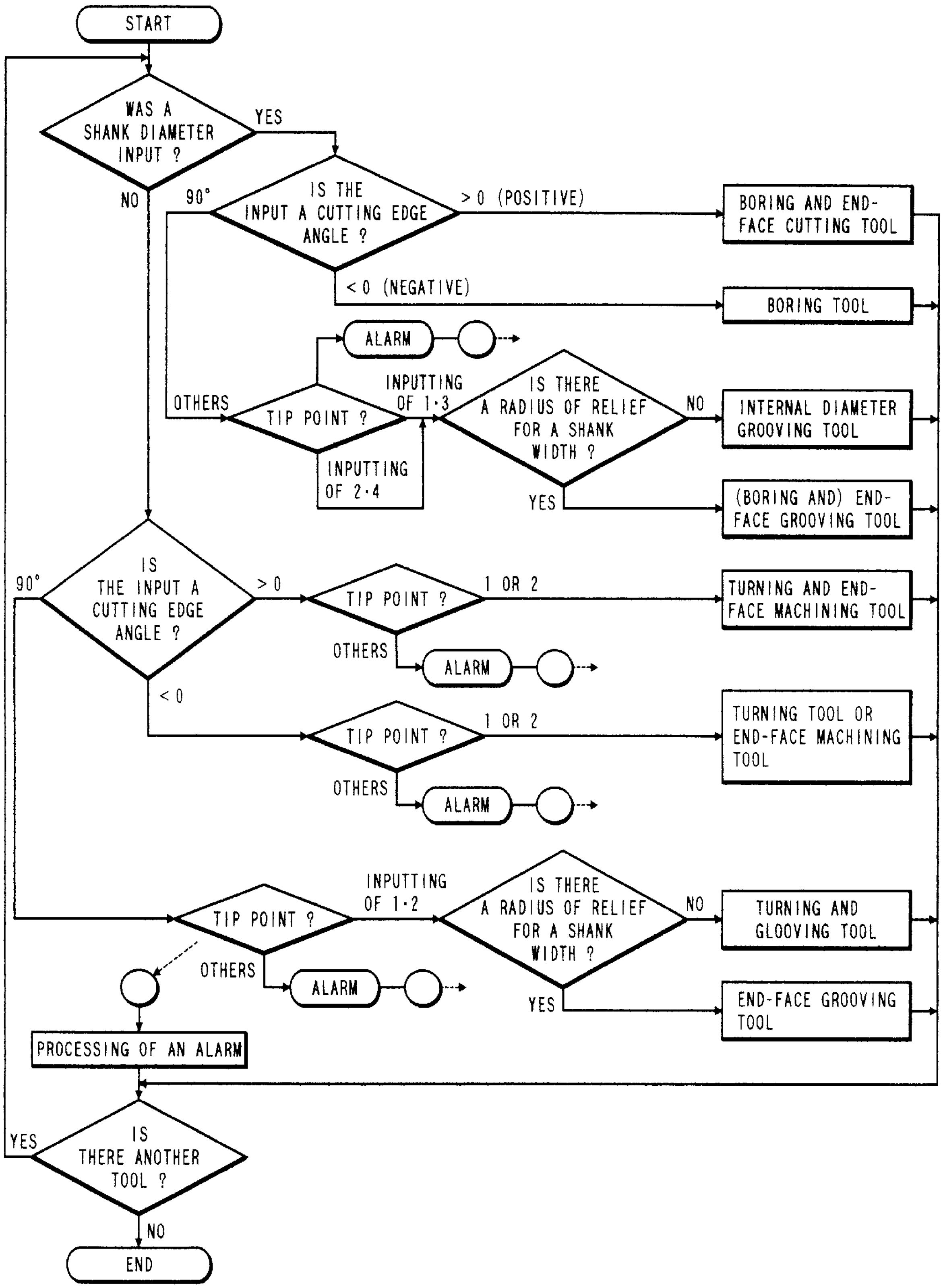
FIG. 6 is a tool data processing flowchart with regard to step 2203 according to the embodiment of the present invention, in which a tool function is identified by means of a cutting edge angle of a minor cutting edge.

As can be seen from the flowchart shown in FIG. 6, the type of tool is identified according to the number of minor cutting edge angles it possesses.

Specifically, given that a tool has one or two minor cutting edge angles, if the shank diameter column has an entry, and if the cutting edge angle is positive, the tool is identified as an internal and end-face machining tool;

if the shank diameter column has an entry, and if the cutting edge angle is negative, the tool is identified as an internal machining tool;

if the shank diameter column is left blank, and if the cutting edge angle is positive, and if the reference tip point is 1 or 2, the tool is identified as an external and end-face machining tool;

if the shank diameter column is left blank, and if the cutting edge angle is negative, and if the reference tip point is 1 or 2, the tool is identified as an external machining tool or an end-face machining tool;

if the shank diameter column is left blank, if the cutting edge angle is 90°, and if the reference tip point is 1 or 2, and if a column with regard to the radius of relief for a shank width is left blank, the tool is identified as an external grooving tool;

if the shank diameter column has an entry, if the cutting edge angle is 90°, if the reference tip point column has an entry of 1 and 3, or 2 and 4, and if the column with regard to the radius of relief for a shank width is left blank, the tool is identified as an internal grooving tool; and if the shank diameter column is left blank, if the cutting edge angle is 90°, if the reference tip point column has an entry of 1 and 2, and if the column with regard to the radius of relief for a shank width has an entry, the tool is identified as an end-face grooving tool.

The end-face machining tool is capable of cutting material while traveling in parallel with the end face. Alternatively, the end-face machining tool has the major cutting edge disposed parallel to the end face, and it is capable of cutting material while traveling (remaining in contact with the material) in the direction normal to the end face.

The area to be machined by the major cutting edge is determined as the area to be machined having the highest-priority in the above described manner. An area to be machined by the minor cutting edge is determined as an area to be machined having the second-priority in the same manner as the highest-priority area. If the tool has a plurality of minor cutting edges, areas to be machined by the minor cutting edges are determined one after the other. The areas to be machined are recalculated as areas to be machined having the third-priority under the conditions that include the dimensional requirements of the shank without the configurational requirements thereof. As a result, all of the areas to be machined by the tool are determined (the removal of the configurational requirements of the shank permits addition of an area to be machined where the internal machining tool is used as the external machining tool, and vice versa.)

Through this processing, it becomes possible for the tool to machine the maximum area.

Segment codes of the areas to be machined by tools are as follows:

| Area to be machined | Segment code |
|---|---|
| Internal machining tool | I |
| Internal and end-face machining tool | I & IF |
| Internal grooving tool | IG |
| Internal threading tool | IH |
| External machining tool | E |
| External and end-face machining tool | E & EF |
| External grooving tool | EG |
| External threading tool | EH |
| End-face machining tool | F |
| End-face grooving tool | FG |
| End-face threading tool | FH |

where IFG=FG and EFG=FG.

In step 2204, respective machining angles of the major cutting edge and the minor cutting edge are calculated from a cutting edge angle, an included angle, an angle at which a tool projects from a tool holder, and an angle at which the tool holder is attached to a tool rest by means of expressions (9)–(16).

For instance, in the case of a tool that rotates in a counterclockwise direction (that is, a tool having a right cutting edge), Major cutting edge inclination=180 [deg.]–(cutting edge angle: κ)–(minor cutting edge angle: κ') (9)

Roughing start angle=90 [deg.]+(minor cutting edge angle)–*A* [deg.]+(the angle at which the tool projects from the tool holder)+(the angle at which the tool holder is attached to the tool rest) (10)

Finishing start angle=90 [deg.]+(minor cutting edge angle)–*B* [deg.]+(the angle at which the tool projects from the tool holder)+(the angle at which the tool holder is attached to the tool rest) (11)

Roughing end angle=(cutting edge angle)+(the angle at which the tool projects from the tool holder)+(the angle at which the tool holder is attached to the tool rest) (12-1)

Finishing end angle=(cutting edge angle)+(the angle at which the tool projects from the tool holder)+(the angle at which the tool holder is attached to the tool rest) (12-2)

For instance, in the case of a tool that rotates in a clockwise direction (that is, a tool having a left cutting edge), Major cutting edge inclination=180 [deg.]–(cutting edge angle: κ)–(minor cutting edge angle: κ') (9)

Roughing start angle=90 [deg.]+(minor cutting edge angle)–*A* [deg.]+(the angle at which the tool projects from the tool holder)+(the angle at which the tool holder is attached to the tool rest) (13)

Finishing start angle=90 [deg.]+(minor cutting edge angle)–*B* [deg.]+(the angle at which the tool projects from the tool holder)+(the angle at which the tool holder is attached to the tool rest) (14)

Roughing end angle=180 [deg.]+(minor cutting edge angle)+(the angle at which the tool projects from the tool holder)+(the angle at which the tool holder is attached to the tool rest) (15)

Finishing end angle=180 [deg.]+(cutting edge angle)+(the angle at which the tool projects from the tool holder)+(the angle at which the tool holder is attached to the tool rest) (16)

where A: 1.5 and B: 3 are used. These constants can be changed or reset depending on the situation.

With regard to a tool clearance angle margin, a machining start angle (an approach angle) is obtained by adding and subtracting the constants A and B, and the machining end angle (an escape angle) is set to 0 [deg.]. In the case of the grooving tool, a tool clearance angle margin of the major cutting edge angle is set to 0 [deg.]. A code of the minor cutting edge angle of the grooving tool complies with a general standard.

Results of the above calculation, the machining start angles, and the machining end angles are stored.

Subsequently, machining angles of the minor cutting edge are calculated in the same manner. Machining angles associated with all of the areas to be machined are calculated and stored. The machining angles of the minor cutting edge are calculated by substituting the minor cutting edge angle for the major cutting edge angle, using the above described expressions.

It is determined in step 2205 whether or not the tool is a throw-away tip.

If it has been determined from the tip code in step 2205 that the tool is a throw-away tip, the segment code of the roughing tool and the segment code of the finishing tool are added to each segment code of the area to be machined by means of a nominal symbol, thereby completing the tool function.

If it has been determined in step 2205 that the tool is not a throw-away tip, data are checked, and the segment code of the roughing tool and the segment code of the finishing tool are added to each segment code of the area to be machined in step 2207, thereby completing the tool function. Upon completion of this step, the processing proceeds to step 2208.

Tool volume is calculated in step 2208.

The tool volume comprises, for example, the maximum depth of cut, the minimum depth of cut, the maximum feed rate, and the minimum feed rate, the maximum cut withstanding volume, etc.

The volume of a standard throw-away tip is calculated by expressions (17) to (20).

$$\text{Maximum depth of cut}=(\text{major cutting edge length})\times\sin\kappa \quad (17)$$

$$\text{Major cutting edge length}=(r\times\cos ec\epsilon_r\times sec\epsilon_r)-(R\times\cos ec\epsilon_r\times\cos\epsilon_r-R)-(R\times\tan\epsilon_r) \quad (18)$$

where $\kappa$ is a cutting edge angle, r is a reference inscribed circle, $\epsilon_r$ is an apex angle, and R is a nose radius.

"Various numerical values for, e.g., a tool identification number 1 are calculated as follows:

The depth of cut is obtained from $$(12.7\times\cos ec\ 80\times sec\ 80)-(0.4\times\cos ec\ 80\times sec\ 80-0.4)-(0.4\times\tan 80)=12.436\ [\text{mm}].$$

Letting the minimum feed rate=R, the minimum depth of cut becomes 0.4 mm."

$$\text{Maximum feed rate}=k_b\times(\text{breaker width})\times(\tan\alpha\times\cos\kappa-\tan k_t)\ (\text{mm/rev.}) \quad (19)$$

where $k_b$ is the maximum feed rate coefficient with regard to the breaker width, $\alpha$ is a clearance angle, $\kappa$ is a cutting edge angle, and $k_t$ is a clearance angle margin (This margin can be freely determined, but it cannot be set larger than the clearance angle).

"Numerical values are calculated, taking a tool identification number 1 as an example.

$$\text{Maximum feed rate}=0.5\times1.5\times(\tan 5°\times\cos 7°-\tan 2°)=0.389\ [\text{mm/rev.}]"$$

$$\text{Minimum feed rate}=\text{minimum feed rate of a control system per revolution (mm/rev.)} \quad (20).$$

The tool volume is calculated for each of the segments of the major cutting edge, the minor cutting edge, and the areas to be machined.

The results obtained through the processing between step 2203 and step 2209, namely, the segment of the area to be machined by the major cutting edge, the area to be machined by the minor cutting edge, the respective machining angles of the major and minor cutting edges, the segment of a roughing operation, the segment of a finishing operation, and the tool volume, are recorded in the storage section in step 2210. Upon completion of the recording of the results, the current processing terminates in step 2211, and then the processing returns to step 220 and proceeds to 230.

The recorded results of this example are shown in FIGS. 78 to 81.

If the tool has been judged to be a rotary tool in step 2201, the tool is classified as the category of a rotary tool according to its tool identification number, and the tool is arranged in ascending order of diameter.

Particularly, a tool having F as the first symbol location in the tool identification number is classified as a face milling cutter and an end milling cutter, according to the diameter and major cutting edge length of the tool.

A criterion for classifying the tool as the face milling cutter and the end milling cutter is as follows:

(½)×tool diameter<major cutting edge length: end mill (FE), and (½)×tool diameter≧major cutting edge length: face milling cutter (FF).

As a result, the following categories are obtained:

D: drills, R: reamers, T: taps, FE: end milling cutters, FF: face milling cutters, B: boring machines, A: facing machines, S: side cutters, and O: others.

Upon completion of this processing, the results obtained through the processing are stored in the tool file storage section in step 2210. After the storing of the results has been completed, the current processing terminates in step 2211, and then the processing returns to step 230.

The rotary tools are classified according to their types, and the classified tools are then sorted in order of size. As a result, it becomes possible to read a tool file quickly.

Figure 7:
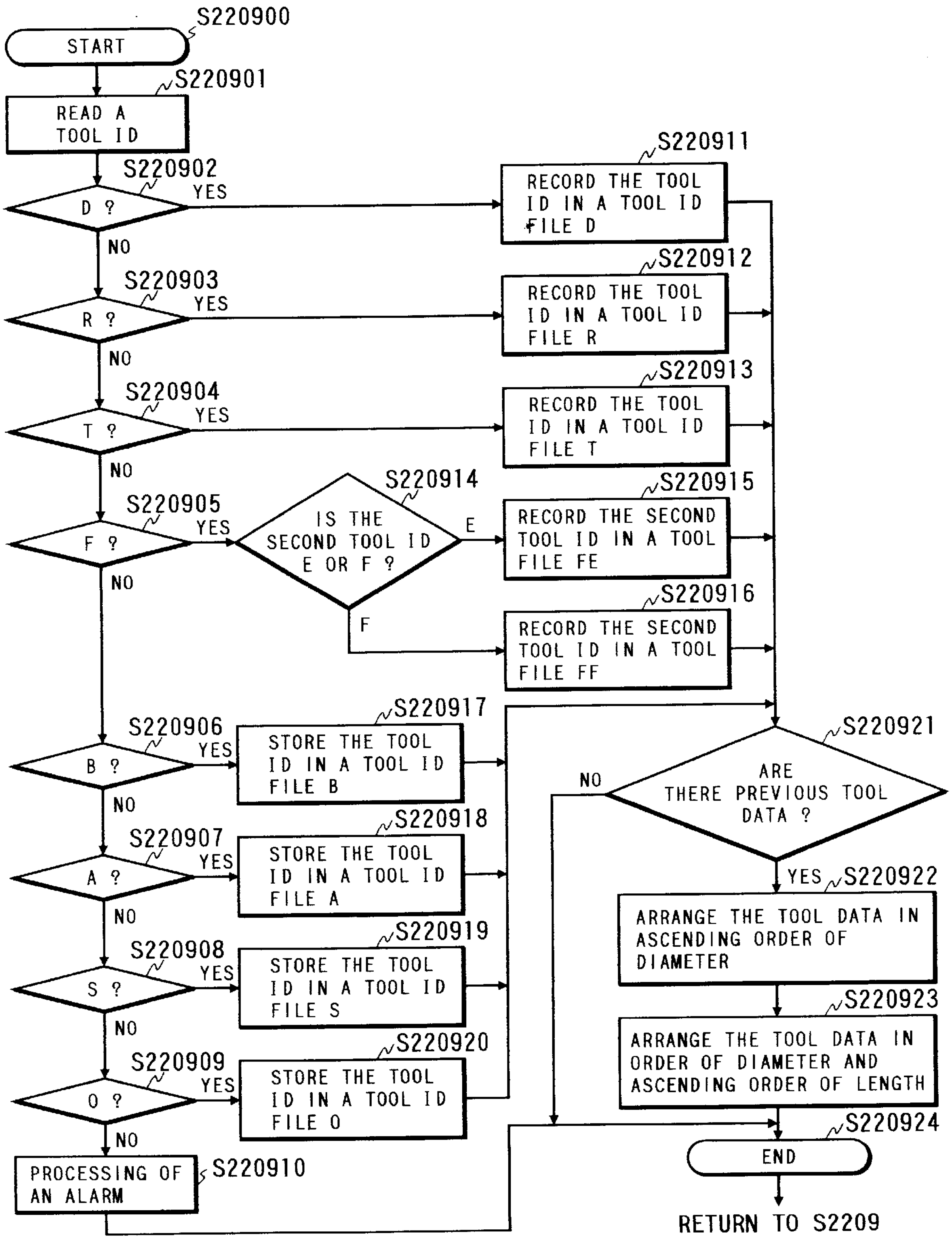
FIG. 7 is a flowchart for classifying rotary tool data and arranging tools in order of diameter, with regard to step 2209 of the embodiment of the present invention.

FIG. 7 shows procedures associated with these operations.

The processing starts from step 220900. A tool identification number is read in step 220901.

The NC machine is designed so as to accept only the previously specified tool identification numbers. If any number other than these numbers is erroneously entered, an alarm is sounded so as to prompt the operator to correct the entry. Upon completion of this inputting operation, the current processing terminates in step 220924, and then the processing returns to step 2209.

The specified tool identification number is classified in steps 220901 to 220909 and in step 220914, and the thus classified tool identification number is stored in each of the rotary tool files through steps 220911–220913 and steps 220915 to 220920. Upon completion of the storing of the classified tool identification number in the rotary tool file, it is judged whether or not tool data have already been recorded in step 220921. If there are recorded tool data, the data items are sorted in ascending order of tool diameter in step 220922. Further, these data items are sorted in ascending order of tool length for each tool diameter in step 220923. Upon completion of the sorting of the data items, the current processing terminates in step 220924, and the processing then returns to step 2209.

Alternatively, if it has been determined in step 220921 that no tool data yet have been recorded, the current processing terminates in step 220924, and then the processing returns to step 2209.

Although the procedures following step 220 have already been described, the registration of the tool file is completed in step 230. It is determined in step 240 whether or not there are any other tool data. If there are other tool data, the current processing returns to step 210. On the contrary, if no other tool data are present, the current processing proceeds to step 250.

Procedures following step 250 represent the registration of other files.

File data are entered in step 250. The file is registered in step 260. It is determined in step 270 whether or not there are any other file data of the same type. If there are other file data, the current processing returns to step 250, and the procedures between step 250 and step 270 are executed. If no other file data exist, it is determined in step 280 whether or not there are file data of a different type. If there are file data of another type, the current processing returns to step 250, and the procedures between step 250 and step 280 are executed. If no file data of another type exist, the registration of various types of file data is completed in step 290. Upon completion of the registration of the file data, the current processing returns to step 2 in the major processing procedures, and then the processing proceeds to step 3.

Figure 43:
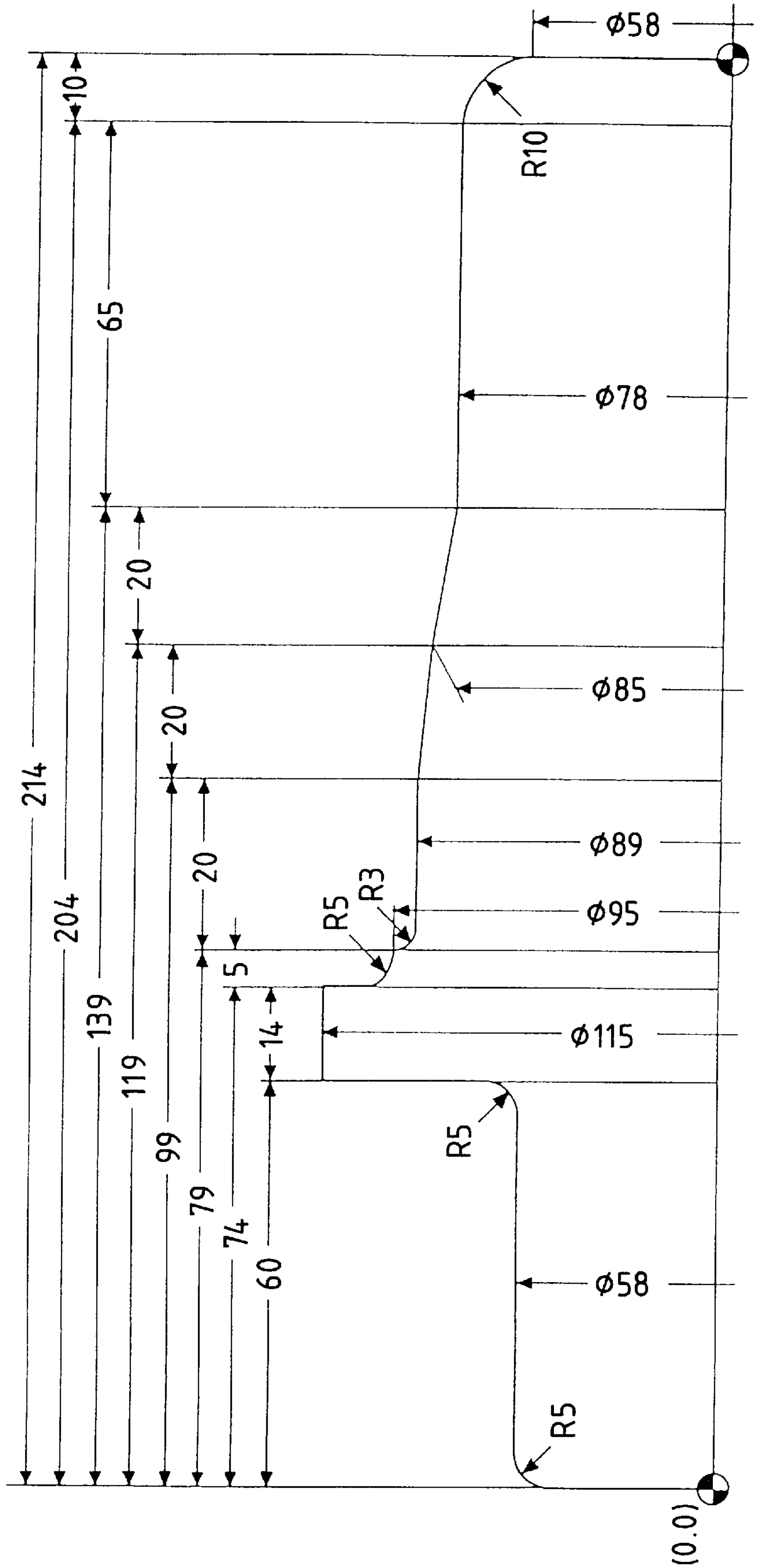
FIG. 43 is a descriptive drawing showing the shape of material according to the embodiment of the present invention.
Figure 44:
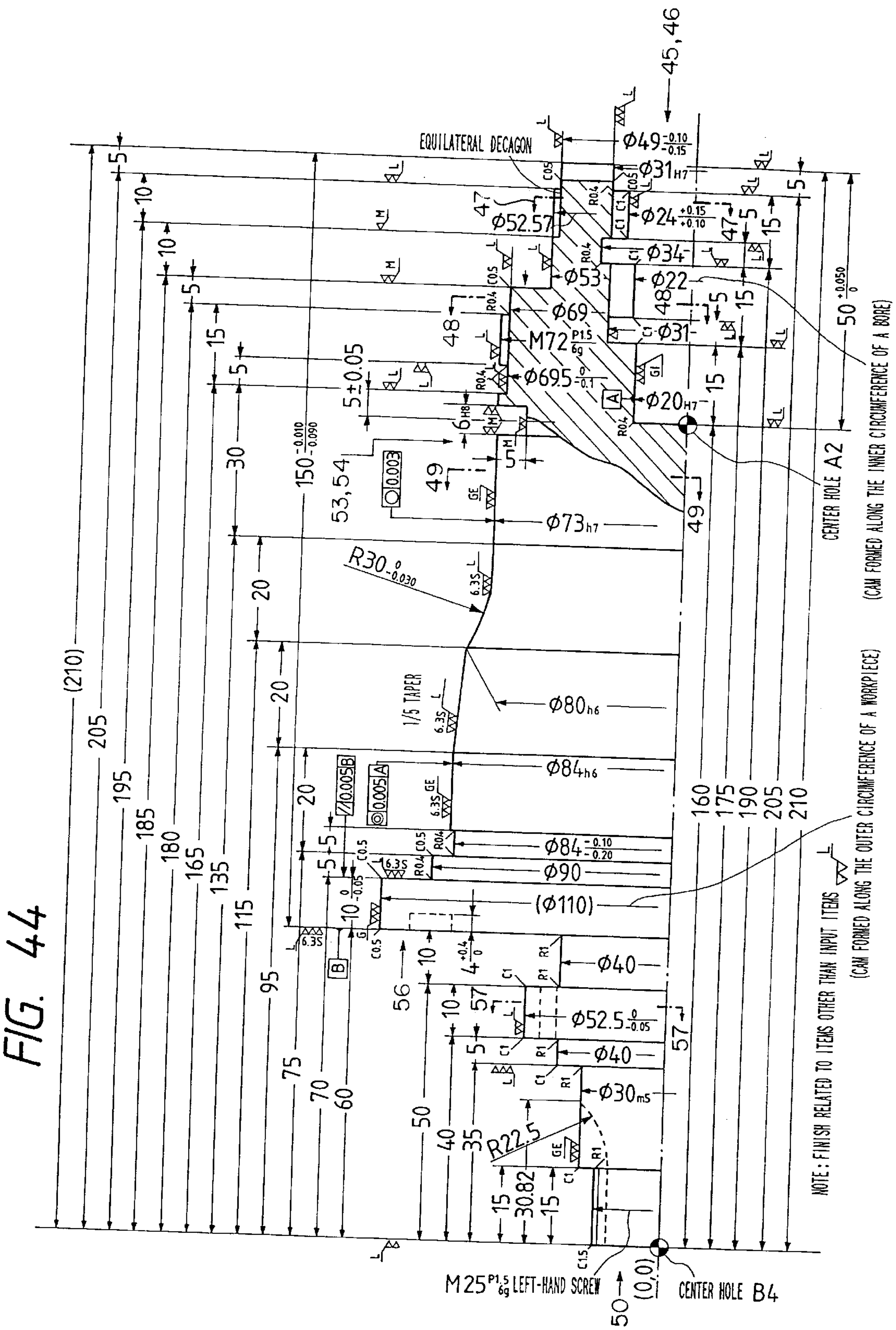
FIG. 44 is a descriptive drawing showing the finished shape of a workpiece according to the embodiment of the present invention.

FIG. 44 shows a finished shape of a workpiece which is displayed using the metric system, and FIG. 43 shows the shape of material of the workpiece. FIGS. 142 to 160 show an example of entry of these shapes in step 3.

In FIG. 142:

A sequence 1 is an example of entries which are input in a format used for entering general items of a workpiece. The format is common for a turning operation and a milling operation, and hence some of the items in that format do not require entry in the present example.

The entries comprise a workpiece identification number (a parts code): M135A224-11A [This column does not require entry in the present example. If it is desired to specify a machine identification number, entries, e.g., a fixture identification number, and a process identification number as sub-numbers, (the machine identification number): XLD001, (the process identification number): LA1, and (the fixture identification number): REXLD001. are added (these entries may also be input according to a variable block scheme)], a workpiece identification number [This column does not require entry in the present example, but it requires entry when a material file is used. Upon entry of a workpiece identification number, material data are read from the file using the identification number of the workpiece as a keyword, and the material shape is automatically complemented by the thus read material data.], a workpiece name: JIKU, the entire length of the workpiece: 210 mm [The dimensions of the workpiece are input in millimeters throughout the following descriptions of the specification if the workpiece complies with the metric system. The unit symbol, i.e., mm, is omitted from the following descriptions for brevity.], the overall width of the workpiece [This column does not require entry in the present example, because the workpiece is subjected to a turning operation. However, if an entered workpiece is subjected to a milling operation, the diameter of the workpiece which follows the current entry column represents the plate thickness or height of the workpiece.], a workpiece diameter [This column does not require entry in the present example. However, in the case of a rod material, the outer diameter of the material is entered in this column.], a workpiece material: SCM440H, the hardness of a workpiece material: HRC30, heat treatment of the workpiece [This column does not require entry in the present example. If the workpiece is subjected to thermal refining treatment, "1", for example, is entered in this column.], the weight of the workpiece (per a single workpiece): 8.3 Kg, workpiece dimensions [A value entered in this column shows the length of the rod material before it is cut into pieces. The value is not the length of each resultant piece. This column does not require entry in the present example. For example, if a regular size of 4.0 m is entered in this column, 4000 is input.], a completed machining process [This column does not require entry in the present example. If a center hole machining process has already been completed, CMS-1 is entered.], specifications for a finishing operation relating to entries; a finishing symbol: 2L, the roughness of a finished surface [This column does not require entry in the present example. For example, if it is desired to specify 50 $\mu$m, 50. is input.], measured data obtained for each process: 1 [If the workpiece is measured, 1 is entered to this column. If the workpiece is not measured, 0 is entered.], the number of specified machining operations: 10, the number of completed machining operations [A count value is incremented every time a machining operation is completed.], an implementor: HIRAI, date: 911125, and a comment: required information or an easy-to-memorize abbreviation is freely entered to this column [In the present example, AUTO-PROCESS is entered.].

The entries are designed so as to directly copy the identical characters on the drawing into the columns.

An initial column number is 1. The next column number is automatically entered upon completion of the entry of one input line.

Sequences between 2 and 14 represent an input format for the shape of material.

According to this data entry format, a sequence, a stage number, a previous C/R chamfer [Details of an input item (the explanation of the identical or similar items will be omitted hereafter); C/R, and the size of the chamfer], specifications for the coordinates of the starting point (diameter, and length), specifications for the coordinates of the end point (diameter, and length), the radius of a circular arc, a subsequent C/R chamfer (C/R, and the size of the chamfer), and specifications (segment, type, and size) for a taper/an angle/a gradient, are entered in a tabular form.

In the present example, the shape of material is input for the sequences 2 to 14 with reference to the material drawing shown in FIG. 43.

Assuming that the point of origin for the entry of the material shape is defined at an intersection between the left end face of the material and the center line (0, 0) of the same, the entry of an upper half of the drawing is started from the point of origin in a leftward direction (a counterclockwise direction) with respect to the center line. As a result, the drawing is inevitably plotted in the right side space with respect to the center line. Similarly, a finished pattern is input using the same inputting method.

Conversely, the drawing is plotted in a rightward direction according to another method. The direction of the entry of the data is a promise, and a similar result is obtained even when the drawing is plotted in either direction so long as the processing procedures are executed based on the promise.

In the case of the material as used in the present example, the major entries of the material comprise the entry of the coordinates of the staring point (diameter: 0., and length: 0.) in the first column, and the entry of the coordinates of the end point (diameter: 0., and length: 214.0). The other entries become unnecessary data. Hence, the entry for the second column is moved up to the first column, whereby the coordinates of the end point are entered into the first column.

A sequence in the first column: that is, the coordinates of the starting point (diameter: 0., and length: 214.0), and the coordinates of the end point (diameter: 58.0, and length: 214.0) are entered, and then a sequence in the thirteenth column: that is, the coordinates of the starting point (diameter: 58.0, and length: 0.) and the coordinates of the starting point (diameter: 0., and length; 0.) are entered. Thus, the entry of the data is completed.

Since the stage number is automatically incremented, it is not necessary to enter a value into the stage number column.

If the coordinates of the current end point match with the coordinates of the next starting point, the entry of the coordinates of the next starting point is omitted.

In this case, the entry of the coordinates of the next starting point is automatically complemented by the system even if the entry of them is omitted. Numerical values which are complemented by automatic inputting, complementing or incrementing operation are represented by two overscore lines.

In the present entry example, the items which will be automatically complemented are represented with two overscore lines because the drawings including these items are monochromatic. In practice, these items are displayed on a practical machine, such as a personal computer, in a discernible way in the form of combinations of, for example, a reversed display and a crosshatched display, a reversed blue display and a crosshatched blue display, a reversed blue display and a reversed black display, displays in different colors, and ornamental characters. The entry and processing of the material data are carried out in accordance with this rule.

A general promise with regard to the entry display is as follows:

In addition to the automatic entry of data, the automatic incrementing of the stage number, and the automatic compensation of data (When the coordinates of the end point of the current column are entered, the coordinates of the end point of the previous column are automatically quoted for the coordinates of the starting point of the current stage. If the coordinates of the starting point are entered, and if the coordinates do not match with the coordinates of the end point of the previous column, a column will be automatically added, and items for diameter and length will be automatically complemented.), the operation of a cursor is facilitated. As a result, data are easily entered by making it possible to quote data from an upper column or a left column. In the present entry example, one overscore line designates quoted data, and two overscore lines designate data obtained as a result of automatic entry, incrementing, or compensation.

In the present entry example, the items which will be automatically complemented are represented by one or two overscore lines because the drawings including these items are monochromatic. In practice, these items are displayed on a practical machine, such as a numerically controlled machine, an electronic computer, and a personal computer, in a discernible way in the form of combinations of, for example, a reversed display and a crosshatched display, a reversed blue display and a crosshatched blue display, a reversed blue display and a reversed black display, displays in different colors, and ornamental characters. The entry and processing of the material data are carried out in accordance with these descriptions.

In the case of entry of length of the material, an increment of length is input together with a ± sign. If a numerical value without ± sign is entered, the value is identified as the entry of an absolute value.

In the present entry example, the shape of the material requires only the entry of an absolute value. With regard to the finished pattern, the major part of the data entry is an absolute value and the minor part is an increment.

The initial column number is 1, and the next column number is automatically entered upon completion of the entry of one input line.

A decision as to the ± sign is made at the time of entry, with a positive sign denoting that the circular arc runs from the coordinates of the staring point to the coordinates of the end point in a leftward direction (a counterclockwise direction), and a negative sign denoting that the circular arc runs from the coordinates of the starting point to the coordinates of the end point in a rightward direction (a clockwise direction).

Circular arc data having a column number 2 in the present example relate to a circular arc which connects between the starting point and the end point in a leftward direction (a counterclockwise direction), and hence +10. is entered.

As to a distinction between C/R segments associated with the previous C/R chamfer column, the chamfering of a surface C at an angle of 45 degrees or the chamfering of a corner C at an angle of 45 degrees, is identified by the entry of C. Further, the chamfering of a surface R or the chamfering of a corner R is identified by the entry of R.

Similarly, with regard to the subsequent C/R chamfer column, the chamfering of the surface or corner C and the chamfering of the surface or corner R are distinguished from each other.

R3., R5., R5., and R5. are respectively entered into the subsequent C/R chamfer of the columns 6, 8, 11, and 12 in the present example.

To make it possible to enter other data items which are not required in the present example, the previous C/R chamfer, specifications for a taper/an angle/a gradient: a distinction between the taper/the angle/the gradient, the type of the taper/the angle/the gradient, and their respective extents can be entered.

To distinguish a taper, an angle, and a gradient from each other, a taper is represented by T, an angle is represented by A, and a slope is represented by S.

The type of each segment of the taper, angle, and the slope is represented by four alphanumeric characters. First and second alphanumeric characters are designed so that the codes which are already known as the standards, such as a morse taper: MT, a Jacob's taper: JT, a national taper (the American standard taper): NT, a Brown & Sharpe taper: BT (B & ST), are used together with a file. Numerals are used for the third and fourth digits to represent their respective extents. As a result, it becomes easy to read each type of taper from the taper file.

Further, the system is designed so that the user can freely create a file and easily input symbolized tapers, angles, and slopes into the file.

In the case of a taper and a slope, their respective extents are entered in such a way that the numerator is positioned on upper digits (the left side) in relation to the decimal point and a denominator is positioned on lower digits (the right side) in relation to the decimal point. In the case of an angle, a value is entered in degrees. The use of the decimal point allows the entry of a degree in the units of 0.00001 degrees.

The symbol is entered into the column with regard to the type of the segment, and a numerical value is entered flush right in the column for the extent of the taper, angle or slope used when reading data from the file. The data read as a result of the entry of the numerical value are displayed as a gradient including decimal fractions.

FIGS. 143 to 160 show an example of entry of a finished pattern.

Sequences following a sequence number of 15 in the present example show a format used for entering a finished pattern.

In addition to the input format of the material shape, this data input format is designed so as to permit the entry of a tolerance symbol, an upper tolerance, a lower tolerance, a finishing symbol, the roughness of a finished surface, configurational and positional accuracies, screw specifications, thermal refining specifications, and surface treatment specifications.

In FIG. 44, the center hole is positioned at the point (0, 0). This workpiece is solid, and this center hole must be machined from the left. For these reasons, the center hole will be input as one to be machined in a later step. Data on the right center hole, that is, an angle: 60 and a type: A2, are entered in the sequence 15. If the workpiece is hollow, data on the center hole located at the point (0., 0.) will be entered first.

The data of the first column becomes unnecessary, and hence the entry of the data is omitted. Data of the second column, that is, the coordinates of the starting point (diameter: 0., and length: 160.), are entered as the data of the first column. In this way, data of columns 3 to 37 are entered one by one, and data of the 38th column with a sequence number of 53, that is, the coordinates of the starting point (diameter: 25., and length: 0.) and the coordinates of the end point (diameter: 0., and length: 0.) are finally entered.

For the details of entry of the data of the first column, the previous C/R chamfer column is skipped because this column has no available data (hereinafter, any column which has no available data will be skipped. The data entry is skipped by use of a special key or a soft menu key set to skipping. The method of entering the previous C/R chamfer has already been described in the explanation of entry of the material shape.) Further, the data entry comprises specifications for the coordinates of the starting point; diameter: 0., a tolerance symbol: skipped, an upper tolerance: skipped, a lower tolerance: skipped, length: 160., a tolerance symbol: skipped, an upper tolerance: skipped, a lower tolerance: skipped, specifications for the coordinates of the end point; diameter: 20., and a tolerance symbol: H7 (Upon entry of H7, an upper tolerance: +0.021 and a lower tolerance: 0.0 are read from a dimensional tolerance file using H7 and a diameter of 20. as parameters, and the thus read data are automatically entered into the column of the end point coordinate specifications.) Turning to FIG. 144, the data entry comprises length: 160., a tolerance symbol: skipped, an upper tolerance: skipped, a lower tolerance: skipped, specifications for the radius of a circular arc, a subsequent C/R chamfer: C/R: R, degree: 0.4, a finishing symbol: 2L, the roughness of a finished surface: skipped, configurational and positional accuracies: skipped, and specifications for a taper/an angle/a slope: skipped. Turning to FIG. 145, the data entry comprises screw specifications: skipped, thermal refining specifications: skipped, and surface treatment specifications: skipped. The entry of data of the first column is now completed.

Backspacing of the cursor (the cursor is backspaced by use of a special key or soft menu key set to backspace) results in the automatic entry of column number 2. As a result, the cursor returns to C/R of the previous C/R chamfer column.

Entry for columns subsequent to the first column is carried out in the same manner as the entry for the first column. Specifications for the coordinates of the starting point of the second column can be quoted from the coordinates of the end point of the first column. For this reason, the cursor is moved to the coordinates of the end point. In this case, since the coordinates of the end point are the same as those of the first column, the specifications for the coordinates of the starting point of the second column: namely, a diameter: 20., a tolerance symbol: H7, an upper tolerance: +0.021, a lower tolerance: 0.0, and a length: 160., are automatically complemented by the specifications for the coordinates of the end point of the first column: namely, a diameter: 20., a tolerance symbol: H7, an upper tolerance: +0.021, a lower tolerance: 0.0, and a length: 160., as a result of the specification of quotation from an upper column (data are quoted from an upper column by use of a special key or a soft menu key set to quote). Then, the specifications for the coordinates of the end point of the second column: namely, a length: 175. and a subsequent chamfer: C1. are input. [The entry items to be skipped have already been described during the explanation of the details of the first column, and hence their explanations will be omitted. The same applies to any counterparts in the following descriptions. An explanation will only be given of a new matter.)

The cursor is moved back, and entry for the third column and the following columns is repeatedly continued in the same manner as previously mentioned.

Entry for screw thread specifications of the 18th column comprises the following items:

Segment; An abbreviated symbol is input in order to classify the type of screw thread, for example, a metric screw thread: M, Whitworth screw thread: W, a unified screw thread: UNC and UNF, and a parallel pipe thread: R, Rc, and Rp. A modal value is designated by M.

Pitch; A pitch of a specified screw thread is input in millimeters. In the case of a screw thread in compliance with the inch system, the number of ridges (a fraction should be converted into a fractional value before it is entered) are input.

R/L: The rotation of the screw thread, that is, a right-hand screw thread: R or a left-hand screw thread L, is input. A modal value is designated by R.

Accuracy: The accuracy of a screw thread is input on the basis of the JIS.

In the case of a male screw thread having the second grade of accuracy of the JIS, JIS 6g or JIS 6h is input. Further, in the case of a female screw having the same grade, JIS 5H or JIS 6H is input.

Finishing symbol of a screw thread: A finishing symbol of a screw thread is input in the same manner as the previously mentioned finishing symbol.

The external nominal diameter of a screw thread in compliance with the inch system is input in inches. For a smaller diameter of a unified screw thread, a numerical value following No. is input. A distinction between the screw thread in compliance with the inch system and the unified screw thread is made by a symbol entered in the segment of the screw thread.

The diameter of the screw thread in compliance with the inch system, for example, 1¼ inches, is input as 1-1.4. The length of the screw thread is input in meters. With regard to the diameter of the unified screw thread, its diameter is not directly entered to the diameter column. For example, in the case of a smaller diameter of the unified screw thread having any one of No. 0–12, only a numerical value after No. is entered in the diameter column (the smaller diameter is identified during the course of the processing by a symbol entered in the segment of the screw thread).

Hereafter, entry for the screw thread will be carried out in the same manner as mentioned in the above example.

In the present example, a segment: M, the diameter of a screw thread:, a pitch: 1.5, R/L: R, and an accuracy: JIS6g are entered on the basis of the above descriptions.

For the circularity of the 20th column, a circularity symbol: is entered into a segment of the configurational and positional accuracy input symbol, and 0.003 is entered into an allowable value column.

As shown in FIGS. 139*a* to 139*h*, the positional accuracy symbols comprise: a circularity symbol, a concentricity symbol, a parallelism symbol, a flatness symbol, a cylindricity symbol, a perpendicularity symbol, a straightness symbol, and a runout symbol.

Specifications for the radius of a circular arc of the 21st column require entry of: a degree of an angle: −30. [Assuming that the starting point and the end point of a circular arc are connected together, a circular arc running in a rightward direction (a clockwise direction) when viewed from the starting point is negative, and a circular arc running in a leftward direction (a counterclockwise direction) when viewed from the starting point is positive.], a tolerance symbol: skipped, an upper tolerance: 0., a lower tolerance: −0.030, and the roughness of a finished surface: 6.3S.

As shown in FIGS. 146 to 147, a taper having a diameter of 80.h6 and a diameter of 84.h6 of the 22nd column requires entry of: the coordinates of the starting point (a diameter: 80., a tolerance: h6, an upper tolerance: 0.0, a lower tolerance: −0.019, and a length: 115.), and the coordinates of the end point (a diameter: 84., a tolerance: h6, an upper tolerance: 0.0, a lower tolerance: −0.022, and a length: 95.).

The concentricity column having a diameter of 84.h6 of the 23rd column requires entry of: a concentricity symbol; ◎into the configurational and positional accuracy input symbol column, 0.005 into an allowable value column, and 2 of the second column having a display of a reference position designated by A into a reference column.

The parallelism of an end face of the 26th column requires entry of: a parallelism symbol; // into the configurational and positional accuracy input symbol column, 0.005 into an allowable value column, and 28 of the 28th column having a display of a reference position designated by B into the reference column.

The specifications for the coordinates of the end point of the 27th column, in which tolerance is specified in a length column, require entry of: a tolerance symbol: skipped, an upper tolerance: skipped, a lower tolerance: skipped, a length: −10. (an increment is input to this column, because tolerance is specified in the length column), a tolerance symbol: skipped, an upper dimension difference: 0., and a lower tolerance: −0.05. As a result, the absolute value and the increment can be mixedly input to the column.

As with the 18th column, a screw of the 37th column requires entry of: a segment: M, the diameter of a screw thread: a pitch: 1.5, R/L: L, and an accuracy: JIS6g.

As previously mentioned, each of the files is provided with items in compliance with the JIS standards and items in compliance with industry standards in order to facilitate a user's entry operations. The file is given a certain degree of freedom which allows NC machine manufacturers and users to change the contents of the files or add new items to them according to their own standards.

Specifically, the files having the above mentioned items, as well as such a degree of freedom are as follows:

a dimensional tolerance file, a finishing symbol file, a groove shape file, a keyway shape file, a file relating to the type and shape of a keyway, a key slot shape file, a hole shape file, a tapped hole shape file, a cylindrical polygon shape file, an internal gear shape file, an external gear shape file, a screw thread shape file, a tapered screw thread shape file, a radial thread relief shape file, a grinding undercut shape file, a taper shape file, and a center hole shape file.

Further, as a standard for the NC machine manufacturers and end users, the files are provided with an input format which is the same as the file format capable of comprising an end-face grooved cam shape file, a groove shape file for the end-face grooved cam, an end-face cam shape file, an external cam shape file, an internal cam shape file, a grooved cylindrical cam shape file, and a groove shape file for the grooved cylindrical cam.

A tolerance symbol to be entered is in compliance with the ISO standard. The entry of the tolerance symbol makes it possible to omit the entry of an upper tolerance and a lower tolerance.

A dimensional tolerance file is obtained, or the upper and lower tolerances are calculated from the basic tolerance file using a tolerance calculating expression according to another method, by means of combinations of: a diameter or a length and a tolerance symbol, a degree of the radius of a circular arc and the tolerance symbol, a groove width and the tolerance symbol, a keyway width and the tolerance symbol, a keyway depth and the tolerance symbol, a depth and the tolerance symbol, the tolerance symbol and a distance with respect to the center of the coordinates of the starting point, a distance with respect to a shoulder and the tolerance symbol, a plane width and the tolerance symbol, and a base tangent length and the tolerance symbol. The thus obtained dimensional tolerance file, or the thus calculated upper and lower tolerances are automatically input to the tolerance symbol column.

FIGS. 111 to 112 show an example of the dimensional tolerance file. An example of the basic tolerance file according to another method is shown in FIGS. 113 and 114. Further, an example of the tolerance calculating expression according to another method is shown by expressions (2) to (8) which will be described later.

If no tolerance symbol is available, the upper and lower tolerances are input to the tolerance symbol column. If the tolerance itself is not necessary, entry for the tolerance can be omitted.

For a sequence 16 of the present example shown in FIG. 143, the upper and lower tolerances, relating to the specifications for the coordinates of the end point; a diameter of 20. H7, are automatically read and input to the tolerance symbol column in the following manner:

Specifically, the type of a hole: H of the dimensional tolerance file shown in FIG. 112 is read, and then an upper tolerance: +0.021 and a lower tolerance: 0.000 at an intersection between a row including a diameter of 20. and a column of the 7th grade are read. The thus read upper and lower tolerances are automatically input to columns 84 to 95. The result of the automatic entry of the data is shown in FIG. 143.

According to the method based on the tolerance calculating expression and the basic file, a tolerance (an upper tolerance or a lower tolerance) which forms foundations of the basic tolerance file, IT basic tolerance, an IT tolerance grade difference, and the promise relating to the tolerance, are grouped into a mathematical expression.

Upper and lower tolerances are obtained for the respective following cases by respective equations.

For the external machining operation:

1. Where the tolerance that forms the foundations for the basic tolerance file is an upper tolerance, (tolerance symbols: a, b, c, cd, e, ef, f, fg, g, and h)

Upper tolerance=upper tolerance which forms the foundations for the basic tolerance file (2)

Lower tolerance=the upper tolerance−IT basic tolerance (3)

2. Where the tolerance that forms the foundations for the basic tolerance file is a lower tolerance,
(tolerance symbols: j, k, m, n, p, r, s, t, u, v, x, y, z, za, zb, and zc)

Upper tolerance=lower tolerance+IT basic tolerance (4)

Lower tolerance=lower tolerance that forms the foundations for the basic tolerance file (5)

3. Tolerance symbol; js

Upper tolerance=+IT basic tolerance/2 (6)

Lower tolerance=−IT basic tolerance/2 (7), and

For an internal machining operation:

1. Where the tolerance that forms the foundations for the basic tolerance file is a lower tolerance,
(tolerance symbols: A, B, C, CD, E, EF, F, FG, G, and H)

Upper tolerance=lower tolerance+IT basic tolerance (4)

Lower tolerance=lower tolerance that forms the foundations for the basic tolerance file (5)

2. Where the tolerance that forms the foundations for the basic tolerance file is an upper tolerance,
(tolerance symbols: J, K, M, N, P, R, S, T, U, V, X, Y, Z, ZA, ZB, and ZC)

Upper tolerance=upper tolerance which forms foundations of the basic tolerance file (2)

Lower tolerance=the upper tolerance−IT basic tolerance (3)

3. Tolerance symbol; Js

Upper tolerance=+IT basic tolerance/2 (6)

Lower tolerance=−IT basic tolerance/2 (7), and

4. Tolerance symbols P–ZC for tolerance grades 3–7

Upper tolerance=upper tolerances that form the foundations for tolerance grades 8–16+IT tolerance grade (8)

Lower tolerance=upper tolerance−IT basic tolerance (3)

More specifically, with regard to the specifications for the coordinates of the end point of a diameter of 20. H7a associated with a sequence 16 of the present example shown in FIG. 143, upper and lower tolerances are automatically read, calculated, and input to the dimensional tolerance file in the following manner.

In FIG. 113, as can be seen from an intersection between a column (a tolerance symbol: the type of hole H) and a row (a diameter of 20.H7), the basic tolerance is 0. Further, as shown in FIG. 114, the IT basic tolerance is defined by an intersection between a column (a tolerance grade: IT7) and a row (a diameter of 20.). However, the row (a diameter of 20.) is within the extent of a row (from a diameter of 18 to a diameter of 30), and hence the intersection between the column (the tolerance grade: IT7) and the row (between the diameter of 18 and the diameter of 30) is 0.021.

The thus obtained basic tolerance and IT basic tolerance are substituted into the expressions (4) and (5), whereby Upper tolerance=lower tolerance+IT basic tolerance=0+0.021=+0.021, and Lower tolerance=the basic lower tolerance=0.

The results of these calculations are automatically input to columns 84 to 95.

FIG. 143 shows the result of the automatic entry of the upper and lower tolerances.

If the upper and lower tolerances of columns following the current column are automatically complemented by entry of tolerance symbols, they will be provided with such an abbreviation as “automatic entry”.

The finishing symbol is provided with a format which makes it possible to write reversed triangular displays in compliance with the old JIS system and a display of roughness in compliance with ISO, as required. According to the old JIS, the number of inverted triangles represents a degree of roughness. Symbols according to the old JIS and the finishing symbols of the present invention correspond to each other in the following manner: ~X: 0, ▽: 1, ▽▽: 2, ▽▽▽: 3, and ▽▽▽▽: 4. Further, the old JIS comprises finishing symbols 5:5 and 6:6 shown in FIG. 119. A finishing symbol is input together with a machining method symbol (see a machining method symbol file shown in FIG. 118), for example, L, M, MPC, or G. For example, 1L or 3G is also referred to as a finishing symbol in the present example.

Further, according to the ISO, a finishing symbol is input together with a numerical value of finished surface roughness. For example, a machining method symbol G is input to the finishing symbol column, and the numerical value for the finished surface roughness is input to the finished surface roughness column together with a symbol for designating a measuring method, e.g., a: mean roughness along the center line, S: the maximum height, and Z: ten-point means roughness. For example, (6.3a), (6.3S), or (6.3Z) is input to the finished surface roughness column.

The machining method symbol (FIG. 77) is input together with the finishing symbol.

A machining method symbol file is used in the following manner:

If 1 is input to an intersection between the finishing symbol row and the machining method symbol column, it is judged that a workpiece can be machined. On the other hand, if 0 is input to the intersection, it is judged that the workpiece cannot be machined.

If 5 or 6 of the finishing symbols are input to the intersection, it is judged that the entry of finished surface roughness is mandatory. If finished surface roughness has not yet been input, an alarm is sounded. A decision as to whether or not a workpiece can be machined is made by reading a finishing symbol number which refer to roughness ranked in four levels 1–4 in the machining method symbol file. If 1 is input to the intersection between the row of the finishing symbol number and the column of the machining method symbol of the machining method symbol file, it is judged that a workpiece can be machined. If 0 is input to the intersection, it is judged that the workpiece cannot be machined.

A numerical value of the finished surface roughness is input in micrometers. For example, 6.3S is input to the finished surface roughness column (If an indication using an inverted triangle in compliance with the old JIS is available, the entry for this column may be omitted).

Entry for configurational and positional accuracy is based on the JIS.

The entry for configurational and positional accuracy comprises three elements, that is, a symbol, a reference plane, and accuracy. Each of these elements is verified by checking an input item against a configurational and positional accuracy file shown in FIG. 139. As a result, it is checked whether or not the symbol is correct or whether or not the reference plane is necessary.

Details of the accuracy comprise straightness, flatness, circularity, cylindricity, parallelism, perpendicularity, concentricity, and runout. It is possible to input them respectively using symbols shown in (a) to (h) of FIG. 139.

The method for inputting the specifications for a taper, an angle, and a slope is the same as the method of inputting material that has previously been described.

Since the entry for the screw thread specifications has already been described in the above, it is omitted here.

The thermal refining specifications require entries such as a thermal refining symbol, the hardness of material obtained as a result of thermal refining, and the depth of material which is thermally refined.

As represented by an example shown in FIG. 138, the thermal refining symbol is composed of alphanumeric characters. This symbol is used for inputting the thermal refining specifications.

With regard to the hardness, a predetermined numerical value of hardness is input together with an abbreviated code of a designated hardness meter, e.g., Rockwell C hardness meter: HRC, Rockwell 15N hardness meter: 15N or HR15N, Vickers hardness meter: HV, and Brinell hardness meter: HB.

With regard to the depth, the required depth of material to be thermally refined that depends on material is specified.

A heat treatment symbol, specified hardness, and applicable material are checked against the contents of the file shown in FIG. 138, whereby a decision as to whether or not the input items are correct is made. If any inappropriate input item is found, an alarm is sounded to prompt the operator to correct it.

Entry for surface treatment is based on the JIS. For example, galvanization: MFZn20-c2 is input.

Entry for the above described items is carried out for all the columns (if no input item is available, it is not necessary to carry out an inputting operation).

Sequences 54 and 55 shown in FIG. 149 are examples of entry for specifications which are so long that they extend over more than one column.

In the present example, the entry for the specifications that extend over columns includes an input which has a reference column éP and a specified column 9 and an input which has a reference column 9 and a specified column 28.

The entry comprises the following items:

Reference column: 1, a distinction between a shoulder positioned at the starting point/a shoulder positioned at the end point in the reference position: E (either a starting point: S or an end point: E is selected for entry. The explanation of the identical or similar matter will be omitted hereinbelow.), a column designated as one to be machined: 9, a distance from the reference position: +50., a tolerance symbol: skipped, an upper tolerance: +0.050, and a lower tolerance: 0.

A sequence 56 shown in FIG. 149 is an example of entry with regard to specifications for a center hole to be machined in a subsequent step.

Angle: 60, and format: B4

Sequences 57 to 60 shown in FIG. 149 show an example of entry for an grooving operation.

Entry for the sequence 57 comprises: a groove number: 1, a reference column: 4, a distinction between a shoulder positioned at the starting point/a shoulder positioned at the end point (S/E): S, a column designated as one to be machined: 4, a distinction between a groove end face at the starting point/a groove end face at the end point with respect to the specified reference position (S/E): S, specifications for a distance from the shoulder; a distance from the shoulder positioned at the starting point/the shoulder positioned at the end point: 0., a tolerance symbol: skipped, an upper tolerance: skipped, a lower tolerance: skipped, the type of groove (If the types of groove are previously registered, a registered file is read and automatically input to this column by inputting a registration number, which in turn obviates the necessity of entry for items subsequent to the current item. However, in this example, the types of groove are not registered, and hence the entry for this column is skipped. Entry for the next column is then carried out.), specifications for a groove bottom; a diameter: 31., a tolerance symbol: skipped, an upper tolerance: skipped, a lower tolerance: skipped, a finishing symbol: 2L, the roughness of a finished surface: skipped, specifications for a groove width: a groove width: 5., a tolerance symbol: skipped, an upper tolerance: skipped, a lower tolerance: skipped, finishing of a groove end face on the starting point side; a finishing symbol: 2L, the roughness of a finished surface: skipped, a groove end face on the end point side; a finishing symbol: 2L, the roughness of a finished surface: skipped, specifications for removing corners of a groove: the size of the corner on the starting point side: 0.4, the size of the corner on the end point side: 0.4, specifications for chamfering a groove; a distinction between the chamfering of a groove on the starting point side/the removal of a corner of a groove on the starting point side (C/R): skipped, the extent of the chamfer or the corner removal: 0., a distinction between the chamfering of a groove on the end point side/the removal of a corner of a groove on the end point side (C/R): C, and the extent of the chamfer or the corner removal: 1.

Figure 50:
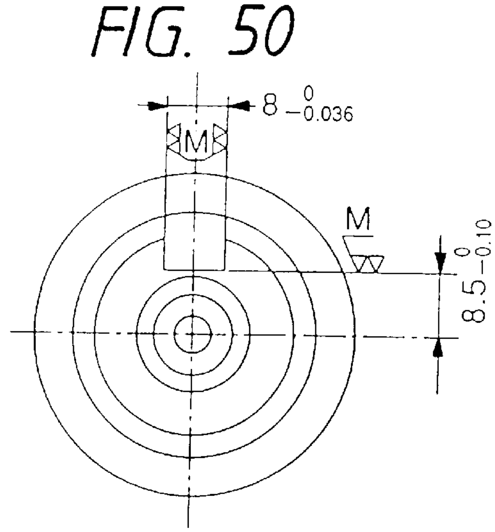
FIG. 50 is a schematic representation showing the finished shape of the workpiece (shown in FIG. 44) when viewed in the direction of the arrow E according to the embodiment of the present invention.

A sequence 61 shown in FIG. 150 is an example of the keyway shown in FIG. 50.

The entry for the sequence 61 comprises: a keyway number: 1, a previous stage: 38, a subsequent stage: 36, the classification of a keyway into segments (If the types of keyway are standardized and previously registered, a registered file is read and automatically input to this column by inputting a registration number, which in turn obviates the necessity of entry for items subsequent to the current item. However, in this example, the types of keyway are not registered, and hence the entry for this column is skipped. Entry for the next column is carried out.), specifications for the width of a keyway; a keyway width: 9., a tolerance symbol: skipped, an upper tolerance: 0., a lower tolerance: −0.03, a finishing symbol: 2M, the roughness of a finished surface: skipped, the entire length of a keyway: 30.82, specifications for the depth of a keyway; a column specified so as to be machined: 37, classification of the depth of a keyway: H (any one of a diameter method: W, a depth method: D, and a center method: H is selected as a method for specifying the depth of a keyway), the depth of a keyway: 8.5, a tolerance symbol: skipped, an upper tolerance: 0., a lower tolerance: −0.1, a finishing symbol: 2M, the roughness of a finished surface: skipped, and the type of keyway: 1 (The types of keyway are standardized and registered like, for example, a single boat bottom keyway: 1, a double boat bottom keyway: 2, a single round end-milled keyway: 3, a double end milled keyway: 4, and a slotted groove: 5. The type of cutter and the shape of a keyway can be specified by inputting one of these numbers into the column. The registered file is read and automatically input to the column, and hence it is not necessary to input a value to the segment of the cutter.). Unless the type of keyway is specified, the entry further comprises the following items; the specification of a cutting method: S (any one of an end milling cutter: E, the side cutter: S, and others: B is selected and input to this column), a cutter diameter: 45., specifications for the reference position of a keyway; a column of a shoulder: 38, a distinction between a shoulder positioned at the starting point/a shoulder positioned at the end point: E, a distance from the shoulder: 0., and an angle in relation to the reference position of a keyway: 0.

Figure 45:
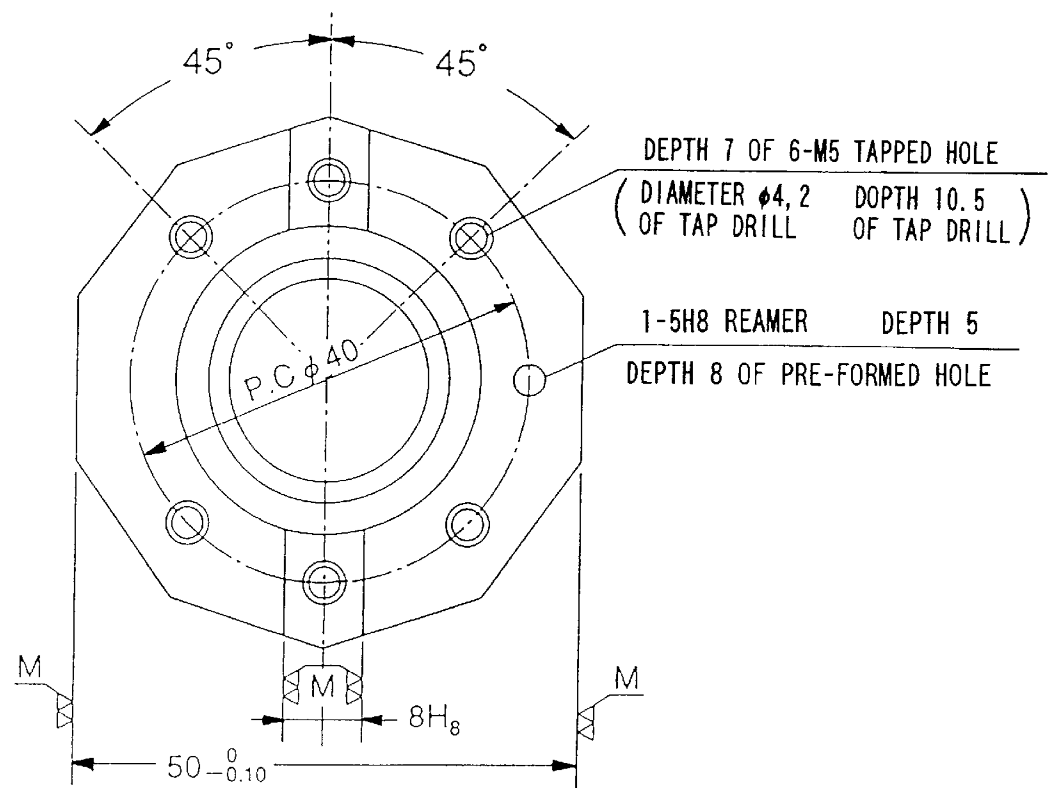
FIG. 45 is a schematic representation showing the finished shape of the workpiece (shown in FIG. 44) when viewed in the direction of the arrow A according to the embodiment of the present invention.
Figure 46:
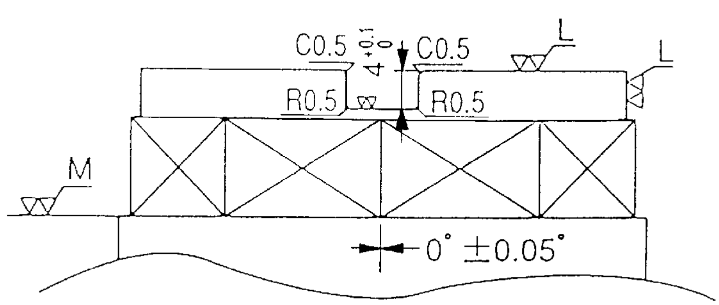
FIG. 46 is a bottom view showing the finished shape of the workpiece (shown in FIG. 44) when viewed in the direction of the arrow A according to the embodiment of the present invention.

Sequences 62 and 63 shown in FIG. 150 are examples of entry for the end-face keyway shown in FIG. 45.

The entry for the sequence 62 comprises: a keyway number: 2, a previous column: 8, a subsequent column; 10, the classification of a keyway as segments (If the types of keyway are standardized and previously registered, a registered file is read and automatically input to this column by inputting a registration number, which in turn obviates the necessity of entry for items subsequent to the current item. However, in this example, the types of keyway are not registered, and hence the entry for this column is skipped. Entry for the next column is then carried out.), specifications for a keyway width; the width of a keyway: 8., a tolerance symbol: H8 (A keyway width of 8. is specified as a parameter as a result of inputting this symbol, whereby an upper tolerance: 0. and a lower tolerance: +0.022 are automatically input to this column), a finishing symbol: 2M, the roughness of a finished surface: skipped, the entire length of a keyway: 9. (the keyway in the present example passes through a workpiece, and hence the keyway is input as a slotted keyway. For this reason, 9. is input to this column), specifications for the depth of a keyway; a column so as to be machined: 9, the depth of a keyway: 4., a tolerance symbol: skipped, an upper tolerance: +0.1, a lower tolerance: 0., a finishing symbol: 2M, the roughness of a finished surface: skipped, and the type of keyway: 5 (the method of specifying this column has already been described with reference to the keyway having a sequence number of 61.). Unless the type of keyway is specified, the entry further comprises the following items; the specification of a cutting method: B (the method of specifying this column has already been described with reference to the keyway having a sequence number of 61), a cutter diameter: skipped (the keyway of this example is to be slotted, and hence the specification of the cutter diameter is unnecessary), specifications for the reference position of a keyway; a column of a shoulder: 9, a distinction between a shoulder positioned at the starting point/a shoulder positioned at the end point: S (the method for specifying this column has already been described with reference to the keyway having a sequence number of 61), a distance from the shoulder: 0., and an angle in relation to the reference position of a keyway: 0.

Sequence number 63 designates a keyway which has a 180° phase shift with respect to the keyway having a sequence number 62. If a key number 3 is input to this column, data are continuously quoted from the above column. The quotation of data from the above column is finished by inputting +180. into the last entry of the column, that is, an angle in relation to the reference position of a keyway.

FIG. 151 is an example of entry for 1–5 reamed holes shown in FIG. 45. FIG. 45 is a plan view of the finished workpiece shown in FIG. 44 when viewed in the direction designated by A.

Entry for the sequence 64 comprises: the order of machining operations: 1, a hole number: 1, a column designated as one to be machined: 9, and the type of hole (If the types of hole are standardized and previously registered, a registered file is read and automatically input to this column by inputting a symbol and a registration number, which in turn obviates the necessity of entry for items subsequent to the current item.). However, in this example, the types of hole are not registered, and hence the entry further comprises a symbol: R (any one is selected from a drill: D, a reamer: R, the chamfering of a hole: C, the counter sinking of a hole: S, the tapering of a hole: T, and the drilling of a hole: B), specifications for the reference position of a hole; a hole number: 1, a rotating angle with respect to the reference value: −90°, a distinction between a shoulder positioned at the starting point/a shoulder positioned at the end point: skipped, the distance from the shoulder: skipped, the hole center with respect to the center axis: skipped, an angle in relation to the Z axis: skipped, an angle in relation to the X axis: skipped, an angle in relation to the Y axis: skipped, hole specifications; a hole column number: 1 (Although this file is provided with a format which makes it possible to input each of a number of diameters of concentrically multi-stepped holes, a hole stage number: 1 is input to this column in the present example, because a reamed hole of this example is a single step hole.), the extent of a taper/an angle: skipped, a tolerance symbol: H8 (A keyway width of 5. is specified as a parameter as a result of inputting this symbol, whereby an upper tolerance: +0.018 and a lower tolerance: 0. are automatically input to this column), a finishing symbol: 3DR, the roughness of a finished surface: skipped, specifications for counterbores and countersinks; a distinction between a counterbore/a countersink: S (either a counterbore: C or a countersink: S is selected as entry for this column), the diameter of a counterbore/a countersink: 6., a countersink angle: 90°, specifications for hole depth; the specification of the method of measuring the hole depth: D (any one of a diametral method; W, a depth method: D, and the center method: H is selected), the depth of a hole: 5., a distinction between a hole passing through a workpiece/a hole which does not pass through the workpiece (P/S): S (either a through hole: P or a hole which does not pass through the workpiece: S is selected), a tolerance symbol: skipped, an upper tolerance: skipped, a lower tolerance: skipped, a finishing symbol for a hole bottom: skipped, the roughness of a finished hole bottom; skipped, the number of holes: 1, specifications (1) for the position of a hole; a machining pitch diameter: 40., the specification of separation of a circumference (C/N): C (either the separation of a circumference at an equivalent flute spacing angle: C or the separation of a circumference at non-equivalent flute spacing angles: N is selected), a hole number: 1, and a flute spacing angle: 0.

The position of a reamed hole can be input by defining its coordinates in the X-Y coordinate using the specifications (2) for the hole position.

The above example relates to an example of entry for a simply reamed hole. However, as can be seen from the input format, the input method used in the above example is provided with an input format capable of coping with all types of hole, a multi-stepped hole, and an angle at which a hole is drilled, and an input format capable of allowing the entry of the position of concentrical holes and the position of a hole on the X-Y coordinates. The present machining method is further provided with a processing method capable of outputting an instruction value which makes it possible to ream the hole.

FIG. 152 is an example of entry for 6-M5 screw hole shown in FIG. 45. FIG. 45 is a plan view of the finished workpiece shown in FIG. 44 when viewed in the direction designated by A. With regard to 6-M5 screw hole shown in FIG. 45, four holes spaced 90° apart from each other are input to a sequence 65, and two holes spaced 180° apart from each other are input to a sequence 66.

Entry for the sequence 65 comprises: the order of a machining operation: 1, a tapped hole number: 1, a column designated as one to be machined: 9, and the type of tapped hole (If the types of hole are standardized and previously registered, a registered file is read and automatically input to this column by inputting a symbol and a registration number, which in turn obviates the necessity of entry for items subsequent to the current item.). However, in this example, the types of hole are not registered, and hence the entry further comprises a symbol: M (any one is selected from a metric screw thread: M, a Whitworth screw thread: W, a unified screw thread: UNC and UNF, a parallel pipe thread: G, and a taper pipe thread: R, Rc, Rp.), specifications for the reference position of a tapped hole; a reference tapped hole number: 1, a rotating angle with respect to the reference value: −45°, a distance from a shoulder positioned at the starting point/a shoulder positioned at the end point: skipped, the hole center with respect to the center axis: skipped, an angle in relation to the Z axis: skipped, an angle in relation to the X axis: skipped, an angle in relation to the Y axis: skipped, tapped hole specifications (a); a tap diameter: 5., a tap pitch: 0.8, a distinction between a right-hand tapped hole/a left-hand tapped hole (R/L): R (either a right-hand tapped hole: R or a left-hand tapped hole: L is selected), the number of tapped holes: 4, specifications for the hole position (1); a machining pitch diameter: 40., the specification of a circumferential flute spacing angle (C/N): C (either an equal circumferential flute spacing angle: C or unequal circumferential flute spacing angle: N is selected), a tapped hole number: 1, a flute spacing angle: −90°, tapped hole specifications (b); a shape: S (any one of a taper: T, an angle: A, and a straight: S is selected), the extent of a taper/an angle: skipped, specifications for counterbores and countersinks; a distinction between a counterbore/a countersink: S (either a counterbore: C or a countersink: S is selected as entry for this column), the diameter of a counterbore/a countersink: 5.2, a countersink angle: 90°, the specification of the method of measuring the hole depth: skipped (if the method is specified, any one of a diametral method; W, a depth method: D, and the center method: H is selected), the depth of a hole: skipped, specifications for the depth of a tapped hole; a depth: 7., a distinction between a hole passing through a workpiece/a hole which does not pass through the workpiece: S (either a through hole: P or a hole which does not pass through the workpiece: S is selected), specifications for a pre-formed hole for tapping purposes; a pre-formed hole diameter: 4.2, and the depth of a pre-formed hole: 10.5.

The present example relates to an example of entry for a tapped hole formed at an ordinary location. However, as can be seen from the input format, the input method used in the above example is provided with an input format capable of coping with all angles at which a tapped hole is formed, and an input format capable of allowing the entry of the position of concentrical holes and the position of a hole on the X-Y coordinates. The present machining method is further provided with a processing method capable of outputting an instruction value which makes it possible to tap the hole.

Entry for the sequence 66 is quoted from the entry for the sequence 65. Items whose values are different from those of the items of the sequence 65 are the order of a machining operation: 2, a tapped hole number: 2, a rotating angle with respect to the reference position: 0°, the number of tapped holes: 2, and a flute spacing angle: −180°.

Sequences 67 and 68 shown in FIG. 153 are examples of entry for an internal cam shown in FIG. 48. FIG. 48 is a schematic representation of the workpiece shown in FIG. 45 taken along line C—C.

Entry for the sequence 67 comprises: a cam number: 1, a column designated as one to be machined: 4, specifications for the standards of an internal cam; a reference angle: 0°, a reference circle: 22., the type of cam (If the types of cam are standardized and previously registered, a registered file is read and automatically input to this column by inputting a registration number, which in turn obviates the necessity of entry for items subsequent to the current item.). However, in the present example, the types of cam are not registered, and hence the entry for this column is skipped. The entry further comprises a point number: 1, specifications for the coordinates of the starting point; a distance from the center: 11., a tolerance symbol: H6 (Although the tolerance symbol used in the drawing is H8, the distance from the center is taken as a radius of the cam so as to increment the tolerance grade. In this way, the distance is changed so as to be equal to the diameter, and the thus changed distance is input. If H6 is input to this column, the distance from the center: 11. is specified as a parameter, whereby an upper tolerance: +0.011 and a lower tolerance: 0. are automatically input.), an angle: 0°, an upper allowable value: +0.001°, a lower allowable value: −0.001°, specifications for the coordinates of the end point; a distance from the center: 19., a tolerance symbol: H6 (Although the tolerance symbol used in the drawing is H8, the distance from the center is taken as a radius of the cam so as to increment the tolerance grade. In this way, the distance is changed so as to be equal to the diameter, and the thus changed distance is input. If H6 is input to this column, the distance from the center: 15. is specified as a parameter, whereby an upper tolerance: +0.011 and a lower tolerance: 0. are automatically input.), an angle of a circular arc: skipped, a distance from the center of the circular arc: skipped, finishing of a cam surface; a finishing symbol: 2M, the roughness of a finished surface: skipped, specifications for chamfering the cam; a distinction between the chamfering the corner of the cam on the starting side/the removal of the corners of the cam (C/R): skipped (the chamfering of the cam or the removal of the corners of the cam can be carried out so long as the system is provided with a special tool. Therefore, if it is desired to chamfer the cam or remove the corners of the cam, the system is provided with a tool, and input either the chamfering of the cam or the removal of the corners of the cam into this column. In this way, it is not necessary to skip the entry for this column.), the extent of the chamfering operation or the corner removal operation: skipped, a distinction between the chamfering of cam on the end point side/the removal of the corners of the cam (C/R): C, and the extent of the chamfering operation or the corner removal operation: 0.5.

The sequence 68 is entry for the second point. The entry for this sequence is quoted from the sequence 67.

The above described example of the entry is an example of entry for the coordinates of the starting and end points and the radius of a circular arc. The above described entry has a format which basically makes it possible to input a sequence of points. As can be seen from this input format, the input format is also provided with an input format which makes it possible to specify the coordinates of the center of the circular arc by use of an angle of the center of the circular arc and a distance between the circular arc and its center, instead of the use of the radius of the circular arc. The present machining method is provided with a processing method capable of outputting an instruction value which makes it possible to machine the internal cam.

Figure 51:
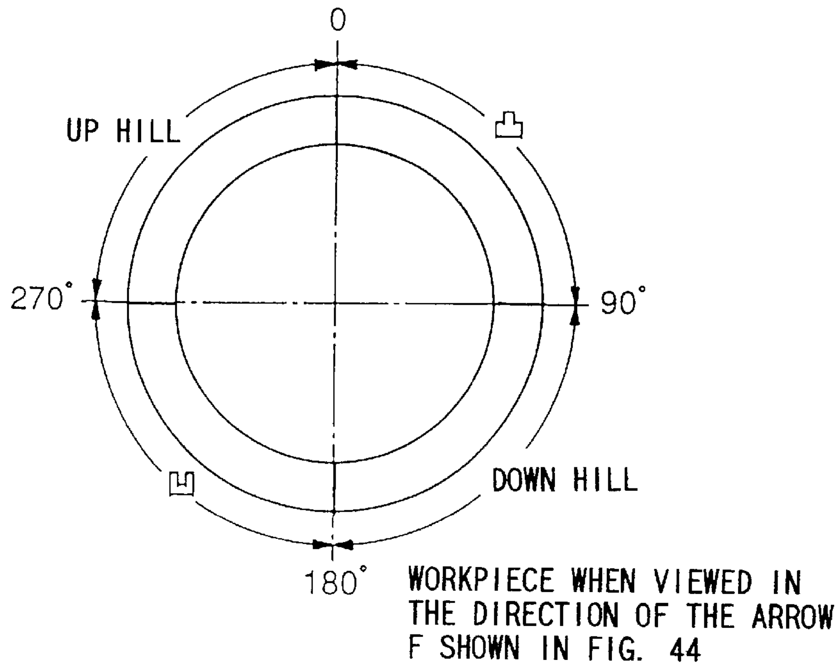
FIG. 51 is a schematic representation showing the finished shape of the workpiece (shown in FIG. 44) when viewed in the direction of the arrow F according to the embodiment of the present invention.
Figure 52:
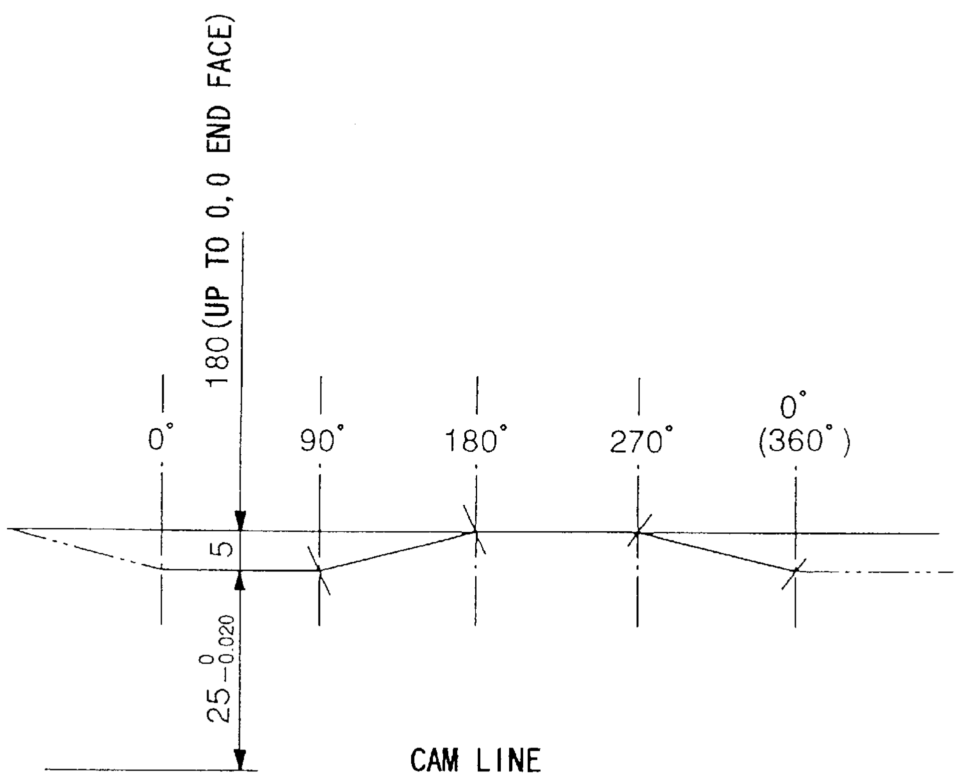
FIG. 52 is a cam diagram showing the finished shape of the workpiece (shown in FIG. 44) when viewed in the direction of the arrow F according to the embodiment of the present invention.

Sequences shown in FIG. 154 are examples of entry for an end cam shown in FIGS. 51 and 52. FIGS. 51 and 52 are plan views of the finished workpiece shown in FIG. 44 when viewed in the direction designated by F.

Entry for the sequence 69 comprises: a cam number: 2, a column designated as one to be machined: 15, specifications for an end cam; a reference angle: 0°, a reference circle: 61., a reference column: 9., and the type of cam (If the types of cam are standardized and previously registered, a registered file is read and automatically input to this column by inputting a registration number and a symbol, which in turn obviates the necessity of entry for items subsequent to the current item.). However, in the present example, the types of cam are not registered, and hence the entry for this column is skipped. The entry further comprises a point number: 1, specifications for the coordinates of the starting point; an angle: 0°, upper tolerance: skipped, lower tolerance: skipped, a distinction between a cam close to a shoulder positioned at the starting point/a cam close to a shoulder positioned at the end point: E, a distance from the shoulder: −25., a tolerance symbol: skipped, an upper tolerance: 0., a lower tolerance: −0.020, specifications for the radius of a circular arc; the extent of the radius: skipped, a tolerance symbol: skipped, an upper tolerance: skipped, a lower tolerance: skipped, an angle of the center of the circular radius: skipped, a distinction between the center of a circular arc at the starting point/a circular arc at the end point (S/E): skipped, a distance from the shoulder of the circular arc: skipped, specifications for finishing a cam surface; a finishing symbol: 2M, the roughness of a finished surface: skipped, specifications for chamfering a cam; a distinction between the chamfering of the outer circumference of the cam/the removal of corners at the outer circumference of the cam (C/R): C (either the chamfering of the cam: C or the removal of the cam: R is selected), the extent of the chamfering operation or the corner removal operation: 0.5, a distinction between the chamfering of the inner circumference of the cam/the removal of corners at the inner circumference of the cam (C/R): skipped, and the extent of the chamfering operation or the corner removal operation: skipped.

The above described example of the entry is an example of entry for the coordinates of the starting and end points. The above described entry has a format which basically makes it possible to input a sequence of points. As can be seen from this input format, the input format is also provided with an input format which makes it possible to specify a curved surface of a circular arc by means of the radius of the circular arc, an angle of the center of the circular arc, and a distance between the center of the circular arc and the shoulder. The present machining method is provided with a processing method capable of outputting an instruction value which makes it possible to machine the end cam.

Figure 53:
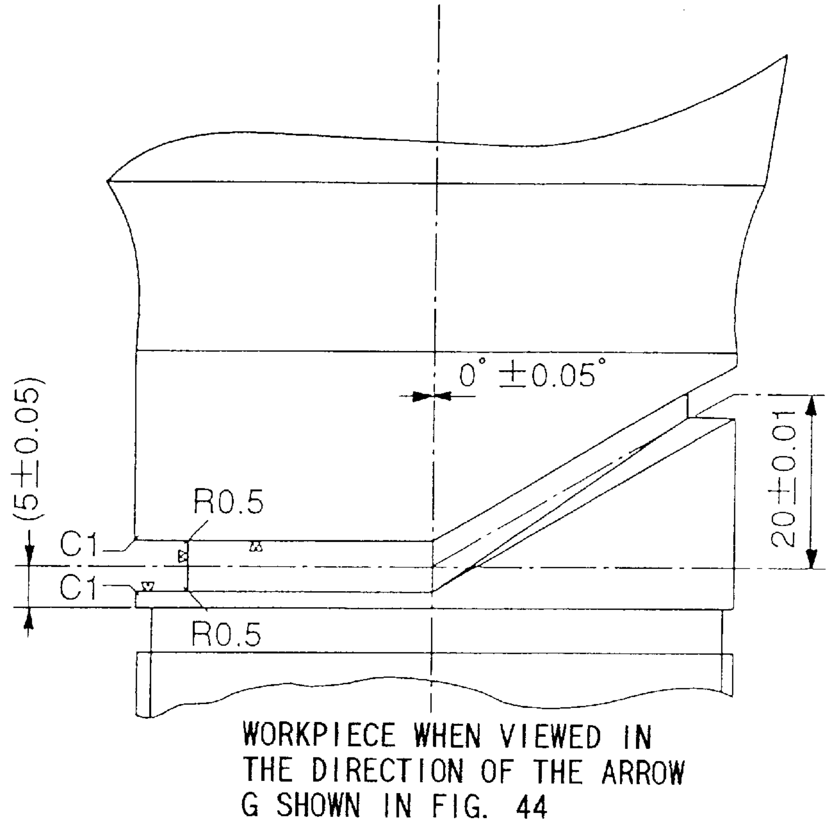
FIG. 53 is a schematic representation showing the finished shape of the workpiece (shown in FIG. 44) when viewed in the direction of the arrow G according to the embodiment of the present invention.
Figure 54:
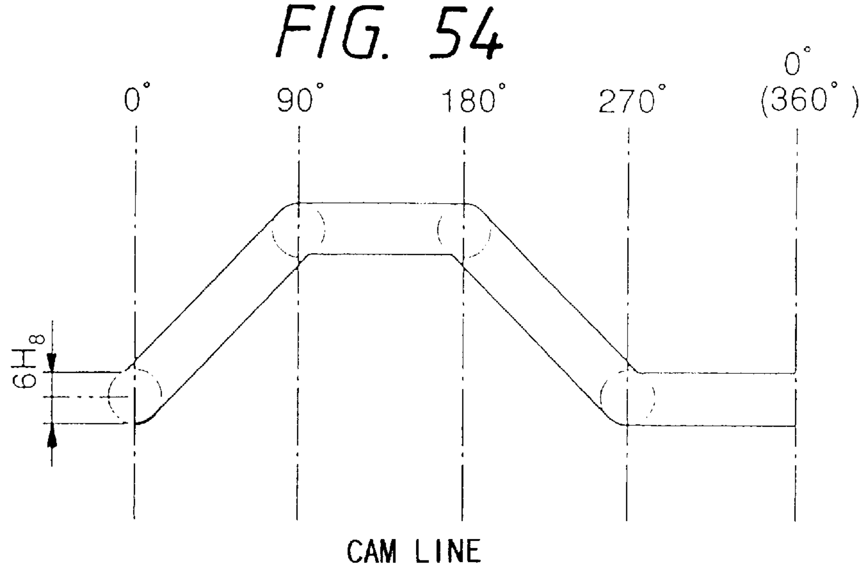
FIG. 54 is a cam diagram showing the finished shape of the workpiece (shown in FIG. 44) when viewed in the direction of the arrow G according to the embodiment of the present invention.

Sequences 73 to 76 shown in FIG. 155 are examples of entry for a grooved cylindrical cam shown in FIGS. 53 to 54. FIGS. 53 and 54 are plan views of the finished workpiece shown in FIG. 44 when viewed in the direction designated by G.

Entry for the sequence 73 comprises: a cam number: 3, a column designated as one to be machined: 20, specifications for a cylindrical cam; a reference angle: 0°, a distinction between a cam close to a shoulder positioned at the starting point/a cam close to a shoulder positioned at the end point (S/E): S, a distance from the shoulder: −5, and the type of cam (If the types of cam are standardized and previously registered, a registered file is read and automatically input to this column by inputting a registration number and a symbol, which in turn obviates the necessity of entry for items subsequent to the current item.). However, in the present example, the types of cam are not registered, and hence the entry for this column is skipped. The entry further comprises a point number: 1, specifications for the coordinates of the starting point; an angle: 0°, an upper allowable value: +0.05°, a lower allowable value: −0.05°, specifications for the coordinates of the end point; an angle: +90°, an upper allowable value: skipped, a lower allowable value: skipped, a length: −20, a tolerance symbol: skipped, an upper tolerance: +0.01, a lower tolerance: −0.01, specifications for the radius of a circular arc; the extent of the radius: skipped, a tolerance symbol: skipped, an upper tolerance: skipped, a lower tolerance: skipped, an angle of the center of the circular arc: skipped, a distinction between the center of a circular arc at the starting point/a circular arc at the end point (S/E): skipped, a distance from the shoulder of the circular arc: skipped, and the type of groove (If the types of groove are standardized and previously registered, a registered file is read and automatically input to this column by inputting a registration number and a symbol, which in turn obviates the necessity of entry for items subsequent to the current item.). However, in the present example, the types of groove are not registered, and hence the entry for this column is skipped. The entry further comprises specifications for the width of a groove: 6., a tolerance symbol: H8 (If H8 is input to this column, a groove width: 6. is specified as a parameter, whereby an upper tolerance: +0.018 and a lower tolerance: 0. are automatically input.), a finishing symbol relating to the left side portion of the groove: 2M, the roughness of a finished surface: skipped, a finishing symbol relating to the right side portion of the groove: 2M, the roughness of a finished surface: skipped, specifications for the depth of the groove; a depth: 5, a tolerance symbol: skipped, an upper tolerance: skipped, a lower tolerance: skipped, a finishing symbol: 2M, the roughness of a finished surface: skipped, specifications for removing corners of the groove; the extent of removing corners of the left side of the groove: 0.5, the extent of removing corners of the right side of the groove: a value is quoted from the left column (A value is quoted from the left column by use of a special key or a soft menu key set to quotation.), (0.5), specifications for chamfering the groove; a distinction between the chamfering of an angular portion on the left side of the groove/the removal of corners on the left side of the groove (C/R): C, the extent of the chamfering operation or the corner removal operation: 1., a distinction between the chamfering of an angular portion on the right side of the groove/the removal of corners on the right side of the groove (C/R): C, and the extent of the chamfering operation or the corner removal operation: a value is quoted from the left column (i.e., 1.).

The above described example of the entry is an example of entry for the coordinates of the starting and end points. The above described entry has a format which basically makes it possible to input a sequence of points. As can be seen from this input format, the input format is also provided with an input format which makes it possible to specify a curved surface of a circular arc by means of the radius of the circular arc, an angle of the center of the circular arc, and a distance between the center of the circular arc and the shoulder. The present machining method is provided with a processing method capable of outputting an instruction value which makes it possible to machine the grooved cylindrical cam.

Figure 55:
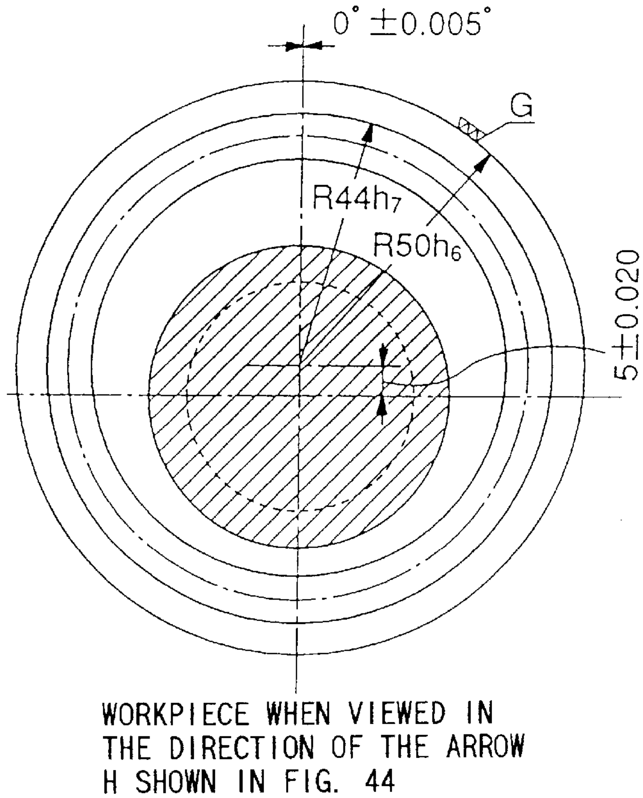
FIG. 55 is a schematic representation showing the finished shape of the workpiece (shown in FIG. 44) when viewed in the direction of the arrow H according to the embodiment of the present invention.

Sequences 77 to 78 shown in FIG. 156 are examples of entry for an external cam shown in FIG. 55. FIG. 55 is a plan view of the finished workpiece shown in FIG. 44 when viewed in the direction designated by H.

Entry for the sequence 77 comprises: a cam number: 4, a column designated as one to be machined: 27, specifications for an outer cam; a reference angle: 0°, a reference circle: 110., and the type of external cam (If the types of external cam are standardized and previously registered, a registered file is read and automatically input to this column by inputting a registration number and a symbol, which in turn obviates the necessity of entry for items subsequent to the current item.). However, in the present example, the types of external cam are not registered, and hence the entry for this column is skipped. The entry further comprises a point number: 1, specifications for the coordinates of the starting point; a distance from the center: 55., a tolerance symbol: skipped, an upper tolerance: skipped, a lower tolerance: skipped, an angle: 0°, an upper allowable value: +0.05°, a lower allowable value: −0.05, specifications for the coordinates of the end point; a distance from the center: 40., a tolerance symbol: skipped, an upper tolerance: skipped, a lower tolerance: skipped, an angle: 190°, an upper allowable value: skipped, a lower allowable value: skipped, specifications for the radius of a circular arc; the extent of the radius: 50., a tolerance symbol: h6 (If h6 is input to this column, the extent of a radius: 50. is specified as a parameter, whereby an upper tolerance: 0.0 and a lower tolerance: −0.01 are automatically input.), an angle of the center of the circular arc: skipped, a distance from the center of the circular arc: skipped, specifications for finishing a cam surface; a finishing symbol: 3G, the roughness of a finished surface: skipped, specifications for the chamfering or removing of corners of the cam close to the starting point of the cam width; a distinction between the chamfering of the portion of the cam close to the starting point of the cam width/the removal of corners of the cam close to the starting point of the cam width (C/R): C, the extent of the chamfering operation or the corner removal operation: 0.5., specifications for the chamfering or removing of corners of the cam close to the end point of the cam width; a distinction between the chamfering of the portion of the cam close to the end point of the cam width/the removal of corners of the cam close to the end point of the cam width (C/R): C, and the extent of the chamfering operation or the corner removal operation: a value is quoted from the left column (0.5).

Similarly, entry for the sequence 78 is carried out. The result of the entry for the sequence 78 is shown in FIG. 156.

The above described example of the entry is an example of entry for the coordinates of the starting and end points and the radius of the circular arc. The above described entry has a format which basically makes it possible to input a sequence of points. As can be seen from this input format, the input format is also provided with an input format which makes it possible to specify an arbitrary curved surface of a circular arc by means of the radius of the circular arc, an angle of the center of the circular arc, and a distance between the center of the circular arc and the shoulder. The present machining method is provided with a processing method capable of outputting an instruction value which makes it possible to machine the external cam.

Figure 56:
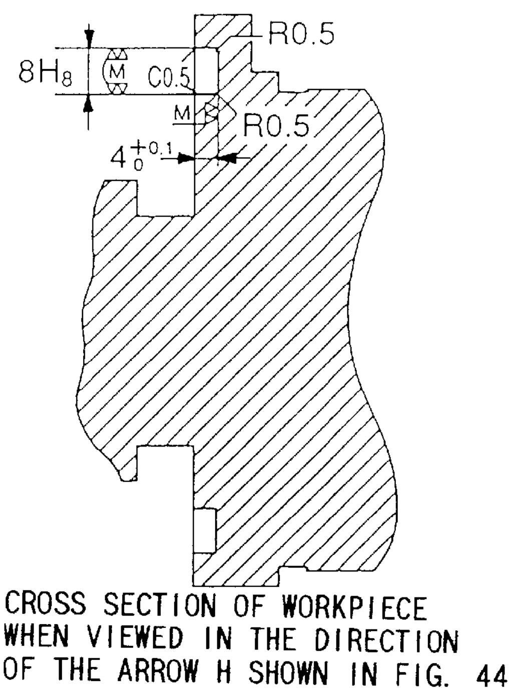
FIG. 56 is a cross section showing the finished shape of the workpiece (shown in FIG. 44) when viewed in the direction of the arrow H according to the embodiment of the present invention.
Figure 76:
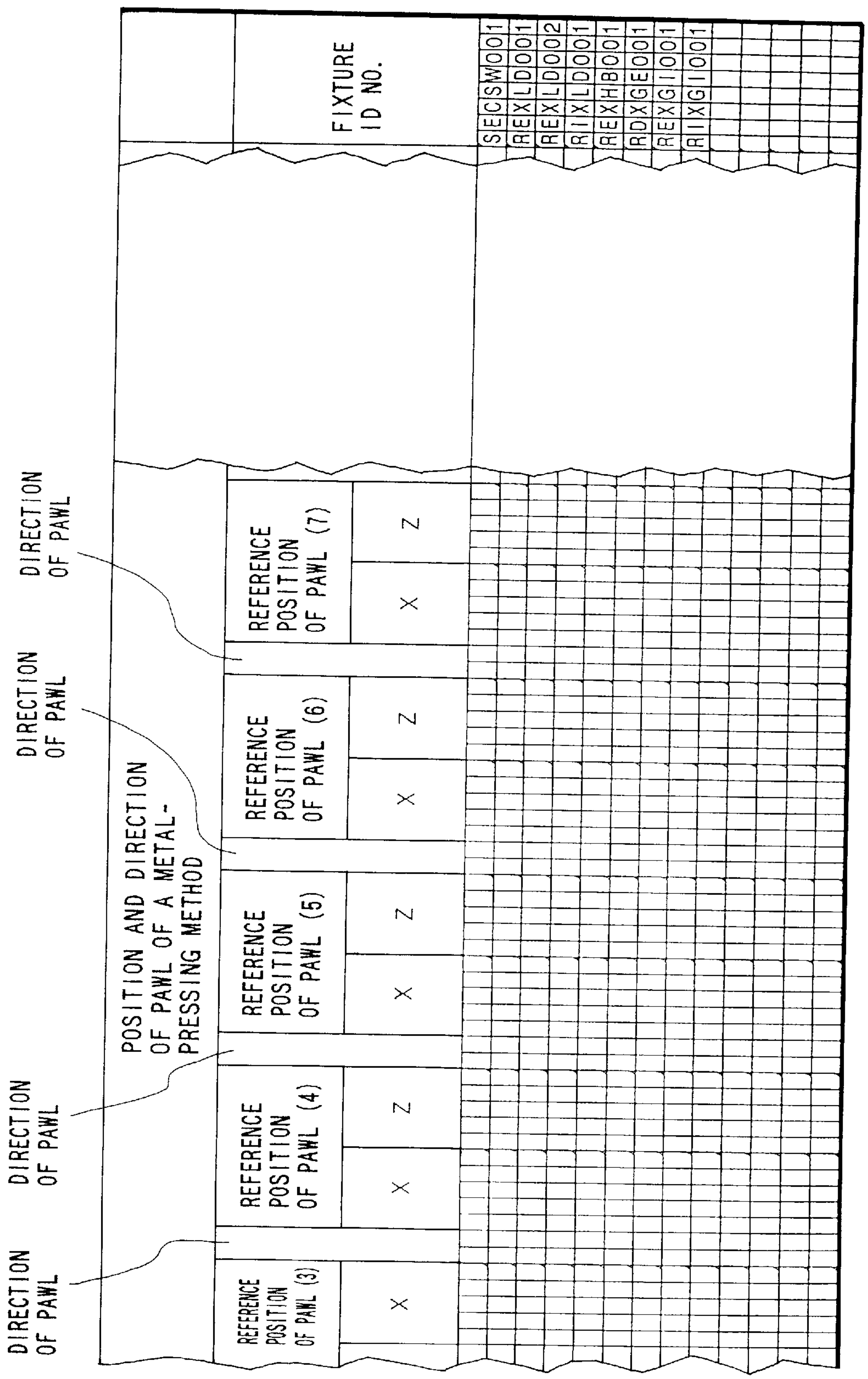
FIG. 76 is a descriptive drawing showing the data entry of an attaching method (4/4) according to the embodiment of the present invention.

Sequences 79 to 80 shown in FIG. 157 are examples of entry for a grooved end cam shown in FIGS. 55 and 56. FIGS. 55 and 56 are plan views of the finished workpiece shown in FIG. 44 when viewed in the direction designated by H.

Entry for the sequence 79 comprises: a cam number: 5, a column designated as one to be machined: 28, and the type of grooved end cam (If the types of grooved end cam are standardized and previously registered, a registered file is read and automatically input to this column by inputting a registration number and a symbol, which in turn obviates the necessity of entry for items subsequent to the current item.). However, in the present example, the types of grooved end cam are not registered, and hence the entry for this column is skipped. The entry further comprises a point number: 1, specifications for the coordinates of the starting point; a distance from the center: 49., a tolerance symbol: skipped, an upper tolerance: skipped, a lower tolerance: skipped, an angle: 0°, an upper allowable value: skipped, a lower allowable value: skipped, specifications for the coordinates of the end point; a distance from the center: 39., a tolerance symbol: skipped, an upper tolerance: skipped, a lower tolerance: skipped, an angle: 180°, an upper allowable value: skipped, a lower allowable value: skipped, specifications for the radius of a circular arc; the extent of the radius: −44., a tolerance symbol: h7 (If h7 is input to this column, the extent of a radius: −44. is specified as a parameter, whereby an upper tolerance: 0. and a lower tolerance: −0.018 are automatically input.), the center of the circular arc; a distance between the center of the radius and the center of the circular arc: skipped, an angle of the center of the circular arc with respect to the reference point: skipped, and the type of groove (If the types of groove are standardized and previously registered, a registered file is read and automatically input to this column by inputting a registration number and a symbol, which in turn obviates the necessity of entry for items subsequent to the current item.). However, in the present example, the types of groove are not registered, and hence the entry for this column is skipped. The entry further comprises specifications for the width of a groove: 8., a tolerance symbol: H8 (If H8 is input to this column, a groove width: 8. is specified as a parameter, whereby an upper tolerance: +0.018 and a lower tolerance: 0. are automatically input.), the finishing of the portion of the groove having a smaller diameter; a finishing symbol: 2M, the roughness of a finished surface: skipped, specifications for the depth of a cam grove; a depth: 4, a tolerance symbol: skipped, an upper tolerance: +0.1, a lower tolerance: 0., a finishing symbol: 2M, the roughness of a finished surface: skipped, specifications for removing corners at the groove bottom; the extent of removing the corners from the portion of the groove having a smaller diameter: 0.5, the extent of removing the corners from the portion of the groove having a larger diameter: 0.5, specifications for chamfering the groove; a distinction between the chamfering of the portion of the groove having a smaller diameter/the removal of corners from the portion of the groove having a smaller diameter (C/R): C (either a chamfering operation C or a corner removal operation R is selected), the extent of the chamfering operation or the corner removal operation: 0.5, a distinction between the chamfering of the portion of the groove having a larger diameter/the removal of corners from the portion of the groove having a larger diameter (C/R): a value quoted from the left column (i.e., C), and the extent of the chamfering operation or the corner removal operation: a value quoted from the left column (i.e., 0.5).

The above described example of the entry is an example of entry for the coordinates of the starting and end points and the radius of the circular arc. The above described entry has a format which basically makes it possible to input a sequence of points. As can be seen from this input format, the input format is also provided with an input format which makes it possible to specify an arbitrary curved surface of a circular arc by means of the specification of the center of the circular arc: a distance between the center of the radius and the center of the circular arc, an angle of the center of the circular radius with respect to the reference point, or the X and Y coordinates. The present machining method is provided with a processing method capable of outputting an instruction value which makes it possible to machine the end grooved cam.

FIG. 158 shows an example of entry for an equilateral decagon shown in FIG. 45. FIG. 45 is a plan view of the finished workpiece shown in FIG. 44 when viewed in the direction designated by A.

Entry of a sequence 81 comprises a plane number: 1, specifications for the reference position; a previous stage: 11, a column designated as one to be machined: 12, a distinction between an equilateral decagon positioned on the starting point side/an equilateral decagon positioned on the end point side (S/E): S, a distance from a shoulder: 0., an angle: 0., the type of plane (If the types of plane are standardized and previously registered, a registered file is read and automatically input to this column by inputting a registration number and a symbol, which in turn obviates the necessity of entry for items subsequent to the current item.). However, in the present example, the types of plane are not registered, and hence the entry for this column is skipped. The entry further comprises the number of planes:éPo, plane specifications; the extent of width of the plane: −10., a tolerance symbol: skipped, an upper tolerance: skipped, a lower tolerance: skipped, a side plane finishing symbol relating to the reference position side of the equilateral decagon: skipped, the roughness of a finished surface: skipped, a side finishing symbol relating to the opposite side of the equilateral decagon to the reference position: 2M, the roughness of a finished surface: skipped, specifications for the depth of a cylindrical outside plane; a column designated as one to be measured: 12, the specification of a method for measuring the depth of the equilateral decagon: H (any one of a diameter width method: W, a depth method: D, and a center method: H is selected), a depth: 25., a tolerance symbol: skipped, an upper tolerance: 0., a lower tolerance: −0.05, a finishing symbol: 2M, and the roughness of a finished surface: skipped.

FIG. 159 shows an example of entry for an internal gear shown in FIG. 47. FIG. 47 is a plan view of the finished workpiece shown in FIG. 44 taken along line B—B.

Entry for a sequence 82 comprises: an internal gear number: 1, specifications for the reference position; a previous stage 5, a subsequent stage 7, a column designated as one to be machined: 6, a distinction between an internal gear close to a shoulder positioned on the starting point/an internal gear close to a shoulder positioned on the end point (S/E): E, a distance from the shoulder: 10., an angle: 0°, and the type of gear (If the types of gear are standardized and previously registered, a registered file is read and automatically input to this column by inputting a registration number and a symbol, which in turn obviates the necessity of entry for items subsequent to the current item.). However, in the present example, the types of gear are not registered, and hence the entry for this column is skipped. The entry further comprises specifications for a gear; a distinction between a spur gear/a helical gear (S/H): S (either a spur gear: S or a helical gear: H is selected), a cross section for reference purposes: T (either a plane orthogonal to the gear: T or a plane orthogonal to the axis: A is selected), a tooth profile: JISB1701 (one of standard numbers JISB1702, ISOR53, and USASB6.1 is selected.), a module: 1.5, a pressure angle: 20., the number of teeth: 18, a helix angle: 0., a lead: skipped, a distinction between an angle/a lead (A/L): skipped, an upper allowable value: skipped, a lower allowable value: skipped, a tooth width (an effective tooth width): 10., specifications for an overpin; an overpin diameter: 23.648, an upper tolerance: 0.06, a lower tolerance: 0., a pin diameter: 2.52, finishing specifications; a method; E (any one of a hobbing method: H, a cutting method using a gear shaper: S, a tooth grinding method: G, a shaving method: V, a gear honing method: R, and an electric discharge machining method: E is selected), a finishing symbol: skipped, and the roughness of a finished surface: 3.0S. In addition, the input format is further provided with a format which makes it possible to input specifications for a base tangent length associated with a method for measuring a tooth thickness of a gear; a tooth thickness, the number of teeth used for determining a base tangent length, a tolerance symbol, an upper tolerance, and a lower tolerance, whereby entry having a higher degree of freedom becomes available.

FIG. 160 shows an example of entry for an external gear shown in FIG. 57. FIG. 57 is a plan view of the finished workpiece shown in FIG. 44 taken along line J—J.

Entry for a sequence 83 comprises: an external gear number: 1, specifications for the reference position; a previous stage 30, a subsequent stage 32, a column designated as one to be machined: 31, a distinction between an external gear close to a shoulder positioned on the starting point/an external gear close to a shoulder positioned on the end point (S/E): S, a distance from the shoulder: 0., an angle: 0°, and the type of gear (If the types of gear are standardized and previously registered, a registered file is read and automatically input to this column by inputting a registration number and a symbol, which in turn obviates the necessity of entry for items subsequent to the current item.). However, in the present example, the types of gear are not registered, and hence the entry for this column is skipped. The entry further comprises specifications for a gear; a distinction between a spur gear/a helical gear (S/H): S (either a spur gear: S or a helical gear: H is selected), a cross section for reference purposes: T (either a plane orthogonal to the gear: T or a plane orthogonal to the axis: A is selected), a tooth profile: JISB1701 (one of standard numbers JISB1702, ISOR53, and USASB6.1 is selected.), a module: 2.5, a pressure angle: 20., the number of teeth: 19, a helix angle: 0., a lead: skipped, a distinction between an angle/a lead (A/L): skipped, an upper allowable value: skipped, a lower allowable value: skipped, a tooth width (an effective tooth width): 10., specifications for a base tangent length; a tooth thickness: 18.451, the number of teeth used for determining the base tangent length: 3, a tolerance symbol: skipped, an upper tolerance: −0.01, a lower tolerance: −0.025, finishing specifications; a method; H (any one of a hobbing method: H, a cutting method using a gear shaper: S, a tooth grinding method: G, a shaving method: V, a gear honing method: R, and an electric discharge machining method: E is selected), a finishing symbol: 3H, and the roughness of a finished surface: skipped. In addition, the input format is further provided with a format which makes it possible to input specifications for an overpin associated with a method for measuring a tooth thickness of a gear; an overpin diameter, an upper tolerance, a lower tolerance, and a pin diameter, whereby entry having a higher degree of freedom becomes available. Through the above described inputting operations, processing associated with step 3 is now completed.

Figure 8:
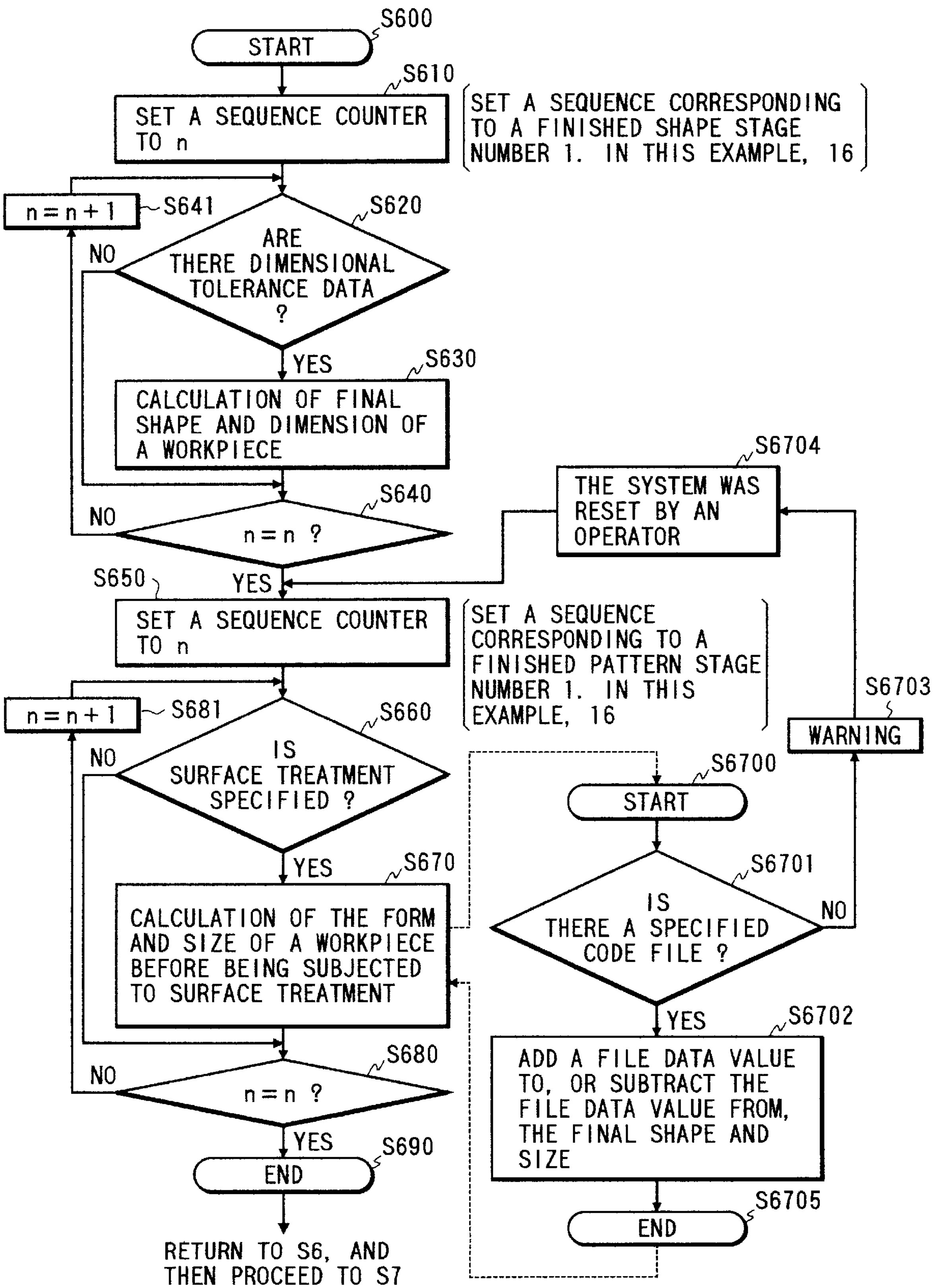
FIG. 8 is a flowchart for processing a finished shape pattern, with regard to step 6 of the processing method according to the embodiment of the present invention.

In step 6, a finished pattern will be processed according to procedures shown in FIG. 8.

Based on the input data, the dimension and shape of a workpiece finally obtained as a result of a machining operation are determined, and the dimension and shape of a workpiece before it undergoes surface treatment are calculated.

The final mean dimension of a finished workpiece is calculated from the data on the final dimension and shape of a finished workpiece that include entry for items, namely, a diameter, a length, a radius, a width, a depth, an angle, a nominal diameter of a screw thread, and a tolerance symbol or tolerance (an upper tolerance and a lower tolerance).

Where the workpiece is subjected to surface treatment, the final dimension and shape of the workpiece may be increased or decreased. For this reason, in addition to the above described calculating operation, an error resulting from the surface treatment is read from the surface treatment file, and the thus read error is added to, or subtracted from, the final dimension and shape of the workpiece.

The above described operations are started from step 600. A sequence counter is set to a sequence having a finished shape column number 1 (sequence 16 in the present example). It is judged in step 620 whether or not dimensional tolerance data including a screw thread tolerance symbol exist. If there are dimensional tolerance data, the processing proceeds to step 630. Contrary to this, if no dimensional tolerance data are exist, it is judged in step 640 whether or not the current current sequence is not the end of the finished shape sequence, the sequence counter is incremented by one in step 641, and then the processing returns to step 620. The procedures following step 620 are executed. If the processing proceeds to step 630, that is, it has been judged that there is dimensional tolerance, a finished shape and dimension of a workpiece are calculated using expression (21).

Dimension of a finished shape=a nominal dimension+{(an upper tolerance)+(a lower tolerance)}/2 (21), where input data are processed by translating a diameter, a length, a radius, a width, a depth, an angle, or a screw thread into the dimension of a finished shape and the nominal dimension.

As to the screw thread, upper and lower dimensions for each of the external diameter and internal diameter of a screw thread, and upper and lower dimensions of an effective diameter of either a male screw thread or a female screw thread are read from the screw thread shape file. The thus read dimensions are averaged, so that the dimension of a finished shape is obtained.

The way in which upper and lower dimensions are read from the screw thread shape file using input values of the screw thread specifications for the 18th column is as follows:

For example, the part of the screw thread shape file (a male screw thread) shown in FIG. 116 which is defined by a segment M, a nominal diameter: 72, a pitch: 1.5, and an accuracy: JIS6g is enclosed and designated by an arrow.

External diameter; an upper dimension: 71.968, and a lower dimension: 71.732, and Effective diameter; an upper dimension: 70.994, and a lower dimension: 70.834 are read from the enclosed block.

Results of the averaging of these dimensions are as follows:

External diameter; (71.968+71.732)/2=71.850

Effective diameter; (70.994+70.834)/2=70.914

The way in which upper and lower dimensions are read from the screw thread shape file using input values of the screw thread specifications for the 37th column is as follows:

For example, the part of the screw thread shape file (a male screw thread) shown in FIG. 116 which is defined by a segment M, a nominal diameter: 25, a pitch: 1.5, and an accuracy: JIS6g is enclosed and designated by an arrow.

External diameter; an upper dimension: 24.968, and a lower dimension: 24.732, and Effective diameter; an upper dimension: 23.994, and a lower dimension: 23.844 are read from the enclosed block.

Results of the averaging of these dimensions are as follows:

External diameter; (24.968+24.732)/2=24.850

Effective diameter; (73.994+23.844)/2=23.919

The input format of the current example does not have an entry column for the effective diameter of the screw thread, and there is no appropriate file available for the entry for the effective diameter of the screw thread. For these reasons, the results are stored in a temporary area in the storage section.

It is easy to make it possible to input the effective diameter of the screw thread and associated detailed information into the input format. However, to avoid complicated input operations, the screw thread shape file is used in the present example.

Upon completion of the processing of this sequence, it is judged in step 640 whether or not the current sequence is the end of the finished shape sequence. If the current sequence is not the end of the finished shape sequence, the sequence counter is incremented by one in step 641, and the processing returns to step 620. Then, the procedures between step 620 and 640 are executed.

If it has been judged in step 640 that the current sequence is the end of the finished shape sequence, the sequence counter is set to “n” (a sequence having a finished shape column number 1, i.e., a sequence 16 in the current example) in step 650 in order to specify the current sequence as one to be subjected to surface treatment. It is judged in step 660 whether or not the current sequence is specified as one to be subjected to surface treatment. If it has been judged in step 660 that the current sequence is specified as one to be subjected to surface treatment, the processing proceeds to step 670, and the workpiece is subjected to surface treatment. Upon completion of this processing, it is judged in step 680 whether or not another sequence follows the current sequence. If there is another subsequent sequence, the sequence counter is incremented by one in step 681, and the processing returns to step 660. The procedures following step 660 are executed. If it has been judged in step 680 that no sequence follows the current sequence, all of the series of these processing operations are completed in step 690. The current processing returns to step 6 of the major processing procedures, and proceeds to step 7. On the other hand, if it has been judged in step 660 that the current sequence is not specified as one to be subjected to surface treatment, the processing proceeds to step 680. The processing of the procedures following step 680 has already been described in the above.

At the time of the processing of a finished pattern, it is judged whether or not a grooving operation is input during the course of a general pattern input operation. If the grooving operation is input during the course of a general pattern input operation, it is further judged whether the workpiece can be machined with a grooving tool or it is not necessary to machine the workpiece using the grooving tool. It is necessary to provide the input format with an item which provides selection for how each segment of the pattern is machined.

A drawing associated with the entry for a grooving operation is identified in step 807.

The calculation of the shape and dimension of a workpiece before it undergoes surface treatment in step 670 is executed in the following manner:

Processing starts from step 6700, and it is judged in step 6701 whether or not there is a specified code file. If there is a specified code file, the shape and dimension of a workpiece are calculated by expression (22).

Dimensions of shape of a workpiece before it undergoes surface treatment=(Dimension of a workpiece when it is finally finished)−(a value stored in a data file) (22)

Upon completion of this calculation, the current processing terminates in step 6705, and the processing returns to step 670 and proceeds to step 680. If it has been judged in step 6701 that there is no specified code file, an alarm is sounded in step 6703, and the processing is suspended. The system is reset after an operator has taken required remedies, whereby the processing returns to step 650 and the procedures can be continuously executed.

Figure 9:
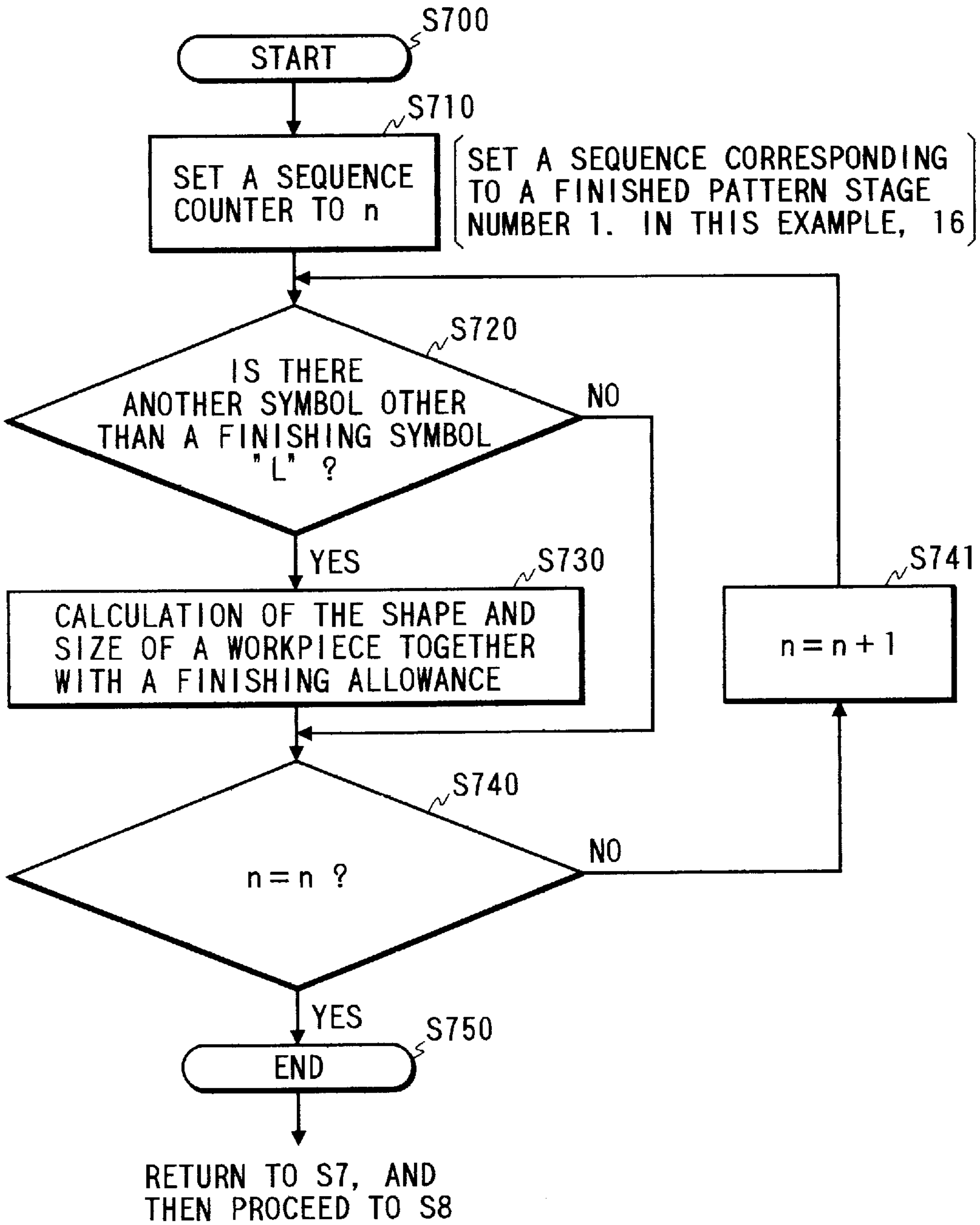
FIG. 9 is a flowchart for processing the shape of a workpiece before undergoing a finishing operation in another process, with regard to step 7 of the processing method according to the embodiment of the present invention.

Subsequently, a pattern of a workpiece before it is finished in another process is processed in step 7. Procedures of this processing are shown in FIG. 9. With reference to a finishing symbol, the roughness of a finished surface, and thermal refining data of each segment, a finishing allowance of the segment is read from a finishing allowance file shown in FIGS. 120 to 123 using the diameter and length of a workpiece as keywords. The thus read data are added to the final dimensions of shape of a workpiece before it is subjected to surface treatment.

Processing starts from step 700, and the sequence counter is set to "n" (a sequence having a finished shape column number 1, i.e., sequence 16 in the present example) in step 710. It is judged in step 720 whether or not there is another finishing symbol other than a finishing symbol L of the input data. If there is another finishing symbol other than L, the dimensions of shape of a workpiece with a finishing allowance are calculated in step 730.

The calculation is executed by expression (23).

Dimensions of shape of a workpiece having a finishing allowance=final dimensions of shape of a workpiece before it is subjected to surface treatment+a finishing allowance (23)

where the input data are processed while the dimensions of shape of a workpiece is replaced with a diameter, a length, a radius, a width, a depth, and an angle.

The result of the calculation according to the present example is shown in FIGS. 173 to 176.

Upon completion of the calculation, it is judged in step 740 whether or not another sequence follows the current sequence. The sequence counter is incremented by one in step 741, and the current processing returns to step 720. Procedures between 720 and 740 are executed.

If it has been judged in step 740 that no sequence follows the current sequence, the current processing terminates in step 750. The current processing returns to step 7 of the major processing procedures and then proceeds to step 8.

On the other hand, if it has been judged in step 720 that there is only a finishing symbol L, the processing proceeds to step 740. The processing of the procedures following step 740 has already been described.

The pattern of a drawing is identified in step 8 using information, such as the starting point and the end point, for each column.

The pattern identification includes the identification of an external diameter, an internal diameter, an end face, and a groove using information, such as a starting point and an end point, for each column. Further, the pattern identification includes the arrangement of constituent line segments and the identification of pictorial space. A result of the pattern identification is used in creating, selecting, and deciding the shape of a tool, as well as in deciding the location of a cutter.

Figure 10:
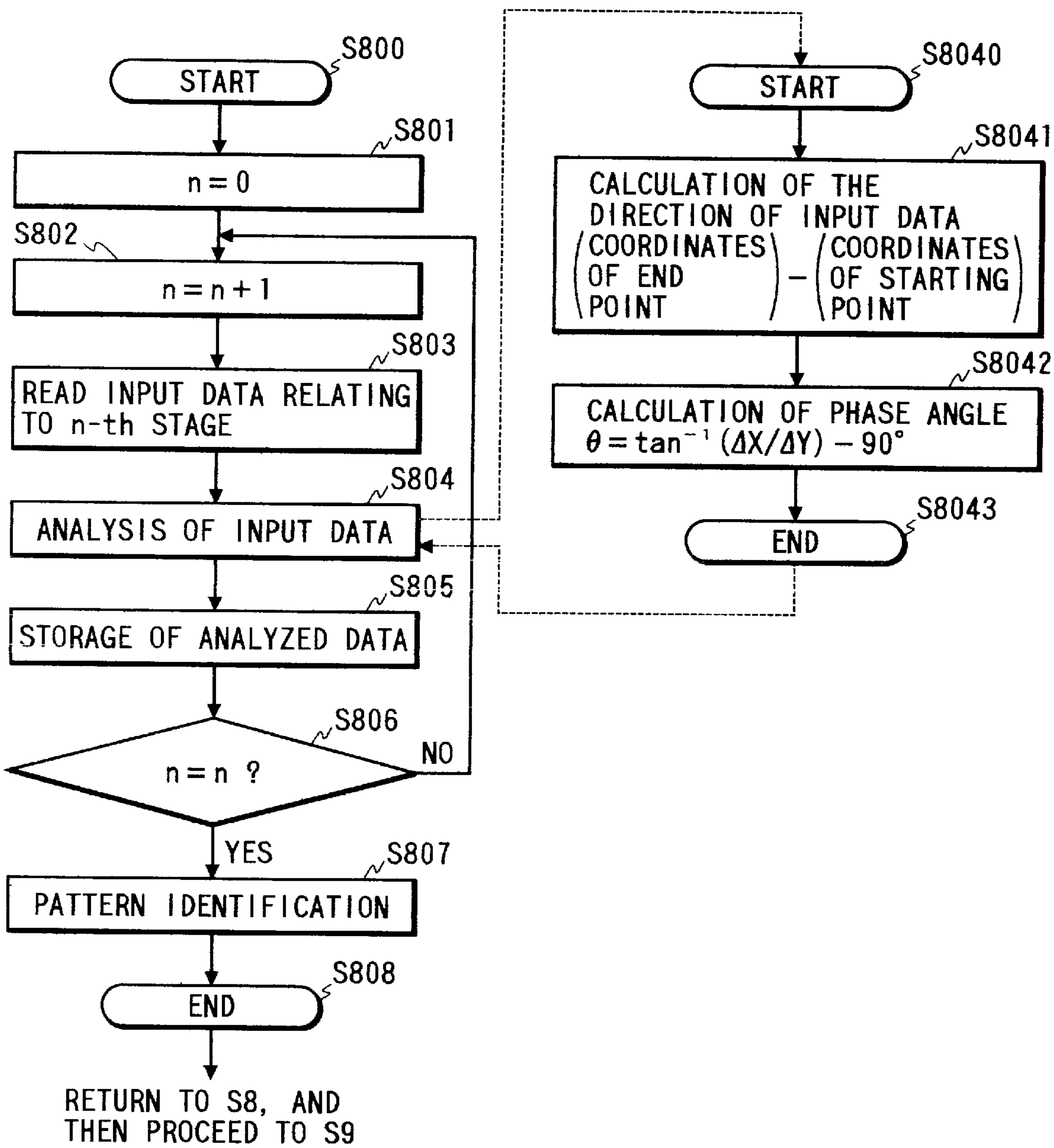
FIG. 10 is a pattern identification flowchart with regard to step 8 of the processing method according to the embodiment of the present invention.

The pattern identification is carried out according to procedures of a flowchart shown in FIG. 10, using information which is input, in the form of a line segment without the use of an input format specially designed for inputting a drawing, for each column from the first column having a sequence number 3 shown in FIG. 143.

Processing starts from step 800. The sequence counter is reset to 0 in step 801. The sequence counter is incremented by one in step 802, and input data related to an n-th count of the sequence counter are read in step 803. The input data are analyzed in step 804, and the analyzed data are stored in the storage section of the numerically controlled system in step 805. It is judged in step 806 whether or not the current column is the end of the data. If it has been judged that the current column is not the end of the data, the processing returns to step 802, and the procedures between step 802 and 806 are executed. If it has been judged in step 806 that the current column is the end of the data, the pattern identification is carried out in step 807. Upon completion of the pattern identification, the processing terminates in step 808. The current processing returns to step 8 of the major processing procedures and proceeds to step 9.

Details of the analysis of the input data carried out in step 804 are as follows:

The analysis of the input data is started from step 8040. The direction of the input data is calculated in step 8041. Whether the input data are provided with a positive sign or a negative sign is determined by subtracting (the coordinates of the end point) from (the coordinates of the starting point). For example, when the coordinates of the end point are subtracted from the coordinates of the starting point with respect to the first column of the present example, it turns out that the drawing has a direction of X+.

The constituent line segments of the drawing are calculated in step 8042. The line segments having a phase angle in a counterclockwise direction with reference to a line segment of X+ are represented with a + sign. The phase angle is calculated by expression (24)

$\theta=\tan^{-1}$ [{(coordinates of the end point; $X$)−(coordinates of the starting point; $X$)}/{(coordinates of the end point; $Z$)−(coordinates of the starting point; $X$)}]−90°

For example, a phase angle of the first column of the present example calculated as a result of subtracting the coordinates of the end point from the coordinates of the starting point is 0 degrees.

In step 8043, this subroutine is completed. Upon completion of this subroutine, the processing proceeds to step 804.

The results of the calculation are as follows:

a direction of X+ and a phase angle of 0 degrees for the first column, a direction of Z+ and a phase angle of −90° for the second column, a direction of X+ and a phase angle of 0 degrees for the third column, and a direction of Z+ and an angle of −90° for the fourth column . . . .

The pictorial space of this case is in the right side as promised.

Figure 11:
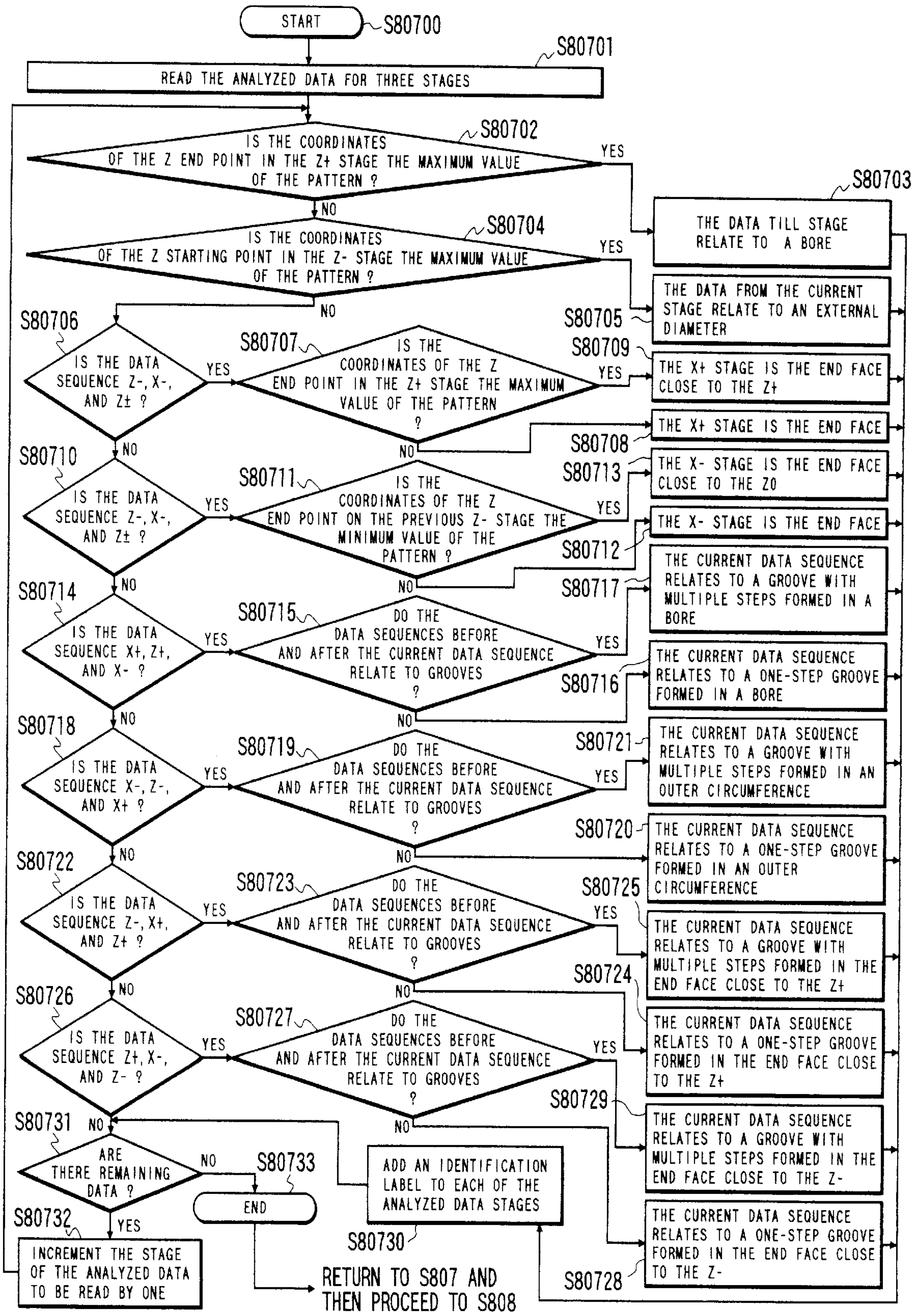
FIG. 11 is a pattern identification flowchart with regard to step 807 of the processing method according to the embodiment of the present invention.
Figure 13:
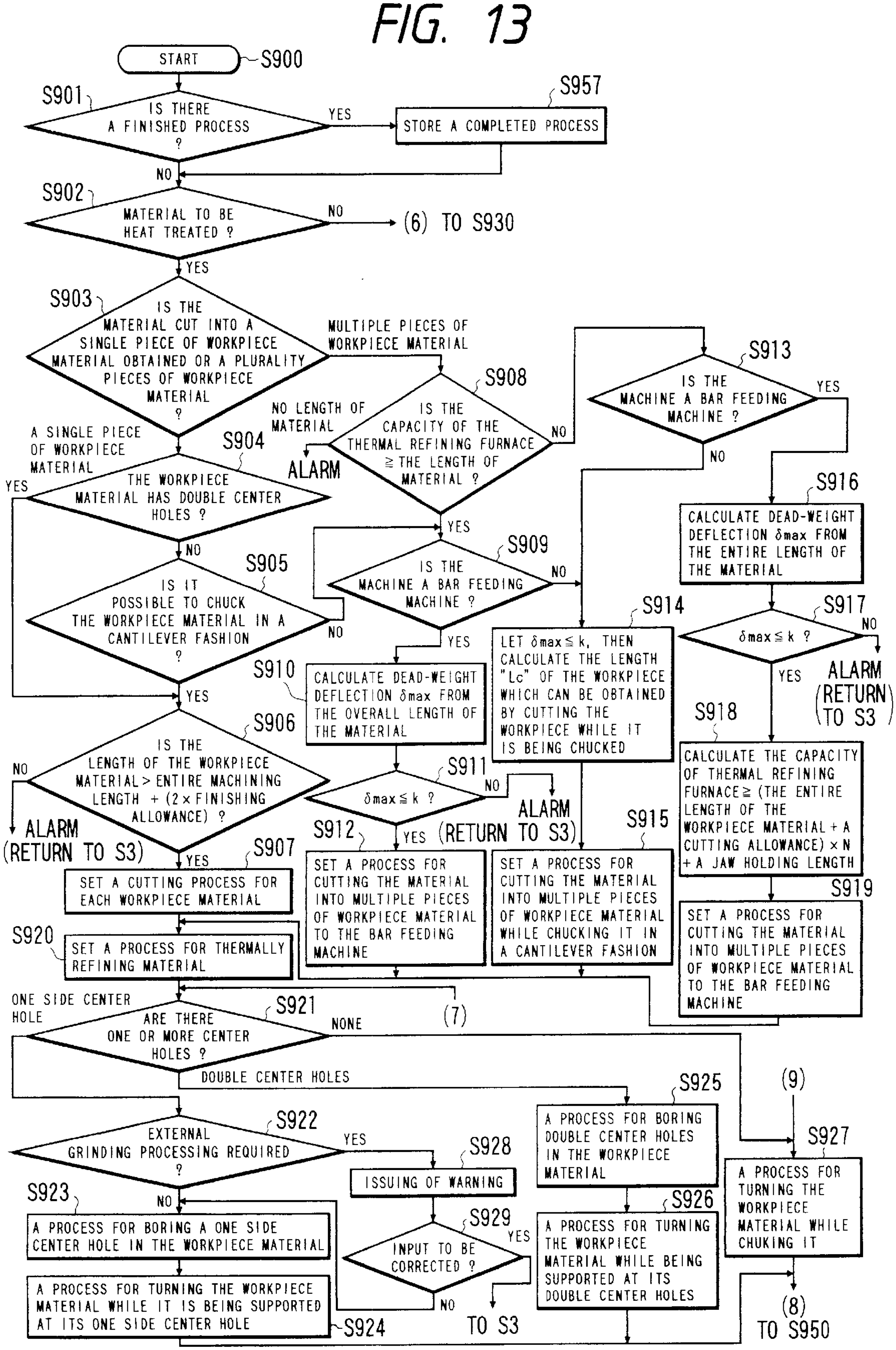
FIG. 13 is a machining process determination method with regard to step 9 of the processing method according to the embodiment of the present invention.

FIG. 11 shows details of the pattern identification carried out in step 807, and the pattern identification is carried out in the following manner.

The pattern identification is started from step 80700, and read the data analyzed in step 804 from the first column to the third column in step 80701.

It is judged in step 80702 whether or not the coordinates of the Z end point of the Z+ column in the data sequence are the maximum value of the pattern. If the coordinates are the maximum value of the pattern, it is determined in step 80703 that the columns between the first to the third relate to an internal diameter.

If it has been judged in step 80702 that the coordinates of the Z end point are not the maximum value of the pattern, it is further judged in step 80704 whether or not the coordinates of the Z starting point of the Z− column are the maximum value of the pattern. If they are the maximum value of the pattern, columns subsequent to the current column are determined as being related to an outside diameter.

If it has been judged in step 80704 that they are not the maximum value of the pattern, it is judged in step 80706 whether or not the data sequence is Z+, X+, and Z±. If the data sequence is Z+, X+, and Z±, it is judged in step 80707 whether or not the coordinates of the Z end point of the Z+ column are the maximum value of the pattern. If they are not the maximum value of the pattern, it is determined in step 80708 that the X+ column relates to an end face.

If it has been judged in step 80707 that they are the maximum value of the pattern, it is determined in step 80709 that the X+ column relates to an end face on the Z+ side.

If it has been judged in step 80706 that the data sequence is not Z+, X+, and Z±, it is further judged in step 80710 whether or not the data sequence is Z−, X−, and Z±. If the data sequence is Z−, X−, and Z±, it is judged in step 80711 whether or not the coordinates of the Z end point of the previous Z− column are the minimum value of the pattern. If they are not the minimum value of the pattern, it is determined in step 80712 that the X− column is the end face.

If it has been judged in step 80711 that they are the minimum value of the pattern, it is determined in step 80713 that the X− column is an end face on the Z0 side.

If it has been judged in step 80710 that the data sequence is not Z−, X−, and Z±, it is judged in step 80714 whether or not the data sequence is X+, Z+, and X−. If the data sequence is X+, Z+, and X−, it is judged in step 80715 whether or not data sequences before and after the current data sequence relate to a groove.

In the case of a multi-stepped groove, the extent of data sequences which have X data with a negative sign is identified as a groove, except for any data sequences which have a difference between X data with a positive sign and X data with a negative sign. Similarly, with regard to the identification of a multi-stepped groove, the groove is identified by replacing the X data with graphical data of that groove.

If the data sequence is not X+, Z+, and X−, it is determined in step 80716 that the data sequence relates to a single-step groove formed in an interior circumference.

If it has been judged in step 80715 that data sequences before and after the current data sequence relate to a groove, it is determined in step 80717 that the groove is a multi-stepped groove formed along an internal circumference.

If it has been judged in step 80714 that the data sequence is not X+, Z+, and X−, it is judged in step 80718 whether or not the data sequence is X−, Z−, and X+. If it has been judged that the data sequence is X−, Z−, and X+, it is judged in step 80719 whether or not data sequences before and after the current data sequence relate to a groove. If the data sequences before and after the current data sequence do not relate to a groove, it is determined in step 80720 that the data sequences relate to a single-step groove formed in an external circumference.

If it has been judged in step 80719 that the data sequences before and after the current data sequence relate to a groove, it is determined in step 80721 that they relate to a multi-stepped groove formed in an external circumference.

If it has been judged in step 80718 that the data sequence is not X−, Z−, and X+, it is judged in step 80722 whether or not the data sequence is Z−, X+, and Z+. If it is Z−, X+, and Z+, it is judged in step 80723 whether or not data sequences before and after the current data sequence relate to a groove. If the data sequences before and after the current data sequence do not relate to a groove, it is determined in step 80724 that the data sequence relates to a single step groove formed in an end face on the Z+ side.

If it has been judged in step 80723 that the data sequences before and after the current data sequence relate to a groove, pictorial space of the data sequence is checked in step 80725, and it is determined that the data sequence relates to a multi-stepped groove formed in the end face on the Z+ side.

If it has been judged in step 80722 that the data sequence is not Z−, X+, and Z+, it is further judged in step 80726 whether or not the data sequence is Z+, X−, and Z−. If it is Z+, X−, and Z−, it is judged in step 80727 whether or not data sequences before and after the current data sequence relate to a groove. If they do not relate to a groove, it is determined in step 80728 that the data sequence relates to a single step groove formed in an end face on the Z− side.

If it has been judged in step 80727 that data sequences before and after the current data sequence relate to a groove, it is determined in step 80729 that the current data sequence relates to a multi-step groove formed in the end face on the Z− side.

Results of the identifying operations executed in steps 80703, 80705, 80708, 80709, 80712, 80713, 80716, 80717, 80720, 80721, 80724, 80725, 80728, and 80729 are respectively provided with an identification label in step 80730 for each analyzed data columns. Upon completion of the labeling of the results, the processing proceeds to step 80731.

If it has been judged in step 80726 that the data sequence is not Z+, X−, and Z−, it is judged in step 80731 whether or not remaining data exist. If remaining data exist, the first data item in the analyzed data sequence is deleted in step 80732, and the subsequent data items read. Then, the sequence counter is incremented by one. The processing returns to step 80702, and the procedures from step 80702 to 80733 are repeatedly executed until there is no remaining data.

If it has been judged in step 80731 that there is no remaining data, the processing terminates in step 80733. Upon completion of the series of processing operations, the current returns to step 807. The processing further goes back to step 8 via step 808 and then proceeds to step 9.

Pictorial codes are as follows:

an internal diameter; I, a circular arc formed along an internal circumference; IR, a gradient of the internal circumference; IS, an end face formed along the internal circumference; IF, a groove formed in the internal circumference; IG, an external diameter; E, a circular arc formed along the external circumference; ER, a gradient of the external circumference; ES, an end face formed along the external circumference; EF, a groove formed in the external circumference; EG, an end face; F, a circular arc formed along an end face; FR, and a groove formed in an end face; FG.

FIG. 12 shows results of the processing of the present example, and the results are as follows:

First column—X+, 0°, and IF,

Second column—Z+, −90°, and I,

Third column—X+, 0°, and IF,

Fourth column—Z+, −90°, and I

.. (columns between the fifth column and the 37th column are omitted here)

..

..

38th column—X−, 180°, and F.

In view of a result obtained as a result of having processed the present example in accordance with the above described processing procedures, as can be seen from the data sequence that comprises Z+ data in the 10th column, X+ data in the 11th column, and Z− data in the 12th column, Z− data exist in the 12th column, and Z data which are larger than the Z value of the 10th column are not input until the end of the columns. For these reasons, the 11th column is graphically identified as an end face on the Z+ side; the data sequences between the first column and the 10th column are graphically identified as an internal diameter; the data sequences between the 12th column and the 37th column are graphically identified as an external diameter; the last column, that is, the 38th column is graphically identified as an end face on the Z0 side; and the data sequences between the 28th column and the 30th column are graphically identified as a groove of 40. at one end and a groove of 52.5 at the other end and a width of 10.

On the assumption that the 11th column is an entry for a taper, i.e., the Z value of the coordinates of the end point is larger than the Z value of the coordinates of the starting point, and that there is no other column which can be identified as an end face, the 11th column is referred to as an end face formed along an internal circumference. Alternatively, on the assumption that the 11th column is an entry for a taper, i.e., the Z value of the coordinates of the end point is smaller than the Z value of the coordinates of the starting point, and that there is no other column which can be identified as an end face, the 11th column is referred to as an end face formed along an outer circumference.

In the case of the present example, in view of the constituent line segments from X+ to Z+ related to the internal diameter, and in view of a phase angle, the data sequences between the first column and the 10th column represent a pattern within space in the rightward direction (a clockwise direction) defined between −180° and −90° which is inverted so as to match the direction of a machining operation. In view of the constituent line segment Z+ related to the end face, the 11th column represents a pattern within space at an angle of 0°. In view of the line segments from Z− to X+ related to the groove formed in the outer circumference, and in view of a phase angle, the data sequences between the 12th column and the 27th column represent a pattern within space in a rightward direction (a clockwise direction) between −90° and 0°. In view of the line segments from Z− to X− related to the external diameter, and in view of a phase angle, the data sequences between the 28th column and the 37th column represent a pattern within space in a rightward direction (a clockwise direction) defined between 0° and 90°. In view of the constituent line segment Z−, the 38th column represents a pattern within space at an angle of 0°.

On the assumption that a pattern within space related to an internal diameter on the Z0 size, which is not mentioned in the present example, is the same as a pattern obtained as a result of inverting the pattern related to the internal diameter on the Z+ side of the present example, the pattern associated with the internal diameter on the Z0 side is located within space in a rightward direction (a clockwise direction) defined between 90° and 180°.

The results of the pattern identification of the present invention are simply arranged in the following manner:

1st to 10th columns—an internal diameter: I, and space in a rightward direction (a clockwise direction) defined between −180° and −90°, 11th column—an end face: F, and space at an angle of 0°, 12th to 27th columns—an external diameter: E, and space in a rightward direction (a clockwise direction) defined between −90° and 0°, 28th to 37th columns—an external diameter: E, and space in a rightward direction (a clockwise direction) defined between 0° and 90°, and 38th column—an end face: F, and space at an angle of 0°.

In addition, as a result of the determination of the types of groove and the entry for grooves, the results of the pattern identification are arranged in the following manner:

4th column—a groove formed in an internal circumference: IG,

6th column—a groove formed in an internal circumference: IG,

18th column—a groove formed in an external circumference: EG,

23rd column—a groove formed in an external circumference: EG, and

28th and 30th columns–a groove formed in an external circumference: EG.

Processing in step 8 is now completed.

A machining process is determined in step 9.

N(n) is used as a keyword in inputting data during the course of the processing in step 9. Hereinafter, N designates a sequence number of input data, and “n” designates a block number of each sequence.

The identification of a process specified as being a final process and the determination of a machining process are carried out on the basis of:

items of a sequence 1, i.e., 1 (1): the identification of a machine, 1 (2): the identification of a process, 1 (3): the entire length of material, 1 (4): a material diameter, 1 (5): material, 1 (6): a workpiece material, 1 (7): heat treatment, 1 (8): the dimension of a workpiece material, 1 (9): a process in which material has finished undergoing processing, and 1 (10): the number of pieces of material to be machined, or items of a sequence 2, i.e., 2 (1): a center hole, 2 (2): a tolerance symbol/upper and lower tolerances, 2 (3): a finishing symbol/the roughness of a finished surface, 2 (4): configurational and positional accuracy, 2 (5): the accuracy of a screw thread/a finishing symbol/the roughness of a finished surface, 2 (6): a thermal refining symbol/hardness, 2 (7): surface treatment specifications, 2 (8): a groove, 2 (9): a keyway, 2 (10): a key slot, 2 (11): a keyway formed in an internal circumference, 2 (12): a hole, 2 (13): a tapped hole, 2 (14): an internal cam, 2 (15): an end cam, 2 (16): a grooved cylindrical cam: 2 (17): an external cam, 2 (18): a grooved end cam, 2 (19): a cylindrical outside plane/a cylindrical outside polygon, 2 (20): an internal gear, and 2 (21): an external gear.

FIGS. 13 to 22 show an example of procedures for determining a machining process in step 9.

The determination of a machining process starts from step 900. It is judged in step 901 whether or not there is a process in which material has finished undergoing processing. If such a process does not exist, it is judged in step 902 whether or not material is subjected to heat treatment using the heat treatment data 1 (7). If material is subjected to heat treatment, it is judged from an input (e.g., a polished material, and the presence or absence of a rod material) or a machine master file (the presence or absence of a bar feeding machine) in step 903 whether or not the material is machined into a single workpiece or a plurality of workpieces.

If it has been judged in step 903 that the material is machined into a single workpiece, it is further judged in step 904 whether or not the material has double center holes. If the material does not have any double center holes, it is judged in step 905 whether or not the material can be chucked in a cantilever fashion, using input pictorial data.

If a ratio of a material diameter D to a material length L (the user can specify this ratio, and a standard modal value is ⅓) is equal to or larger than a given value, the material is machined while being chucked in a cantilever fashion. On the other hand, if the ratio is smaller than the given value, the material is machined while being supported at its center hole.

If the material can be machined while being chucked in a cantilever fashion, it is judged in step 906 whether or not 1 (8): the dimension of a workpiece material>(1 (3): the entire length of material)+(2×a finishing allowance)

If 1 (8): the dimension of a workpiece material>(1 (3): the entire length of material)+(2×a finishing allowance), a process for machining material into a single workpiece is set in step 907. On the other hand, if it has been judged in step 906 that 1 (8): the dimension of a workpiece material≦(1 (3): the entire length of material)+(2×a finishing allowance), an alarm is sounded, because the length of material is shorter than, or equal to, the overall extent of a machining operation, which thus means that it is impossible to machine the material.

However, if it has been judged in step 905 that the material cannot be machined while being chucked, the processing proceed to step 909 (the processing of procedures subsequent to step 909 will be described together with an explanation of procedures subsequent to step 908).

If it has been judged in step 903 that the material is machined into a plurality of workpieces, the volume of a thermal refining furnace is compared with the dimension of a workpiece material 1 (8) in step 908. If the item for the dimension of a workpiece material is left blank, an alarm is sounded.

If it has been judged in step 908 that (the volume of a thermal refining furnace)≦(1 (8): the dimension of a workpiece material), it is judged in step 909 whether or not the machine is a bar feeding machine by reading data from an associated item input in the machine tool file. If the machine is a bar feeding machine, the maximum dead-weight deflection: δmax is calculated from the entire length of material 1 (3).

It is judged in step 911 whether or not δmax≦k. If δmax≦k, a process of machining material into a plurality of workpieces is set in step 912. On the other hand, if δmax>k, an alarm is sounded, because a special retaining method and a machining method are required to machine such a material.

In the above relationship, "k" is a preset value: the maximum allowable dead-weight, and "k" designates the maximum allowable value hereinbelow. As is well known, chatter developing in a machine during a machining operation is relevant to vibrations in a normal mode. In general, the chatter can be calculated from δmax.

On the other hand, if it has been judged in step 909 that the machine is not a bar feeding machine, the processing proceeds to step 914 (the processing of procedures following step 914 will be described together with the explanation of procedures subsequent to step 913.)

If it has been judged in step 908 that (the volume of a thermal refining furnace)<(1 (8): the size of a workpiece material), it is judged in step 913 whether or not the machine is a bar feeding machine by reading data from an associated item input in the machine tool file. If the machine is not a bar feeding machine, the processing proceeds to step 914. If the machine is a bar feeding machine, the processing proceeds to step 916.

A length, Lc, which a length of the material to be cut while it is chucked in a cantilever fashion, is calculated from δmax≦k in step 914 using expressions (25) to (27).

$$Lc=(8\times E\times I\times \delta\max/W)^{1/3}+\text{a tong hold} \quad (25)$$

$$Lc\geqq(1\ (3)\text{: the entire length of material+a cutting allowance})\times N+\text{a tong hold} \quad (26)$$

$$Lc<(\text{the volume of a thermal refining furnace}) \quad (27)$$

The Lc that satisfies these three expressions is determined.

In the above expressions, N is an integer representing the number of workpieces which can be machined by the length Lc.

The expressions are developed from $\delta\max=w\times L^3/(8\times E\times I)$. A concentrated load may be used in developing the expressions instead of a uniform load. Alternatively, the expressions may be developed from an expression based on a finite element method.

Upon completion of the determination of the length Lc, the processing proceeds to step 915, and a process of cutting material into a plurality of workpieces while being chucked in a cantilever fashion is set.

If it has been judged in step 913 that the machine is a bar feeding machine, δ,ax is calculated from the entire length of material 1 (3) in step 916.

It is judged in step 917 whether or not δmax≦k. If it has been judged that δmax≦k, (the volume of a thermal refining furnace)≧{1(3): the entire length of material+a cutting allowance+(2×a finishing allowance)}×N+a tong hold is calculated using expressions (28) and (29)

$$Lb\geqq\{1\ (3)\text{: the entire length of material+a cutting allowance+(2×a finishing allowance)}\}\times N+\text{a tong hold} \quad (28)$$

Lb<(the volume of a thermal refining furnace), where Lb is a length of material to be cut into a plurality of workpieces by a bar feeding machine.

Upon completion of the calculation, a process of cutting material into a plurality of workpieces using a bar feeding machine is set in step 919.

If it has been judged in step 917 that δmax>k, an alarm is sounded.

If a decision regarding the sounding of the alarm has been made in steps 906, 908, 911, or 917, an alarm is sounded to prompt the operator to correct the entry, and also the processing returns to step 3 related to input operations.

Upon completion of the operations, the processing proceeds to a thermal refining process in step 920. The thermal refining process is set in step 920.

On the other hand, if the process which the material has finished undergoing has already been input, the processing proceeds to step 957.

The process which the material has finished undergoing is stored in step 957, and then the processing proceeds to step 902. The processing procedures after step 902 have already been described.

Figure 15:
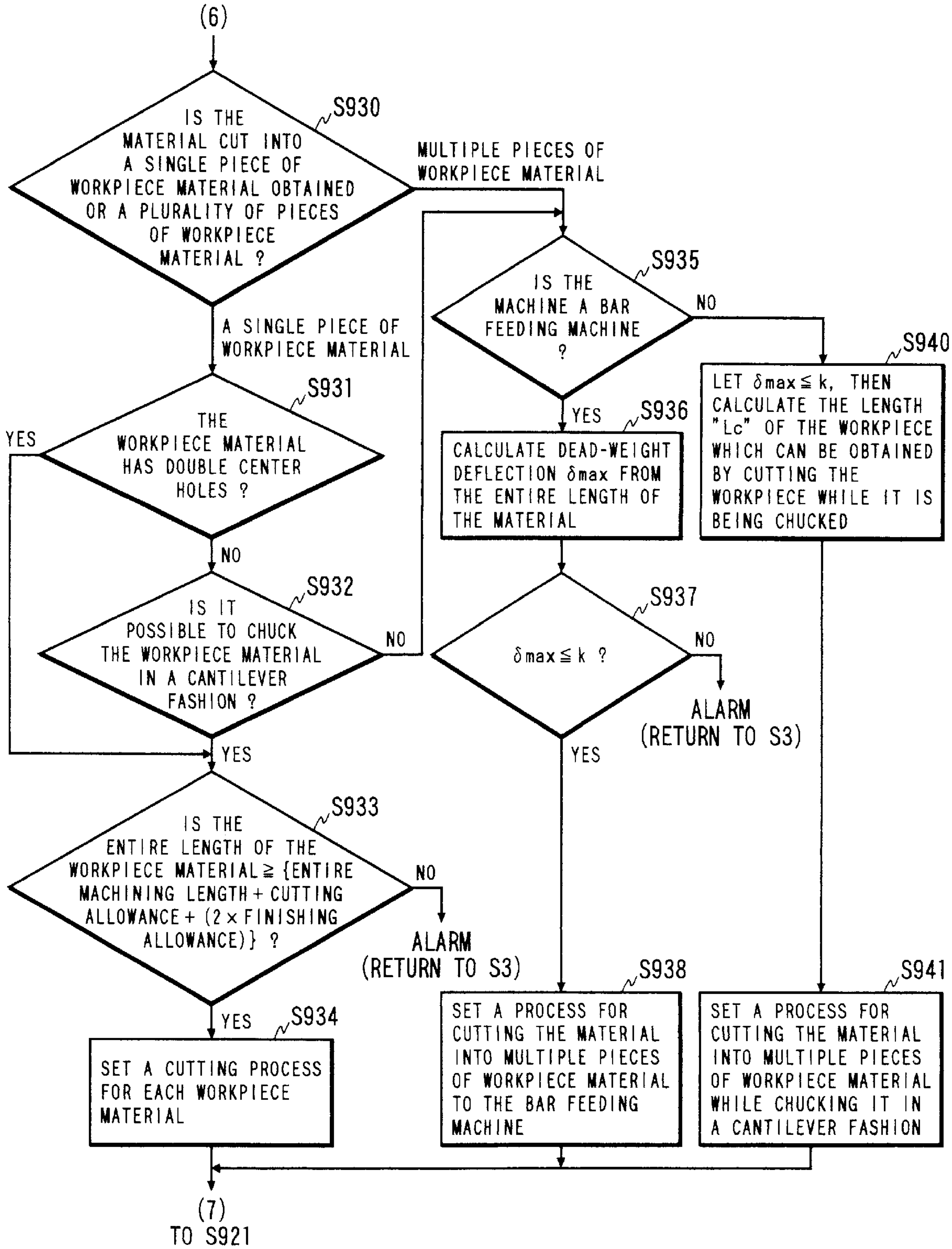
FIG. 15 is a flowchart continued from FIG. 14, that is, the machining process determination flowchart according to the embodiment of the present invention.

A decision regarding the presence or absence of the heat treatment of the material using the heat treatment data 1(7) is made in step 902. If such a processing does not exist, the processing proceeds to step 930 (FIG. 15).

A decision as to whether the material is machined into a single piece or a plurality of workpieces is made, using an input or data of the machine master file in step 930. If it has been determined in step 930 that the material is machined into a single workpiece, a decision as to whether or not the material has double center holes is made in step 931. If it has been determined that the material does not have double center holes, a decision as to whether or not the material can be chucked in a cantilever fashion is made in step 932 using pictorially input data together with the height and grip diameter of the pawls stored in the fixture file. If the material can be chucked in a cantilever fashion, a decision is made in step 933 with regard to 1(8): the size of the workpiece material≧{1 (3): the entire length of a workpiece+a cutting allowance+(2×a finishing allowance)}.

If 1(8): the size of the workpiece material>{1 (3): the entire length of a workpiece+a cutting allowance+(2×a finishing allowance)}, a cutting processing is set for each workpiece.

On the other hand, if 1(8): the size of the workpiece material<{1 (3): the entire length of a workpiece+a cutting allowance+(2×a finishing allowance)}, an alarm is sounded because the length of the material is shorter than, or equal to, the overall extent of a machining operation, which thus means that it is impossible to machine the material.

If it has been determined in step 932 that the material cannot be chucked in a cantilever fashion, the processing proceeds to step 935.

If it has been determined in step 930 that the material is machined into a plurality of workpieces, a decision as to whether or not the machine is a bar feeding machine is made in step 935 by reading items input in the machine tool file. If it has been determined that the machine is a bar feeding machine, δmax is calculated from the entire length 1(3) in step 936.

A decision as to whether or not δmax≦k is made in step 937. If δmax≦k, a process of machining the material into a plurality of workpieces is set in step 938. On the other hand, if δmax>k, an alarm is sounded, because a special retaining method and a machining method are required to machine such a material.

On the other hand, if it has been judged in step 935 that the machine is not a bar feeding machine, the Lc, i.e., the length of the material to be cut while it is chucked in a cantilever fashion, is calculated from δmax≦k in step 940 using expressions (25) and (26).

$$Lc=(8\times E\times I\times \delta max/W)^{1/3}+\text{a tong hold} \quad (25)$$

$$Lc\geqq(1\ (3)\text{: the entire length of the material+a cutting allowance})\times N+\text{a tong hold} \quad (26)$$

The Lc that satisfies these expressions is determined.

In the above expressions, N is an integer representing the number of workpieces which can be machined by the length Lc.

The expressions are developed from $\delta max=w\times L^3/(8\times E\times I)$. A concentrated load may be used in developing the expressions instead of a uniform load. Alternatively, the expressions may be developed from an expression based on a finite element method.

Upon completion of the determination of the length Lc, the processing proceeds to step 941, and a process of cutting material into a plurality of workpieces while being chucked in a cantilever fashion is set.

If a decision regard the sounding of the alarm has been made in steps 933 and 937, an alarm is sounded to prompt the operator to correct the input item, and processing is executed to return the current processing to step 3 of the input processing. Upon completion of these steps, the processing proceeds to step 921.

Figure 16:
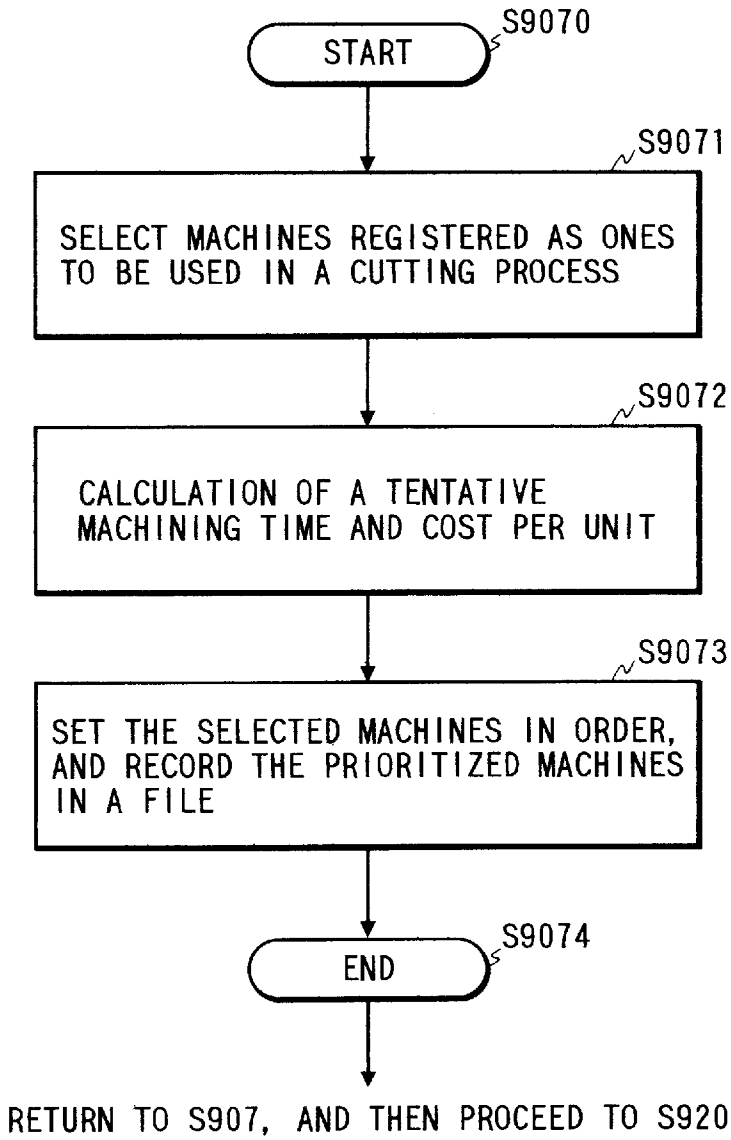
FIG. 16 is a flowchart for cutting material into a single workpiece with regard to step 907 of the processing method according to the embodiment of the present invention.

FIG. 16 shows details of the processing carried out in step 907 associated with each process for cutting the material into a single workpiece.

The processing starts from step 9070, and all of machines possessing cutting processes are selected in step 9071 from among machines registered as ones to be use for cutting in the machine tool file, according to 1(5): material and 1(4): a material diameter. Subsequently, tentative machining time and cost per single workpiece are calculated in step 9072 from the number of workpieces to be machined by reading preparation time, preparation cost, a cross-sectional area to be hourly machined for each material, and machining cost from a data file associated with the selected machines.

Based on the results of the calculation, the selected machines are arranged in order according to cost and in order according to a machining time per single workpiece material in step 9073, and the prioritized machines are recorded in a cutting process file.

Upon completion of the recording of the prioritized machines, the processing associated with the single workpiece cutting process is finished in step 9074, and then the current processing returns to step 907 and proceeds to step 920.

Details of a process in step 915 for cutting the material into a plurality of workpieces while it is chucked in a cantilever fashion, and details of a process in step 919 for cutting the material into several workpieces using the bar feeding machine are the same as those of the processing carried out in step 907. They are different from each other only in that the length of the material to be cut into workpieces, and therefore their explanations will be omitted.

The number of center holes of the material is identified in step 921. If the material has a single center hole, a decision as to whether or not a turning operation exists is made in step 922. If the machining operation includes the turning operation, an alarm is issued in step 928 so that the material can be machined while it is supported at its double center holes using a tentatively input center hole pattern. Based on this alarm, the operator judges the necessity or the lack of necessity of such a machining in step 929. If it is necessary to carry out the machining, the processing returns to step 3, so that the operator corrects the input pattern. Then, the processing procedures following step 3 are repeated. If the processing is not needed, the alarm is reset, and the processing proceeds to step 923. Further, if the machining process does not include the turning operation, a process in step 923 for machining a single center hole in the material is set to a process in step 924 for turning the material while it is supported at its single center hole. If the material is supported at its double center holes, a process in step 925 for machining double center holes in the material is set to a process in step 926 for turning the material while it is supported at its double center holes. If the material does not have any center holes, a process is set to a process in step 927 for turning the material while it is chucked. In this way, the setting of the process continues.

Figure 17:
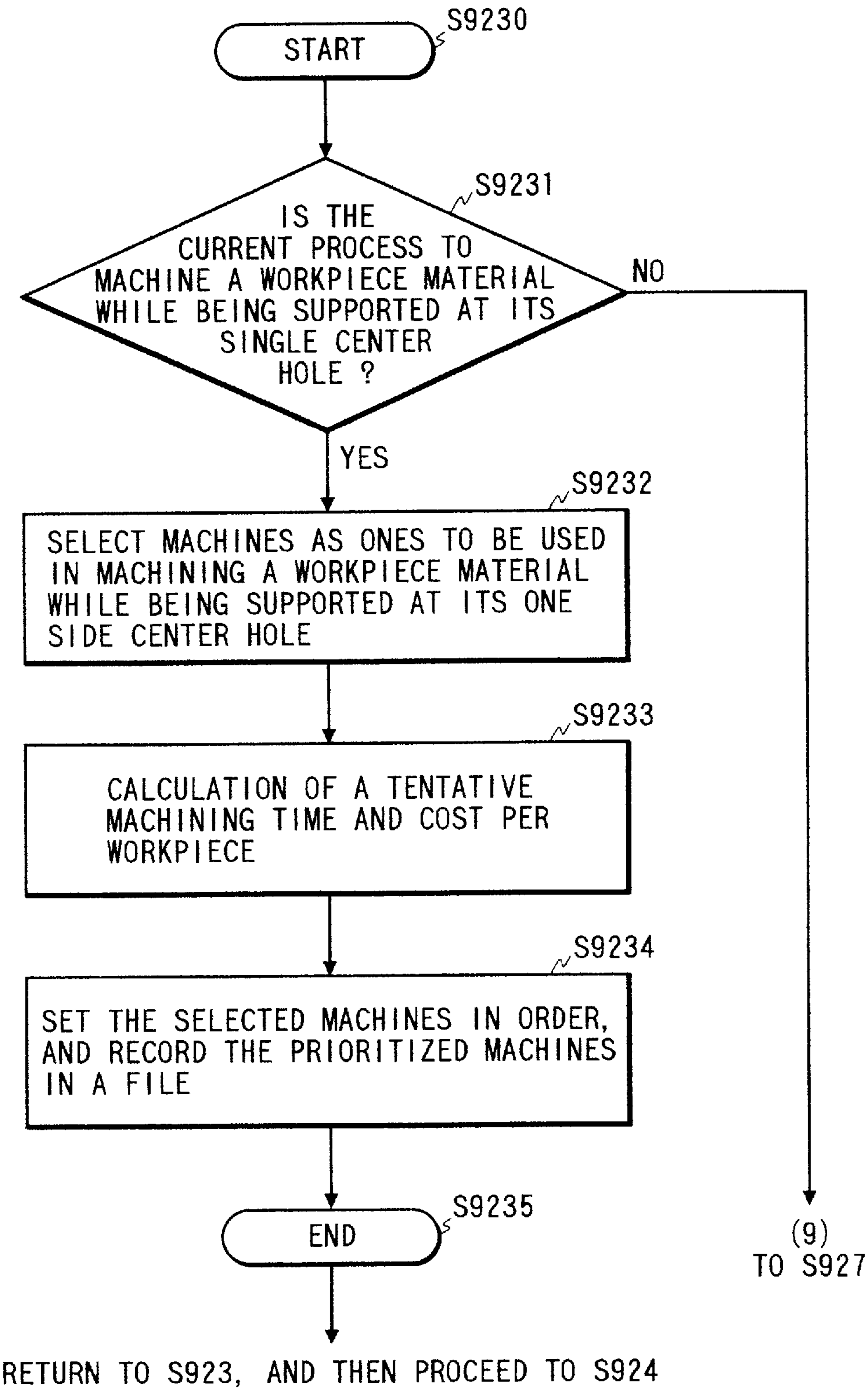
FIG. 17 is a flowchart for machining a workpiece while being supported at its single center hole, with regard to step 923 of the processing method according to the embodiment of the present invention.
Figure 18:
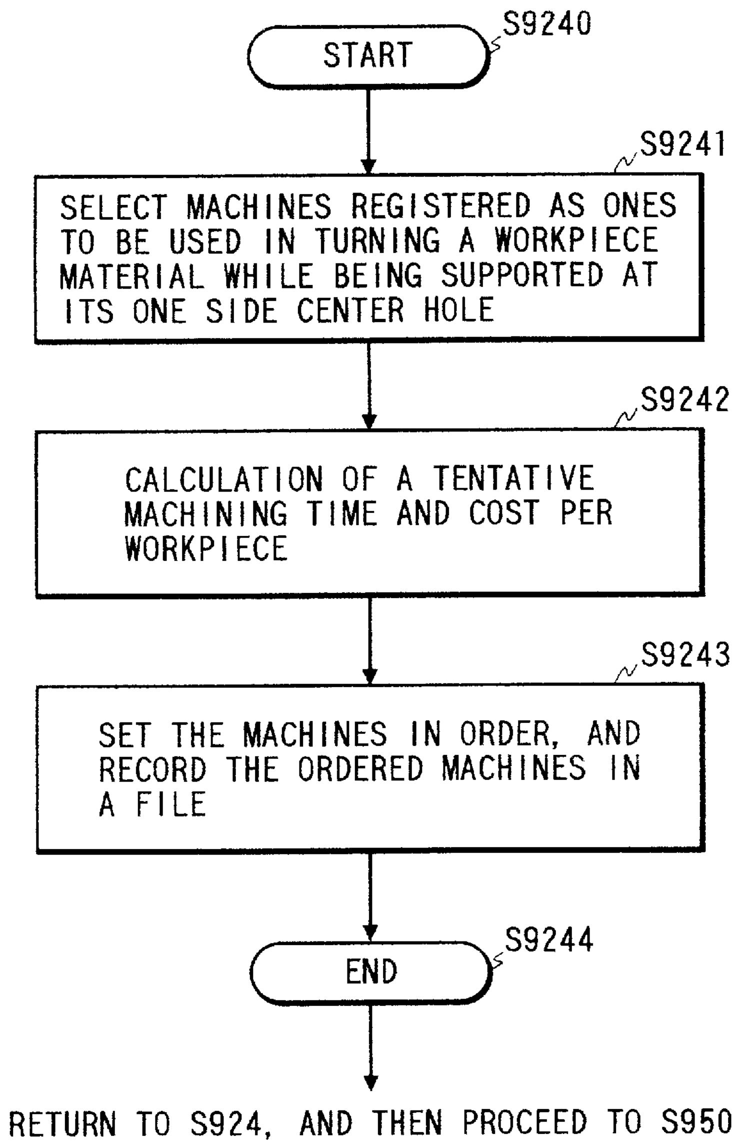
FIG. 18 is a flowchart for machining a workpiece while being supported at its single center hole, with regard to step 924 of the processing method according to the embodiment of the present invention.

If it has been determined in step 921 that the material has a single center hole, the processing proceeds to steps 922 and 923 successively. Then, processing procedures following the process for machining a single center hole in the material are executed. With regard to details of the processing, FIG. 17 shows the evaluation of the selection of a machine associated with the single center hole machining process, and FIG. 18 shows the evaluation of the selection of a machine associated with the process for turning the material while it is supported at its single center hole.

The method of selecting machines for use in the single center hole machining process decided in step 923 is processed in the following manner:

The processing starts from step 9230. A decision as to whether or not the current process is a process for machining the material while it is supported at its single center hole is made in step 9231 using 1(3): the entire length, 2(3): a finishing symbol/the roughness of a finished surface, and the position of the center. If it has been determined that the current process is a process for machining the material while it is supported at its single center hole, all of machines which machine a single center hole in the material in another process are selected from among machines registered as ones to be used in the single center hole machining process in a machine tool file, according to 1(3): the entire length and 1(4): the material diameter. Subsequently, tentative machining time and cost per single workpiece are calculated in step 9233 from 1(10): the number of workpieces to be machined and a volume to be removed as a result of machining a center hole, by reading preparation time, preparation cost, an hourly removal volume, and machining cost from a data file associated with the selected machines.

Based on the results of the calculation, the selected machines are arranged in order according to cost and in order according to a machining time per single workpiece material in step 9234, and the prioritized machines are recorded in a single center hole machining process file.

Upon completion of the recording of the prioritized machines, the processing associated with the single center hole machining process is finished in step 9235, and then the current processing returns to step 923 and proceeds to step 924.

On the other hand, if it has been determined in step 9231 that the current process is not the process for machining the material while it is supported at its center hole, another process is so that a center hole is made in the material during the course of turning the material while it is chucked in step 927.

FIG. 18 shows details of the process in step 924 for turning the material while it is supported at its single center hole.

The processing starts from step 9240. All of machines registered as ones to be used in turning the material while it is supported at its single center hole are selected from the machine tool file in step 9241, according to 1(3): the entire length, 1(4): the material diameter, 1(10): the number of workpieces to be machined, 2(2): tolerance symbols/upper and lower tolerances, 2(3): finishing symbols/the roughness of a finished surface, 2(4): configurational and positional accuracy, and 2(5): the accuracy of a screw/finishing symbols/roughness of a finished surface. Subsequently, tentative machining time and cost per single workpiece are calculated in step 9242 from 1(10): the number of workpieces to be machined and a volume to be removed as a result of a turning operation, by reading preparation time, preparation cost, an hourly removal volume, and machining cost from a data file associated with the selected machines.

Based on the results of the calculation, the selected machines are arranged in order according to cost and in order according to a machining time per single workpiece material in step 9243, and the prioritized machines are recorded in a file regarding the process for turning the material while it is supported at its single center hole.

Upon completion of the recording of the prioritized machines, the processing associated with the process for turning the material while it is supported at its single center hole is finished in step 9244, and then the current processing returns to step 924 and proceeds to step 950.

Figure 19:
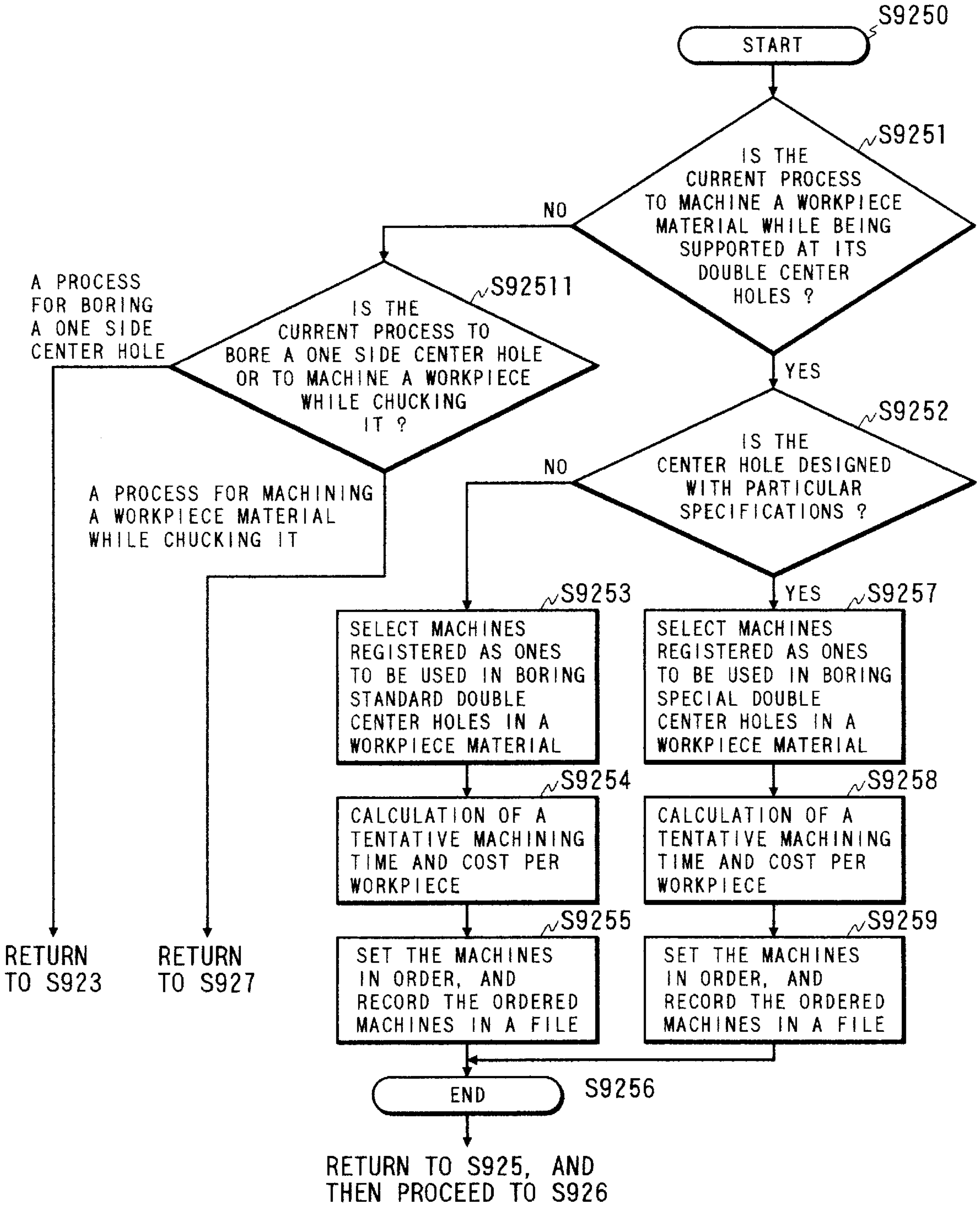
FIG. 19 is a flowchart for machining a workpiece while being supported at its double center holes, with regard to step 925 of the processing method according to the embodiment of the present invention.

The method of selecting machines for use in a double center hole machining process determined in step 925 is processed in the following manner:

FIG. 19 shows details of a process in step 925 for machining double center holes in the material.

The processing starts from step 9250. A decision as to whether or not the current process is a process for machining double center holes in the material is made in step 9251, according to 1(3): the entire length, 2(3): finishing symbols/the roughness of a finished surface, and the position of the center holes. If the current process is the process for machining double center holes in the material, the current process is checked against a file possessing data on the presence or absence of special specifications of the center hole in step 9252. If the process does not have any special specifications, all of machines which machine double center holes in the material in another process are selected in step 9253 from among machines registered as ones to be used in a standard double center hole machining process in the machine tool file, according to 1(3): the entire length and 1(4): the material diameter. Subsequently, tentative machining time and cost per single workpiece are calculated in step 9254 from 1(10): the number of workpieces to be machined and a volume to be removed as a result of machining double center holes, by reading preparation time, preparation cost, an hourly removal volume, and machining cost from a data file associated with the selected machines.

Based on the results of the calculation, the selected machines are arranged in order according to cost and in order according to a machining time per single workpiece material in step 9255, and the prioritized machines are recorded in a double center hole machining process file.

Upon completion of the recording of the prioritized machines, the processing associated with the double center hole machining process is finished in step 9256, and then the current processing returns to step 925 and proceeds to step 926.

If it has been determined in step 9251 from the position of the center hole that the current process is not a process for machining the material while it is supported at its double center holes, a decision, as to whether the current process is the single center hole machining process or the process for machining the material while it is chucked, is made in step 92511. Then, the current processing returns to steps 923 and 927, and the machining process is selected.

If it has been determined in step 9252 that a special center hole is to be machined, i.e., if it has been determined that it is impossible for the standard double center hole machining tool to machine the center hole, all of machines registered as ones to be used in machining special double center holes in the material are selected in step 9257 from the machine tool file, according to 1(3): the entire length and 1(4): the material diameter. Subsequently, tentative machining time and cost per single workpiece are calculated in step 9258 from 1(10): the number of workpieces to be machined and a volume to be removed as a result of machining the special double center holes, by reading preparation time, preparation cost, an hourly removal volume, and machining cost from a data file associated with the selected machines.

Based on the results of the calculation, the selected machines are arranged in order according to cost and in order according to a machining time per single workpiece material in step 9259, and the prioritized machines are recorded in a special double centerfold machining process file.

Upon completion of the recording of the prioritized machines, the processing associated with the special double center hole machining process is finished in step 9259, and then the current processing returns to step 925 and proceeds to step 926.

Figure 20:
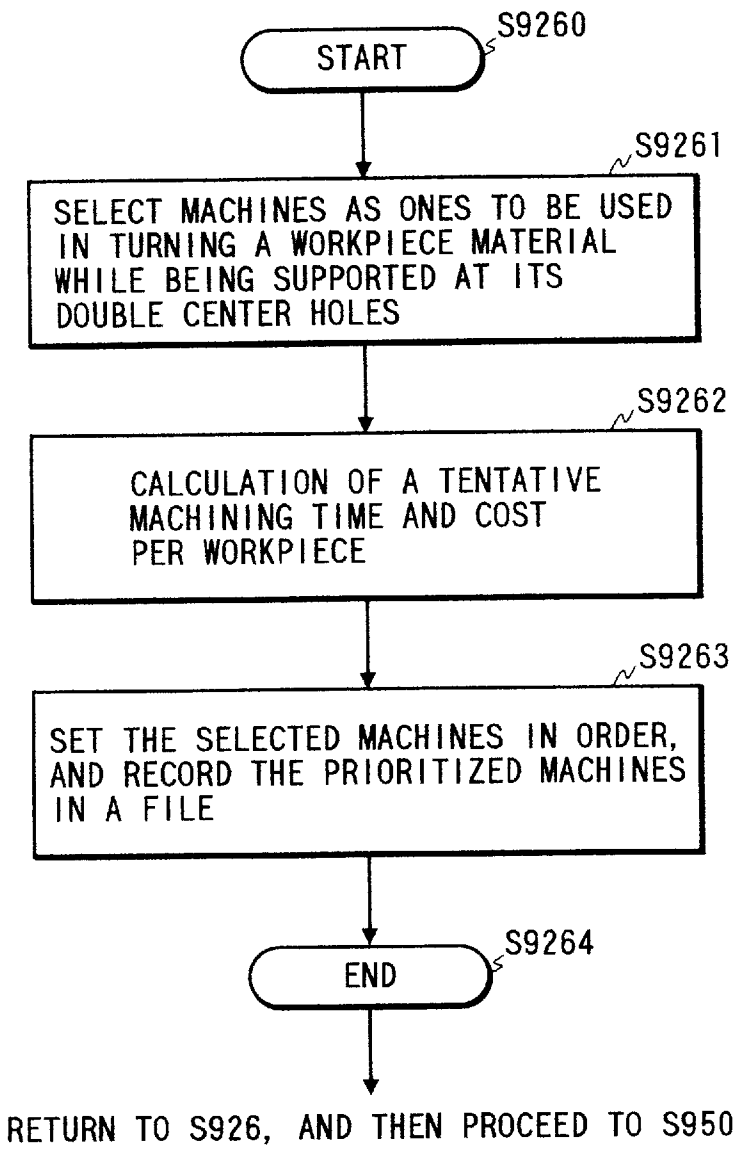
FIG. 20 is a flowchart for turning a workpiece while being supported at its double center holes, with regard to step 926 of the processing method according to the embodiment of the present invention.

FIG. 20 shows details of a process in step 926 for turning the material while it is supported at its double center holes.

The processing starts from step 9260. All of machines registered as ones to be used in a process for turning the material while it is supported at its double center holes are selected in step 9261 from the machine tool file, according to 1(3): the entire length, 1(4): the material diameter, 1(10): the number of workpieces to be machined, 2(2): tolerance symbols/upper and lower tolerances, 2(3): finishing symbols/the roughness of a finished surface, 2(4): configurational and positional accuracy, and 2(5): accuracy of a screw/finishing symbols/the roughness of a finished surface. Subsequently, tentative machining time and cost per single workpiece are calculated in step 9262 from 1(10): the number of workpieces to be machined and a volume to be removed as a result of the turning operation, by reading preparation time, preparation cost, an hourly removal volume, and machining cost from a data file associated with the selected machines.

Based on the results of the calculation, the selected machines are arranged in order according to cost and in order according to a machining time per single workpiece material in step 9263, and the prioritized machines are recorded in a file regarding the process for tuning the material while it is supported at its double center holes.

Upon completion of the recording of the prioritized machines, the processing associated with the process for turning the material while it is supported at its double center holes is finished in step 9264, and then the current processing returns to step 926 and proceeds to step 950.

A machining method which assigns a priority to the machining time is adopted when calculating a tentative turning time so that the maximum profit can be expected. The machines selected for use in finishing a workpiece by lathe turning are arranged in order based on the above described criterion.

The criterion for providing the maximum profit is basically intended to maximize the number of workpieces to be hourly machined (number of product).

Figure 21:
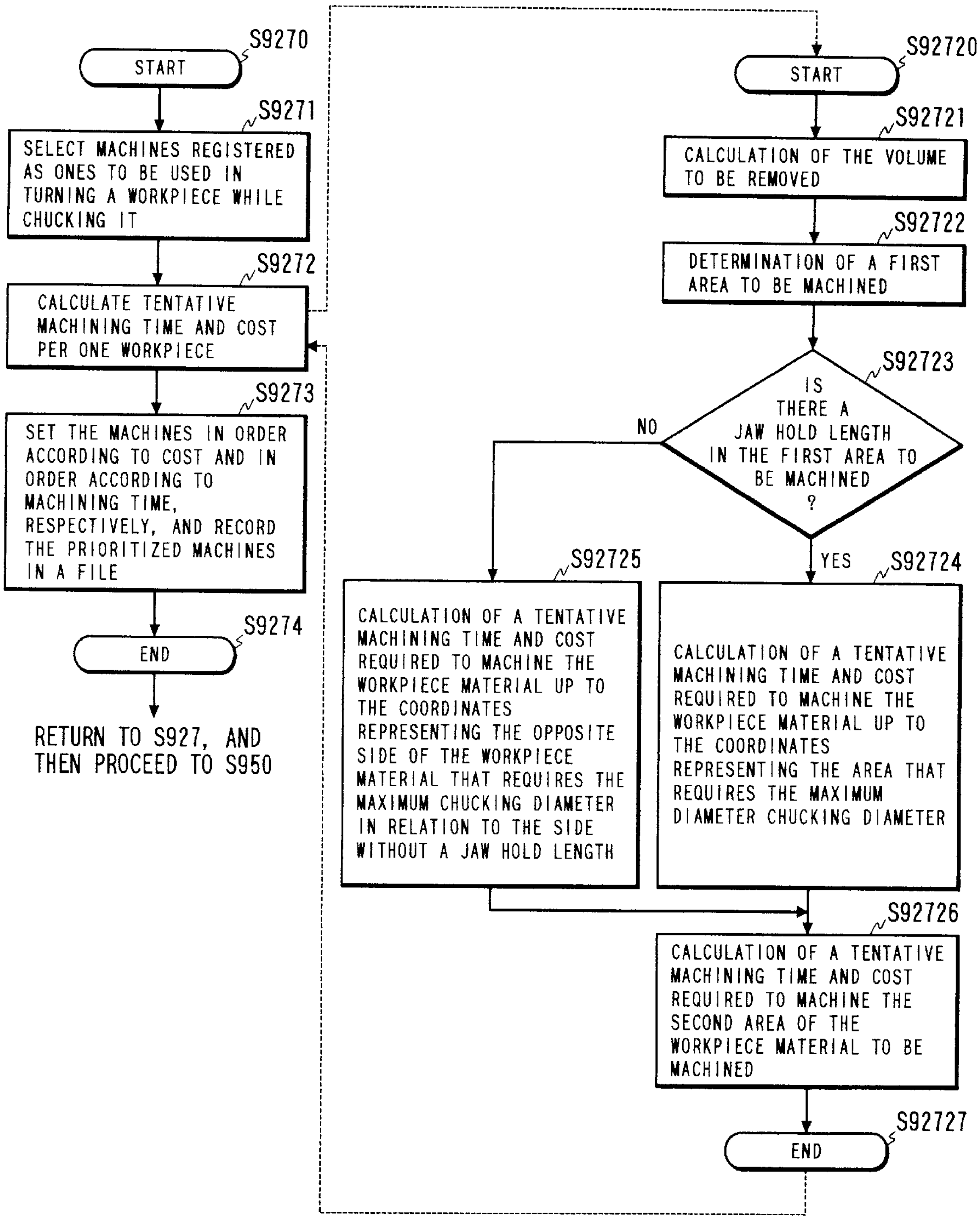
FIG. 21 is a flowchart for turning a workpiece while being chucked, with regard to step 927 of the processing method according to the embodiment of the present invention.

FIG. 21 shows procedures related to the process in step 927 for turning the material while it is chucked.

The processing starts from step 9270. All of machines registered as ones to be used in turning the material while it is chucked are selected in step 9271 from the machine tool file, according to 1(3): the entire length, 1(4): the material diameter, 1(10): the number of workpieces to be machined, 2(2): tolerance symbols/upper and lower tolerances, 2(3): finishing symbols/the roughness of a finished surface, 2(4): configurational and positional accuracy, and 2(5): accuracy of a screw/finishing symbols/the roughness of a finished surface. Subsequently, tentative machining time and cost per single workpiece are calculated in step 9272 from 1(10): the number of workpieces to be machined and a volume to be removed as a result of the turning operation, by reading preparation time, preparation cost, an hourly removal volume, and machining cost from a data file associated with the selected machines.

FIG. 21 shows procedures used when calculating tentative time and cost associated with the process for turning the material while it is chucked in step 9272.

The calculation of the time and cost is started in step 92720. A volume to be removed which is used for deciding an area to be machined, and the product of the volume to be removed and a mean radius are calculated in step 92721.

The product of the volume to be removed and the mean radius is to be dealt as a coefficient obtained as a result of multiplying an average radius between a material radius and a finished material radius in each stage by the volume to be removed in each stage, and by adding a time factor associated with the turning operation to the product.

FIG. 177 shows the volume to be removed, i.e., the volume to be removed as a result of turning a workpiece of the present embodiment.

FIG. 178 shows the product of the volume to be removed and the mean radius, i.e., the product of the volume to be removed as a result of turning a workpiece of the present embodiment and the mean radius.

A first area to be machined is determined by setting the maximum outside diameter and the minimum inside diameter of the material in step 92722. The maximum outside diameter and the minimum inside diameter are divided between both sides of the material in such a way as to be equal to half the product of the volume to be removed and the average diameter. The side of the material which has a larger product of the volume to be removed and the mean radius is taken as a first area to be machined. A decision as to whether or not the first side to be machined has a chucking allowance is made in step 92723. If the first side has a chucking allowance, the processing proceeds to step 92724. Then, tentative machining time and cost needed to machine the material up to the coordinates representing the area that requires the maximum outside chucking diameter, and needed to machine the material up to the coordinates representing the area that requires the minimum inside chucking diameter, are calculated.

If the product of the volume to be removed and the mean diameter with regard to the maximum outside diameter or the minimum inside diameter is twice or more as large as the product of the volume to be removed and the mean diameter with regard to another outside diameter or the inside diameter (i.e., a parameter which can be arbitrarily set to a numerical value), half the material is roughed in the first machining step, and the other half of the workpiece material is roughed in the second machining step. If it is judged from the finishing symbols and designation of the roughness of a finished surface that it is difficult to ensure a certain degree of accuracy when the workpiece material is machined in several steps, in view of resultant values in the machine tool file, the workpiece material is finished by one operation in the second machining step. If it is possible to ensure a certain degree of accuracy, the workpiece material is finished in several processes.

As a special exception, if the area continued from the area machined in the first step is a tapered portion having an acute cone angle or a screw thread without a chucking allowance, the second machining process is carried out prior to the first machining process irrespective of the result of the above described processing procedures.

If it has been determined in step 92723 that no chucking allowance is available, tentative machining time and cost required to machine the workpiece material up to the coordinates representing the area opposite to the area that requires the maximum outside chucking diameter, and needed to machine the material up to the coordinates representing the area opposite to the area that requires the minimum inside chucking diameter are calculated. Upon completion of the processing, the remaining area of the material is dealt with as an area to be machined in the second machining process. Tentative machining time and cost associated with the second machining process are then calculated in step 92726. Upon completion of the calculation, the processing for calculating the tentative time and cost associated with the process for turning the material while it is chucked is completed in step 92727. Then, the processing returns to step 9272 and further proceeds to step 9273.

According to another criterion, the maximum outside diameter and the minimum inside diameter are divided between both sides of the material so as not to exceed one-half the product of the volume to be removed and the mean radius, and the area to be machined is prevented from being divided so as to extend over steps. The area to be machined, according to the present embodiment, shown in FIG. 178 is determined according to the above criterion. In the case of the drawing of the material, the area is defined between the 22nd step and 23rd step. The area between 1st step and 22nd step is determined as a first area, the area between 23rd step and 38th step is determined as a second area. In the case of rod material having a diameter of 115 mm, the area between 1st step and 21st step is determined as a first area, and the area between 22nd step and 38th step is determined as a second area, thereby resulting in highly productive determination of the areas.

Based on the result of the determination of the areas to be machined, the machines are arranged in order according to cost and in order according to machining time per single workpiece material in step 9273. The thus prioritized machines are recorded in the file regarding the process for turning the material while it is chucked.

Upon completion of step 9274, the processing returns to step 927, and further proceeds to step 950.

Figure 14:
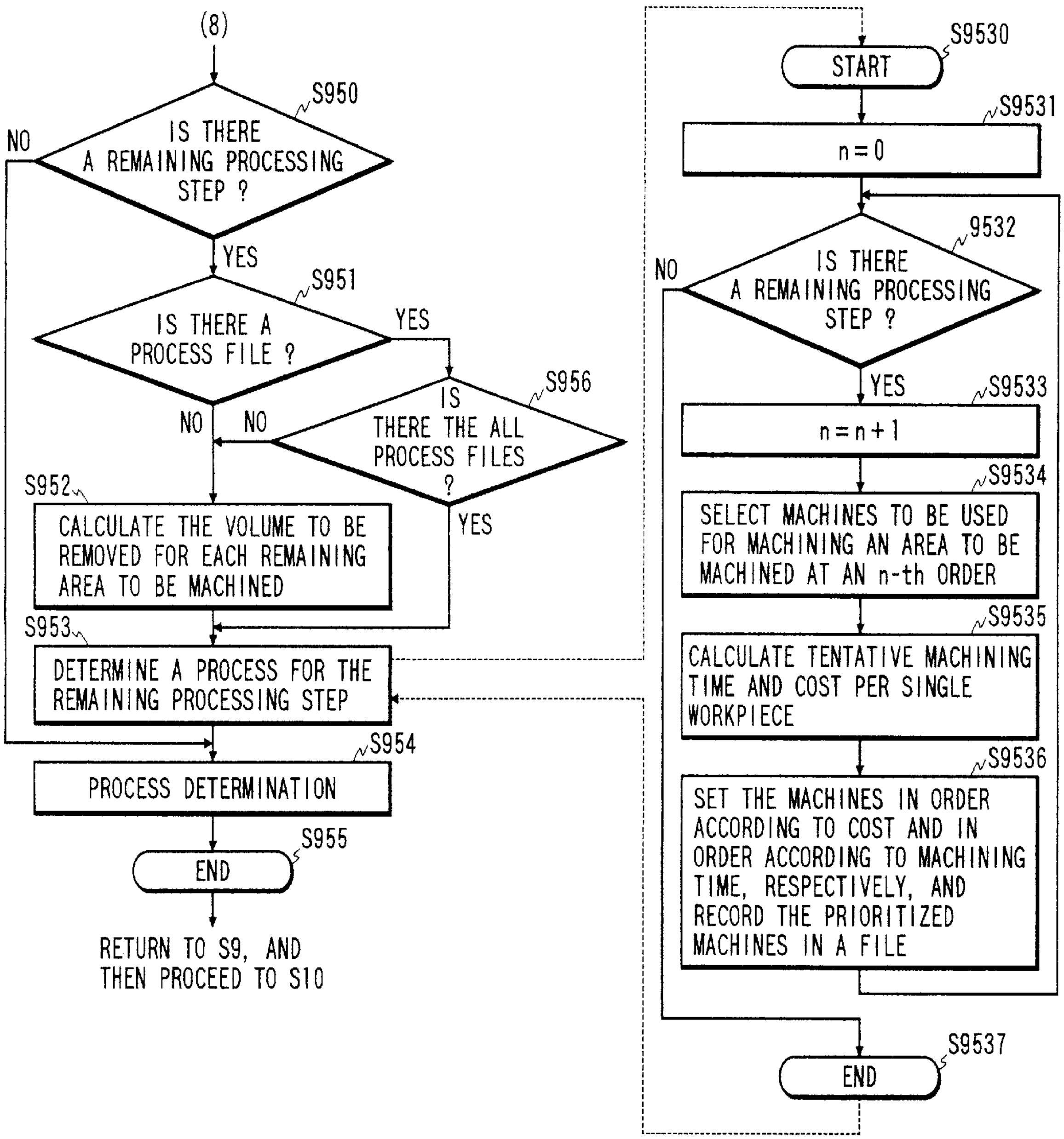
FIG. 14 is a flowchart continued from FIG. 13, that is, the machining process determination flowchart according to the embodiment of the present invention.

FIG. 14 shows processing procedures following step 950.

A decision as to whether or not there is a process for machining remaining areas is made in step 950, using input data and 2(3): finishing symbols/the roughness of a finished surface. If areas to be machined still remain, a decision as to whether or not there is a process file is made in step 951. If no process file is present, the processing proceeds to step 952.

In step 952, the volume to be removed is calculated for each of the remaining areas to be machined. The volumes to be removed are arranged in a descending order of volume. With regard to the machining method, a cutting operation: G, a honing operation: GH, a superfinishing operation: GSP, various types of special machining operation: SP . . . are arranged in descending order of a degree of roughness of a finished surface. The processes are arranged by combining together these two elements according to the roughness of a finished surface.

FIG. 177 shows results of the calculation of the volume to be removed according to the present embodiment.

In addition to the volumes to be removed as a result of turning the material associated with the input material drawing shown in FIG. 178, the volumes to be removed shown in FIG. 177 are arranged in order.

Volumes to be removed as a result of a turning operation:

(1) Volume to be removed as a result of turning a material while it is supported in a cantilever fashion −181.147 $cm^3$, (2) Volume to be removed as a result of turning a material while it is supported in a cantilever fashion −126.136 $cm^3$, Volumes to be removed as a result of machining a remaining area to be processed:

(3) Volume to be removed as a result of forming an external cam in the remaining area −16.439 $cm^3$, (4) Volume to be removed as a result of forming a groove in an end face −8.042 $cm^3$, (5) Volume to be removed as a result of forming a grooved cylindrical cam −6.626 $cm^3$, (6) Volume to be removed as a result of forming a cam in an end face −3.833 $cm^3$, (7) Volume to be removed as a result of forming an external gear −3.731 $cm^3$, (8) Volume to be removed as a result of forming an internal gear −3.267 $cm^3$, (9) Volume to be removed as a result of forming a keyway −1.734 $cm^3$,

(10) Volume to be removed as a result of forming an internal gear −1.272 $cm^3$,

(11) Volume to be removed as a result of forming a cylindrical outside polygon −0.768 $cm^3$,

(12) Volume to be removed as a result of forming a keyslot −0.576 $cm^3$,

(13) Volume to be removed as a result of forming a tapped hole −0.330 $cm^3$, and

(14) Volume to be removed as a result of boring a hole −0.098 $cm^3$.

In the present embodiment, an explanation is given of the material without a pre-formed hole. However, if the material has a pre-formed hole, the volume to be removed varies, which in turn results in changes in the direction of a machining operation. Further, the presence of the pre-formed hole in the material causes a change in the order of machining processes. If the material has a pre-formed hole, machining processes are arranged in an order such as a process for roughing an end face, a process for roughing an internal circumference, . . . . If the material does not have a pre-formed hole, the machining processes are arranged in an order such as a process for forming a pre-formed hole for boring purposes, a process for roughing an end face, . . . . In the present embodiment, the latter order of machining operations is employed as a standard.

Upon completion of this step, the processing proceeds to step 953. If it has been determined in step 951 that a process file exists, a decision regarding a degree of the entry of that process is made in step 956. If the entry for all of the processes has already been completed, the processing proceeds to step 953, and operations are carried out in accordance with the order of the process files. On the other hand, if the entry has partly been completed, the processing proceeds to step 952, and the volume to be removed for the remaining areas is calculated. Upon completion of this step, the processing proceeds to step 953.

Machining process names (names obtained on the HELP screen by reading process symbols which are provided with registration marks * in the process file shown in FIG. 77) are input to the process file in compliance with an input format, as shown in FIG. 109, comprising the designation of a process/the presence or absence of a specified tool/a fixture number/a finishing allowance.

It is also possible to write or read the designation of a tool, a fixture number, a finishing allowance associated with the current process, and a finishing allowance associated with another process, into or from, the information already filed as items on the HELP screen, as required.

If an entry is made for the designation of a tool, entries for the designation of a tool and conditions are made for each process in accordance with an input format regarding to the designation of a tool/cutting condition shown in FIG. 110. As previously mentioned, the entry is carried out with reference to the HELP screen.

FIG. 14 shows procedures in step 953 for selecting a machine to be used in each process for machining a remaining area.

The processing starts from step 9530. In step 9531, a process counter is set to n=0. A decision as to whether or not a process still remains is made in step 9532. If a process still remains, the process counter is counted up to n=n+1 in step 9533. A machine used in machining the area to be machined in an n-th order is selected using the input data in step 9534. In step 9535, tentative machining time and cost per single workpiece material are calculated from 1(10): the number of workpiece materials to be machined and the volume to be removed, by reading preparation time and cost, hourly removal volume, and machining costs from the file associated with the selected machines.

Based on the results of the calculation, the machines are arranged in order according to cost and in order according to a machining time per single workpiece material, respectively, and the thus prioritized machines are recorded in an n-th machining process file. Upon completion of the recording of the machines, the processing returns to step 9532 and the processing procedures following step 9532 are executed again. If it has been determined in step 9532 that no process remains, the current processing is completed in step 9537, and the processing returns to step 953 and further proceeds to step 954.

Figure 22:
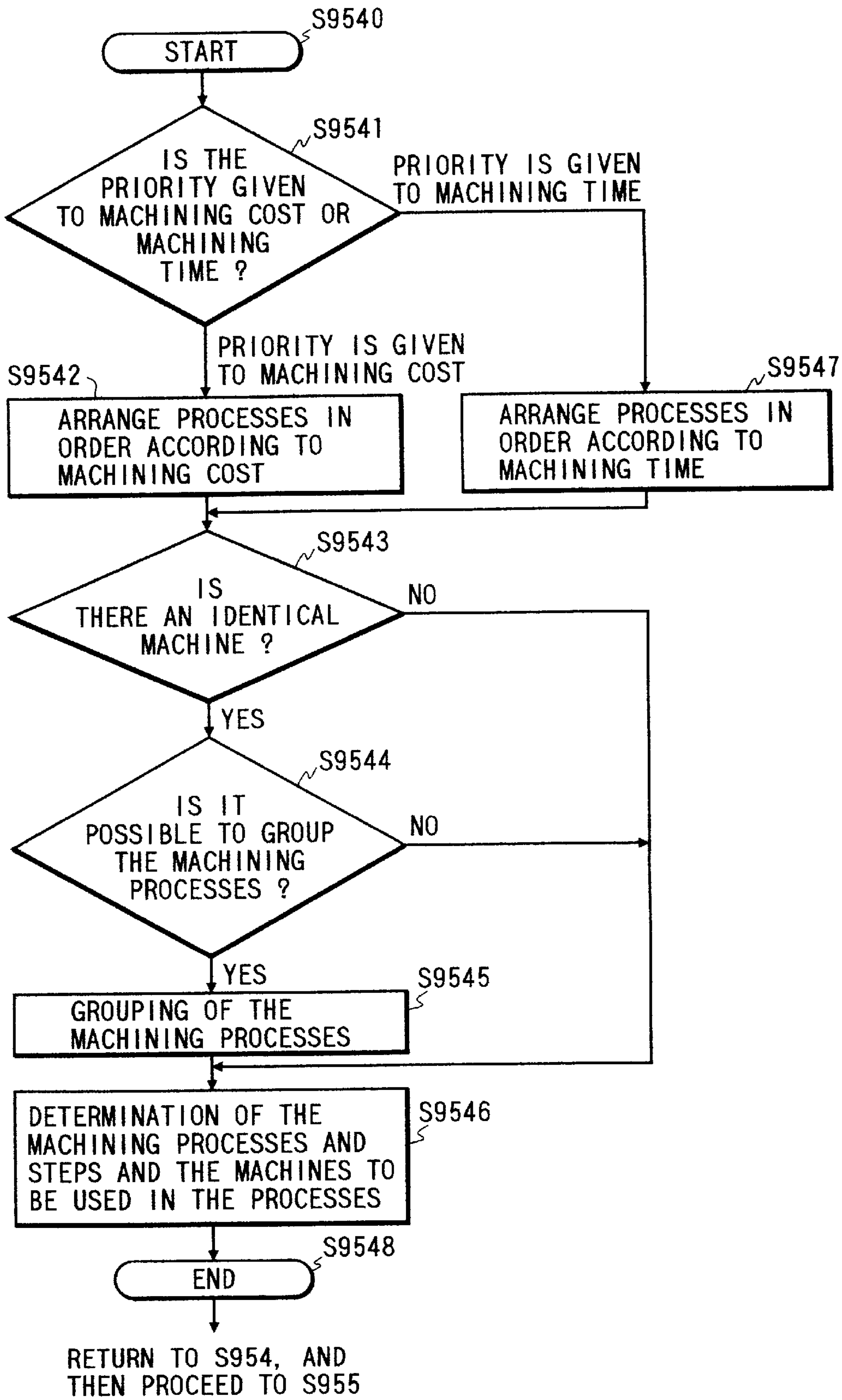
FIG. 22 is a process determination process with regard to step 954 of the processing method according to the embodiment of the present invention.

FIG. 22 shows process decision procedures in step 954.

Machines for use in a process determined in step 954 are selected and decided in the following manner.

Processes are identified by quoting data: namely, input items to be used—input patterns, and designated processes, files to be used—a process file, a fixture file, a tool file, a cost file, and a pattern file, and data developed from them. As a result, a final processing process is determined.

The processing processes and the machine tool used in that process have already been selected, and the number of combinations of the processes and the selected machine tools is minimized.

The sets of machine tools are sorted so that they can meet the respective conditions shown below:

* in the case where the machine tools are selected in order of decreasing precedence so as to minimize the number of machine tools;

* in the case where a high prority is provided to productivity, and in the case where a high priority is provided to machining cost; and

* in the case where a designated group of machine tools are used for making availability factors of the machine tools uniform.

It is checked whether or not a machine tool having a graphic processing volume is present.

The processing starts from step 9540. A decision as to whether the priority is assigned to a machining cost or a machining time is made in step 9541. If the priority is given to machining cost, minimum machining cost processes defined between the first to the n-th process are read, in step 9542, from a file which is prioritized according to machining cost in the machining process file. The thus read minimum machining cost processes are then arranged. If the priority is given to machining time, tentative minimum machining time processes defined between the first to the n-th process from a file which is prioritized according to machining time in the machining process file. The thus read tentative minimum machining time processes are arranged. After completion of the processing, a decision as to whether or not an identical machine is selected for these processes is made in step 9543. If the identical machine is selected, a decision as to whether or not the processes can be grouped is made in step 9544 in view of the directions of chucking and machining operations. Only when the processes are included in the identical chucking or machining process, the processes are grouped in step 9545. If it is impossible to group the processes, the processing proceeds to step 9546. If it has been determined in step 9543 that the identical machine is not selected, the processing proceeds to step 9546.

If tools having the identical machining function, tools having a similar function, and finishing symbols and finished surface roughness related to areas to be machined by these tools, are less than the identical rank, processes associated with these tools, symbols, and surface roughness are grouped in step 9545. If thermal refining processing, a roughing operation associated with another machine tool, and measurement are included between the processes of the selected machine tools, the processes are classified as being different processes. Further, if processes do not agree with these processing standards, or if the processes are comprehensively ambiguous, they are classified as being different processes.

The processes that have been selected in the processing prior to the current processing are listed in step 9546, and they are arranged in order according to machining cost or machining time.

A decision as to whether the priority is given to cost or machining time is determined by the optimum cutting rate.

The optimum cutting rate is obtained by expanding the known Tailor's equation (i.e., a tool life equation) $S=VT^n$.

Equation (30) gives the cutting cost: namely, $$C=C_w t_i+C_w AV^{-1}+C_w t_{tc} A(V^{((1/n)-1)}/S^{1/n})+C_t A(V^{((1/n)-1)}/S^{1/n}) \quad (30),$$

where $C$=cutting cost, $W_o$=wedge, $C_m$=machine charge, $C_r$=running charge, $C_w=W_o+C_m+C_r$=charge and wedge, $t_i$=non-cutting time, A=amount of cut converted into travel distance (m), V=cut rate (m/min.), $t_{tc}$=time required to replace abrasive tool with a new one (min./number of times), S=Tailor's constant, n=index, and $C_t$=tool charge.

FIG. 141 shows the Tailor's constant (S) and the index (n), and they are obtained by use of a constant table file for use with the tool life equation. FIG. 141 shows a table consisting of workpiece materials and tool materials. For example, if the workpiece material is SCM440H and the tool material is P20, S=284 and n=0.25.

Equation (31) obtained as a result of expanding Equation (30) gives a cutting rate ($V_{min}$) which minimizes cutting cost.

$$V_{min}=S\{C_w/((1/n)-1)(C_w \cdot t_{tc}+C_t)\}^n \quad (31).$$

Equation (32) obtained as a result of expanding Equation (31) gives a cutting rate ($V_{pmax}$) which minimizes cutting time.

$$V_{pmax}=S/\{((1/n)-1)t_{tc}\}^n \quad (32).$$

If the priority is assigned to the machining cost, the cutting rate ($V_{min}$) which minimizes cutting cost obtained by Equation (31) is used. On the other hand, if the priority is assigned to the machining time, the cutting rate ($V_{pmax}$) which minimizes cutting time obtained by Equation (32) is used.

Upon completion of the processing, the current sequence is completed in step 9548. The processing then returns to step 954 and further proceeds to step 955.

The sequence is completed in step 955, and the processing returns to step 9 of the main processing procedures and then proceeds to step 10.

As a result of the execution of the processing according to the above described processing procedures, the following results of the pattern of the present embodiment are obtained.

Order of machining operation, and Machining process:

The order of machining operations is determined according to a descending order of volume to be removed, a descending order of tolerance width, and an ascending order of finishing symbol.

| Machining process | Volume to be removed (volume) | Tolerance width/ tolerance symbol | Finishing symbol |
|---|---|---|---|
| (1) Turning of material while it is supported in a cantilever fashion - 1 | 181.147 $cm^3$ | | |
| (2) Turning of material while it is supported in a cantilever fashion - 2 | 126.136 $cm^3$ | | |
| (3) Machining of external cam | 16.439 $cm^3$ | | |
| (4) Forming of grooved end cam | 8.042 $cm^3$ | H8, | 2M |
| (5) Forming of grooved cylindrical cam | 6.626 $cm^3$ | H8, | 2M |
| (6) Forming of end cam | 3.833 $cm^3$ | | 2M |
| (7) Forming of internal cam | 3.267 $cm^3$ | H8, | 2M |

-continued

| Machining process | Volume to be removed (volume) | Tolerance width/ tolerance symbol | Finishing symbol |
|---|---|---|---|
| (8) Forming of keyway | 1.734 $cm^3$ | 0.036, | 2M |
| (9) Forming of cylindrical outside polygon | 0.768 $cm^3$ | 0.1, | 2M |
| (10) Forming of keyslot | 0.576 $cm^3$ | H8, | 2M |
| (11) Tapping of hole | 0.330 $cm^3$ | | |
| (12) Boring | 0.098 $cm^3$ | | |
| (13) Shaping of external gear | 3.731 $cm^3$ | 0.015, | 3M |
| (14) Shaping of internal gear | 1.272 $cm^3$ | 0.020, | SPED |
| (15) Cutting of outer circumference | 0.661 $cm^3$ | h7, | 3G |
| (16) Cutting of external cam | 0.432 $cm^3$ | h6 (radius) | 3G |
| (17) Cutting of internal circumference | 0.070 $cm^3$ | H7, | 3G |
| (18) Measurement | | | |

In addition to the processes related to forged material as shown in the input example of the present embodiment, if a process related to rod material is also determined, a cutting process is added before the first step, i.e., the turning of the material while it is supported in a cantilever fashion—1, in the above listed processes.

Figure 23:
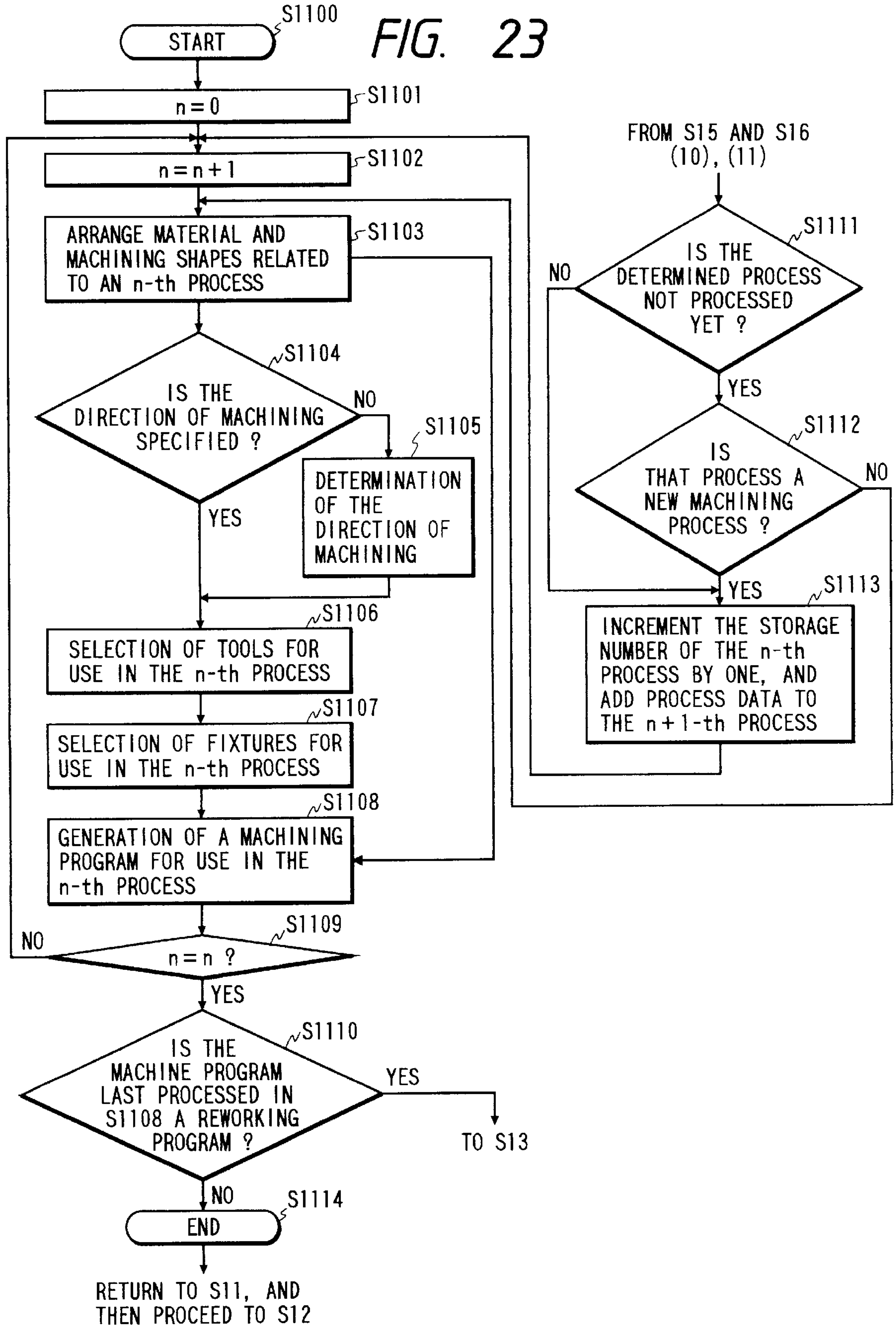
FIG. 23 is a flowchart for preparing a machine program for each process, with regard to step 11 of the processing method according to the embodiment of the present invention.

FIG. 23 shows procedures for preparing a per-process machine program in step 11.

This processing starts from step 1100. The process counter is reset to 0 in step 1101. The process counter is counted up to n=n+1 in step 1102.

A material drawing and a machining pattern are arranged in step 1103.

The material drawing and the machining pattern are arranged in the following manner in step 1103.

On the basis of the material drawings and machining patterns in the first machining process, a material drawing for use in the second machining process serves as a machining pattern for use in the first machining process, and the machining pattern for use in the second machining process serves as a material drawing in the third machining process. According to this rule, machining patterns related to processes are arranged.

In the present embodiment, the material drawing and the machining pattern are arranged for each process. However, they may be processed by one operation.

The result of the arrangement of the drawing and pattern is used as a machining pattern for use in each process. Upon completion of this step, the processing proceeds to step 1104.

A decision as to whether or not the direction of a removing operation has been designated is made in step 1104.

A stress is placed on productivity when the direction of a removing operation is determined, using an input item (an example of an input format is shown in FIGS. 107 and 108).

If the direction of removing is specified, follow that direction.

If the direction is not specified, the direction of a removing operation is determined in step 1105.

If the direction is specified, the processing proceeds to step 1106.

An entry for the direction of removing is determined according to the specified input format related to a machining operation shown in FIGS. 107 and 108. The direction of a removing operation included in the input items: an operation prioritized according to cost/time, a process, the direction of a removing operation, a tool, a fixture, cutting conditions, and a finishing allowance, is used for the entry.

The direction of removing is determined in step 1105.

The direction of removing associated with the turning process is determined in step 1105 shown in FIG. 23.

Figure 26:
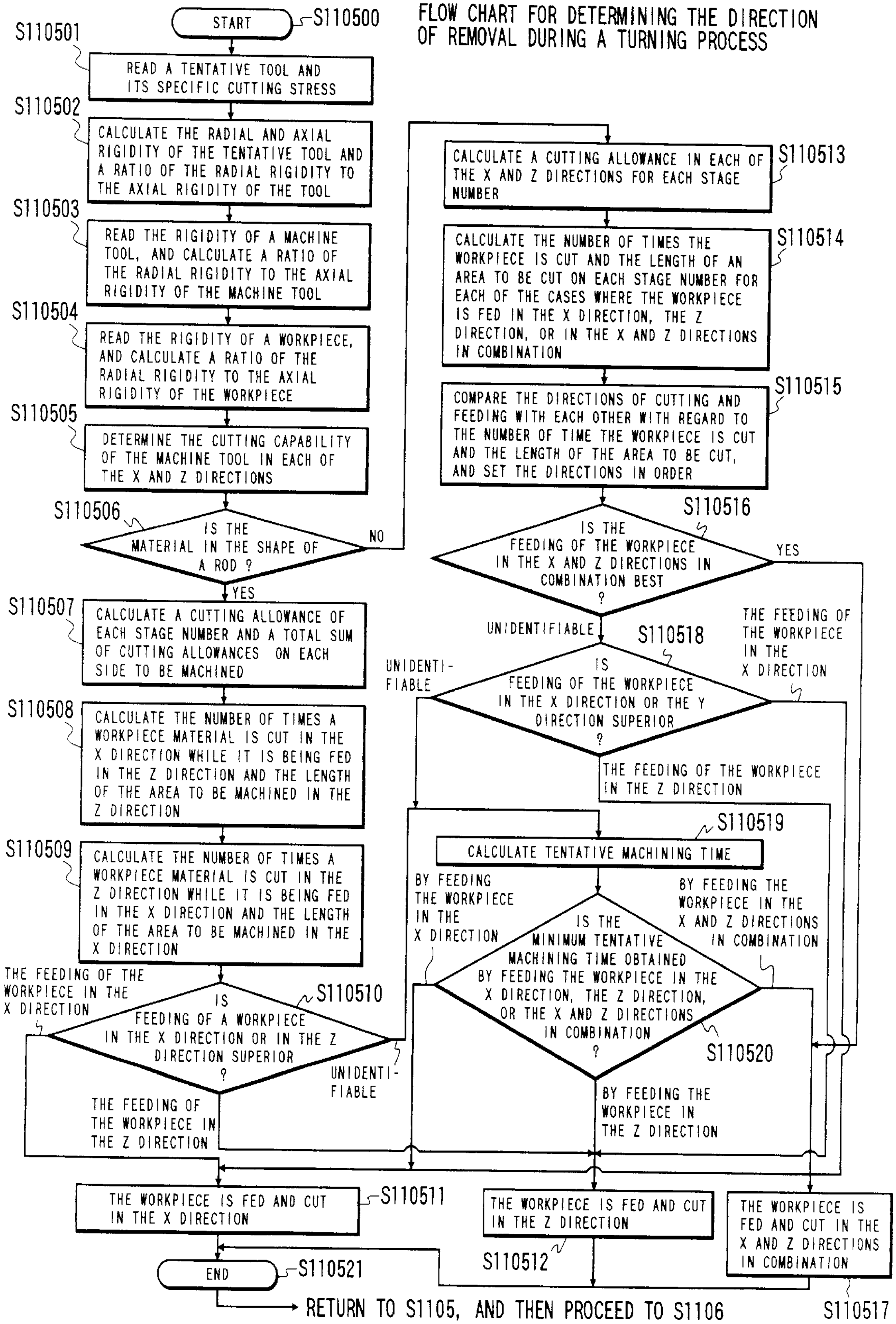
FIG. 26 is a flowchart for determining a removing direction in a turning process, with regard to step 1105 according to the embodiment of the present invention.

A flowchart of this processing is shown in FIG. 26.

In the case of the turning operation, the direction of removing is determined by calculating the productivity associated with the direction of the removing operation from a cross sectional area of a cutting allowance, the cutting allowance, a ratio for the extent of machining between a length in the Z (axis) direction to a length in the X direction (in the direction of an end face) in combination with the maximum depth of cut, mechanical rigidity, and tool rigidity, and by evaluating the thus obtained productivity using a machining time. The direction of feeding which provides a shorter period of machining time is selected, and then a roughing operation is carried out.

More specifically, a product of a finishing allowance and a length in each step is obtained for each of the distal end face, the outer circumference, and the internal circumference in each area to be machined. The sum of the product in the direction of a groove and the product in the direction of the end face is obtained, and the sum of the product in the direction of the outer circumference and the product in the direction of the internal circumference are obtained. The sum of the length of the area to be machined in the X direction (in the direction of the end face) and the length of the area to be machined in the Z direction (in the axial direction), i.e., the entire length of the area to be machined, is obtained for each area to be machined. Subsequently, each of the sums is divided by the entire length, so that a mean cutting allowance is obtained. The thus obtained mean cutting allowance is further divided by the maximum depth of cut. The result of the division is rounded up, whereby a macroscopic number of times the material is cut is calculated.

From this result, an extent of machining in the X direction (i.e., in the direction of an end face) (a product between a length in the X direction (in the direction of an end face) and the number of times the material is cut in the Z direction), and an extent of machining in the Z direction (i.e., in the axial direction) (a product between a length in the Z direction (in the axial direction) and the number of times the material is cut in the Z direction) are calculated. The thus obtained results are compared with each other. Among a ratio related to the conditions of the machine tool (i.e., a ratio of a product of the maximum depth of radial cut and the maximum axial feed of material, to a product of the maximum depth of axial cut and the maximum radial feed of material), a ratio regarding the tool conditions (a ratio of the maximum depth of radial cut, the maximum axial feed of material, the maximum depth of axial cut, and the maximum radial feed of material), and a ratio regarding the workpiece conditions (a ratio of radial rigidity to axial rigidity), the minimum ratio is selected. The thus selected ratio and the macroscopic number of times the material is cut are compared with each other. The direction of the removing operation which provides a shorter machining time is determined from a ratio of a machining time associated with the feed of material in the Z direction (in the axial direction) to a machining time associated with the feed of material in the X direction (in the radial direction).

In the above descriptions, the feeding of material in the X direction (in the radial direction) designates the cutting of material in the Z direction while it is fed in the −X direction (in the radial direction). On the other hand, the feeding of the material in the Z direction (in the axial direction) designates the cutting of the material in the X direction (in the radial direction) while it is fed in the −Z direction (in the axial direction).

The direction of a cutting operation in each machining step is different from the direction of the overall removing operation defined by the machine tool conditions. In the final machine program, the direction of the removing operation is determined for each step to be machined.

It is preferable to calculate the direction of the machining operation for each area to be machined in terms of evaluation of the productivity. However, in some cases, the areas to be machined are machined using the identical machine tool. If the areas are machined using the identical machine tool, it may be possible to determine the direction of a removing operation with regard to the entire areas.

Tools for use in the n-th process are selected in step 1106.

Figure 24:
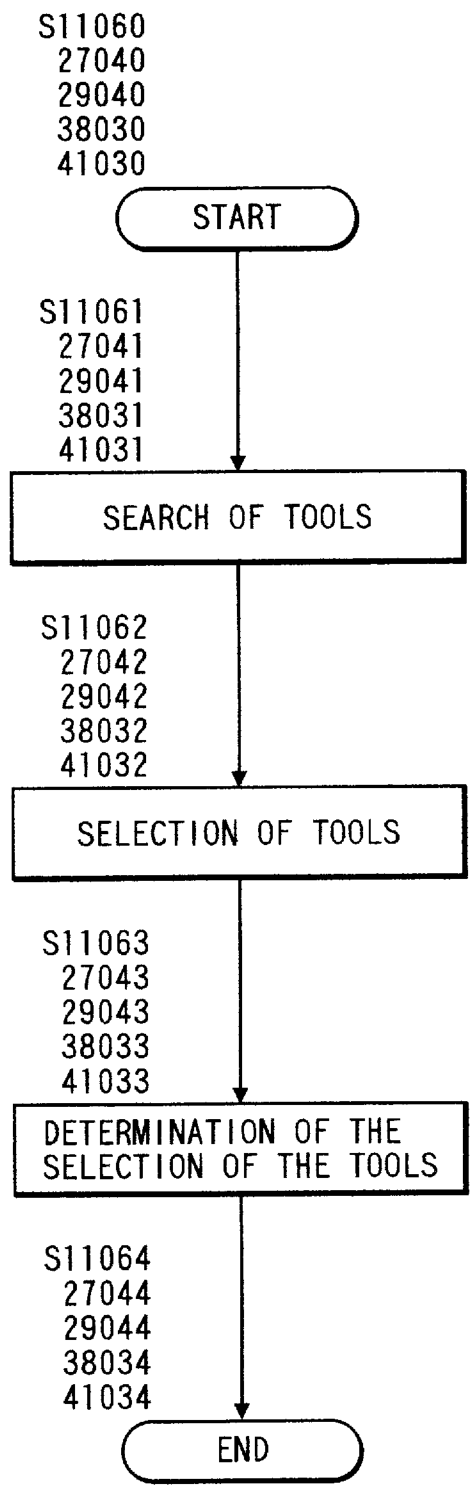
FIG. 24 is a tool selection flowchart with regard to steps 1106, 2704, 2904, 3803, and 4103 of the processing method according to the embodiment of the present invention.

FIG. 24 shows procedures for selecting tools for use in the n-th process in step 1106.

The selection of the tools starts from step 11060. Tools are retrieved in step 11061. The tool file processed in step 220 is retrieved using pictorial codes (FIG. 12) obtained as a result of processing pictorially input data in step 807. (As described in step 220, a machinable pattern is computed by means of the tip of an input tool and holder information, and the thus computed machinable pattern is registered as a tool code (including the starting point angle and end point angle with regard to a machining operation).) All of the tools that have a match with regard to graphical processing function codes are obtained through a search. The tools obtained in step 11061 are arranged in descending order of degree of versatility and rigidity in step 11062. Upon completion of the arrangement of the tools, tools best suited to the processing are selected and determined on the basis of the maximum and minimum productivity determined by the number of tools. The selection of the tool is completed in step 11064, and the processing returns to step 1106 and further proceeds to step 1107.

Fixtures for use in the n-th process are selected in step 1107.

Figure 25:
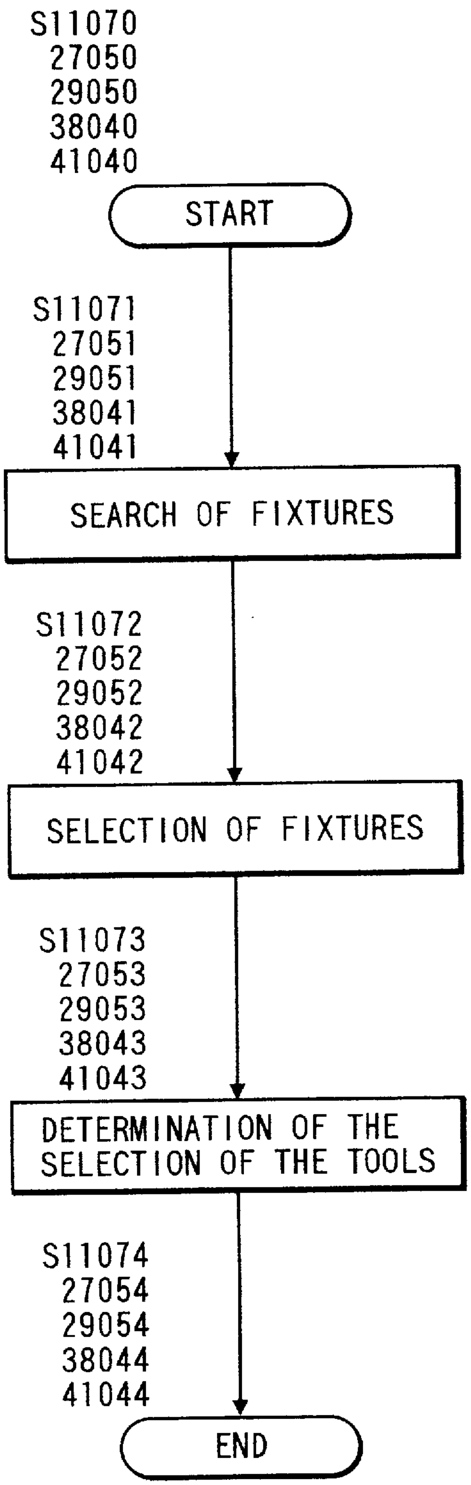
FIG. 25 is a fixture selection flowchart with regard to steps 1107, 2705, 2905, 3804, and 4104 of the processing method according to the embodiment of the present invention.

FIG. 25 shows procedures for selecting fixtures for use in the n-th process in step 1107.

The selection of fixtures starts from step 11070, and fixtures are obtained through a search in step 11071. Fixtures of the machine tool file input for each of the machine tools associated with the n-th process are obtained from input drawings through a search, using the area to be chucked as a key. The diameter and limit length of each side to be machined are selected as key elements in step 11072. Then, fixtures which have lengths less than the limit of length are selected, and the thus selected fixtures are arranged in order of length from shortest to longest. After the completion of the arrangement of the fixtures, a fixture having the most approximate chucking diameter is selected, for each side to be machined in step 11073, from the fixtures selected and arranged in step 11072. A fixture in common use for double machining operations is determined as being best suited. If the fixture in common use for both machining operations is not determined, a fixture best suited for each of machining operations is selected and determined. Upon completion of the selection and determination of the fixture, the selection of the fixture associated with the n-th process is completed in step 11074. The processing returns to step 1107 and then proceeds to step 1108.

An n-th machine program is processed in step 1108.

The processing carried out in step 1108 is as follows:

A rod material is added to a forged material according to an example of the input. Using these two types of material, the preparation of a machine program for machining a pattern in accordance with an example of entry for a finishing operation is described.

Processes related to the rod material and the forged material are different from each other only in whether or not a cutting operation is included. Further, a cutting allowance of the rod material becomes significantly large when the material is turned while it is supported in a cantilever fashion in the second and third processes. However, the processes following the third process and the cutting allowance associated with the rod material are identical with the processes and the cutting allowance associated with the forged material.

Processes are arranged in the following order:

| Process No. | Rod Material | Forged Material |
|---|---|---|
| 1 | Cutting | None |
| 2 | Turning material while it is supported in a cantilever fashion | Turning material while it is supported in a cantilever fashion |
| 3 | Turning material while it is supported in a cantilever fashion | Turning material while it is supported in a cantilever fashion |
| 4 | Forming external cam | Forming external cam |
| 5 | Forming grooved end cam | Forming grooved end cam |
| 6 | Forming grooved cylindrical cam | Forming grooved cylindrical cam |
| 7 | Forming end cam | Forming end cam |
| 8 | Forming internal cam | Forming internal cam |
| 9 | Forming keyway | Forming keyway |
| 10 | Forming cylindrical outside polygon | Forming cylindrical outside polygon |
| 11 | Forming keyslot | Forming keyslot |
| 12 | Tapping hole | Tapping hole |
| 13 | Boring | Boring |
| 14 | Shaping external gear | Shaping external gear |
| 15 | Shaping internal gear | Shaping internal gear |
| 16 | Cutting outer circumference | Cutting outer circumference |
| 17 | Machining external cam | Machining external cam |
| 18 | Cutting internal circumference | Cutting internal circumference |
| 19 | Measuring | Measuring |

Procedures for deciding the machine program while the rod material is distinguished from the forged material, and a result of the execution of this machine program will now be described.

A decision as to whether or not n=n is made in step 1109. If a process still remains, the processing returns to step 1102. On the other hand, if no process remains, a decision as to whether or not the last process processed in step 1108 was a re-machine program is made in step 1110. If it was not a re-machine program, the sequence is completed in step 1114, and the processing returns to step 11 and further proceeds to step 12.

According to another criterion, the maximum outside diameter and the minimum inside diameter are divided between both sides of the material so as not to exceed one-half the product of the volume to be removed and the mean radius, and the area to be machined is prevented from being divided so as to extend over steps. The area to be machined, according to the present embodiment, shown in FIG. 178 is determined according to the above criterion. In the case of the drawing of the material, the area is defined between the 22nd step and 23rd step. The area between 1st step and 22nd step is determined as a first area, the area between 23rd step and 38th step is determined as a second area. In the case of rod material having a diameter of 115 mm, the area between 1st step and 21st step is determined as a first area, and the area between 22nd step and 38th step is determined as a second area, thereby resulting in highly productive determination of the areas.

Cutting Process:

The forged material, i.e., the input material, of the present embodiment does not require the cutting process. General matters of the input drawing, that is, 1(3): the entire length, 1(4): a material diameter, and 1(8): the dimension of a workpiece material, are used as input data when the machine program is prepared in the cutting process.

If the material is a polishing material or a rod-shaped material (a decision: if a ratio of a length to the entire length which are input into the entry for the size of the workpiece material is in excess of two), the machine tool is a bar feeding machine. If the bar feeding machine is not registered, the cutting operation is set so as to cut the rod material into a single workpiece.

If the size of the workpiece material is in excess of the entire length of +10 mm (10 mm is a modal value which the user can arbitrarily change), the cutting operation is set so as to cut the rod material into a single workpiece.

The finishing allowance is read from an end face finishing allowance file (FIG. 123) with regard to a finishing allowance of the rod material to be turned, using 1(4): a material diameter and 1(3) the entire length as variables. In the present embodiment, 1.5 mm is read by means of the material diameter: 115 mm and the entire length: 210 mm.

Machines are read from the machine tool file (FIGS. 58 to 76) by utilization of 1(3): the entire length, 1(4): the material radius, and 1(8): the dimension of the workpiece material. A program for selecting and conveying material and for cutting material into a single workpiece is prepared using a variety of data of the machine tool file. As shown below, this program may also be changed so as to permit repeated cutting operations by use of a block skip symbol (/) together with the steps. Explanation of procedures for preparing the machine program which uses the machine tool file for use with a cutter of the present embodiment are omitted.

| Machine program | Contents of the program |
|---|---|
| N001 G90; | Specify an absolute value instruction. |
| /N002 D115.; | Select material (diameter: 115. mm) |
| /N003 M56; | Feed the material to a reference position. |
| /N004 G00 Y115.; | Specify a clamp diameter (the positions of pawls are set to the clamp diameter). |
| N005 M01; | Optional stop |
| N006 G00 Z218.; | Feed the material over a distance inlcuding a tool width of 5 mm. (210 + 1.5 × 2 + 5 = 218 mm) |

-continued

| Machine program | Contents of the program |
|---|---|
| N007 M68; | Clamp the material. |
| N008 G00 X-1.Z0; | Bring a cutting tool close to the material (with a margin of 1 mm). Return the material feed control shaft to its original position. |
| N009 G01 X118. F120M03M08; | (115 + a margin: 3 = 118), Rotate the main spindle, and turn on a cooling unit. Calculate a feed rate from a cut rate of 120 mm/min. (in the tool file shown in Figs. 78 to 85). F = 0.15 × 20/(3.14 × 0.315) × 40 = 121 [mm] |
| N010 G00 X-10. M05M09; | Move the cutting tool backward, and stop the main spindle. Turn off the cooling unit. A margin of 10 mm. |
| N011 M69; | Release the material. |
| N012 M02; | Program end (the machining operation is completed) |
| /N013 G00X-50.Y150; | Return the tool and the clamp claws to their original points. |
| /N014 M00; | Program stopped |

(Description of the contents of the machine program)

In N001, the coordinate system is set to be in compliance with an absolute value instruction using G90. A material measuring 115 mm is selected in N002. The material is fed to a reference position in N003. A material diameter of 115 mm is specified in N004, and claws are set to their clamping positions. The completion of the preparation is specified in N005. Steps between N006 and N012 define a common cutting cycle. In N006, the material is fed over a distance which equals to the sum of the entire specified length of a workpiece, a finishing allowance, and a cutting tool width (the length of the material obtained as a result of a cutting operation is 213 mm). The material is clamped so that the material can withstand a machining force in N007. In N008, the tool is quickly made to travel to a point 1 mm short of the material, and the material feed control shaft is returned to its original point. In N009, the main spindle of the tool and the cooling unit are activated. The tool travels at a rate of 120 mm/min, and the machining operation is completed after the tool has penetrated the material 3 mm into the material. In N010, the main spindle of the tool and the cooling unit are stopped while the cutting tool is spaced 10 mm away from the material. In N011, the material is released from the clamp. In N012, the machining operation is stopped. In N013, the cutting tool and the clamping claws are returned to their original positions within the volume of the machine tool in order to be ready for the radius of the next material. The program is stopped in N014. If the material is repeatedly cut into an identical length, a block skip switch is turned on. Steps between N006 and N012 are repeated with the exception of the steps provided with the block skip symbol (/). The processing escapes from the loop by turning off the block skip switch in N012, and the processing is continuously executed up to N014. Then, the processing is completed.

Turning Process

A turning process uses data of a variety of files and a drawing of a workpiece before it has finished undergoing another process. The drawing (in a file for an intermediately finished shape shown in FIGS. 173 to 176) was calculated in previously described step 7, that is, it was calculated by the graphical processing of the workpiece before it has finished undergoing another process by utilization of input data on materials and finishes.

Determination of an order in which a turning process is carried out:

The areas to be machined determined in step 92722 are directly used in determining the order in which the turning operation is carried out.

In the present embodiment, as previously mentioned, the area between the first step and the 25th step which requires a large volume to be removed are taken as an area for a first machining operation (i.e., front side processing), and the area between the 27th step and the last step is designated as the second area to be finished (i.e., rear side processing).

Determination of a removing direction in the turning process

As previously mentioned, the removing direction is determined in step 1105 shown in FIG. 23.

FIG. 26 shows a flowchart for the details of this processing.

In FIG. 23, the determination of the removing direction starts from step 110500. Temporal tools and associated tool conditions are read from tool files (shown in FIGS. 78 to 85).

Among universal roughing tools, tools having the maximum rigidity, tools capable of producing the maximum depth of cut, tools having the maximum feed rate, and tools having the minimum length of a projection with respect to a tool holder, are retrieved from the tool file. Tools having a tool ID number (tool ID number 1 as shown in FIG. 78 in the present embodiment), the tool rigidity ($\delta$max of 0.003 mm both in the radial and axial directions in the present embodiment), the maximum depth of cut (12.43 mm in the present embodiment), the maximum feed rate (0.4 mm in the present embodiment), and the length of the projection of the tool from the tool holder (25 mm in the present embodiment) are read.

(The reading of the tools is embodied depending on selecting conditions. Tools having the maximum productivity are selected from filed tools. The tools are selected according to a known method, and hence its detailed description will be omitted.)

1(5): a workpiece material (SCM 440H in the present embodiment) is read from general input matters (FIG. 142). A specific cutting force (1,960N/mm$^2$ in the present embodiment) is read from the material file (FIG. 124) using the workpiece material as a keyword. Upon completion of this step, the processing proceeds to step 110502.

Not all of the data on the conditions are registered, and hence the interpolating method based on fuzzy logic is adopted. Specifically, more than three data items regarding specifications for a tool adjacent to the tool to be used, that is, the diameter and shank of the adjacent tool are obtained on the basis of specifications for the tool to be used, i.e., the diameter and shank of the tool to be used. The thus obtained data items are analyzed using the tool specifications, that is, the diameter and shank of the tool, as variables. As a result, an approximate expression is obtained. The tool specifications, such as the diameter and shank of the tool to be used, are automatically input to the expression, whereby cutting conditions are calculated.

A specific example of the method will be described later referring to a workpiece of the present embodiment.

Radial and axial rigidity of the tentative tool are calculated in step 110502.

The maximum cutting load of the tentative tool is calculated from the tool conditions read in step 110501 and a specific cutting force of 1,960N/mm$^2$ corresponding to the workpiece material, using Equation (33).

$$\text{Max. cutting load} = \text{Max. depth of cut} \times \text{Max. feed} \times \text{specific cutting force} = 12.43 \times 0.4 \times 1{,}960 = 9{,}745.12\text{N} \quad (33)$$

The tool has an identical tool rigidity in its radial and axial directions (FIG. 79), and hence a tool rigidity ratio becomes 1.

The maximum cutting load is obtained by expanding Equation (34), using the size of the tool shank (the tool shank measuring 25 mm (W)×25 mm (H) in the present embodiment) obtained from the tool file (FIG. 79), the length of the projection from the tool holder (a length of 25 mm in the present embodiment), and a variety of numerical values which have already been provided.

$$\delta max = P_r \times L^3/(3 \times E \times I) \quad (34)$$

$$\begin{aligned} P_r &= 3 \times E \times I \times \delta max/L^3 \\ &= 3 \times 2.14 \times 10^5 \times 25^4 \times 0.03/(12 \times 25^3) \\ &= 4{,}012.5\,N \end{aligned}$$

where $P_r$: theoretical radial load [N],

L: length of a projection of a tool from a tool holder=25 [mm],

E: elastic modulus=$2.14\times10^5$ [N/mm$^2$], $I=b\cdot h^3/12$: moment of inertia [mm$^4$], b: tool shank width=25 [mm], h: tool shank height=25 [mm], and δmax: the maximum allowable deflection=0.003 [mm].

As a result, the maximum allowable load calculated from the tool rigidity is smaller than a maximum cutting load of 9,745.1N calculated from the product of the depth of cut, the feed rate, and the specific cutting force. Therefore, a theoretical radial load of 4,012.5N is employed.

The maximum allowable loads in the radial and axial directions of the tool are set to 4,012.5N. As previously mentioned, a ratio of the maximum radial allowable load to the maximum allowable axial load is 1:1.

Upon completion of this step, the processing proceeds to step 110503.

In step 110503, the rigidity of a machine tool is read from the machine tool file (FIGS. 58–76), and a ratio of the radial rigidity to the axial rigidity of the machine tool is calculated in order to compare the feeding volume of the machine tool in the X direction (in the radial direction) to the feeding volume of the same in the Z direction (in the axial direction).

The rigidity of the main spindle (the maximum allowable load) (a radial rigidity of 6,000N and an axial rigidity of 30,000N are read from the machine tool XLD001 in the present embodiment), and the maximum depth of cut (7 mm in the present embodiment) and the maximum feed rate (0.7 mm/rev. in the present embodiment) are read from the machine tool file. The maximum cutting load is calculated from the specific cutting force (1,960N/mm$^2$) corresponding to the workpiece material.

Equation (33) gives the maximum cutting load by substituting the maximum depth of cut, the maximum feed rate, and the specific cutting force into Equation (33). For simplicity, practical machining conditions are omitted, and the calculation is carried out using the data read from the file as they are.

$$\text{Max. cutting load} = \text{Max. depth of cut} \times \text{Max. feed rate} \times \text{specific cutting force} = 7 \times 0.7 \times 1{,}960 = 9{,}604\,N \quad (33)$$

In the present embodiment, the maximum depth of cut and the maximum feed rate in the radial direction are identical with those in the axial direction. As a result of comparison of the thus obtained maximum depth of cut and the maximum feed rate with the maximum allowable values obtained from the machine tool file, the radial load stored in the file is smaller than the radial load obtained as a result of the calculation. Therefore, the radial load is set to 6,000N using the machine tool file. The axial load stored in the file is larger than the axial load obtained as a result of calculation, and hence the calculated axial load is used, that is, the axial load is set to 9,604N.

Consequently, the ratio of the axial load to the radial load of the machine tool becomes 1:1.6, because the radial load is 6,000N and the axial load is 9,604N.

Upon completion of this step, the processing proceeds to step 110504.

The rigidity of the workpiece, and a ratio of the radial rigidity to the axial rigidity of the workpiece are calculated in step 110504.

The radial rigidity (deflection) is expressed as the amount of deflection yielded by Equation (34). It can be said that the rigidity becomes larger as the amount of deflection becomes smaller.

$$\delta max = P_r \times L^3/(3\times E\times I) \quad (34)$$

where the following exemplary input items related to the material are substituted into Equation (34).

$P_r$=4,012.5 [N], $L_1$=210 [mm], $L_2$=185 [mm],

E=$2.14\times10^5$ [N/mm$^2$], $I=\pi d^4/64$ [mm$^4$], $d_1$=58 [mm] (the first area to be machined), and $d_2$=53 [mm] (the second are to be machined).

As a result, Equation yields $$\delta_1 max = 64\times4{,}012.5\times210^3/(3\times2.14\times10^5\times\pi\times58^4) = 0.001042 \text{ [mm]},$$

$$\delta_2 max = 64\times4{,}012.5\times185^3/(3\times2.14\times10^5\times\pi\times53^4) = 0.001022 \text{ [mm]},$$

In the case of a rod material having a diameter of 115 mm, the following items are substituted into Equation (34).

$P_r$=4,012.5 [N], $L_1$=210 [mm](the first area to be machined), $L_2$=185 [mm](the second area to be machined), $E=2.14\times10^5$ [N/mm$^2$], $I=\pi d^4/64$ [mm$^4$], $d_1$=115 [mm](the first area to be machined), and $d_2$=53 [mm](the second are to be machined).

As a result, Equation yields $$\delta_1 max = 64\times4{,}012.5\times210^3/(3\times2.14\times10^5\times\pi\times115^4) = 0.000067 \text{ [mm]},$$

$$\delta_2 max = 64\times4{,}012.5\times185^3/(3\times2.14\times10^5\times\pi\times53^4) = 0.001022 \text{ [mm]}$$

Equation (35) gives the axial rigidity (torsion).

$$\delta max = 32\times P_r\times L\times r^2/\pi d^4 G \quad (35)$$

where the following exemplary input items related to the material are substituted into Equation (35).

$P_r$=4,012.5 [N], $L_1$=210 [mm](the first area to be machined), $L_2$=185 [mm](the second area to be machined), $G$=8.9×10$^4$ [N/mm$^2$], $d_1$=58 [mm] (used as an approximate value of the first area to be machined), $d_2$=53 [mm] (used as an approximate value of the second are to be machined), $r_1$=29 [mm] (the first area to be machined), and $r_2$=265 [mm] (the second area to be machined).

As a result, Equation yields $$\delta_1\max=32\times4{,}012.5\times210\times29^2/(\pi\times58^4\times8.9\times10^4)=0.00717\ [\text{mm}],$$

and $$\delta_2\max=32\times4{,}012.5\times185\times29^2/(\pi\times53^4\times8.9\times10^4)=0.00906\ [\text{mm}].$$

In the case of a rod material having a diameter of 115 mm, the following items are substituted into Equation (35).

Pr=4,012.5 [N], $L_1$=210 [mm] (the first area to be machined), $L_2$=185 [mm] (the second area to be machined), G=8.9×10$^4$ [N/mm$^2$], $d_1$=115 [mm] (used as an approximate value of the first area to be machined), $d_2$=53 [mm] (used as an approximate value of the second are to be machined), $r_1$=57.5 [mm] (the first area to be machined), and $r_2$=57.5 [mm] (the second area to be machined).

As a result, Equation yields $$\delta_1\max=32\times4{,}012.5\times210\times57.5^2/(\pi\times115^4\times8.9\times10^4)=0.001823\ [\text{mm}],$$

and $$\delta_2\max=32\times4{,}012.5\times185\times57.5^2/(\pi\times53^4\times8.9\times10^4)=0.0356\ [\text{mm}].$$

From the results of the calculation of the exemplary inputs, the rigidity of the machine tool with respect to the radial load is larger than the torsional rigidity of the same in the axial direction. A ratio of the deflection rigidity to the torsional rigidity is as follows:

The ratio with regard to the first area to be machined is 0.001042:0.00717=0.145:1, and the ratio with regard to the second area to be machined is 0.001022:0.00906=0.113:1.

For the rod material having a diameter of 115 mm, the rigidity with respect to the radial load is larger than the torsional rigidity in the axial direction. The ratio of the deflection rigidity to the torsional rigidity is as follows:

The ratio with regard to the first area to be machined is 0.000067:0.00182=0.0037:1, and the ratio with regard to the second area to be machined is 0.00102:0.0356=0.029:1.

Upon completion of this step, the processing proceeds to step 110505.

The results obtained in steps between 110501 and 110504 are compared with each other in step 110505. As a result, the volume of the machine tool to cut the material in the X direction while feeding it in the −Z direction, the volume of the machine tool to cut the material in the Z direction while feeding it in the −X direction, and the maximum machining load, are judged and determined.

Since the maximum radial cutting load is 4,012.5N, and the maximum axial cutting load is 4,012.5N, and a ratio of the maximum radial cutting load to the maximum axial cutting load obtained in step 110502 is 1:1.

The ratio of the axial load to the radial load of the machine tool obtained in step 110503 becomes 1:1.6, because the radial load is 6,000N and the axial load is 9,604N.

The ratio of the axial rigidity to the radial rigidity of the workpiece obtained in step 110504 becomes as follows:

In the case of the exemplary input of the material, the ratio with regard to the first area to be machined is $$0.001042:0.00717=0.145:1,$$

and the ratio with regard to the second area to be machined is $$0.001022:0.00906=0.113:1.$$

For the rod material having a diameter of 115 mm, the ratio of the deflection rigidity to the torsional rigidity is as follows:

the ratio with regard to the first area to be machined is $$0.000067:0.00182=0.0037:1,$$

and the ratio with regard to the second area to be machined is $$0.00102:0.0356=0.029:1.$$

Since the maximum cutting load ratio calculated from the tool rigidity obtained in step 110502 is 1:1, the identical rigidity is ensured in both the Z direction (the axial direction) and the X direction (the radial direction).

The ratio regarding the conditions of the machine tool obtained in step 110503 is 1:1.6, and therefore it can be judged that larger rigidity is obtained in the Z direction (the axial direction) of the machine tool.

For the exemplary input of the material, the ratio with regard to the rigidity of the workpiece for the first area to be machined is 0.145:1, and the ratio with regard to the rigidity of the workpiece for the second area to be machined is 0.113:1. Hence, the deflection rigidity is larger than torsional rigidity. In other words, high rigidity is obtained when the workpiece is cut in the Z direction (the axial direction) while it is fed in the X direction (the radial direction).

For the rod material having a diameter of 115 mm, the ratio with regard to the rigidity of the material for the first area to be machined is 0.037:1, and the ratio with regard to the rigidity of the material for the second area to be machined is 0.0287:1. As with the exemplary input of the material, the deflection rigidity is larger than the torsional rigidity. In other words, high rigidity is obtained when the material is cut in the Z direction (the axial direction) while it is fed in the X direction (the radial direction).

From these results, in the case of the exemplary input of the material, the maximum radial machining load of the tool conditions: 4,012.5N, and the maximum axial machining load of the tool conditions: 4,012.5N.

Therefore, it is preferable to cut the material in the Z direction (the axial direction) while it is fed in the X direction (the radial direction).

For the rod material, the maximum radial machining load of the tool conditions: 4,012.5N, and the maximum axial machining load of the tool conditions: 4,012.5N. Accordingly, it is preferable to cut the rod material in the Z direction (the axial direction) while it is fed in the X direction (the radial direction).

The specific cutting force is calculated from the tool material and the input workpiece material, and the cut rate and the feed rate are read from the cutting condition file (FIGS. 128 to 136). The maximum tentative depth of cut used in a cutting operation, i.e., a depth of cut corresponding to the rigidity limit value, is calculated from the specific cutting force, the cut rate, and the feed rate.

In the case of the present embodiment, a cut rate of 102 m/min. and a feed rate of 0.4 mm/rev. are read from the cutting condition file (FIG. 128), using a tool material of P20 and a workpiece material of SCM440H which are read from the tool file (FIGS. 78 to 85). From the maximum machining load conditions, that is, a rigidity of 4,012.5N, a maximum feed rate of 0.4 mm/rev., and a specific cutting force of 1,960N/$mm^2$, $$\text{the maximum tentative depth of cut}=4{,}012.5/(0.4\times1{,}960)=5.118\ [\text{mm}]$$

Upon completion of this step, the processing proceeds to step 110506.

Procedures for determining a machining direction, which start with material identification in step 110506, are carried out.

Material is identified in step 110506.

1(8): a decision as to whether or not the material is a rod material is made on the basis of an entry for the size of the workpiece material. If the material is the rod material, the processing proceeds to step 110507. On the other hand, if the material is not the rod material, the processing proceeds to step 110513.

In step 110507, a machining allowance on each stage number is calculated. Further, a sum and the total sum of machining allowances on each side to be machined are calculated.

FIG. 179 shows results obtained as a result of calculation on the assumption that the material is a rod material.

As shown in FIG. 179, if the material of the present embodiment is a rod material, A cross-sectional area of the machining allowance of the first area to be machined is $S_1$=35.965 [$cm^2$], a cross-sectional area of the machining allowance of the second area to be machined is $S_2$=25.088 [$cm^2$].

A sum of these areas is S=61.0525 [$cm^2$].

Upon completion of this step, the processing proceeds to step 110508.

The number of times the material is cut in the X direction while it is fed in the Z direction, and the length of cut made in the material in the Z direction are calculated in step 110508.

As can be seen from FIG. 179, in the case of the rod material according to the present embodiment, a mean machining allowance along the outer circumference of the first area to be machined is $$S_1/L_1=35.965/17.15=2.097\ [\text{cm}],$$

and a mean machining allowance along the outer circumference of the second area to be machined is $$S_2/L_2=25.088/6.65=3.773\ [\text{cm}].$$

Hence, the mean machining allowance is $$S/L=61.0525/23.8=2.565\ [\text{cm}].$$

The mean machining allowance is divided by the maximum tentative depth of cut of the tentative tool obtained in step 110505, i.e., 5.118 mm, whereby the macroscopic number of times the material is cut is obtained.

The macroscopic number of times the first area to be machined is cut in the X direction (the radial direction) is 5 (20.97/5.118), and the macroscopic number of times the second area to be machined is cut in the X direction (the radial direction) is 8 (37.73/5.118).

The sum of the number of times the material is machined is 13.

The length of the first area in the Z direction (the axial direction) is $L_1$=171.5 (mm), and the length of the second area in the Z direction (the axial direction) is $L_2$=66.5 [mm].

The sum of the lengths is 238. [mm].

The length of cut made in the first area in the Z direction (the axial direction), i.e., the length of the first area in the Z direction (the axial direction)×the number of times the material is cut in the X direction (the radial direction) is 171.5×5=857.5 [mm], and the length of cut made in the second area in the Z direction (the axial direction) is 66.5×8=532. [mm].

The sum of them is 857.5+532.=1,389.5 [mm].

From these results, where the material is cut in the Z direction (the axial direction), the number of times the material is cut is 13, and the length of cut is 1,389.5 mm.

The processing then proceeds to step 110509.

The number of times the material is cut in the Z direction while it is fed in the X direction, and the length of cut made in the material in the X direction are calculated in step 110509.

As can be seen from FIG. 179, in the case of the rod material according to the present embodiment, a mean machining allowance of the first area to be machined in the Z direction is $$S_1/R_1=35.965/5.75=6.255\ [\text{cm}],$$

and a mean machining allowance of the second area to be machined in the Z direction is $$S_2/R_2=25.088/5.75=4.363\ [\text{cm}].$$

Hence, the mean machining allowance is $$S/R=61.053/5.75=10.618\ [\text{cm}].$$

The mean machining allowance is divided by the maximum tentative depth of cut of the tentative tool obtained in step 110505, i.e., 5.118 mm, whereby the macroscopic number of times the material is cut is obtained.

The macroscopic number of times the first area to be machined is cut in the Z direction (the axial direction) is 13 (62.55/5.118), and the macroscopic number of times the second area to be machined is cut in the Z direction (the axial direction) is 9 (43.36/5.118).

The sum of the number of times is 22.

The length of the first area in the X direction (the radial direction) is $R_1$=57.5 [mm], and the length of the second area in the X direction (the radial direction) is $R_2$=57.5 [mm].

A mean value of them is R=57.5 [mm].

The length of cut made in the first area in the X direction (the radial direction), i.e., the length of the first area in the X direction (the radial direction)×the number of times the material is cut in the Z direction (the axial direction) is 57.5×13=747.5 [mm], and the length of the cut made in the second area in the X direction (the radial direction) is 57.5×9=517.5. [mm].

The sum of them is 747.5+517.5=1,265. [mm].

From these results, where the material is cut in the Z direction (the axial direction), the number of times the material is cut is 22, and the length of cut is 1,265 mm.

The processing then proceeds to step 110510.

In step 110510, a decision as to whether it is best to feed the material in the X direction or the Z direction is made in terms of a distance over which the material is fed and the number of times the material is cut.

If either of the methods satisfies both conditions; namely, a shorter distance over which the material is fed and fewer number of times the material is cut, that method is selected. In the case of the method of feeding the material in the X direction that requires a shorter length of the material to be machined and a lower number of times the material is cut, the processing proceeds to step 110511. In the case of the method of feeding the material in the Z direction that provides a shorter distance over which the material is machined and a lower number of times the material is cut, the processing proceeds to step 110512. In the case of another combination of the distance over which the material is machined and the number of times the material is cut, an ambiguous decision may be made under given conditions, and hence it is impossible to determine the direction. In this case, the processing proceeds to step 110519.

In the present embodiment, a ratio of the length of the material to be machined while it is fed in the X direction (the radial direction) to the length of the material to be machined while it is fed in the Z direction (the axial direction), that is, X:Z, is

1:1.147

747.5 [mm]:857.5 [mm] for the first area to be machined, and

1:1.028

517.5 [mm]:532. [mm] for the second area to be machined.

Eventually, 1:1.098=1,265 [mm]:1,389.5 [mm]. A ratio of the number of times the material is cut in the X direction to the number of times the material is cut in the Z direction is

1:0.385

13:5 for the first area to be machined, and

1:0.8

10:8 for the second area to be machined.

The sum of the ratios is

1:0.591

22:13.

As a result, the feeding of the material in the X direction is preferable in terms of the length of the material to be machined. The feeding of the material in the Z direction is preferable in terms of the number of times the material is cut. Hence, it is impossible to determine one direction. In the present embodiment, the processing proceeds to step 110519.

If the feeding of the material in the Z direction is preferable in terms of the length of the material to be machined and the number of times the material is cut, the processing proceeds to step 110520.

If it has been determined in step 110506 that the material is not the rod material, an entry for the material is carried out. Cutting allowances in the respective X and Z directions on each stage are calculated in step 110513, using data on the material and a finished pattern. The result of the entry for the material of the present embodiment is show in FIG. 180.

In FIG. 180, an end face and a groove formed in the end face shown in some intersections between a pattern column and rows designate allowances in the Z direction, whereas a bore, a groove formed in the bore, an outer circumference, and a groove formed in the outer circumference shown in the other intersections designate allowances in the X direction.

After the completion of this step, the processing proceeds to step 110514.

In step 110514, the number of times the material is cut and the length of the material to be machined are calculated for each stage and for each of the following cases, namely, where the material is fed in the X direction, where the material is fed in the Z direction, and where the material is fed in X or Z direction while it is cut in the other direction.

The feeding of the material in the X direction means that the material is cut in the Z direction (the axial direction) while it is fed in the −X direction (the radial) direction. The feeding of the material in the Z direction means that the material is cut in the X direction (the radial direction) while it is fed in the −Z direction (the axial direction). The feeding of the material in combined directions means that the material is cut in the Z (axial) direction while it is fed in the −X (radial) direction in order to machine end faces and grooves, and that the material is also cut in the X (radial) direction while it is fed in the −Z (axial) direction in order to machine the outer and internal circumferences of the material.

If the bore is not pre-formed as in the present embodiment, it is impossible to practically machine the material in the X and Z directions. However, on the assumption that the tip of the tool can enter up to the center of the bore, the material is bored, and grooves are formed in the internal circumference of the bore. If the grooves are formed perpendicular to the direction in which the material is fed, the material is first grooved while it is covered with a lid. The number of times the material is additionally grooved and the length of the material to be additionally grooved are added to the cutting condition file.

The number of times the material is cut and the length of the material to be machined are calculated for each stage, using the previously obtained tentative maximum depth of cut of the tentative tool, that is, a depth of 5.118 mm.

The method of calculating them has already been described in steps 110508 and 110509 as an analogous method which uses the rod material having a single step. Therefore, the description of this method is omitted.

In the present embodiment, where the material is fed in the X direction:

the number of times the material is cut: 55+6 (grooves), and the length of the material to be machined: 497.94+24.5=522.44 [mm], and where the material is fed in the Z direction, the number of times the material is cut: 59+4 (grooves), and the length of the material to be machined: 549.+24.5 (grooves)=573.5 [mm].

Where the material is fed in combined directions, the number of times the material is cut: 46, and the length of the material to be machined: 515.+82.+24.5 (grooves)=621.5 [mm].

After the completion of this step, the processing proceeds to step 110515.

In step 110515, the previously mentioned machining methods are compared with each other with regard to the number of times the material is cut and a distance over which the material is fed.

In the present embodiment, the machining methods are arranged in ascending order of the number of times the material is cut, from the least to the largest; namely, 1: The method of feeding the material in combined directions (46 times), 2: The method of feeding the material in the X direction (55+6 (grooves)), and 3: The method of feeding the material in the Z direction (59+4 (grooves)).

The machining methods are arranged in ascending order of length to be machined, from the shortest to the longest; namely, 1: The method of feeding the material in the X direction (497.94+24.5 (grooves)=522.44 [mm]), 2: The method of feeding the material in the Z direction (549.+24.5 (grooves)=573.5 [mm]), and 3: The method of feeding the material in combined directions (515.+82.+24.5 (grooves)=621.5 [mm]). After the completion of this step, the processing proceeds to step 110516.

In step 110516, it is determined whether or not the method of feeding the material in combined directions that qualitatively needs fewer machining time is best in terms of the number of times the material is cut and the length of the material to be machined.

If this method is best, the processing proceeds to step 110517. On the other hand, if it is difficult to identify the method as being best, the processing proceeds to step 110518.

In the present embodiment, as can be seen from the data obtained in step 110515, the methods have different orders with regard to the number of times the material is cut and the length of the material to be cut. For this reason, it is impossible to simply identify the best method, and hence the processing proceeds to step 110517.

A decision whether it is best to feed the material in the X direction or in the Z direction is made in step 110518.

As with step 110510, if either of the methods satisfies both conditions; namely, a shorter distance over which the material is fed and fewer number of times the material is cut, that method is selected. In the case of the method of feeding the material in the X direction that requires a shorter length of the material to be machined and a fewer number of times the material is cut, the processing proceeds to step 110511. In the case of the method of feeding the material in the Z direction that provides a shorter distance over which the material is machined and fewer number of times the material is cut, the processing proceeds to step 110512. In the case of another combination of the distance over which the material is machined and the number of times the material is cut, an ambiguous decision is made under given conditions, and hence it is impossible to determine the direction. In this case, the processing proceeds to step 110519.

Tentative machining time is calculated in step 110519.

Operating time of the machine tool, that is, the time required to position the material so as to be quickly fed in the X direction, the time required to position the material so as to be quickly fed in the Z direction, the speed for quickly feeding material in the X direction, and the speed for quickly feeding material in the Z direction, are read from the machine tool file.

Tentative positioning time, rapid traverseing time, and time for feeding material while machining it are calculated for each direction in which the material is fed.

In the present embodiment, the following items are read from the machine tool file (FIGS. 58 to 76) by means of a machine ID number of XLD001 and a machining function of L.

Operating time of the machine tool the time required to quickly position the machine tool in the X direction: 0.00006 Hr, and the time required to quickly position the machine tool in the Z direction: 0.00006 Hr.

A rate for quickly feeding the material a rate for quickly feeding the material in the X direction: 15,000 mm/min., and a rate for quickly feeding the material in the Z direction: 15,000 mm/min.

The respective times are calculated in the following manner using Equations (36) to (38).

$$\text{sum of positioning times}=(\text{positioning time})\times 2\times(\text{the number of times material is cut}) \tag{36}$$

The rapid traverse time is obtained by macroscopically dividing the length of the material to be machined by the number of times the material is cut, by dividing a resultantly obtained mean travel distance by the rapid traverse rate, by adding the result of the division to the positioning time, and by multiplying the resultant sum by the number of times the material is cut.

$$\text{Rapid traverse time}=[\{\text{a length of material to be machined}/(\text{the number of times the material is cut}\times\text{a rapid traverse rate})\}+(\text{positioning time})]\times\text{the number of times the material is cut} \tag{37}$$

The time required to cut the material while feeding it is obtained by reading a cut rate and a feed rate from the cutting condition file using tool material and input workpiece material, by calculating a rate for cutting and feeding the material per minute from a mean diameter of the workpiece to be machined, and by dividing the length of the workpiece to be machined by the cut and feed rate per minute.

$$\text{Time required to cut material while feeding it}=\text{a length of the material to be machined}/\text{a rate at which the material is machined per minute} \tag{38}$$

The calculation of the time related to the rod material of the present embodiment continues from step 110510.

In the case of the method of feeding the material in the X direction, sum of the positioning times=0.00264 Hr.

In the case of the present embodiment, the sum of the positioning times=positioning time×2×the number of times the material is cut $$= 0.00006 \times 2 \times 22$$
$$= 0.00264\ [Hr]$$
$$\text{a rapid traverse time} = 0.00273\ [Hr].$$

In the present embodiment, a rapid traverse mean distance=1,265/22=57.5, $$\text{a rapid traverse time} = \{57.5 \times 22/(15{,}000 \times 60)\} + 6 \times 10^{-5} \times 22$$
$$= 0.00273\ [Hr]$$
$$\text{cutting feed time} = 0.10958\ [Hr].$$

In the present embodiment, a mean machining diameter=(110+25)/2=67.5 [mm]

In the present embodiment, the conditions, i.e., a cut rate of 102 m/min. and a feed rate of 0.4 mm/rev. are read from the cutting condition file (FIG. 128), using a tool material P20 and an input workpiece material SCM440H which are read from the tool file (FIGS. 78 to 85).

The rate at which the material is machined per minute is calculated by use of these conditions.

Rate at which material is machined per minute=0.4×102,000/(3.14×67.5)=192.4 [mm/min.]

Equation (38) yields the cutting feed time.

$$\text{Cutting feed time} = \text{a length of material to be machined/rate at which the material is machined per minute} \quad (38)$$
$$= 1265/192.4$$
$$= 6.57484\ [min.]$$
$$= 0.10958\ [Hr].$$

As a result, the tentative machining time required when the material is fed in the X direction is 0.11495 Hr.

Details: Sum of positioning time=0.00264 Hr

Rapid traverse time=0.00273 Hr

Cutting feed time=0.1095 Hr.

In the case of the method of feeding the material in the Z direction, sum of the positioning times=0.00156 Hr.

In the case of the present embodiment, the sum of the positioning times=positioning time×2×the number of times the material is cut $$= 0.00006 \times 2 \times 13$$
$$= 0.00156\ [Hr]$$
$$\text{a rapid traverse time} = 0.00232\ [Hr].$$

In the present embodiment, a rapid traverse mean distance=1,389.5/13=106.885, $$\text{a rapid traverse time} = \{106.885 \times 13/(15{,}000 \times 60)\} + 6 \times 10^{-5} \times 24$$
$$= 0.00232\ [Hr]$$
$$\text{cutting feed time} = 0.12037\ [Hr].$$

Equation (38) yields the cutting feed time.

$$\text{Cutting feed time} = \text{a length of material to be machined/rate at which the material is machined per minute} \quad (38)$$

-continued $$= 1389.5/192.4$$
$$= 7.2219\ [min.]$$
$$= 0.12037\ [Hr].$$

As a result, the tentative machining time required when the material is fed in the Z direction is 0.12425 Hr.

Details: Sum of positioning times=0.00156 Hr

Rapid traverse time=0.00232 Hr

Cutting feed time=0.12037 Hr

After the completion of this step, the processing proceeds to step 110520.

On the assumption that it becomes impossible to make a decision, in steps 110516 and 110518, whether or not the method of feeding the material in combined directions is the best method, the calculation of the time related to an entry for a material pattern of the present embodiment continues from step 110518.

In the case of the method of feeding the material in the X direction, sum of the positioning times=0.00732 Hr.

In the case of the present embodiment, the sum of the positioning times=positioning time×2×the number of times the material is cut $$= 0.00006 \times 2 \times 61$$
$$= 0.00732\ [Hr]$$
$$\text{a rapid traverse time} = 0.00424\ [Hr].$$

In the present embodiment, a rapid traverse mean distance=522.44/61=8.565

$$\text{a rapid traverse time} = \{8.565 \times 61/(15{,}000 \times 60)\} + 6 \times 10^{-5} \times 61$$
$$= 0.00424\ [Hr]$$
$$\text{cutting feed time} = 0.04526\ [Hr].$$

In the present embodiment, a mean machining diameter=(110+25)/2=67.5 [mm]

In the present embodiment, the conditions, i.e., a cut rate of 102 m/min. and a feed rate of 0.4 mm/rev. are read from the cutting condition file, using a tool material P20 read from the tool file and an input workpiece material SCM440H.

The rate at which the material is machined per minute is calculated by use of these conditions.

Rate at which material is machined per minute=0.4×102,000/(3.14×67.5)=192.4 [mm/min.]

Equation (38) yields the cutting feed time.

$$\text{Cutting feed time} = \text{a length of material to be machined/rate at which the material is machined per minute} \quad (38)$$
$$= 522.44/192.4$$
$$= 2.71538\ [min.]$$
$$= 0.04526\ [Hr].$$

As a result, the tentative machining time required when the material is fed in the X direction is 0.05682 Hr.

Details: Sum of positioning time=0.00732 Hr

Rapid traverse time=0.00424 Hr

Cutting feed time=0.04526 Hr

In the case of the method of feeding the material in the Z direction, sum of the positioning times=0.00756 Hr.

In the case of the present embodiment, the sum of the positioning times=positioning time×2×the number of times the material is cut $$= 0.00006 \times 2 \times 63$$
$$= 0.00756\ [\text{Hr}]$$
$$\text{a rapid traverse time} = 0.00442\ [\text{Hr}].$$

In the present embodiment, a rapid traverse mean distance= 573.5/63=9.103, $$\text{a rapid traverse time} = \{9.103 \times 63/(15{,}000 \times 60)\} + 6 \times 10^{-5} \times 63$$
$$= 0.00442\ [\text{Hr}]$$
$$\text{cutting feed time} = 0.04968\ [\text{Hr}].$$

Equation (38) yields the cutting feed time.

$$\text{Cutting feed time} = \text{a length of material to be machined/rate at which the material is machined per minute} \quad (38)$$
$$= 573.54/192.4$$
$$= 2.98077\ [\text{min.}]$$
$$= 0.04968\ [\text{Hr}].$$

As a result, the tentative machining time required when the material is fed in the Z direction is 0.06184 Hr.

Details: Sum of positioning times=0.00756 Hr
Rapid traverse time=0.00442 Hr
Cutting feed time=0.04968 Hr In the case of the method of feeding the material in combined directions, sum of the positioning times=0.00552 Hr.

In the case of the present embodiment, the sum of the positioning times=positioning time×2×the number of times the material is cut $$= 0.00006 \times 2 \times 46$$
$$= 0.00552\ [\text{Hr}]$$
$$\text{a rapid traverse time} = 0.00345\ [\text{Hr}].$$

In the present embodiment, a rapid traverse mean distance= 621.5/46=13.511, $$\text{a rapid traverse time} = \{13.511 \times 46/(15{,}000 \times 60)\} + 6 \times 10^{-5} \times 46$$
$$= 0.00345\ [\text{Hr}]$$
$$\text{cutting feed time} = 0.05384\ [\text{Hr}].$$

Equation (38) yields the cutting feed time.

$$\text{Cutting feed time} = \text{a length of material to be machined/rate at which the material is machined per minute} \quad (38)$$
$$= 612.5/192.4$$
$$= 3.23025\ [\text{min.}]$$
$$= 0.05384\ [\text{Hr}].$$

As a result, the tentative machining time required when the material is fed in the Z direction is 0.06281 Hr.

Details: Sum of positioning times=0.00552 Hr
Rapid traverse time=0.00345 Hr
Cutting feed time=0.05384 Hr After the completion of this step, the processing proceeds to step 110520.

The best method is selected in step 110520.

If the method of feeding the material in the X direction is judged as being the best method as a result of comparing three tentative machining times, the processing proceeds to step 110511. If the method of feeding the material in the Z direction is judged as being the best method, the processing proceeds to step 110512. If the method of feeding the material in combined directions is judged as being the best method, the processing proceeds to step 110517.

In the case of the rod material of the present embodiment, the tentative machining time required when the material is fed in the X direction is 0.11495 Hr, and the tentative machining time required when the material is fed in the Z direction is 0.12425 Hr. Hence, the method of feeding the material in the X direction that requires a tentative machining time of 0.11495 Hr is the best method.

Accordingly, in this case, the processing proceeds to step 110512.

In the case of the entry for the material pattern of the present embodiment based on the assumption that the method is judged as being unidentifiable in steps 110516 and 110518, the tentative machining time required when the material is fed in the X direction is 0.05682 Hr, the tentative machining time required when the material is fed in the Z direction is 0.06184 Hr, and the tentative machining time required when the material is fed in combined directions is 0.06281 Hr. Hence, the method of feeding the material in the X direction that requires a tentative machining time of 0.05682 Hr is the best method.

If the method of feeding the material in the X direction is selected in step 110511, the method of feeding the material in the Z direction is selected in step 110512, and the method of feeding the material in combined directions is selected in step 110517, the respective methods are stored in predetermined storage units of the numerically controlled machine in the respective steps.

Upon completion of these steps, the determination of the maximum machining load and the direction in which the material is cut while being fed is finished in step 110521, and the processing returns to step 1105 and then proceeds to step 1106. Selection of a tool for use in a turning process:

FIG. 24 is a flowchart for showing processing procedures in step 1106.

Since the direction in which the material is machined is determined in step 11050, procedures for selecting a tool which are carried out in step 1106 will now be described.

The selection of a tool starts from step 11060, and tools are obtained through a search in step 11061. Areas to be machined are divided into several categories, such as a bore, an end face, an external circumferential surface, a groove formed in the internal circumferential surface of the bore, a groove formed in the external circumferential surface, and a groove formed in the end face. Using the tool file processed in step 220 (which comprises tool codes (including angles of starting and end points for a machining operation) obtained as a result of calculating tips of the tools input as they are described in step 220 and a pattern which can be machined using holder information), and pattern codes of the input data (the starting point angle and the end point angle of the pattern to be machined that are processed in step 8, and the same applies to any counterparts in the following descriptions) (FIG. 12), the divided areas to be machined are searched and checked against the tool file and the pattern codes.

A tool with addition of a tool for pre-forming a hole is obtained through a search depending on whether or not the bore is pre-formed in the material.

The maximum graphics processing tool used in deciding the direction of removing is used as a part of the turning tool.

In this case, it is necessary to search for a tool with a plurality of functions in order to minimize the number of tools to be used. The top priority is assigned to a tool having all of the required functions. Tools are arranged in a descending order of degree of priority as the number of functions of the tools decreases.

| Tools arranged in descending order of the number of features | Functions |
|---|---|
| 1 | Boring: I, and forming an end face: F, forming an external circumference: E and a groove: G |
| 2 | Boring: I, and forming an end face: F and an external circumference: E |
| 3 | Boring: I and forming an end face: F. |
| 3 | Forming an external circumference: E and an end face: F |
| 4 | Solely boring: I |
| 4 | Solely forming an external circumference I |
| 4 | Solely forming an end face: F |
| 4 | Solely forming a groove: G |

On the basis of the results of the identification of the patterns of the present invention (FIG. 12), which are arranged in the manner as described in step 8, and the material pattern data, the graphics information of the present embodiment provides

- 1st to 10th columns—an internal diameter: I, and space in a rightward direction (a clockwise direction) defined between −180° and −90°,
- 11th column—an end face: F, and space at an angle of 0°,
- 12th to 27th columns—an external diameter: E, and space in a rightward direction (a clockwise direction) defined between −90° and 0°,
- 28th to 37th columns—an external diameter: E, and space in a rightward direction (a clockwise direction) defined between 0° and 90°, and
- 38th column—an end face: F, and space at an angle of 0°.

In addition, as a result of the determination of the types of groove and the entry for grooves, the results of the pattern identification are arranged in the following manner:

- Fourth column—a groove formed in an internal circumference: IG,
- Sixth column—a groove formed in an internal circumference: IG,
- 18th column—a groove formed in an external circumference: EG,
- 23rd column—a groove formed in an external circumference: EG, and
- Columns between 28th and 30th columns—a groove formed in an external circumference: EG.

Result of the search of the tool obtained as a consequence of a comparison between the above data and the tool file (FIGS. 78 to 85), and results of the search of the pre-forming tool are as follows:

- 1st to 10th columns—an internal diameter of a pre-formed hole: I, and tool ID numbers: 9, 12, and 17,
- 1st to 10th columns—an internal circumference: I, and tool ID numbers: 7, and 8,
- 11th column—an end face: F, and tool ID numbers: 1, 2, and 3,
- 12th to 27th columns—an external diameter: E, and tool ID numbers: 1, 2, 3, and 4,
- 28th to 37th columns—an external diameter: E, and tool ID numbers: 1, 2, 3, and 4,
- 38th column—an end face: F, and tool ID numbers: 1, 2, and 3,
- 4th column—a groove formed in an internal circumference: IG, and tool ID number: 8,
- 6th column—a groove formed in an internal circumference: IG, and tool ID number: 8,
- 18th column—a groove formed in an external circumference: EG, and tool ID number: 4,
- 23rd column—a groove formed in an external circumference: EG, and tool ID number: 4, and
- 28th and 30th columns—a groove formed in an external circumference: EG, and tool ID number: 4.

Unless a roughing tool matches with the input drawing, an alarm is sounded. Thereafter, a finishing tool is used as a roughing tool.

Unless a tool required by the input drawing is included in the tool file (FIGS. 78 to 85), an alarm is sounded.

The operator decides whether to re-enter tools into the tool file (FIGS. 78 to 85) in accordance with the alarm or to ignore the alarm. If the operator ignores the alarm, it becomes impossible to machine the area designated by a pictorial code, which requires the use of a tool specified by the input pattern but not registered in the tool file, as might be expected.

Upon completion of the retrieving operation, the processing proceeds to step 11062.

Method of selecting a tool for use in a turning process (FIG. 24)

The selection of a tool in step 11062 is carried out in the following steps:

A tool sufficiently capable of machining the material according to the shapes and sizes described in the input drawing which are previously known, i.e., bores, depths, groove widths, and groove depths, is selected. The first priority is assigned to rigidity and the second priority to versatility during the course of the selection of the tool with largest emphasis on productivity.

The selection of the versatility of the tool is carried out with reference to the previously mentioned tools which are arranged in descending order of the number of functions from 1 to 4. If any tools match with the previously mentioned tools, the identical tools are initially arranged, and then the remaining tools to be used in the same area where the identical tools are used are then arranged.

Method of selecting a tool for use in a turning process (FIG. 24)

A decision on the selection of the tools carried out in step 11063 needs allowing for the following conditions:

- a tool should be, in principle, selected so as to minimize the total number of tools,
- a tool should be selected taking into consideration of the number of workpieces per one lot, prerequisites, and absolute requirements, and
- a decision on the selection of tools is made by selecting a tool having the maximum cutting volume for each area, supposing A which is the sum of machining time and ATC time and B which is the sum of the machining time and the ATC time obtained using a method for minimizing the number of tools, and comparing A with B.

The decision on the selection of tools is made on the result of the comparison between A and B. That is, a group of tools which requires the sum of fewer machining times are selected. After the selection of the group of tools, the tool selection in step 11064 is completed. The processing returns to step 1106 and further proceeds to step 1107.

Determination of tool

Tools are determined in accordance with the previously mentioned processing in step 1106. As a result of the processing, the following results were obtained in the present embodiment.

With regard to a roughing operation

1st to 10th columns—an internal diameter: I, and a tool ID number: 7,

11th column—an end face: F, and a tool ID number: 1,

12th to 27th columns—an external diameter: E, and a tool ID number: 1,

28th to 37th columns—an external diameter: E, and a tool ID number: 1,

38th column—an end face: F, and tool ID number: 1, With regard to a finishing operation 4th column—a groove formed in an internal circumference: IG, and tool ID number: 8, 6th column—a groove formed in an internal circumference: IG, and tool ID number: 8, 18th column—a groove formed in an external circumference: EG, and tool ID number: 4, 23rd column—a groove formed in an external circumference: EG, and tool ID number: 4, and 28th and 30th columns—a groove formed in an external circumference: EG, and tool ID number: 4.

In the present embodiment, a hole is not previously formed in the area to be bored, and hence the shape and size of the pre-formed hole on the drawing pose limitations to the boring operation.

The boring tool has been determined in step 1106, and therefore this tool, is directly used for the boring specifications. A tip nose radius of 0.4 mm is read from the tool file (FIGS. 78 to 85) with tool ID number 7, and the thus read nose radius is added to a finishing allowance, whereby dimensions for the roughing operation are arranged as shown below.

| Column No. | Dimensions of workpiece before having been finished | Length |
|---|---|---|
| 2 | (coordinates of the starting point) 20.011 | 0.[159.975] |
| 2 | 20.011 − 0.8 = 19.211 | 15.025[175.] |
| 4 | 22. − 0.8 = 21.2 | 15.[190.] |
| 6 | 24.125 − 0.8 = 23.325 | 15.[205.] |
| 8 | 31.013 − 0.8 = 30.213 | 5.[210.] |
| SUM | | 50.025 |

As a result of the retrieval of the limit size of the tool, the minimum finish size is a diameter of 19.211 mm for use in roughing the first step of the material to 20.011 mm.

As a result of a search for a drill measuring less than a minimum size of 19.211 mm through the retrieval of a pre-forming drill from a rotary tool file (FIGS. 82 to 85), there are obtained a drill having tool ID number 9 and a size of 19 mm, a space drill having tool ID number 12 and a size of 19 mm, and an end mill having tool ID number 17 and a size of 16 mm. These search results are identical with the results of the retrieval based on the size on the drawing.

As a result of a search for a tool which satisfies an input depth of cut of 50 mm among these results, a tool having tool ID number 9 and a size of 145 mm and a tool having tool ID number 12 and a size of 140 mm are obtained.

These tools do not satisfy a minimum internal diameter of 19.211 mm. However, a hole made by these tools can be additionally machined. Therefore, these tools are selected, and a hole is previously formed in the material by means of a drilling operation and a drilling operation using a space drill.

Subsequently, tools having a function of making a groove in the internal circumference are searched.

As a result of a search for the tools having a function of forming a groove in the internal circumference among the tool file (FIGS. 78 to 85), a tool having tool ID number 8 was obtained.

A decision as to whether or not the tool is suitable for the operation is made.

The tool reads specifications for each of grooves from a finally finished shape file (FIGS. 161 to 172), and it is determined whether or not the grooves can be machined by checking the groove specifications against the tool specifications.

A check is made for various items, such as, a groove width, the diameter of a groove bottom, the diameter of a groove step, a distance of the groove from the end face of the tool, the nominal length of the tool, a radius for removing a fillet from the groove, and a finishing symbol.

In the case of an operation for forming a groove in the internal circumference according to the present embodiment, it turns out that the tool having tool ID number 8 is sufficiently capable of machining the shapes and sizes on the drawing, as a result of the check for the above described items.

A decision as to whether or not the tool is specified according to a tool designation entry format shown in FIG. 107 is made. It is possible to select the designation of a tool for each process using the format shown in FIG. 110 or automatic selection of the tool.

It may be possible to carry out the total specification of tools and partial specification of tools in a mixed manner. In the case of the partial specification of tools, processes which have an insufficient entry or the order in which the tools are specified are automatically complemented.

FIG. 110 shows an example of an entry format for specifying a tool for each process in the case of a turning operation. The entry format poses limitations on the size of the toll together with the a pattern on the drawing, and the tool is specified by use of tool ID number registered in the tool file.

A tool is specified as a result of the operator making an entry after having judged the characteristics of an input drawing. Or the tool is specified as a result of the operator calling, on HELP screen, results obtained by processing pictorial input data and by subjecting the data to pattern identification. In this case, the tools registered in the tool file are specified. When the tool is specified during the course of the entry of the drawing, an alarm is sounded if it will be impossible for the specified tool to machine material or machine the material completely for reasons of the consistency between the tool and the input drawing obtained as a result of computation.

It goes without saying that there should be a match between the tool and the tool ID number.

For this reason, to specify the tool, the operator inevitably makes an entry while viewing the tool file (FIGS. 78 to 85 in the present embodiment). As a matter of course, the tool file is called into the HELP screen, the operator makes the entry while viewing this file.

A roughing tool is not used for finishing purposes, but and a finishing tool may be used as to be a roughing too, as circumstances demand.

Selection and determination of a fixture

With use of a parameter comprising the diameter and length of the area which can be chucked in input material and finishing drawings, a fixture input into the machine tool file for each machine tool is retrieved from the file.

The fixture is selected and determined on the general rule that a portion of the material very close to the area to be machined should be fixed.

Generation and determination of an n-th process processing path in the order of machining A method which makes it possible to change the depth of cut in response to variations in a cutting allowance is employed. For example, a statistical processing technique is employed to cope with variations in material which will be described later.

Correction of an entry for the shape of material in a turning process

Figure 29:
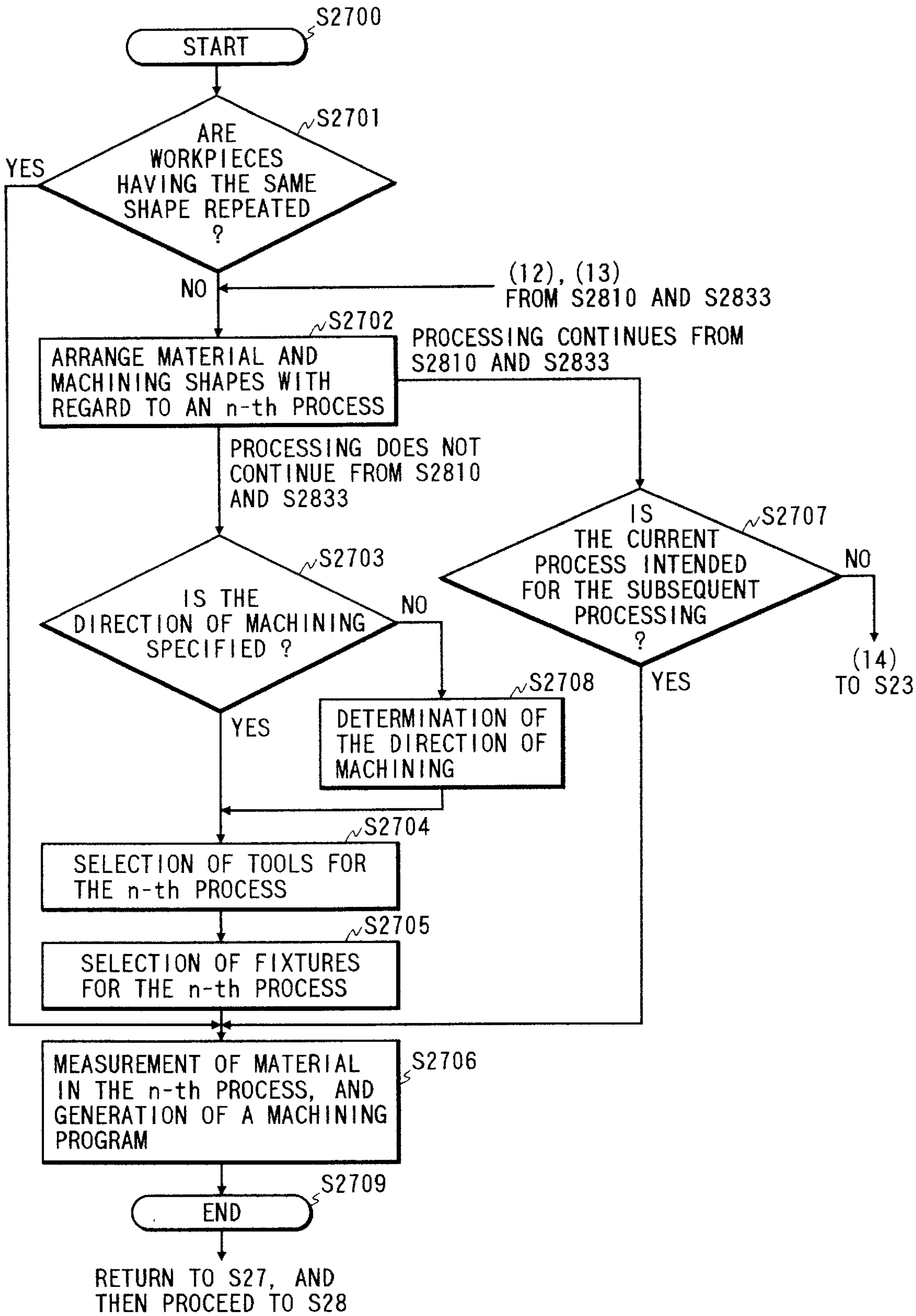
FIG. 29 is a flowchart for machining material in an n-th process and generating a machine program, with regard to step 27 of the processing method according to the embodiment of the present invention.
Figure 30:
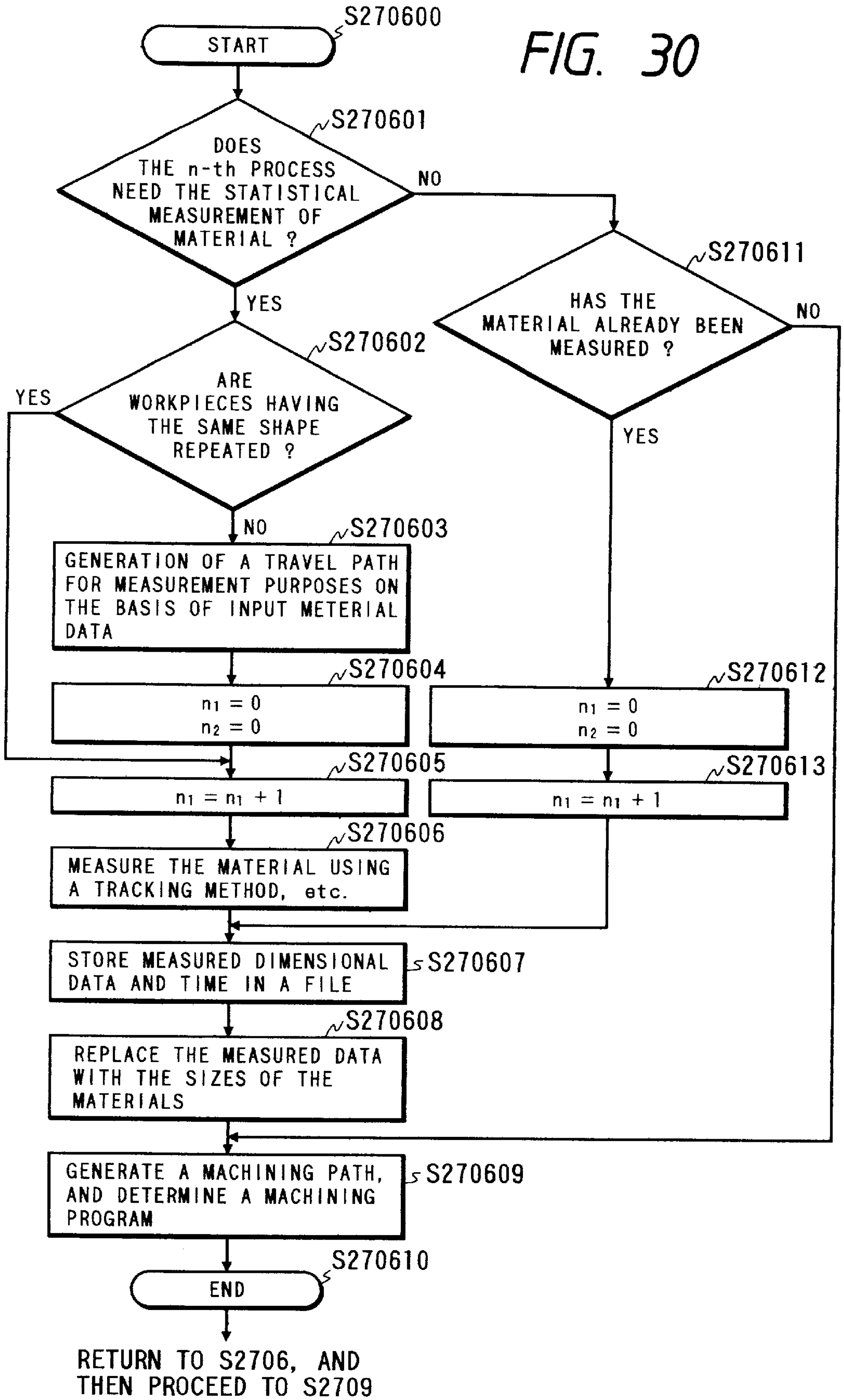
FIG. 30 is a detailed flowchart for machining material in an n-th process and generating a machine program, with regard to step 2706 of the processing method according to the embodiment of the present invention.

In this correcting method, variations in the shape of the material are estimated by use of the statistical processing technique. FIGS. 29 and 30 show procedures of this correcting method.

Generally, materials to be cast and forged do not have a constant shape, and these materials each have their changes in shape depending on variations in various conditions of a manufacturing process. To make it possible to stably and quickly machine these workpieces comprising variations, the materials to be cast and forged are measured to obtain data on their practical shapes, and the input data on the material shape are corrected so as to match with the measured shape data. A machining cycle and the depth of cut are determined on the basis of a difference between the measured practical shape data and the input material shape data.

Specifically, the shape of "n" pieces of material is repeatedly sampled (for example, the minimum value of "n" is set to seven in order to ensure statistical reliability), and the sampled data are statistically processed, whereby a mean value and variations are obtained. A sum of the measured time and the machining time is compared with the machining time obtained by means of the statistical method. Of the two ways of machining: namely, a method of machining material by measuring it every time and a method of machining material using statistical data, the most highly productive method is adopted on the basis of the result of the comparison.

Procedures for machining material while measuring it start from step 27. Measurement of material in an n-th process and procedures for preparing a machine program in step 27 are shown in FIG. 29.

The measurement of the material starts from step 2700. A decision as to whether or not workpieces having the identical pattern are repeated is made in step 2701. If the workpieces have different patterns, material drawings and machining patterns for use in the n-th process are arranged in step 2702.

On the other hand, if it has been determined in step 2701 that the workpieces having the identical pattern are repeated, the processing proceeds to step 2706.

The material drawings and the machining patterns are arranged in step 2702 according to the following method.

On the basis of the material and machining patterns in the first machining process, a material drawing for use in the second machining process serves as a machining pattern for use in the first machining process, and the machining pattern for use in the second machining process serves as a material drawing in the third machining process. According to this rule, machining patterns related to processes are arranged.

In the present embodiment, the material drawing and the machining pattern are arranged for each process. However, they may be processed by one operation.

The result of the arrangement of the drawing and pattern is used as a machining drawing for materials or each of the processes.

Figure 31:
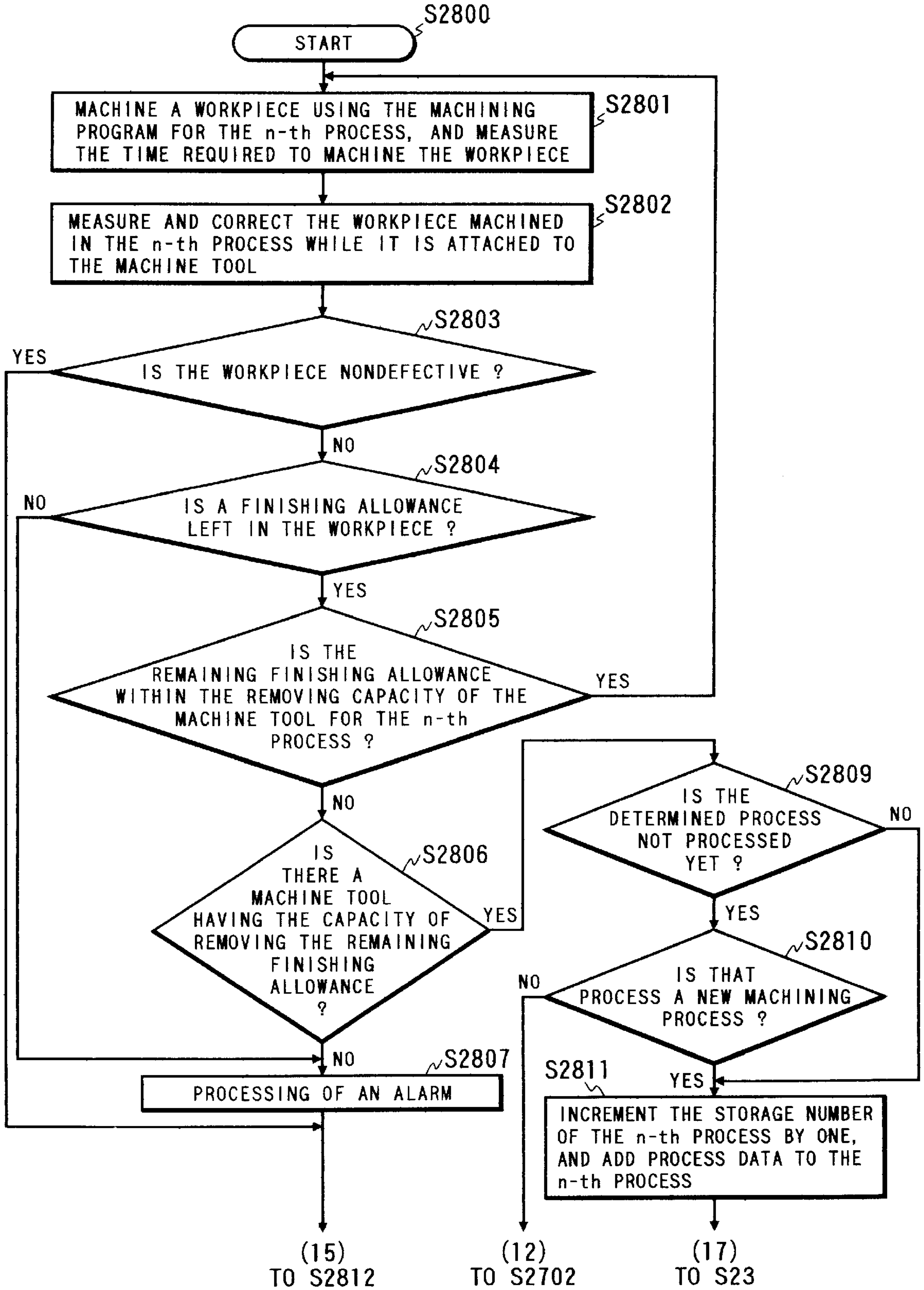
FIG. 31 is a flowchart for the machining of a workpiece in an n-th process, and the on-machine measurement, the correction, and the reworking of the machined workpiece, with regard to step 28 according to the embodiment of the present invention.
Figure 33:
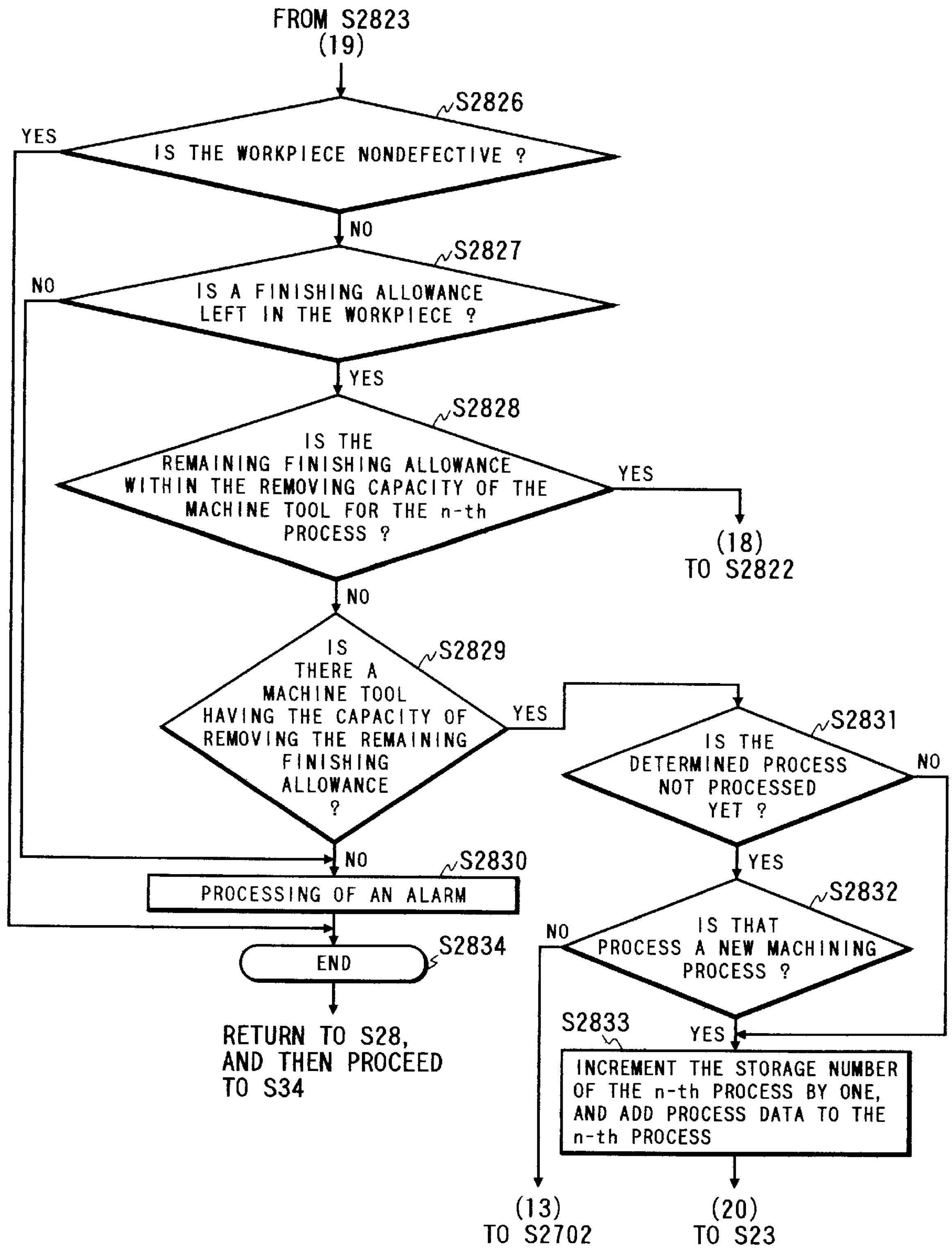
FIG. 33 is a flowchart continued from FIG. 32, that is, the flowchart for the machining of a workpiece in an n-th process, and the on-machine measurement, the correction, and the reworking of the machined workpiece, with regard to step 28 according to the embodiment of the present invention.

Processing in step 2702 continues from step 2810 (12) shown in FIG. 31 and step 2832 (13) shown in FIG. 33, via (12) and (13) shown in FIG. 29, a decision is made in step 2702. If the processing continues from steps 2810 and 2832, the processing proceeds to step 2707. However, the processing does not continue from steps 2810 and 2832, the processing proceeds to step 2703.

If the processing in step 2702 continues from steps 2810 and 2832, a decision as to whether or not the current process is a process for the subsequent processing is made in step 2707. If the current process is the process for the subsequent processing, the processing proceeds to step 2706. If it is not the process for the subsequent processing (14), the processing returns to step 23 via (14) shown in FIG. 2, and procedures following step 23 are carried out.

A decision as to whether or not the direction of a removing operation has been designated is made in step 2703.

A stress is placed on productivity when the direction of removing is determined, and hence an exemplary input item is specified using the input format shown in FIG. 107.

If the direction of removing is specified, follow that direction.

If the input item is not specified, the direction of removing is determined in step 2708. After the direction of removing has been determined, the processing proceeds to step 2704.

Details of the processing in step 2708 are identical with those of the processing carried out in step 1105 shown in FIG. 26, and hence their detailed descriptions will be omitted here.

If the direction of removing is specified, the processing proceeds to step 2704.

Tools for use in the n-th process are selected in step 2704.

FIG. 24 shows procedures for selecting tools for use in the n-th process in step 2704.

The selection of the tools starts from step 27040. Tools are retrieved in step 27041. The tool file processed in step 220 is retrieved using pictorial codes (FIG. 12) obtained as a result of processing pictorially input data in step 807. (As described in step 220, a machinable pattern is computed by means of the tip of an input tool and holder information, and the thus computed machinable pattern is registered as a tool code (including the starting point angle and end point angle with regard to a machining operation).) All of the tools that have a match with regard to graphical processing function codes are obtained through a search. The tools obtained in step 27041 are arranged in descending order of degree of versatility and rigidity in step 27042. Upon completion of the arrangement of the tools, tools best suited to the processing are selected and determined on the basis of the maximum and minimum productivity determined by the number of tools. The selection of the tool is completed in step 27044, and the processing returns to step 2704 and further proceeds to step 2705.

Fixtures for use in the n-th process is selected in step 2705.

FIG. 25 shows procedures for selecting fixtures for use in the n-th process in step 2705.

The selection of fixtures starts from step 27050, and fixtures are obtained through a search in step 27051. Fixtures of the machine tool file input for each of the machine tools associated with the n-th process are obtained from input drawings through a search, using the area to be chucked as a key. The diameter and limit length of each side to be machined are selected as key elements in step 27052. Then, fixtures which have lengths less than the limit of length are selected, and the thus selected fixtures are arranged in order of length from shortest to longest. After the completion of the arrangement of the fixtures, a fixture having the most approximate chucking diameter is selected, for each side to be machined in step 27053, from the fixtures selected and arranged in step 27052. A fixture in common use for double machining operations is determined as being best suited. If the fixture in common use for both machining operations is not determined, a fixture best suited for each of machining operations is selected and determined.

In the present embodiment, the following fixtures were selected according to the above described standards.

Namely, in the case of a rod material, REXLD001 for a first machining operation, RXLD001 for a second machining operation, and REXLD001 for a first machining operation carried after the rod material has been regrasped, are selected. Further, in the case of the entry for material, REXLD001 is selected for machining use.

Upon completion of the selection and determination of the fixture, the selection of the fixture associated with the n-th process is completed in step 27054. The processing returns to step 2705 and then proceeds to step 2706.

The measurement of material in the n-th process and the preparation of the machine program are carried out in step 2706.

FIG. 30 shows material measurement in an n-th process and procedures for preparing a machine program in step 2706.

The measurement of the material starts from step 270600. A decision as to whether or not the material should be measured in the n-th process is made in step 270601. If the material must be measured, a decision as to whether or not the workpieces having an identical pattern are repeated is made in step 270602. If the workpieces having the identical pattern are repeated, the processing proceeds to step 270605. On the other hand, if the workpieces having the identical pattern are not repeated, that is, if a new workpiece is machined, a method of tracing the workpiece or a travel path for measuring the workpiece at equivalent intervals is generated, in step 270603, using input material data. A repeat counter for counting the number of workpieces to be produced is reset to $n_1=0$ in step 270604, as well as a group repeat counter being reset to $n_2=0$.

The repeat counter for counting workpieces is counted up to $n_1=n_1+1$ in step 270605. The material is measured using the tracing method, or it is measured at equivalent intervals in step 270606. Further, the time required to measure the material is measured. The thus measured dimensional data and the measuring time are stored in a data region of the file in step 270607.

The size of the material is replaced with the measured size in step 270608.

A cutting allowance is calculated using the result of the measurement in step 270609, and a machining path is generated and determined. After the determination of the machining path, the processing is now completed in step 270610, and it returns to step 2709. The processing further returns to step 27 and proceeds to step 28.

If the measurement of the material in the n-th process has been judged as not to be necessary in step 270601, a decision as to whether or not the material has already been measured in the n-th process is made in step 270611. If the material has already been measured, the repeat counter for measuring the number of workpieces to be produced is reset to $n_1=0$, and the group repeat counter is also reset to $n_2=0$ in step 270612.

The repeat counter for counting the number of workpieces to be produced is counted up to $n_1=n_1+1$ in step 270613, and the processing proceeds to step 270607. The procedures following step 270607 have already been described.

A decision as to whether or not the material has already been measured is made in step 270611. If it has not been measured yet, the processing proceeds to step 270609.

The machining, measurement, correction, and reworking of a workpiece for the n-th process are carried out in step 28.

Figure 32:
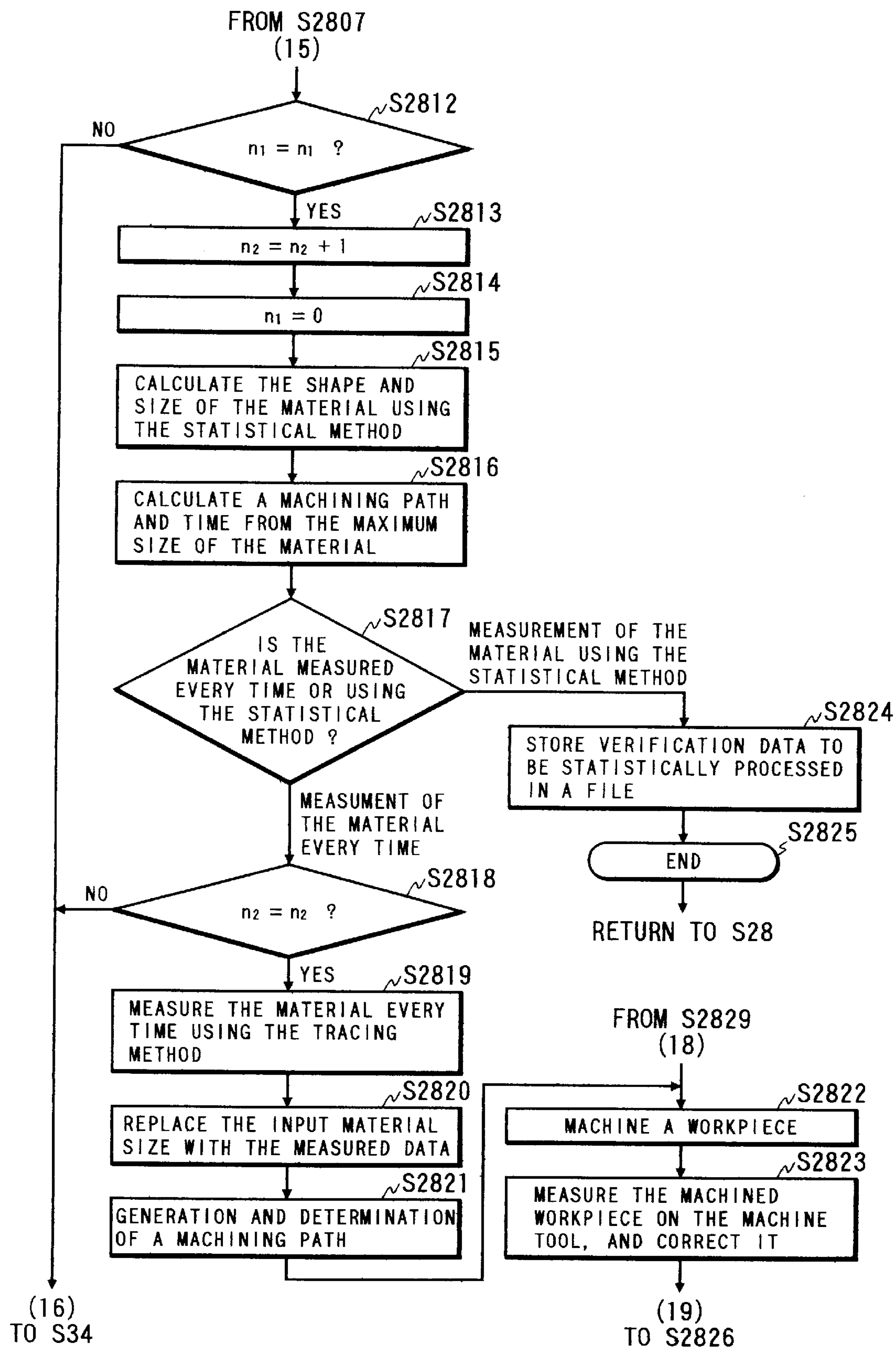
FIG. 32 is a flowchart continued from FIG. 31, that is, the flowchart for the machining of a workpiece in an n-th process, and the on-machine measurement, the correction, and the reworking of the machined workpiece, with regard to step 28 according to the embodiment of the present invention.

FIGS. 31, 32, and 33 show procedures for the details of the processing in step 28.

The processing starts from step 2800. The workpiece is machined in step 2801, using the n-th process machine program generated in step 270609. The time required to machine the workpiece is also measured, and the thus measured machining time is stored in some region of the file.

Control of machining power during the course of the machining operation is carried out in the following manner:

In the case of a roughing operation,

If the machining power is in excess of an allowable value, the number of revolutions of the main spindle is gradually reduced to 80% as the first step. If the power still remains in excess of a critical value, a feed rate is reduced to 50% as a second step.

If the power is still in excess of the critical value in spite of these series of operations, an alarm is sounded, and the machining of the workpiece is stopped at a break between blocks to be machined, for example, an interval between a block to be cut and a block to be quickly fed.

Conversely, if the machining power does not satisfy the allowable value, the feed rate is gradually increased up to 200% as the first step. If the machining power still fails to satisfy the allowable value, a cut rate is gradually increased up to 150% as the second step. As a matter of course, processing necessary to retain the rigidity of the machine, tool, and material within the ranges of their allowable volume is included in the above described processing.

In the case of a finishing operation, the feed rate is dependent on the roughness of a finished surface, and hence the feed rate is controlled by using only the number of revolutions of the main spindle. In this case, the critical number of revolutions of the main spindle is determined by the processing associated with the lifespan of the tool.

The workpiece for the n-th process is measured on the machine and then corrected in step 2802.

Details of the measurement and correction of the machined workpiece are as follows:

The areas of the workpiece designated by a tolerance and a tolerance symbol are all measured after the workpiece has been machined. The positions of the tool and machine are corrected by expectation in such a way that the positions fall within their allowable values before the next processing is carried out. For example, when the diameter of the workpiece is measured, the distance between two points in a diametrical direction of the material is measured at two points in the longitudinal direction of the material.

The number of measurement points is increased using the range of tolerance and the length of the workpiece as parameters. For example, in the case of a tolerance width of 10 μm, the number of measurement points is 6. In the case of a tolerance width of 20 μm, the number of measurement points is 4. In the case of more than 20 μm, the number of measurement points is 2. The measurement of the diameter is carried out at two points in the longitudinal direction of the workpiece, provided that 25 mm is taken as to be one unit. If the length of the workpiece is less than 5 mm, its diameter is measured at one point in the longitudinal direction.

From the results of the measurement, a mean value and a difference between the maximum value and the minimum value are calculated.

If the workpiece was machined with an identical tip of an identical tool, a difference between a mean value obtained as a result of computation and the center of designated tolerance is corrected by the correction of the tool position and the correction of the machine position in combination.

If a difference between the maximum measured value and the minimum measured value is in excess of two-third of the tolerance width of each designated area, an alarm is sounded to inform erroneous process selection. This is attributable to an erroneous entry for the machine tool file.

A decision as to whether or not the result of the measurement carried out in step 2802 is acceptable is made in step 2803. If the resultant workpiece is non-defective (15), the processing proceeds to step 2812 via (15) shown in FIG. 32.

If the resultant workpiece has been judged as to be defective, a decision as to whether or not a finishing allowance still remains in the workpiece is made in step 2804.

If the finishing allowance still remains in the workpiece, a decision as to whether or not the remaining finishing allowance is within the removing volume of an n-th process machine tool is made in step 2805. If it has been determined that the remaining finishing allowance falls within the removing volume of the n-th process machine tool, the processing returns to step 2801, and the procedures following step 2801 are executed.

On the other hand, if it has been determined in step 2805 that the remaining finishing allowance falls outside the removing volume of the n-th process machine tool, a decision as to whether or not there is a machine tool having the volume to remove the remaining finishing allowance is made in step 2806 by checking the remaining finishing allowance against the minimum removing volume stored in the machine tool file. If it has been determined that there is a machine tool having the volume to remove the remaining finishing allowance, the processing proceeds to step 2809. If it has been determined that no machine tool capable of removing the remaining finishing allowance is available, an alarm is sounded in step 2807. After the completion of this decision (15), the processing proceeds to step 2812 via (15) shown in FIG. 32.

In step 2809 that continues from step 2806 when it has been determined that there is a machine tool having the volume to remove the remaining finishing allowance, a decision as to whether or not the process through which the machine tool capable of removing the remaining finishing allowance was selected is an unexecuted processing is made. If that process is not executed yet, a decision whether or not that process is a new machining process is made in step 2810. If that process is not a new machining process, the processing returns to step 2702.

If it has been determined in step 2810 that processing is a new machining process, an n-th process storage number is counted up by one in step 2811, and process data are additionally stored into a storage section. After the completion of the storage of the data (17), the processing proceeds to step 23 via (17) shown in FIG. 2.

If the process determined in step 2809 has already been executed, the processing proceeds to step 2811. The details of the processing in step 2811 have already been described in the above.

FIG. 32 shows procedures for the processing subsequent to step 2812.

In step 2812, a decision as to whether or not the repeat counter for counting the number of workpieces to be produced has a count value of $n_1=n_1$ is made in step 2812. If the count value of the counter is not $n_1=n_1$ (16), the processing returns to step 34 via (16) shown in FIG. 2, and the procedures following step 34 are executed.

On the other hand, if the count value of the counter is $n_1=n_1$, the processing proceeds to step 2813, and the group repeat counter is counted up to $n_2=n_2+1$ in step 2813.

The repeat counter for counting the number of workpieces to be produced $n_1$ is reset to $n_1=0$ in step 2814.

A material data file containing data obtained as a result of measuring the material $n_1 \times n_2$ times is read in step 2815, and a mean value, the maximum value, and the minimum value with regard to the shape of the material are calculated by means of a statistical processing technique such as the least square method and 3σ method.

A machining path and a machining time for the maximum size of the material calculated in step 2815 are calculated in step 2816. The method of calculating the machining path and the machining time has already been described in the descriptions for the processing in step 1105.

A mean processing time is added to the time required to measure material when the material is measured each time for machining. In step 2817, the sum of these times is compared with the time required to machine the material into a shape and a size using the previously mentioned statistical processing technique. As a result, processing which needs fewer machining time is adopted.

If it takes a longer time to machine the material using the statistical technique, a decision as to whether or not the group repeat counter has a count value of $n_2=n_2$ is made in step 2818. If the counter does not have such a count value (16), the statistical processing is not employed in the subsequent processing. The processing returns to step 34 via (16) shown in FIG. 2, and processing procedures following step 34 are repeated.

On the other hand, if the counter has such a count value, the material is measured each time using the tracing method in step 2819. The input size of the material is replaced with the measured data in step 2820. A machining path is generated and determined in step 2821. The workpiece is machined in subsequent step 2822. Upon completion of the machining of the workpiece, the workpiece is measured while it is on the machine tool, and it is then corrected in step 2823. The processing proceeds to step 2826 via (19) shown in FIG. 33.

Details of the measurement and correction of the workpiece after it has been machined are as follows:

The areas of the workpiece designated by a tolerance and a tolerance symbol are all measured after the workpiece has been machined. The positions of the tool and machine are corrected by expectation in such a way that the positions fall within their allowable values before the next processing is carried out. As previously mentioned, for example, when the diameter of the workpiece is measured, the distance between two points in a diametrical direction of the material is measured at two points in the longitudinal direction of the material.

The number of measurement points is increased using the range of tolerance and the length of the workpiece as parameters. For example, in the case of a tolerance width of 10 $\mu$m, the number of measurement points is 6. In the case of a tolerance width of 20 $\mu$m, the number of measurement points is 4. In the case of more than 20 $\mu$m, the number of measurement points is 2. The measurement of the diameter is carried out at two points in the longitudinal direction of the workpiece, provided that 25 mm is taken as to be one unit. If the length of the workpiece is less than 5 mm, its diameter is measured at one point in the longitudinal direction.

From the results of the measurement, a mean value and a difference between the maximum value and the minimum value are calculated.

If the workpiece was machined with an identical tip of an identical tool, a difference between a mean value obtained as a result of computation and the center of designated tolerance is corrected by the correction of the tool position and the correction of the machine position in combination.

If a difference between the maximum measured value and the minimum measured value is in excess of two-third of the tolerance width of each designated area, an alarm is sounded to inform erroneous process selection. This is attributable to an erroneous entry for the machine tool file.

On the other hand, if the statistical processing is selected in step 2817, decision data that require statistical processing are stored in a storage section in step 2824, and the statistical processing is completed in step 2825. The processing returns to step 28 and then proceeds to step 34.

FIG. 33 shows processing procedures subsequent to step 2826.

A decision as to whether or not the result of the measurement is acceptable is made in step 2826. If the resultant workpiece is non-defective, the measurement is now completed in step 2834, and the processing returns to step 28 and further proceeds to step 34.

If the resultant workpiece has been judged as to be defective in step 2826, a decision as to whether or not a finishing allowance still remains in the workpiece is made in step 2827. If the finishing allowance still remains in the workpiece, a decision as to whether or not the remaining finishing allowance is within the removing volume of an n-th process machine tool is made in step 2828. If it has been determined that the remaining finishing allowance falls within the removing volume of the n-th process machine tool (18), the processing returns to step 2822 via (18) shown in FIG. 32, and the procedures following step 2822 are executed.

On the other hand, if it has been determined in step 2828 that the remaining finishing allowance falls outside the removing volume of the n-th process machine tool, a decision as to whether or not there is a machine tool having the volume of removing the remaining finishing allowance is made in step 2829 by checking the remaining finishing allowance against the minimum removing volume stored in the machine tool file. If it has been determined that there is a machine tool having the volume to remove the remaining finishing allowance, the processing proceeds to step 2831. If it has been determined that no machine tool capable of removing the remaining finishing allowance is available, an alarm is sounded in step 2830. The processing proceeds to step 2834. The current processing is now completed in step 2834, and the processing returns to step 28 and further proceeds to step 34.

In step 2831 that continues from step 2829 when it has been determined that there is a machine tool having the volume to remove the remaining finishing allowance, a decision as to whether or not the process through which the machine tool capable of removing the remaining finishing allowance was selected is an unexecuted processing is made. If that process is not executed yet, a decision whether or not that process is a new machining process is made in step 2832. If that process is not a new machining process (13), the processing returns to step 2702 via (13) shown in FIG. 29.

If it has been determined in step 2832 that processing is a new machining process, the n-th process storage number is counted up by one in step 2833, and process data are additionally stored into a storage section. After the completion of the storage of the data (20), the processing proceeds to step 23 via (20) shown in FIG. 2.

If the process determined in step 2831 has already been executed, the processing proceeds to step 2833.

Generation of a machining path

The generation of a turning path carried out in steps 1108, 2706, 2821, 2907, 2933, 3805, and 4105 is as follows:

It is automatically determined whether to designate any one of the following combinations: namely, a combination of a method to equally divide the depth of cut made by roughing among steps (hereinafter referred to as a method of cutting material so as to be equally divided among steps or a variable cutting method) and a method using a constant finishing allowance, and a combination of a method to form the constant depth of cut by roughing (hereinafter referred to as a constant depth cutting method) and a method using a variable finishing allowance, by dealing with this decision as an input item for the machining operation, or by use of productivity, the elimination of chips, the life span of a tool, and the material of the tool.

The evaluation of productivity is determined by simulating a machining time of the constant depth cutting method or the variable cutting method, using the number of times the tool is positioned and the length of the machining path over which the turning machine travels.

A machining path for use with the constant depth cutting method is taken to be the simple path method. According to this simple path method, material is machined up to the point where the material can be continuously machined even if a finishing allowance is ensured in the material without changing the depth of cut formed in the material.

As is publicly known, it qualitatively takes a longer time to machine the material using the tracing method. This method also requires positioning the tool an increasing number of times, resulting in a shorter lifespan of the tool. For this reason, the machining operation using the tracing method is not employed in the present embodiment.

A variable cutting method which equivalently dividing the depth of cut made by roughing among steps A variable depth cutting method is employed to increase the productivity of a machining operation, wherein the depth of cut made by roughing is equally divided among steps.

If the material is roughed into the maximum depth on each step while a constant finishing allowance is retained, the resultant depth of cut varies from the maximum depth to the minimum depth which is a rounded value. If the material is machined faithfully in this manner, chips resulting from the cutting operation will not be automatically cut and will coil around the workpiece, or they will be cut into small pieces. Thus, the result of the machining operation may change depending on situations. Further, if the tool is used to cut the material to less than a constant depth, the lifespan of the tool is considerably shorten. To prevent this problem, a cutting allowance is obtained by subtracting the finishing allowance from the area to be machined. The thus obtained cutting allowance is divided by the maximum depth of cut, and the result of the division is rounded up, whereby the number of times the material is cut is obtained. The cutting allowance obtained as a result of subtracting the finishing allowance from the area to be machined is divided for each step by the number of times the material is cut, whereby a cutting allowance on each step in each cycle is obtained. As a consequence, the depth of cut varies from a little less than half the maximum depth of cut to the maximum depth of cut. It becomes possible to ensure the disposing of the chips and the lifespan of the tool while the material is automatically machined.

A variable finishing allowance method based on the constant cutting method

A variable finishing allowance method based on the constant cutting method is employed in order to improve the machining productivity, in which the material is roughed to a constant depth.

If the constant depth cutting method is adopted to reduce the number of cycles the roughing operation is carried out, the finishing allowance differs for each step. If the workpiece is finished with different finishing allowances, combined deflection of the tool and the machine varies, which makes it impossible for many NC machines to control the dimension of the resultant workpiece so as to fall within the range of a specified dimension. For this reason, displacement correction corresponding to the finishing allowances is carried out so as to make the dimension of the workpiece fall within the range of the specified dimension.

The correction of displacement comprises the step of obtaining an approximate calculation expression from the actually measured data, and calculating the amount of correction using the depth of cut, a feed, the strength of material, and the entire length of a workpiece.

Alternatively, a deficiency of the actually measured raw data is calculated from adjacent data using approximate interpolation, and the amount of correction is calculated by means of interpolation using the strength of the material and the entire length of the workpiece as variables.

Figures 86, 87:
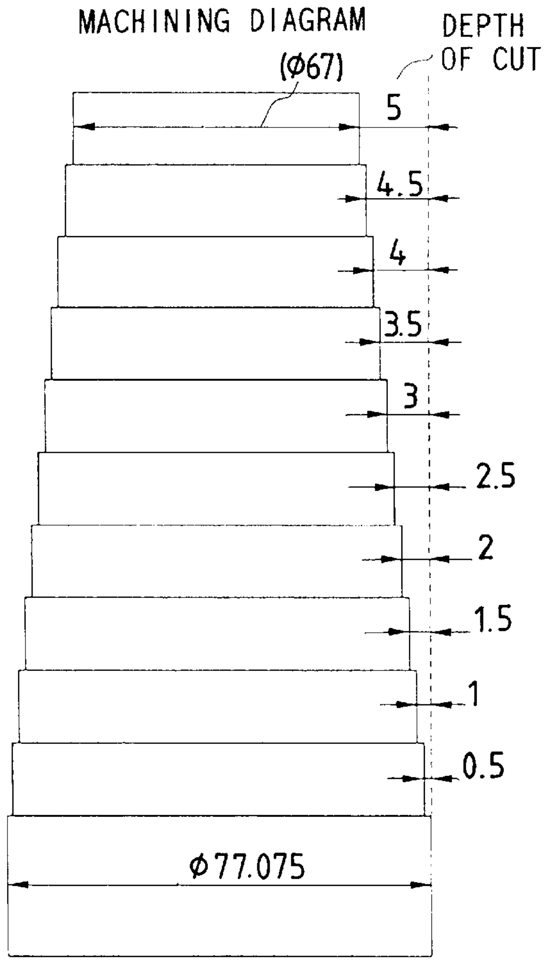
FIG. 86 is a schematic representation for explaining variations in the outside diameter of a workpiece as a result of a turning operation according to one embodiment of the present invention.
FIG. 87 is a chart for explaining a difference between the reference diameter and practically measured data with regard to variations in the outside diameter of a workpiece as result of a turning operation, according to one embodiment of the present invention.
Figure 88:
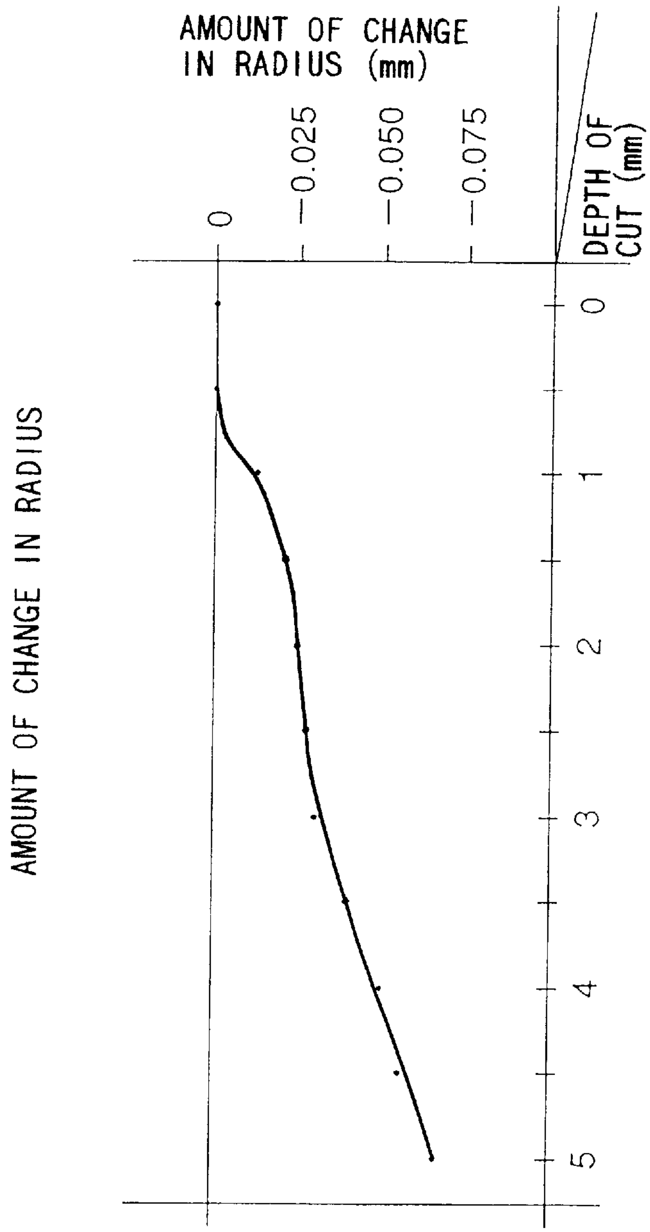
FIG. 88 is a plot showing the relationship between variations in the outside diameter of a workpiece and the depth of cut formed as a result of a turning operation.

As shown in, for example, schematic representations and plots with regard to displacements resulting from the machining of the outer circumference of the workpiece (FIGS. 86 to 88), the depth of cut is reduce to 0.5 mm on the assumption that the maximum depth of cut obtained resulting from the turning operation is 5 mm. With regard to the case where the minimum depth of cut is set to 0.5 mm, FIG. 86 shows a schematic representation of a turning operation of the workpiece, FIG. 87 shows differences between the actually measured data and the reference diameter, and FIG. 88 shows a plot of the depth of cut vs. radial changes.

Alternatively, the amount of correction is calculated and corrected using Equations (39) to (41) which use a broaching load, the entire length of the material, the entire length of the workpiece, a supporting method, and load points as variables.

Equation is selected from Equations (39) to (41) shown below depending on the supporting method.

In the case of a method of machining a workpiece while it is chucked in a cantilever fashion:

$$\delta_{r11}(k_1 \times W \times L^3/E \times I) - k_2 \times W + k_3 \times W + C \quad (39)$$

In the case of a method of machining a workpiece while it is supported at its double center holes:

$$\delta_{r11}(k_4 \times W \times L_1{}^1 \times l_2{}^2/E \times I \times L) - k_2 \times W + k_3 \times W + C \quad (40)$$

In the case of a method of machining a workpiece while it is chucked at its both ends:

$$\delta_{r11}(k_5 \times W \times L_1{}^3 \times l_2{}^3/E \times I \times L^3) - k_2 \times W + k_3 \times W + C \quad (41)$$

where

- $\delta_{r11}$: a radial change at one point in a workpiece, that is, a load point,
- $k_1$: a coefficient for supporting a workpiece while it is supported in a cantilever fashion,
- $k_4$: a coefficient for supporting a workpiece at its double center holes,
- $k_5$: a coefficient for supporting a workpiece while it is chucked at its both ends,
- W: combined radial loads arising as a result of a machining operation,
- L: the length of a workpiece,
- $l_1$: a distance between a loading point and a point of the workpiece where it is supported close to the main spindle,
- $l_2$: a distance between a loading point and a point of the workpiece where it is supported distant from the main spindle,
- E: Young's modulus,
- I: moment of inertial in a cross section of a workpiece
- $k_2$: machine tool rigidity factor,
- $k_3$: tool rigidity factor, and
- C: constant.

A rod material having a diameter of 115 mm is machined in the following order:

a first area of the material is first roughed, and then a second area is roughed on the basis of the product of the volume to be removed and a mean radius by the machine tool of the present embodiment. An external cam is formed on the 27th step of the material. For the first area, the grooving of the external cam, the finishing of the external cam, the grooving of an internal circumference, and the finishing of the internal circumference are carried out. A cylindrically grooved cam is formed in the outer circumference in the 20th step. An end cam is formed in the 15th step. Then, an internal cam is formed along the internal circumference in the 4th step. A polygon is formed along the cylindrical outer circumference so as to extend over the 11th step to the 2nd step. A keyslot is formed from the 8th to the 10th steps. A hole is bored in the 9th step, and the thus formed hole is tapped in the 9th step. For the second area, the outer circumference is finished and grooved. An end cam is formed in the 28th step, and a keyway is formed so as to extend over the 35th to 38th steps. Subsequently, an internal gear is subjected to an electric discharge machining in the 6th step by use of a machine tool for another process use. An external gear is hobbed in the 31st step, and the outer circumference and the internal circumference are ground in that order.

A path for turning a rod material

A path for turning a rod material is calculated according to the previously mentioned rule as follows:

Roughing of the first area:

| Machine program | Contents, conditions for determination, and Equations |
|---|---|
| N001 G90; | Designation of an absolute value<br>"Select an absolute value or an increment used when designating the position of a machine by specifying an item of a machine tool file (FIG. 72). In the present |

-continued

| Machine program | Contents, conditions for determination, and Equations |
|---|---|
| | embodiment, an absolute value is adopted." |
| N002 G28G95; | Check the point of origin of the machine. The point is shifted every time. |
| N003 T000001; | Select tool ID No. 1. |

As has been determined in step 110520, the top priority is assigned to the roughing of the first area according to the principle in which the roughing operation starts from the maximum Z point of the material, and the material is fed in the X direction while the end face of the material is machined. The tool selected as a result of the decision in the step is used as it is.

| | |
|---|---|
| N004 G96S102M03; | Set a peripheral normality to a constant value of 102 m/min. "A cut rate of 102 m/min is read from a turning operation condition file (FIG. 128), using a workpiece material SCM440H and a tool material P20 with tool ID No. 1 which are read from the tool file (FIGS. 78 to 85)." M03: Rotate the tool clockwise with respect to the spindle according to the hand of tool ID No. 1. |
| N005 G00X118.Z211.6; | Roughing of an end face. Material diameter: 115 + 3 = 118, a material length: 213 mm, and a finishing allowance of the end face: 0.1 mm. |
| N006 G00X118.Z211.6; | From the limit of depth of cut: a maximum value of 12.43 mm and a minimum value of 0.4 mm and a feed rate: a maximum value of 0.39 mm/rev. and a minimum value of 0.01 mm/rev. read from the tool file (FIGS. 78 to 85), and a depth of cut of 4 mm and a feed rate of 0.4 mm/rev. read from the cutting condition file (FIG. 128), a feed rate of 0.39 mm/rev. is obtained. |
| N007 G00Z212.6; | |

The equivalently divided cutting method and the constant depth cutting method have machining paths which are different from each other. Therefore, specific examples of these paths are shown below.

A calculation method for use with a method of equally dividing the depth of cut

A calculation method for use with a method of equally dividing the depth of cut uses Equations (42) to (44).

Roughing allowance on each stage={material diameter−(designated diameter+finishing allowance)} (42)

The designated diameter is calculated using a finally finished shape file. In the present embodiment, the finishing allowance is set to 0.8 mm. This value is added to a step which needs a finishing allowance for use in another process.

Max. allowable depth of cut on each stage=Max. machining load/feed×specific cutting force (43).

The number of times the material is cut: N is an integer part of N'+1.

Theoretical number of times material is cut: $N'$=(roughing allowance on each stage)/(2×maximum allowable depth of cut on each stage) (44)

As previously mentioned, of the maximum allowable depths of cut of the workpiece, the machine tool, and the tools, the smallest value is determined as the maximum allowable depth of cut.

As previously mentioned, in the case of the rod material, the maximum radial machining load of the tool conditions: 4,012.5N, and the maximum axial machining load of the tool conditions:

4,012.5N.

Accordingly, it is preferable to cut the rod material in the Z direction (the axial direction) while it is fed in the X direction (the radial direction).

The specific cutting force is calculated from the tool material and the input workpiece material, and the cut rate and the feed rate are read from the cutting condition file. The depth of cut corresponding to the rigidity limit value is calculated from the specific cutting force, the cut rate, and the feed rate.

In the case of the present embodiment, a cut rate of 102 m/min. and a feed rate of 0.4 mm/rev. are read from the cutting condition file (FIG. 128), using a tool material of P20 and a workpiece material of SCM440H which are read from the tool file (FIGS. 78 to 85). Further, the maximum depth of cut is calculated from the maximum machining load condition of 4,012.5N, a specific cutting force of 1,960N/mm$^2$, and a maximum feed rate of 0.39 mm/rev. This maximum feed rate is obtained by comparing a maximum feed rate of 0.4 mm/rev. with a maximum feed rate of 0.39 mm/rev. of the tool which are read from the cutting condition file (FIG. 128).

The maximum depth of cut=4,012.5/(0.39×1,960)=5.249 [mm]

The shape of each step is read from the finally finished shape file (FIGS. 161 to 172), and the finishing allowance is added to the shape, whereby the dimension of the workpiece before it is finished is obtained. The number of times the workpiece is cut is obtained by dividing the length of the workpiece by the maximum depth of cut, and the result of the division is rounded up in order to obtain the equally divided depth of cut. Where the workpiece is cut in the Z direction (the axial direction) while it is fed in the X direction (the radial direction), calculation results of the dimension of the workpiece is as follows:

| Step No. | Dimension of workpiece before it is finished | Length | Depth of cut No. of times: depth of cut |
|---|---|---|---|
| 10 | (Coordinates of the starting point) 49.675 | 0. | [211.9] |
| 10 | 48.875 + 0.8 = 49.675 | 5. | [206.9]1:5. |
| 12 | 52.57 + 0.8 = 53.37 | 10. | [196.9]2:5. |
| 14 | 53. + 0.8 = 53.8 | 10. | [186.9]2:5. |
| 16 | 69. + 0.8 = 69.8 | 5. | [181.9]1:5. |
| 18 | 71.850 + 0.8 = 72.650 | 15. | [166.9]3:5. |
| 20 | 72.985 + 0.8 + 0.2 = 73.985G | 30. | [136.9]6:6. |
| 21 | 79.985 + 0.8 = 73.785~79.989 + 0.8 = 80.789 | 20. | [116.9]4:5. |
| 22 | 79.990 + 0.8 = 80.790~83.989 + 0.8 = 84.789 | 20. | [96.9]3:5.227 |
| 23 | 83.989 + 0.8 + 0.2 = 84.989G | 20. | [76.9]4:5.192 |
| 25 | 90. + 0.8 = 90.8 | 4.96 | [71.94]1:5.145 |
| SUM | | 139.96 | 27 |

The machine program is prepared using the above data. If the depth of cut in the Z direction increases during the course of the machining operation, the program is corrected using the depth of cut in the Z direction in the previous machining step so as to prevent the increase.

An example of the preparation of the machine program is as follows:

| Machine program | Contents, conditions for determination, and Equations |
|---|---|
| N008 G00X118.; | Position a tool so as to machine the outer circumference. |
| N009 G00Z207.233; | Cut the workpiece to a depth of Z:5.227 mm from the end face on 10th step. |
| N010 G01X80.789F0.39; | Feed the workpiece to a specified diameter of X: 80.789 at 0.39 mm/rev. |
| N011 G01Z206.9; | Cut the workpiece to an end face on 21st step. |
| N012 G01X49.675; | |
| N013 G01Z212.9; | |
| N014 G00X118.Z211.9; | First cutting cycle is now completed. |
| N015 G00Z201.446; | |
| N016 G01X80.789; | |
| N017 G01201.9; | |
| N018 G01X53.37; | |
| N019 G01Z207.9; | |
| N020 G00X118.Z206.9; | Second cutting cycle is now completed. |
| N021 G00Z196.219; | |
| N022 G01X80.789; | |
| N023 G01Z196.9; | |
| N024 G01X53.37; | |
| N025 G01Z202.9; | |
| N026 G01X53.37; | |
| N027 G00X118.Z201.9; | Third cutting cycle is now completed. |
| N028 G00Z190.992; | |
| N029 G01X80.789; | |
| N030 G01Z191.9; | |
| N031 G01X53.8; | |
| N032 G01Z192.9; | |
| N033 G00X118.Z191.9; | Fourth cutting cycle is now completed. |
| . | Programs between N034 and N116 (cycles |
| . | between 5th and 18th cycles) are |
| . | omitted. |
| N117 G00Z112.587; | |
| N118 G01X80.789; | |
| N119 G01Z116.9; | |
| N120 G01X73.985; | |
| N121 G01Z117.9; | |
| N122 G00X118.Z117.9; | 19th cutting cycle is now completed. |
| N123 G00Z107.36; | |
| N124 G01X80.789; | |
| N125 G01Z113.587; | |
| N126 G00X118.Z112.587; | 20th cutting cycle is now completed. |
| N127 G00Z.102.133; | |
| N128 G01X80.789; | |
| N129 G01Z108.36; | |
| N130 G0X118.Z107.36; | 21st cutting cycle is now completed. |
| N131 G00Z96.9; | |
| N132 G01X80.789; | |
| N133 G01Z103.133; | |
| N134 G00X118.Z102.133; | 22nd cutting cycle is now completed. |
| N135 G00Z91.708; | |
| N136 G01X84.789; | |
| N137 G01Z97.9; | |
| N138 G00X118.Z96.9; | 23rd cutting cycle is now completed. |
| . | Programs between N139 and N146 (cycles |
| . | between 24th and 25th cycles) are |
| . | omitted. |
| N147 G00Z76.132; | |
| N148 G01X90.8; | |
| N149 G01Z76.9; | |
| N150 G01X84.989; | |
| N151 G01Z83.092; | |
| N152 G00X118.Z82.092; | 26th cutting cycle is now completed. |
| N153 G0071.94; | |
| N154 G01X90.8; | |
| N155 G01Z77.9; | |
| N156 G00Z211.9X118.; | 27th cutting cycle is now completed. |
| N157 M05; | |

Program for constant depth cutting method

A program for the constant depth cutting method will now be described.

Of the maximum allowable depths of cut of the workpiece, the machine tool, and the tools, the smallest value is determined as the maximum allowable depth of cut.

As previously mentioned, in the case of the rod material, the maximum radial machining load of the tool conditions: 4,012.5N; and the maximum axial machining load of the tool conditions:

4,012.5N.

Accordingly, it is preferable to cut the rod material in the Z direction (the axial direction) while it is fed in the X direction (the radial direction).

The specific cutting force is calculated from the tool material and an input workpiece material. The cut rate and the feed rate are read from the cutting condition file. The depth of cut corresponding to the rigidity limit value is calculated from them.

In the case of the present embodiment, a cut rate of 102 m/min. and a feed rate of 0.4 mm/rev. are read from the cutting condition file (FIG. 128), using a tool material of P20 and a workpiece material of SCM440H which are read from the tool file (FIGS. 78 to 85). Further, the maximum depth of cut is calculated from the maximum machining load condition of 4,012.5N, a maximum feed rate of 0.39 mm/rev. obtained by comparing a maximum feed rate of 0.4 mm/rev. with a maximum feed rate of 0.39 mm/rev. of the tool which are read from the cutting condition file (FIG. 128), and a specific cutting force of 1,960N/mm$^2$.

$$\text{The maximum depth of cut}=4{,}012.5/(0.39\times 1{,}960)=5.249\ [\text{mm}]$$

As mentioned above, the outer circumference of the workpiece is turned in the Z direction while it is fed in the X direction in the present embodiment. The workpiece is fed 5.249 mm each time along the machining path to the point which is determined by adding a finishing allowance and a finishing allowance for another process to the data of the finally finished shape file (FIGS. 161 to 172). The portion of the workpiece which is not machined yet is machined in the Z+ direction while it is fed in the X− direction.

The shape of each step is read from the finally finished shape file (FIGS. 161 to 172), and the finishing allowance is added to the shape, whereby the dimension of the workpiece before it is finished is obtained. The number of times the workpiece is cut is obtained by dividing the length of the workpiece by the maximum depth of cut. The number of times the workpiece is cut and the resultant quotients are shown below. Size of the workpiece before it is finished=(designated diameter+finishing allowance)

The designated diameter is calculated by use of the finally finished shape file. Further, the finishing allowance of the present embodiment is 0.8 mm. A step which needs a finishing allowance for another process is provided with the finishing allowance for another process.

| Step No. | Dimension of workpiece before it is finished | Length | Depth of cut No. of times: quotient |
|---|---|---|---|
| 10 | (Coordinates of the starting point) 49.675 | 0. | [211.9] |
| 10 | 48.875 + 0.8 = 49.675 | 5. | [206.9] 1 : −0.249 |
| 12 | 52.57 + 0.8 = 53.37 | 10. | [196.9] 2 : −0.747 |
| 14 | 53. + 0.8 = 53.8 | 10. | [186.9] 2 : −1.245 |
| 16 | 69. + 0.8 = 69.8 | 5. | [181.9] 1 : −1.494 |
| 18 | 71.850 + 0.8 = 72.650 | 15. | [166.9] 3 : −2.241 |

-continued

| Step No. | Dimension of workpiece before it is finished | Length | Depth of cut No. of times: quotient |
|---|---|---|---|
| 20 | 72.985 + 0.8 + 0.2 = 73.985G | 30. | [136.9] 6 : −3.735 |
| 21 | 79.985 + 0.8 = 73.785 ~ 79.989 + 0.8 = 80.789 | 20. | [116.9] 4 : −4.731 |
| 22 | 79.990 + 0.8 = 80.790 ~ 83.989 + 0.8 = 84.789 | 20. | [96.9] 4 : −0.478 |
| 23 | 83.989 + 0.8 + 0.2 = 84.989G | 20. | [76.9] 4 : −1.474 |
| 25 | 90. + 0.8 = 90.8 | 4.96 | [71.94] 1 : −1.683 |
| SUM | | 139.96 | 28 |

A path for roughing the outer circumference of the workpiece is calculated on the above data and a maximum depth of cut of 5.249 mm. The roughing path is programmed as follows:

| Machine program | Contents, conditions for determination, and Equations |
|---|---|
| N008 G00X118.; | Position a tool so as to machine the outer circumference. |
| N009 G00Z206.651; | Cut the workpiece to a depth of Z:5.249 mm from the end face on 10th step. |
| N010 G01X53.37F0.39; | Feed the workpiece at F 0.39 mm/rev. to a specified diameter of X: 53.37 on 12th. |
| N011 G01Z206.9; | Cut the workpiece to the end face located at a specified diameter of X:49.675. |
| N012 G01X49.675F0.39; | Feed the workpiece at F0.39 mm/rev. to the position of a specified diameter of X49.675. |
| N013 G01Z212.9; | Cut the workpiece to the end face. |
| N014 G00X118.; | Reset the tool to the position to cut the outer circumference of the material. |

The workpiece is fed to the specified diameter for cutting purposes each time the workpiece is cut to a depth of Z: 5.249 mm. Subsequently, the tool is moved to the previous cutting point so that it is ready for cutting the outer circumference of the workpiece. The machining path is calculated through the repetition of these operations, whereby the machine program is prepared.

If the material has a circular-arc shape or a tapered shape, a known expression for obtaining an intersection between a circular arc and a linear line and an intersection between a linear line and another linear line is used for calculating a machining path for such a material.

| | |
|---|---|
| N015 G00Z201.420; | 12th step |
| N016 G01X53.37; | |
| N017 G01Z207.651; | |
| N018 G00X118.; | |
| N019 G00Z196.153; | 14th step |
| N020 G01X53.8; | |
| N021 G01Z196.9; | |
| N022 G01X53.37; | |
| N023 G01Z202.402; | |
| N024 G00X118.; | |
| N025 G00Z190.904; | |
| N026 G01X53.8; | |
| N027 G01Z197.153; | |
| N028 G00X118.; | |

-continued

| | |
|---|---|
| N029 G00X185.655; | |
| N030 G01X53.8; | |
| N031 G01Z187.9; | |
| N032 G00X118.; | |
| N033 G00Z180.406; | 16th step / 18th step |
| N034 G01X72.650; | |
| N035 G01Z181.9; | |
| N036 G01X69.8: | |
| N037 G01Z186.655; | |
| N038 G00X118.; | |
| N039 G00Z175.157; | 18th step |
| N040 G01X72.650; | |
| N041 G01Z181.406; | |
| N042 G00X118.; | |
| N043 G00Z169.908; | |
| N044 G01X72.650; | |
| N045 G01Z176.157; | |
| N046 G00X118.; | |
| N047 G00Z164.659; | 20th step |
| N048 G01X73.985; | |
| N049 G01Z166.9; | |
| N050 G01X72.650; | |
| N051 G01Z170.908; | |
| N052 G00X118.; | |
| N053 G00Z159.41; | |
| N054 G01X73.985; | |
| N055 G01Z165.659; | |
| N056 G00X118.; | |
| N057 G00Z154.161; | |
| N058 G01X73.985; | |
| N059 G01Z159.14; | |
| N060 G00X118.; | |
| N061 G00Z148.912; | |
| N062 G01X73.985; | |
| N063 G01Z155.161; | |
| N064 G00X118.; | |
| N065 G00Z143.663; | |
| N066 G01X73.985; | |
| N067 G01Z149.912; | |
| N068 G00X118.; | |
| N069 G00Z138.414; | |
| N070 G01X73.985: | |
| N071 G01Z144.663; | |
| N072 G00X118.; | |
| N073 G00Z133.165; | 21st step |
| N074 G01X74.218; | |
| N075 G03X73.985Z136.9R59.985; | |
| N076 G01Z139.414; | |
| N077 G00X118.; | |
| N078 G01Z127.916; | |
| N079 G01X75.338; | |
| N080 G03X74.111Z1134.165R59.985; | |
| N081 G00X118.; | |
| N082 G01X77.411; | |
| N083 G01X77.411; | |
| N084 G03X75.053Z128.916R59.985; | |
| N085 G00X118; | |
| N086 G00Z117.418; | |
| N087 G01X80.446; | |
| N088 G03X776.941Z123.667R59.985; | |
| N089 G00X118.; | |
| N090 G00Z112.169; | 22nd step |
| N091 G01X81.735; | |
| N092 G01X80.789Z116.9; | |
| N093 G03X79.821Z118.418R59.985; | |
| N094 G00X118.; | |
| N095 G00Z106.92; | |
| N096 G01X83.785; | |
| N097 G01X81.535Z113.169; | |
| N098 G00X118.; | |
| N099 G00Z101.671; | |
| N100 G01X83.835; | |
| N101 G01X82.585Z107.92; | |
| N102 G00X118.; | |
| N103 G00Z96.442; | 23rd step |
| N104 G01X84.989; | |
| N105 G01Z96.9; | |
| N106 G01X84.789; | |
| N107 G01X84.589Z97.9; | |
| N108 G00X118., | |

-continued

| | |
|---|---|
| N109 G00Z91.193; | |
| N110 G01X84.989; | |
| N111 G01X97.422; | |
| N112 G00X118.; | |
| N113 G00Z85.944; | |
| N114 G01X84.989; | |
| N115 G01Z92.193; | |
| N116 G00X118.; | |
| N117 G00Z80.695; | |
| N118 G01X84.989; | |
| N119 G01Z85.944; | |
| N120 G00X118.; | |
| N121 G00Z75.446; | 25th step |
| N122 G01X90.8; | |
| N123 G01Z76.9; | |
| N124 G01X84.989; | |
| N125 G01Z81.695; | |
| N126 G00X118.; | |
| N127 G00Z71.94; | |
| N128 G01X90.8; | |
| N129 G01Z76.446; | |
| N130 G00X118.; | Reset the tool to a point from which an operation of turning the workpiece starts. |
| N131 G00Z211.9; | Reset the tool to a point from which an operation for cutting an end face starts. |
| N132 G28; | Rest the machine to its point of origin. |
| N133 M05; | Stop the main spindle. |

The preparation of the program for roughing the first area of the workpiece using the constant depth cutting method is now completed.

A path for Boring the workpiece is calculated in accordance with the above described procedures for deciding processing operations.

Tool Selection

Since a pre-formed hole for a boring operation is not included in the entry for the material, the minimum finishing size is retrieved from 1st to 8th steps of the finally finished shape file (FIG. 161).

As a result, a minimum finishing size is 20.011 mm of the 1st step.

The boring tool has already been determined in step 1106, and hence this tool is directly used. Further, a nose-radius of 0.4 mm is read from a tool file having tool ID No. 7 (FIGS. 78 to 85). The thus read nose-radius is added to the size for roughing purposes as a finishing allowance.

Sizes for roughing purposes are as follows:

| Step No. | Dimension of workpiece before it is finished | Length | |
|---|---|---|---|
| 2 | (coordinates of the starting point) 20.011 | 0. | [159.975] |
| 2 | 20.011 − 1.0 = 19.011 (19.811G) | 15.025 | [175.] |
| 4 | 22. − 0.8 = 21.2 | 15. | [190.] |
| 6 | 24.125 − 0.8 = 23.325 | 15. | [205.] |
| 8 | 31.013 − 0.8 = 30.213 | 5. | [210.] |
| SUM | | 50.025 | |

From these results, the minimum size is 19.011 mm to which the workpiece having a size of 20.011 mm is roughed.

A tool for machining a pre-formed hole capable of machining material to this minimum size is retrieved from the rotary tool file (FIGS. 82 to 85). A drill having a minimum size of less than 19.011 mm was searched. As a consequence, a drill having a size of 19 mm with tool ID No. 9, a space drill having a size of 19 mm with tool ID No. 12, and an end mill having a size of 16 mm with tool ID No. 17 were obtained.

Further, a tool capable of drilling a hole to a depth of 50 mm is searched from the rotary tool file. A tool having a size of 145 mm with tool ID No. 9 and a tool having a size of 140 mm with tool ID No. 12 were obtained as a result of the search of the tool.

These tools do not satisfy a minimum internal diameter of 19.011 mm, but the hole made by these tools can be further bored by use of the boring tool. Hence, these tools are adopted. A hole is previously made in the workpiece by means of a drilling operation or a drilling operation using the space drill.

| Machine program | Contents, conditions for determination, and Equations |
|---|---|
| N200 G28; | Check the point of origin. |
| N201 T09; | Select a drill having a size of 19 mm. |
| N202 G97; | Disable control for maintaining peripheral normality to a constant level. |
| N023 S235M03; | Material of the tool file (Figs. 82 to 85): |

Cutting conditions are obtained using SKH-51 and a workpiece material SCM440H.

SKH-51 is not included in the cutting condition file (FIG. 131), and hence a material which can be translated to SKH-51 is retrieved from a tool material translation file (FIGS. 125 to 127). S4 is obtained. Cutting conditions of, i.e., a workpiece material: SCM440H, a tool material S4, and a tool diameter of 19 mm are obtained from the cutting condition file for use with a drill (FIG. 131).

Consequently, a cut rate of 14 m/min. and a feed rate of 0.2 mm/rev. are obtained.

The number of revolutions of the main spindle is 14 m/min. and a feed rate of 0.2 mm/rev.

From these results, the number of revolutions of the main spindle is $S=14000/(19\times\pi)=235$ [r.p.m.]. The feed rate is $F=0.2\times235=47$ [mm/min.].

```
N024 G00X0Z211.9;
N205 G01Z191.9F47;
N206 G00Z220;
N207 G00Z191.9;
N208 G01Z171.9;
N209 G00Z220;
N210 G00Z171.9;
N211 G01Z160.375;
N212 G00Z220.;
N213 G28M05;
```

Since the bottom end of the pre-formed hole made by the drill is conical in shape at a cone angle of 118°, the conical portion is removed by use of a space drill having a linear end.

| | |
|---|---|
| N250 T12; | Tool replacement, Select a space drill having a size of 19 mm. |
| N251 S235M03; | Cutting conditions are identical with cutting conditions for the space drill having a size of 19 mm. |
| N252 G00X0Z211. 9; | |
| N253 G01Z1G0.375F47.; | |
| N254 G01F0.1: | |
| N255 G00Z220; | |
| N256 G28M05; | Return the machine tool to its origin of point, and stop the main spindle. |

The program for previously forming a hole in the material is now completed.

Upon completion of this program, the above processing is completed in step 1108, and the processing further proceeds to step 1109.

The preparation of a boring program will now be described.

Tool Selection

A program for roughing the workpiece using the above described tool with tool ID No. 7 is prepared.

| Machine program | Contents, conditions for determination, and Equations |
|---|---|
| N300 | |
| N301 G28; | Check the point of origin. |
| N302 G96: | Set peripheral normality to a constant value. |
| N303 T000007; | Select a tool with tool ID No. 7. |
| N304 G00X19.748Z211.6; | Point from which a cutting operation starts. |

As can be seen from the tool file (FIGS. 78 to 81), the maximum limit of depth of cut is 0.53 mm, the minimum limit of depth of cut is 0.1 m, the maximum feed rate is 0.15 mm/rev., and the minimum feed rate is 0.01 mm/rev. Further, as can be seen from the previously described limits of the tool machine and the workpiece, and the cutting condition file (FIG. 128), a depth of cut is 1, and a feed rate is 0.18 mm/rev. Therefore, a feed rate is set to 0.15 mm/rev.

The maximum radial machining load of the tool conditions: 110N, and the maximum axial machining load of the tool conditions: 110N.

According to results of the identification of the direction of removing (details of the results are omitted here), it is preferable to cut the material in the X direction (the radial direction) while it is fed in the Z direction (the axial direction).

The specific cutting force is calculated from the tool material and an input workpiece material. The cut rate and the feed rate are read from the cutting condition file. The depth of cut corresponding to the rigidity limit value is calculated from them.

In the case of the present embodiment, a cut rate of 135 m/min. and a feed rate of 0.18 mm/rev. are read from the cutting condition file (FIG. 128), using a tool material of P10 and a workpiece material of SCM440H which are read from the tool file (FIGS. 78 to 81).

Further, the maximum depth of cut is calculated from the maximum machining load condition of 110N, a specific cutting force of 1,960N/mm$^2$, and a maximum feed rate of 0.15 mm/rev. The maximum feed rate of 0.15 mm/rev. is a smaller value of a maximum feed rate of 0.18 mm/rev. of the cutting condition file and a maximum feed rate of 0.15 mm/rev. of the tool.

$$\text{The maximum depth of cut}=110/(0.15\times 1{,}960)=0.374\ [\text{mm}]$$

Since the maximum depth of cut of the tool is 0.374 mm, a finishing allowance of the bore is set to one-third of the depth of cut (which is arbitrarily changeable), i.e., about 0.1 mm, and a finishing allowance of the end face is set to one half the diameter (which is arbitrarily changeable), i.e., 0.05 mm.

An entry which extends over a step of sequence 54, that is, 50 (0, +0.05), is averaged to 0.025±0.025. This mean value is added to absolute lengths of step 1 to step 9. As a result, a finishing allowance is added to the final shape of the workpiece, whereby the size of the workpiece to which the workpiece is roughed is obtained, as shown below.

| Step No. | Dimension of workpiece before it is finished | Length | | |
|---|---|---|---|---|
| 2 | (Coordinates of the starting point) 20.011 | 0. | [159.975] | 161.525 |
| 2 | 20.011 − 0.4 = 19.611 (19.811G) | 15.025 | [175.] | 176.55 |
| 4 | 22. − 0.2 = 21.8 | 15. | [190.] | 191.55 |
| 6 | 24.125 − 0.2 = 23.925 | 15. | [205.] | 206.55 |
| 8 | 31.013 − 0.2 = 30.813 | 5. | [210.] | 211.9 |
| SUM | | 50.025 | | |

| Machine program | Contents, conditions for determination, and Equations |
|---|---|
| N305 G01Z176.55S135.F0.15M03; | |
| N306 G01X19.611; | Depth of cut of 0.137 mm to which the second step of the workpice is roughed |
| N307 G01Z161.525; | |
| N308 G00Z211.9; | |
| N309 G00X20.496; | Depth of cut of 0.374 mm |
| N310 G01Z176.55; | |
| N311 G00Z211.9; | |
| N312 G00X21.244; | Depth of cut of 0.374 mm |
| N313 G01Z176.55; | |
| N314 G00Z211.9; | |
| N315 G00X21.992; | Depth of cut of 0.374 mm |
| N316 G01Z191.55; | |
| N317 G01X21.8; | The size to which the fourth step of the workpiece is roughed. |
| N318 G01Z176.55; | |
| N319 G00Z211.9; | |
| N320 G00X22.74; | Depth of cut of 0.374 mm |
| N321 G01Z191.55; | |
| N322 G00Z211.9; | |
| N323 G00X23.488; | Depth of cut of 0.374 mm |
| N324 G01Z191.55; | |
| N325 G00Z211.9; | |
| N326 G00X24.236; | Depth of cut of 0.374 mm |
| N327 G01Z206.55; | |
| N328 G10X23.925; | The size to which the sixth step of the workpiece is roughed. |
| N329 G01Z191.55; | |
| N330 G00Z211.9; | |
| N331 G00X24.984; | Depth of cut of 0.374 mm |
| N332 G01Z206.55; | |
| N333 G00Z211.9; | |
| N334 G00X25.732; | |
| N335 G01Z206.55; | |
| N336 G00Z211.9; | |
| N337 G00X26.48; | Depth of cut of 0.374 mm |
| N338 G01Z206.55; | |
| N339 G00Z211.9; | |
| N340 G00X27.228; | Depth of cut of 0.374 mm |
| N341 G01Z206.55; | |
| N342 G00Z211.9; | |
| N343 G00X27.976; | Depth of cut of 0.374 mm |
| N344 G01Z206.55; | |
| N345 G00Z211.9; | |
| N346 G00X28.724; | Depth of cut of 0.374 mm |
| N347 G01Z206.55; | |
| N348 G00Z211.9; | |
| N349 G00X29.472; | Depth of cut of 0.374 mm |
| N350 G01Z206.55; | |
| N351 G00Z211.9; | |
| N352 G00X30.22; | Depth of cut of 0.374 mm |
| N353 G01Z206.55; | |
| N354 G00Z211.9; | |
| N355 G00X30.968; | Depth of cut of 0.374 mm |
| N356 G01Z211.078; | |
| N357 G01X30.813Z211.; | Chamfering operation, and the size to which the eighth step of |

-continued

| Machine program | Contents, conditions for determin-ation, and Equations |
|---|---|
| | the workpiece is roughed. |
| N358 G01Z206.55; | |
| N359 G00Z211.9; | |
| N360 G00X31.716; | |
| N361 G01Z211.452; | |
| N362 G01X30.813Z211.; | |
| N363 G00Z211.9; | |
| N364 G00X32.413; | |
| N365 G01X31.413Z211.3; | |
| N366 G00Z211.9; | |
| N367 G28M05; | |

The preparation of the program is now completed in step 1108. Then the processing proceeds to step 1109.

(A rod material having a diameter of 115 mm)

Subsequently, the second area of the workpiece is now roughed. The second area is roughed while the first area of the workpiece is grasped.

Specifications for roughing the second area are obtained from the finally finished shape file shown in FIGS. 161 to 164 and the finishing allowance file shown in FIG. 120. An entry of −150 (−0.010+0.090) which extends a step of sequence 55 is averaged to −149.95±0.040. This mean value is added to absolute lengths of step 9 to step 29. The increased absolute lengths are dealt as an increase in differences of the absolute lengths. As a result, a finishing allowance is added to the final shape of the workpiece, whereby the size of the workpiece to which the workpiece is roughed is obtained, as shown below.

| Machine program | Contents, conditions for determination, and Equations |
|---|---|
| N400; | |
| N401 G90; | |
| N402 G28G95; | |
| N403 T000001; | Select tool ID No. 1. |
| N404 G96S102M03; | Set peripheral normality to a constant speed of 102 m/min. M03: Rotate the tool in a rightward direction according to the rotation of the tool with tool ID No. 1. |
| N405 G00X118.Z210.8; | Roughing of an end face, a material diameter of 115 + 3 = 118, a material length of 211.9, and a finishing allowance of 0.4 for the end face. |
| N406 G01X0F0.39; | |
| N407 G00Z211.8; | |
| N408 G00X118. | |
| N409 G00X107.502; | Cutting operation of the first machining cycle (a diameter of 10,498 mm) |
| N410 G01Z150.785F0.39; | |
| N411 G01X111.; | |
| N412 G01Z139.6; | |
| N413 G00X118.; | |
| N414 G00Z211.8; | |
| N415 G00X97.004; | Cutting operation of the second machining cycle |
| N416 G01Z150.785F0.39; | |
| N417 G01X107.502; | |
| N418 G00Z211.8; | |
| N419 G00X86.506; | Cutting operation of the third machining cycle |
| N420 G01Z150.785G0.39; | |
| N421 G01X97.004; | |

| Step No. | Dimension of workpiece before it is finished | Length | | Depth of cut No. of times: depth of cut in the diametrical direction: quotient | | |
|---|---|---|---|---|---|---|
| 37 | (coordinates of the starting point) 24.850 | 0. | [210.8] | | | |
| 37 | 24.850 + 0.8 = 25.650 | 15. | [195.8] | 8 | 10.498 | 8.366 |
| 35 | 30.013 + 0.8 + 0.2 = 31.013G | 20. | [175.8] | 8 | 10.498 | 3.003 |
| 33 | 40. + 0.8 = 40.8 | 5. | [170.8] | 7 | 10.498 | 3.714 |
| 31 | 52.475 + 0.8 = 53.275 | 10. | [160.8] | 6 | 10.498 | 51.173 |
| 29 | 40. + 0.8 = 40.8 | 10.015 | [150.785] | — | — | Grooving |
| 27 | 110. + 0.8 + 0.2 = 111.0G | 9.975 | [140.815] | 0 | 7.000 | |
| (25 | 90. + 0.8 = 90.8 | 5. | [135.815]) | | | |
| SUM | | 74.99 | | | | |

A program for machining the second area is prepared in the same manner as the program for the first area, using the above numerical values. As a result of the determination, the workpiece is cut in the Z direction while it is fed in the X direction throughout the processing. However, the example of the machining of the first area, in which the workpiece is cut in the Z direction while it is fed in the X direction, has already been described. Hence, for convenience of reference, the result of the machining of the workpiece using the constant cutting method, in which the workpiece is cut in the X direction while it is fed in the Z direction, will now be described.

| | |
|---|---|
| N422 G00Z211.8; | |
| N423 G00X76.008; | Cutting operation of the fourth machining cycle |
| N424 G01Z150.785F0.39; | |
| N425 G01X86.506; | |
| N426 G00Z211.8; | |
| N427 G00X65.51; | Cutting operation of the fifth machining cycle |
| N428 G01Z150.785F0.39; | |
| N429 G01X76.008; | |
| N430 G00Z211.8; | |
| N431 G00X55.012; | Cutting operation of the sixth machining cycle |
| N432 G01Z150.785F0.39; | |
| N433 G01X65.51; | |
| N434 G00Z211.8; | |

| | |
|---|---|
| N435 G00X44.514; | Cutting operation of the seventh machining cycle |
| N436 G01Z170.8F0.39; | |
| N437 G01X55.012; | |
| N438 G00Z211.8; | |
| N439 G00X34.016; | Cutting operation of the eighth machining cycle |
| N440 G01Z175.8F0.39; | |
| N441 G01X44.514; | |
| N442 G00Z211.8; | |

Diametrical remains of the workpiece resulting from roughing each of the steps using the constant cutting method are as follows:

step 37: 8.366 mm, step 35: 3.003 mm, step 33: 3.714 mm, and step 31; 1.737 mm.

A program for machining a workpiece while correcting warpage arising in the workpiece as a result of the machining operation is prepared using the above values with reference to FIGS. 86 to 88.

Radial depth of cut of each step is as follows step 37: 4.183, step 35: 1.5015, step 33: 1.857, and step 31: 0.8685. Given that depths of cut ranging from 0.5 mm to 5 mm shown in FIGS. 86 to 88 are proportional to each other according to a linear expression, approximate corrections will be obtained as follows:

$$\Delta X_{0.8685}=0.024-\{(0.024-0)/0.5\}\times 0.1315=0.017688$$

$$\Delta X_{1.857}=0.050-\{(0.050-0.040)/0.5\}\times 0.143=0.04714$$

$$\Delta X_{1.5015}=0.050-\{(0.050-0.040)/0.5\}\times 0.4985=0.04003$$

$$\Delta X_{4.183}=0.111-\{(0111-0.1)/0.5\}\times 0.317=0.10403$$

These corrections are used respectively for correcting the depths of cut.

A program for correcting warpage of the workpiece resulting from a machining operation:

| | |
|---|---|
| N445 G00x25.668; | 25.650 + 0.018 = 25.668 |
| N446 G01Z195.8F0.39; | |
| N447 G01X31.06; | 31.013 + 0.047 = 31.060 |
| N448 G01Z175.8; | |
| N449 G01X40.84; | 40.8 + 0.040 = 40.840 |
| N450 G01Z170.8; | |
| N451 G01X53.379; | 53.275 + 0.104 = 53.379 |
| N452 G01Z150.785; | |
| N453 G01X112.; | |
| N454 G00X115.Z211.8; | |
| N455 G28M05; | |

Roughing of a groove determination section

| | |
|---|---|
| N460 T000004; | Select a tool having a width of 10 mm and a depth of 3.119 min. Assuming (53.275 − 40.8)/4 = 3.11875, a tool having a tool width of 5 mm |
| and | |
| | a tool number of 4 is selected from the tool file shown in FIGS. 78 to 81. |
| N461 S135M03; | |
| N462 G00x115.Z211.8; | |
| N463 G00x54.275Z152.693; | {(150.785 + 159.6)/2} − (5/2) = 152.6925 |
| N464 G01X40.8F0.145; | Calculate the feed rate of a grooving tool from the shank size of the tool, a length of a projection of the tool; 30 mm, the rigidity of the tool: X-0.007 μm/N and Z-0.28 μm/N, the limit of the feed rate: a maximum of 0.18 mm/rev. and a minimum of 0.01 mm/rev., the maximum cut withstanding volume of the tool: 714.3 N, all being read from the tool file (FIGS. 78 to 81), as well as from a workpiece material SCM440H and a specific cutting force of 1,960 N/mm² read from the material file (FIG. 124). |

The maximum allowable load is calculated by dividing an allowable deflection limit of 5 μm by a tool rigidity of X-0.007 μm/N as follows:

$$W=0.005/0.000007=714.285\text{N}=714.3\text{N}$$

This result is coincident with the maximum cut withstanding volume of the tool.

Equation (45) is transformed into an expression for calculating a radial feed rate.

$$\text{Feed rate: } F=\text{Maximum allowable load}/(\text{specific cutting force}\times\text{groove width})\ [\text{mm/rev.}] \quad (45)$$

Numerical values are substituted into Equation (45).

$$\text{Feed rate: } F=2\times 714.3/(1{,}960\times 5)=0.1457\ [\text{mm/rev.}]$$

| | |
|---|---|
| N465 G04F0.085; | Set a dwell time to the time necessary for the workpiece to rotate about one-and-a-half revolution. |

The dwell time is calculated by substituting, into Equation (46), the number of revolutions of the tool while it is in a dwell state (one and a half revolution in the present embodiment), the cut rate (135 m/min. in the present embodiment), and the diameter of the groove bottom (40.8 mm in the present embodiment).

$$t = (\text{the number of revolutions of the tool while it is in a dwell state})/(\text{cut rate}/(60\times\pi\times\text{bottom diameter}))\ [\text{sec.}] \ldots (46) = 1.5/(135{,}000/(60\times\pi\times 40.8)) = 0.08545\ [\text{sec.}]$$

In the present embodiment, the dwell time is 0.0854 [sec.].

| | |
|---|---|
| N466 G00X54.275; | |
| N467 G00Z151.8; | |
| N468 G01Z150.785F0.145; | |
| N469 G01X40.8; | |
| N470 G04F0.085; | |
| N471 G00X54.275; | |
| N472 G00Z155.6; | 159.6 0 4 = 155.6 |
| N473 G01X40.8F0.145; | |
| N474 G04F0.085; | |
| N475 G00X115.; | |
| N476 G00Z211.8; | |
| N477 G28M05; | |

Upon completion of the roughing of the second area, the processing is completed in step 1107 and then proceeds to step 1109.

Outer peripheral cam on 27th step

After the completion of the roughing of the second area, the workpiece is regrasped again, and the first area is again machined.

Cam specifications are shown in FIG. 55—a schematic representation of the workpiece, FIG. 156—a file of an entry for cam specifications, and FIG. 170—a finally finished shape file.

| Machine program | Contents, conditions for determination, and Equations |
|---|---|
| N500; | |
| N501 G90; | |
| N502 G28G95; | |
| N503 T0000017; | Select a tool having ID No. 17, a diameter of 16 mm, and two teeth. |
| N504 G97S1154M03; | Search for a tool material from the tool file. As a result of the search of the cutting condition file (FIG. 130) based on the thus obtained tool material: M20 and workpiece material: SCM440H, a peripheral normality of 58 m/min. (the number of revolutions of the main spindle: 1154 rev./min. which is a calculation result) and a feed rate of 0.075 mm/tooth (173 mm/min. which is a calculation result) are obtained. |
| N505 G00Z145.X115.C0.; | (150 + 140)/2 = 145 |
| N506 G01X110.8F70; | |
| N507 G01C180.X105.8F173; | |
| N508 G01C0.X110.8; | |
| N509 G01C180.X110.8; | |
| N510 G01C0.X110.8; | |
| N511 G01C180.X95.8; | |
| N512 G01C0.X110.8; | |
| N513 G02C180.X90.8; | |
| N514 G01C0.X110.8; | |
| N515 G28M05; | |
| N516 T000100; | Replace a measuring tool with another tool. |
| N517 #101 = 0; | Initialize macroscopic variations. |
| N518 #102 = 0; | |
| N519 #103 = 0; | |
| N520 #104 = 0; | |
| N521 #5061 = 0; | |
| N522 #1 = 0; | |
| N523 #2 = 0; | |
| N524 #3 = 0; | |
| N525 #4 = 0; | |
| N526 #5 = 0; | |
| N527 #6 = 0; | |
| N528 #7 = 0; | |
| N529 G00A-90.; | Rotate the tool head through 90° a counterclockwise direction, and turn the measuring axis to the axis of the tool head. |
| N530 G28$G100*; | Calibrate a measuring head. |
| N531 G00X115.Z215.1; | Move the measuring tool to the reference point for the machining operation. |
| N532 G00Z152.1X112.8; | Move the measuring tool to the first measurement point. |
| N533 G31X109.F150; | Measurement (1) – 110.8 mm |
| N534 #101 = #5061; | Store the measurement result to 101. |
| N535 G00Z158.X112.8; | Move the measuring tool to the second measurement point. |
| N536 G31X109.G150; | Measurement (2) – 110.8 mm |
| N537 #102 = #5061; | Store the measurement result to 102. |
| N538 #1 = #101 + #102; | Calculate respective cam rises of the first and second measurement points. |
| N539 #2 = #1/2; | |
| N540 G00C180.X82.8; | Move the measuring tool to the third measurement point. |
| N541 G31X79.F150; | Measurement (3) – 80.8 mm |
| N542 #103 = #5061; | Store the measurement result to 103. |
| N543 G00Z152.X82.8; | Move the measuring tool to the fourth measurement point. |
| N544 G31X79.F150; | Measurement (4) – 80.8 mm |
| N545 #104 = #5061; | Store the measurement result to 104. |
| N546 #3 = #103 = #104; | Calculate respective cam rises of the third and fourth measurement points. |
| N547 #4 = #3/2; | |
| N548 #5 = #2 + #4; | Calculate the sum of cam rises. |
| N549 #6 = 55.4 + 45.4; | Calculate a specified value. |
| N550 #7 = #6 – #5; | Calculate a difference between the sum and the specified value. |
| N551 G00X115.; | Move the tool head to the reference point of the machining operation. |

-continued

| Machine program | Contents, conditions for determination, and Equations |
|---|---|
| N552 G00Z215.1; | Move the tool head to the reference point of the machining operation. |
| N553 G28; | Return the tool head to the point of origin. |
| N554 G00A0.; | Rotate the tool head to 0°, and return the tool to the point of origin. |
| N555 #4107 = #4107 – #7; | Rewrite a correction for the tool diameter. |
| N556 T000017; | Re-enter a tool correction. |
| N557 G97S1154M03; | |
| N558 G00X110.8Z145.C0.; | |
| N559 G01X110.2F70; | |
| N560 G01C180.X90.2F173; | |
| N561 G01C0,X110.2; | |
| N562 G01C2.X109.998; | Machine an overlapped portion defined through an angle of 2°. |
| N563 G00X115.; | |
| N564 G00Z210.C0.; | |
| N565 G28M05; | |

Upon completion of the machining of the outer peripheral cam, the processing is completed in step 1108 and then proceeds to step 1109.

Grooving of the outer circumference of the first area

Sequence 58, groove No. 3, reference step/step to be machined: 18th step, reference position: 165.1 mm, a groove width of 5 mm, and a radius for removing corners at the groove bottom: R 0.4 mm

| Machine program | Contents, conditions for determination, and Equations |
|---|---|
| N570 G90; | |
| N571 G28; | |
| N572 T000004; | Select a tool. |
| N573 G96S135M03; | |
| N574 G00X115.Z165.4; | |
| N575 G00X74.8; | Additional coverage of 0.5 mm for grooving purposes |
| N576 G01X69.45F0.145; | |

Calculate the feed rate of a grooving tool from a shank size of 19×25, a length of a projection of the tool; 30 mm, the rigidity of the tool: X-0.007 μm/N and Z-0.28 μm/N, the limit of the feed rate: a maximum of 0.18 mm/rev. and a minimum of 0.01 mm/rev., the maximum cut withstanding volume of the tool: 714.3N, all being read from the tool file (FIGS. 78 to 81), as well as from a workpiece material SCM440H and a specific cutting force of 1,960N/mm$^2$ read from the material file (FIG. 124).

The maximum allowable load is calculated by dividing an allowable deflection limit of 5 μm by a tool rigidity of X-0.007 μm/N as follows:

$$W=0.005/0.000007=714.285N=714.3N$$

This result is coincident with the maximum cut withstanding volume of the tool.

Equation (45) is transformed into an expression for calculating a radial feed rate.

$$\text{Feed rate: } F=\text{Maximum allowable load/(specific cutting force} \times \text{groove width) [mm/rev.]} \quad (45)$$

Numerical values are substituted into Equation (45).

$$\text{Feed rate: } F=2\times 714.3/(1{,}960\times 5)=0.1457 \text{ [mm/rev.]}$$

| | |
|---|---|
| N577 G04F0.145; | Set a dwell time to the time necessary for the workpiece to rotate about one-and-a-half revolution. |

The dwell time is calculated by substituting, into Equation (46), the number of revolutions of the tool while it is in a dwell state (one and a half revolution in the present embodiment), the cut rate (135 m/min. in the present embodiment), and the diameter of the groove bottom (69.45 mm in the present embodiment).

t = (the number of revolutions of the tool while it is in a dwell state)/(cut rate/(60 × π × bottom diameter)) [sec.] . . . (46) = 1.5/(135,000/(60 × π × 69.45)) = 0.14546 [sec.]

In the present embodiment, the dwell time is 0.145 [sec.].

| | |
|---|---|
| N578 G01X73.8F0.145; | A feed rate is the same as the feed rate at which the workpiece is cut. |
| N579 G00X115.; | |

Grooving of the outer circumference of the first area:

Sequence 60, groove No. 4, reference step/step to be machined: 23rd step, reference position: 75.1 mm, a groove width of 5 mm, and a radius for removing corners at the groove bottom: R 0.4 mm

| | |
|---|---|
| N580 G00Z75.4; | |
| N584 G00X91.8; | Additional coverage of 0.5 mm for grooving purposes |
| N582 G01X83.85F0.145; | Machining conditions which are identical with the conditions for cutting the groove No. 3 |
| N583 G04F0.176; | Set a dwell time to the time necessary for the workpiece to rotate about one-and-a-half revolution. |

The dwell time is calculated by substituting, into Equation (46), the number of revolutions of the tool while it is in a dwell state (one and a half revolution in the present embodiment), the cut rate (135 m/min. in the present embodiment), and the diameter of the groove bottom (83.85 mm in the present embodiment).

t = (the number of revolutions of the tool while it is in a dwell state)/(cut rate/(60 × π × bottom diameter)) [sec.] . . . (46) = 1.5/(135,000/(60 × π × 83.85)) = 0.1756 [sec.]

In the present embodiment, the dwell time is 0.176 [sec.].

N584 G01X90.8F0.145; A feed rate is the same as the feed rate at which the workpiece is cut. Since the tool has a nose radius of 0.4 mm, the position to which the tool returns is not provided with an additional coverage, i.e., the tool is reset to the outer diameter of the workpiece. As a result, when compared with the case where the tool returns to the cutting point, the machining time can be reduced.

The quick return position used in the grooving operation is intended to switch the feed rate to a rapid traverse rate depending on the nose radius of the tool tip when the tool tip arrives at the outer circumference of the workpiece after having come out of contact with the workpiece.

N585 G00X115.Z210.4;

N586 G28M05;

Upon completion of the grooving of the outer circumference of the first area, the processing is completed in step 1108 and then proceeds to step 1109.

Finishing of outer circumference of the workpiece

Specifications for finishing the outer circumference of the first area of the workpiece are as follows:

| Step No. | Dimension of workpiece before it is finished | Dimension of finished workpiece | Length |
|---|---|---|---|
| 10 | (coordinates of the starting point) 49.675 | 48.875 | 0. [210.4] |
| 10 | 49.675 | 48.875 | 5. [205.4] |
| 12 | 53.37 | 52.57 | 10. [195.4] |
| 14 | 53.8 | 53. | 10. [185.4] |
| 16 | 69.8 | 69. | 5. [180.4] |
| 18 | 72.65 | 71.85 | 15. [165.4] |
| 20 | 73.985G | 72.985 + 0.2 = 73.185G | 30. [165.4] |
| 21 | 73.785~80.789 | 72.985~79.989 | 20. [115.4] |
| 22 | 80.790~84.789 | 79.990~83.989 | 20. [95.4] |
| 23 | 84.989G | 83.989 + 0.2 = 84.189 | 20. [75.4] |
| 25 | 90.8 | 90. | 4.96 [70.36] |

The program for finishing the outer circumference of the first area is prepared as follows:

| Machine program | Contents, conditions for determination, and Equations |
|---|---|
| N600 G90; | |
| N601 G28; | |
| N602 T000003; | |
| T603 G96S135M03; | |
| T604 G41G00X31.013Z210.8; | |
| T605 G01Z210.4F0.09; | Determine the feed rate F depending on a finishing method symbol. |

A finishing symbol on 9th step is 2L, and hence it is only required to satisfy a feed rate of less than 25 S. Equation (47) for the relationship between the roughness of the surface and the feed rate is expanded to Equation (48). A nose radius of 0.4 mm of the tool read from the tool file (FIGS. 78 to 81) is substituted into Equation (48).

$$H\max = f^2/8R \quad (47)$$

$$f^2 = 8R \times H = 8 \times 0.4 \times 0.025 = 0.08 \quad (48)$$

$$f\max = 0.08^{0.5} = 0.28284$$

$f = 0.28284 \times 0.8 = 0.226272$ (0.8 is an arbitrarily changeable safety factor)

When the end face is finished, a feed rate of the tool, designed to be used in the Z direction, in the X direction is 1/2.5 of the feed rate in the Z direction (2.5 is a parameter which can be arbitrarily changed as required).

$$f = 0.226/2.5 = 0.09 \text{ [mm/rev.]}$$

| | |
|---|---|
| N606 G01X47.87.5F0.09; | |
| F607 G01X48.875Z209.9; | Chamfer 0.5C plane. |
| N608 G01Z205.4F0.226; | |
| N609 G01X52.57F0.09; | |
| N610 G01Z195.4F0.226; | |
| N611 G01X53.F0.09; | |
| N612 G01Z185.4F0.226; | |

-continued

| | |
|---|---|
| N613 G01X68.F0.09; | |
| N614 G01X69Z184.9; | |
| N615 G01Z180.4F0.226; | |
| N616 G01X71.85F0.09; | |
| N617 G01Z165.4F0.226; | |
| N618 G01X73.185F0.09; | Add a finishing allowance of 0.2 mm to the size to which the workpiece is machined. |
| N619 G01Z135.4F0.226; | |
| N620 G01X72.985F0.09; | A relief of 0.2 mm for grinding purposes |
| N621 G02X79.989Z115.4R59.985F0.226; | Machine the workpiece to form a circular arc. |
| N622 G01X83.989Z95.4; | |
| N623 G01X84.189F00.9; | |
| N624 G01Z75.4F0.226; | |
| N625 G01X83.989F0.09; | |
| N626 G01X89.F0.09; | |
| N627 G01X90.Z74.9F0.226; | |
| N628 G01Z70.36; | |
| N629 G01X109.F0.09; | |
| N630 G01X110.Z69.9F0.09; | Chamfer 26th step of the workpiece. |
| N631 G01X115F0.09; | |
| N632 G40; | |
| N633 G28M05; | |

Upon completion of the finishing of the outer circumference of the workpiece, the processing is completed in step 1108 and then proceeds to step 1109.

There are many threading methods which are different from each other in the way of making a thread (a threading method) and the way of determining the depth of thread.

The threading method includes a driving method, a relieving method, and a combined driving method. Further, the way of determining the depth of thread includes a method of threading a workpiece so that each thread has an equivalent cross section, and a method of threading a workpiece at equivalent intervals.

The selection of the methods depends on the material and hardness of a workpiece, mechanical rigidity, and the material, rigidity, and characteristics of a tool.

Data on tools and depth of cut associated with the threading operation are calculated from the thread specifications using Equations (49) to (59).

Width of a flat portion of the root=2{($P$/4)−(½)×effective mean diameter−maximum minor diameter)×tan (one-half included angle)} (49)

where P=thread pitch (mm).

Nose radius of the tip which satisfies the width of the flat portion of the root=(the width of the flat portion of the root/2)×cos (one-half included angle) (50)

Minor diameter of a sharply angular root=effective mean diameter−2×($P$/4)×cot (one-half included angle) (51)

The tip nose radius is retrieved and determined by Equations (52) and (53).

Minor diameter to which the workpiece is machined=minor diameter+2[(the width of the flat portion of the root/2)−{(nose radius of the determined tool)/cos (one-half included angle)}]×cot (one-half included angle) (52)

Minor diameter to which the workpiece is machined=minor diameter of the sharply angular root+2×{nose radius of the tip of the determined tool/sin (one-half included angle)}−(nose radius of the tip of the determined tool) (53)

Depth of cut={(means outside diameter)−(minor diameter to which the workpiece is machined)}/2 (54)

Width of top land when the determined tool is a trapezoidal screw thread=2×nose radius of a determined tool×[{(1/sin (one-half included angle)}−1]×tan (half the included angle) (55)

Width of an opening in a thread=($P$/2)+(mean outside diameter−effective mean diameter)×tan (one-half included angle) (56)

Cross section of a thread=(depth of cut)×(the width of an opening in the thread+tip width)/2 (57)

where the depth of cut is obtained by Equation (54), the width of the opening in the thread is obtained by Equation (56), and the width of the tip is obtained by Equation (55).

The depth of cut is divided using the equivalent cross section method in the following manner. Determination of the number of times the workpiece is threaded:

The number of times the workpiece is threaded is determined by the steps of:

- dividing a total cutting load, which is a product of a cross section of a thread and a specific cutting force, by an allowable cutting load calculated from mechanical rigidity and tool rigidity, whereby substantial number of times the workpiece is threaded, and
- multiplying the substantial number of times material is threaded by a safety factor. The safety factor can be changed depending on the conditions of the machine tool or the tool. In the present embodiment, the safety factor is 1 (which is an arbitrarily changeable parameter).

The divided depth of cut is calculated by expanding Equation (58).

Cross section of a thread/number of times ($n$) the workpiece is threaded=top land width×$(h_n-h_{(n-1)})$+2×(½)×{$(h_n)^2$×tan (one-half included angle)−$(h_{(n-1)})^2$×tan (one-half included angle)}=top land width×$(h_n-h_{(n-1)})$+tan (one-half included angle)×{$(h_n)^2-(h_{(n-1)})^2$} (58)

A horizontal travel distance of the tool required by the relieving method or the method of driving the tool in combined directions is calculated by Equation (59).

Horizontal travel distance of the tool $(\Delta Z_n)=(h_n-h_{(n-1)})$×tan (one-half included angle) (59)

As a result, various numerical values are obtained as shown below.

Threading:

M72P1.5R on 18th step, JIS6g, and numerical values of a male thread screw are read from a file (FIG. 116).

Outside diameter of a screw thread:

Upper dimension: 71.968, lower dimension: 71.732, and mean diameter: 71.85

Effective diameter of a screw thread:

Upper dimension: 70.994, lower dimension: 70.834, and mean diameter: 70.914

Minimum root radius: 0.188

Various numerical values for a machining path are calculated by substituting the above described numerical values into Equations (49) to (59).

Width of a flat portion of the root=2{($P$/4)−(1/e)×effective mean diameter−maximum minor diameter)×tan (one-half included angle)} (49)

where P=thread pitch (mm).

Since P=1.5, the one-half included angle=30°, the effective mean diameter=70.914, and the maximum minor diameter=unspecified, it is impossible to use Equation (49).

Nose radius of the tip which satisfies the width of the flat portion of the root=(the width of the flat portion of the root/2)×cos (one-half included angle) (50)

The width of the flat portion of the root cannot be obtained by Equation (49) in the present embodiment, and therefore Equation (50) can be used neither.

Search and determination of nose radius of the tool

The minimum specified nose radius of the specified tool in the file (FIG. 116) is 0.188 mm.

A tool having tool ID No. 000005 and a nose radius of 0.2 mm is searched as a tool which satisfies the above requirement. The thus obtained tool is then checked against the minimum nose radius of the specified tool, i.e., 0.188 mm. The searched tool also satisfies this requirement, and therefore the tool with tool ID No. 000005 is determined so as to be used.

The minor diameter of a sharply angular root, a minor diameter to which the workpiece is machined, and the depth of cut are calculated by substituting P=1.5, one-half included angle=30° and effective mean diameter=70.914 into Equations (51) to (54).

Minor diameter of a sharply angular root=effective mean diameter−2×($P$/4)×cot (one-half included angle) (51)

Minor diameter of a sharply angular root=70.914−2×(1.5/4)×cot 30=69.615

Minor diameter to which the workpiece is machined=minor diameter+2[(the width of the flat portion of the root/2)−{(nose radius of the determined tool)/cos (one-half included angle)}]× cot (one-half included angle) (52)

Minor diameter to which the workpiece is machined=minor diameter of the sharply angular root+2×{nose radius of the tip of the determined tool/sin (one-half included angle)}−(nose radius of the tip of the determined tool) (53)

Minor diameter of the sharply angular root: 69.615 mm, nose radius of the determined tool: 0.2 mm, and one-half included angle: 30° are substituted into Equation (53).

Minor diameter to which the workpiece is machined=69.615+2× {0.2/sin 30)−(0.2)=70.215

Mean outside diameter: 71.85 and minor diameter to which the workpiece is machined: 70.215 are substituted into Equation (54).

Depth of cut={(means outside diameter)−(minor diameter to which the workpiece is machined)}/2 (54)

Depth of cut=(71.85−70.215)/2=0.8175

Nose radius of a specified tool: 0.2 mm and one-half included angle: 70.215 are substituted into Equation (55), whereby the width of top land when the determined tool is a trapezoidal screw thread is calculated.

Width of top land when the determined tool is a trapezoidal screw thread=2×nose radius of a determined tool×[{(1/sin (one-half included angle)}−1]×tan (half the included angle) (55)

Width of top land when the determined tool is a trapezoidal screw thread=2×0.2×{(1/sin 30)−1}×tan 30=0.231

P=1.5, mean outside diameter: 71.85, effective mean diameter: 70.914, and the one-half included angle=30° are substituted into Equation (56), whereby the width of an opening in the thread is calculated.

Width of an opening in a thread=($P$/2)+(mean outside diameter−effective mean diameter)×tan (one-half included angle) (56)

Width of an opening in a thread=(1.5/2)+(71.85−70.914)×tan 30=1.2904

Depth of cut: 0.8175, width of top land when the determined tool is a trapezoidal screw thread: 0.231, and width of an opening in the thread: 1.2904 are substituted into Equation (57), whereby the cross section of the thread is calculated.

Cross section of a thread=(depth of cut)×(the width of an opening in the thread+tip width)/2 (57)

Cross section of a thread=0.8175×(1.2904+0.231)/2=0.6219 $mm^2$

Determination of the number of times the workpiece is threaded

The number of times the workpiece is threaded is determined by the steps of:

- dividing a total cutting load, which is a product of a cross section of a thread and a specific cutting force, by an allowable cutting load calculated from mechanical rigidity and tool rigidity, whereby substantial number of times the workpiece is threaded, and
- multiplying the substantial number of times material is threaded by a safety factor. The safety factor can be changed depending on the conditions of the machine tool or the tool. In the present embodiment, the safety factor is 1 (which is an arbitrarily changeable parameter).

Using workpiece material SCM440H as a key cord, a specific cutting force of 1,960N/$mm^2$ is obtained from the material file (FIG. 124).

Total cutting load=1,960×0.6219=1,218,96 [N]

Data on the tool with tool ID No. 000005 are read from the tool file (shown in FIGS. 78 to 81) as follows:

Tool rigidity: X-0.004 μm/N and Z-0.016 μm/N,

Limit of depth of cut: a maximum depth of 1 mm and a minimum depth of 0.01 mm, and Maximum cut withstanding volume: 1,125N.

The limit of the tool rigidity is set to half the limit of the rigidity of the tool used for a roughing operation, i.e., 5 μm (an arbitrarily changeable parameter), under the condition that the workpiece is threaded.

Allowable cutting load=2.5/0.016=156.25 (N)

Number of times the workpiece is threaded=total cutting load: 1,218.92/allowable cutting load: 156.25=7.8=8

The number of times the workpiece is threaded is set to 8. Although the number of times the workpiece is finished can be arbitrarily set, it is set to 2 in the present embodiment.

Cross section of a thread: 0.6219 $mm^2$, number of times the workpiece is threaded: 8, tip width: 0.231 mm, and one-half included angle: 30° are substituted into Equation (58), whereby the depth of cut made by each threading action is calculated.

Cross section of a thread/number of times ($n$) the workpiece is threaded=top land width×$(h_n-h_{(n-1)})$+2×(½)×$\{(h_n)^2$×tan (one-half included angle)−$(h_{(n-1)})^2$×tan (one-half included angle)}= top land width×$(h_n-h_{(n-1)})$+tan (one-half included angle)× $\{(h_n)^2-(h_{(n-1)})^2\}$ (58)

0.6219/(8)=0.231×$(h_n-h_{(n-1)})$+tan 30 $\{(h_n)^2-(h_{(n-1)})^2\}$

As a result of the calculation, $$0.077738=0.231\times(h_n-h_{(n-1)})+0.577367\{(h_n)^2-(h_{(n-1)})^2\}$$

The above equation is transformed into $$0.577367(h_n)^2+0.231\times h_n-\{0.077738+0.231\times h_{(n-1)}+0.577367\ (h_{(n-1)})^2=0$$

Then, assuming $S'(n-1)=0.231\times h_{(n-1)})+0.577367h_{(n-1)}{}^2$, we have $0.577367(h_n)^2+0.231\times h_n-\{0.077738+S'(n-1)\}=0$ Therefore $$h_n=[-0.231\pm\{0.2312^2+4\times0.577367(0.077738+S'(n-1)\}^{1/2}]/1.15473$$

Depth of cut is calculated using this equation while "n" is changed from 1 to 8.

Programmed values which include a finishing allowance are shown below.

| Calculated depth of cut | Depth of cut (rounded value diameter) | Programmed value | $h_n - h_{(n-1)}$ |
|---|---|---|---|
| [In the case of a roughing operation] | | | |
| h1 = 0.2178788 | 0.436 | 71.85 + 0.04 = 71.454 | 0.436 |
| S' (2-1) = 0.0777382 | | | |
| h2 = 0.3561055 | 0.712 | = 71.178 | 0.138 |
| S' (3-1) = 0.1554768 | | | |
| h3 = 0.4662486 | 0.932 | = 70.985 | 0.1105 |
| S' (4-1) = 0.2332158 | | | |
| h4 = 0.5606072 | 1.121 | = 70.769 | 0.0965 |
| S' (5-1) = 0.3109553 | | | |
| h5 = 0.6444887 | 1.289 | = 70.601 | 0.084 |
| S' (6-1) = 0.3886951 | | | |
| h6 = 0.7207608 | 1.442 | = 70.448 | 0.0765 |
| S' (7-1.) = 0.4663456 | | | |
| h7 = 0.7911818 | 1.582 | = 70.308 | 0.0700 |
| S' (8-1) = 0.5441765 | | | |
| h8 = 0.8275 | 1.635 | = 70.255 | 0.0265 |
| Finishing allowance (a finishing allowance of 0.01 mm is set to twice) | | | |
| h9 = 0.8275 | 1.655 | = 70.235 | 0.01 |
| h10 = 0.8375 | 1.675 | = 70.245 | 0.01 |

A horizontal travel distance of the tool required by the relieving method or the method of driving the tool in combined directions is calculated by substituting $h_n-h_{(n-1)}$ and tan 30 into Equation (59).

$$\text{Horizontal travel distance of the tool } (\Delta Z_n)=(h_n-h_{(n-1)})\times\tan\ (\text{one-half included angle}) \tag{59}$$

To prevent a side flank edge employed in the relieving method from theoretically coming into contact with the workpiece, the horizontal travel distance is rounded off to the minimum travel distance unit of a control unit (a distance of 0.001 mm in the present embodiment). Cutting points for relieving are calculated in opposite order to the order of threading operation with respect to a final position of 185.4. Results of the calculation and associated errors (an accumulated value—an accumulated value obtained as a result of the calculation) are shown below.

| Calculated value | Rounded value | Accumulated value | Cutting point for relieving | Acumulated value obtained by calculation | Error |
|---|---|---|---|---|---|
| −Δz1 = 0.2517246 | −0.252 | −0.252 | 185.979 | −0.2517246 | −0.0002754 |
| −Δz2 = 0.0796743 | −0.080 | −0.332 | 185.745 | −0.3313989 | −0.0006011 |
| −Δz3 = 0.0637971 | −0.064 | −0.396 | 185.665 | −0.3951962 | −0.0000804 |
| −Δz4 = 0.0557142 | −0.056 | −0.452 | 185.601 | −0.4509102 | −0.0010898 |
| −Δz5 = 0.0484974 | −0.049 | −0.501 | 185.545 | −0.4994976 | −0.0015924 |
| −Δz6 = 0.0441672 | −0.045 | −0.546 | 185.496 | −0.5435748 | −0.0024252 |
| −Δz7 = 0.0404145 | −0.041 | −0.587 | 185.451 | −0.5839893 | −0.0030107 |
| −Δz8 = 0.0152997 | −0.016 | −0.603 | 185.410 | −0.599289 | −0.003711 |
| −Δz9 = 0.0057735 | −0.006 | −0.609 | 185.394 | −0.6050625 | −0.0039375 |
| Δz10 = 0.0057735 | −0.006 | −0.603 | 185.4 | −0.599289 | −0.003711 |

To prevent a side flank edge employed in the method of driving the tool in combined directions from theoretically coming into contact with the workpiece, the horizontal travel distance is rounded off to the minimum travel distance unit of the control unit (a distance of 0.001 mm in the present embodiment). Cutting points for the driving method are calculated in opposite order to the order of threading operation with respect to a final position of 185.4. Results of the calculation and associated errors {(an accumulated value)—(0.043)—(an accumulated value obtained as a result of the calculation)} are shown below.

| Calculated value | Rounded value | Accumulated value | Cutting point | Accumulated value obtained by calculation | Error |
|---|---|---|---|---|---|
| Δz1 = 0 | 0.043 | 0.043 | 185.443 | | |
| −Δz2 = 0.0796743 | −0.080 | −0.037 | 185.363 | −0.0796743 | −0.0003257 |
| Δz3 = 0.0637971 | 0.064 | 0.027 | 185.427 | −0.0158772 | −0.0001228 |
| −Δz4 = 0.0557142 | −0.056 | −0.029 | 185.371 | −0.0715914 | −0.0004086 |
| Δz5 = 0.0484974 | 0.049 | 0.020 | 185.420 | −0.0230940 | −0.0000944 |
| −Δz6 = 0.0441672 | −0.045 | −0.025 | 185.375 | −0.0672612 | −0.0007388 |
| Δz7 = 0.0404145 | 0.041 | 0.016 | 185.416 | −0.0268467 | −0.0001533 |
| −Δz8 = 0.0152997 | −0.016 | 0.0 | 185.4 | −0.0421464 | −0.0005360 |
| Δz9 = 0.0057735 | 0.006 | 0.006 | 185.406 | −0.0363729 | −0.0006271 |
| −Δz10 = 0.0057735 | −0.006 | 0.0 | 185.4 | −0.0421464 | −0.0008536 |

A threading program is prepared using the above calculation results.

A machining method using the driving method is as follows:

| Machine program | Contents, conditions for determination, and Equations |
|---|---|
| N700 G28; | |
| N701 G96; | |
| N702 T000005; | Threading tool with tool ID No. 5 |
| N703 S102.M03; | A cut rate of 102 mm/min. is calculated from the tool material P20 and the workpiece material SCM440H read from the cutting condition file (FIG. 128). |
| N704 G00X74.Z185.4; | Position from which the threading of the workpiece starts, that is, Z: 180.4, and an acceleration margin of 5 mm are added together. The sum is programmed as the starting point of the threading operation, i.e., 185.1. |
| N705 G00X71.454; | First threading opration with use of calculated values. The same applies to counterparts in the following descriptions. |
| N706 G33Z165.4F1.5; | Threading P; 1.5. The same applies to counterparts in the following descriptions. |
| N707 G00X74.; | Round up a nominal diameter, and 2 mm is added to the rounded diameter. The same applies to counterparts in the following descriptions. The value of 2 mm can be arbitrarily set. |
| N708 G00Z185.4; | Return the tool head to the cutting point. The same applies to counterparts in the following descriptions. |
| N709 G00X71.178; | Second threading operation |
| N710 G33Z165.4; | |
| N711 G00X74.; | |
| N712 G00Z185.4; | |
| N713 G00X70.985; | Third threading operation |
| N714 G33Z165.4; | |
| N715 G00X74.; | |
| N716 G00Z185.4; | |
| N717 G00X70.769; | Fourth threading operation |
| N718 G33Z165.4; | |
| N719 G00X74.; | |
| N720 G00Z185.4; | |
| N721 G00X70.601; | Fifth threading operation |
| N722 G33Z165.4; | |
| N723 G00X74.; | |
| N724 G00Z185.4; | |
| N725 G00X70.448; | Sixth threading operation |

-continued

| Machine program | Contents, conditions for determination, and Equations |
|---|---|
| N726 G33Z165.4; | |
| N727 G00X74.; | |
| N728 G00Z185.4; | |
| N729 G00X70.308; | Seventh threading operation |
| N730 G33Z165.4; | |
| N731 G00X74.; | |
| N732 G00Z185.4; | |
| N733 G00X70.255; | Eighth threading operation |
| N734 G33Z165.4; | |
| N735 G00X74.; | |
| N736 G00Z185.4; | |
| N737 G00X70.235; | Ninth threading operation (finishing operation) |
| N738 G33Z165.4; | |
| N739 G00X74.; | |
| N740 G00Z185.4; | |
| N741 G00X70.215; | Tenth threading operation (finishing operation) |
| N742 G33Z165.4; | |
| N743 G00X74.; | |
| N744 G00Z185.4; | |
| N745 G28M05; | |

A machine program using the relieving method is as follows:

| Machine program | Contents, conditions for determination, and Equations |
|---|---|
| N700 G28; | |
| N701 G96; | |
| N702 T000005; | Threading tool with tool ID No. 5 |
| N703 S102.M03; | A cut rate of 102 mm/min. is calculated from the tool material P20 and the workpiece material SCM440H read from the cutting condition file (FIG. 128). |
| N704 G00X74.Z185.4; | Position from which the threading of the workpiece starts, that is, Z: 180.4 (including a finishing allowance for an end face. 0.4 mm), an acceleration margin of 5 mm, and a shift in relieving position: 0.579 mm are added together. The sum is programmed as the starting point of the threading operation, i.e., 185.979. |
| N705 G00X71.454; | First threading opration with use of calculated values. The same applies to |

-continued

| Machine program | Contents, conditions for determination, and Equations |
|---|---|
| | counterparts in the following descriptions. |
| N706 G33Z165.4F1.5; | Threading P; 1.5. The same applies to counterparts in the following descriptions. |
| N707 G00X74.; | Round up a nominal diameter, and 2 mm is added to the rounded diameter. The same applies to counterparts in the following descriptions. The value of 2 mm can be arbitrarily set. |
| N708 G00Z185.652; | Return the tool head to the cutting point. The same applies to counterparts in the following descriptions. |
| N709 G00X71.178; | Second threading operation |
| N710 G33Z165.4; | |
| N711 G00X74.; | |
| N712 G00Z185.652; | |
| N713 G00X70.985Z185.665; | Third threading operation |
| N714 G33Z165.4; | |
| N715 G00X74.; | |
| N716 G00Z185.652; | |
| N717 G00X70.769Z185.601; | Fourth threading operation |
| N718 G33Z165.4; | |
| N719 G00X74.; | |
| N720 G00Z185.652; | |
| N721 G00X70.601Z185.545; | Fifth threading operation |
| N722 G33Z165.4; | |
| N723 G00X74.; | |
| N724 G00Z185.652; | |
| N725 G00X70.448Z185.496; | Sixth threading operation |
| N726 G33Z165.4; | |
| N727 G00X74.; | |
| N728 G00Z185.652; | |
| N729 G00X70.308Z185.451; | Seventh threading operation |
| N730 G33Z165.4; | |
| N731 G00X74.; | |
| N732 G00Z185.652; | |
| N733 G00X70.255Z185.410; | Eighth threading operation |
| N734 G33Z165.4; | |
| N735 G00X74.; | |
| N736 G00Z185.652; | |
| N737 G00X70.235Z185.394; | Ninth threading operation (finishing operation) |
| N738 G33Z165.4; | |
| N739 G00X74.; | |
| N740 G00Z185.652; | |
| N741 G00X70.215Z185.4; | Tenth threading operation (finishing operation) |
| N742 G33Z165.4; | |
| N743 G00X74.; | |
| N744 G00Z185.652; | |
| N745 G28M05; | |

A machine program using the method of driving a workpiece in combined directions (threading the workpiece in a staggered manner) is as follows:

| Machine program | Contents, conditions for determination, and Equations |
|---|---|
| N700 G28; | |
| N701 G96; | |
| N702 T000005; | Threading tool with tool ID No. 5 |
| N703 S102.M03; | A cut rate of 102 mm/min. is calculated from the tool material P20 and the workpiece material SCM440H read from the cutting condition file (FIG. 128). |
| N704 G00X74.Z185.4; | Position from which the threading of the workpiece starts, that is, Z: 180.4 (including a finishing allowance for an end face. 0.4 mm), an acceleration margin of 5 mm, and a shift in relieving position associated with the driving method: 0.043 mm are added together. The sum is programmed as the starting point of the threading operation, i.e., 185.443. |
| N705 G00X71.454; | First threading opration with use of calculated values. The same applies to counterparts in the following descriptions. |
| N706 G33Z165.4F1.5; | Threading P; 1.5. The same applies to counterparts in the following descriptions. |
| N707 G00X74.; | Round up a nominal diameter, and 2 mm is added to the rounded diameter. The same applies to counterparts in the following descriptions. The value of 2 mm can be arbitrarily set. |
| N708 G00Z185.652; | Return the tool head to the cutting point. The same applies to counterparts in the following descriptions. |
| N709 G00X71.178Z185.363; | Second threading operation |
| N710 G33Z165.4; | |
| N711 G00X74.; | |
| N712 G00Z185.652; | |
| N713 G00X70.985Z185.427; | Third threading operation |
| N714 G33Z165.4; | |
| N715 G00X74.; | |
| N716 G00Z185.652; | |
| N717 G00X70.769Z185.601; | Fourth threading operation |
| N718 G33Z165.4; | |
| N719 G00X74.; | |
| N720 G00Z185.652; | |
| N721 G00X70.601Z185.420; | Fifth threading operation |
| N722 G33Z165.4; | |
| N723 G00X74.; | |
| N724 G00Z185.652; | |
| N725 G00X70.448Z185.375; | Sixth threading operation |
| N726 G33Z165.4; | |
| N727 G00X74.; | |
| N728 G00Z185.652; | |
| N729 G00X70.308Z185.416; | Seventh threading operation |
| N730 G33Z165.4; | |
| N731 G00X74.; | |
| N732 G00Z185.652; | |
| N733 G00X70.255Z185.4; | Eighth threading operation |
| N734 G33Z165.4; | |
| N735 G00X74.; | |
| N736 G00Z185.352; | |
| N737 G00X70.235Z185.406; | Ninth threading operation (finishing operation) |
| N738 G33Z165.4; | |
| N739 G00X74.; | |
| N740 G00Z185.652; | |
| N741 G00X70.215Z185.4; | Tenth threading operation (finishing operation) |
| N742 G33Z165.4; | |
| N743 G00X74.; | |
| N744 G00Z185.652; | |
| N745 G28M05; | |

The preparation of the threading programs is now completed. Upon completion of the preparation of the program, the processing is completed in step 1108 and then proceeds to step 1109.

The preparation of a program for grooving the internal circumference of the workpiece will now be described.

The preparation of a program in which the internal circumference of a workpiece is grooved using the previously determined tool with tool ID No. 8, and the result of the preparation of the program will be shown below.

| Machine program | Contents, conditions for determination, and Equations |
|---|---|
| N800 G28; | |
| N801 G96: | |
| N802 G000008; | |
| N803 S135.M03; | Of the cutting conditions, a cut rate (a cut rate of 135 m/min. in the present |

-continued

| Machine program | Contents, conditions for determination, and Equations |
|---|---|
| | embodiment) is read from the cutting condition file (FIG. 128) by means of the workpiece material (SCM440H in the present embodiment) and the tool material (P10 in the present embodiment). The machine is controlled so as to maintain peripheral normality constant, and hence 135. is directly input as a cutting condition. |
| N804 G00X19.Z211.4; | |
| N805 G00Z176.4; | |
| N806 G01X31.F0.046; | Of the cutting conditions, a feed rate is calculated from the maximum cut withstanding volume (227N in the present embodiment) and the specific cutting force (1,960 N in the present embodiment) of the workpiece (SCM440H in the present embodiment) using Equation (45). |

$$\text{Feed rate: } F = \text{Maximum cut withstanding volume}/(\text{specific cutting force} \times \text{groove width})\ [\text{mm}/rev.] \quad (45)$$

$$= 227/(1{,}960 \times 5)$$

$$= 0.023\ [\text{mm}/rev.]$$

The workpiece is grooved while it is radially fed in the present embodiment, and hence the feed rate is doubled to 0.046 [mm/rev.].

This value falls within the range between a feed rate limit of 0.01–0.15 m of the tool file (FIGS. 78 to 85) and a minimum cut rate of more than 0 of the machine tool file (FIGS. 58 to 76), and hence it is directly used in the grooving operation.

| | |
|---|---|
| N807 G04F0.065; | Set a dwell time to the time necessary for the workpiece to rotate about one-and-a-half revolution. |

The dwell time is calculated by substituting, into Equation (46), the number of revolutions of the tool while it is in a dwell state (one and a half revolution in the present embodiment), the cut rate (135 m/min. in the present embodiment), and the diameter of the groove bottom (31 mm in the present embodiment).

t = (the number of revolutions of the tool while it is in a dwell state)/(cut rate/(60 × π × bottom diameter)) [sec.] . . . (46) = 1.5/(135,000/(60 × π × 31)) = 0.0649 [sec.]

In the present embodiment, the dwell time is 0.065 [sec.] by rounding up the calculation result.

| | |
|---|---|
| N808 G01X20.; | Return the tool head to the inside diameter of the workpiece. |
| N809 G00Z191.4; | |
| N810 G00X21.; | |
| N811 G01X34.F0.046; | |
| N812 G04F0.065; | Calculate the dwell time using the above described equation. |
| N813 G01X22.; | |
| N814 G00X19.Z211.4; | |
| N815 G28M05; | |

The preparation of the program for grooving the internal diameter of the workpiece is now completed.

Upon completion of the preparation of the program, the processing is completed in step 1108 and then proceeds to step 1109.

The preparation of a program for finishing the internal circumference of the workpiece will now be described. The preparation of a program in which the internal circumference of a workpiece is finished using the previously determined tool with tool ID No. 7, and the result of the preparation of the program will be shown below.

| Machine program | Contents, conditions for determination, and Equation |
|---|---|
| N850 G28; | Check the point of origin. |
| N851 G96; | Set peripheral normality to a constant speed. |
| N852 T000007; | Select a tool with tool ID No. 7. |
| N853 G41; | Correction of the tool diameter is carried out. |
| N854 G00Z210.4X32.213; | |
| N856 G01X31.013Z209.9F0.226; | Determine the feed rate F depending on a finishing method symbol. |

A finishing symbol on 8th step is 2L, and hence it is only required to satisfy a feed rate of less than 25 S. Equation (47) for the relationship between the roughness of the surface and the feed rate is expanded to Equation (48). A nose radius of 0.4 mm of the tool read from the tool file (FIGS. 78 to 81) is substituted into Equation (48).

$$H\text{max}=f^2/8R \quad (47)$$

$$f^2 = 8R \times H \quad (48)$$

$$= 8 \times 0.4 \times 0.025 = 0.08$$

$$f\text{max}=0.08^{0.5}=0.28284$$

$f$=0.28284×0.8=0.226272 (0.8 is an arbitrarily changeable safety factor)

The contents of a program for chamfering a surface C when the program is not provided with a tool correction function are shown below. This program is unnecessary for the present embodiment. However, if a decision as to the presence or absence of the tool correction function is made as one of the conditions to prepare the program, this program should be included in the processing procedures of the program.

*N857 G00Z210.9X32.682;* 0.5*C DIA* (the position of the diameter of the tool)

$$0.5C\,DIA = XD + 2r - 2\Delta X + \Delta D$$

$$= 32.013 + 2 \times 0.4 - 2 \times 0.16568 + 0.2$$

$$= 32.68163$$

where ΔX=r×tan 22.5=0.4×tan 22.5=0.16568.

| | |
|---|---|
| N858 G01X31.013Z210.634F226; | 0.5C Z (the position of the tool in the Z direction) 0.5C Z = Z + r − ΔZ = 210.4 + 0.4 − 0.16568 = 210.6343 ΔZ = r × tan 22.5 = 0.4 × tan 22.5 = 0.16568 |
| N859 G01Z205.4; | 8th step, Bore the workpiece |

-continued

| | |
|---|---|
| | to a diameter of 31H7. |
| N860 G01X23.825F0.09; | 7th step, Finish an end face. The feed rate at which the end face is finished is set to 1/2.5 of the feed rate. FX = FZ/2.5 = 0.226/2.5 = 0.0904 |
| N861 G02X24.125Z205.R0.4F0.226; | Chamfer the surface to 0.4R. |
| N862 G01Z190.4; | 6th step, Bore the workpiece to a diameter of 24. |
| N863 G01X22.F0.09; | 5th step, Finish the end face. |
| N864 G01Z175.4F0.226; | 4th step, Bore the workpiece to a diameter of 22. |
| N865 G01X18.011F0.09; | 3rd step, Finish the end face. |
| N866 G01X19.811Z174.5F0.226; | Chamfer surface 1C. |
| N867 G01Z160.4; | 2nd step, Bore the workpiece to a diameter of 19.811 (the diameter of the workpiece before it is finished to a diameter of 20H7 by grinding). |
| N868 G01X0.F0.09; | 1st step, Finish the end face. |
| N869 G00Z210.4; | |
| N870 G40; | |
| N871 G28M05; | |

The program for finishing the internal circumference of the workpiece is now completed. Upon completion of the preparation of the program, the processing is completed in step 1108 and then proceeds to step 1109.

Grooved cylindrical cam on 20th step

Details of the grooved cam are shown in FIGS. 44, 53, 54, 155, and 169. A groove width is 6 mm H8, and a groove depth is 5 mm.

| Machine program | Contents, conditions for determination, and Equations |
|---|---|
| N900 G28; | |
| N901 G94; | Asynchronous feeding operation. |
| N902 T000021; | Search for a tool through FIGS. 82 to 85 by using a groove width of 6 mm as a key code. By means of agreement between the code and the data of the file with respect to F and a tool diameter of 6h10, a tool with tool ID No. 2 is selected. |
| N903 S79M03; | Of the cutting conditions, a cut rate (15 m/min. in the present embodiment) is read from the cutting condition file (FIG. 130) by means of the workpiece (SCM440H in the present embodiment) and the tool material (SKH51 = S4 in the present embodiment). Then, the number of revolutions is calculated from them. |

$$S=15\times1000/(3.1416\times6)=795.8 \text{ [r.p.m.]}$$

N904 G00Z160.4X74.985C0.; Position the tool to a dimension of 72.985+2 mm to which the workpiece is finished.

| | |
|---|---|
| N905 G01X71.985F21; | A rate of 0.013 mm/tooth is read from the cutting condition file (FIG. 130). |

$$F=0.013\times2\times796=20.696 \text{ [mm/min.]}$$

The depth of cut is determined on the basis of the tool rigidity, and the number of times the workpiece is grooved is calculated. The workpiece is grooved to a predetermined depth by cyclically repeating the grooving operation.

A specific cutting force of 1,960N is read from the material file (FIG. 124) using SCM 440H as a key code. The depth of cut is then calculated from this specific cutting force using the known cutting force expression.

```
N906 G01X70.985F21;
N907 G01C90.Z140.F21;
N908 G01C180.;
N909 G01Z160.4C270.;
N910 G01C0.;
N911 G01X69.985F21;
N912 G01C90.Z140.F21;
N913 G01C180.;
N914 G01Z160.4C270;
N915 G01C0.;
N916 G01X68.985F21;
N917 G01C90.Z140.F21;
N918 G01C180.;
N919 G01Z160.4C270.;
N920 G01C0.;
N921 G01X67.985F21;
N922 G01C90.Z140.F21;
N923 G01C180.;
N924 G01Z160.4C270.;
N925 G01C0.;
N926 G01X66.985F21;
N927 G01C90.Z140.4F21;
N928 G01C180.;
N929 G01Z160.4C270.;
N930 G01C0.;
N931 G01X65.985F21;
N932 G01C90.Z140.4F21;
N933 G01C180.;
N934 G01Z1604C270.;
N935 G01C0.;
N936 G01X64.985F21;
N937 G01C90.Z140.4F21;
N938 G01C180.,
N939 G01Z160.4C270.;
N940 G01C0.;
N941 G01X63.985F21;
N942 G01C90.Z140.4F21;
N943 G01C180.;
N944 G01Z160.4C270.;
N945 G01C0.;
N946 G01X62.985F21;
N947 G01C90.Z140.4F21;
N948 G01C180.;
N949 G01Z160.4C270.,
N950 G01C0.;
N951 G01Z160.396;
N952 G01X62.985F21;
N953 G01C90.Z140.4F21;
N954 G01C180.;
N955 G01Z160.4C270.;
N956 G01C0.;
N957 G01Z160.404;
N958 G01X62.985F21;
N959 G01C90.Z140.4F21;
N960 G01C180.;
N961 G01Z160.4C270.;
N962 G01C0.;
N963 G01Z160.4;
N964 G00X74.985;
N965 G28M05;
```

Upon completion of the preparation of the program for grooving the cylinder, the processing is completed in step 1108 and then proceeds to step 1109.

End cam on 15th step

Numerical values are calculated from entries (shown in FIG. 154) for an end cam shown in FIGS. 44, 50, and 51, and a machine program is prepared using the thus obtained numerical values.

| Machine program | Contents, conditions for determination, and Equations |
|---|---|
| N1000 G28; | |
| N1001 G94; | Asynchronous feeding operation. |
| N1002 T000017; | Search for a tool through FIGS. 82 to 85 |

-continued

| Machine program | Contents, conditions for determination, and Equations |
|---|---|
| | using an end face width of (69 − 53)/2 = 8 mm and a diameter of the drawing as key codes. However, since the present embodiment is not provided with an entry for the radius of the drawing, an alarm is sounded. Then, a tool which has the maximum machining volume, F, a maximum tool diameter of 16h10, and tool ID No. 17 is selected. |
| N1003 S1154M03; | Since the tool material: M20 and the workpiece material SCM 440H, a cut rate of 58 m/min is read from the cutting condition file (FIG. 130). A feed rate which corresponds to 16 mm is calculated by complementing feed rates of 0.025/10 mm, 0.038/12 mm, and 0.075/18 mm read from the tool file. |

Then, the number of revolutions is calculated from them.

$$S=58\times1000/(3.1416\times16)=1153.87\ [\text{r.p.m.}]$$

| | |
|---|---|
| N1004 G00Z210.4X115.; | |
| N1005 G41D1; | Start tool diameter correction. |
| N1006 G00Z185.6X53.4; | |
| N1007 G01Z185.5X53.F154; | Calculate a feed rate. The feed rate is complemented on the assumption that it is proportional to the square of the diameter. |

$$0.025\times16^2/10^2=0.064$$

$$0.038\times16^2/12^2=0.0676$$

From these results, a tool having a feed rate of 0.067 mm/tooth is adopted.

$$F=0.067\times2\times1154=154.636\ [\text{mm/min.}]$$

| | |
|---|---|
| N1008 G01C90.F154; | |
| N1009 G01C180.Z180.5F154; | Calculate a feed rate. |
| N1010 G01C270F154; | |
| N1011 G01C360.Z185.5F154; | |
| N1012 G00Z210.4X115.; | |
| N1013 G28M05; | |
| N1015 T000100; | Replace a measuring tool with another tool. |
| N1016 #101 = 0; | Macroscopic initial changes |
| N1017 #102 = 0; | |
| N1018 #103 = 0; | |
| N1019 #104 = 0; | |
| N1020 #503 = 0; | |
| N1021 #1 = 0; | |
| N1022 #2 = 0; | |
| N1023 #3 = 0; | |
| N1024 #4 = 0; | |
| N1025 #5 = 0; | |
| N1026 #6 = 0; | |
| N1027 #7 = 0; | |
| N1028 G28$G100*; | Calibrate a measuring head. |
| N1029 G00X115.Z215.4C10.; | Move the tool to the reference point for the machining operation. |
| N1030 G00Z186.4X55.4; | Move the measuring tool to the first measurement point. |
| N1031 G31Z184.4F150; | Measurement (1) 185.2 mm |
| N1032 #101 = #5063; | Store the result of the measurement to 101. |
| N1033 G00Z186.4X67.; | Move the measuring tool to the second measurement point. |
| N1034 G31Z184.4F150; | Measurement (2) 185.2 mm |
| N1035 #102 = #5063; | Store the result of the measurement to 102. |
| N1036 #1 = #101 + #102; | Calculate the cam rise of a cam surface at an angle of 10°. |
| N1037 #2 = #1/2; | |
| N1038 G00C186.4; | Move the measuring tool to the third measurement point. |
| N1039 G00C80.; | Move the measuring tool to the reference point for a machining operation. |
| N1040 G31Z184.4; | Measurement (3) − 185.2 mm |
| N1041 #103 = #5063; | Store the measurement result to 103. |
| N1042 G00Z186.4X55.4; | Move the measuring tool to the second measurement point. |
| N1043 G31Z184.4F150; | Measurement (4) − 185.2 mm |
| N1044 #104 = #5063; | Store the measurement result to 104. |
| N1045 #3 = #103 = #104; | Calculate the cam rise of a cam surface at an angle of 80°. |
| N1046 #4 = #3/2; | |
| N1047 #5 = #2 + #4; | Calculate the sum of the cam rises. |
| N1048 #6 = #5/2; | Calculate a mean cam rise. |
| N1049 #7 = 185.2 − #6; | Calculate a difference between the mean cam rise and the specified value. |
| N1050 G00X115.Z215.4; | Move the tool head to the reference point of the machining operation. |
| N1051 G28; | Return the tool head to the point of origin. |
| N1052 #4107 = #4107 − #7; | Rewrite a tool diameter correction. |
| N1055 T000017; | Finishing cycle |
| N1056 S1154M03; | |
| N1057 G00Z210.4X115; | |
| N1058 G41D1; | Start the correction of a tool diameter. |
| N1059 G00Z185.6X53.4; | |
| N1060 G01Z185.4X53.F154; | |
| N1061 G01C90.F154;°. | |
| N1062 G01C180.Z180.4F154; | |
| N1063 G01C279F154; | |
| N1064 G01C360.Z185.4F154; | |
| N1065 G40D1; | Terminate the tool diameter correction. |
| N1066 G00X115.7Z210.4; | |
| N1067 G28M05; | |

Upon completion of the preparation of the program for machining the end cam, the processing is completed in step 1108 and then proceeds to step 1109.

Internal cam on 4th step

Numerical values are calculated from entries (shown in FIG. 153) for an internal cam shown in FIGS. 44 and 48 and the finally finished shape (FIG. 168), and a machine program is prepared using the thus obtained numerical values.

| Machine program | Contents, conditions for determination, and Equations |
|---|---|
| N1100 G28; | |
| N1101 G94; | Asynchronous feeding operation. |
| N1102 T000017; | Search for a tool, through FIGS. 82 to 85, which satisfies conditions, that is, a bore = a maximum tool diameter of more than 20 mm, a cam width = a cutting edge width of more than 10 mm, and the maximum depth from the end face = a nominal length of 30 mm. Then, a tool which has the maximum machining volume, F, a maximum tool diameter of 16h10, a nominal length of 30 mm, and tool ID No. 17 is selected. |
| N1103 G00A-90.; | |
| N1104 S1154M03; | Since the tool material: M20 and the workpiece material SCM 440H, a cut rate of 58 m/min is read from the cutting condition file (FIG. 130). A feed rate which corresponds to 16 mm is calculated by complementing feed rates of 0.025/10 mm, 0.038/12 mm, and 0.075/18 mm read from the tool file. |

Then, the number of revolutions is calculated from them.

$$S=58\times1000/(3.1416\times16)=1153.87\ [\text{r.p.m.}]$$

| | |
|---|---|
| N1005 G00Z210.4X0.; | |
| N1106 G41D1; | Start tool diameter correction. |
| N1107 G00Z190.4X10.9; | |
| N1108 G01Z178.4F154; | Calculate a feed rate. The feed rate is complemented on the assumption that it is proportional to the square of the diameter. |

$$0.025\times16^2/10^2=0.064$$

$$0.038\times16^2/12^2=0.0676$$

From these results, a tool having a feed rate of 0.067 mm/tooth is adopted.

$$F=0.067\times2\times1154=154.636\ [\text{mm/min.}]$$

| | |
|---|---|
| N1109 G01X18.9C180.F154; | |
| N1110 G01X10.9C0.; | |
| N1111 G01X10.9C0.; | Machine the workpiece so that overlap at an angle of 5° is ensured between the machined areas. |
| N1112 G40D1; | |
| N1113 G00X0.C0; | |
| N1114 G00Z210.4; | |
| N1115 G28M05; | |
| N1116 G00A0.; | |
| N1120 T000100; | Replace a measuring tool with another tool. |
| N1121 #101 = 0; | Macroscopic initial changes |
| N1122 #102 = 0; | |
| N1123 #103 = 0; | |
| N1124 #104 = 0; | |
| N1125 #5061 = 0; | |
| N1126 #1 = 0; | |
| N1127 #2 = 0; | |
| N1128 #3 = 0; | |
| N1129 #4 = 0; | |
| N1130 #5 = 0; | |
| N1131 #6 = 0; | |
| N1132 #7 = 0; | |
| N1133 G00A-90.; | Rotate the head through 90° in a counterclockwise direction, and align the measurement axis to the tool axis. |
| N1134 G28$G100*; | Caiibrate a measuring head. |
| N1135 G00X0.Z215.4; | Move the tool to the reference point for the machining operation. |
| N1136 G00Z182.4X20.8; | Move the measuring tool to the first measurement point. |
| N1137 G31X19.8F150; | Measurement (1) 21.8 mm |
| N1138 #101 = #5061; | Store the result of the measurement to 101. |
| N1139 G00Z188.4X20.8; | Move the measuring tool to the second measurement point. |
| N1140 G31X19.8F150; | Measurement (2) 21.8 mm |
| N1141 #102 = #5061; | Store the result of the measurement to 102. |
| N1142 #1 = #101 + #102; | Calculate the cam rise of a first cam surface. |
| N1143 #2 = #1/2; | |
| N1144 G00X − 28.8; | Move the measuring tool to the third measurement point. |
| N1145 G31X − 31.8F150; | Measurement (3) − 29.8 mm |
| N1146 #103 = #5061; | Store the measurement result to 103. |
| N1147 G00Z182.4X − 28.8; | Move the measuring tool to the fourth measurement point. |
| N1148 G31X − 31.8F150; | Measurement (4) − 29.8 mm |
| N1149 #104 = #5061; | Store the measurement result to 104. |
| N1150 #3 = #103 = #104; | Calculate the cam rise of a second cam surface. |
| N1151 #4 = #3/2; | |
| N1152 #5 = #2 + #4; | Calculate the sum of the cam rises. |
| N1153 #6 = 10.9 + 18.9; | Calculate a specified value. |
| N1154 #7 = #6 − #5; | Calculate a difference between the sum of the cam rises and the specified value. |

-continued

| | |
|---|---|
| N1155 G00X0; | Move the tool head to the reference point of the machining operation. |
| N1156 G00Z215.4; | Move the tool head to the reference point of the machining operation. |
| N1157 G28; | Return the tool head to the point of origin. |
| N1158 G00A0.; | Rotate the head to 0° so as to return to its point of origin. |
| N1159 #4107 = #4107 − #7; | Rewrite a tool diameter correction. |
| N1160 T000017; | Finishing operation |
| N1161 G00A-90; | |
| N1162 S1154M03; | |
| N1163 G00Z210.4X0.0; | |
| N1164 G41D1; | Start the correction of a tool diameter. |
| N1165 G00Z190.4X10.9C − 5.; | Machine the workpiece so that overlap at an angle of 5° is ensured between the machined areas. |
| N1166 G01Z178.4F154; | |
| N1167 G01X11.006C0.F154; | |
| N1168 G01X19.007C180.F154; | |
| N1169 G01X11.006C0.; | |
| N1170 G01X11.228C5.; | Machine the workpiece so that overlap at an angle of 5° is ensured between the machined areas. |
| N1171 G40D1; | |
| N1172 G00X0.C0.; | |
| N1173 G00Z210.4; | |
| N1174 G28M05; | |
| N1175 G00A0.; | |

Upon completion of the preparation of the program for machining the internal cam, the processing is completed in step 1108 and then proceeds to step 1109.

Polygon formed around the outer circumference between 11th and 12th steps

Numerical values are calculated from entries (shown in FIG. 158) for a polygon shown in FIGS. 44, 45, 46, and 47 and the finally finished shape (FIG. 171), and a machine program for the polygon is prepared using the thus obtained numerical values.

| Machine program | Contents, conditions for determination, and Equations |
|---|---|
| N1200 G28; | |
| N1201 G94; | Asynchronous feeding operation. |
| N1202 T000017; | Search for the maximum end mill, through FIGS. 82 to 85, which satisfies condtions, i.e., a plane width of 10 mm. Then, a tool which has the maximum machining volume, F, a maximum tool diameter of 16h10, a nominal length of 33 mm, and tool ID No. 17 is selected. |
| N1203 S1154M03; | Since the tool material: M20 and the workpiece material SCM 440H, a cut rate of 58 m/min is read from the cutting condition file (FIG. 130). A feed rate which corresponds to 16 mm is calculated by complementing feed rates of 0.025/10 mm, 0.038/12 mm, and 0.075/18 mm read from the tool file. |

Then, the number of revolutions is calculated from them.

$$S=58\times1000/(3.1416\times16)=1153.87\ [\text{r.p.m.}]$$

| | |
|---|---|
| N1204 G00Z210.4X115.; | |
| N1205 G41D1; | Start tool diameter correction. |
| N1206 G00Z195.4X50.15Y9.123; | Y = (52.57/2) tan 18 + 1 = 8.123 + 1 = 9.123 |
| N1207 G01Y-25.123F154; | Calculate a feed rate. The feed rate is complemented on the assumption that it is proportional to the square of the diameter. Designated plane |

-continued

| | |
|---|---|
| | roughness: 2M |

$$0.025\times16^2/10^2=0.064$$

$$0.038\times16^2/12^2=0.0676$$

From these results, a tool having a feed rate of 0.067 mm/tooth is adopted.

$$F=0.067\times2\times1154=154.636\text{ [mm/min.]}$$

| | |
|---|---|
| N1208 G00Z206.4; | Second plane |
| N1209 G00Y9.123C36. | |
| N1210 G00Z195.4; | |
| N1211 G01Y − 25.123F154; | |
| N1212 G00Z206.3;. | Third plane |
| N1213 G00Y9.123C72.; | |
| N1214 G00Z195.4; | |
| N1215 G01Y − 25.123F154; | |
| N1216 G00Z206.4; | Fourth plane |
| N1217 G00Y9.123C106.; | |
| N1218 G00Z195.4; | |
| N1219 G01Y − 25.123F154.; | |
| N1220 G00Z206.4; | Fifth plane |
| N1221 G00Y9.123C144.; | |
| N1222 G00Z195.4; | |
| N1223 G01Y − 25.123F154; | |
| N1224 G00Z206.4; | Sixth plane |
| N1225 G00Y9.123C180.; | |
| N1226 G00Z195.4; | |
| N1227 G01Y − 25.123F154; | |
| N1228 G00Z206.4; | Seventh plane |
| N1229 G00Y9.123C216.; | |
| N1230 G00Z19S.4; | |
| N1231 G01Y − 25.123F154; | |
| N1232 G00Z206.4; | Eighth plane |
| N1233 G00Y9.123C252.; | |
| N1234 G00Z195.4; | |
| N1235 G01Y − 25.123F154; | |
| N1236 G00Z206.4; | Ninth plane |
| N1237 G00Y9.123C288.; | |
| N1238 G00Z195.4; | |
| N1239 G01Y − 25.123F154; | |
| N1240 G00Z206.4; | Tenth plane |
| N1241 G00Y9.123C324.; | |
| N1242 G00Z195.4; | |
| N1243 G01Y − 25.123F154.; | |
| N1244 G00Z206.4; | |
| N1245 G00C360.; | |
| N1246 G00Y0.; | |
| N1247 G40D1; | Terminate the tool diameter correction. |
| N1248 G00Z210.4X115.; | |
| N1249 G28M05; | |
| N1250 T000100; | Replace a measuring tool with another tool. |
| N1251 #101 = 0; | Macroscopic initial changes |
| N1252 #102 = 0; | |
| N1253 #103 = 0; | |
| N1254 #104 = 0; | |
| N1255 #105 = 0; | |
| N1256 #106 = 0; | |
| N1257 #107 = 0; | |
| N1258 #108 = 0; | |
| N1259 #5061 = 0; | |
| N1260 #1 = 0; | |
| N1261 #2 = 0; | |
| N1262 #3 = 0; | |
| N1263 #4 = 0; | |
| N1264 #5 = 0; | |
| N1265 #6 = 0; | |
| N1266 #7 = 0; | |
| N1267 #8 = 0; | |
| N1268 #9 = 0; | |
| N1269 #10 = 0; | |
| N1270 #11 = 0; | |

-continued

| | |
|---|---|
| N1271 G00A − 90.; | Rotate the head through 90° in a counterclockwise direction, and align the measurement axis to the tool axis. |
| N1272 G28$G100*; | Calibrate a measuring head. |
| N1273 G00X115.Z210.4; | Move the tool to the reference point for the machining operation. |
| N1274 G00Z197.4X51.2Y7.; | Move the measuring tool to the first measurement point in the first plane. |
| N1275 G31X49.F150; | Measurement (1) |
| N1276 #101 = #5061; | Store the result of the measurement to 101. |
| N1277 G00X51.2Y − 7.; | Move the measuring tool to the second measurement point in the first plane. |
| N1278 G31X49.F150; | Measurement (2) |
| N1279 #102 = #5061; | Store the result of the measurement to 102. |
| N1280 G00Z203.4X51.2; | Move the measuring tool to the third measurement point in the first plane. |
| N1281 G31X49.F150; | Measurement (3) |
| N1282 #103 = #5061; | Store the measurement result to 103. |
| N1283 G00X51.2Y7.; | Move the measuring tool to the fourth measurement point in the first plane. |
| N1284 G31X49.F150; | Measurement (4) |
| N1285 #104 = #5061; | Store the measurement result to 104. |
| N1286 #1 = #101 = #102; | Calculate the cam rise of a first cam surface. |
| N1287 #2 = #103+#104; | |
| N1288 #3 = #1 + #2; | |
| N1290 #4 = #3/4; | |
| N1291 G00X51.2Z215.4; | Move the measuring tool to the reference point of the measurement. |
| N1292 G00X − 51.2Y7.; | Move the measuring tool to the first measurement point in the second plane. |
| N1293 G00X197.4; | |
| N1294 G31X − 49.F150; | Measurement (5) |
| N4295 #105 = #5061; | Store the result of the measurement to 105. |
| N1296 G00X − 51.2Y − 7.; | Move the measuring tool to the second measurement point in the second plane. |
| N1297 G31X − 49.F150; | Measurement (6) |
| N1298 #106 = #5061; | Store the result of the measurement to 106. |
| N1299 G00Z203.4X − 51.2; | Move the measuring tool to the third measurement point in the second plane. |
| N1300 G31X − 49.F150; | Measurement (7) |
| N1301 #107 = #5061; | Store the result of the measurement to 107. |
| N1302 G00X − 51.2Y7.; | Move the measuring tool to the fourth measurement point in the second plane. |
| N1303 G31X − 49.F150; | Measurement (8) |
| N1304 #108 − #5061; | Store the result of the measurement to 108. |
| N1305 #5 = #105 + #106; | Calculate the height of the second plane. |
| N1306 #6 = #107 + #108; | |
| N1307 #7 = #5 + #6; | |
| N1308 #8 = #7/4; | |
| N1309 #9 = #7 − #8; | Calculate the width of the polygon from the results of the calculation. |
| N1310 #10 = 24.975 * 2; | Calculate a specified value. |
| N1311 #11 = #10 − #9; | Calculate a difference between the polygon width and the specified value. |
| N1312 G00X − 51.2Z215.4; | Move the tool head to the reference point of the measurement. |
| N1313 G00X115.; | Move the tool head to the reference point of the machining operation. |
| N1314 G00Z210.4; | Move the tool head to the reference point of the machining operation. |
| N1315 G28; | Return the tool head to the point of |

-continued

| | |
|---|---|
| | origin. |
| N1316 G00A0.; | Rotate the head to 0° so as to return to its point of origin. |
| N1317 #4107 = #4107 − #11; | Rewrite a tool diameter correction. |
| N1320 T000017; | Finishing operation |
| N1321 S1154M03; | |
| N1322 G00Z210.4X115.; | |
| N1323 G41D1; | Start the correction of a tool diameter. |
| N1324 G00Z195.4X24.975Y9.123; | First plane |
| N1325 G01Y − 25.123F154.; | |
| N1326 G00Z206.4; | Second plane |
| N1327 G00Y9.123C36.; | |
| N1328 G00Z195.4; | |
| N1329 G01Y − 25.123F154; | |
| N1330 G00Z206.4; | Third plane |
| N1331 G00Y9.123C72., | |
| N1332 G00Z195.4; | |
| N1333 G01Y − 25.123F154; | |
| N1334 G00Z206.4; | Fourth plane |
| N1335 G00Y9.123C106.; | |
| N1336 G0OZ195.4; | |
| N1337 G01Y − 25.123F154.; | |
| N1338 G00Z206.4; | Fifth plane |
| N1339 G00Y9.123C144.; | |
| N1340 G00Z195.4; | |
| N1341 G01Y − 25.123F154; | |
| N1342 G00Z206.4; | Sixth plane |
| N1343 G00Y9.123C180.; | |
| N1344 G00Z195.4; | |
| N1345 G01Y − 25.123F154; | |
| N1346 G00Z206.4; | Seventh plane |
| N1347 G00Y9.123C216.; | |
| N1348 G00Z195.4; | |
| N1349 G01Y − 25.123F154; | |
| N1350 G00Z206.4; | Eighth plane |
| N1351 G00Y9.123C252.; | |
| N1352 G00Z195.4; | |
| N1353 G01Y − 25.123F154; | |
| N1354 G00Z206.4; | Ninth plane |
| N1355 G00Y9.123C288.; | |
| N1356 G00Z195.4; | |
| N1357 G01Y − 25.123F154; | |
| N1358 G00Z206.4; | Tenth plane |
| N1359 G00Y9.123C324.; | |
| N1360 G00Z195.4; | |
| N1361 G01Y − 25.123F154.; | |
| N1362 G00Z206.4; | |
| N1363 G00C0.; | |
| N1364 G00Y0.; | |
| N1365 G40D1; | Terminate the tool diameter correction. |
| N1366 G00Z210.4X115.; | |
| N1367 G28M05; | |

Upon completion of the preparation of the program for machining the outer circumference to polygon, the processing is completed in step 1108 and then proceeds to step 1109. Keyslot extending from 8th step to 10th step Numerical values, that is, a keyslot width of 8.011 mm, finishing symbol 2M, a depth of 4.05 mm, and a cutter diameter of 7.5 mm, are calculated from entries (shown in FIG. 150) for a keyslot shown in FIGS. 44 and 45 and the finally finished shape (FIG. 166), and a machine program for the keyslot is prepared using the thus obtained numerical values.

| Machine program | Contents, conditions for determination, and Equations |
|---|---|
| N1400 G28; | |
| N1401 G94; | Asynchronous feeding operation. |
| N1402 T000017; | Search for an end mill, through FIGS. 82 to 85, which satisfies condtions, i.e., a cutter diameter of 7.5 mm and a depth of 4.05 mm. Then, |

-continued

| Machine program | Contents, conditions for determination, and Equations |
|---|---|
| | a tool which has F, a tool diameter of 6h10, a nominal length of 8 mm, and tool ID No. 21 is selected. |
| N1403 G00A − 90.; | Put a tool head in readiness for grooving an end face by rotating it through 90°. |
| N1404 S796M03; | Since the tool material: SKH51 and the workpiece material SCM 440H, a cut rate of 15 m/min is read from the cutting condition file (FIG. 130). A feed rate which corresponds to 6 mm is calculated by complementing feed rates of 0.013/10 mm and 0.025/12 mm read from the tool file. |

Then, the number of revolutions is calculated from them.

$$S=15\times1000/(3.14159\times6)=795.775\ [\text{r.p.m.}]$$

| | |
|---|---|
| N1405 G00Z210.4X115.; | |
| N1406 G00Z206.35X62.Y0.; | |
| N1407 G01X18.F3.7; | Calculate a feed rate. The feed rate is complemented on the assumption that it is proportional to the diameter to the fourth power. Designated plane roughness: 2M |

$$0.013\times16^4/10^4=0.0016$$

$$0.038\times16^4/12^4=0.0023$$

From these results, a tool having a feed rate of 0.0023 mm/tooth is adopted.

$$F=0.0023\times2\times796=3.7\ [\text{mm/min.}]$$

| | |
|---|---|
| N1408 G00X − 18.; | |
| N1409 G01X − 62.; | |
| N1410 G0Y0.9; | Extend the groove width by a width which corresponds to a deficiency of width {(8 − 6)/2} − 0.1 = 0.9 |
| N1411 G01X − 18.; | |
| N1412 G00X18.; | |
| N1413 G01X62.; | |
| N1414 G01Y − 0.9; | Extend the groove width by a width which corresponds to a deficiency of width {(8 − 6)/2} − 0.1 = 0.9 |
| N1415 G01X18.; | |
| N1416 G00X − 18.; | |
| N1417 G01X − 62.; | |
| N1418 G00Z210.4; | |
| M1419 G00X115.; | |
| N1420 G00A0.; | |
| N1321 G28M05; | |
| N1430 T000100; | Replace a measuring tool with another tool. |
| N1431 #101 = 0; | Initialize macroscopic changes. |
| N1432 #102 = 0; | |
| N1433 #103 = 0; | |
| N1434 #104 = 0; | |
| N1435 #5062 = 0; | |
| N1436 #1 = 0; | |
| N1437 #2 = 0; | |
| N1438 #3 = 0; | |
| N1439 #4 = 0; | |
| N1440 #5 = 0; | |
| N1441 G00A − 90.; | Rotate the head through 90° in a counterclockwise direction, and align the measurement axis to the tool axis. |
| N1442 G28$G100*; | Calibrate a measuring head. |
| N1443 G00X11S.Z210.4; | Move the tool to the reference point for the machining operation. |

-continued

| | |
|---|---|
| N1444 G00Z208.35X47.Y0.; | Move the measuring tool to the first measurement point. |
| N1445 G31Y6.F150; | Measurement (3.9 mm) |
| N1446 #101 = #5062; | Store the result of the measurement to 101. |
| N1447 G31Y − 6.F150; | Measurement (−3.9 mm) |
| N1448 #102 = #5062; | Store the result of the measurement to 102. |
| N1449 #1 = #101 − #102; | Calculate the groove width from the measurement results. |
| N1450 G00X33.Y0.; | Move the measuring tool to the second measurement point. |
| N1451 G31Y6.F150; | Measurement (3.9 mm) |
| N1452 #103 = #5062; | Store the result of the measurement to 103. |
| N1453 G31Y − 6.F150; | Measurement (−3.9 mm) |
| N1454 #104 = #5062; | Store the result of the measurement to 104. |
| N1455 #2 = #103 − #104; | Calculate the groove width from the measurement results. |
| N1456 #3 = #1 + #2; | Calculate a mean value between the results of the first and second measurement points. |
| N1457 #4 = #3/2; | |
| N1458 #5 = 7.811 − #4; | Calculate a difference between the mean value and the specified value. |
| N1459 G00Z210.4X115.; | Move the tool head to the reference point of the machining operation. |
| N1460 G28; | Return the tool head to the point of origin. |
| N1461 G00A0.; | Rotate the head to 0° so as to return to its point of origin. |
| N1462 #4107 = #4107 − #5; | Rewrite a tool diameter correction. |
| N1463 G28; | |
| N1464 T000021; | |
| N1465 G00A − 90.; | |
| N1466 S79M03;. | |
| N1467 G00Z210.4X115.; | |
| N1468 G00Z206.35X62.Y1.005; | |
| N1469 G01X17.F15; | |
| N1470 G00X − 18.; | |
| N1471 G01X − 62.; | |
| N1472 G01Y − 1.005; | |
| N1473 G01X − 18.; | |
| N1474 G00X18.; | |
| N1475 G01X62.; | |
| N1476 G00Z210.4; | |
| N1477 G00X115.; | |
| N1478 G28M05; | |
| N1479 G00A0.; | |

Upon completion of the preparation of the program for grooving the keyslot, the processing is completed in step 1108 and then proceeds to step 1109.

Tap on 9th step

A set of entries, i.e., type: M, a rotating angle with respect to the reference position; −45°, the number of steps of a tapped hole: 5, hole pitch: 0.8, the number of holes: 4, position: 40.PCD, spacing of the hole: C, the reference hole: 1, a spacing angle: −90°, the shape of a tap: S, a distinction between counterbore/countersink: S, diameter: 5.2, a countersinking angle: 90°, depth: 7.-S, a pre-formed hole diameter: 4.2, depth: 10.5, and another set of entries, i.e., type: M, a rotating angle with respect to the reference position; 0, bore: 5., a hole pitch: 0.8, the number of holes: 2, position: 40.PCD, spacing of the hole: C, the reference hole: 1, a spacing angle: −180°, tap shape: S, a distinction between counterbore/countersink: S, diameter: 5.2, a countersinking angle: 90°, depth: 7.-S, a pre-formed hole diameter: 4.2, depth: 10.5, are read from FIGS. 45, 152, and the finally finished shape pattern shown in FIG. 167. A machine program is prepared using these data items.

| Machine program | Contents, conditions for determination, and Equations |
|---|---|
| N1500 G28; | |
| N1501 G94; | Asynchronous feeding operation. |
| N1502 T000015; | Search for a drill for boring a pre-formed hole, through FIGS. 82 to 85, which satisfies condtions, i.e., the bore of a pre-formed hole: 4.2 mm and a depth of 10.5 mm. Then, a tool which has D, a tool diameter of 4.2 mm, a nominal length of 54 mm, and tool ID No. 15 is selected. |
| N1503 G00A − 90.; | Put a tool head in readiness for boring an end face by rotating it through 90°. |
| N1504 S1061M03; | Since the tool material: SKH51 and the workpiece material SCM 440H, a cut rate of 14 m/min is read from the cutting condition file (FIG. 131). A feed rate which corresponds to 4.8 mm is calculated by complementing feed rates of 0.05/3 mm and 0.10/6 mm read from the tool file. |

Then, the number of revolutions is calculated from them.

$$S=14\times1000/(3.14159\times4.2)=1061.034\ [\text{r.p.m.}]$$

| | |
|---|---|
| N1505 G00X40.Z215.4; | |
| N1506 G00Z207.4; | |
| N1507 G73Z194.688R211.4Q2.F74.3P150; | Calculate the depth of a bore; 10.5 + (4.2/2) × tan30 = 11.712 210.4 − 11.712 − 4 = 194.688 |

A feed rate is calculated. The feed rate is complemented on the assumption that it is proportional to the diameter to the fourth power.

$$0.05\times4.2/3=0.07$$

$$0.10\times4.2/6=0.07$$

From these results, a drill having a cut rate of 0.07 mm/rev. is adopted.

$$F=0.07\times1061=74.27\ [\text{mm/min.}]$$

| | |
|---|---|
| N1508 G00Z215.4C45.; | |
| N1509 G00Z211.4 | |
| N1510 G73Z198.688R211.4Q2F74.3P150; | Calculate the depth of a bore; 10.5 + (4.2/2) × tan30 = 11.712 210.4 − 11.712 = 198.688 |
| N1511 G00Z215.4C135.; | |
| N1512 G00Z211.4 | |
| N1513 G73Z198.688R211.4Q2F74.3P150; | |
| N1514 G00Z215.4C180.; | |
| N1515 G00Z207.4; | |
| N1516 G73Z194.688R211.4Q2F74.3P150; | Calculate the depth of a bore; 10.5 + (4.2/2) × tan30 = 11.712 210.4 − 11.712 − 4 = 194.688 |
| N1517 G00Z215.4C225.; | |
| N1518 G00Z211.4 | |
| N1519 G73Z198.688R211.4Q2F74.3P150; | Calculate the depth of a bore; 10.5 + (4.2/2) × tan30 = 11.712 210.4 − 11.712 − 4 = 194.688 |
| N1520 G00Z215.4C135.; | |
| N1521 G00Z211.4; | |
| N1522 G73Z198.688R211.4Q2F74.3P150; | |
| N1523 G00Z215.4; | |
| N1524 G28M05; | |

-continued

| | |
|---|---|
| N1526 T000016; | Search for a drill for boring a preformed hole, through FIGS. 82 to 85, which satisfies condtions, i.e., tap: M5 and a depth of 7. mm. Then, a tool which has T, a tool diameter of 5 mm, a nominal length of 18 mm, and tool ID No. 16 is selected. |
| N1526 G00A − 90.; | Put a tool head in readiness for boring an end face by rotating it through 90°. |
| N1527 S509M03; | Since the tool material: SKH51 and the workpiece material SCM 440H, a cut rate of 8 m/min is read from the cutting condition file (FIG. 132). |

Then, the number of revolutions is calculated from them.

$$S=8\times1000/(3.14159\times5)=509.296\ [\text{r.p.m.}]$$

| | |
|---|---|
| N1528 G00X40.Z215.4; | |
| N1529 G00Z207.4; | |
| N1530 G83Z199.4R211.4F0.8P150; | Calculate the depth of a bore; 210.4 − 7 − 4 = 119.4 The feed rate that has already been calculated in the previous sequence is used as it is. |
| N1531 G00Z215.4C45.; | |
| N1532 G00Z211.4 | |
| N1533 G84Z203.4R211.4F0.8P150; | Calculate the depth of a bore; 210.4 − 7 = 203.4 |
| N1534 G00Z215.4C135.; | |
| N1535 G00Z211.4 | |
| N1536 G84Z203.4R211.4F0.8P150; | Calculate the depth of a bore; 210.4 − 7 = 203.4 |
| N1537 G00Z215.4C180.; | |
| N1538 G00Z207.4; | |
| N1539 G84Z199.4R211.4F0.8P150; | Calculate the depth of a bore; 210.4 − 7 − 4 = 199.4 |
| N1540 G00Z215.4C225.; | |
| N1541 G00Z211.4; | |
| N1542 G84Z203.4R211.4F0.8P150; | Calculate the depth of a bore; 210.4 − 7 = 203.4 |
| N1543 G00Z21S.4C315.; | |
| N1544 G00Z211.4; | |
| N1545 G84Z203.4R211.4F0.8P150; | Calculate the depth of a bore; 210.4 − 7 = 203.4 |
| N1546 G00Z215.4; | |
| N1547 G28M05; | |

Upon completion of the preparation of the tapping program, the processing is completed in step 1108 and then proceeds to step 1109.

Reamed hole on 9th step

Type: DR, a rotating angle with respect to the reference position; −90°, the number of steps of a tapped hole: 1, diameter: 5.009, a finishing symbol: 3DR, a distinction between counterbore/countersink: S, a diameter: 6., a countersinking angle: 90°, a depth: D-5., and the number of holes/position: 1–40.PCD are read from FIGS. 45, 151, and the finally finished shape pattern shown in FIG. 167. A machine program is prepared using these data items.

| Machine program | Contents, conditions for determination, and Equations |
|---|---|
| N1548; | |
| N1549 G28; | |
| N1550 G94; | Asynchronous feeding operation. |
| N1551 T000013; | Search for a drill for boring a preformed hole, through FIGS. 82 to 85, which satisfies condtions, i.e., the bore of a reamed hole: 5.009 mm and a depth of 5. mm. Then, a tool which has D, a tool diameter of 4.8 mm, a nominal length of 59 mm, and tool ID No. 13 is selected. |
| N1552 G00A − 90.; | Put a tool head in readiness for boring an end face by rotating it through 90°. |
| N1553 S928M03; | Since the tool material: SKH51 and the workpiece material SCM 440H, a cut rate of 14 m/min is read from the cutting condition file (FIG. 131). A feed rate which corresponds to 4.8 mm is calculated by complementing feed rates of 0.05/3 mm and 0.10/6 mm read from the tool file. |

Then, the number of revolutions is calculated from them.

$$S=14\times1000/(3.14159\times4.8)=928.404\ [\text{r.p.m.}]$$

| | |
|---|---|
| N1554 G00X40.Z215.4C90.; | |
| N1555 G73Z203.014R212.4Q2.F74.2P150; | Calculate the depth of a bore; 5 + (4.8/2) × tan30 + 1 = 7.38564 210.4 − 7.386 = 203.014 |

A feed rate is calculated. The feed rate is complemented on the assumption that it is proportional to the diameter.

$$0.05\times4.8/3=0.0799$$

$$0.10\times4.8/6=0.08$$

From these results, a drill having a cut rate of 0.08 mm/rev. is adopted.

$$F=0.08\times928=74.24\ [\text{mm/min.}]$$

| | |
|---|---|
| N1556 G00Z215.4; | |
| N1557 G00Z211.4 | |
| N1558 G00A0.; | |
| N1560 T000014; | Search for a drill for boring a preformed hole, through Figs. 82 to 85, which satisfies condtions, i.e., the bore of a reamed hole: 5.009 mm and a depth of 5. mm. Then, a tool which has R, a tool diameter of 5. mm, a nominal length of 23. mm, and tool ID No. 14 is selected. |
| N1561 G00A-90.; | Put a tool head in readiness for boring an end face by rotating it through 90°. |
| N1562 S928M03; | Since the tool material: SKH51 and the workpiece material SCM 440H, a cut rate of 8 m/min is read from the cutting condition file (Fig. 133). A feed rate which corresponds to 5 mm is calculated by complementing feed rates of 0.075/3 mm and 0.15/6 mm read from the tool file. |

Then, the number of revolutions is calculated from them.

$$S=8\times1000/(3.14159\times5)=509.296\ [\text{r.p.m.}]$$

N1563 G00X40.Z215.4C90.;
N1564 G01Z204.4F63.6;

-continued

| | |
|---|---|
| | Calculate the depth of a bore; 5 + 1 = 6 210.4 − 6 = 204.4 |

A feed rate is calculated. The feed rate is complemented on the assumption that it is proportional to the diameter.

$$0.075\times5/3=0.125$$

$$0.15\times5/6=0.125$$

From these results, a drill having a cut rate of 0.125 mm/rev. is adopted.

$$F=0.125\times509=63.625\ [\text{mm/min.}]$$

| |
|---|
| N1565 G01Z212.4 |
| N1566 G00Z215.4; |
| N1567 G28M05; |
| N1568 G00A0.; |

Upon completion of the preparation of the reaming program, the processing is completed in step 1108 and then proceeds to step 1109.

Regrasp the workpiece so that its second area to be machined can be machined.

Grooved end cam on 28th step

Specifications for a grooved end cam are read from an entry for the grooved end cam shown in FIG. 55, a finally finished shape file shown in FIG. 157, and a file for the grooved end cam shown in FIG. 170.

| Machine program | Contents, conditions for determination, and Equations |
|---|---|
| N1600 G28; | |
| N1601 G94; | Asynchronous feeding operation. |
| N1602 T000021; | Search for a tool, through Figs. 82 to 85, which satisfies condtions, that is, the groove width of a cam: 8 mm, a cam depth = a major cutting edge: 4.05 mm. Then, a tool which has F, a tool diameter of 6h10, a nominal length of 8 mm, and tool ID No. 21 is selected. |
| N1603 G00A-90.; | |
| N1604 S79M03; | Since the tool material: SKH51 and the workpiece material SCM 440H, a cut rate of 15 m/min is read from the cutting condition file (Fig. 130). A feed rate which corresponds to 6 mm is calculated by complementing feed rates of 0.013/10 mm, 0.025/12 mm, and 0.05/18 mm read from the tool file. |

Then, the number of revolutions is calculated from them.

$$S=15\times1000/(3.14159\times6)=795.775\ [\text{r.p.m.}]$$

| | |
|---|---|
| N1605 G00Z210.X115.; | |
| N1606 G00Z151.X89.982; | Correct the coordinates of the starting point using a specified radius. X = (43.991 − 4) × 2 + 10 = 89.982 |
| N1607 G01Z145.95F50; | Calculate a feed rate. The feed rate is complemented on the assumption that it is proportional to the square of the diameter. |

$$0.013\times6^2/10^2=0.0047$$

$$0.025\times6^2/12^2=0.0063$$

From these results, a tool having a feed rate of 0.063 mm/tooth is adopted.

$$F=0.063\times2\times796=50.148\ [\text{mm/min.}]$$

| | |
|---|---|
| N1608 G01X69.982C180.F50; | X = (43.991 − 4 − 5) × 2 = 69.982 |
| N1609 G01X89.982C0.; | |
| N1610 G01X89.426C5.; | Machine the workpiece so that overlap at an angle of 5° is ensured between the machined areas. Enlarge the groove width: from 6 mm to 8 mm. |
| N1611 G00Z151.; | |
| N1612 G00C-5.; | |
| N1613 G01Z145.95F50; | |
| N1614 G41D1; | |
| N1615 G01X97.582C0.; | X = (43.991 − 0.2) × 2 + 10 = 97.582 |
| N1616 G01X77.582C180.; | |
| N1617 G01X97.582C0.; | |
| N1618 G01X97.026C5.; | Machine the workpiece so that overlap at an angle of 5° is ensured between the machined areas. |
| N1619 G00Z151.; | |
| N1620 G00C-5.; | |
| N1621 G01Z145.95F50; | |
| N1622 G42D1; | |
| N1623 G01X82.382C0.; | X = (43.991 − 8 + 0.2) × 2 + 10 = 82.382 |
| N1624 G01X62.382C180.; | |
| N1625 G01X82.382C0.; | |
| N1626 G01X81.826C5.; | Machine the workpiece so that overlap at an angle of 5° is ensured between the machined areas. |
| N1627 G00Z151.; | |
| N1628 G40D1; | |
| N1629 G00Z210.X115.; | |
| N1630 G28M05; | |
| N1631 G00A0.; | |
| N1640 T000100; | Replace a measuring tool with another tool. |
| N1641 #101=0; | Initialize macroscopic changes. |
| N1642 #102=0; | |
| N1643 #103=0; | |
| N1644 #104=0; | |
| N1645 #105=0; | |
| N1646 #106=0; | |
| N1647 #107=0; | |
| N1648 #108=0; | |
| N1649 #5061=0; | |
| N1650 #1=0; | |
| N1651 #2=0; | |
| N1652 #3=0; | |
| N1653 #4=0; | |
| N1654 #5=0; | |
| N1655 #6=0; | |
| N1656 #7=0; | |
| N1657 #8=0; | |
| N1658 #9=0; | |
| N1659 #10=0; | |
| N1660 G00A-90.; | Rotate the head through 90° in a counterclockwise direction, and align the measurement axis to the tool axis. |
| N1661 G28$G100*; | Calibrate a measuring head. |
| N1662 G00X115.Z215.; | Move the measuring tool to the reference point for the measurement. |
| N1663 G00X93.582; | X = (43.991 − 0.2) × 2 + 10 − 4 = 93.582 |
| N1664 G00Z148.95; | 147.45 + 1.5 = 148.95 |
| N1665 G31X100.F150; | |
| N1666#101=#5061; | |
| N1667 G00X93.582Z147.45; | 145.95 + 1.5 = 147.45 |
| N1668 G31X100.F150; | |
| N1669 #102=#5061; | |
| N1670 #1=#101+#102; | |
| N1671 G00X86.382Z148.95; | X = (43.991 − 9. + 0.2) × 2 + 10 + 4 = |

-continued

| | |
|---|---|
| | 86.382<br>147.45 + 1.5 = 148.95 |
| N1672 G31X70.F150; | |
| N1673 #103=#5061; | |
| N1674 G00X86.382Z147.45; | 145.95 + 1.5 = 147.45 |
| N1675 G31X70.F150; | |
| N1676 #104=#5061; | |
| N1677 #2=#103+#104; | |
| N1678 #3=#1−#2; | |
| N1679 #4=#3/2; | |
| N1680 G01X73.582C180.; | X = (43.991 − 0.2) × 2 − 10 − 4 = 73.582 |
| N1681 G00Z148.95; | 147.45 + 1.5 = 148.95 |
| N1682 G31X78.F150; | |
| N1683 #105=#5061; | |
| N1684 G00X73.582Z147.45; | 145.95 + 1.5 = 147.45 |
| N1685 G31X78.F150; | |
| N1686 #106=#5061; | |
| N1687 #5=#105+#106; | |
| N1688 G00X66.382Z148.95; | X = (43.991 − 8. + 0.2) × 2 − 10 + 4 = 66.382<br>147.45 + 1.5 = 148.95 |
| N1689 G31X61.F150; | |
| N1690 #107=#5061; | |
| N1691 G00X66.382Z147.45; | 145.95 + 1.5 = 147.45 |
| N1692 G31X61.F150; | |
| N1693 #108=#5061; | |
| N1694 #6=#107+#108; | |
| N1695 #7=#5−#6; | |
| N1696 #8=#7/2; | |
| N1697 #9=#4+#8; | |
| N1698 #10=#9/2; | |
| N1699 G00Z215.; | Move the measuring tool to the reference point for the measurement. |
| N1700 G00X115.; | Move the measuring tool to the reference point for the measurement. |
| N1701 G28; | Return the tool head to the point of origin. |
| N1703 G00A0.; | Rotate the head to 0° so as to return to its point of origin. |
| N1704 #4107=#4107−#10; | Rewrite a tool diameter correction. |
| N1710 T000021; | Finishing operation |
| N1711 G00A-90.; | |
| N1712 S796M03.; | |
| N1713 G00Z210.X115.; | |
| N1714 G00X151.X89.982C-5; | Correct the coordinates of the starting point using a specified radius. |
| N1715 G01Z145.95F50; | |
| N1716 G41D1; | Correct the tool diameter. |
| N1717 G01X97.982C0.; | X = 43.991 × 2 + 10 = 97.982 |
| N1718 G01X77.982C180.; | |
| N1719 G01X97.982C0.; | |
| N1720 G01X97.426C5.; | Machine the workpiece so that overlap at an angle of 5° is ensured between the machined areas. |
| N1721 G00Z151.; | |
| N1722 G00C05.P | |
| N1723 G01Z145.95F50; | |
| N1724 G42D1; | |
| N1725 G01X81.982C0.; | X = (43.991 − 8) × 2 + 10 = 81.982 |
| N1726 G01X61.982C180.; | |
| N1727 G02X81.982C0.; | |
| N1729 G01X81.426C5.; | Machine the workpiece so that overlap at ang angle of 5° is ensured between the machined areas. |
| N1729 G00Z151.; | |
| N1730 G40D1; | |
| N1731 G00Z210.X115.; | |
| N1732 G28M05; | |
| N1733 G00A0.; | |

Upon completion of the preparation of the program for machining the grooved end cam, the processing is completed in step 1108 and then proceeds to step 1109.

Finishing of outer circumference of the second area

| Step No. | Dimension to which the workpiece is finished | Length | |
|---|---|---|---|
| 37 | (Coordinates of the starting point)<br>20.011 | 0. | [210.] |
| 37 | 24.850 | 15. | [195.] |
| 35 | 30.013+0.2=30.213G | 20. | [175.] |
| 33 | 40. | 5. | [170.] |
| 31 | 52.475 | 10. | [160.] |
| 29 | 40. | 10.05 | [149.95] |
| 27 | 110.+0.2=111.2G | 9.975 | [139.915] |
| (25 | 90. | 4.96<br>74.985 | [134.955]) |

| Machine program | Contents, conditions for determination, and Equations |
|---|---|
| N1800 G90; | |
| N1801 G28; | |
| N1802 T000003; | |
| T1803 G96S135M03; | |
| T1804 G41G00X0Z211.4; | |
| T1805 G01Z210.F0.226; | |
| T1806 G01X24.850F0.09; | Determine the feed rate F depending on a finishing method symbol. |

A finishing symbol on 37th step is 2L, and hence it is only required to satisfy a feed rate of less than 25 S. Equation (47) for the relationship between the roughness of the surface and the feed rate is expanded to Equation (48). A nose radius of 0.4 mm of the tool read from the tool file (FIGS. 78 to 81) is substituted into Equation (48).

$$H\max=f^2/8R \tag{47}$$

$$\begin{aligned} f^2 &= 8R \times H \\ &= 8 \times 0.4 \times 0.025 = 0.08 \end{aligned} \tag{48}$$

$f\max=0.08^{0.5}=0.28284$ $f=0.28284\times0.8=0.226272$ (0.8 is an arbitrarily changeable safety factor)

When the end face is finished, a feed rate of the tool, designed to be used in the Z direction, in the X direction is 1/2.5 of the feed rate in the Z direction (2.5 is a parameter which can be arbitrarily changed as required).

$f=0.226/2.5=0.09$ [mm/rev.]

| | |
|---|---|
| N1807 G01Z195.F0.226; | |
| N1808 G01X28.013; | |
| N1809 G01X30.213Z193.9; | Chamfer 1C plane. |
| N1810 G01Z173.013; | |
| N1811 G02X30.Z175.R1.; | Remove 1R corner. |
| N1812 G01X38.; | |
| N1813 G01X40.Z174.; | Chamfer 1C plane. |
| N1814 G01Z169.; | |
| N1815 G01X42.Z170.R1.; | Remove 1R corner. |
| N1816 G01X50.475; | |
| N1817 G01X52.475Z169.; | Chamfer 1C plane. |
| N1818 G01Z158.6; | Allowance for excessive grooving = 1 + 0.4 (nose-radius R) |
| N1819 G00X115.G00Z210.; | |
| N1820 G40; | |
| N1821 G28M05; | |

Upon completion of the preparation of the program for finishing the outer circumference, the processing is completed in step 1108 and then proceeds to step 1109.

Finishing of a groove

As can be seen from the finally finished pattern shown in FIGS. 161 to 164, groove specifications are as follows:

| Step No. | Dimension to which the workpiece is finished | Length | |
|---|---|---|---|
| 37 | 52.475 | 50. | [160.] |
| 29 | 40 | 10.05 | [149.95] |
| 27 | 110.+0.2=110.2G | 9.975 | [139.915] |

The selection of a grooving tool and the calculation of a feed rate are carried out in the same manner as previously mentioned.

| Machine program | Contents, conditions for determination, and Equations |
|---|---|
| N1830 T000004; | Select a grooving tool. |
| N1831 G96S135M03; | |
| N1832 G00X115.Z210.; | |
| N1833 G00Z153.; | |
| N1834 G00X42.8; | |
| N1835 G01X40.F0.145; | Finishing a center groove. |
| N1836 G04F0.084; | Set a dwell time to the time necessary for the workpiece to rotate about one-and-a-half revolution. |

The dwell time is calculated by substituting, into Equation (46), the number of revolutions of the tool while it is in a dwell state (one and a half revolution in the present embodiment), the cut rate (135 m/min. in the present embodiment), and the diameter of the groove bottom (40. mm in the present embodiment).

$$t = (\text{the number of revolutions of the tool while it is in a dwell state})/(\text{cut rate}/(60 \times \pi \times \text{bottom diameter}))\ [\text{sec.}] \ldots (46)$$
$$= 1.5/(135{,}000/(60 \times \pi \times 40.))$$
$$= 0.0837\ [\text{sec.}]$$

In the present embodiment, the dwell time is 0.084 [sec.].

| | |
|---|---|
| N1837 G00X115.; | |
| N1838 G00Z149.95X110.; | The starting point for the finishing of a side end face having a diameter of 110 mm. |
| N1839 G01X41.2F0.145; | The starting point for the machining of 1R. |
| M1840 G03X40.Z150.55R0.6; | Machine 1R. |
| N1841 G01Z151.35; | Finish the groove bottom. |
| N1842 G00X54.475; | |
| N1843 G00Z161.234; | The starting point for the finishing of a side end face having a diameter of 52.475 mm. |
| N1844 G01X52.475F0.145; | |
| N1845 G01X50.475Z160.; | |
| N1846 G01X41.2; | The starting point for the machining of 1R |
| N1847 G02X40.Z159.4R0.6F0.145; | Machine 1R. |
| N1848 G01Z158.6; | Finish the groove bottom. |
| N1849 G00X115.; | |
| N1850 G00Z210.; | |
| N1851 G28M05; | |

Upon completion of the preparation of the program for finishing the groove, the processing is completed in step 1108 and then proceeds to step 1109.

Keyway extending from 35th step to 38th step

As can be seen from FIGS. 44 and 50, a file for a keyway entry shown in FIG. 150, and the finally finished pattern shown in FIG. 166, keyway specifications are as follows:

a keyway number: 1, a previous stage number: 38, a subsequent stage number: 36, a keyway width: 8 mm, a tolerance 0/−0.036 (a mean width: 7.985 mm), a finishing symbol: 2M, the entire length of a keyway: 30.82 mm, a stage specified so as to be machined; 37, depth; H: 8.495 mm, a finishing symbol: 2M, a groove type: 1, a cutter diameter: S: 45 mm, a step number of the reference shoulder: 38, a distance from the shoulder: E: 0 mm, and an angle with respect to the reference position: 0°.

A program for machining the keyway is prepared using these specifications.

| Machine program | Contents, conditions for determination, and Equations |
|---|---|
| N1900 G28; | |
| N1901 G94; | Asynchronous feeding operation. |
| N1902 T000017; | Search for an end mill, through Figs. 82 to 85, which satisfies condtions, i.e., a cutter diameter of 45 mm and a width of 8 mm (a mean width of 7.985 mm). Then, a tool which has S, a tool diameter of 45 mm 0/−0.050, tool ID No. 19 is selected. |
| N1903 S141M03; | Since the tool material: SKH51 and the workpiece material SCM 440H, a cut rate of 20 m/min and a feed rate of 0.015 mm/rev. are read from the cutting condition file (Fig. 129). The number of revolutions of the workpiece is calculated by dividing the number of revolutions of the main spindle by the number of teeth. |

The number of revolutions of the main spindle is calculated as follows:

$$S=20\times1000/(3.14159\times45)=141.471\ [\text{r.p.m.}]$$

| | |
|---|---|
| N1904 G00Z237.5X0.C90.; | Positioning point=215.+22.5=237.5 |
| N1905 G00Y8.495; | |
| N1906 G00Z223.806; | Cutting point=201.+$\{22.5^2-(22.5-4)^2\}^{1/2}$+1=223.806 |
| N1907 G01Z194.9F38; | End point=210.−30.82+$[22.5^2-(22.5-6.5)^2]^{1/2}]$−0.1=194.9 Calculate a feed rate. The feed rate is calculated from the number of revolutions: 141 rev./min., a feed rate of 0.015 mm/rev., and the number of teeth: 18. |

$$F=0.015\times141\times18=38.07\ [\text{mm/min.}]$$

Therefore, the feed rate is set to 38 mm/min.

| |
|---|
| N1908 G0Y16.; |
| N1909 G00Z237.6; |
| N1910 G00C0.; |
| N1911 G28M05; |

Upon completion of the preparation of the program for machining the keyway, the processing is completed in step 1108 and then proceeds to step 1109.

Machine programs for use with respective machine tools used in other processes will be prepared.

To begin with, a program for electric discharge machining of an internal gear on 6th step will be prepared. Electric discharge machining of an internal gear on 6th step:

A screen for the electric discharge machining operation permits additional entries for machining conditions so long as machining electrodes are prepared. Hence, it is possible to prepare its program according to the general method.

Electric discharge machining specifications comprise machining position: Z210 mm, X0, Y0, specified depth: 195 mm, depth to which the workpiece is machined: 191 mm which is calculated from a margin of depth of 190 mm.

Using these values, the machine program is prepared as follows:

| Machine program | Contents, conditions for determination, and Equations |
|---|---|
| N2000 G28; | Check the point of origin. |
| N2001 G90; | Instruction for an absolute value |
| N2002 T000200; | Roughing tool |
| N2003 G00X0.Y0.Z210.M03; | Move a tool to a machining point, and turn the power on. |
| N2004 G01Z191.F0.06; | Roughing operation |
| N2005 M05; | Turn the power off. |
| N2007 G00Z210.; | Return the tool to the starting point for the machining operation. |
| N2008 G00X0.Y0.Z210.M03; | Move the tool to the starting point for the machining operation, and turn the power on. |
| N2009 G01Z191.F0.06; | Finishing operation |
| N2010 M05; | Turn the power off. |
| N2011 G00Z210.; | Return the tool to the starting point for the machining operation. |
| N2012 G28; | Return the tool to its point of origin. |
| N2013 M30; | Rewind a program end tape. |

Upon completion of the preparation of the program for machining the internal gear by means of electric discharge machining, the processing is completed in step 1108 and then proceeds to step 1109.

Hobbing of an external gear on 31st step

As can be seen from FIGS. 44 and 47, a file for entries for the external gear shown in FIG. 160, and a finally finished shape file shown in FIG. 172, specifications for hobbing an external gear are as follows:

an external gear number: 1, reference position: a previous step number-30, a subsequent step number-32, and a specified step number-31, a distance from shoulder: S: 0 mm, an angle: 0°, and gear specifications:, a tooth profile: JISB1701, a module (M): 2.5, a pressure angle (PA): 20°, the number of teeth: 19, a helix angle: 0°, a tooth width: 10 mm, a base tangential length: 18.433/3 teeth, a finishing method: H, and a finishing symbol: 3H.

Since gear specifications: ST, a tooth profile: JISB1701, M: 2.5, and PA: 20 as can be seen from FIGS. 82 to 85, a tool with tool ID No. 22 is selected.

A tool diameter of 65 mm and a cutter addendum of 3.125 mm are read from the tool file. It is decided whether or not the hobbing of a gear is feasible.

Under these conditions, the tool has a clearance diameter margin of 65 mm, and the groove has a clearance of 10 mm, and hence the hobbing of the gear is impossible.

An alarm is sounded to inform the operator of the absence of a file for processes and machine tools capable of machining the gear under these conditions.

Provided that the machining margin (the tool diameter+5 mm)/2 is satisfied, the machine program of the present embodiment will be prepared as follows:

| Machine program | Contents, conditions for determination, and Equations |
|---|---|
| N2100 G28; | |
| N2101 G90; | Asynchronous feeding operation. |
| N2102 T000022; | Search for a tool, through FIGS. 82 to 85, which satisfies gear specifications, i.e., ST, a tooth profile: JISB1701M: 2.5, PA: 20. Then, a tool which has tool ID No. 22 is selected. |

Since a tool diameter of 65 mm and a cutter dedendum of 3.125 mm as can be read from the tool file, a helix angle is calculated as follows:

$$LA=\tan^{-1}\{2.5/\pi(65-3.125\times 2)\}=0.776026°.$$

| | |
|---|---|
| N2103 G00Y0.A0.776Z210.X115.; | |
| N2104 SB133.MB03SC7.MC03; | Since the tool material: SKH55 and the workpiece material SCM 440H, a cut rate of 29 m/min and a feed rate of 1.15 rev./work are read from the cutting condition file (FIG. 134). The number of revolutions of the main spindle is calculated as follows: |

$$S=20\times 1000/(3.14159\times 65)=142.015\ [\text{r.p.m.}]$$

The tool has nineteen teeth, and hence the number of revolutions of the workpiece is calculated by dividing the number of revolutions of the main spindle by the number of teeth.

Number of revolutions of the workpiece $$SC=142/19=7.4736842\ [\text{r.p.m.}]$$

The number of revolutions of the workpiece (SC) is rounded up to 7 rpm, and hence the number of revolutions of the main spindle (SB) is $$7\times 19=133\ [\text{r.p.m.}]$$

| | |
|---|---|
| X2105 G00X51.5Z189.127M08; | $Z = 210 - 35 + \{32.5^2 - )\ 32.5 - 5.525)^2\}^{1/2} + 1$ |
| X2106 G01X41.45F8.05; | Roughing operation, |

Specified diameter to which the workpiece is machined=52.5−2×(3.125+2.5)=41.25

Ensure a finishing allowance of 0.2 mm.

$$X=41.25+0.2=41.45$$

$$F=1.15\times 7=8.05\ [\text{mm/min.}]$$

| |
|---|
| N2107 G01Z164.F8.05; |
| N2108 G00X115.; |
| N2109 G00Z2189.127; |
| N2110 G00X41.45; |
| N2111 G01X41.25; |
| N2112 G01Z164.F8.05; |
| N2113 G00Z115.M09; |
| N2114 G28M05; |

Upon completion of the preparation of the program for hobbing the external gear, the processing is completed in step 1108 and then proceeds to step 1109.

Grinding of outer circumference

Figure 49:
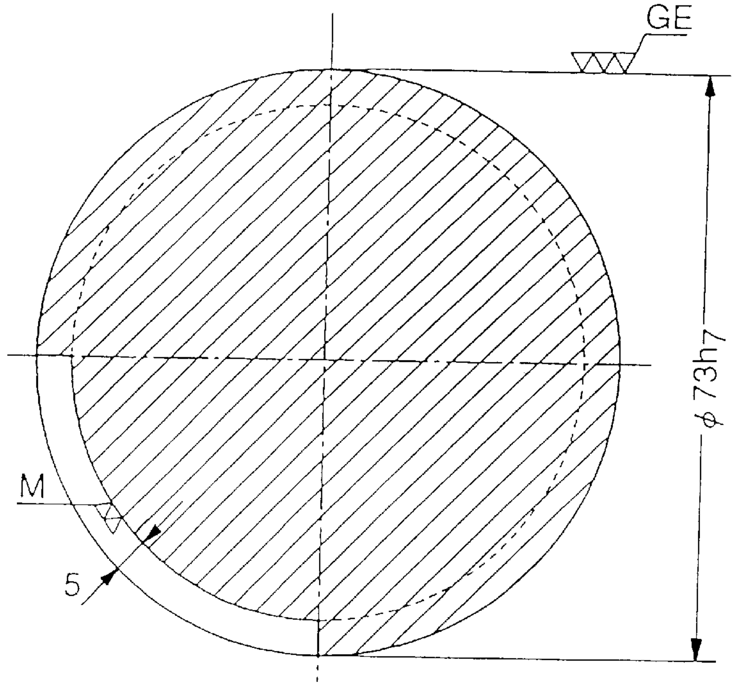
FIG. 49 is a cross section taken along line D—D (shown in FIG. 44) with regard to the finished shape of the workpiece according to the embodiment of the present invention.

As can be seen from FIGS. 44 and 49, files for entries for the outer circumference shown in FIGS. 143–148, and finally finished pattern files shown in FIGS. 161–164, specifications for grinding the outer circumference are as follows:

First area to be machined

| Step No. | Dimension of workpiece before it is finished | Dimension of finished workpiece | Length |
|---|---|---|---|
| 20 | 73.185G | 72.985 | 30.[135.] |
| 23 | 84.189G | 83.989 | 20.[75.] |
| 27 | 110.2G | 110.(cam) | 10.[60.] |

Second area to be machined

| Step No. | Dimension of workpiece before it is | Dimension of finished workpiece | Length |
|---|---|---|---|
| 35 | 30.213G | 30.013 | 20.[175.] |

The program for grinding the outer circumference of the workpiece is prepared as follows, using the above conditions.

Given that the in-process measurement of the workpiece is measured during the grinding operation, the control of the Y axis and the forward and backward movement of a measuring unit are also programed together with the grinding program. The in-process measurement of a cam requires special equipment and control, and hence this measurement is omitted from the following descriptions.

| Machine program | Contents, conditions for determmation, and Equations |
|---|---|
| N2200 G28; | |
| N2201 G90; | Asynchronous feeding operation |
| N2202 T000024; | Search for a tool with reference to the type of machining and the outside diameter of the workpiece. |
| N2203 SA1259SB109M03; | Wheel spindle: A, and the main spindle of the workpiece: B |

Since the workpiece material SCM 440H, hardness: HB285-352, and translated hardness: Rc30-38 are read from FIG. 124. Under these conditions, the width of an area to be machined and the major cutting edge (grinding wheel width): 75 mm are read from FIG. 135, and they are compared with each other. As a result, a plunge cutting method is determined as to be a machining method.

Peripheral velocity of a grinding wheel: 30 m/sec., peripheral velocity of a workpiece: 25 m/min., depth of cut made by the plunge cutting method: (roughing operation) 0.015/(finishing operation) 0.005 mm/rev.

$$SA=30\times60\times1000/\pi\times455=1259 \text{ [rev./min.]}$$

$$SB=25\times1000/\pi\times73=109.01 \text{ [rev./min.]}$$

$$SB=25\times1000/\pi\times84=94.735 \text{ [rev./min.]}$$

$$SB=25\times1000/\pi\times110=72.343 \text{ [rev./min.]}$$

$$SB=25\times1000/\pi\times30=265.258 \text{ [rev./min.]}$$

| | |
|---|---|
| N2204 G00Z210.; | Move the tool head to the point of origin for machining the workpiece in the Z direction. |
| N2205 G00X115.; | Move the tool head to the point of origin for machining the workpiece in the X direction. |
| N2206 G00Z136.; | Move the tool head to the first machining point. |
| N2207 G00Z73.285M08; | Grinding gap: 0.1, Turn a cooling unit on. |
| N2208 G01X73.005Y72.985M98F1.63; | Rough the workpiece so as to leave an allowance of 0.02 for precision grinding purposes. Set the measuring unit, and move it forward. F = 0.015 × 109 = 1.635 [mm/min.] |
| N2209 G01X72.985F0.54 | Finishing operation F = 0.005 × 109 = 0.545 [mm/min.] |
| N2210 G04F0.826M86; | Set the tool in a dwell state, and move the measuring equipment backward. F = 1.5/(109/60) = 0.8257 [sec.] |
| N2211 G00115.SB95; | Move the tool to the point of origin for machining the workpiece in the X direction |
| N2212 G00Z76.; | Move the tool to the second machining point. |
| N2213 G00X84.289; | (Diametrical) grinding gap: 0.1 |
| N2214 G01X84.009Y83.989M89F1.42; | Rough the workpiece so that an allowance of 0.02 is left for (diametrical) precision grinding. Set the measuring equipment, and move it forward. F = 0.015 × 95 = 1.425 [mm/min.] |
| N2215 G01X83.989F0.47; | Finishing allowance F = 0.005 × 95 = 0.475 [mm/min.] |
| N2216 G04F0.95M86; | Set the tool in a dwell state, and move the measuring equipment backward. F = 1.5/(95/60) = 0.9474 [sec.] |
| N2217 G00X115.; | Move the tool to the point of origin for machining the workpiece in the X direction. |
| N2218 G00Z59.MB05; | Move the tool to the third machining point, and stop the main spindle of the workpiece. |
| N2219 G00C0.; | Return the main spindle of the workpiece to the point of origin. |
| N2220 G00X110.3; | (Diametrical) grinding gap: 0.1 |
| N2221 G01X110.004F0;36; | Rough the workpiece so that an allowance of 0.02 is left for (diametrical) precision grinding. Set the measuring equipment, and move it forward. F = 0.015 × 72 = 0.36 [mm/min.] |
| N2222 G01X90.004C180.FX14.4; | FX = (2 × 20)/(π × 110)/{(0.005 × 72 × π × 110)/(0.1 × 10))} = 14.3999 [mm/min.] |
| N2223 G01X110.004C360.; | |
| N2224 G01X109.984F0.36; | Finishing operation |
| N2225 G01X89.984C180.FX7.2; | FX = (2 × 20)/(π × 110)/{(0.005 × 72 × π × 110)/(0.1 × 20))} = 7.1999 [mm/min.] |
| N2226 G01X109.984C360FX7.2; | |
| N2227 G01X109.428C5.FX7.2; | Overlap at an angle of 5° |
| N2228 G00X115. | Move the tool to the point of origin for machining the workpiece in the X direction. |
| N2229 G00Z210.C0.; | Move the tool to the point of origin for machining the workpiece in the z direction. |
| N2230 G28M05M09; | Return the tool to the point of |

-continued

| | |
|---|---|
| | origin. Turn off the main spindle of the workpiece. Turn off the cooling unit. |
| N2231 M00; | Stop the program, and reverse the direction of the workpiece. |
| N2232 SA1259SB265M03; | Actuate the wheel spindle and the main spindle of the workpiece. |
| N2233 G00Z210.; | Move the tool to the point of origin for machining the work-piece in the z direction. |
| N2234 G00X115.; | Move the tool to the point of origin for machining the work-piece in the X direction. |
| N2235 G00Z75.; | Move the tool to the fourth machining point. |
| N2236 G00X31.313M08; | (Diametrical) grinding gap: 0.1, Turn a cooling unit on. |
| N2237 G01X30.033Y30.013M89F3.97; | Rough the workpiece so as to leave an allowance of 0.02 for precision grinding purposes. Set the measuring unit, and move it forward. F = 0.015 × 265 = 3.975 [mm/min.] |
| N2238 G01X30.013F1.32 | Finishing operation F = 0.005 × 265 = 1.325 [mm/min.] |
| N2239 G04F0.34M86; | Set the tool in a dwell state, and move the measuring equipment backward. F = 1.5/(265/60) = 0.3396 [sec.] |
| N2240 G00115.; | Move the tool to the point of origin for machining the work-piece in the X direction. |
| N2241 G00Z210.; | Move the tool to the point of origin for machining the work-piece in the z direction. |
| N2242 G28M05M09; | Return the tool to the point of origin. Turn off the main spindle of the workpiece. Turn off the cooling unit. |

Upon completion of the preparation of the program for grinding the outer circumference of the workpiece, the processing is completed in step 1108 and then proceeds to step 1109.

Grinding of internal circumference

Grinding of the internal circumference of the workpiece comprises the finishing of hole H7 having a specified diameter of 20 mm formed in the second step of the workpiece.

| Step No. | Dimension of workpiece before it is finished | Dimension of finished workpiece | Length |
|---|---|---|---|
| 2 | (coordinates of the starting points) | 20.011 | 0.[160.]161.55 |
| 2 | 19.811G | 20.011 | 15.[175.]176.55 |

| Machine program | Contents, conditions for determination, and Equations |
|---|---|
| N2300 G28; | |
| N2301 G90; | Asynchronous feeding operation |
| N2302 T000023; | Search for a tool with reference to the type of machining and the inside diameter of the workpiece. |

-continued

| Machine program | Contents, conditions for determination, and Equations |
|---|---|
| N2303 SA180000SB637M03; | Wheel spindle: A, and the main spindle of the workpiece: B |

Since the workpiece material SCM 440H, hardness: HB285-352, and translated hardness: Rc30-38 are read from FIG. 124. Under these conditions, the width of an area to be machined and the major cutting edge (grinding wheel width): 13 mm are read from FIG. 135, and they are compared with each other. As a result, a traverse grinding method is determined as to be a machining method.

Peripheral velocity of a grinding wheel: 30 m/sec., peripheral velocity of a workpiece: 45 m/min., depth of cut made by the traverse grinding method: (roughing operation) 0.013/(finishing operation) 0.005 mm/rev.

$$SA=30\times 60\times 1000/\pi\times 10=180000\ [\text{rev./min.}]$$

$$SB=40\times 1000/\pi\times 20=636.619\ [\text{rev./min.}]$$

| | |
|---|---|
| N2304 G00X0.; | Move the tool head to the point of origin for machining the workpiece in the X direction. |
| N2305 G00Z215.; | Movethe tool head to the point of origin for machining the workpiece in the Z direction. |
| N2306 G00X19.811M08; | Grinding gap: 0.1, Turn a cooling unit on. |
| N2307 G00Z176.; | Move the tool to the machining point. |
| N2308 G01Z160.2F2756; | Move the tool to the machining end point. A chopping rate of the tool in the Z direction is calculated on the assumption that ⅓ of the width of the grinding wheel is fed during one rotation of the workpiece. |

$$F=(13/3)\times 636=2755.9999\ [\text{mm/min.}]$$

| | |
|---|---|
| N2309 G01Z176.; | Return the tool to the machining point. |
| N2310 G01X19.824; | Cut the workpiece to a diameter of 0.013 mm. |
| N2311 G01Z160.2; | Move the tool to the machining end point. |
| N2312 G01Z176.: | Return the tool to the machining point. |
| N2313 G01Z160.2; | (The above described operations are repeatedly executed.) |
| N2314 G01Z160.2; | |
| N2315 G01Z176.; | |
| N2316 G01X19.85; | |
| N2317 G01Z160.2; | |
| N2318 G01Z176.; | |
| N2319 G01X19.863; | |
| N2320 G01Z160.2; | |
| N2321 G01Z176.; | |
| N2322 G01X19.876; | |
| N2323 G01Z160.2; | |
| N2324 G01Z176.; | |
| N2325 G01X19.889: | |
| N2326 G01Z160.2; | |
| N2327 G01Z176.; | |
| N2328 G01X19.902; | |
| N2329 G01Z160.2; | |
| N2330 G01Z176.; | |
| N2331 G01X19.915; | |
| N2332 G01Z160.2; | |
| N2333 G01Z176.; | |
| N2334 G01XX19.928; | |

-continued

| | |
|---|---|
| N2335 G01Z160.2; | |
| N2336 G01Z176.; | |
| N2337 G01X19.941; | |
| N2338 G01Z160.2; | |
| N2339 G01Z176.; | |
| N2340 G01X19.954; | |
| N2341 G01Z160.2; | |
| N2342 G01Z176.; | |
| N2343 G01X19.967; | |
| N2344 G01Z160.2; | |
| N2345 G01Z176.; | |
| N2346 G01X19.98; | |
| N2347 G01Z160.2; | |
| N2348 G01Z176.; | |
| N2349 G01X19.991; | |
| N2350 G01Z160.2; | |
| N2351 G01Z176.; | |
| N2352 G01Z160.2; | Spark out |
| N2353 G01Z176.; | |
| N2354 G01Z160.2; | |
| N2355 G01Z176.; | |
| N2356 G01Z160.2; | |
| N2357 G01Z176.; | |
| N2358 G01Z160.2; | |
| N2359 G01Z176.; | |
| N2360 G01Z160.2; | |
| N2361 G01Z176.; | |
| N2362 G01Z160.2; | |
| N2363 G01Z176.; | |
| N2364 G00Z215.X0.M09; | |
| N2365 G28M05; | |

Measurement of a bore having a diameter of 20 mm:

| | |
|---|---|
| N2370 T000100; | Replace the measuring tool with another tool. |
| N2371 #101 = 0; | Initialize macroscopic changes. |
| N2372 #102 = 0; | |
| N2373 #103 = 0; | |
| N2374 #104 = 0; | |
| N2375 #23061 = 0; | |
| N2376 #1 = 0; | |
| N2377 #2 = 0; | |
| N2378 #3 = 0; | |
| N2379 #4 = 0; | |
| N2380 #23 = 0; | |
| N2381 #6 = 0; | |
| N2382 #7 = 0; | |
| N2383 G00A-90.; | Rotate the head through 90° in a counterclockwise direction, and align the measurement axis to the tool axis. |
| N2384 G28$G100*; | Calibrate a measuring head. |
| N2385 G00X115.Z215.; | Move the measuring tool to the reference point for the measurement. |
| N2386 G00X0.; | |
| N2387 G00Z173.; | Move the measuring tool to the first measurement point. |
| N2388 G31X21.011F150; | Measurement (1) 20.011 mm |
| N2389 #101 = #5061; | Store the result of the measurement to 101. |
| N2390 G00Z162.X0.; | Move the measuring tool to the second measurement point. |
| N2391 G31X20.011F150; | Measurement (2) 20.011 mm |
| N2392 #102 = #5061; | Store the result of the measurement to 102. |
| N2393 #1 = #101 + #102; | Calculate diameters of the workpiece at the first and second measurement points. |
| N2394 #2 = #1/2; | |
| N2395 G00X; | Move the measuring tool to the third measurement point. |
| N2396 G31X − 21.011F150; | Measurement (3) − 20.011 mm |
| N2397 #103 = #5061; | Store the measurement result to 103. |
| N2398 G00Z173X0.; | Move the measuring tool to the fourth measurement point. |
| N2399 G31X − 20.011F150; | Measurement (4) − 20.011 mm |

-continued

| | |
|---|---|
| N2400 #104 = #5061; | Store the measurement result to 104. |
| N2401 #3 = #103 + #104; | Calculate the diameters of the workpiece at the third and fourth measurement points. |
| N2402 #4 = #3/2; | |
| N2403 #5 = #2 − #4; | Calculate a mean diameter. |
| N2404 #6 = #5/2; | |
| N2405 #7 = 20.022 − #6; | Calculate a difference between the mean diameter and a specified diameter |
| N2406 G00X0.; | |
| N2407 G00X115.Z215.; | Move the tool to the reference point for a machining operation. |
| N2408 G28; | Move the measuring tool to the point of origin. |
| N2409 G00A0.; | Rotate the measuring head to 0°, and return it to the point of origin. |
| N2410 #4107 = #4107 − #7; | Rewrite a tool diameter correction. |
| N2420 G28; | |
| N2421 G90; | |
| N2422 T000023; | Re-input the tool correction. |
| N2423 SA180000SB63M03; | |
| N2424 G00X115.Z215.; | Move the tool to the point of origin for the machining operation. |
| N2425 G00X0.; | |
| N2426 G00X19.811M08; | (Diametrical) grinding gap: 0.1. Turn a cooling unit on. |
| N2427 G00Z176.; | Move the tool to the machining point. |
| N2428 G01Z160.2F1378; | Move the tool to the machining end point. A chopping rate of the tool in the Z direction is calculated on the assumption that ⅙ of the width of the grinding wheel is fed during one rotation of the workpiece. |

$$F=(13/6)\times 636=1377.9999\ [\text{mm/min.}]$$

| | |
|---|---|
| N2429 G01Z176.; | Return the tool to the machining point. |
| N2430 G01X19.996; | |
| N2431 G01Z160.2; | |
| N2432 G01Z176.; | |
| N2433 G01X20.001; | |
| N2434 G01Z160.2; | |
| N2436 G01X20.006; | |
| N2437 G01Z160.2; | |
| N2438 G01Z176.; | |
| N2439 G01X20.011; | |
| N2440 G01z160.2; | |
| N2441 G01Z176.; | |
| N2442 G01Z160.2; | Spark out |
| N2443 G01Z176.; | |
| N2444 G01Z160.2; | |
| N2445 G01Z176.; | |
| N2446 G01Z160.2; | |
| N2447 G01Z176.; | |
| N2448 G01Z160.2; | |
| N2449 G01Z176.; | |
| N2450 G00Z215.X0.M09; | |
| N2451 G28M05; | |

Final measurement

Measurement of a bore having a diameter of 20 mm:\

| | |
|---|---|
| N2460 T000100; | Replace the measuring tool. |
| N2461 #101 = 0; | Initialize macroscopic changes. |
| N2462 #102 = 0; | |
| N2463 #103 = 0; | |
| N2464 #104 = 0; | |
| N2465 #23061 = 0; | |
| N2466 #1 = 0; | |
| N2467 #2 = 0; | |
| N2468 #3 = 0; | |
| N2469 #4 = 0; | |
| N2470 #23 = 0; | |

-continued

| | |
|---|---|
| N2471 #6 = 0; | |
| N2472 #7 = 0; | |
| N2473 #8 = 0; | |
| N2474 #9 = 0; | |
| N2475 #10 = 0.022; | |
| N2476 G00A-90.; | Rotate the head through 90° in a counterclockwise direction, and align the measurement axis to the tool axis. |
| N2477 G28$G100*; | Calibarate a measuring head. |
| N2478 G001X115.Z215.; | Move the measuring tool to the reference point for the measurement. |
| N2479 G00X0.; | |
| N2480 G00Z173.; | Move the measuring tool to the first measurement point. |
| N2481 G31X21.011F150; | Measurement (1) 20.011 mm |
| N2482 #101 = #5061; | Store the result of the measurement to 101. |
| N2483 G00Z162.X0.; | Move the measuring tool to the second measurement point. |
| N2484 G31X20.011F150; | Measurement (2) 20.011 mm |
| N2485 #102 = 1π5061; | Store the result of the measurement to 102. |
| N2486 #1 = #101 + #102; | Calculate diameters of the workpiece at the first and second measurement points. |
| N2487 #2 = #1/2; | |
| N2488 G00X; | Move the measuring tool to the third measurement point. |
| N2489 G31X − 21.011F150; | Measurement (3) − 20.011 mm |
| N2490 #103 = #5061; | Store the measurement result to 103. |
| N2491 G00Z173X0.; | Move the measuring tool to the fourth measurement point. |
| N2492 G31X − 20.011F150; | Measurement (4) − 20.011 mm |
| N2493 #104 = #5061; | Store the measurement result to 104. |
| N2494 #3 = #103 + #104; | Calculate the diameter of the workpiece at the third and fourth measurement points. |
| N2495 #4 = #3/2; | |
| N2496 #5 = #2 − #4; | Calculate a mean diameter. |
| N2497 #6 = #5/2; | |
| N2498 #7 = 20.011 − #6; | Calculate a difference between the mean diameter and a specified diameter. |
| N2499 G00X0.; | |
| N2500 G00X115.Z215.; | Move the tool to the reference point for a machining operation. |
| N2501 G28; | Move the measuring tool to the point of origin. |
| N2502 G00A0.; | Rotate the measuring head to 0°, and return it to the point of origin. |
| N2503 #4107 = #4107 − #7; | Rewrite a tool diameter correction. |
| N2504 #8 = 20.022 − #6; | Calculate a difference between the specified dimension and the acutally measured value. |
| N2505 IF#8GT#10G0502420; | If the actually measured value is smaller than a specified value of 20.0, execute this sequence. |
| N2506 IF#8GE#9G0T02510; | If the actually measured value is equal to a specified value of 20.022, execute this sequence. |
| N2507 IF#8LE#10G0TO2510; | If the actually measured value is larger than the specified value of 20.0, execute this sequence. |
| N2508 IF#8LT#9GOTO2509; | If the actually measure value is larger than the specified value of 20.022, execute this sequence. |
| N2509 PRINT;NOGO; | Display: defective |
| N2510 PRINT:GO; | Display: non-defective |
| N2511 MO2; | |

Measurement

In the present embodiment, a measuring program is prepared, which is limited for use in measuring the areas provided with a tolerance symbol or a tolerance. The outside diameter of each of the following areas.

| Step No. | Measured dimension | | Distance from the reference point |
|---|---|---|---|
| | First area | | |
| 10 | 49. | −0.1/−0.15 | 210./205. |
| 18 | 69.5 | 0/−0.1 | 170./165. |
| 20 | 73. | h7 | 165./135. |
| 22–23 | 80. | h6/84.h6 | 115./95. |
| 24 | 84. | h6 | 95./80. |
| 24 | 84. | −0.1/−0.2 | 80./75. |
| | Second area | | |
| 31 | 52.5 | 0/0.05 | 40./40. |
| 35 | 30. | m5 | 35./15. |

Measurement of a bore having a diameter of 20 mm:

| | |
|---|---|
| N2600 T000100; | Replace the measuring tool with another tool. |
| N2601 #101 = 0; | Initialize macroscopic changes. |
| N2602 #102 = 0; | |
| N2603 #103 = 0; | |
| N2604 #404 = 0; | |
| N2605 #105 = 0; | |
| N2606 #106 = 0; | |
| N2607 #107 = 0; | |
| N2608 #108 = 0; | |
| N2609 #109 = 0; | |
| N2610 #110 = 0; | |
| N2611 #111 = 0; | |
| N2612 #112 = 0; | |
| N2613 #113 = 0; | |
| N2614 #114 = 0; | |
| N2615 #115 = 0; | |
| N2616 #116 = 0; | |
| N2617 #117 = 0; | |
| N2618 #118 = 0; | |
| N2619 #119 = 0; | |
| N2620 #120 = 0; | |
| N2621 #121 = 0; | |
| N2622 #122 = 0; | |
| N2623 #123 = 0; | |
| N2624 #124 = 0; | |
| N2625 #125 = 0; | |
| N2626 #126 = 0; | |
| N2627 #127 = 0; | Initialize an X counter. |
| N2628 #128 = 0; | Initialize a Y counter. |
| N2629 #129 = 0; | Initialize a Z counter. |
| N2630 #1; | Initialize macroscopic changes. (The same shall applies to any corresponding part in the following descriptions.) |
| N2631 #2; | |
| N2632 #3; | |
| N2633 #4; | |
| N2634 #5; | |
| N2635 #6; | |
| N2636 #7; | |
| N2637 #8; | |
| N2638 #9; | |
| N2639 #10; | |
| N2640 #11; | |
| N2641 #12; | |
| N2642 #13; | |
| N2643 #14; | |
| N2644 #15; | |
| N2645 #16; | |
| N2646 #17; | |
| N2647 #18; | |
| N2648 #19; | |
| N2649 #20; | |
| N2650 #21; | |
| N2651 #22; | |
| N2652 #23; | |
| N2653 #24; | |
| N2654 #25; | |

-continued

| | |
|---|---|
| N2655 #26; | |
| N2656 G28$G100*; | Calibrate the measuring head. |
| N2657 G00X115.Z215.; | Move the tool to the reference point for the machining operation. |
| N2658 G00Y-25.Z207.5; | Move the measuring tool to the first measurement point (Y and Z). |
| N2659 G00X0.; | Move the measuring tool the the first measurement point (X). |
| N2660 G31Y-24.F150; | Measurement (1) - 24.4375 mm |
| N2661 #101 = #5062; | Store the measurement result to 101. |
| N2662 G00Y-25.; | Return the measuring tool the the first measurement point (Y). |
| N2663 G00X115.; | Return the measuring tool to the reference point for the measurement. (X) |
| N2664 G00Y25.; | Move the measuring tool to the second measurement point (Y). |
| N2665 G00X0.; | Move the measuring tool to the second measurement point (X). |
| N2666 G31Y24.F150; | Measurement (2) - 24.4375 mm |
| N2667 #102 = #5062; | Store the measurement result to 102. |
| N2668 #1 = #102–#101; | Calculate the diameter of the area defined by 49. mm and –0.1/–0.15. |
| N2669 #2 = #1/2; | |
| N2670 G00Y-25.; | Return the measuring tool to the second measurement point (Y). |
| N2671 G00X115.; | Return the measuring tool to the reference point for the measurement. |
| N2672 G00Y167.5; | Move the measuring tool to the third measurement point (Z). |
| N2673 G00Y35.; | Move the measuring tool to the third measurement point (Y). |
| N2674 G00X0.; | Move the measuring tool to the third measurement point (X). |
| N2675 G31Y-34.F150; | Measurement (3) - 34.725 mm |
| N2676 #103 = #5062; | Store the measurement result to 103. |
| N2677 G00Y-35.; | Return the measuring tool to the third measurement point (Y). |
| N2678 G00X115.; | Return the measuring tool to the reference point for the measurement. (X) |
| N2679 G00Y35.; | Move the measuring tool to the fourth measurement point (Y). |
| N2680 G00X0.; | Move the measuring tool to the fourth measurement point (X). |
| N2681 G31Y24.F150; | Measurement (4) - 34.725 mm |
| N2682 #104 = #5062; | Store the measurement result to 104. |
| N2683 #3 = #104–#103; | Calculate the diameter of the area defined by 69.5 mm and 0/–0.1. |
| N2684 #4 = #3/2; | |
| N2685 G00Y34.; | Return the measuring tool to the fourth measurement point (Y). |
| N2686 G00X115.; | Return the measuring tool to the reference point for the measurement. (X) |
| N2687 G00Z162.5; | Move the measuring tool to the fifth measurement point (Z). |
| N2688 G00Y35.; | Move the measuring tool to the fifth measurement point (Y). |
| N2689 G00X0.; | Move the measuring tool to the fifth measurement point (X). |
| N2690 G31Y-36.F150; | Measurement (5) - 36.4975 mm |
| N2691 #105 = #5062; | Store the measurement result to 105. |
| N2692 G00Y-37.; | Return the measuring tool to the fifth measurement point (Y). |
| N2693 G00X115.; | Return the measuring tool to the reference point for the measurement. (X) |
| N2694 G00Y37.; | Move the measuring tool to the sixth measurement point (Y). |
| N2695 G00X0.; | Move the measuring tool to the fourth measurement point (X). |
| N2696 G31Y36.F150; | Measurement (6) - 36.4975 mm |
| N2697 #106 = #5062; | Store the measurement result to 105. |
| N2698 #106 = #106-#105; | Calculate the diameter of the area defined by 73.h3. |
| N2699 #6 = #5/2; | |
| N2700 G00Y37.; | Return the measuring tool to the sixth measurement point (Y). |
| N2701 G00X115.; | Return the measuring tool to the reference point for the measurement. (X) |
| N2702 G00Z137.5; | |
| N2703 G00Y37.; | Move the measuring tool to the seventh measurement point (Y). |

-continued

| | |
|---|---|
| N2704 G00X0.; | Move the measuring tool to the seventh measurement point (X). |
| N2705 G31Y-36.F150; | Measurement (7) - 36.4975 mm |
| N2706 #107 = #5062; | Store the measurement result to 107. |
| N2707 G00Y-37.; | Return the measuring tool to the seventh measurement point (Y). |
| N2708 G00X115.; | Return the measuring tool to the reference point for the measurement. (X) |
| N2709 G00Y37.; | Move the measuring tool to the eighth measurement point (Y). |
| N2710 G00X0.; | Move the measuring tool to the eighth measurement point (X). |
| N2711 G31Y36.F150; | Measurement (8) - 36.4975 mm |
| N2712 #107 = #5062; | Store the measurement result to 107. |
| N2713 #5 = #108–#107; | Calculate the diameter of the area defined by 73.h7. |
| N2714 #8 = #7/2; | |
| N2715 G00Y37.; | Return the measuring tool to the eighth measurement point (Y). |
| N2716 G00X115.; | Return the measuring tool to the reference point for the measurement. (X) |
| N2717 G00Y112.5; | Move the measuring tool to the ninth measurement point (Z). |
| N2718 G00Y-40.5; | Move the measuring tool to the ninth measurement point (Y). |
| N2719 G00X0; | Move the measuring tool to the ninth measurement point (X). |
| N2720 G31Y-39.5F150; | Measurement (9) - 40.24525 mm |
| N2721 #109 = #5062; | Store the measurement result to 109. |
| N2722 G00Y-40.5; | Return the measuring tool to the ninth measurement point (Y). |
| N2723 G00X115.; | Return the measuring tool to the reference point for the measurement. (X) |
| N2724 G00Y40.5; | Move the measuring tool to the tenth measurement point (Y). |
| N2725 G00X0.; | Move the measuring tool to the tenth measurement point (X). |
| N2726 G31Y39.5F150; | Measurement (10) - 40.24525 mm |
| N2727 #110 = #5062; | Store the measurement result to 110. |
| N2728 #9 = #110–#109; | Calculate the diameter of the area defined by 80.5h6. |
| N2729 #10 = #9/2; | |
| N2730 G00Y40.5; | Return the measuring tool to the tenth measurement point (Y). |
| N2731 G00X115.; | Return the measuring tool to the reference point for the measurement. (X) |
| N2732 G00Z97.5; | |
| N2733 G00Y-42.; | Move the measuring tool to the eleventh measurement point (Y). |
| N2734 G00X0.; | Move the measuring tool to the eleventh measurement point (X). |
| N2735 G31Y-41.5F150; | Measurement (11) - 41.74945 mm |
| N2736 #11 = #5062; | Store the measurement result to 111. |
| N2737 G00Y-42.; | Return the measuring tool to the elventh measurement point (Y). |
| N2738 G00X115.; | Return the measuring tool to the reference point for the measurement. (X) |
| N2739 G00Y42,; | Move the measuring tool to the twelfth measurement point (Y). |
| N2740 G00X0.; | Move the measuring tool to the twelfth measurement point (X). |
| N2741 G31Y41.5F150; | Measurement (12) - 41.74945 mm |
| N2742 #112 = #5062; | Store the measurement result to 112. |
| N2743 #11 = #112–#111; | Calculate the diameter of the area defined by 83.5h6. |
| N2744 G00Y42.; | Return the measuring tool to the twelfth measurement point (Y). |
| N2746 G00X115.; | Return the measuring tool to the reference point for the measurement. (X) |
| N2747 G00Y92.5; | |
| N2748 G00Y-42.5; | Move the measuring tool to the thirteenth measurement point (Y). |
| N2749 G00X0.; | Move the measuring tool to the thirteenth measurement point (X). |
| N2750 G31Y-41.5F150; | Measurement (13) - 41.9945 mm |
| N2751 #113 = #5062; | Store the measurement result to 113. |
| N2752 G00Y-42.5; | Return the measuring tool to the thirteenth measurement point (Y). |
| N2753 G00X115.; | Return the measuring tool to the reference point for the measurement . (X) |

-continued

| | |
|---|---|
| N2754 G00Y42.5; | Move the measuring tool to the fourteenth measurement point (Y). |
| N2755 G00X0.; | Move the measuring tool to the fourteenth measurement point (X). |
| N2756 G31Y41.5F150; | Measurement (14) - 41.9945 mm |
| N2757 #114 = #5062; | Store the measurement result to 114. |
| N2758 #13 = #114–#113; | Calculate the diameter of the area defined by 84.h6. |
| N2759 #14 = #13/2; | |
| N2760 G00Y42.5; | Return the measuring tool to the fourteenth measurement point (Y). |
| N2761 G00X115.; | Return the measuring tool to the reference point for the measurement. (X) |
| N2762 G00Z82.5; | |
| N2763 G00Y-42.5; | Move the measuring tool to the fifteenth measurement point (Y). |
| N2764 G00X0.; | Move the measuring tool to the fifteenth measurement point (X). |
| N2765 G31Y-41.5F150; | Measurement (15) - 41.9945 mm |
| N2766 #115 '2 #5062; | Store the measurement result to 115. |
| N2767 G00Y-42.5; | Return the measuring tool to the fifteenth measurement point (Y). |
| N2768 G00X115.; | Return the measuring tool to the reference point for the measurement. (X) |
| N2769 G00Y42.5; | Move the measuring tool to the sixteenth measurement point (Y). |
| N2770 G00X0.; | Move the measuring tool to the sixteenth measurement point (X). |
| N2771 G31Y41.5F150; | Measurement (160) - 41.9945 mm |
| N2772 #116 = #5062; | Store the measurement result to 116. |
| N2773 #15 = #116–#115; | Calculate the diameter of the area defined by 84.h6. |
| N2774 #16 = #15/2; | |
| N2775 G00Y42.5; | Return the measuring tool to the sixteenth measurement point (Y). |
| N2776 G00X115.; | Return the measuring tool to the reference point for the measurement. (X) |
| N2777 G00Y77.5; | |
| N2778 G00Y-42.5; | Move the measuring tool to the seventeenth measurement point (Y). |
| N2779 G00X0.; | Move the measuring tool to the seventeenth measurement point (X). |
| N2780 G31Y-41.5F150; | Measurement (17) - 41.925 mm |
| N2781 #117 = #5062; | Store the measurement result to 117. |
| N2782 G00Y-42.5; | Return the measuring tool to the seventeenth measurement point (Y). |
| N2783 G00X115.; | Return the measuring tool to the reference point for the measurement. (X) |
| N2784 G00Y42.5; | Move the measuring tool to the eighteenth measurement point (Y). |
| N2785 G00X0.; | Move the measuring tool to the eighteenth measurement point (X). |
| N2786 G31Y41.5F150; | Measurement (18) - 41.925 mm |
| N2787 #118 = #5062; | Store the measurement result to 118. |
| N2788 #17 = #118–#117; | Calculate the diameter of the area defined by 84.–0.10/–0.20. |
| N2789 #18 = #17/2; | |
| N2790 G00Y42.5; | Return the measuring tool to the eighteenth measurement point (Y). |
| N2791 G00X115.; | Return the measuring tool to the reference point for the measurement. (X) |
| N2792 G00Z47.5; | |
| N2793 G00Y-47.5; | Move the measuring tool to the ninteenth measurement point (Y). |
| N2794 G00X0.; | Move the measuring tool to the ninteenth measurement point (X). |
| N2795 G31Y-26.F150; | Measurement (19) - 26.2375 mm |
| N2796 #119 = #5062; | Store the measurement result to 119. |
| N2797 G00Y-26.75; | Return the measuring tool to the ninteenth measurement point (Y). |
| N2798 G00X115.; | Return the measuring tool to the reference point for the measurement. (X) |
| N2799 G00Y26.75; | Move the measuring tool to the twentieth measurement point (Y). |
| N2800 G00X0.; | Move the measuring tool to the twentieth measurement point (X). |
| N2801 G31Y26.F150; | Measurement (20) - 26.2375 mm |
| N2802 #1120 = #5062; | Store the measurement result to 120. |
| N2803 #19 = #120–#119; | Calculate the diameter of the area defined by 52.5 0/–0.05. |

-continued

| | |
|---|---|
| N2804 #20 = #19/2; | |
| N2805 G00Y26.75; | Return the measuring tool to the twentieth measurement point (Y). |
| N2806 G00X115.; | Return the measuring tool to the reference point for the measurement. (X) |
| N2807 G00Z42.5; | |
| N2808 G00Y-26.75; | Move the measuring tool to the twenty-first measurement point (Y). |
| N2809 G00X0.; | Move the measuring tool to the twenty-first measurement point (X). |
| N2810 G31Y-26.F150; | Measurement (21) - 26.2375 mm |
| N2811 #121 = #5062; | Store the measurement result to 121. |
| N2812 G00Y-26.75; | Return the measuring tool to the twenty-first measurement point (Y). |
| N2813 G00X115.; | Return the measuring tool to the reference point for the measurement. (X) |
| N2814 G00Y26.75; | Move the measuring tool to the twenty-second measurement point (Y). |
| N2815 G00X0.; | Move the measuring tool to the twenty-second measurement point (X). |
| N2816 G31Y26.F150; | Measurement (22) - 26.2375 mm |
| N2817 #122 = #5062; | Store the measurement result to 122. |
| N2818 #21 = #122–#121; | Calculate the diameter of the area defined by 52.5 0/–0.05. |
| N2819 #22 = #21/2; | |
| N2920 G00Y26.75; | Return the measuring tool to the twenty-second measurement point (Y). |
| N2821 G00X115.; | Return the measuring tool to the reference point for the measurement. (X) |
| N2822 G00Z32.5; | |
| N2823 G00Y-15.5; | Move the measuring tool to the twenty-first measurement point (Y). |
| N2824 G00X0.; | Move the measuring tool to the twenty-first measurement point (X). |
| N2825 G31Y-14.5F150; | Measurement (21) - 15.00625 mm |
| N2826 #123 = #5062; | Store the measurement result to 123. |
| N2827 G00Y-15.5; | Return the measuring tool to the twenty-first measurement point (Y). |
| N2828 G00X115.; | Return the measuring tool to the reference point for the measurement. (X) |
| N2829 G00Y15.5; | Move the measuring tool to the twenty-second measurement point (Y). |
| N2830 G00X0.; | Move the measuring tool to the twenty-second measurement point (X). |
| N2831 G31Y14.5F150; | Measurement (22) - 15.00625 mm |
| N2832 #124 = #5062; | Store the measurement result to 124. |
| N2833 #23 = #124–#123; | Calculate a diameter of 30.m5. |
| N2834 #24 = #23/2; | |
| N2835 G00Y15.5; | Return the measuring tool to the twenty-second measurement point (Y). |
| N2836 G00X115.; | Return the measuring tool to the reference point for the measurement. (X) |
| N2837 G00Y17.5; | |
| N2838 G00Y-15.5; | Move the measuring tool to the twenty-first measurement point (Y). |
| N2839 G00X0.; | Move the measuring tool to the twenty-first measurement point (X). |
| N2840 G31Y-14.5F150; | Measurement (21) - 15.00625 mm |
| N2841 #125 = #5062; | Store the measurement result to 125. |
| N2842 G00Y-15.5; | Return the measuring tool to the twenty-first measurement point (Y). |
| N2843 G00X115.; | Return the measuring tool to the reference point for the measurement. (X) |
| N2844 G00Y15.5; | Move the measuring tool to the twenty-second measurement point (Y). |
| N2845 G00X0.; | Move the measuring tool to the twenty-second measurement point (X). |
| N2846 G31Y14.5F150; | Measurement (22) - 15.00625 mm |
| N2847 #126 = #5062; | Store the measurement result to 126. |
| N2848 #25 = #126–#125; | Calculate a diameter of 30.m5. |
| N2849 #26 = #25/2: | |
| N2850 G00Y15.5; | Return the measuring tool to the twenty-second measurement point (Y). |
| N2851 G00X115.; | Return the measuring tool to the reference point for the measurement (X). |
| N2852 G00Z215.; | Return the measuring tool to the reference point for the measurement (Z). |
| N2853 G28; | Return the tool to the mechanical point of origin. |

Upon completion of the preparation of the measuring program, the processing is completed in step 1108 and then proceeds to step 1109.

Second Embodiment

Figure 27:
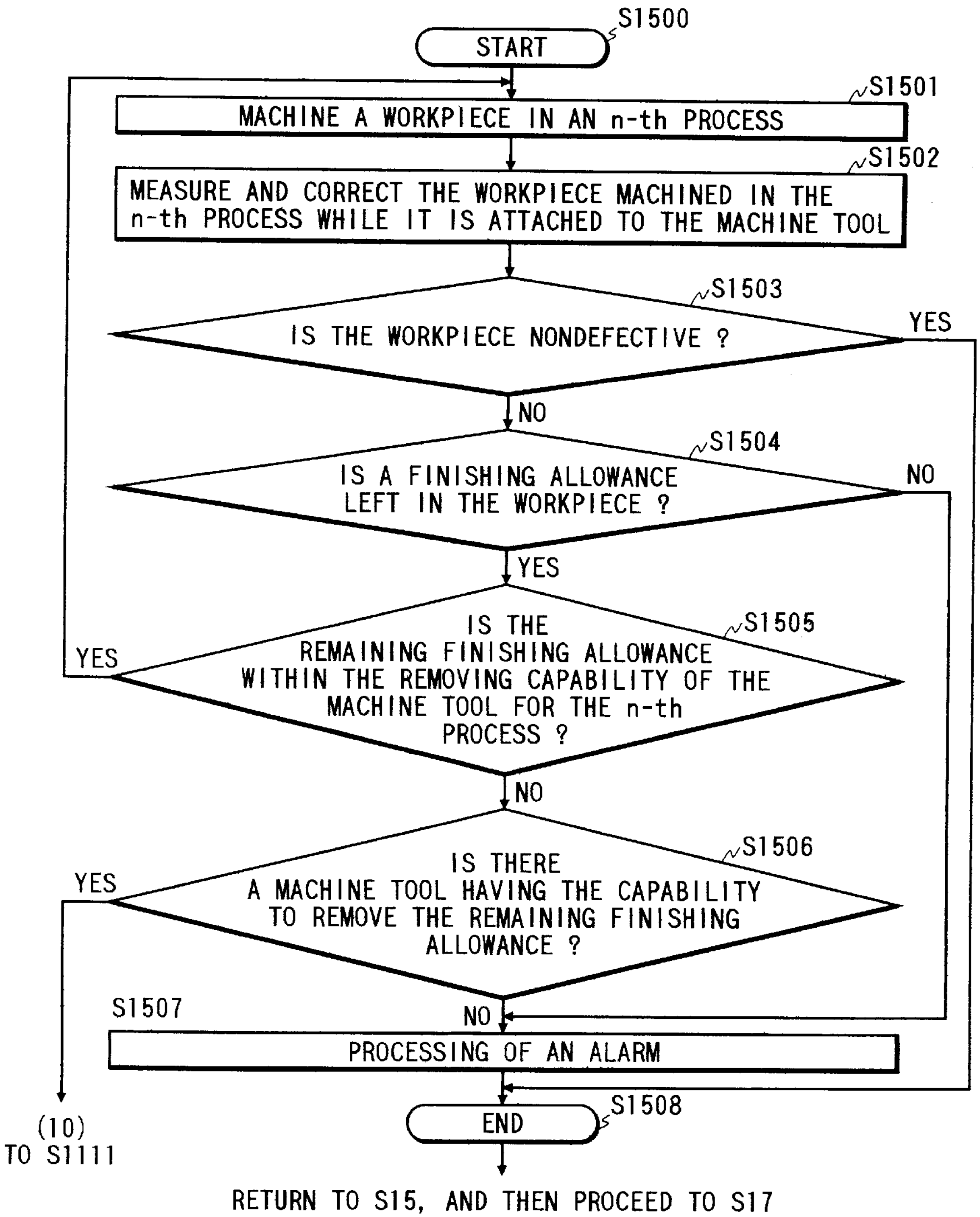
FIG. 27 is a flowchart for machining a workpiece in an n-th process and measuring the workpiece on a machine tool, with regard to step 15 of the processing method according to the embodiment of the present invention, in which the measurement of material is not included.

Detailed description of steps which were omitted for convenience of explanation, except for the material pattern, the rod material, and the configuration of the machine tool file described above, are as follows:

FIG. 27 shows details of procedures associated with the machining, measurement, correction, and reworking of a workpiece for the n-th process are carried out in step 15.

The processing starts from step 1500. The workpiece is machined in step 1501, using the n-th process machine program generated in step 1108.

Control of machining power during the course of the machining operation is carried out in the following manner:

In the case of a roughing operation,

If the machining power is in excess of an allowable value, the number of revolutions of the main spindle is gradually reduced to 80% as the first step so as to prevent the power from exceeding the allowable limit. If the power still remains in excess of a critical value, a feed rate is gradually reduced to 50% as a second step.

If the power is still in excess of the critical value in spite of these series of operations, an alarm is sounded, and the machining of the workpiece is stopped at a break between blocks to be machined, for example, an interval between a block to be cut and a block to be quickly fed.

Conversely, if the machining power does not satisfy the allowable value, the feed rate is gradually increased up to 200% as the first step. If the machining power still fails to satisfy the allowable value, a cut rate is gradually increased up to 150% as the second step. As a matter of course, processing necessary to retain the rigidity of the machine, tool, and material within the ranges of their allowable volume is included in the above described processing.

In the case of a finishing operation, the feed rate is dependent on the roughness of a finished surface, and hence the feed rate is controlled by using only the number of revolutions of the main spindle. In this case, details of the processing include the lifespan of the tool.

Details of the measurement and correction of the machined workpiece are as follows:

The areas of the workpiece designated by a tolerance and a tolerance symbol are all measured after the workpiece has been machined. The positions of the tool and machine are corrected by expectation in such a way that the positions fall within their allowable values before the next processing is carried out. For example, when the diameter of the workpiece is measured, the distance between two points in a diametrical direction of the material is measured at two points in the longitudinal direction of the material.

The number of measurement points is increased using the range of tolerance and the length of the workpiece as parameters. For example, in the case of a tolerance width of 10 $\mu$m, the number of measurement points is 6. In the case of a tolerance width of 20 $\mu$m, the number of measurement points is 4. In the case of more than 20 $\mu$m, the number of measurement points is 2. The measurement of the diameter is carried out at two points in the longitudinal direction of the workpiece, provided that 25 mm is taken as to be one unit. If the length of the workpiece is less than 5 mm, its diameter is measured at one point in the longitudinal direction. From the results of the measurement, a mean value and a difference between the maximum value and the minimum value are calculated.

If the workpiece was machined with an identical tip of an identical tool, a difference between a mean value obtained as a result of computation and the center of designated tolerance is corrected by the correction of the tool position and the correction of the machine position in combination.

If a difference between the maximum measured value and the minimum measured value is in excess of two-third of the tolerance width of each designated area, an alarm is sounded to inform erroneous process selection. This is attributable to an erroneous entry for the machine tool file.

A decision as to whether or not the result of the measurement carried out in step 1502 is acceptable is made in step 1503. If the resultant workpiece is non-defective, the current processing proceeds to step 1508, and it is then completed. The processing returns to step 15 and then proceeds to step 17.

If the resultant workpiece has been judged as to be defective, a decision as to whether or not a finishing allowance still remains in the workpiece is made in step 1504.

If the finishing allowance still remains in the workpiece, a decision as to whether or not the remaining finishing allowance is within the removing volume of an n-th process machine tool is made in step 1505. If it has been determined that the remaining finishing allowance falls within the removing volume of the n-th process machine tool, the processing returns to step 1501, and the procedures following step 1501 are executed.

On the other hand, if it has been determined in step 1505 that the remaining finishing allowance falls outside the removing volume of the n-th process machine tool, a decision as to whether or not there is a machine tool having the volume to remove the remaining finishing allowance is made in step 1506 by checking the remaining finishing allowance against the minimum removing volume stored in the machine tool file. If it has been determined that there is a machine tool having the volume to remove the remaining finishing allowance, the processing proceeds to step 1111. If it has been determined that no machine tool capable of removing the remaining finishing allowance is available, an alarm is sounded in step 1507.

After the completion of this decision, the processing proceeds to step 1508 and it is then completed.

In step 1111, a decision as to whether or not the process through which the machine tool capable of removing the remaining finishing allowance was selected is an unexecuted processing is made. If that process is not executed yet, a decision whether or not that process is a new machining process is made in step 1112. If that process is not a new machining process, the processing returns to step 1103.

If it has been determined in step 1112 that processing is a new machining process, an n-th process storage number is counted up by one in step 1113, and process data are additionally stored into a storage section. After the completion of the storage of the data, the processing proceeds to step 1102.

If the process determined in step 1111 has already been executed, the processing proceeds to step 1113.

Figure 28:
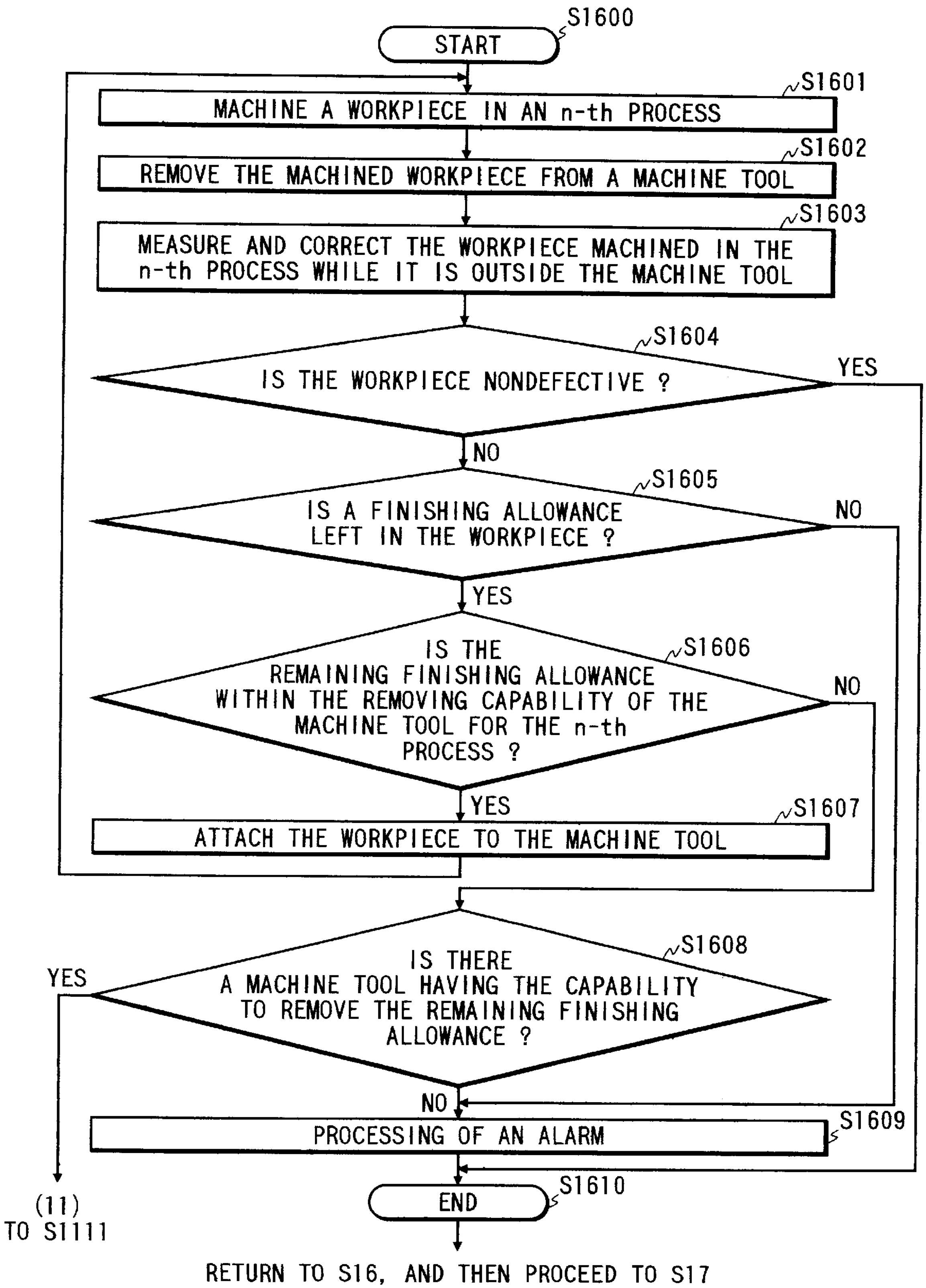
FIG. 28 is a flowchart for machining a workpiece in an n-th process and measuring the workpiece on a machine tool, with regard to step 16 of the processing method according to the embodiment of the present invention, in which the measurement of material is not included.

FIG. 28 shows details of procedures associated with the machining, measurement, correction, and reworking of a workpiece for the n-th process are carried out in step 16.

The processing starts from step 1600. The workpiece is machined in step 1601, using the n-th process machine program generated in step 1108.

Control of machining power during the course of the machining operation is carried out in the same manner as in previously mentioned step 1501.

Upon completion of the machining operation, the workpiece is removed from the machine tool in step 1602. The thus machined workpiece is then measured for the n-th process outside the machine tool in step 1603, and the measured workpiece is then corrected. The correction of the workpiece is made with regard to the mechanical position or a tool correction.

Details of the measurement and correction of the machined workpiece are carried out in the same as the measurement and correction of the workpiece carried out in step 1502.

A decision as to whether or not the result of the measurement carried out in step 1603 is acceptable is made in step 1604. If the resultant workpiece is non-defective, the current processing proceeds to step 1610.

If the resultant workpiece has been judged as to be defective, a decision as to whether or not a finishing allowance still remains in the workpiece is made in step 1605. If the finishing allowance still remains in the workpiece, a decision as to whether or not the remaining finishing allowance is within the removing volume of an n-th process machine tool s is made in step 1606. If it has been determined that the remaining finishing allowance falls within the removing volume of the n-th process machine tool, the workpiece is attached to the machine tool in step 1607. The processing returns to step 1601, and a finishing operation of the processing operations is executed.

On the other hand, if it has been determined in step 1605 that the remaining finishing allowance falls outside the removing volume of the n-th process machine tool, the processing proceeds to step 1609. An alarm is sounded in step 1609, and the processing is now completed in step 1610. The processing following this step has already been described.

On the other hand, if it has been determined in step 1606 that the remaining finishing allowance falls outside the removing volume of the n-th process machine tool, a decision as to whether or not there is a machine tool having the volume to remove the remaining finishing allowance is made in step 1608 by checking the remaining finishing allowance against the minimum removing volume stored in the machine tool file. If it has been determined that there is a machine tool having the volume to remove the remaining finishing allowance (11), the processing proceeds to step 1111 via (11) shown in FIG. 23. If it has been determined that no machine tool capable of removing the remaining finishing allowance is available, an alarm is sounded in step 1609. The processing proceeds to step 1610 and it is then completed.

Thereafter, the processing returns to step 16 and then proceeds to step 17.

The processing subsequent to step 1111 has already been described in the description of the processing procedures shown in FIG. 27.

Figure 34:
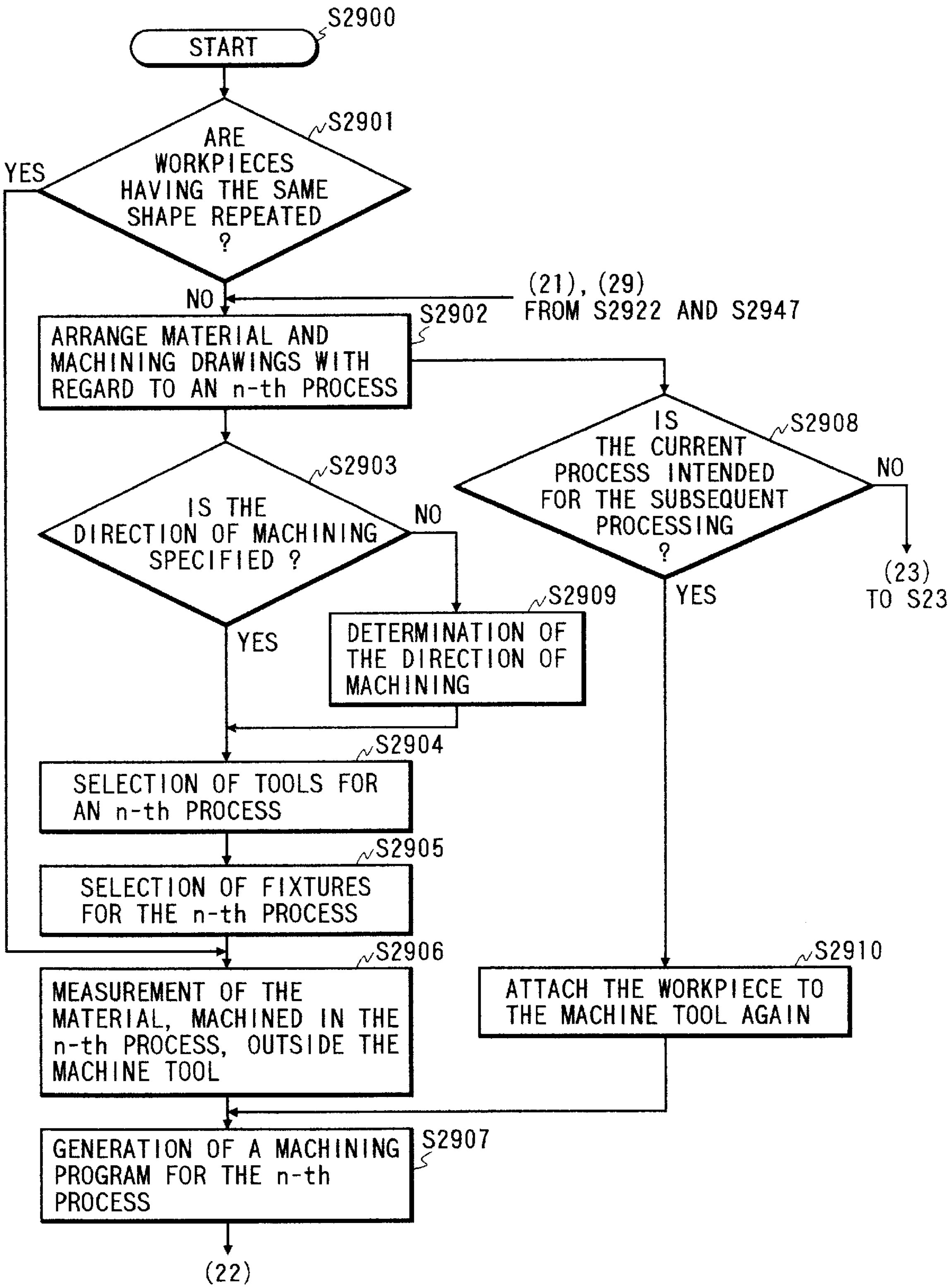
FIG. 34 is a flowchart for the off-machine measurement of a workpiece in an n-th process, the generation of a machine program, the machining of a workpiece, the off-machine measurement of a workpiece, and the correction and reworking of a machined workpiece, with regard to step 29 of processing according to the embodiment of the present invention.

Measurement of material in an n-th process and procedures for preparing a machine program in step 29 are shown in FIG. 34.

The measurement of the material starts from step 2900. A decision as to whether or not workpieces having the identical pattern are repeated is made in step 2901. If the workpieces have different patterns, material drawings and machining patterns for use in the n-th process are arranged in step 2902.

On the other hand, if it has been determined in step 2901 that the workpieces having the identical pattern are repeated, the processing proceeds to step 2906.

The material drawings and the machining patterns are arranged in step 2902 according to the following method.

On the basis of the material and machining patterns in the first machining process, a material drawing for use in the second machining process serves as a machining pattern for use in the first machining process, and the machining pattern for use in the second machining process serves as a material drawing in the third machining process. According to this rule, machining patterns related to processes are arranged.

In the present embodiment, the material drawing and the machining pattern are arranged for each process. However, they may be processed by one operation.

The result of the arrangement of the drawing and pattern is used as a machining drawing for materials or each of the processes.

Processing in step 2902 continues from step 2922 and step 2947 via (21) and (29) shown in FIG. 34, a decision is made in step 2902. If the processing continues from steps 2922 and 2947, the processing proceeds to step 2908. However, the processing does not continue from steps 2922 and 2947, the processing proceeds to step 2903.

If the processing in step 2902 continues from steps 2922 and 2947 via (21) and (29) shown in FIG. 34, a decision as to whether or not the current process is a process for the subsequent processing is made in step 2908. If the current process is the process for the subsequent processing, the processing proceeds to step 2910. The workpiece is re-fitted to the machine tool, and the processing proceeds to step 2907. If it has been determined in step 2908 that it is not the process for the subsequent processing ((23) shown in FIG. 34), the processing returns to step 23 via (23) shown in FIG. 2, and procedures following step 23 are carried out.

A decision as to whether or not the direction of a removing operation has been designated is made in step 2903.

A stress is placed on productivity when the direction of removing is determined, and hence an exemplary input item is specified using the input format.

If the direction of removing is specified, follow that direction.

If the input item is not specified, the direction of removing is determined in step 2909. After the direction of removing has been determined, the processing proceeds to step 2904.

Details of the processing in step 2909 are identical with those of the processing carried out in step 1105 shown in FIG. 26, and hence their detailed descriptions will be omitted here.

If the direction of removing is specified, the processing proceeds to step 2904.

Tools for use in the n-th process are selected in step 2904. FIG. 24 shows procedures for selecting tools for use in the n-th process in step 2904. The details of the processing are the same as those carried out in step 1106.

The selection of the tools starts from step 29040. Tools are retrieved in step 29041. For each n-th process machine tool, the tool file processed in step 220 is retrieved using pictorial codes (FIG. 12) obtained as a result of processing pictorially input data in step 807. (As described in step 220, a machinable pattern is computed by means of the tip of an input tool and holder information, and the thus computed machinable pattern is registered as a tool code (including the starting point angle and end point angle with regard to a machining operation).) All of the tools that have a match with regard to graphical processing function codes are obtained through a search. The tools obtained in step 29041 are arranged in descending order of degree of versatility and rigidity in step 29042. Upon completion of the arrangement of the tools, tools best suited to the processing are selected and determined on the basis of the maximum and minimum productivity determined by the number of tools in step 29043. The selection of the tool is completed in step 29044, and the processing returns to step 2904 and further proceeds to step 2905.

Fixtures for use in the n-th process is selected in step 2905.

FIG. 24 shows procedures for selecting fixtures for use in the n-th process in step 2905. The details of the processing are the same as those carried out in step 1107.

The selection of fixtures starts from step 29050, and fixtures are obtained through a search in step 29051. Fixtures of the machine tool file input for each of the machine tools associated with the n-th process are obtained from input drawings through a search, using the area to be chucked as a key. The diameter and limit length of each side to be machined are selected as key elements in step 29052. Then, fixtures which have lengths less than the limit of length are selected, and the thus selected fixtures are arranged in order of length from shortest to longest. After the completion of the arrangement of the fixtures, a fixture having the most approximate chucking diameter is selected, for each side to be machined in step 29053, from the fixtures selected and arranged in step 29052. A fixture in common use for double machining operations is determined as being best suited. If the fixture in common use for both machining operations is not determined, a fixture best suited for each of machining operations is selected and determined.

In the present embodiment, the following fixtures were selected according to the above described standards. Upon completion of the selection and determination of the fixture, the selection of the fixture associated with the n-th process is completed in step 29054. The processing returns to step 2905 and then proceeds to step 2906.

Figure 38:
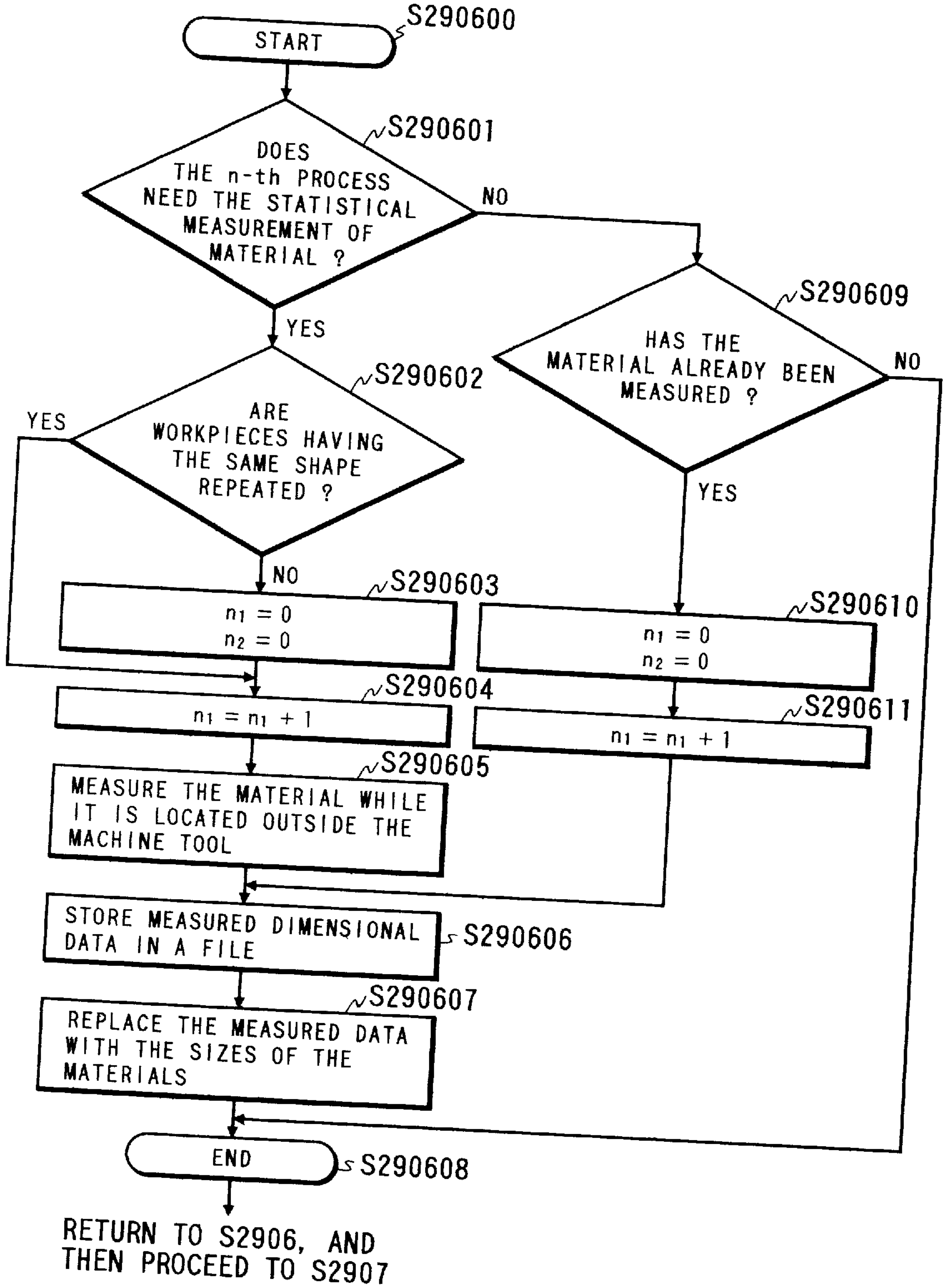
FIG. 38 is a flowchart for measuring material outside a machine tool in an n-th process, with regard to step 2906 of the processing method according to the embodiment of the present invention.

The material for the n-th process is measured outside the machine tool in step 2906. FIG. 38 shows procedures of this measurement.

FIG. 38 shows procedures of the off-machine tool measurement of the material for the n-th process carried out in step 2906.

The measurement of the material starts from step 290600. A decision as to whether or not the material should be measured in the n-th process is made in step 290601. If the material must be measured, a decision as to whether or not the workpieces having an identical pattern are repeated is made in step 290602. If the workpieces having the identical pattern are repeated, the processing proceeds to step 290604. On the other hand, if the workpieces having the identical pattern are not repeated, that is, if a new workpiece is machined, a repeat counter for counting the number of workpieces to be produced is reset to $n_1=0$ in step 290603, as well as a group repeat counter being reset to $n_2=0$.

The repeat counter for counting workpieces is counted up to $n_1=n_1+1$ in step 290604. The material is measured outside the machine tool in step 290605. The thus measured dimensional data are stored in a data region of the file in step 290606.

The size of the material is replaced with the measured size in step 290607.

The processing is now completed in step 290608, and it returns to step 2906 and further proceeds to step 2907.

In step 2907, a cutting allowance is calculated using the result of the measurement, and a machining path is generated and determined.

The procedures for generating the machining path is identical with the previously described processing procedures in step 1108.

On the other hand, if the measurement of the material in the n-th process has been judged as not to be necessary in step 290601, a decision as to whether or not the material has already been measured in the n-th process is made in step 290609. If the material has already been measured, the repeat counter for measuring the number of workpieces to be produced is reset to $n_1=0$, and the group repeat counter is also reset to $n_2=0$ in step 290610.

The repeat counter for counting the number of workpieces to be produced is counted up to $n_1=n_1+1$ in step 290611, and the processing proceeds to step 290606. The procedures following step 290606 have already been described.

If a decision as to whether or not the material has already been measured is not made in step 290609, the processing proceeds to step 200608.

The machining, off-machine measurement, correction, and re-working of the workpiece is carried out in the procedures following step 2911.

Figure 35:
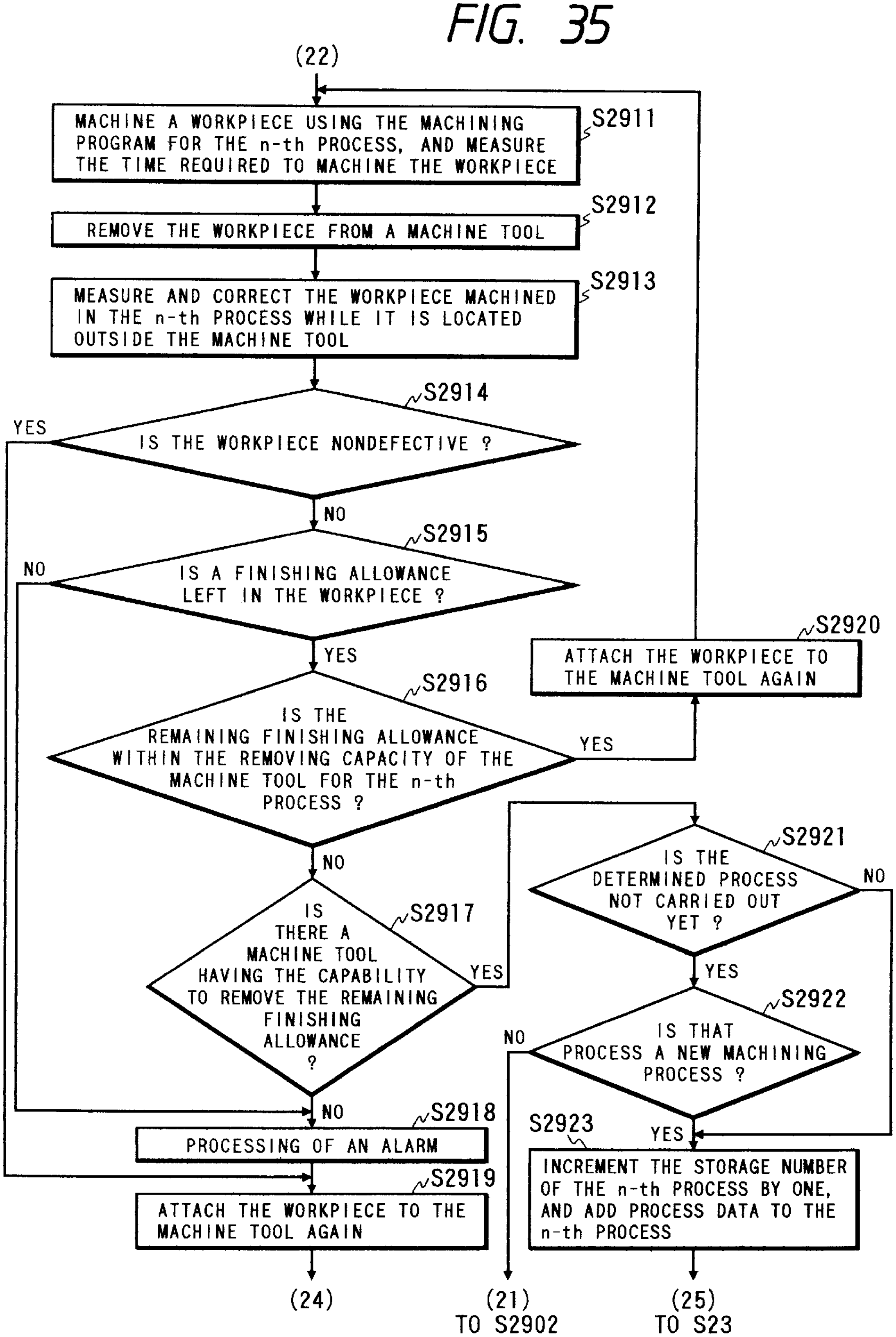
FIG. 35 is a flowchart continued from FIG. 34, that is, the flowchart for the off-machine measurement of a workpiece in an n-th process, the generation of a machine program, the machining of a workpiece, the off-machine measurement of a workpiece, and the correction and reworking of a machined workpiece, with regard to step 29 of the processing method according to the embodiment of the present invention.
Figure 36:
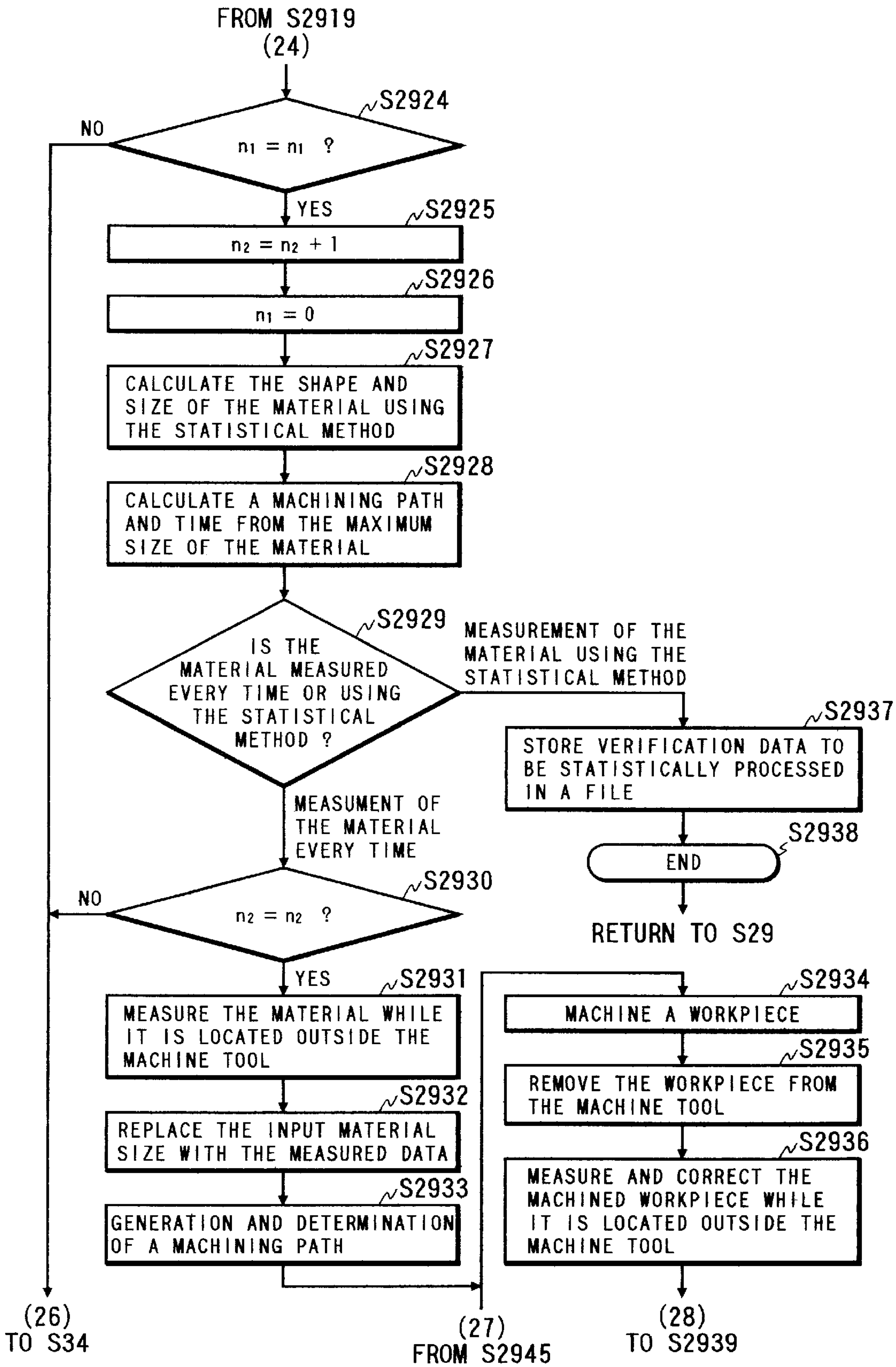
FIG. 36 is a flowchart continued from FIG. 35, that is, the flowchart for the off-machine measurement of a workpiece in an n-th process, the generation of a machine program, the machining of a workpiece, the off-machine measurement of a workpiece, and the correction and reworking of a machined workpiece, with regard to step 29 of the processing method according to the embodiment of the present invention.
Figure 37:
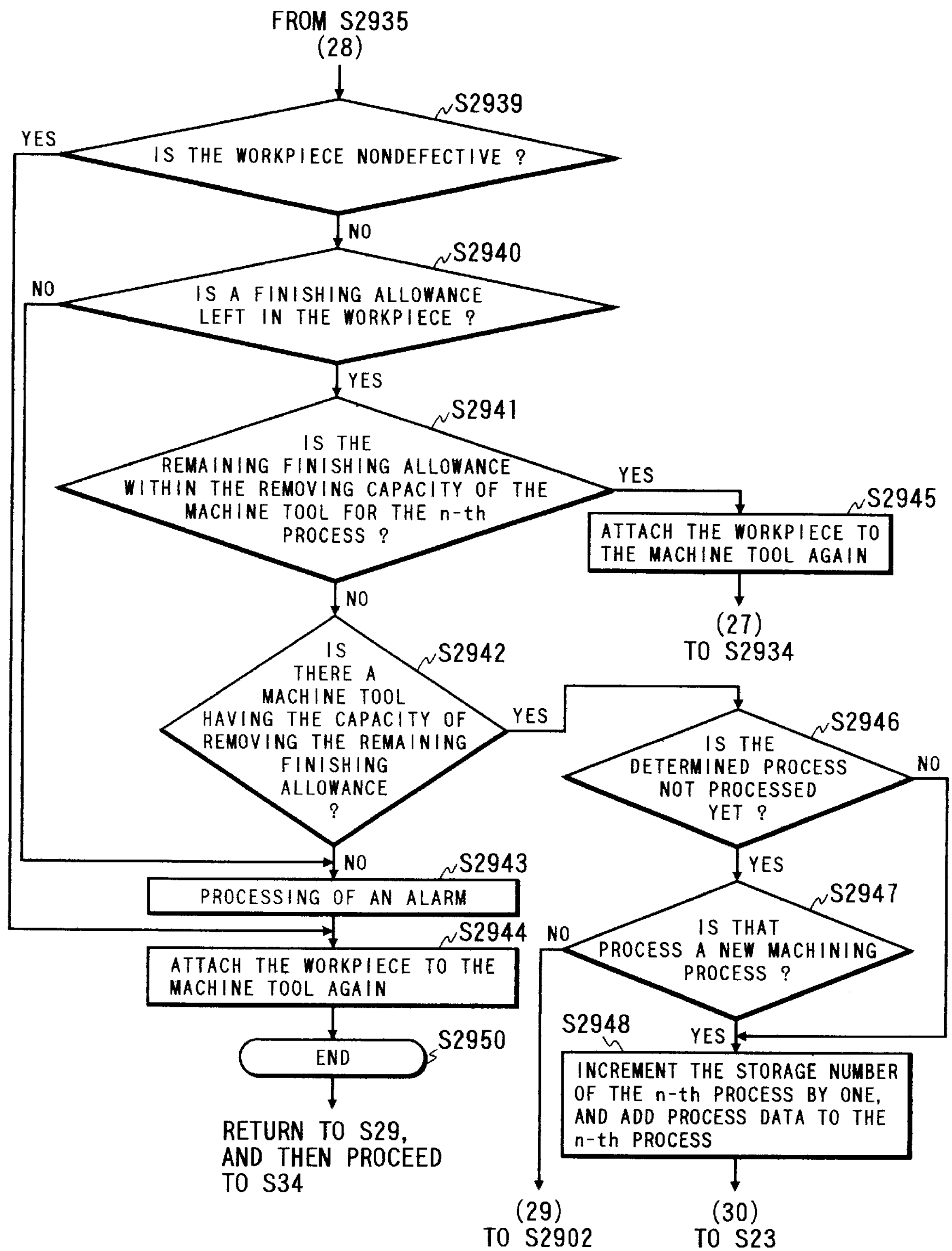
FIG. 37 is a flowchart continued from FIG. 36, that is, the flowchart for the off-machine measurement of a workpiece in an n-th process, the generation of a machine program, the machining of a workpiece, the off-machine measurement of a workpiece, and the correction and reworking of a machined workpiece, with regard to step 29 of the processing method according to the embodiment of the present invention.

FIGS. 35, 36, and 37 show procedures for the details of the processing following step 2911.

The workpiece is machined in step 2911, using the n-th process machine program generated in step 2907, and the time required to machine to the workpiece is measured. The thus measured data on the machining time are stored in a data region of the file in step 2911.

The control of the cutting power during the course of the machining operation is carried out in the same manner as in step 1501.

The workpiece is removed from the machine tool in step 2912. Then the workpiece for the n-th process is measured outside the machine tool and then corrected in step 2913.

The details of the measurement and correction of the machined workpiece are identical with those carried out in step 1502.

A decision as to whether or not the resultant workpiece is defective is made in step 2914. If the workpiece is non-defective, the processing proceeds to step 2919.

If the resultant workpiece has been judged as to be defective, a decision as to whether or not a finishing allowance still remains in the workpiece is made in step 2915. If the finishing allowance still remains in the workpiece, a decision as to whether or not the remaining finishing allowance is within the removing volume of an n-th process machine tool is made in step 2916. If it has been determined that the remaining finishing allowance falls within the removing volume of the n-th process machine tool, the workpiece is re-attached to the machine tool in step 2920. The processing returns to step 2911.

On the other hand, if it has been determined in step 2916 that the remaining finishing allowance falls outside the removing volume of the n-th process machine tool, a decision as to whether or not there is a machine tool having the volume to remove the remaining finishing allowance is made in step 2917 by checking the remaining finishing allowance against the minimum removing volume stored in the machine tool file. If it has been determined that there is a machine tool having the volume to remove the remaining finishing allowance, the processing proceeds to step 2921. If it has been determined that no machine tool capable of removing the remaining finishing allowance is available, an alarm is sounded in step 2918. The processing proceeds to step 2919.

In step 2929, the workpiece is attached again to the machine tool so as to be reworked.

In step 2917, a decision as to whether or not there is a machine tool having the volume to remove the remaining finishing allowance is made. If it has been determined that there is a machine tool having the volume to remove the remaining finishing allowance, a decision as to whether or not the process through which the machine tool capable of removing the remaining finishing allowance was selected is an unexecuted processing is made in step 2921. If that process is not executed yet, a decision whether or not that process is a new machining process is made in step 2922. If that process is not a new machining process (21), the processing returns to step 2902 via (21) shown in FIG. 34.

If it has been determined in step 2922 that processing is a new machining process, an n-th process storage number is counted up by one in step 2923, and process data are additionally stored into a storage section. After the completion of the storage of the data, the processing proceeds to step 23 via (25) shown in FIG. 2.

If the process determined in step 2921 has already been executed, the processing proceeds to step 2923.

FIG. 36 shows procedures for the processing subsequent to step 2924.

In step 2924, a decision as to whether or not the repeat counter for counting the number of workpieces to be produced has a count value of $n_1=n_1$ is made. If the count value of the counter is not $n_1=n_1$ (26), the processing returns to step 34 via (26) shown in FIG. 2, and the procedures following step 34 are executed.

On the other hand, if the count value of the counter is $n_1=n_1$, the processing proceeds to step 2925, and the group repeat counter is counted up to $n_2=n_2+1$ in step 2925.

The repeat counter for counting the number of workpieces to be produced $n_1$ is reset to $n_1=0$ in step 2926.

The shape and dimension of the material are calculated in step 2927 using the statistical processing technique.

A material data file containing data obtained as a result of measuring the material $n_1 \times n_2$ times is read, and a mean value, the maximum value, and the minimum value with regard to the shape of the material are calculated by means of a statistical processing technique such as the least square method and 3σ method.

A machining path and a machining time for the maximum size of the material calculated in step 2927 are calculated in step 2928. The method of calculating the machining path and the machining time has already been described in the descriptions for the processing in step 110519.

A mean processing time is added to the time required to measure material when the material is measured each time for machining. In step 2929, the sum of these times is compared with the time required to machine the material into a shape and a size using the previously mentioned statistical processing technique. As a result, processing which needs fewer machining time is adopted.

If it takes a longer time to machine the material using the statistical technique, a decision as to whether or not the group repeat counter has a count value of $n_2=n_2$ is made in step 2930. If the counter does not have such a count value, the statistical processing is not employed in the subsequent processing. The processing returns to step 34 via (26) shown in FIG. 2, and processing procedures following step 34 are repeated.

On the other hand, if the counter has such a count value, the material is measured outside the machine tool each time in step 2930. The input size of the material is replaced with the measured data in step 2932. A machining path is generated and determined in step 2933. The workpiece is machined in subsequent step 2934. Upon completion of the machining of the workpiece in step 2934, the workpiece is removed from the machine tool in step 2935. The workpiece is measured while it is outside the machine tool in step 2936, and it is then corrected (28). The processing proceeds to step 2939 via (28) shown in FIG. 37.

The details of the measurement and correction of the machined workpiece are identical with those carried out in previously mentioned step 1502.

If the statistical processing is selected in step 2929, the decision data obtained as a result of statistical processing are stored in a storage section of the file in step 2937, and the current processing is completed in step 2938. The processing returns to step 29 and then proceeds to step 34.

Processing procedures following step 2939 are shown in FIG. 37.

A decision as to whether or not the resultant workpiece is defective is made in step 2939. If the workpiece is non-defective, the workpiece is re-attached to the machine tool in step 2944. The current processing is now completed in step 2950, and the processing returns to step 29 and then proceeds to step 34.

If the resultant workpiece has been judged as to be defective in step 2939, a decision as to whether or not a finishing allowance still remains in the workpiece is made in step 2940. If the finishing allowance still remains in the workpiece, a decision as to whether or not the remaining finishing allowance is within the removing volume of an n-th process machine tool is made in step 2941. If it has been determined that the remaining finishing allowance falls within the removing volume of the n-th process machine tool, the workpiece is re-attached to the machine tool in step 2945 (27). The processing returns to step 2934 via (27) shown in FIG. 36. A finishing operation included in the processing is executed.

On the other hand, if it has been determined in step 2941 that the remaining finishing allowance falls outside the removing volume of the n-th process machine tool, a decision as to whether or not there is a machine tool having the volume to remove the remaining finishing allowance is made in step 2942 by checking the remaining finishing allowance against the minimum removing volume stored in the machine tool file. If it has been determined that there is a machine tool having the volume to remove the remaining finishing allowance, the processing proceeds to step 2946. If it has been determined that no machine tool capable of removing the remaining finishing allowance is available, an alarm is sounded in step 2943. The processing proceeds to step 2944.

In step 2944, the workpiece is attached again to the machine tool so as to be reworked.

Upon completion of the re-attachment of the workpiece, the current processing is now completed in step 2950, and the processing returns to step 29 and then proceeds to step 34.

In step 2942, a decision as to whether or not there is a machine tool having the volume to remove the remaining finishing allowance is made. If it has been determined that there is a machine tool having the volume to remove the remaining finishing allowance, a decision as to whether or not the process through which the machine tool capable of removing the remaining finishing allowance was selected is an unexecuted processing is made in step 2946. If that process is not executed yet, a decision whether or not that process is a new machining process is made in step 2947. If that process is not a new machining process (29), the processing returns to step 2902 via (29) shown in FIG. 34.

If it has been determined in step 2946 that processing is a new machining process, an n-th process storage number is counted up by one in step 2948, and process data are additionally stored into a storage section. After the completion of the storage of the data, the processing proceeds to step 23.

If the process determined in step 2946 has already been executed, the processing proceeds to step 2948. Upon completion of the current processing in step 2948, the processing returns to step 23 via (30) shown in FIG. 2.

Figure 39:
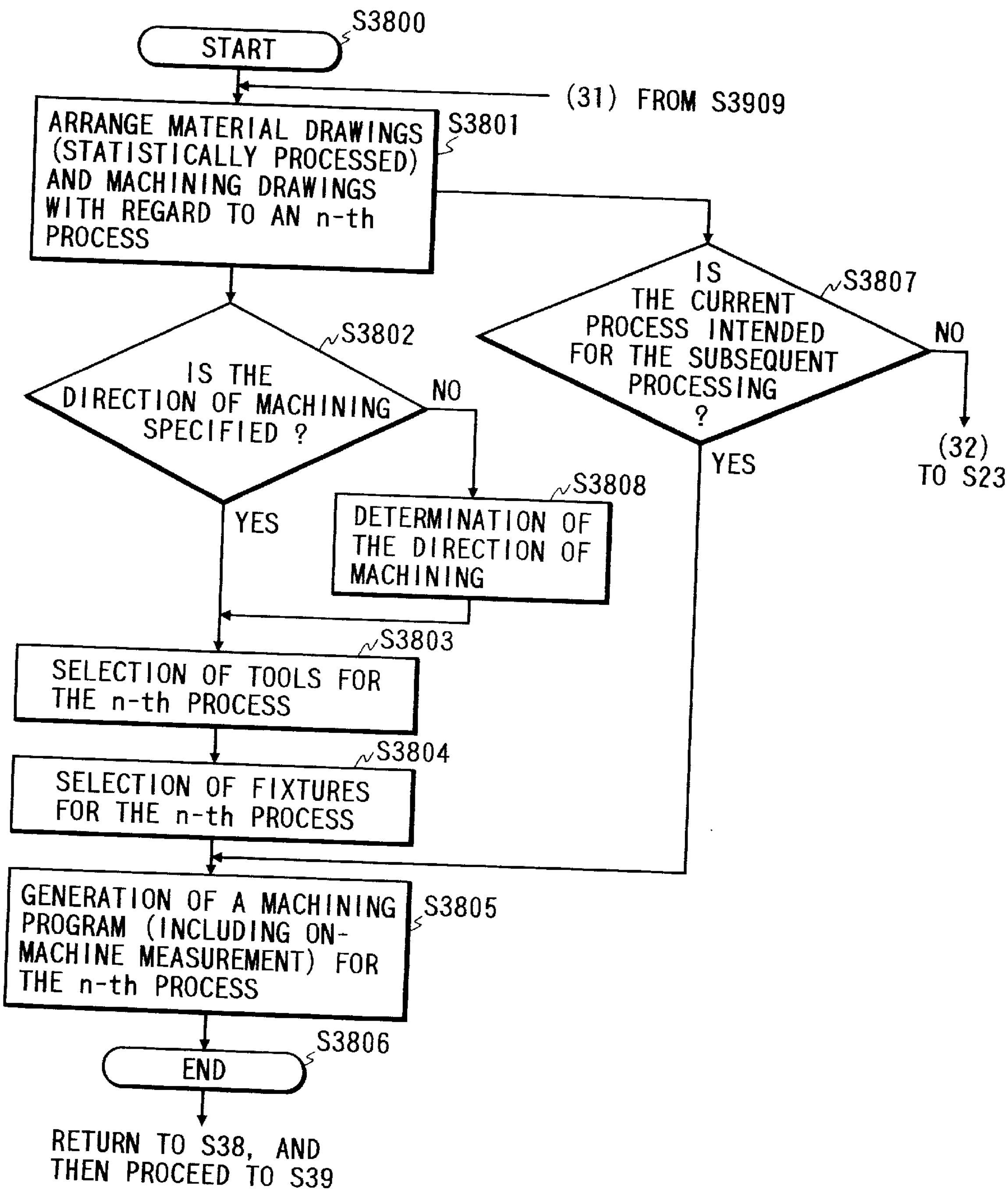
FIG. 39 is a flowchart for generating a machine program which has a function of statistically measuring material in an n-th process and a function of measuring a workpiece on a machine tool, with regard to step 38 of the processing method according to the embodiment of the present invention.

FIG. 39 shows procedures for preparing a program which statistically processes material in an n-th process and measures it on a machine tool.

The preparation of the program starts from step 3800, and statistically processed material drawings and machining patterns are arranged in step 3801.

The statistically processed material drawings and machining patterns are arranged in step 3801 in the following manner:

On the basis of the statistically processed material drawing and machining patterns in the first machining process, a material drawing for use in the second machining process serves as a machining pattern for use in the first machining process, and the machining pattern for use in the second machining process serves as a material drawing in the third machining process. According to this rule, machining patterns related to processes are arranged.

In the present embodiment, the material drawing and the machining pattern are arranged for each process. However, they may be processed by one operation.

The result of the arrangement of the drawing and pattern is used as a machining drawing for materials or each of the processes.

Processing in step 3801 continues from step 3909 via (31) shown in FIG. 39, a decision is made in step 3801. If the processing continues from step 3909, the processing proceeds to step 3807. However, the processing does not continue from step 3809, the processing proceeds to step 3802.

If the processing in step 3801 continues from step 3909 via (31) shown in FIG. 39, a decision as to whether or not the current process is a process for the subsequent processing is made in step 3807. If the current process is the process for the subsequent processing, the processing proceeds to step 3805. If it has been determined that it is not the process for the subsequent processing (32), the processing returns to step 23 via (32) shown in FIG. 2, and procedures following step 23 are carried out.

A decision as to whether or not the direction of a removing operation has been designated is made in step 3802.

A stress is placed on productivity when the direction of removing is determined, and hence an exemplary input item is specified using the input format.

If the direction of removing is specified, follow that direction.

If the input item is not specified, the direction of removing is determined in step 3808. After the direction of removing has been determined, the processing proceeds to step 3803.

Details of the processing in step 3808 are identical with those of the processing carried out in step 1105 shown in FIG. 26, and hence their detailed descriptions will be omitted here.

If the direction of removing is specified, the processing proceeds to step 3803.

Tools for use in the n-th process are selected in step 3803.

FIG. 24 shows procedures for selecting tools for use in the n-th process in step 3803. The details of the processing are the same as those carried out in step 1106.

The selection of the tools starts from step 38030. Tools are retrieved in step 38031. For each n-th process machine tool, the tool file processed in step 220 is retrieved using pictorial codes (FIG. 12) obtained as a result of processing pictorially input data in step 807. (As described in step 220, a machinable pattern is computed by means of the tip of an input tool and holder information, and the thus computed machinable pattern is registered as a tool code (including the starting point angle and end point angle with regard to a machining operation).) All of the tools that have a match with regard to graphical processing function codes are obtained through a search. The tools obtained in step 38031 are arranged in descending order of degree of versatility and rigidity in step 38032. Upon completion of the arrangement of the tools, tools best suited to the processing are selected and determined on the basis of the maximum and minimum productivity determined by the number of tools in step 38033. The selection of the tool is completed in step 38034, and the processing returns to step 3803, and further proceeds to step 3804.

Fixtures for use in the n-th process is selected in step 3804.

FIG. 25 shows procedures for selecting fixtures for use in the n-th process in step 3804. The details of the processing are the same as those carried out in step 1107.

The selection of fixtures starts from step 38040, and fixtures are obtained through a search in step 38041. Fixtures of the machine tool file input for each of the machine tools associated with the n-th process are obtained from input drawings through a search, using the area to be chucked as a key. The diameter and limit length of each side to be machined are selected as key elements in step 38042. Then, fixtures which have lengths less than the limit of length are selected, and the thus selected fixtures are arranged in order of length from shortest to longest. After the completion of the arrangement of the fixtures, a fixture having the most approximate chucking diameter is selected in step 38043, for each side to be machined, from the fixtures selected and arranged in step 38042. A fixture in common use for double machining operations is determined as being best suited. If the fixture in common use for both machining operations is not determined, a fixture best suited for each of machining operations is selected and determined. Upon completion of the selection and determination of the fixture, the selection of the fixture associated with the n-th process is completed in step 38044. The processing returns to step 3804 and then proceeds to step 3805.

A machine program which has a function of measuring the material for the n-th process on the machine tool is prepared in step 3805.

After the generation of this machine program, the current processing is now completed in step 3806, and the processing returns to step 38 and then proceeds to step 39.

Figure 40:
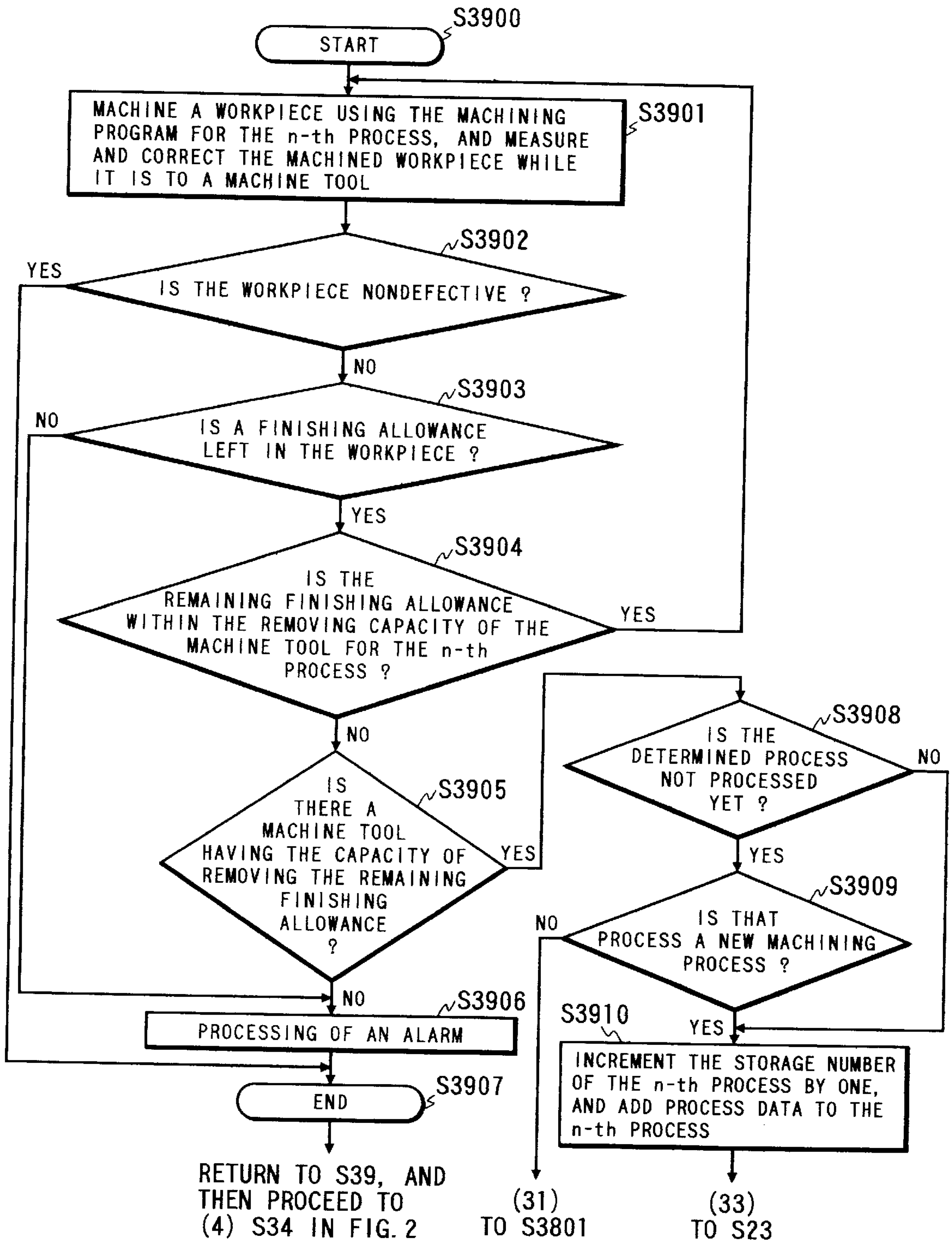
FIG. 40 is a flowchart for the machining of a workpiece in an n-th process, and the on-machine measurement, the correction, and the reworking of the machined workpiece, with regard to step 39 according to the embodiment of the present invention.

FIG. 40 shows details of procedures associated with the machining, measurement, correction, and reworking of a workpiece for the n-th process are carried out in step 39.

The processing starts from step 3900. The workpiece is machined, measured on the machine tool, and then corrected in step 3901, using the n-th process machine program generated in step 270609.

Control of machining power during the course of the machining operation is carried out in the same manner as in previously mentioned step 1501.

Details of the measurement and correction of the machined workpiece are carried out in the same as the measurement and correction of the workpiece carried out in step 1502.

A decision as to whether or not the resultant workpiece is defective is made in step 3902. If the resultant workpiece is non-defective, the current processing proceeds to step 3907.

If the resultant workpiece has been judged as to be defective, a decision as to whether or not a finishing allowance still remains in the workpiece is made in step 3903. If the finishing allowance still remains in the workpiece, a decision as to whether or not the remaining finishing allowance is within the removing volume of an n-th process machine tool is made in step 3904. If it has been determined that the remaining finishing allowance falls within the removing volume of the n-th process machine tool, the processing returns to step 3901, and operations following step 3901 are executed.

On the other hand, if it has been determined in step 3904 that the remaining finishing allowance falls outside the removing volume of the n-th process machine tool, a decision as to whether or not there is a machine tool having the volume to remove the remaining finishing allowance is made in step 3905 by checking the remaining finishing allowance against the minimum removing volume stored in the machine tool file. If it has been determined that there is a machine tool having the volume to remove the remaining finishing allowance, the processing proceeds to step 3908. If it has been determined that no machine tool capable of removing the remaining finishing allowance is available, an alarm is sounded in step 3906. The processing proceeds to step 3907. The current processing is now completed in step 3907, and the processing returns to step 39 shown in FIG. 3 and then proceeds to step 34 via (4) shown in FIG. 3 and (4) shown in FIG. 2.

In step 3905, a decision as to whether or not there is a machine tool having the volume to remove the remaining finishing allowance is made. If it has been determined that there is a machine tool having the volume to remove the remaining finishing allowance, a decision as to whether or not the process through which the machine tool capable of removing the remaining finishing allowance was selected is an unexecuted processing is made in step 3908. If that process is not executed yet, a decision whether or not that process is a new machining process is made in step 3909. If that process is not a new machining process (31), the processing returns to step 3801 via (31) shown in FIG. 39.

If it has been determined in step 3909 that processing is a new machining process, an n-th process storage number is counted up by one in step 3910, and process data are additionally stored into a storage section. After the completion of the storage of the data, the processing proceeds to step 23 via (33) shown in FIG. 2.

If the determined process has already been executed in step 3908, the processing proceeds to step 3910.

Figure 41:
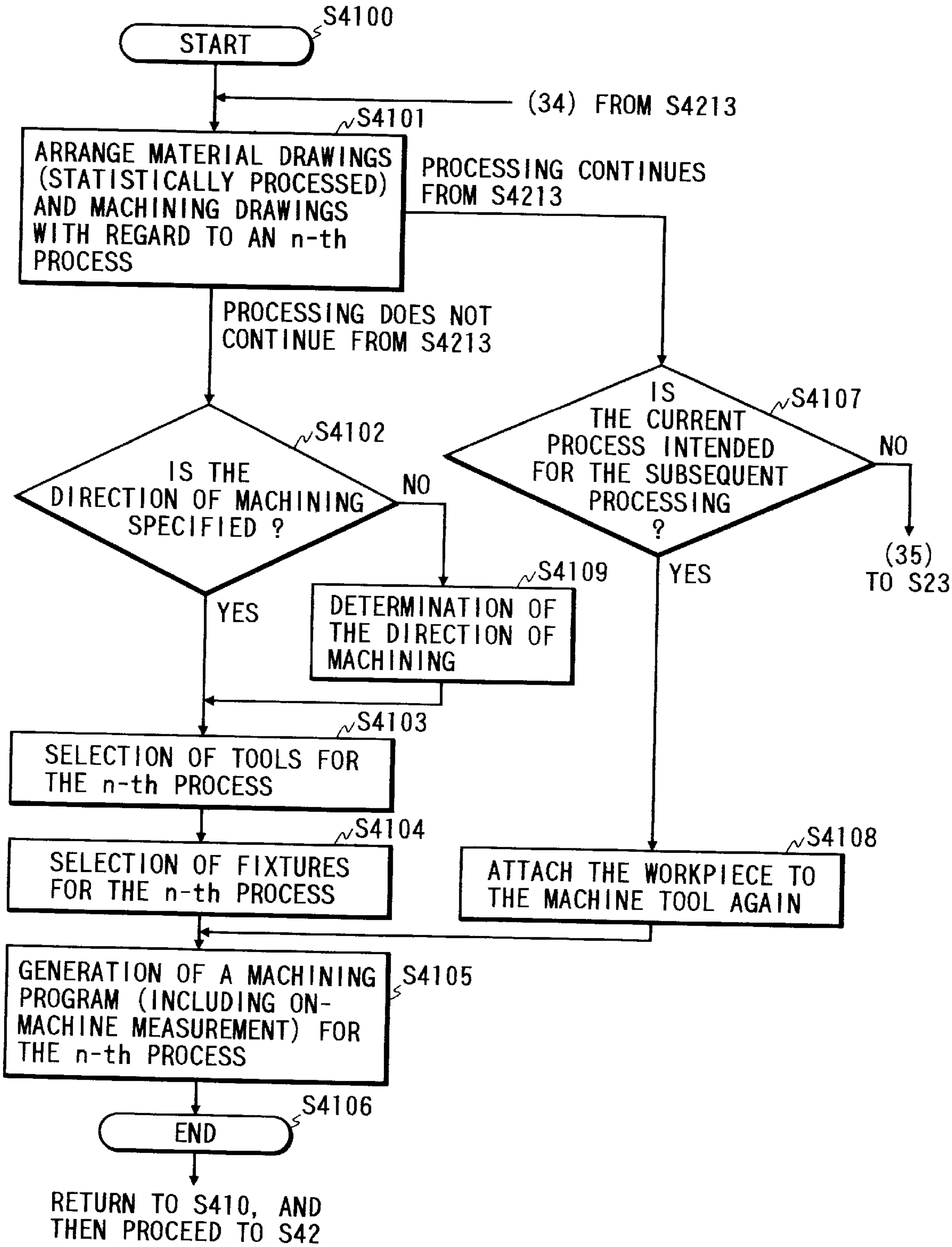
FIG. 41 is a flowchart for generating a machine program which has a function of statistically measuring material in an n-th process and a function of measuring a workpiece outside a machine tool, with regard to step 41 of the processing method according to the embodiment of the present invention.

FIG. 41 shows procedures for preparing a program which statistically processes material in an n-th process and measures it outside a machine tool.

The preparation of the program starts from step 4100, and statistically processed material drawings and machining patterns are arranged in step 4101.

The statistically processed material drawings and machining patterns are arranged in step 4101 in the following manner:

On the basis of the statistically processed material drawing and machining patterns in the first machining process, a material drawing for use in the second machining process serves as a machining pattern for use in the first machining process, and the machining pattern for use in the second machining process serves as a material drawing in the third machining process. According to this rule, machining patterns related to processes are arranged.

In the present embodiment, the material drawing and the machining pattern are arranged for each process. However, they may be processed by one operation.

The result of the arrangement of the drawing and pattern is used as a machining drawing for materials or each of the processes.

Figure 42:
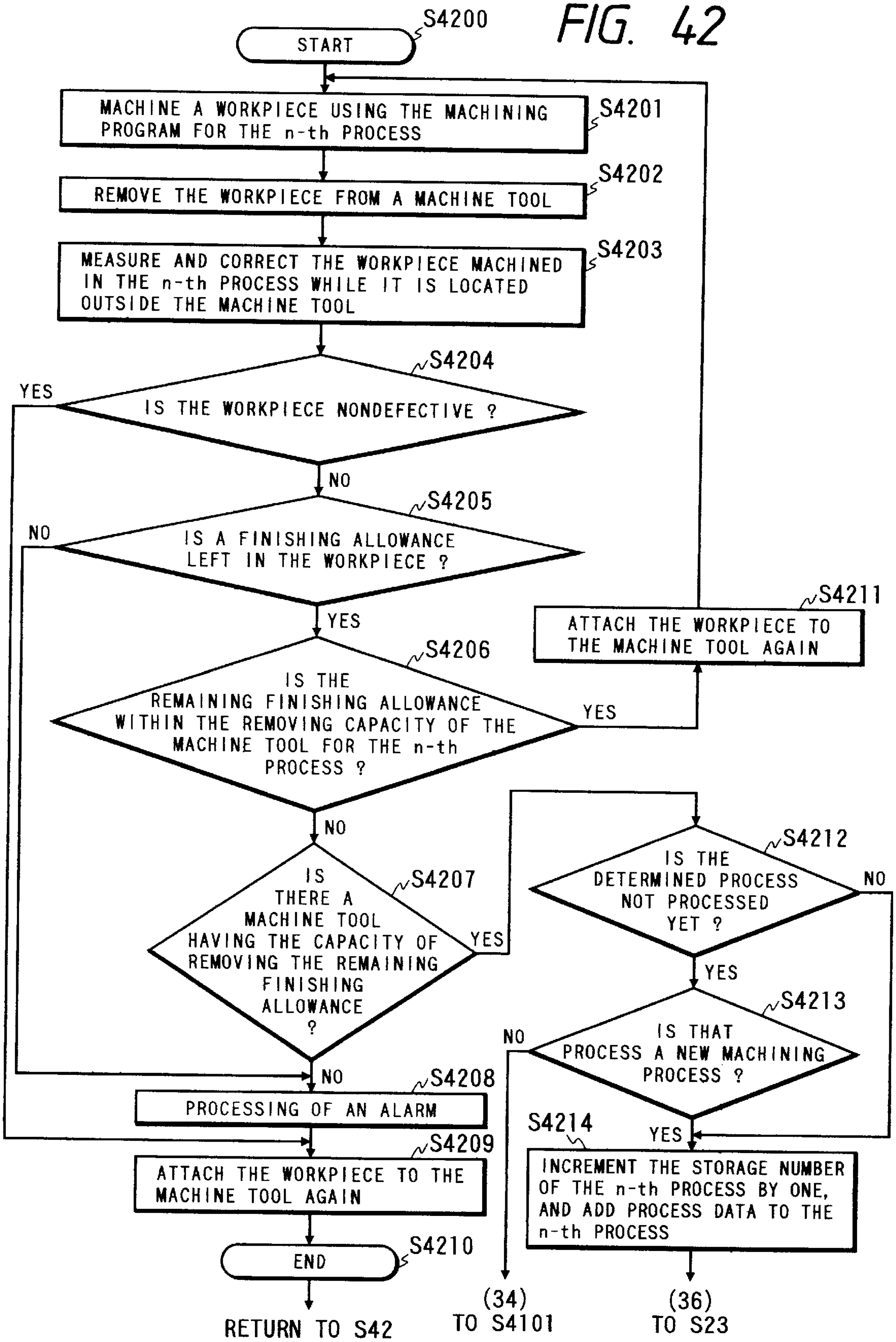
FIG. 42 is a flowchart for the machining of a workpiece in an n-th process, and the off-machine measurement, the correction, and the reworking of the machined workpiece, with regard to step 42 according to the embodiment of the present invention.

Processing in step 4101 continues from (34) shown in FIGS. 42 and 41, a decision is made in step 4101. If the processing continues from (34), the processing proceeds to step 4107.

A decision as to whether or not the current process is a process for the subsequent processing is made in step 4107. If the current process is the process for the subsequent processing, the processing proceeds to step 4108. Then, the workpiece is attached to the machine tool again. Upon completion of the attachment of the workpiece, the processing proceeds to step 4105. On the other hand, if it has been determined in step 4107 that it is not the process for the subsequent processing (35), the processing returns to step 23 via (35) shown in FIG. 2, and procedures following step 23 are carried out.

If the processing does not continue from (34), the processing proceeds to step 4102.

A decision as to whether or not the direction of a removing operation has been designated is made in step 4102.

A stress is placed on productivity when the direction of removing is determined, and hence an exemplary input item can be specified using the input format.

If the direction of removing is specified, follow that direction.

If the input item is not specified, the direction of removing is determined in step 4109. After the direction of removing has been determined, the processing proceeds to step 4103.

Details of the processing in step 4109 are identical with those of the processing carried out in step 1105 shown in FIG. 26, and hence their detailed descriptions will be omitted here.

If the direction of removing is specified, the processing proceeds to step 4103.

Tools for use in the n-th process are selected in step 4103.

FIG. 24 shows procedures for selecting tools for use in the n-th process in step 4103. The details of the processing are the same as those carried out in step 1106.

The selection of the tools starts from step 41030. Tools are retrieved in step 41031. For each n-th process machine tool, the tool file processed in step 220 is retrieved using pictorial codes (FIG. 12) obtained as a result of processing pictorially input data in step 807. (As described in step 220, a machinable pattern is computed by means of the tip of an input tool and holder information, and the thus computed machinable pattern is registered as a tool code (including the starting point angle and end point angle with regard to a machining operation).) All of the tools that have a match with regard to graphical processing function codes are obtained through a search. The tools obtained in step 41031 are arranged in descending order of degree of versatility and rigidity in step 41032. Upon completion of the arrangement of the tools, tools best suited to the processing are selected and determined on the basis of the maximum and minimum productivity determined by the number of tools in step 41033. The selection of the tool is completed in step 41034, and the processing returns to step 4103, and further proceeds to step 4104.

Fixtures for use in the n-th process is selected in step 4104.

FIG. 25 shows procedures for selecting fixtures for use in the n-th process in step 4104. The details of the processing are the same as those carried out in step 1107.

The selection of fixtures starts from step 41040, and fixtures are obtained through a search in step 41041. Fixtures of the machine tool file input for each of the machine tools associated with the n-th process are obtained from input drawings through a search, using the area to be chucked as a key. The diameter and limit length of each side to be machined are selected as key elements in step 41042. Then, fixtures which have lengths less than the limit of length are selected, and the thus selected fixtures are arranged in order of length from shortest to longest. After the completion of the arrangement of the fixtures, a fixture having the most approximate chucking diameter is selected in step 41043, for each side to be machined, from the fixtures selected and arranged in step 41042. A fixture in common use for double machining operations is determined as being best suited. If the fixture in common use for both machining operations is not determined, a fixture best suited for each of machining operations is selected and determined. Upon completion of the selection and determination of the fixture, the selection of the fixture associated with the n-th process is completed in step 41044. The processing returns to step 4104 and then proceeds to step 4105.

A machine program which has a function of measuring the material for the n-th process outside the machine tool is prepared in step 4105.

After the generation of this machine program, the current processing is now completed in step 4106, and the processing returns to step 41 and then proceeds to step 42.

FIG. 42 shows details of procedures associated with the machining, off-machine measurement, correction, and reworking of a workpiece for the n-th process are carried out in step 42.

The workpiece for the n-th process is machined, measured outside the machine tool, corrected, and then reworked in the procedures subsequent to step 4200.

FIG. 42 shows the processing procedures subsequent to step 4200.

The processing starts from step 4200. The workpiece is machined in step 4201, using the n-th process machine program generated in step 4105.

Control of machining power during the course of the machining operation is carried out in the same manner as in previously mentioned step 1501.

The workpiece is removed from the machine tool in step 4202. The thus machined workpiece for the n-th process is then measured outside the machine tool and then corrected in step 4203.

Details of the measurement and correction of the machined workpiece are carried out in the same as the measurement and correction of the workpiece carried out in step 1502.

A decision as to whether or not the resultant workpiece is defective is made in step 4204. If the resultant workpiece is non-defective, the current processing proceeds to step 4209.

If the resultant workpiece has been judged as to be defective, a decision as to whether or not a finishing allowance still remains in the workpiece is made in step 4205. If the finishing allowance still remains in the workpiece, a decision as to whether or not the remaining finishing allowance is within the removing volume of an n-th process machine tool is made in step 4206. If it has been determined that the remaining finishing allowance falls within the removing volume of the n-th process machine tool, the workpiece is re-attached to the machine tool in step 4211. The processing returns to step 4201, and a finishing operation included in the processing is executed.

On the other hand, if it has been determined in step 4206 that the remaining finishing allowance falls outside the removing volume of the n-th process machine tool, a decision as to whether or not there is a machine tool having the volume to remove the remaining finishing allowance is made in step 4207 by checking the remaining finishing allowance against the minimum removing volume stored in the machine tool file. If it has been determined that there is a machine tool having the volume to remove the remaining finishing allowance, the processing proceeds to step 4212. If it has been determined that no machine tool capable of removing the remaining finishing allowance is available, an alarm is sounded in step 4208. The processing proceeds to step 4209.

The workpiece is attached to the machine tool again so as to be reworked in step 4209.

Upon completion of the re-attachment of the workpiece, the current processing is now completed in step 4210, and the processing returns to step 42 shown in FIG. 3 and then proceeds to step 34 via (4) shown in FIG. 2.

In step 4207, a decision as to whether or not there is a machine tool having the volume to remove the remaining finishing allowance is made. If it has been determined that there is a machine tool having the volume to remove the remaining finishing allowance, a decision as to whether or not the process through which the machine tool capable of removing the remaining finishing allowance was selected is an unexecuted processing is made in step 4212. If that process is not executed yet, a decision whether or not that process is a new machining process is made in step 4213. If that process is not a new machining process (34), the processing returns to step 4101 via (34) shown in FIG. 41.

If it has been determined in step 4213 that processing is a new machining process, an n-th process storage number is counted up by one in step 4214, and process data are additionally stored into a storage section. After the completion of the storage of the data, the processing proceeds to step 23 via (36) shown in FIG. 2.

If the determined process has already been executed in step 4212, the processing proceeds to step 4214.

Third Embodiment

The first and second embodiments have been described with reference to the entries which include the turning operations associated with rotary drawings as an initial process. However, if slicing operations associated with a three-dimensional pattern is included as the initial process, entries of material and patterns in a tabular form are used. Specifically, finishing specification, accuracy specifications, pattern specifications, and positional specifications, for example, including the reference points: X, Y, and Z, the coordinates of the starting point: X, Y, and Z for each of the external and internal side of a plane, and the coordinates of the end point: X, Y, and Z for the same, and finishing symbols of the plane are added to the entries. As a result, it becomes possible to expand the machining method.

Still further, although the present invention has been described referring to the cutting operations in the above embodiments, it is also applicable to an assembling operation, a welding operation, transportation, the machining of wood products using a machine tool, and robotics.

The present invention is constituted in the manner as has been described above, and therefore the following advantageous results will be resultantly obtained.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has finished undergoing another process; identification of the pattern; a decision with regard to a machining process; a decision as to whether or not material should be measured; if the measurement of the material has been judged to be unnecessary, generation of a machine program for each process and a decision as to whether or not the material can be measured on the machine; and, if the material can be measured on the machine, machining a workpiece in each process, measurement of the workpiece on the machine, correction of the workpiece, reworking of the workpiece if the workpiece has been judged to be defective, and measurement of the workpiece after it has been reworked. Accordingly, material is measured on condition that the measurement of the material is unnecessary, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the measurement of the material has been judged to be unnecessary, generation of a machine program for each process and a decision as to whether or not the material can be measured on the machine; and, if the material cannot be measured on the machine, machining of a workpiece in each process, measurement of the workpiece outside the machine, correction of the workpiece, reworking of the workpiece if it has been judged as to be defective, and measurement of the workpiece after it has been reworked. Accordingly, material is machined on condition that the measurement of the material is unnecessary, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the measurement of the material has been judged to be necessary, a decision as to whether or not the material should be measured in the machining process; if the measurement of the material in the process has been judged to be necessary, a decision as to whether or not statistical processing of the material is necessary; if the statistical processing of the material has been judged to be unnecessary, a decision as to whether or not the material can be measured on the machine; and, if the material can be judged on the machine, measuring the material in each process, generation of a machine program, machining of a workpiece in each process, measuring the workpiece on the machine, correction of the workpiece, reworking of the workpiece if it has been judged as to be defective, and measurement of the workpiece after it has been reworked. Accordingly, material is machined on condition that the measurement of the material is necessary, that the material is measured in each process, that the statistical processing of the material is unnecessary, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not statistical processing of the material is necessary; if the statistical processing of the material has been judged to be unnecessary, a decision as to whether or not the material can be measured on the machine; and, if it is impossible to measure the material on the machine, measurement of the material outside the machine in each process, generation of a machine program, machining of a workpiece in each process, measurement of the workpiece outside the machine, correction of the workpiece, reworking of the workpiece if it has been judged as to be defective, and measurement of the reworked workpiece. Accordingly, material is machined on condition that the measurement of the material is necessary, that the material is measured in each process, that the statistical processing of the material is unnecessary, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision whether or not the material should be measured in the machining process; if the material should be measured in the process, a decision as to whether or not statistical processing of the material is necessary; if the statistical processing of the material is necessary, a decision as to whether or not a statistical measurement review number has been achieved; if the statistical measurement review number has been achieved, measurement of the material, arrangement of data on the result of the measurement, and a decision as to whether or not variations in the material fall within a tolerance; if the variations are outside the tolerance, a decision whether or not the material can be measured on the machine; and, if the material can be measured on the machine, measurement of the material in each process, generation of a machine program, machining of a workpiece in each process, measurement of the workpiece on the machine, correction of the workpiece, reworking of the workpiece if it has been judged as to be defective, and measurement of the reworked workpiece. Accordingly, material is machined on condition that the measurement of the material is necessary, that the material is measured in each process, that the statistical processing of the material is necessary, that a statistical processing review number has been reached, that variations in the material are outside the tolerance, and that the on-machine measurement of the material is feasible. As a result, highly accurate machining can be efficiently carried out.

Using electronic calculators including a numerical control unit, a FA system, and a personal computer, and a series of data processing units and machine tools, a series of operations; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the machining process, a decision as to whether or not the material should be statistically processed; if the material should be statistically processed, a decision as to whether or not a statistical processing review number has been reached; if the statistical processing review number has been reached, measurement of the material, arrangement of data on the result of the measurement, a decision as to whether or not variations in the material fall within a tolerance; if the variations are outside the tolerance, a decision as to whether or not the material can be measured on the machine; and, if it is impossible to measure the material on the machine, measurement of the material outside the machine in each process, generation of a machine program, machining of a workpiece in each process, measurement of the workpiece outside the machine, correction of the workpiece, reworking of the workpiece if it has been judged as to be defective, and measurement of the reworked workpiece. Accordingly, material is machined on condition that the measurement of the material is necessary, that the material is measured in each process, that the statistical processing of the material is necessary, that a statistical processing review number has been reached, that variations in the material are outside the tolerance, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not the material should be statistically processed; if the material should be statistically processed, a decision as to whether or not a statistical processing review number has been reached; if the statistical processing review number has been reached, measurement of the material, arrangement of data on the result of the measurement, a decision as to whether or not variations in the material fall within a tolerance; if the variations are within the tolerance, a decision as to whether or not the material can be measured on the machine; if the material can be measured on the machine, a decision as to whether or not a workpiece having the identical shape is repeated; and, if the workpiece having the identical shape is not repeated, generation of a machine program which statistically processes the material in each process and measures the material on the machine, machining of the workpiece in each process, measurement of the workpiece on the machine, correction of the workpiece, reworking of the workpiece if it has been judged as to be defective, and measurement of the reworked workpiece. Accordingly, workpieces having different shapes are machined on condition that the measurement of the material is necessary, that the material is measured in each process, that the statistical processing of the material is necessary, that a statistical processing review number has been reached, that variations in the material are outside the tolerance, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not the material should be statistically processed; if the material should be statistically processed, a decision as to whether or not a statistical processing review number has been reached; if the statistical processing review number has been reached, measurement of the material, arrangement of data on the result of the measurement, and a decision as to whether or not variations in the material fall within a tolerance; if the variations are within the tolerance, a decision as to whether or not the material can be measured on the machine; if the material can be measured on the machine, a decision as to whether or not a workpiece having the identical shape is repeated; and, if the workpiece having the identical shape is repeated, machining of the workpiece in each process, measurement of the workpiece on the machine, correction of the workpiece, reworking of the workpiece if it has been judged as to be defective, and measurement of the reworked workpiece. Accordingly, workpieces having the identical shape are repeatedly machined on condition that the measurement of the material is necessary, that the material is measured in each process, that the statistical processing of the material is necessary, that a statistical processing review number has been reached, that variations in the material are outside the tolerance, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not material should be statistically processed; if the material should be statistically processed, a decision as to whether or not a statistical processing review number has been reached; if the statistical processing review number has been reached, measurement of the material, arrangement of data on the result of the measurement, and a decision as to whether or not variations in the material fall within a tolerance; if the variations are within the tolerance, a decision as to whether or not the material can be measured on the machine; if it is impossible to measure the material on the machine, a decision as to whether or not a workpiece having the identical shape is repeated; and, if the workpiece having the identical shape is not repeated, generation of a machine program which statistically processes the material in each process and measures the material outside the machine, machining of the workpiece in each process, measurement of the workpiece outside the machine, correction of the workpiece, reworking of the workpiece if it has been judged as to be defective, and measurement of the reworked workpiece. Accordingly, workpieces having different shapes are machined on condition that the measurement of the material is necessary, that the material is measured in each process, that the statistical processing of the material is necessary, that a statistical processing review number has been reached, that variations in the material are within the tolerance, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not material should be statistically processed; if the material should be statistically processed, a decision as to whether or not a statistical processing review number has been reached; if the statistical processing review number has been reached, measurement of the material, arrangement of data on the result of the measurement, and a decision as to whether or not variations in the material fall within a tolerance; if the variations are within the tolerance, a decision as to whether or not the material can be measured on the machine; if it is impossible to measure the material on the machine, a decision as to whether or not a workpiece having the identical shape is repeated; and, if the workpiece having the identical shape is repeated, machining of the workpiece in each process, measurement of the workpiece outside the machine, correction of the workpiece, reworking of the workpiece if it has been judged as to be defective, and measurement of the reworked workpiece. Accordingly, workpieces having the identical shape are repeatedly machined on condition that the measurement of the material is necessary, that the material is measured in each process, that the statistical processing of the material is necessary, that a statistical processing review number has been reached, that variations in the material are within the tolerance, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not material should be statistically processed; if the material should be statistically processed, a decision as to whether or not a statistical processing review number has been reached; if the statistical processing review number has not been reached yet, a decision as to whether or not the material can be measured on the machine; if the material can be measured on the machine, a decision as to whether or not a workpiece having the identical shape is repeated; and, if the workpiece having the identical shape is not repeated, generation of a machine program which statistically processes the material in each process and measures the material on the machine, machining of the workpiece in each process, measurement of the workpiece on the machine, correction of the workpiece, reworking of the workpiece if it has been judged as to be defective, and measurement of the reworked workpiece. Accordingly, workpieces having different shapes are machined on condition that the measurement of the material is necessary, that the material is measured in each process, that the statistical processing of the material is necessary, that a statistical processing review number has not been reached yet, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material should be measured in the process, a decision as to whether or not material should be statistically processed; if the material should be statistically processed, a decision as to whether or not a statistical processing review number has been reached; if the statistical processing review number has not been reached yet, a decision as to whether or not the material can be measured on the machine; if the material can be measured on the machine, a decision as to whether or not a workpiece having the identical shape is repeated; and, if the workpiece having the identical shape is repeated, machining of the workpiece in each process, measuring the workpiece on the machine, correction of the workpiece, reworking of the workpiece if it has been judged as to be defective, and measurement of the reworked workpiece. Accordingly, workpieces having the identical shape are repeatedly machined on condition that the measurement of the material is necessary, that the material is measured in each process, that the statistical processing of the material is necessary, that a statistical processing review number has not been reached yet, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process;

identification of the pattern; a decision with regard to a machining process; a decision as to whether or not material should be measured; if the material should be measured, a decision as to whether or not the material should be measured in the machining process; if the material should be measured in the process, a decision as to whether or not material should be statistically processed; if the material should be statistically processed, a decision as to whether or not a statistical processing review number has been reached yet; if the statistical processing review number has not been reached yet, a decision as to whether or not the material can be measured on the machine; if it is impossible to measure the material on the machine, a decision as to whether or not a workpiece having the identical shape is repeated; and, if the workpiece having the identical shape is not repeated, generation of a machine program which statistically processes the material in each process and measures the material outside the machine, machining of the workpiece in each process, measurement of the workpiece outside the machine, correction of the workpiece, reworking of the workpiece if it has been judged as to be defective, and measurement of the reworked workpiece. Accordingly, workpieces having different shapes are machined on condition that the measurement of the material is necessary, that the material is measured in each process, that the statistical processing of the material is necessary, that a statistical processing review number has not been reached yet, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if the material shtuld be measured in the process, a decision as to whether or not material should be statistically processed; if the material should be statistically processed, a decision as to whether or not a statistical processing review number has been reached yet; if the statistical processing review number has not been reached yet, a decision as to whether or not the material can be measured on the machine; if it is impossible to measure the material on the machine, a decision as to whether or not a workpiece having the identical shape is repeated; and, if the workpiece having the identical shape is repeated, machining of the workpiece in each process, measurement of the workpiece outside the machine, correction of the workpiece, reworking of the workpiece if it has been judged as to be defective, and measurement of the reworked workpiece. Accordingly, workpieces having the identical shape are repeatedly machined on condition that the measurement of the material is necessary, that the material is measured in each process, that the statistical processing of the material is necessary, that a statistical processing review number has not been reached yet, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if it is unnecessary to measure the material in the process, a decision as to whether or not the material can be measured on the machine; if the material can be measured on the machine, a decision as to whether or not a workpiece having the identical shape is repeated; and, if the workpiece having the identical shape is not repeated, the generation of a machine program which statistically processes the material in each process and measures the material on the machine, machining of the workpiece in each process, measurement of the workpiece on the machine, correction of the workpiece, reworking of the workpiece if it has been judged as to be defective, and measurement of the reworked workpiece. Accordingly, workpieces having different shapes are machined on condition that the measurement of the material is necessary, that the measurement of the material carried out in each process is unnecessary, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are repeated; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if it is unnecessary to measure the material in the process, a decision as to whether or not the material can be measured on the machine; if the material can be measured on the machine, a decision as to whether or not a workpiece having the identical shape is repeated; and, if the workpiece having the identical shape is repeated, machining of the workpiece in each process, measurement of the workpiece on the machine, correction of the workpiece, reworking of the workpiece if it has been judged as to be defective, and measurement of the reworked workpiece. Accordingly, workpieces having the identical shape are repeatedly machined on condition that the measurement of the material is necessary, that the measurement of the material carried out in each process is unnecessary, and that the on-machine measurement of the material is feasible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if it is unnecessary to measure the material in the process, a decision as to whether or not the material can be measured on the machine; if it is impossible to measure the material on the machine, a decision as to whether or not a workpiece having the identical shape is repeated; and, if the workpiece having the identical shape is not repeated, generation of a machine program which statistically processes the material in each process and measures the material outside the machine, machining of the workpiece in each process, machining the workpiece in each process, measurement of the workpiece outside the machine, correction of the workpiece, reworking of the workpiece if it has been judged as to be defective, and measurement of the reworked workpiece. Accordingly, workpieces having different shapes are machined on condition that the measurement of the material is necessary, that the measurement of the material carried out in each process is unnecessary, and that the on-machine measurement of the material is impossible. As a result, highly accurate machining can be efficiently carried out.

Using electronic calculators including a numerical control unit, a FA system, and a personal computer, and a series of data processing units and machine tools, a series of operations are carried out; namely, registration of a variety of information files; inputting of machining pattern data; processing of a finished pattern; processing of a machining pattern before a workpiece has undergone another process; identification of the pattern; a decision with regard to a machining process; a decision as to whether or not material should be measured; if the material should be measured, a decision as to whether or not the material should be measured in the machining process; if it is unnecessary to measure the material in the process, a decision as to whether or not the material can be measured on the machine; if it is impossible to measure the material on the machine, a decision as to whether or not a workpiece having the identical shape is repeated; and, if the workpiece having the identical shape is repeated, machining of the workpiece in each process, machining of the workpiece in each process, measurement of the workpiece outside the machine, correction of the workpiece, reworking of the workpiece if it has been judged as to be defective, and measurement of the reworked workpiece. Accordingly, workpieces having the identical shape are repeatedly machined on condition that the measurement of the material is necessary, that the measurement of the material carried out in each process is unnecessary, and that the on-machine measurement of the material is impossible. As a result, highly accurate machining can be efficiently carried out.

At least a variety of files are registered, and machining pattern data are checked against a registered file after the machining pattern data have been input. If it is impossible to process the data because of a discrepancy between the machining pattern input data and the registered file, a warning for the addition of various kinds of files is provided to prompt the operator to carry out the re-registration of the data. Accordingly, the operator is informed that there is a discrepancy between the input machining pattern data and the data of the registered file. As a result, it is possible to reduce machining failures.

If another workpiece having a different pattern is selected after the workpieces having the identical pattern have all been used, the workpiece is machined by determining a similarity between the patterns. Accordingly, workpieces are machined while data on dissimilar workpieces are added to the file. As a result, a machining operation can be continued while the data base is improved.

For the registration of a tool information file, there are procedures with respect to at least, the inputting of tool data, the processing of the tool data, and the registration of a tool information file. In the processing of the tool data, the following processing is carried out, namely, the discrimination of stationary and rotary tools, the classification of the rotary tools, the arrangement of the tools in order of diameter, the reading of tool angles, a reference tip point and a shank size, the determination of segments which are machined by the major cutting edge and segments which are machined by the minor cutting edge, the calculation of machining angles of the major and minor cutting edges, the determination, or filling out, of segments of roughing tools and finishing tools, the calculation of the function of a tool, and the recording of processing results into a storage section. Accordingly, the registration of data to the tool file is automatically determined and executed by means of the tool data. As a result, erroneous registration of the data can be prevented.

With regard to the inputting of the tool data, the stationary tools have at least the following input items; namely, a sequence number, a tool identification number, a shank identification number, a chip identification number, specifications of a breaker (the width of the breaker (at its tip), the width of the breaker (at its dedendum), the height of a breaker (at its tip), the height of the breaker (at its dedendum), and the angle of the breaker), the rotation of the cutting edge (L/R), specifications for the major cutting edge (a clearance angle $\alpha_0$, a side rake $_f$, a back rake $_p$, and a nose radius), specifications of a minor cutting edge (1) (an angle of the minor cutting edge $\kappa'_1$, and a clearance angle $\alpha\kappa'_1$), specifications of a minor cutting edge (2) (an angle of the minor cutting edge $'_2$, and a clearance angle $\alpha\ '_2$), specifications of a minor cutting edge (3) (a distance from the reference tip point which serves as the starting point: X and Z, an angle of the minor cutting edge $\kappa'_3$, a clearance angle $\alpha\kappa'_3$), the size of a shank (/ identification of a shank, radius/width, height), segments of XT/ZT (a segment of a tool attached in the direction of X and a segment of a tool attached in the direction of Z), a reference tip point, the length of projection from a tool holder, an angle of the projection from the tool holder, a mounting angle of the tool holder, the rigidity of a tool (the rigidity obtained when a load is imposed on the tool in the direction of X and the rigidity obtained when a load is imposed on the tool in the direction of Z), a tip clamping method, a cutting limit (an automatic input and a manual input), a feeding limit, the maximum cut proof stress, the permissible limits of intermittent cutting (a cut proof stress, a threshold frequency, the maximum depth of cut, and the maximum feed), a side rake of a minor cutting edge ($_f'_1$, $_f'_2$, and $_f'_3$), a back rake of a minor cutting edge ($_p'_1$, $_p'_2$, and $_p'_3$), the material of a tool, segments of roughing tools/finishing tools (R/F), and specifications for grooving tools (the widths of the grooving tools, and the depths of grooves made by the tools). Accordingly, the input of the stationary tool data can be standardized. As a result, it is possible to improve a machining efficiency as well as to make data entry efficient.

With regard to the inputting of the tool data, the stationary tools are registered by linking at least tool identification numbers to machine identification numbers, whereby the tools and the machines are correlated with each other. As a result, it is possible to match a tool with a machine in a more efficiently way.

With regard to the inputting of the tool data, the angle of a cutting edge $\kappa$ is input at least with a plus or minus sign.

On the assumption that the axis which extends from an intersection between the axis of a shank and the reference tip point along a line between the tip and the shank is set to an angle of 0-degrees, a cutting edge twisted in the counter-clockwise direction with respect to the zero axis is designated with a plus sign, and a cutting edge twisted in the clockwise direction with respect to the zero axis is designated with a minus sign. Accordingly, the direction in which the pattern is input and the direction in which the tool is input agree with each other, which in turn reduces the number of times the data are converted. As a result, it is possible to improve the efficiency of data processing as well as to make data entry efficient.

With regard to the inputting of the tool data, the stationary tools are input after having been divided into a segment of major cutting edges and a segment of minor cutting edges. Functional definitions and machining patterns are prepared using these input values. Accordingly, tools corresponding to the patterns input as a result of internal processing are selected. As a result, reliability with regard to the selection of a tool can be improved.

With regard to the inputting of the tool data, the volume of a throw-away stationary tool is input for a segment of an area to be cut by the major cutting edge and for a segment of an area to be cut by the minor cutting edge on the basis of cutting limits (the maximum depth of cut and the minimum depth of cut) and feeding limits (the maximum feed and the minimum feed), using at least a cutting edge angle, the reference inscribed circle, an apex angle, a nose radius, the maximum feed factor, a clearance angle, and a clearance angle margin. Accordingly, the volume of the tool is calculated by means of internal processing, using the input tool data. As a result, it is possible to make the machining operation more efficient.

With regard to the inputting of the tool data, the permissible limit of intermittent cutting of the stationary tool specifies at least a cut proof stress, a threshold frequency, the maximum depth of cut, and the minimum depth of cut. Accordingly, the extent to which a tool can be safely used is calculated by internal processing. As a result, the reliability of the machining can be improved.

With regard to the inputting of the tool data, the tool has a translation table for its material, and means for translating an ISO code into a manufacturer code, and vice versa. The table and the means complement non standardized codes. Accordingly, tool material codes of the tool data which have not been standardized yet are translated into standard values. As a result, it is possible to make the quality of machined workpieces uniform without the modification of a data entry method.

Of the input fool data, a segment of an area to be cut by the major cutting edge is identified by at least the direction of attachment of the cutting edge in either the X or Z direction, the presence or absence of an input shank diameter, a cutting edge angle, a reference tip point, and the presence or absence of a recess diameter of a shank width. The areas to be cut by the major cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank. Of the tool data, the segment with regard to the areas to be cut by the major cutting edge is identified by the input data, and a segment with regard to a tool and its cutting angle are calculated. As a result, the reliability of a machining operation can be improved.

Of the input tool data, the segment of an area to be cut by the minor cutting edge is identified by at least the direction of attachment of the cutting edge in either the X or Z direction, the presence or absence of an input shank diameter, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank. Accordingly, the segments of the areas to be cut by the minor cutting edge are identified by the input data, and a segment with regard to a tool and its cutting angle are calculated for each minor cutting edge. As a result, the reliability of a machining operation can be improved.

Of the input tool data, the segment of an area to be cut by the major cutting edge and the segment of an area to be cut by the minor cutting edge are identified by at least dimensional conditions with the exception of configurational conditions of the shank, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside-diameter grooving tool, an inside-diameter grooving tool, and an end-face grooving tool. Cutting angles including a machining start angle (an approach angle) and a machining end angle (an escape angle) are calculated from a cutting edge angle, a rake angle, a clearance angle, a reference tip point, and the shape and size of a shank. As a result, segments with regard to the areas to be cut by the major cutting edge and the minor cutting edge and associated cutting angles are calculated from a cutting edge angle, a rake angle, a clearance angle, the reference tip point, and the shape and size of a shank. Accordingly, the reliability of a machining operation can be improved.

Of the input tool data, the segment of an area to be cut by the major cutting edge and the segment of an area to be cut by the minor cutting edge are identified by at least the direction of attachment of the cutting edges in either the X or Z direction, the presence or absence of an input shank diameter, a cutting edge angle, a reference tip point, and the presence or absence of a recess diameter of a shank width. The areas to be cut by the minor cutting edge are provided with segments related to a boring tool, a boring and end-face cutting tool, a diameter turning tool, a diameter turning and end-face cutting tool, a diameter turning tool or an end-face cutting tool, an outside diameter grooving tool, an inside diameter grooving tool, and an end-face grooving tool. Segment codes for the areas to be cut by the tools are defined as follows:

I—a boring tool, I & IF—a boring and end-face cutting tool, IG—an inside-diameter grooving tool, IH—an internal threading tool, E—a diameter turning tool, E & EF—a diameter turning and end-face cutting tool, EG—an outside-diameter grooving tool, EH—an external threading tool, F—an end-face cutting tool, FG—an end-face grooving tool, and FH an end-face threading tool. Accordingly, the areas to be machined by tools and symbols of those tools are correlated with each other. As a result, the efficiency of the selection of a tool which matches the data formed from an input pattern can be improved.

Machining start and end angles corresponding to the segment of an area to be machined by a tool are calculated, and a result of the calculation is stored in the data processor. Consequently, the machining start and end angles corresponding to the segment of the area to be machined are stored as data.

If the tool is identified as a throw-away tip by the segment of an area to be machined and a tip code, the tool is further divided into a roughing tool and a finishing tool according to a nominal symbol of the throw-away tip. If the tool is not identified as a throw-away tip, the tool is further divided into a roughing tool and a finishing tool using input data, thereby completing the tool function. Accordingly, the tools are divided into segments by discriminating between a throw-away tip and a tip which is not a throw-away type. As a result, erroneous input of data can be prevented.

If the input tool data relate to a rotary tool, any tools having F as the first symbol of the tool identification number are further divided into a face milling cutter and an end mill according to the diameter of the tool and the length of a cutting edge of the tool. The tools are arranged in ascending order for each classification according to the diameter of the tool. The thus classified tools are registered in the tool file. Accordingly, the tools judged as rotary tools are registered in the tool file in ascending order of diameter for each classification. As a result, the speed at which a tool is retrieved and reliability with regard to the retrieval of the tool can be improved.

With regard to the inputting of the tool data, data on drills of the rotary tool consist of at least sequence numbers, tool identification numbers, shank identification numbers, tip identification numbers, specifications for the diameters of tools, specifications for tips, the number of tooth, the directions of rotation, segments of tools in the X or Z direction (XT/ZT), reference tip points, the rigidity of tools, tip clamping methods, feeding limits, the maximum cut proof stress, the permissible limits of intermittent cutting, materials of tools, segments of roughing/finishing tools (R/F), and machine identification numbers. Accordingly, the data relating to the drills of the rotary tool comprise the tool identification numbers, specifications for the drills, and the machine identification numbers. As a result, a highly reliably machining operation can be implemented.

With regard to the inputting of the tool data, data on reamers of the rotary tool consist of at least sequence numbers, tool identification numbers, shank identification numbers, tip identification numbers, specifications for the diameters of tools, the lengths of cutting edges of tools, a nominal length, specifications for tips, the number of teeth, the directions of rotation, segments of tools in the X or Z direction (XT/ZT), reference tip points, the rigidity of tools, tip clamping methods, feeding limits, the maximum cut proof stress, the permissible limits of intermittent cutting, materials of tools, segments of roughing/finishing tools (R/F), and machine identification numbers. Accordingly, the data relating to the reamers of the rotary tool comprise the tool identification numbers, the specifications for the reamers, and the machine identification numbers. As a result, a highly reliable machining operation can be implemented.

With regard to the inputting of the tool data, data on taps of the rotary tool consist of at least sequence numbers, tool identification numbers, shank identification numbers, tip identification numbers, specifications of the diameters of tools, the lengths of cutting edges of tools, a nominal length, specifications for tips, the number of teeth, the directions of rotation, segments of tools in the X or Z direction (XT/ZT), reference tip points, the rigidity of tools, tip clamping methods, feeding limits, the maximum cut proof stress, the permissible limits of intermittent cutting, the materials of tools, segments of roughing/finishing tools (R/F), and machine identification numbers. Accordingly, the data relating to the taps of the rotary tool comprise the tool identification numbers, the specifications for the taps, and the machine identification numbers. As a result, a highly reliable machining operation can be implemented.

With regard to the inputting of the tool data, data on end mills of the rotary tool consist of at least sequence numbers, tool identification numbers, shank identification numbers, tip identification numbers, specifications for the diameters of tools, the lengths of cutting edges of tools, a nominal length, specifications of tips, the number of teeth, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers. Accordingly, the data relating to the end mills of the rotary tool comprise the tool identification numbers, the specifications for the end mills, and the machine identification numbers. As a result, a highly reliable machining operation can be implemented.

With regard to the inputting of the tool data, data on side cutters of the rotary tool consist of at least sequence numbers, tool identification numbers, shank identification numbers, tip identification numbers, specifications for the diameters of tools, the widths of tools, the number of teeth, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers. Accordingly, the data relating to the side cutters of the rotary tool comprise the tool identification numbers, the specifications for the side cutters, and the machine identification numbers. As a result, a highly reliable machining operation can be implemented.

With regard to the inputting of the tool data, data on gear hobs of the rotary tool consist of at least sequence numbers, tool identification numbers, shank identification numbers, tip identification numbers, specifications for the diameters of tools, the widths of tools, the number of teeth, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, specifications for gear shaping tools, segments of roughing/finishing tools (R/F), and machine identification numbers. Accordingly, the data relating to the hobs of the rotary tool comprise the tool identification numbers, the specifications for the hobs, and the machine identification numbers. As a result, a highly reliable machining operation can be implemented.

With regard to the inputting of the tool data, data on grinding wheels for inside diameter grinding purposes of the rotary tool consist of at least sequence numbers, tool identification numbers, shank identification numbers, tip identification numbers, specifications for the diameters of tools, the lengths of cutting edges of tools, a nominal length, specifications for tips, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers. Accordingly, the data relating to the grinding wheels of the rotary tool for inside diameter grinding purposes comprise the tool identification numbers, the specifications for the grinding wheels, and the machine identification numbers. As a result, a highly reliable machining operation can be implemented.

With regard to the inputting of the tool data, data on grinding wheels for outside diameter grinding purposes of the rotary tool consist of at least sequence numbers, tool identification numbers, shank identification numbers, tip identification numbers, specifications for the diameters of tools, the lengths of cutting edges of tools, the directions of rotation, segments of tools in the X or Z direction (XT/ZT), reference tip points, the rigidity of tools, tip clamping methods, cutting limits, feeding limits, the maximum cut proof stress, the permissible limits of intermittent cutting, the materials of tools, segments of roughing/finishing tools (R/F), and machine identification numbers. Accordingly, the data relating to the grinding wheels of the rotary tool for outside diameter grinding purposes comprise the tool identification numbers, the specifications for the grinding wheels, and the machine identification numbers. As a result, a highly reliable machining operation can be implemented.

Registered data of the machine tool information file comprises at least data relating to sequence numbers of machine tools, machining volume, machine identification numbers, machining method symbols, a machining process for each of machine tools, center hole supporting and machining processes, chucking and turning processes, a grinding process, segments of absolute values and increments, machinable dimensions, center-to-center distances, specifications for the tapering of a hole, permissible machining weights, specifications for the output and speed of the main spindle, segments of the main spindle for a workpiece and a tool, mechanical efficiency, the rigidity and allowable loads of the main spindle, the rigidity and allowable loads of a tailstock, specifications for gearshifts, specifications about replacement of tools, specifications for mechanical accuracy, segments of finish allowance volume, standard machine operation time, fixture replacement time, tool preparation time, workpiece replacement time, tool replacement time, a master relating to grinding machines, a master relating to drilling and tapping machines, a master relating to milling machines, a master relating to allowable sizes of fixtures, and data on operation and time of machine tools. Accordingly, input items of the machine tool information file are standardized. As a result, a highly reliable machining operation can be efficiently implemented.

Data of the fixture file within the machine tool information file are classified into data on a turning operation, data on a milling operation, and data on a grinding operation. The data comprise at least sequence numbers, chucking volume, machine identification numbers, the maximum/minimum chucking dimensions, the number of chucking pawls, segments of equal/unequal intervals of the pawls, the stroke of pawls (on one side), segments of synchronous/asynchronous movement of pawls, a shift of the positions of pawls, the direction of a pawl which specifies the direction of shift of the pawl, a distance between the mechanical standard position and the pawl standard position, the widths of pawls, the heights of pawls, specifications for through-holes, segments of pawls by shape, size, and volume, the positions of pawls in a pressing method, pressing directions, and fixture identification numbers. Accordingly, the data on the fixture file are classified into the data on the turning operation, the data on the milling operation, and the data on the grinding operation, and thereafter the data are standardized. As a result, a highly reliable machining operation can be efficiently implemented.

Data of a fixture file which relates to a turning operation comprise at least sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications of through-holes, segments of pawls by shape, size, and volume, the positions of pawls in a pressing method, pressing directions, and fixture identification numbers. Accordingly, the data of the fixture file that relates to the turning operation comprise input items such as the chucking volume, the machine identification numbers, and the fixture identification numbers. As a result, a highly reliable machining operation can be efficiently implemented.

Data of a fixture file which relates to a milling operation comprise at least sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications of through-holes, segments of pawls by shape, size, and volume, the positions of pawls in a pressing method, pressing directions, and fixture identification numbers. Accordingly, the data of the fixture file that relates to the milling operation comprise the chucking volume, the machine identification numbers, and the fixture identification numbers. As a result, a highly reliable machining operation can be implemented.

With regard to the cylindrical grinding of a workpiece while being supported at its double center holes, data of a fixture file which relates to a grinding operation comprise sequence numbers, chucking volume, machine identification numbers, the maximum/minimum chucking dimensions, and fixture identification numbers. On the other hand, with regard to the boring of a workpiece to create inside diameter while chucking it in a cantilever fashion or the turning of a workpiece to create outside diameter while chucking it in a cantilever fashion, the data comprises sequence numbers, chucking volume, machine identification numbers, the maximum/minimum chucking dimensions, the number of chucking pawls, segments of equal/unequal intervals of the pawls, the stroke of pawls, segments of synchronous/asynchronous movement of pawls, a shift of the positions of pawls, the directions of pawls, a distance between the mechanical standard position and the pawl standard position, the widths of pawls, the heights of pawls, specifications for through-holes, segments of pawls by shape, size, and volume, the positions of pawls in a pressing method, pressing directions, and fixture identification numbers. Accordingly, the data of the fixture file that relates to the grinding operation comprise input items, such as the chucking volume, the machine identification numbers, and the fixture identification numbers, irrespective of the cylindrical grinding of a workpiece while being supported at its double center holes, the boring of a workpiece to create inside diameter while chucking it in a cantilever fashion, and the boring of a workpiece to create outside diameter while chucking it in a cantilever fashion. As a result, a highly reliable machining operation can be implemented.

Data relating to the cost information file comprises at least machine identification numbers, personnel costs, machine tool costs, running costs, and costs of tools. Accordingly, input items of the cost information file become standardized. As a result, machining conditions can be efficiently calculated, allowing for machining cost.

Data of a cost information file comprise at least the cost for purchasing machine tools, initial costs, a variety of annual expenses, and working conditions (annual uptime, the presence or absence of work shifts, a working shift pattern, and a pattern of days off). Costs are obtained using an expression for calculating hourly expenses which is based on the file containing the above mentioned data. Accordingly, the hourly expenses are calculated taking into consideration a variety of expenditures. As a result, the reliability of the machining conditions that were calculated taking into consideration machining cost can be improved.

Data of a finishing allowance information file is provided with a format capable of discriminating at least between an outer diameter and an inner diameter and between a workpiece including a refining allowance and a workpiece without a refining allowance. The format is arranged so as to assign a finishing allowance to the inside of a segment composed of combinations of diameters and lengths, and it is also capable of reading a grinding allowance per diameter. A finishing allowance of a rod material requires an end face and an outer diameter finishing allowance depending on the length of a finished product and a finished diameter. Accordingly, the data on the finishing allowance are divided into segments depending on the length and diameter of a workpiece to be machined, and the thus divided data are standardized. As a result, it is possible to determine a finishing allowance needed in a machining operation in an optimum way.

In consideration of input items such as at least shapes of materials, finished shapes, and materials, data of a file related to a machining method which automatically determines a cutting path are prepared on the basis of determination data on the direction of removal with reference to a machining method having a proven track record for a particular machining operation, a ratio of diameter to length, an allowance in the X direction, an allowance in the Z direction, the direction of removal, data on the shapes of materials, and data on finished shapes. Accordingly, the data are prepared on the basis of the determination data on the removing direction, referring to the machining method having a proven track record for a particular machining operation. As a result, it is possible to determine a highly efficient and reliable machining method.

Data of a file relating to the cutting condition information are arranged in such a way that a variety of items, i.e., a cut rate, the depth of cut, and a feed, are filed as data using at least the materials of workpieces and tools as keywords. The machining conditions can be read by use of the materials of the workpieces and tools and the diameters of the tools. The materials of the tools are displayed in compliance with ISO, and the materials of the tools that use original symbols of manufacturers and users are translated into an ISO display. Using fuzzy logic, cutting conditions are obtained by substituting a given numerical value of a sequence of points, from among specific numerical values of conditions, into an interpolation equation or an expression for calculating the life of a tool. Original workpiece and tool material symbols of manufacturers and users are converted into standard symbols using a translation table. Accordingly, the data on the cutting conditions are prepared by translating the input tool material into a standard value, and by interpolating discontinuities in the input data. As a result, it is possible to implement a highly reliable machining operation on the basis of standard data whatever data are input.

Data of a surface treatment information file are made up of at least the JIS codes and variable dimensions. A procedure for processing the JIS codes and variable dimensions are obtained using input surface treatment symbols. Finished dimensions and process setting are processed using the thus obtained procedure and the dimensions. Accordingly, the pictorially input surface treatment symbol is converted into the standardized procedures and dimensions in compliance with the JIS codes. As a result, it is possible to implement a highly reliable machining operation by inputting solely a symbol used in a drawing.

Data of a thermally refining operation information file are designed in such a way that the details of heat treatment, the presence and absence of the designation of hardness, and material to be used are selected using at least heat treatment symbols as keywords. The setting of a process, erroneous input of the specification of hardness, the checking of an error in the used material, and the selection of machining conditions are carried out. Accordingly, a variety of heat treatment conditions are determined on the basis of the heat treatment symbols. As a result, it is possible to implement a machining operation, which is necessary to carry out each heat treatment, in a highly reliable way by inputting solely a heat treatment symbol.

Data of a graphics information file are classified according to at least dimensional tolerance, the shape of a screw, and a pattern. As to the dimensional tolerance, basic numerical values corresponding to tolerance symbols, dimensions, and tolerance grades are prepared as data of the file using data on basic tolerances (upper or lower tolerances), basic IT tolerance, and differences in the grade of the IT tolerance. The tolerance is calculated from the basic numerical values that serve as a reference with respect to input tolerance symbols, input dimensions, and input tolerance grades of an area to be machined, using a tolerance calculation equation. Accordingly, the data on the tolerance are determined on the basis of the input tolerance symbol, dimensions, and tolerance grade. As a result, it is possible to implement a highly reliable machining operation by inputting solely a symbol used in a drawing.

The data of the graphics information file are classified according to at least dimensional tolerance, the shape of a screw, and a pattern. Data of a screw shape file comprise at least segments for the nominal designation of screws, nominal diameters of screws, pitches, grades, an upper dimension of an outer diameter, a lower dimension of the outer diameter, an upper dimension of an effective diameter, a lower dimension of the effective diameter, and the minimum root radius. Accordingly, threading specifications are determined on the basis of input data with regard to the shape of a screw thread. As a result, it is possible to implement a highly reliable machining operation by inputting solely a symbol used in a drawing.

The data of the graphics information file are classified according to at least dimensional tolerance, the shape of a screw, and a pattern. Data of the pre-formed hole file comprise at least nominal diameters of screws, pitches, the diameters of pre-formed holes, and the diameter of a chamfer of a screw. Accordingly, pre-forming specifications are determined on the basis of the input data on a pre-formed hole of a screw thread. As a result, it is possible to implement a highly reliable machining operation by inputting solely a symbol used in a drawing.

The data of the graphics information file are classified according to at least dimensional tolerance, the shape of a screw, and a pattern. A variety of items of data of a shape file are formed in compliance with at least a data entry format. An input format of each data item is provided with a standardized pattern and a shape identification code. Data of a groove shape file comprise at least the type of groove, specifications for the bottom of a groove, specifications for groove width, a finish of a groove end face, specifications for the removal of the corners of a groove, and specifications for the chamfering of a groove. Data of a center hole shape file comprise at least an angle of a center hole, a nominal diameter of the center hole, a larger diameter of the center hole, the diameter of a chamfer, the diameter of a counterbore, the depth of a nominal diameter, the depth of a counterbore, the depth of a chamfer, and the radius from the center of a round.

Data of a keyway shape file comprise at least the segments of keyways, specifications for the widths of the keyways, the total lengths of the keyways, specifications for the depths of the keyways, the type of the keyway, specifications for cutters, and specifications for the reference positions of the keyways.

Data of a file relating to the type of shape of a keyway comprise at least the type of groove and specifications for cutters.

Data of a file relating to the shape of a key slot comprise at least segments of key slots, specifications for the widths of the key slots, the total lengths of the key slots, specifications for the depths of the key slots, the type of key slot, and specifications for the reference positions of the key slots.

Data of a file relating to the shape of a hole comprise at least specifications for the reference positions of holes, specifications for the holes, specifications for a countersink, specifications for the depths of the holes, the number of the holes, and specifications for the positions of the holes.

Data of a file relating to the shape of a tapped hole comprise at least the type of tapped holes, specifications for the reference positions of the tapped holes, specifications for the tapped holes, the number of the tapped holes, specifications for the positions of the tapped holes, specifications for countersinks, specifications for the depths of the tapped holes, and specifications for pre-formed holes.

Data of a file relating to the shape of an internal cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of an end cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of a grooved cylindrical cam comprise at least the type of cam, point numbers, specifications for the coordinates of the starting point, specifications for the coordinates of the end point, the dimension of the radius of a circular arc, the type of groove, and specifications for the depths of grooves.

Data of a file relating to the shape of a groove of a grooved cylindrical cam comprise the type of groove, specifications for the widths of grooves, and specifications for the depths of the grooves.

Data of a file relating to the shape of an external cam comprise at least the type of cam, point numbers, specifications for the coordinates of the starting point, specifications for the coordinates of the end point, specifications for the radius of a circular arc, the finish of the cam surface, and specifications for chamfering the cam.

Data of a file relating to the shape of an end-face grooved cam comprise at least the type of cam, point numbers, specifications for the coordinates of the starting point, specifications for the coordinates of the end point, specifications for circular arcs, the center positions of the circular arcs, the type of groove, specifications for cam grooves, the finishing of a groove surface, specifications of the depths of cam grooves, specifications for the removal of corners at the bottom of a groove, and specifications for chamfering the grooves.

Data of a file relating to the shape of grooves of an end-face grooved cam comprise at least the types of groove, specifications for cam grooves, the finish of groove surfaces, specifications for the depths of cam grooves, specifications for the removal of corners at the bottom of the groove, and specifications for the chamfering the groove corners.

Data of a file relating to the shape of a cylindrical outside plane/a cylindrical polygon comprise the type of plane, specifications for planes, and specifications for the depths of cylindrical outside planes.

Data of a file relating to the shape of an internal gear comprise at least the type of gear, specifications for gears, specifications for base tangent length, specifications for oversize pins, and finishing specifications.

Data of a file relating to the shape of an external gear comprise at least the type of gear, specifications for gears, specifications for base tangent length, specifications for oversize pins, and finishing specifications. Accordingly, data formats of a variety of pattern files are standardized. As a result, it is possible to improve the reliability of a machining operation by means of a less erroneous data entry method.

Data of a machining method symbol information file comprise at least machining method symbols, a machining method, and the extent of roughing. Accordingly, a machining method and associated specifications are determined on the basis of the machining method symbol. As a result, it is possible to implement a highly reliable machining operation by inputting solely a symbol used in a drawing.

Data of a finishing symbol information file comprise at least finishing symbols, symbols used for a drawing, and roughness. Accordingly, a finishing method and associated specifications are determined on the basis of the finishing symbol. As a result, it is possible to implement a highly reliable machining operation by inputting solely a symbol used in a drawing.

Data of a material information file comprise at lest JIS codes, heat treatment symbols, tensile strength, hardness, and a specific cutting force. Accordingly, a machining method and associated specifications are determined on the basis of the JIS code and the heat treatment symbol. As a result, it is possible to implement a highly reliable machining operation by inputting solely a symbol used in a drawing.

Data of a positional and configurational accuracy information file comprise configurational and positional accuracy codes, the necessity or lack of necessity of a reference plane, and the designation of accuracy. Accordingly, a machining method and associated specifications are determined on the basis of the configurational and positional accuracy code, the necessity or lack of necessity of a reference plane, and the designation of accuracy. As a result, it is possible to implement a highly reliable machining operation by inputting solely a symbol used in a drawing.

Data on constants used in the tool life equation are defined for each of segments classified according to at least the material of a workpiece and the material of a tool. Accordingly, the data on constants are determined according to the materials of the workpiece and the tool. As a result, it is possible to estimate a lifespan of a tool in a highly accurate manner.

Data on the finished shape of a workpiece displayed according to the metric system comprise at least a workpiece specification input format which is included in a sequence 1 of a data entry format in a tabular form. The data are arranged in such a way as to make it possible to input:

workpiece identification numbers capable of using a variable block input system;

workpiece material identification numbers which are used as keywords for automatically complementing material data read from a file into the shape of material; and the name of a workpiece, the total length of a workpiece, the total width of the workpiece when it is input for milling, the diameter of a rod material, the material of a workpiece, the hardness of a workpiece material, the presence or absence of the heat treatment of a workpiece, the weight of a workpiece material (per one workpiece), the dimensions of a workpiece material, a machining process which the workpiece has already undergone, specifications for the finish of a workpiece which is not included in an entry (a finishing symbol and finished surface roughness), the necessity or lack of necessity of measured data for each process, the designated number of workpieces to be machined, the number of finished workpieces, revision of data used when previously input data are changed, an implementor, date, and comments. The same characters as are described in drawings are directly used as input data. Accordingly, the data on the finished shape of the workpiece displayed according to the metric system are input in a tabular form, thereby rendering the inputting of the data simple. As a result, it is possible to implement a highly reliable machining operation by inputting solely a symbol used in a drawing.

The initial value of the sequence number is one. The next sequence number is automatically generated every time the inputting of one input line has been completed. Accordingly, the data are input in an interactive manner. As a result, it is possible for even an unexperienced operator to easily input data and to execute a highly reliable machining operation.

The input format of the material shape data is used for inputting at least a sequence number, a step number, a previous C/R chamfer (C/R and size), specifications for the coordinates of the starting point (diameter and length), specifications for the coordinates of the end point (diameter and length), the radius of a circular arc, a subsequent C/R chamfer (C/R and size), and specifications for a taper/an angle/an inclination (segments, type, and size) in a tabular form. Accordingly, the material shape data are input in a tabular form, thereby rendering the inputting of the data simple. As a result, data are input according to a fixed form, and this less erroneous data entry method enables the execution of a highly reliable machining operation.

The material shape data are input with respect to the left end surface of the material and the center line of the material which serve as the point of origin. The inputting of an upper half of the drawing starts from the point of origin in a counterclockwise direction with respect to the center line. Accordingly, data entry procedures are standardized. As a result, it is possible to input data in an less erroneous manner.

The finished shape data are input with respect to the left end surface of the material and the center line of the material which serve as the point of origin. The inputting of an upper half of the drawing starts from the point of origin in a counterclockwise direction with respect to the center line. Accordingly, data entry procedures are standardized. As a result, it is possible to input a less erroneous manner.

At least a stage number is automatically counted up when the material shape data are input, which makes the inputting of the stage number unnecessary. If the coordinates of the end point and the coordinates of the starting point match with each other, the coordinates of the next starting point will be automatically input in a complementary manner even when the inputting of them is omitted. Accordingly, the coordinates of the next starting point are automatically complemented if the coordinates of the end point and the coordinates of the next starting point match with each other. As a result, it is possible to improve the reliability of data entry as well as to simplify the data entry.

The itemized data, which were at least automatically counted up and input in a complementary manner when the material shape data were input, are displayed in a discernible way in the form of combinations of, for example, a reversed display and a crosshatched display, a reversed blue display and a crosshatched black display, displays in different colors, and ornamental characters. Accordingly, the items are displayed so that the operator can discern the data that are automatically input in a complementary manner from other data items. As a result, it is possible to prompt an operator to distinguish input data from each other, which in turn provides easy operation.

The itemized data, which were at least automatically counted up and input in a complementary manner when the finished shape data were input, are displayed in a discernible way in the form of combinations of, for example, a reversed display and a crosshatched display, a reversed blue display and a crosshatched blue display, a reversed blue display and a reversed black display, displays in different colors, and ornamental characters. Accordingly, the items are displayed so that the operator can discern the data that are automatically input in a complementary manner from other data items. As a result, it is possible to prompt an operator to distinguish input data from each other, which in turn provides easy operation.

If the automatic inputting of data, the automatic counting up of the stage number, and the inputting of the coordinates of the end point on the current stage are carried out at the time of inputting the data, the coordinates of the end point of the previous stage are automatically quoted for the coordinates of the starting point of the current stage. If the input coordinates of the starting point do not match with the coordinates of the end point of the previous stage, a stage will be automatically added, and items for diameter and length will be automatically complemented. An increment of length is input together with a ±sign at the time of the inputting of the length. If length is input without the ±sign, the input is identified as the input of the absolute value.

In the inputting of the radius of a circular arc, a plus sign denotes that the circular arc starts from the coordinates of the staring point to the coordinates of the end point in a counterclockwise direction, whereas a minus sign denotes that the circular arc starts from the coordinates of the starting point to the coordinates of the end point in a clockwise direction. A taper is designated by T, an angle is designated by A, and a slope is designated by S. The type of taper is designated by four alphanumerics. The first two characters show the type of taper, and the following two characteristics show the size of the taper. The sizes of a taper and a slope are input in the form of a series of digits including a decimal point. The digits to the left of the decimal point show a numerator, and the digits to the right of the decimal point show a denominator. Accordingly, procedures for inputting data with regard to a length and the radius of a circular and rules for inputting taper data are standardized. As a result, it is possible to reduce data entry errors.

A data format for inputting finished shapes has at least the following items arranged in a tabular form, namely, a sequence stage number, a previous C/R chamfer (C/R and size), specifications for the coordinates of the starting point (diameter and length), specifications for the coordinates of the end point (diameter and length), the radius of a circular arc, a subsequent C/R chamfer (C/R and size), specifications for a taper/an angle/an inclination (segments, type, and size), tolerance symbols, difference between an upper dimension and a lower dimension, finishing symbols, the roughness of a finished surface, the accuracy of shape and position, specifications for screws, specifications for a thermal refining operation, and specifications for surface treatment. Accordingly, data entry is standardized. As a result, data entry errors are reduced, which in turn enables the execution of a highly reliable machining operation.

In the inputting of data, a skip for skipping data entry is executed by use of a special key or a soft menu key set to skipping;

backspacing is carried out by use of a special key or a soft menu key set to backspacing;

quotation of data on an upper stage when the same data are used is carried out by use of a special key or a soft menu key set to quotation;

a machining method symbol is input while being added to a finishing symbol, and a decision as to whether or not machining is possible on the basis of the machining method symbol and the finishing symbol is made using a finishing symbol and a machining method symbol of a machining method symbol file;

configurational and positional accuracy data are input using at least three elements, that is, a symbol, a reference plane, and accuracy, and each of the elements is checked by verifying the elements against a configurational and positional accuracy file, whereby it is confirmed if the symbol is correct and if the reference plane is necessary;

a decision as to whether or not the inputting of a heat treatment symbol, hardness designation, and material to be used is correct, is carried out by checking them with a refining file data, and an alarm sounds if the inputting is correct;

the inputting of specifications extending over stages comprises the inputting of at least a reference stage, segments of the starting and end shoulders of a reference position, stages for which machining is designated, length and dimension with respect to the reference position, tolerance symbols, an upper tolerance, and a lower tolerance;

the inputting of grooving data comprises the inputting of at least groove numbers, a reference stage, segment (S/E) from the starting and end shoulders, stages for which grooving is designated, segments (S/E) of groove ends with reference to a specified position, specifications for dimensions with respect to the shoulders, the types of groove, specifications for the bottom of the groove, specifications for the widths of the grooves, the finishing of the starting-point side end face of the groove, the finish of the end-point side end face of the groove, specifications for the removal of corners of the groove, and specifications for the chamfering of the groove;

the inputting of keyway data comprises the inputting of at least keyway numbers, a previous stage, a subsequent stage, segments of the keyways, specifications for the widths of the keyways, the total lengths of the keyways, specifications for the depths of the keyways, the type of keyway, specifications for cutters, and specifications for the reference position of the keyway;

the inputting of key slot data comprises the inputting of at least key slot numbers, a previous stage, a subsequent stage, segments of the key slots, specifications for the widths of the key slots, the total lengths of the key slots, specifications for the depths of the key slots, the type of key slot, specifications for cutters, and specifications for the reference position of the key slot;

the inputting of reamed hole data comprises the inputting of at least the order of machining, hole numbers, stages for which reaming is designated, the type of reamed hole, specifications for the reference position, specifications for the reamed holes, specifications for countersinks, specifications for the depths of the reamed holes, the number of the reamed holes, and specifications for the positions of the reamed holes;

the inputting of tapped hole data comprises the inputting of at least the order of screwing, tapped hole numbers, stages for which tapping is designated, the type of tapped hole, specifications for the reference position, specifications for the tapped holes, the number of the tapped holes, specifications for the positions of the tapped holes, tapped hole numbers, flute spacing angles, counterbores, specifications for countersinks, specifications for the depths of tapped holes, and specifications for pre-tapped holes;

the inputting of internal cam data comprises the inputting of at least cam numbers, stages for which machining is designated, specifications for the standards of internal cams, the types of internal cam, point numbers, specifications for the coordinates of a starting point, specifications for the coordinates of an end point, specifications for the radius of a circular arc, specifications for the finishing of a cam surface, and specifications for chamfering the internal cam, or the inputting of an angle of the center of the circular arc instead of the radius of the circular arc and the coordinates of the center of the circular arc specified by a distance from the circular arc to its center;

the inputting of end cam data comprises the inputting of at least cam numbers, stages for which machining is designated, specifications for end cams, the type of cam, point numbers, specifications for the coordinates of the starting point, specifications for the coordinates of the end point, specifications for the radius of a circular arc, specifications for the finishing of a cam surface, and specifications for chamfering the cam, or inputting of the radius of the circular arc, an angle of the center of the circular arc, and a curved surface of the circular arc specified using a dimension from the shoulder of the center of the circular arc;

the inputting of grooved cylindrical cam data comprises the inputting of at least cam numbers, stages for which machining is designated, specifications for the standards of cylindrical cams, the types of grooved cylindrical cam, point numbers, specifications for the coordinates of the starting point, specifications for the coordinates of the end point, specifications for the radius of a circular arc, the types of groove, specifications for the widths of the grooves, specifications for the depths of the grooves, specifications for the removal of corners of the cam, and specifications for chamfering the cam, or the inputting of the radius of the circular arc, an angle of the center of the circular arc, and the inputting of a curved surface of the circular arc specified by a dimension from the shoulder of the center of the circular arc;

the inputting of outer cam data comprises the inputting of at least cam numbers, stages for which machining is designated, specifications for the standards of outer cams, the type of the outer cam, point numbers, specifications for the coordinates of the starting point, specifications for the coordinates of the end point, specifications for the radius of a circular arc, specifications for the finish of a cam surface, specifications for the chamfering of a cam on the starting point side in a widthwise direction, and specifications for chamfering the cam on the end point side in the widthwise direction, or the inputting of the radius of the circular arc, an angle of the center of the circular arc, and a curved surface of an arbitrary circular arc specified by a dimension from the shoulder of the center of the circular arc;

the inputting of a grooved end cam comprises the inputting of at least cam numbers, stages for which machining is designated, the type of the grooved end cam, segments of the grooved end cams, point numbers, specifications for the coordinates of the starting point, specifications for the coordinates of the end point, specifications for the radius of a circular arc, specifications of the center of the circular radius, the types of groove, specifications for grooves of the cam, the finish of a grooved surface in which the grooves have a small diameter, the finish of a grooved surface in which the grooves have a large diameter, specifications for the depths of the grooves of the cam, specifications for the removal of corners at the bottom of the groove, and specifications for chamfering the grooves, or the specification of the center position of the circular arc comprises the specified inputting of a curved surface of an arbitrary circular arc using a distance from the radius center of the circular arc, an angle of the center of the circular arc with respect to the reference point, or the X and Y coordinates;

the inputting of regular polygon data comprises the inputting of at least plane numbers, specifications for the reference position, the type of plane, the number of planes, specifications for the planes, and specifications for the depths of cylindrical outside planes;

the inputting of internal gear data comprises the inputting of at least internal gear numbers, specifications for the reference position of the internal gear, the type of the internal gear, specifications for the internal gears, specifications for oversize pins, and specifications for the finishing of an internal gear, or the inputting of specifications for base tangent lengths for use in a specifying method which measures the thickness of teeth of a gear, tolerance symbols, an upper tolerance, and a lower tolerance; and the inputting of external gear data comprises the inputting of at least external gear numbers, specifications for the reference position, the type of gear, specifications for the external gears, specifications for base tangent length, and specifications for the finish of the external gears, or the inputting of specifications for oversize pins for use in a specifying method which measures the thickness of teeth of a gear. Accordingly, the inputting of a variety of data items is standardized. As a result, it is possible to execute a highly reliable machining operation as well as to reduce data input errors.

The processing of a finished pattern is calculated from data which comprise at least a diameter, a length, a radius, a width, a depth, an angle, a nominal dimension of a screw, and tolerance symbols or tolerance (an upper tolerance and a lower tolerance). The shape and dimension of a workpiece to be machined are decided. If surface treatment is specified, data are read from a surface treatment data file, whereby the shape and dimension of the workpiece before being subjected to surface treatment are calculated. Accordingly, the final shape and dimension of the workpiece are determined on the basis the input data. As a result, a highly reliable machining operation can be efficiently implemented.

In the processing of the shape of a workpiece finished by a screw thread, upper and lower dimensions of an external or internal diameter and upper and lower dimensions of an effective diameter of a female or male screw are read from a screw shape data file. The shape and dimension of a finished workpiece are obtained by averaging the thus read data. Accordingly, the shape and dimension of the finished workpiece are determined by averaging the data with regard to screw shapes. As a result, a highly reliable machining operation can be efficiently implemented by means of simplified data entry.

In the graphical processing of a workpiece before having finished undergoing another process, a finishing allowance of each part is read from a finishing allowance data file on the basis of at least a finishing symbol of each part, finished surface roughness, and refining data, using diameter and length as keywords. The thus read finishing allowance is added to the final shape and dimension of the workpiece before undergoing surface treatment. Accordingly, a finishing allowance of each part is automatically added to the final shape and dimension of a workpiece before undergoing surface treatment. As a result, a highly reliable machining operation can be implemented by means of simplified data entry.

An external diameter, an internal diameter, an end face, and a groove are identified using at least information about the starting point and the end point. The direction of input data is calculated, and the sizes of the input data are compared with each other on the basis of the coordinates of the end and starting points, whereby signs of the data are determined. The reference of constituent line segments is represented by a line segment of X+ which serves as the reference line. A phase angle in a counterclockwise direction with respect to the reference line, that is, the line segment of X+, has a plus sign. A phase angle of the constituent line segments of the drawing is obtained by the following expression.

$$=\tan^{-1}[\{(\text{coordinates of end point; } X)-(\text{coordinates of starting point; } X)\}/\{(\text{coordinates of end point; } Z)-(\text{coordinates of starting point; } Z)\}-90^\circ$$

The discrimination of a pictorial pattern and the discrimination of pictorial space are carried out by combination of the constituent line segments. Accordingly, the pictorial pattern and the pictorial space are discriminated from each other by analyzing the input data. As a result, even in the case of a complicated shape, it is possible to implement a highly reliable machining operation by analyzing input data.

Pattern discrimination comprises at least the steps of:

judging whether or not the coordinates of the Z end point on a Z+ stage are the maximum values in a data sequence, and determining data up to the current stage as an internal diameter if the coordinates of the Z end point are the maximum values of a pattern;

judging whether or not the coordinates of the Z starting point on a Z− stage are the maximum values of the pattern if the coordinates of the Z end point have been judged as not being the maximum values of the pattern, and determining data following the current stage as an external diameter if the coordinates of the Z starting point have been judged to be the maximum values of the pattern;

judging whether the data sequence is Z+, X+, and Z± when the coordinates of the if the coordinates of the Z starting point on the Z− stage have been judged as not being the maximum values of the pattern, and judging whether or not the coordinates of the Z end point on the Z+ stage are the maximum values of the pattern if the data sequence is Z+, X+, and Z±, and determining that the data on the X+ stage relate to an end face if the coordinates of the Z end point have been judged as not being the maximum values of the pattern;

determining that the data on the X+ stage relate to a Z+ side end face if the coordinates of the Z end point on the Z+ stage have been judged as being the maximum values;

judging whether or not the data sequence is Z−, X−, and Z± if the data sequence has been judged as not being Z+, X+, and Z±, and judging whether or not the coordinates of the Z end point on the previous Z− stage are the minimum values of the pattern if the data sequence has been judged as being Z−, X−, and Z±, and determining that the data on the X− stage relate to an end face;

determining that the data on the X− stage relate to a Z0 side end face if the coordinates of the Z end point on the previous Z− stage are the minimum values of the pattern;

judging whether or not the data sequence is X+, Z+, and X− if the data sequence has been judged as not being Z−, X−, and Z±, and judging whether or not data sequences before and after the current data sequence relate to grooves if the data sequence is X+, Z+, and X−;

identifying the extent of reversal of data as a groove by removing a difference in the size of reversed X data in the case of a multistage groove, and identifying similar multistage grooves in subsequent stages by replacing the X data with pictorial data of the multistage grooves;

determining the pattern as a one-stage groove having an inner diameter if the data sequence is not X+, Z+, and X−;

determining a groove as a multistage groove having an inner diameter if the data sequences before and after the current data sequence are judged as the groove;

judging whether or not the data sequence is X−, Z−, and X+ if the data sequence has been judged as not being X+, Z+, and X−, and judging whether or not the data sequences before and after the current data sequence relate to a groove if the data sequence is X−, Z−, and X+, and determining the groove as one-stage groove having an external diameter if the data sequences before and after the current data sequence do not relate to the groove;

determining the groove as a multistage groove having an external diameter if the data sequences before and after the current data sequence are judged as the groove;

judging whether or not the data sequence is Z−, X+, and Z+ if the data sequence is judged as not to be X−, Z−, and X+, and judging whether or not the data sequences before and after the current sequence relate to a groove if the data sequence is Z−, X+, and Z+, and determining the groove as one-stage groove of the Z+ side end face if the data sequences before and after the current data sequence do not relate to the groove;

recognizing pictorial space of the data sequence and identifying a multistage groove of the Z+ side end face if the data sequences before and after the current data sequence are judged as a groove;

judging whether or not the data sequence is Z+, X−, and Z− if the data sequence has been judged as not being Z−, X+, and Z+, and judging whether or not the data sequences before and after the current data sequence relate to a groove if the data sequence is judged as Z+, X−, and Z−, and determining the groove as one-stage groove on the Z− side end face if the data sequences before and after the current data sequence have been judged as not being the groove;

determining the groove as a multistage groove on the Z− side end face if the data sequences before and after the current data sequence are judged as the groove;

adding an identification label to each of analyzed data stages; and judging absence or presence of the remaining data if the data sequence has been judged as not being Z+, X−, and Z−, and deleting the data at the beginning of the analyzed data sequence if the remaining data exist, and reading the next data and incrementing that data by one stage, and repeating these operations until there are no remaining data. Accordingly, the data with regard to several stages are compared and analyzed, and a pattern name and a pattern code are provided to each line segment. The creation, selection, and determination of a tool shape, and a decision with regard to the position of the tool are carried out on the basis of the result of the pattern identification. As a result, even in the case of a complicated shape, it is possible to implement a highly reliable machining operation by analyzing input data.

A machining process is determined by identifying the final machining process using at least data on the discrimination of machines in one sequence, the discrimination of processes, the entire length, the diameter of material, materials to be machined, workpiece materials, heat treatment, the sizes of the workpiece materials, a process which material has finished undergoing, and the number of finished workpieces, or data on center holes, tolerance symbols, upper and lower tolerances, finishing symbols, finished surface roughness, configurational and positional information, the accuracy of a screw, thermally refining symbols, hardness, specifications for surface treatment, grooves, keyways, key slots, bored keyways, holes, tapped holes, internal cams, end cams, grooved cylindrical cams, external cams, grooved end cams, cylindrical outside planes, cylindrical outside polygons, internal gears, and external gears. Accordingly, a machining process is automatically determined on the basis of input data. As a result, it is possible for even an unexperienced operator to efficiently carry out a highly reliable machining operation.

The processing of the machining process is determined by at least the steps of:

determining the presence or absence of a process which material has finished undergoing;

determining the presence or absence of heat treatment of the material using heat treatment data if there is no process which the material has finished undergoing, and judging from an input or information of a machine master file whether one piece or a plurality of pieces of workpiece material are formed if the material is subjected to heat treatment;

judging whether or not the material has double center holes if it is judged that one piece of workpiece material is to be formed, and judging from input pictorial data, in view of the diameter and length of the material, whether or not the material can be chucked in a cantilever fashion if the workpiece material has a single center hole;

determining whether or not the size of the workpiece material>(the entire length of a workpiece+2×a finishing allowance);

setting a process of cutting the material one by one if the size of the workpiece material>(the entire length of a workpiece+2×a finishing allowance);

sounding an alarm if it is judged that the size of the workpiece material≦(the entire length of a workpiece+2×a finishing allowance);

comparing the capacity of a thermally refining furnace with the size of the workpiece material if a plurality of pieces of workpiece material are to be obtained;

sounding an alarm if there is no description of the size of the workpiece material;

judging whether or not the machine is a bar feeding machine if it is judged that (the capacity of the material thermal refining furnace)≧(the size of the workpiece material), and calculating the maximum value of dead-weight deflection (δmax) from the entire length of the material if the machine is judged as the bar feeding machine;

determining δmax≦k, and setting a process of forming a plurality of pieces of workpiece material if δmax≦k;

sounding an alarm if δmax>k;

judging whether the machine is a bar feeding machine if the capacity of the thermally refining furnace is smaller than the size of the workpiece material, and determining Lc which satisfies the following three expressions if the machine is judged as not being the bar feeding machine, that is, $$Lc=(8\times E\times I\times \delta max/W)^{1/3}+\text{a tong hold},$$

$$Lc>(\text{the entire length of a workpiece+a cutting allowance})\times N+\text{a tong hold},$$

and $$Lc<(\text{the capacity of a material thermal refining furnace}),$$

where N is an integer and δmax is the maximum value of dead-weight deflection;

setting a cutting process for forming a plurality of pieces of workpiece material while the material is chucked in a cantilever fashion;

calculating δmax on the basis of the entire length of the material if the machine is judged to be a bar feeding machine;

judging whether or not δmax≦k, and calculating the length of the material to be cut by use of the following three expressions if δmax≦k, that is, $$(\text{capacity of material thermally refining furnace})\geqq\{\text{entire length of workpiece material+cutting allowance+}(2\times\text{finishing allowance})\}\times N+\text{tong hold},$$

$$Lb\geqq\{\text{entire length of a workpiece+cutting allowance+}(2\times\text{finishing allowance})\}\times N+\text{tong hold},$$

and $$Lb<(\text{capacity of material thermally refining furnace}),$$

where Lb is the length of a workpiece when the material is cut into a plurality of pieces of workpiece material while being fed on the bar feeding machine, and setting a process of cutting the material into a plurality of pieces of workpiece material while being fed on the bar feeding machine;

sounding an alarm if it is judged as δmax>k, setting the material thermally refining process;

storing the process in which the material has finished undergoing processing;

determining the presence or absence of the heat treatment of material using the heat treatment data;

judging from an input or information of the machine master file whether one piece or a plurality of pieces of workpiece material are formed, and judging whether or not the workpiece material has double center holes if it is judged that one piece of workpiece material is to be formed, and judging from the input pictorial data and data on the height of a pawl of a fixture file and the diameter to be chucked whether or not the material can be chucked in a cantilever fashion if the workpiece material has a single center hole;

determining whether or not the size of the workpiece material≧(the entire length of a workpiece+2×a finishing allowance) if the material can be chucked in a cantilever fashion;

setting a process of cutting the material one by one if the size of the workpiece material≧(the entire length of a workpiece+2×a finishing allowance);

sounding an alarm if it is judged that the size of the workpiece material<(the entire length of the workpiece+2×a finishing allowance);

judging whether or not the machine is a bar feeding machine if it is judged that a plurality of pieces of workpiece material are to be obtained, and calculating δmax from the entire length of the material if the machine is judged to be the bar feeding machine;

determining δmax≦k, and setting a process of forming a plurality of pieces of workpiece material if δmax≦k;

sounding an alarm if δmax>k; and determining Lc, which is a length of the material to be cut while being chucked in a cantilever fashion, using the following two expressions on the basis of δmax≦k if the machine is judged as not to be the bar feeding machine, that is, $$Lc=(8\times E\times I\times \delta max/w)^{1/3}+\text{tong hold},$$

and

Lc≧(the entire length of a workpiece+a cutting allowance)×N+a tong hold, where N is an integer and w is a uniform load. Accordingly, a machining process is selected and determined on the basis of the input data of a workpiece to be machined. As a result, it is possible for even an unexperienced operator to efficiently carry out a highly reliable machining operation.

The processing of the process for cutting the material one by one comprises at least the steps of:

choosing all of machines which possess cutting processes from among machines which are registered as ones to be use for cutting in a machine tool file according to material and the diameter of the material;

calculating a per-unit tentative machining time and cost by reading preparation time, preparation cost, a cross-sectional area to be hourly machined depending on material, and machining cost from a data file which includes the number of pieces of material to be machined and the selected machines; and arranging the selected machines in order of precedence of cost and in order of precedence of per-unit machining time, and recording the thus determined order of the selected machines into a cutting process file. Accordingly, the machine best suited to cut material into a single workpiece is determined. As a result, it is possible for an unexperienced operator to carry out an optimum machining operation.

The determination of the machining process comprises at least the steps of:

identifying the number of center holes;

judging whether or not the machining process includes a turning operation if workpiece material has a single center hole;

issuing a warning so that the material can be subjected to double center hole machining by inputting a tentative center hole pattern if the machining operation includes the turning operation;

determining a change of process from a single center hole machining process to a single center hole turning process if the machining process does not include the turning operation;

determining a change of process from a double center hole machining process to a double center hole supported machining process if the workpiece material is supported at its double center holes;

employing a chucked turning process if the workpiece material has no center holes;

judging, from the entire length, a finishing symbol, the roughness of a finished surface, and the position of the center, whether or not the current process is a single center hole supported turning process;

selecting all the machines that machine the center hole in another process from among machines which are registered as ones to be used in a single center hole machining process in a machine tool file according to the entire length of the machines and the diameter of material if the current process is the single center hole supported machining process, and reading preparation time, preparation costs, an hourly removal capacity, and machining costs from the file of the selected machines on the basis of the number of workpieces to be machined and the volume of the center hole to be removed, and calculating per-unit tentative machining time and tentative machining costs from the thus read data;

arranging the selected machines in order of precedence of cost and in order of precedence of per-unit machining time, and recording the thus arranged machines in the single center hole process file; and setting a process in which the center hole is formed in the workpiece material by turning while being chucked together with the execution of another machining operation if the current process is judged as not to be the single center hole supported machining process. Accordingly, machining processes are selected from the conditions with regard to the center hole machining and the turning, and a suitable machining process is determined taking into consideration the machining cost or time. As a result, it is possible for even an unexperienced operator to carry out a highly reliable machining operation in a more productive manner.

The processing of the single center hole supported turning process comprises at least the steps of:

choosing all of machines which machine the center hole in another process from among machines which are registered as ones to be used in a single center hole supported turning process in the machine tool file according to the entire length of the machines, the diameter of material, the number of workpieces to be machined, tolerance symbols, upper and lower tolerances, finishing symbols, the roughness of a finished surface, configurational and positional accuracy, and the accuracy of a screw;

reading preparation time, preparation costs, an hourly removal capacity, and machining costs from the file of the selected machines on the basis of the number of workpieces to be machined and the volume of the material to be removed as a result of a turning operation, and calculating per-unit tentative machining time and tentative machining costs from the thus read data;

arranging the selected machines in order of precedence of cost and in order of precedence of per-unit machining time, and recording the thus arranged machines in a single center hole supported turning process file. Accordingly, the machine best suited to turning of a workpiece while being supported at its single center hole is determined on the basis of the input data and the machining cost or time. As a result, it is possible for even an unexperienced operator to carry out a highly reliable machining operation in a more productive manner.

The selection of a machine for use in a double center hole machining process comprises at least the steps of:

judging from the entire length of a workpiece material, a finishing symbol, the roughness of a finished surface, and the position of the center hole whether or not the current process is the double center hole supported machining process;

checking the process with a file possessing data on the presence or absence of special specifications of the center hole if the current process is the double center hole supported machining process;

choosing all of machines which machine double center holes in another process from among machines which are registered as ones to be used in a standard double center hole machining process in the machine tool file if the center holes do not have any special specifications;

reading preparation time, preparation costs, an hourly removal capacity, and machining costs from the file of the selected machines on the basis of the number of workpieces to be machined and the volume of the material to be removed as a result of machining, and calculating per-unit tentative machining time and tentative machining costs from the thus read data;

arranging the selected machines in order of precedence of cost and in order of precedence of per-unit machining time, and recording the thus arranged machines in a double center hole drilling process file;

discriminating between the single center hole machining process and the chucked machining process if the current process is judged as not to be the double center hole supported machining process from the position of the center hole;

choosing all of machines which machine double center holes in another process from among machines which are registered as ones to be used in a special double center hole machining process in the machine tool file if the center holes are identified as having special specifications;

reading preparation time, preparation costs, an hourly removal capacity, and machining costs from the file of the selected machines on the basis of the number of workpieces to be machined and the volume of the material to be removed as a result of machining, and calculating per-unit tentative machining time and tentative machining costs from the thus read data; and arranging the selected machines in order of precedence of cost and in order of precedence of per-unit machining time, and recording the thus arranged machines in a special double center hole drilling process file. Accordingly, the machine best suited to the machining of a workpiece while being supported at its double center holes is determined on the basis of the input data and the machining cost or time. As a result, it is possible for even an unexperienced operator to carry out a highly reliable machining operation in a more productive manner.

The processing of the double center hole supported turning process comprises at least the steps of:

choosing all of machines which machine the center hole in another process from among machines which are registered as ones to be used in a double center hole supported turning process in the machine tool file according to the entire length of the machines, the diameter of material, the number of workpieces to be machined, tolerance symbols, upper and lower tolerances, finishing symbols, the roughness of a finished surface, configurational and positional accuracy, and the accuracy of a screw;

reading preparation time, preparation costs, an hourly removal capacity, and machining costs from the file of the selected machines on the basis of the number of workpieces to be machined and the volume of the material to be removed as a result of a turning operation, and calculating per-unit tentative machining time and tentative machining costs from the thus read data;

arranging the selected machines in order of precedence of cost and in order of precedence of per-unit machining time, and recording the thus arranged machines in a double center hole supported turning process file. Accordingly, the machine best suited to the turning of a workpiece while being supported at its double center holes is determined on the basis of the input data and the machining cost or time. As a result, it is possible for even an unexperienced operator to carry out a highly reliable machining operation in a more productive manner.

The process of turning material while chucking it comprises at least the steps of:

choosing all the machines, which are registered as ones to be used in turning material while chucking it, in the machine tool file, according to the entire length of material, the diameter of the material, the number of workpieces to be formed from the material, tolerance symbols, upper and lower tolerances, finishing symbols, the roughness of a finished surface, configurational and positional accuracy, and degrees of the accuracy of a screw;

calculating tentative machining time and cost per single workpiece on the basis of the number of workpieces to be produced and the volume to be removed as a result of turning, by reading preparation time, preparation cost, per-hour removing volume, machining costs, and the like, from the file of the selected machines;

calculating the volume to be removed which is used for determining an area to be machined, as well as the product of the volume to be removed and the averaged diameter of the material;

handling the product of the volume to be removed and the averaged diameter of the material as a coefficient which includes a time factor at the time of machining and is produced by obtaining an average radius between the radius of the material and the radius of the finished material in each stage, and by multiplying the volume to be removed in each stage by the average radius in each stage;

defining an area of the material between its maximum outside and minimum inside diameters, setting the maximum outside diameter and the minimum inside diameter on respective sides of the material in such a way as to be equal to half the product of the volume to be removed and the average diameter, and taking that one of the sides which has a larger product of the volume to be removed and the average diameter as a first side to be machined;

identifying whether or not the first side to be machined has a chucking allowance, and calculating tentative machining time and cost required to machine the workpiece material up to the coordinates representing the area that requires the maximum outside chucking diameter or up to the coordinates representing the area that requires the minimum inside chucking diameter, if the first side has a chucking allowance;

roughing half the material in the first machining step and the other half of the workpiece material in the second machining step, if the product of the volume to be removed and the average diameter with regard to the maximum outside diameter or the minimum inside diameter is twice or more as large as the product of the volume to be removed and the average diameter, with regard to another outside diameter or the inside diameter;

finishing the workpiece material by one operation in the second machining step if it is judged from the finishing symbols and designation of the roughness of a finished surface that a certain accuracy cannot be ensured by machining the workpiece material in several steps, or dividing the operation for finishing the workpiece material into several steps if the accuracy can be ensured, machining the area to be machined in the second machining step prior to the area to be machined in the first step irrespective of the result of the above processing procedures, if the area continued from the area to be machined in the first step will become a tapered portion having an acute cone angle or a screw thread, and no chucking allowance will be available as a result of the machining operation in the first step, and then machining the area to be machined in the first step;

calculating tentative machining time and cost required to machine the workpiece material up to the coordinates representing the opposite side of the workpiece material that has the maximum outside diameter in relation to the side of the workpiece material that is chucked, or tentative machining time and cost required to machine the workpiece material up to the coordinates representing the opposite side of the workpiece material that has the minimum inside diameter in relation to the side of the workpiece material that is chucked, if it is judged that no chucking allowance is available; and setting the machines in order according to cost and in order according to machining time, respectively, and record the prioritized machines in a file. Accordingly, the machine best suited to the turning of a workpiece while being chucked in a cantilever fashion is determined on the basis of the input data, the volume to be removed as a result of the machining operation, the machining cost and time, and machining procedures. As a result, it is possible for even an unexperienced operator to carry out a highly reliable machining operation in a more productive manner.

Processing carried out after it has been decided whether or not areas to be machined still remain comprises at least the steps of:

identifying whether or not there is a process for machining remaining areas on the basis of finishing symbols and the roughness of a finished surface;

identifying the presence or absence of a process file if an area to be machined still remains;

calculating the volume to be machined for each remaining area to be machined, and arranging the thus calculated volumes in descending order of size;

arranging a turning operation, a honing operation, a super finishing operation, and a variety of special finishing operations in descending order of degree of the roughness of a surface finished by each operation, and arranging the process, after these two elements, that is, the order of the size of the volume and the order of the degree of the roughness, have been combined together, in such a way that the priority is given to the finished surface roughness;

identifying the extent to which the inputting of data to a process has been completed if it is judged that there is a process file, and continuing the processing in order of process file if designated data entry with regard to all of the processes has already been completed; and calculating the volume to be removed for the remaining area to be machined, if data entry with regard to the process has been partially finished. Accordingly, processing associated with the remaining machining process is determined on the basis of the volume to be removed and the roughness of a finished surface. As a result, a machining operation can be implemented by means of a highly efficient machining method.

A process for selecting a machine to be used in each process for machining a remaining area comprises at least the steps of:

identifying whether or not there is a remaining process;

selecting a machine to be used when machining the area, which is used to be machined in a predetermined order, from the input data, if there is a remaining process;

calculating tentative machining time and cost per single workpiece material from the number of workpiece materials to be machined and the volume to be removed, by reading preparation time and cost, per-hour removing volume, and machining costs from the file related to the selected machines; and setting the machines in order according to cost and in order according to machining time per single workpiece material, respectively, and recording the prioritized machines in an n-th process file. Accordingly, a machine which is used in executing the remaining machining process is determined on the volume to be removed and the machining cost and time. As a result, it is possible to implement a highly efficient machining operation taking into consideration productivity.

A final machining process is determined by identifying and quoting machining processes, utilizing input drawings, designated processes, a process file, a fixture file, a tool file, a cost file, a drawing file, and data items unarchived from these files. Accordingly, the final machining process is determined on the basis of the standardized data. As a result, it is possible to carry out a highly reliable machining operation.

In machining process determination processing for determining the selection of a machine to be used in a machining process, at least one of several requirements, that is, requirements for minimizing the number of machine tools, requirements for giving priority to machining cost, and requirements for making the availability factor uniform, is taken into consideration, and a machine tool is selected by adding requirements of a tool of a machine having a graphic processing volume to any one of the above requirements. Accordingly, the machine used in the machining process is determined so as to improve the productivity of the process. As a result, it is possible to carry out a highly reliable machining operation by means of a machine tool which provides optimum productivity.

Procedures for determining a process comprises at least:

identifying whether priority is given to machining cost or machining time;

reading minimum machining cost processes defined between the first to the n-th process from a file, which is prioritized according to machining cost, in a machining process file, if priority is given to machining cost;

reading minimum machining time processes defined between the first to the n-th process from a file, which is prioritized according to machining time, in the machining process file, if priority is given to machining time;

identifying whether or not an identical machine is chosen for the selected processes;

identifying whether or not the processes can be grouped by chucking and machining directions if the identical machine is chosen, and grouping the processes only when the processes are included in the identical chucking or machining process;

grouping the processes if tools having the identical machining function, tools having a similar function, and finishing symbols and the roughness of finished surfaces which are related to these tools, are ranked equal or below a certain level;

separating the processes into different processes if thermal refining processing, roughing associated with another machine, and measurement are included between the processes of the selected machines;

listing the processes that have been selected in the processing prior to the current processing, and determining and setting processes in order according to machining cost or machining time;

obtaining a cutting rate ($V_{min}$) which minimizes cutting cost from the following expression if the priority is given to cost, and obtaining a cutting rate ($V_{pmax}$) which minimizes machining cost from the following expression $$V_{min}=S\{C_w/((1/n)-1)(C_w\cdot t_{tc}+C_t)\}^n$$

$$V_{pmax}=S/\{((1/n)-1)t_{tc}\}^n;\text{ and}$$

deciding a machining order according to a descending order of volume to be removed, a descending order of tolerance width, and an ascending order of finishing symbol. Accordingly, the machining process is determined in such a way that the optimum machining time or cost is obtained. As a result, it is possible to carry out a highly reliable machining operation in a more productive manner.

A per-process machine program comprises the steps of:

utilizing the machining drawing used in the previous machining process as a material drawing for the current process;

identifying whether or not the direction of removing has been designated;

determining the direction of removing during the turning operation by evaluating the productivity associated with the removing direction, which was calculated from the cross sectional area of a cutting allowance, the cutting allowance, a machining length ratio obtained from a machining length ratio of the length in the Z (axis) direction to the length in the X direction (in the direction of the end face) in combination with the maximum depth of cut, mechanical rigidity, and tool rigidity, using the machining time;

retrieving a tool file using a graphic code obtained as a result of processing graphical input data, and searching for all tools that have a match with regard to graphical processing function codes;

selecting and determining tools best suited to processing on the basis of the maximum and minimum productivity determined by the number of tools;

retrieving a fixture of a machine tool file, which are input for each machine tool in the n-th process, from input drawings using the area to be chucked as a key item; and determining the optimum fixture common to processing by selecting a fixture which most closely fits the chucking diameter for each area to be machined, from the selected and aligned fixtures. Accordingly, a machining operation in each process is determined on the basis of the conditions with regard to the tools and the fixtures. As a result, it is possible to efficiently carry out a highly reliable machining operation.

A machine program for use in a cutting process, which uses the entire length and diameter of material and the size of workpiece material, comprises at least the steps of:

subjecting the material to processing of a bar feeding machine if the material is a long material such as a polishing material and a rod material, and cutting the rod material into a single piece if the bar feeding machine is not registered in the program;

cutting the rod material to a less than a predetermined value if the size of the workpiece material is in excess of the workpiece material;

reading the diameter and entire length of the material, from a file relating to a finishing allowance used in turning the rod material, as variables; and reading a corresponding machine from a machine tool file, using data based on the entire and diameter of the material and the size of the workpiece material. Accordingly, a machine used to cut a workpiece is determined on the basis of the dimension of the workpiece and the presence or absence of the bar feeding machine. As a result, it is possible to carry out a highly reliable machining operation by selecting an optimum machine tool.

A machine program for use in a turning process uses data of a variety of files relating to; for example, a drawing of a workpiece before it has finished undergoing another process, which was calculated in the graphical processing of the workpiece before it has finished undergoing another process by utilization of, at least, input data with regard to a row material and a finish (a file relating to the shape of a workpiece while it undergoes an intermediate finishing process); machine tool information; tool information; cutting condition information; material information, machining method symbol information; finishing symbol information; finishing allowance information; surface treatment information; thermal refining information; and cost information. Machining is carried out on the basis of the standardized data. As a result, a highly reliable machining operation can be efficiently implemented.

A method of determining a removing direction in the turning process comprises at least:

retrieving temporal tools from a tool file, and reading tool conditions from the same file;

retrieving a universal roughing tool having the maximum tool rigidity, a universal roughing tool capable of producing the maximum depth of cut, a universal roughing tool having the maximum feed, and a tool having the minimum projection with respect to a tool holder from the tool file, and reading tool ID numbers, the tool rigidity, the maximum depth of cut, the maximum feed, and the projection of the tool from the tool holder;

reading specific cutting force from a material file using a workpiece material as a keyword;

adopting the interpolating method based on fuzzy logic;

calculating a ratio of the radial rigidity to the axial rigidity of the tool;

calculating the maximum cutting load using the following expression

Max. cutting load=Max. depth of cut×Max. feed×specific cutting force;

calculating the maximum load from the size of the tool shank and the projection of the tool from the tool holder, both being obtained from the tool file, and a variety of numerical values which have already been given, using the following expression, namely, $P_r=3\times E\times I\times\delta\max/L^3$, where $\delta\max$ is the maximum allowable deflection;

comparing the maximum allowable load obtained from the tool rigidity with the maximum cutting load obtained from the product of the depth of cut, the feed, and the specific cutting force, and taking a smaller load as the allowable cutting load;

calculating the maximum allowable cutting load in each of the radial and axial directions, and obtaining a ratio between them;

reading the rigidity of a machine tool from a machine tool file, and obtaining a ratio of the radial rigidity to the axial rigidity of the machine tool in order to compare the volume of feeding material in the X direction (in the radial direction) to the volume of feeding material in the Z direction (in the axial direction) with regard to the machine tool;

reading data relating to the rigidity of the main spindle (the maximum allowable load), the maximum depth of cut, and the maximum feed from the machine tool file;

calculating the maximum cutting load from the specific cutting force corresponding to the workpiece material, using the following expression, namely, Max. cutting load=Max. depth of cut×Max. feed×specific cutting force;

calculating the maximum radial cutting load and the maximum axial cutting load respectively from the maximum depth of cut and the maximum feed, and comparing the thus obtained maximum radial and axial cutting loads with the maximum allowable value obtained from machine tool file, and then using a lower value as the maximum allowable load;

calculating a machine condition ratio from a ratio of the maximum radial allowable load to the maximum axial allowable load;

calculating the rigidity of a workpiece from the radial and axial rigidity of the workpiece using the following expression, namely, $$\text{Radial rigidity (deflection)}=P_r\times L^3/(3\times E\times I)$$

$$\text{Axial rigidity (torsion)}=32\times P_r\times L\times r^2/\pi d^4 G;$$

comparing the radial rigidity with the axial rigidity (torsional rigidity) of the workpiece, and obtaining a ratio of radial deflection to axial deflection of the workpiece;

judging and determining the volume of the machine tool to cut the material in the X direction while feeding it in the z direction, the volume of the machine tool to cut the material in the Z direction while feeding it in the X direction, and the maximum machining load;

determining the maximum allowable load condition and a feeding direction by combination of the maximum cutting load ratio of the tool, the rigidity ratio of the machine tool, and the rigidity ratio of the workpiece;

obtaining the temporary maximum depth of cut which is to be used in a cutting operation, by calculating the limit rigidity value from the tool material and an input material to be machined, using the cutting rate and the feed obtained from the cutting condition file and the specific cutting force;

executing the processing and decision of the machining direction which beings with the decision of material;

deciding whether or not the material is a rod material based on the size of an input workpiece material, and calculating a machining allowance on each stage number if the material is a rod material, and calculating a sum of machining allowances on each side to be machined and the total sum of the machining allowances;

calculating a mean machining allowance obtained by dividing the total sum of cross sectional areas of the machining allowances on each of the sides to be machined by the length of cut in each direction on each side to be machined, and calculating the macroscopic number of times the material is cut by dividing the mean machining allowance by the maximum tentative depth of cut of the tentative tool, and calculating the length of the material to be machined in the Z direction from a product of the length of the material in the Z direction and the number of times the material is cut in the X direction;

calculating the mean machining allowance obtained by dividing the total sum of cross sectional areas of the machining allowances on each of the sides to be machined by the length of cut in each direction on each side to be machined, and calculating the macroscopic number of times the material is cut by dividing the mean machining allowance by the maximum tentative depth of cut of the tentative tool, and calculating the length of the material to be machined in the X direction from a product of the length of the material in the X direction and the number of times the material is cut in the Z direction;

deciding whether to feed the material in the X direction or in the Z direction on the basis of the length over which the material fed in the feeding direction and the number of times the material is cut;

dealing with the material as a material input if the material is not a rod material, and calculating a cutting allowance in each of the X and Z directions on each stage using data relating to the material and a finished pattern;

calculating the number of times the material is cut and the length of the material to be machined on each stage for each of the following machining methods, namely, feeding of the material in the X direction in which the material is cut in the Z (axial) direction while being fed in the −X (radial) direction, feeding of the material in the Z direction in which the material is cut in the X (radial) direction while being fed in the −Z direction (axial), and feeding of material in the X and Z directions in combination in which the material is cut in the Z (axial) direction while being fed in the −X (radial) direction in order to machine end faces and grooves, and the material is cut in the X (radial) direction while being fed in the −Z (axial) direction in order to machine the outside and inside diameters of the material;

boring and forming grooves in the internal periphery of the bore based on the assumption that the tip of the tool can enter as far as the center of the bore, if the bore is not pre-formed;

grooving the material while the tool is covered with a lid if the groove is to be formed perpendicular to the direction of the feeding of the material, and adding to the machining condition file the number of times the material is to be additionally grooved again, and the length of the material to be grooved;

comparing the previously mentioned machining methods with each other with regard to the number of times the material is cut and the length over which the material is fed, and arranging them in order;

deciding whether or not the feeding of material in the X and Z directions in combination, which qualitatively requires much shorter machining time, is best in terms of the number of times the material is cut and the machining length over which the material is fed;

deciding which of feeding the material in the X direction or feeding in the Z direction is superior;

calculating tentative machining time;

reading operating time of the machine tool (the time required to position material so as to be quickly fed in the X direction, the time required to position material so as to be quickly fed in the Z direction, the speed for quickly feeding material in the X direction, and the speed for quickly feeding material in the Z direction) from the machine tool file;

calculating tentative positioning time, rapid traverseing time, and time for feeding material while machining it, for each of feeding directions using the following expressions Sum of positioning time=(positioning time)×2×(the number of times material is cut), Rapid traverse time=[{a length of material to be machined/(the number of times the material is cut×a rapid traverseing rate)}+(positioning time)]×the number of times the material is cut Time for feeding material while cutting it=length of material to be machined/feed rate/min. during machining;

and comparing the thus obtained three tentative machining times with each other, and deciding the best machining method. Accordingly, an optimum removing direction for the turning process is determined taking into consideration the tool requirements, the cutting load, and the time required to turn a workpiece. As a result, it is possible to efficiently carry out a highly reliable machining operation in a more productive manner.

Selection of a tool for use in a turning operation comprises at least the steps of:

dividing an area to be machined into several categories, such as a bore, an end face, an external circumferential surface, a groove formed in the internal circumferential surface of the bore, a groove formed in the external circumferential surface, and a groove formed in the end face, using a tool file and pictorial codes of input data, and retrieving a tool and checking it against these categories;

retrieving a tool with addition of a tool for pre-forming a hole if a pre-formed hole is made in a workpiece;

using the maximum graphic processing tool used in deciding the removal direction as a part of a turning tool;

retrieving a tool with multiple functions in order to minimize the number of tools to be used;

sounding an alarm if no roughing tool matches with an input drawing, and thereafter using a finishing tool as a roughing tool;

sounding an alarm unless a tool required by the input drawing is included in the tool file;

selecting a tool sufficiently capable of machining the material according to the shapes and sizes described in the input drawing, that is, bores, depths, groove widths, and groove depths, and giving the top priority to rigidity and the second priority to versatility during the course of the selection of a tool, with the greatest emphasis on productivity;

reading specifications for each groove from a file for intended finally finished shapes, and determining whether or not the groove can be formed by checking the grooving of a tool against the specifications; and adopting one of the following three steps as conditions for selecting a tool, namely, (1) a tool should be selected, in principle, so as to minimize the total number of tools, (2) a tool should be selected taking into consideration the number of workpieces per one lot, prerequisites, and absolute requirements, and (3) a decision as to selection of a tool is made by selecting a tool having the maximum cutting volume for each area, supposing that A is the sum of machining time and ATC time and B is the sum of the machining time and the ATC time obtained using a method for minimizing the number of tools, and comparing A with B. Accordingly, tools are selected and determined taking into consideration the presence or absence of tools corresponding to input drawings, the direction of removal, the number of tools used in the machining process, and the time required to machine a workpiece. As a result, it is possible to carry out a highly reliable machining operation in a more productive manner on the basis of pictorial data by use of an optimum tool.

Designation of a tool comprises at least the steps of:

making a decision as to whether or not a tool designation entry, with regard to the designation and input of a tool for machining, is filled with a tool;

selecting manual designation of a tool for each process by specifying and inputting a tool and cutting conditions, or automatic determination of a tool;

disclosing the limit size of a tool by combination of the tool and cutting conditions specified and input for each process with a pictorial pattern, and specifying a tool using a tool number registered in a tool file;

sounding an alarm to inform that the area which a tool cannot machine or the area which will be left unprocessed will occur for reasons of the consistency between a tool and a pattern as a result of computation, if the tool is specified at the time of inputting the pattern; and determining a roughing tool as one not to be used for finishing purposes and a finishing tool as one to be used for roughing purposes, as circumstances demand. Accordingly, the operator selects either the manual designation of a tool or the automatic designation of a tool. If the manual designation of the tool is chosen, the operator designates a tool for each process using a tool number.

The selection and determination of a fixture comprises the steps of:

pairing up the diameter and length of an area of material which is determined, as it can be chucked, from input material and finishing drawings;

retrieving a fixture in a machine tool file input for each machine tool using the pair of parameters, that is, the diameter and length; and selecting and determining a fixture on the general rule that a portion of the material very close to the area to be machined should be fixed. Accordingly, an optimum area for chucking is determined on the basis of the input data. As a result, it is possible to carry out a highly reliable machining operation by use of a fixture which fits the chucking diameter of an object to be machined.

Generation and determination of an n-th process processing path for each processing order comprises at least the steps of:

changing the depth of cut corresponding to variations in a cutting allowance;

correcting an input relating to the shape of material used in the turning process, by estimating variations in the material shape using statistical processing means;

measuring materials to be cast and forged in order to obtain data on the shape of practical materials, correcting the input data on the shape of the material, and determining a machining cycle and the depth of cut from a difference between the corrected input data and a finished pattern;

measuring the shape of the material, and statistically processing the data obtained as a result of feeding a plurality of pieces of material, so that a mean value and variations are obtained; and determining whether the material should be processed while it is measured each time, or while utilizing statistical data by comparing the sum between measuring time and machining time with machining time obtained by means of the statistical method. Accordingly, a highly productive n-th process machining path is determined by comparing machining time with measured time, taking into consideration variations in the shape of material. As a result, it is possible to carry out a highly reliable machining operation, which fits the shape of material, in a more productive manner.

Measurement and processing of material in an n-th process comprises at least the steps of:

identifying whether or not workpieces having the identical pattern are repeated;

using the machining drawing employed in the previous machining process as a material drawing in the current processing process if the workpieces have different patterns;

identifying whether or not the direction of removing is specified;

selecting a tool for use in the n-th process;

selecting a fixture for use in the n-th process;

measuring the material used in the n-th process and generating a machine program;

identifying whether or not the material should be measured in the n-th process;

identifying whether or not the workpieces having the identical pattern are repeated if the material must be measured;

executing the tracing method or generating a travel path for measurement use having equivalent intervals from the input material data if the workpieces have different patterns;

initializing a repeat counter for counting the number of workpieces to be machined to $n_1=0$ and a group repeat counter to $n_2=0$;

incrementing the repeat counter for counting workpieces to $n_1=n_1+1$, measuring the material using the tracing method or equivalent intervals and measuring time, and storing measured dimensional data and the measuring time in a data region;

exchanging the material size with the measured size;

calculating a cutting allowance and generating and determining a machining pat, using the result of the exchange;

identifying whether or not the material has already been measured in the n-th process, if the measurement of the material in the n-th process is judged as not to be necessary;

initializing the repeat counter for measuring the number of workpieces to $n_1=0$ and the group repeat counter to $n_2=0$, if the material has already been measured; and incrementing the repeat counter for counting the number of workpieces to $n_1=n_1+1$. Accordingly, a method for measuring and machining material in an n-th process is determined taking into consideration whether or not workpieces having the identical pattern are repeated, the necessity or the lack of necessity of the measurement of material, and time required to machine and measure the material. As a result, it is possible to carry out a highly reliable machining operation in a more productive manner.

A method of processing a workpiece in an n-th process which includes on-machine measurement, correction, and reworking operations comprises at least:

roughing processing which includes the steps of sequentially reducing the number of revolutions of the main spindle to 80% if machining power is in excess of an allowable value, and sequentially reducing a feed rate to 50% if the power is still in excess of a critical value, sounding an alarm if the power is still in excess of the critical value, and stopping the machining of the workpiece at a break between blocks to be machined, sequentially increasing the feed rate up to 200% if the cutting power does not satisfy the allowable value, and sequentially increasing a cutting rate up to 150% if the cutting power still fails to satisfy the allowable value; and finishing processing which includes the steps of determining the critical number of revolutions allowing for the lifespan of the tool on the assumption that the feed rate corresponds to variations in the number of revolutions of the main spindle, measuring all the areas of the workpiece designated by a tolerance and a tolerance symbol after the workpiece has been machined, correcting the positions of the tool and machine using expected values in such a way that the positions fall within allowable values at the time of the next processing, increasing the number of measurement points using the range of tolerance and the length of the workpiece as parameters, correcting a difference between a mean value obtained as a result of computation and the center of designated tolerance by combination of a tool position correction operation and a machine position correction operation, if the workpiece was machined with the identical tip of the identical tool, sounding an alarm indicating erroneous process selection if a difference between the maximum measured value and the minimum measured value is in excess of two-third of the range of tolerance at each of the designated areas, identifying whether or not there is a remaining finishing allowance in the workpiece if the workpiece has been judged as to be defective, identifying whether or not the remaining finishing allowance is within the removing volume of an n-th process machine tool if there is a remaining finishing allowance, determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, sounding an alarm if it has been judged that there is no machine tool capable of removing the remaining finishing allowance, identifying whether or not the decision process through which the machine tool capable of removing the remaining finishing allowance was selected is an unexecuted processing, identifying whether or not the process is a new machining process if that process is the unexecuted processing, incrementing an n-th process storage number by one if the unexecuted processing has been judged as being a new machining process, and additionally storing associated process data into a storage section, reading a measured material data file and calculating the mean value, maximum value, and minimum value of the shape of the material by means of a statistical processing technique such as the least squares method and 3σ method, calculating a machining path and machining time at the maximum size of the material, adding mean processing time to the time required to measure material when the material is measured each time and then machined, and comparing the thus obtained time with the time required to machine the material into a shape and a size using the statistical processing technique, so that processing which needs fewer machining time is adopted, reading a count value of the group repeat counter if it takes a long time to machine the material using the statistical processing technique, and identifying whether or not there is statistical processing, measuring the material each time using the tracing method, if the statistical processing is not selected, exchanging the input size of the material with the measured data, generating and determining a machining path, machining the workpiece, measuring the thus machined workpiece on the machine, and correcting the workpiece, storing the data on the decision in order to select the statistical processing if the statistical processing is selected into the storage section, determining whether or not the workpiece is nondefective using the result of the measurement, identifying whether or not there is a remaining finishing allowance in the workpiece if the workpiece has been judged as to be defective, identifying whether or not the remaining finishing allowance is within the removing volume of the n-th process machine tool, if there is a remaining finishing allowance, identifying whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, sounding an alarm if it has been judged that no machine tool table is available for removing the remaining finishing allowance, identifying whether or not the decision process through which the machine tool capable of removing the remaining finishing allowance was selected is an unexecuted processing, if it has been judged that there is a machine tool capable of removing the remaining finishing allowance, identifying whether or not the process is a new machining process if that process has been judged as to be the unexecuted processing, and incrementing an n-th process storage number by one if the unexecuted processing has been judged as being a new machining process, and additionally storing associated process data into the storage section. Accordingly, a workpiece is roughed while the rotating speed of the main spindle and a feed rate are being changed. In a finishing operation, requirements for correction and reworking are determined on the basis of the result of the measurement of the machined workpiece. As a result, it is possible to carry out a highly accurate machining operation by selecting a feed rate and a rotating speed which are suitable for the kind of the machining operation.

Generation of a turning processing path comprises at least the steps of:

determining whether to designate any one of the following combinations based on a cutting method specified in an input item concerning machining or to automatically select one from the combinations using productivity, the elimination of chips, the life span of a tool, and the material of the tool, namely, a combination of a method to equally divide the depth of cut made as a result of roughing among stages and a method using a constant finishing allowance, and a combination of a method to form the constant depth of cut by roughing and a method using a variable finishing allowance;

determining the evaluation of productivity, with regard to the case of the constant depth of cut or the case of the equivalently divided depth of cut, by simulating machining time using the number of positioning times and the length of a path over which a turning machine travels;

dealing with a machining path associated with the method for cutting material into a constant depth, as a simple path method in which material is machined as far as the point where the material can be continuously machined even if a finishing allowance is ensured in the material without changing the depth of cut formed in the material;

adopting a cutting method called a variable cutting method in which the depth of cut made as a result of roughing is divided among stages, in order to improve the machining productivity;

subtracting a finishing allowance from a cutting allowance of the material, dividing the thus obtained cutting allowance by the maximum depth of cut, rounding up the result of the division to obtain the number of times the material is cut, subtracting a finishing allowance from a cutting allowance on each stage, dividing the thus obtained cutting allowance on each stage by the number of times the material is cut, as a result of which the depth of cut is equally divided among the stages, and using the thus obtained depth of cut as a cutting allowance on each stage in each cycle;

adopting a variable finishing allowance method based on the constant cutting method in which the material is roughed to a constant depth, in order to improve the machining productivity; and correcting displacement corresponding to the finishing allowance, wherein the correction of displacement comprises the step of:

obtaining an approximate calculation expression from the actually measured data, and calculating the amount of correction using the depth of cut, a feed, the strength of material, and the entire length of a workpiece; or calculating a deficiency of the actually measured raw data using approximate interpolation, and calculating the amount of correction by means of interpolation using the actually measured data, the approximately interpolated data, and the strength of material and the entire length of a workpiece which act as variables; or calculating and correcting the amount of correction using an arithmetic expression which employs a broaching load, material, the entire length of a workpiece, a supporting method, and load points as variables. Accordingly, a path for cutting a workpiece during a roughing operation is determined taking into consideration the productivity of the machining operation and a method employed for cutting the workpiece. As a result, it is possible to efficiently carry out a highly reliable roughing operation.

A path for turning a rod material comprises at least the steps of:

selecting either an absolute value or an increment for the position of a machine based on a designation item of the machine tool;

calculating a cutting rate from the material of a workpiece and the material of a tool;

determining the direction of revolution of the main spindle on the basis of the rotation of a tool associated with a tool ID number; and setting a feed rate to an allowable value determined by the limit of depth of cut, a feed, the limit of a machine tool, and the limit of a workpiece which are read from a tool file as well as by the depth of cut and a feed rate read from a cutting condition file, the path comprising a calculation method for equally dividing the depth of cut which includes the steps of calculating a roughing allowance on each stage, the maximum allowable depth of cut on each stage, the theoretical number of times material is cut using the following expressions Roughing allowance on each stage={diameter of material−(designated diameter+finishing allowance)}, Max. depth of cut on each stage=Max. machining load/feed×specific cutting force Theoretical number of times material is cut=(roughing allowance on each stage)/(2×allowable maximum depth of cut on each stage), setting the direction of the allowable maximum depth of cut to the direction of the cut associated with that one of a workpiece, a machine tool, and a tool which has the largest minimum value, calculating the depth of cut, which is based on a critical value for the limit of rigidity, with regard to the maximum depth of cut used in the turning operation by calculating a specific cutting force from the materials of a tool and an input workpiece, and by reading a cutting rate from the cutting condition file, and obtaining the size of a workpiece before it will be finished by adding a finishing allowance to the shape of the workpiece on each stage read from a file related to intended finally finished shapes, obtaining the number of times the workpiece is cut by dividing the length of the workpiece by the maximum depth of cut, rounding up the result of the division in order to obtain the equally divided depth of cut, and determining the directions of cut and feed;

carrying out processing so as to prevent the depth of cut in the Z direction from increasing by use of the depth of cut in the Z direction used in machining the previous stage if the depth of cut in the Z direction increases during the course of the execution of processing when a machine program is generated using the equally divided depth of cut, or carrying out processing so as to prevent the depth of cut in the X direction from increasing by use of the depth of cut in the X direction used in machining the previous stage if the depth of cut in the X direction increases in the course of the execution of processing;

a method for calculating a program for use with a constant cutting method which includes the steps of setting the direction of the allowable maximum depth of cut to the direction of the cut associated with one of a workpiece, a machine tool, and a tool that has the largest minimum value, calculating the depth of cut, which is based on a critical value for the limit of rigidity, with regard to the maximum depth of cut used in the turning operation by calculating a specific cutting force from the materials of a tool and an input workpiece, and by reading a cutting rate from the cutting condition file, calculating a machining path along which the workpiece is turned in the Z direction while it is fed in the X direction, in which the workpiece is fed to the point at which a finishing allowance and a finishing allowance for another processing are added to the intended finally finished shape file every time the material is machined, and calculating a machining path, for a remaining portion of the material which was not machined in the previous turning processing, in which the workpiece is turned in the Z+ or Z− direction while being fed in the X− direction, and the thus turned workpiece is repeatedly returned to the point from which the previous turning processing started and again undergoes the turning processing, obtaining the size of the workpiece before it will be finished by adding a finishing allowance to the shape of the workpiece on each stage read from the intended finally finished shape file, and obtaining the number of times the workpiece is cut by dividing the length of the workpiece by the maximum depth of cut and the remainder of the workpiece which is to be machined together with the machining of another portion on the subsequent machining stage, calculating a roughing allowance on each stage using the following expression Roughing allowance on each stage={diameter of material−(designated diameter+finishing allowance)}, retrieving exchangeable material from a tool material translation table file if tool material which is not included in the cutting condition file is specified, and retrieving machining conditions applicable to the material of the workpiece and a tool diameter from the cutting condition file using the equivalent tool material, setting a finishing allowance of a bore to one-third of the maximum depth of cut which the tool can form and a finishing allowance of an end face to half a finishing allowance in the diametrical direction of the workpiece, calculating an approximate value by computing the correction of machining deflection based on the assumption that the radius of the material and the depth of cut are proportional to each other according to a linear expression, using a turning variation plot which shows a remainder of the workpiece on each stage occurring as a result of turning the workpiece to a constant depth, a difference between the actually measured data and the reference diameter of the workpiece, and a plot which illustrates variations in the workpiece radius, and then generating a machine program by correcting values of machine program data, calculating the feed rate of a grooving tool from the shank size of the tool, the length of a projection of the tool, the rigidity of the tool, the (Max. and Min.) limits of a feed of the tool (in the X and Z directions), the maximum cut withstanding volume of the tool, all being read from the tool file, as well as the material of the workpiece, taking into consideration the specific cutting force of material of the workpiece, calculating the maximum allowable load by dividing the limit of allowable deflection by the tool rigidity, and calculating a feed rate using the following expression $$F = 2 \times \text{max. cut withstanding volume} / (\text{specific cutting force} \times \text{groove width}) \; [\text{mm/rev.}],$$

calculating the time during which the tool is in a dwell state at the groove bottom from the number of revolutions of the machine tool spindle while it is in a dwell state, the cutting speed calculated from the materials of the tool and the workpiece, and the diameter of the groove bottom, using the following expression $$t = (\text{the number of revolutions of the tool while it is in a dwell state}) / (\text{cutting speed} / (60 \times \pi \times \text{bottom diameter})) \; [\text{sec.}],$$

selecting rapid traverse mode of the tool if the tip of the tool has come out of contact with the workpiece and it has then get outside of the outer circumference of the workpiece by means of the radius of the tool tip, when the tool comes to a quick return position for grooving purposes;

determining a finishing feed rate on the basis of a finishing method symbol;

calculating the finish feeding rate associated with the turning processing from the roughness of a finish defined by a finishing symbol, a relational expression between the roughness of a finished surface and the feed of the workpiece, and the radius of the tool tip (i.e., the nose-radius of the tool) read from the tool file, using the following expression $$H\text{max} = f^2/8R$$

$$f^2 = 8R \times H$$

$$f = (8R \times H)^{1/2} \times 0.8,$$

setting the finishing feed rate of the end face of the workpiece, which is required when the workpiece is fed in the X direction while the tool is actuated in the Z direction, to 1/2.5 the feed rate of the tool in the Z direction;

a threading method which includes the steps of selecting a cutting method from among a driving method, a relieving method, and a combined driving method, as well as selecting a method for determining the depth of cut from among a method for cutting material into an equivalent cross section and a method for cutting material at equivalent intervals, depending on the material and hardness of a workpiece, mechanical rigidity, and the material, rigidity, and characteristics of a tool, and calculating the depth of cut, the width of an opening in the thread, and the width of a top land using the following expressions $$\text{Depth of cut} = \{(\text{mean outside diameter}) - (\text{minor diameter to be machined})\}/2$$

$$\text{Width of top land} = 2 \times \text{nose radius of a determined tool} \times [\{(1/\sin(\text{half of a thread angle})\} - 1] \times \tan(\text{half the included angle})$$

$$\text{Width of an opening in a thread} = (P/2) + (\text{mean outside diameter} - \text{effective mean diameter}) \times \tan(\text{half the included angle});$$

and a method of dividing the depth of cut, for use in cutting material into an equivalent cross section, which includes the steps of determining the number of times material is cut by dividing a total cutting load, which is a product of a cross section of a thread and a specific cutting force, by an allowable contact load calculated from the mechanical rigidity and the tool rigidity, so that substantially the number of times material is cut is obtained, and by multiplying the substantial number of times material is cut by a safety factor, calculating the specific cutting force from the material of a workpiece using a material file, and calculating the total cutting load from the thus obtained specific cutting force using the following equation $$\text{Total cutting load} = \text{specific cutting force} \times \text{total cross section of cut made by a thread},$$

calculating the tool rigidity, the limit of depth of cut, and the maximum cut withstanding volume using the tool file, setting the limit of the tool rigidity to half the tool rigidity obtained at the time of roughing on condition that material is threaded, dividing the limit of allowable deflection by the tool rigidity in order to obtain the allowable cutting load, and obtaining the integral number of times material is cut by dividing the total cutting load by the allowable cutting load and subsequently rounding up the result of the division, obtaining the divided depth of cut by expanding the following expression $$\text{Cross section of thread/number of division } (n) = \text{top land width} \times (h_n - h_{(n-1)}) + 2 \times (1/2) \times \{(h_n)^2 \times \tan(\text{half of a thread angle}) - (h_{(n-1)})^2 \times \tan(\text{half of a thread angle})\} = \text{top land width} \times (h_n - h_{(n-1)}) + \tan(\text{half of a thread angle}) \times \{(h_n)^2 - (h_{(n-1)})^2\},$$

calculating the distance, in a lateral direction, over which the tool travels in the case of the relieving method or the combined driving method, using the following equation Travel distance in a lateral direction $(z_n)=(h_n-h_{(n-1)})\times\tan$ (half of a thread angle), and calculating cutting points for use in the combined driving method in the reverse order of machining with respect to the final position. Accordingly, a path for turning a rod material is determined on the basis of the allowable depth of cut, the feed rate, the finishing allowance, the tool data, and the material data. As a result, it is possible to efficiently machine a rod material in a highly reliable manner.

Selection of a tool and setting of cutting conditions comprise at least the steps of:

selecting a rotating tool for grooving purposes by retrieving a tool using the width of a groove to be formed in material as a keyword, and selecting a tool ID number if the diameter and nominal length of the tool matches with the groove width;

retrieving a cutting rate from a cutting condition file based on the materials of a workpiece and the tool, and calculating the number of revolutions of the tool using the tool diameter;

determining the depth of cut based on the tool rigidity, calculating the number of times material is cut from the thus obtained the depth of cut, and cyclically cutting the material into predetermined depth;

complementing a feed rate using the diameters of tools before and after the applicable tool which satisfies a predetermined tool quality, a predetermined workpiece material, a predetermined cutting rate, and a predetermined feed rate, if data relating to the applicable tool are not available; and complementing a feed rate of an end mill in such a way as to be proportional to the fourth power of its diameter; and complementing a feed rate of a drill in such a way as to be proportional to its diameter. Accordingly, where a rotating tool for grooving purposes is used, machining settings are determined taking into consideration the width of a groove formed in an area to be grooved, and the materials of a tool and a workpiece. As a result, a highly reliable machining operation can be implemented.

A program for reaming a hole uses data on inputs, an intended finally finished size, a type of twist, a rotating angle with regard to the reference position, steps of a hole, a diameter, finishing symbols, countersinks/counterbores, a counter sinking angle, a depth, and the number and positions of holes. Accordingly, standardized input data are used. As a result, it is possible to carry out a highly reliable machining operation in such a way as to reduce data entry errors.

A reaming program comprises at least the steps of:

retrieving and selecting a pre-forming drill using a reamer diameter and the depth of a reamed hole;

obtaining a reaming rate from a cutting condition file based on the material of a tool, which is read from the tool file, and the material of a workpiece, and determining the number of revolutions of the tool by calculating the cutting rate;

reading feed rates of pre-forming drills which have similar diameters from the cutting condition file, and calculating a feed rate of a pre-forming drill by interpolation in such a way that the feed rate is in proportion to the diameter of the pre-forming drill; and retrieving a reamer using the diameter and depth of a reamed hole as key codes, and selecting a reamer. Accordingly, a drill to pre-form a hole, associated cutting conditions, and a reamer are selected in an optimum way. As a result, it is possible to efficiently ream a workpiece in a highly reliable manner.

A program for machining a grooved end cam comprises at least the steps of:

retrieving and selecting a tool using the width of a groove formed in a cam and the depth of a cam, that is, a major cutting edge as key codes;

obtaining a cutting rate on the basis of the materials of a workpiece and the tool, and determining the number of revolutions of the tool by calculating the cutting rate; and reading feed rates of tools which have similar diameters from the cutting condition file, and calculating a feed rate for machining a grooved end cam by interpolation in such a way that the feed rate is in proportion to the square of the diameter of the tool. Accordingly, a tool for grooving a workpiece and grooving conditions are selected in an optimum way. As a result, it is possible to efficiently carry out a grooving operation in a highly reliable way.

A program for finishing the outer circumference of material comprises at least the steps of:

obtaining at least finished surface roughness designated by a finishing method symbol utilizing specifications for an intended finally finished shape, and calculating a feed rate which satisfies the thus obtained finished surface roughness utilizing a relational expression between the finished surface roughness and a feed rate, the tip radius of a tool (i.e., the nose-radius of a tool), and a safety factor;

selecting a grooving tool and a feed rate based on specifications for a groove having an intended finally finished shape, with regard to the finishing of a groove; and calculating the chamfering of the bottom of a groove using the tip radius of the grooving tool (i.e., the nose-radius of the grooving tool). Accordingly, a tool and a cutting rate used in a finishing operation are determined on the basis of a finishing method symbol and an intended finally finished shape. As a result, it is possible to carry out an appropriate machining operation on the basis of a symbol used in a drawing.

A keyway machine program executes a machining operation based on, at least, an input drawing for a keyway and specifications for an intended finally finished shape pattern (keyway numbers, a previous stage, a subsequent stage, a keyway width, a tolerance, finishing symbols, the entire length of a keyway, stages designated so as to be machined, a depth, a type of groove, a cutter diameter, a step of the reference shoulder, and an angle with regard to the reference position). Accordingly, input data are standardized. As a result, a highly reliable machining operation in such a way as to reduce data entry errors.

The keyway machine program comprises at least the selection of a keyway machining tool, and the keyway machining tool including the steps of:

retrieving and selecting a cutter for machining a keyway, using the diameter and width of the cutter as key codes;

obtaining a cutting rate and a feed rate per one blade from the materials of a tool and a workpiece, and calculating keyway cutting conditions from the thus obtained cutting and feed rates using the number of revolutions and teeth of the cutter; and calculating a feeding speed of a side cutter from the number of revolutions and teeth of the cutter and its feed rate. Accordingly, an optimum tool and optimum cutting conditions are determined. As a result, it is possible to efficiently form a keyway in a highly reliable manner.

An external gear hobbing program generates specifications for hobbing an external gear on the basis of, at least, an intended finally finished pattern (external gear numbers, the reference position, an angle, specifications for a gear, a tooth profile, a module (M), a pressure angle (PA), the number of teeth, a helix angle, a tooth width, a base tangential length, a finishing method, and finishing symbols). Accordingly, input data are standardized. As a result, it is possible to hob an external gear in a highly reliable manner in such a way as to reduce data entry errors.

The external gear hobbing program comprises at least a step of selecting a tool, the tool selecting step further including the steps of:

selecting a hobbing tool on the basis of specifications for a gear, a tooth profile, and a pressure angle;

calculating a tool diameter and a cutter addendum, and deciding whether or not the hobbing of a gear is feasible;

sounding an alarm if the hobbing of a gear is impossible;

calculating a helix angle from the tool diameter and the cutter addendum; and obtaining a cutting rate and a feed rate on the basis of the materials of the tool and a workpiece, calculating the theoretical number of revolutions of the main spindle from the cutting rate and the feed rate, calculating the number of revolutions of a workpiece by dividing the theoretical number of revolutions of the main spindle by the number of teeth and rounding up the result of the division, and calculating the number of revolutions of the main spindle by multiplying the number of revolutions of a workpiece by the number of teeth. Accordingly, an optimum tool and optimum cutting conditions are determined. As a result, it is possible to hob an external gear in an optimum manner.

An outside diameter turning program comprises at least a step of selecting a tool, the tool selection step further including the steps of:

selecting the material of a grinding wheel on the basis of the material and hardness of a workpiece;

selecting a machining method from a radially feeding method, a traverse grinding method, and a plunge cutting method by comparing the width of an area to be machined and the major cutting edge (grinding wheel width) on the basis of the material and hardness (translated hardness) of the workpiece, and determining cutting conditions (the peripheral velocity of the grinding wheel, the peripheral velocity of the workpiece, and the depth of cut) on the basis of the selected machining method;

calculating the number of revolutions of the grinding wheel from the diameter and peripheral velocity of the grinding wheel;

calculating the number of revolutions of the workpiece from the peripheral velocity of the workpiece corresponding to the workpiece which is to be machined; and generating a machining path from inputs, an intended finally finished shape, and the shape of a workpiece which has been finished in another process. Accordingly, an optimum tool and optimum cutting conditions are determined. As a result, it is possible to carry out an outside diameter turning operation in an optimum manner.

A boring program comprises at least the step of selecting a boring tool, the boring tool section step further including the steps of:

selecting the material of a grinding wheel on the basis of the material and hardness of a workpiece;

selecting a machining method from a radially feeding method, a traverse grinding method, and a plunge cutting method by comparing the width of an area to be machined and the major cutting edge (grinding wheel width) on the basis of the material and hardness (translated hardness) of the workpiece, and determining cutting conditions (the peripheral velocity of the grinding wheel, the peripheral velocity of the workpiece, and the depth of cut) on the basis of the selected machining method;

calculating the number of revolutions of the grinding wheel from the diameter and peripheral velocity of the grinding wheel;

calculating the number of revolutions of the workpiece from the peripheral velocity of the workpiece corresponding to the workpiece which is to be machined;

determining a chopping rate in the Z direction which is employed in roughing and finishing operations, in relation to the width of the grinding wheel per one revolution of the workpiece; and generating a machining path from inputs, an intended finally finished shape, and the shape of a workpiece which has been finished in another process. Accordingly, an optimum tool and optimum cutting conditions are determined. As a result, it is possible to carry out a boring operation in an optimum manner.

A method of processing a workpiece in an n-th process which includes on-machine measurement, correction, and reworking operations comprises at least the steps of:

measuring the workpiece on the machine tool after the machining of the workpiece has been completed, and correcting the position of the machine tool or a tool;

identifying whether or not the result of the measurement of the corrected workpiece is acceptable;

identifying whether or not there is a remaining finishing allowance in the workpiece if the workpiece has been judged as to be defective;

identifying whether or not the remaining finishing allowance is within the removing volume of an n-th process machine tool if there is a remaining finishing allowance;

repeating the processing procedures from the finishing step if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool;

sounding an alarm if it has been judged that there is no machine tool capable of removing the remaining finishing allowance;

identifying whether or not the decision process through which the machine tool capable of removing the remaining finishing allowance was selected is an unexecuted processing;

identifying whether or not the process is a new machining process if that process is the unexecuted processing; and incrementing an n-th process storage number by one if the unexecuted processing has been judged as to be a new machining process, and additionally storing associated process data into a storage section. Accordingly, conditions for correction and reworking are determined on the basis of the result of the measurement of a machined workpiece. As a result, it is possible to efficiently a highly accurate machining operation.

Adaptive processing applied to cutting power during the course of machining processing comprises at least the steps of:

in the case of a roughing operation, sequentially reducing the number of revolutions of the main spindle to 80% if machining power is in excess of an allowable value;

sequentially reducing a feed rate to 50% if the power is still in excess of a critical value;

sounding an alarm if the power is still in excess of the critical value, and stopping the machining of the workpiece at a break between blocks to be machined;

sequentially increasing the feed rate up to 200% if the cutting power does not satisfy the allowable value, and sequentially increasing a cutting rate up to 150% if the cutting power still fails to satisfy the allowable value;

in the case of a finishing operation, making the feed rate adaptable solely to the number of revolutions of the main spindle, and sequentially reducing the number of revolutions of the main spindle to 80% if the cutting power exceeds the allowable value;

sequentially reducing the feed rate to 50% if the power is still in excess of a critical value;

sounding an alarm if the power is still in excess of the critical value, and stopping the machining of the workpiece at a break between blocks to be machined; and sequentially increasing the feed rate up to 150% if the cutting power does not satisfy the allowable value. Accordingly, a workpiece is roughed while the rotating speed of the main spindle and a feed rate are being changed. When the workpiece is finished, the finishing of the workpiece is carried out in an optimum way by changing solely the rotating speed of the main spindle. As a result, it is possible to efficiently carry out a highly reliable machining operation by changing a feed rate and a rotating speed in an optimum manner depending on the type of the machining operation.

A method of processing a workpiece in an n-th process which includes off-machine measurement, correction, and reworking operations comprises at least the steps of:

measuring the workpiece outside a machine tool in the n-th process after the machining of the workpiece has been completed, and correcting the position of the machine tool or a tool;

identifying whether or not the result of the measurement of the corrected workpiece is acceptable;

identifying whether or not there is a remaining finishing allowance in the workpiece if the workpiece has been judged as to be defective, identifying whether or not the remaining finishing allowance is within the removing volume of an n-th process machine tool if there is a remaining finishing allowance, attaching the workpiece to the machine tool, and repeating the processing procedures from the finishing step if the remaining finishing allowance is within the removing volume of the n-th process machine tool;

sounding an alarm if it has been judged that the remaining finishing allowance is outside the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool; and sounding an alarm if it has been judged that there is no machine tool capable of removing the remaining finishing allowance. Accordingly, conditions for correction and reworking are determined on the basis of the result of the measurement of a machined workpiece. As a result, a highly accurate machining operation can be carried out.

Measurement and correction of a workpiece after it has been machined comprises at least the steps of:

measuring all the areas of the workpiece designated by a tolerance and a tolerance symbol after the workpiece has been machined;

correcting the positions of the tool and machine using expected values in such a way that the positions fall within allowable values at the time of the next processing;

changing measurement points on the basis of the range of tolerance;

calculating a difference between a mean value, the maximum value, and the minimum value which were obtained as a result of the measurement of the workpiece;

correcting a difference between the mean value and the center of the designated tolerance which was obtained as a result of the calculation by combination of the correction of the tool machine position and the correction of the tool position, if the workpiece has been machined with the identical tip of the identical tool; and sounding an alarm as erroneous process selection if a difference between the maximum measured value and the minimum measured value is in excess of two-third of the range of tolerance at each of the designated areas. Accordingly, the positions of a tool and a machine are corrected on the basis of the result of measurement using expected values in such a way that the positions fall within the tolerance at the next machining operation. As a result, it is possible to carry out a machining operation having superior reliability and accuracy using a learning effect.

A machine program which includes off-machine material measurement for an n-th process comprises at least the steps of:

identifying whether or not workpieces having the identical pattern are repeated, and arranging material drawings and machining patterns associated with the n-th process if the workpieces having the identical pattern are not repeated;

selecting a previous machining pattern as a material pattern of the current process, and arranging machining drawings of each process;

identifying whether or not the direction of removing has been designated;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

retrieving a fixture of a machine tool file, which was input for each machine tool in the n-th process, from input drawings using the area to be chucked as a key item;

selecting the diameter and limit length of each side to be machine as key elements, selecting fixtures which have lengths less than the limit of length, and arranging the thus selected fixtures in order of length from shortest to longest;

determining the optimum fixture common to processing by selecting a fixture which most closely fits the chucking diameter for each area to be machined, from the selected and aligned fixtures;

measuring the material outside the machine tool in the n-th process;

identifying whether or not the material should be measured in the n-th process;

identifying whether or not workpieces having the identical pattern are repeated;

initializing a repeat counter for counting the number of workpieces to be machined and a group repeat counter;

incrementing the repeat counter for counting the number of workpieces to be machined, and measuring the material outside the machine tool;

exchanging the material size with the measured size;

calculating a cutting allowance, and determining the generation of a machining pat, using the result of the exchange;

identifying whether or not the material should be measured in the n-th process, identifying whether or not the material has already been measured if it is judged that the measurement of the material in the n-th process is unnecessary, and initializing the repeat counter for measuring the number of workpieces and the group repeat counter, if it is judged that the material has already been measured;

incrementing the repeat counter for counting the number of workpieces;

executing the machining, off-machine measurement, correction, and reworking of the workpiece of the n-th process;

measuring the time required to machine the workpiece, and store the measured machining time in a file region;

identifying whether or not there is a remaining finishing allowance in the workpiece if the workpiece has been judged as to be defective as a result of the off-machine measurement in the n-th process;

identifying whether or not the remaining finishing allowance is within the removing volume of an n-th process machine tool if there is a remaining finishing allowance, and attaching the workpiece to the machine tool again if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet;

incrementing an n-th process storage number by one if the unexecuted processing has been judged as being a new machining process, and additionally storing associated process data into a storage section;

incrementing the group repeat counter by one if the repeat counter for counting the number of workpieces to be machined has already counted up to a predetermined value;

reading a measured material data file for predetermined number of times, and calculating the mean value, maximum value, and minimum value of the shape of the material by means of a statistical processing technique such as the least squares method and 3σ method;

calculating a machining path and machining time at the maximum size of the material;

adding mean processing time to the time required to measure material when the material is measured each time and then machined, and comparing the thus obtained time with the time required to machine the material into a shape and a size using the statistical processing technique, so that processing which needs fewer machining time is adopted;

identifying whether or not the group repeat counter has counted up to a predetermined value if it takes much time to machine a workpiece using the statistical method, and stopping the execution of the statistical processing associated with the remainder of the machining operations if the group repeat counter has not counted up to the predetermined value;

measuring the material outside the machine tool each time if the counter has counted up to the predetermined value, exchanging the input material size with the measured data, and determining the generation of a machining path;

machining the workpiece;

identifying whether or not there is a remaining finishing allowance in the workpiece if the workpiece has been judged as to be defective as a result of the measurement;

identifying whether or not the remaining finishing allowance is within the removing volume of the n-th process machine tool, if there is a remaining finishing allowance;

attaching the workpiece to the machine tool again, and repeating finishing of the workpiece if the remaining finishing allowance is within the removing volume of the n-th process machine tool;

identifying whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing, if it has been judged that there is a machine tool capable of removing the remaining finishing allowance, and identifying whether or not the process is a new machining process if that process has been judged as to be the unexecuted processing; and incrementing an n-th process storage number by one if the unexecuted processing has been judged as being a new machining process, and additionally storing associated process data into the storage section. Accordingly, a tool and a fixture are selected on the basis of pictorially input data, and conditions for correction and reworking are determined on the result of the measurement of a machined workpiece. As a result, it is possible to efficiently carry out a highly accurate machining operation by means of a simply input.

A machine program, which includes the function of statistically processing material in an n-th process and the function of measuring the material on a machine tool, comprises at least the steps of:

as a method of arranging a statistically processed material drawing and a machining pattern associated with the n-th process, arranging a machining pattern of each process by using a previous machining pattern as a material pattern of the current machining process;

identifying whether or not the direction of removing has been designated;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

retrieving fixtures of a machine tool file, which are input for each of the machine tools associated with the n-th process, from input drawings using the area to be chucked as a key item;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

selecting and determining a fixture best suited to each machining process if there is no fixture which can be commonly used for machining all the sides; and generating a machine program which includes the measurement of material on the machine tool in the n-th process. Accordingly, tools which are chosen according to a pattern code and a removing direction are further determined on the basis of the number of tools and productivity that are necessary for machining. An optimum fixture for machining is selected from fixtures selected by an input pattern. As a result, it is possible to carry out a highly productive machining operation in a highly reliable manner by means of simple data entry, using an optimum tool.

A machine program which includes the on-machine measurement, correction, and reworking of a workpiece comprises at least the steps of:

identifying whether or not there is a remaining finishing allowance in the workpiece if the workpiece has been judged as to be defective as a result of the on-machine measurement after the machining of the workpiece has been completed, and identifying whether or not the remaining finishing allowance is within the removing volume of an n-th process machine tool if there is a remaining finishing allowance;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet; and incrementing an n-th process storage number by one if the unexecuted processing has been judged as to be a new machining process, and additionally storing associated process data into a storage section. Accordingly, conditions for correction and reworking are determined on the basis of the result of the measurement of a machined workpiece. As a result, it is possible to efficiently carry out a highly accurate machining operation.

A machine program, which includes the function of statistically processing material in an n-th process and the function of measuring the material outside a machine tool, comprises at least the steps of:

as a method of arranging a statistically processed material drawing and a machining pattern associated with the n-th process, arranging a machining pattern of each process by using a previous machining pattern as a material pattern of the current machining process;

identifying whether or not the direction of removing has been designated;

selecting a tool for use in the n-th process;

retrieving a tool from a tool file on the basis of the direction of removing using a graphic code for each of machine tools associated with the n-th process, and searching for all tools that have a match with regard to graphical processing function codes;

selecting and determining tools best suited to processing on the basis of the maximum and minimum productivity determined by the number of tools;

selecting a fixture for use in the n-th process;

retrieving fixtures of a machine tool file, which are input for each of the machine tools associated with the n-th process, from input drawings using the area to be chucked as a key item;

selecting the diameter and limit length of each side to be machine as key elements, selecting fixtures which have lengths less than the limit of length, and arranging the thus selected fixtures in order of length from shortest to longest;

selecting a fixture, which has the most approximate chucking diameter on each side to be machined, from the selected and arranged fixtures, and determining a fixture, which can be commonly used for machining all the sides, as the best suited fixture;

selecting and determining a fixture best suited to each machining process if there is no fixture which can be commonly used for machining all the sides; and generating a machine program which includes the measurement of material outside the machine tool in the n-th process. Accordingly, tools which are chosen according to a pattern code and a removing direction are further determined on the basis of the number of tools and productivity that are necessary for machining. An optimum fixture for machining is selected from fixtures selected by an input pattern. As a result, it is possible to carry out a highly reliable machining operation in a highly productive manner by means of simple data entry, using an optimum tool.

A machine program which includes the off-machine measurement, correction, and reworking of a workpiece comprises at least the steps of:

determining whether or not the result of the measurement of the workpiece is acceptable, and identifying whether or not there is a remaining finishing allowance in the workpiece if the workpiece has been judged as to be defective;

identifying whether or not the remaining finishing allowance is within the removing volume of an n-th process machine tool if there is a remaining finishing allowance;

attaching the workpiece to the machine tool again and repeating the machining procedures from a finishing step if the remaining finishing allowance is within the removing volume of the n-th process machine tool;

determining whether or not there is a machine tool having the volume to remove the remaining finishing allowance by checking the remaining finishing allowance against the minimum removing volume stored in the machine tool file, if it has been judged that the remaining finishing allowance falls outside the removing volume of the n-th process machine tool, and sounding an alarm if it has been judged that there is no machine tool capable of removing the remaining finishing allowance;

identifying whether or not the decision process through which the machine tool capable of removing the remaining finishing allowance was selected is an unexecuted processing if there is a machine tool capable of removing the remaining finishing allowance;

identifying whether or not the process is a new machining process if that process has not been executed yet; and incrementing an n-th process storage number by one if the unexecuted machining has been judged as to be a new machining process, and additionally storing associated process data into a storage section. Accordingly, conditions for correction and reworking are determined on the basis of the result of the measurement of a machined workpiece. As a result it is possible to efficiently carry out a highly accurate machining operation.

If the data which are directly read by means of a tool diameter and specifications for a tool shank are not registered in the cutting condition file, a series of processing items are automatically executed; namely, reading more than three data items from the cutting condition file with regard to tool diameters and specifications for tool shanks which are adjacent to the specifications for the tool to be used, on the basis of the tool diameter and shank; analyzing the group of data items with use of the tool diameter and the specifications for the tool shank as parameters, whereby an approximate calculation expression is obtained; substituting the diameter of a tool to be used and specifications for the shank of that tool into the approximate calculation expression, so that cutting conditions are calculated; and storing the thus calculated cutting conditions in the machine program. Accordingly, optimum cutting conditions are also determined analogously with regard to tools which are not registered in the file. As a result, it is possible to carry out a substantially optimum machining operation whatever tool is used.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A machining method in which a numerically controlled apparatus carries out a series of operations for performing a current machining process, the series of operations including at least two of determining machining procedures, selecting a tool, preparing a workpiece, inspecting programs, performing a machining operation, and performing inspection required when a numerically controlled machine tool carries out a machining operation based on input graphics and process information, using at least a plurality of machine tool information, tool information, cutting condition information, material information, machining method symbol information, finishing symbol information, finishing allowance information, surface treatment information, information about thermal refining, and cost information, while using an electronic computer, including at least one of a numerical control unit, an FA system, and a personal computer, and a series of data processing units and machine tools, said method comprising the steps of:

registering a variety of information files;

inputting machining pattern data;

determining whether or not there are dimensional tolerance data, and if there are dimensional tolerance data, calculating a final shape and dimension of the workpiece based on said dimensional tolerance data;

judging whether or not a surface treatment is specified, and if the surface treatment is specified, calculating a form and size of the workpiece prior to being subjected to the surface treatment;

processing a finished pattern based on said machining pattern data input in said inputting step and on results of said determining step and said judging step;

ascertaining whether or not a finishing allowance is specified, and if the finishing allowance is specified, calculating a shape and size of the workpiece together with the finishing allowance;

processing a machining pattern, before the workpiece has finished undergoing a machining process other than the current machining process, based on a result ascertained in said ascertaining step;

identifying the pattern;

identifying the current machining process to be performed;

deciding whether or not material should be measured; and performing the current machining process.

2. A machining method as claimed in claim 1, wherein if measurement of the material has been judged to be unnecessary, then generating a machine program for each process, and deciding whether or not the material can be measured on the machine; and if the material can be measured on the machine, machining a workpiece in each process, measuring the workpiece on the machine, correcting the workpiece based on the measuring, reworking the workpiece if the workpiece has been judged to be defective based on the measuring, and measuring the workpiece after it has been reworked.

3. A machining method as claimed in claim 1, wherein if measurement of the material has been judged to be unnecessary, then generating a machine program for each process and deciding whether or not the material can be measured on the machine; and if the material cannot be measured on the machine, then machining a workpiece in each process, measuring the workpiece outside the machine, correcting the workpiece based on the measuring, reworking the workpiece if it has been judged as to be defective based on the measuring, and measuring the workpiece after it has been reworked.

4. A machining method as claimed in claim 1, wherein if the measurement of the material in the process has been judged to be necessary, then making a decision as to whether or not statistical processing of the material is necessary;

if the statistical processing of the material has been judged to be unnecessary, then deciding whether or not the material can be measured on the machine; and if the material can be judged on the machine, then measuring the material in each process, generating a machining program, machining a workpiece in each process, measuring the workpiece on the machine, correcting the workpiece based on the measuring, reworking the workpiece if it has been judged as to be defective based on the measuring, and measuring the workpiece after it has been reworked.

5. A machining method as claimed in claim 1, wherein if the material should be measured, then deciding whether or not the material should be measured in the machining process;

if the material should be measured in the process, then deciding whether or not statistical processing of the material is necessary;

if the statistical processing of the material has been judged to be unnecessary, then deciding whether or not the material can be measured on the machine; and if it is impossible to measure the material on the machine, then measuring the material outside the machine in each process, generating a machine program, machining a workpiece in each process, measuring the workpiece outside the machine, correcting the workpiece based on the measuring, reworking the workpiece if it has been judged as to be defective based on the measuring, and measuring the reworked workpiece.

6. A machining method as claimed in claim 1, wherein if the material should be measured, then deciding whether or not the material should be measured in the machining process;

if the material should be measured in the process, then deciding whether or not statistical processing of the material is necessary;

if the statistical processing of the material is necessary, then deciding whether or not a statistical measurement review number has been achieved;

if the statistical measurement review number has been achieved, then measuring the material, arranging data according to a result of the measurement, and deciding whether or not variations in the material fall within a tolerance, based on the result of the measurement;

if the variations are outside the tolerance, then deciding whether or not the material can be measured on the machine; and if the material can be measured on the machine, then measuring the material in each process, generating a machine program, machining a workpiece in each process, measuring the workpiece on the machine, correcting the workpiece based on the measuring, reworking the workpiece if it has been judged as to be defective based on the measuring, and measuring the reworked workpiece.

7. A machining method as claimed in claim 1, wherein if the material should be measured, then deciding whether or not the material should be measured in the machining process;

if the material should be measured in the machining process, then deciding whether or not the material should be statistically processed;

if the material should be statistically processed, then deciding whether or not a statistical processing review number has been reached;

if the statistical processing review number has been reached, then measuring the material, arranging data according to a result of the measurement, and deciding whether or not variations in the material fall within a tolerance, based on the result of the measurement;

if the variations are outside the tolerance, then deciding whether or not the material can be measured on the machine; and if it is impossible to measure the material on the machine, then measuring the material outside the machine in each process, generating a machine program, machining a workpiece in each process, measuring the workpiece outside the machine, correcting the workpiece based on the measuring, reworking the workpiece if it has been judged as to be defective based on the measuring, and measuring the reworked workpiece.

8. A machining method as claimed in claim 1, wherein if the material should be measured, then deciding whether or not the material should be measured in the machining process;

if the material should be measured in the process, then deciding whether or not the material should be statistically processed;

if the material should be statistically processed, then deciding whether or not a statistical processing review number has been reached;

if the statistical processing review number has been reached, then measuring the material, arranging data according to a result of the measurement, and deciding whether or not variations in the material fall within a tolerance, based on the result of the measurement;

if the variations are within the tolerance, then deciding whether or not the material can be measured on the machine;

if the material can be measured on the machine, then deciding whether or not a workpiece having the identical shape is repeated; and if the workpiece having the identical shape is not repeated, then generating a machine program which statistically processes the material in each process and measures the material on the machine, machining the workpiece in each process, measuring the workpiece on the machine, correcting the workpiece based on the measuring, reworking the workpiece if it has been judged as to be defective based on the measuring, and measuring the reworked workpiece.

9. A machining method as claimed in claim 1, wherein if the material should be measured, then deciding whether or not the material should be measured in the machining process;

if the material should be measured in the process, then deciding whether or not the material should be statistically processed;

if the material should be statistically processed, then deciding whether or not a statistical processing review number has been reached;

if the statistical processing review number has been reached, then measuring the material, arranging data according to a result of the measurement, and deciding whether or not variations in the material fall within a tolerance, based on the result of the measurement;

if the variations are within the tolerance, then deciding whether or not the material can be measured on the machine;

if the material can be measured on the machine, then deciding whether or not a workpiece having the identical shape is repeated; and if the workpiece having the identical shape is repeated, then machining the workpiece in each process, measuring the workpiece on the machine, correcting the workpiece based on the measuring, reworking the workpiece if it has been judged as to be defective based on the measuring, and measuring the reworked workpiece.

10. A machining method as claimed in claim 1, wherein if the material should be measured, then deciding whether or not the material should be measured in the machining process;

if the material should be measured in the process, then deciding whether or not the material should be statistically processed;

if the material should be statistically processed, then deciding whether or not a statistical processing review number has been reached;

if the statistical processing review number has been reached, then measuring the material, arranging data according to a result of the measurement, and deciding whether or not variations in the material fall within a tolerance, based on the result of the measurement;

if the variations are within the tolerance, then deciding whether or not the material can be measured on the machine;

if it is impossible to measure the material on the machine, then deciding whether or not a workpiece having the identical shape is repeated; and if the workpiece having the identical shape is not repeated, then generating a machine program which statistically processes the material in each process and measures the material outside the machine, machining the workpiece in each process, measuring the workpiece outside the machine, correcting the workpiece based on the measuring, reworking the workpiece if it has been judged as to be defective based on the measuring, and measuring the reworked workpiece.

11. A machining method as claimed in claim 1, wherein if the material should be measured, then deciding whether or not the material should be measured in the machining process;

if the material should be measured in the process, then deciding whether or not material should be statistically processed;

if the material should be statistically processed, then deciding whether or not a statistical processing review number has been reached;

if the statistical processing review number has been reached, then measuring the material, arranging data according to a result of the measurement, and deciding whether or not variations in the material fall within a tolerance, based on the result of the measurement;

if the variations are within the tolerance, then deciding whether or not the material can be measured on the machine;

if it is impossible to measure the material on the machine, then deciding whether or not a workpiece having the identical shape is repeated; and if the workpiece having the identical shape is repeated, then machining the workpiece in each process, measuring the workpiece outside the machine, correcting the workpiece based on the measuring, reworking the workpiece if it has been judged as to be defective based on the measuring, and measuring the reworked workpiece.

12. A machining method as claimed in claim 1, wherein if the material should be measured, then deciding whether or not the material should be measured in the machining process;

if the material should be measured in the process, then deciding whether or not material should be statistically processed;

if the material should be statistically processed, then deciding whether or not a statistical processing review number has been reached;

if the statistical processing review number has not been reached yet, then deciding whether or not the material can be measured on the machine;

if the material can be measured on the machine, deciding whether or not a workpiece having the identical shape is repeated; and if the workpiece having the identical shape is not repeated, then producing a machining program which statistically processes the material in each process and measures the material on the machine, machining the workpiece in each process, measuring the workpiece on the machine, correcting the workpiece based on the measuring, reworking the workpiece if it has been judged as to be defective based on the measuring, and measuring the reworked workpiece.

13. A machining method as claimed in claim 1, wherein if the material should be measured, then deciding whether or not the material should be measured in the machining process;

if the material should be measured in the process, then deciding whether or not material should be statistically processed;

if the material should be statistically processed, then deciding whether or not a statistical processing review number has been reached;

if the statistical processing review number has not been reached yet, then deciding whether or not the material can be measured on the machine;

if the material can be measured on the machine, then deciding whether or not a workpiece having the identical shape is repeated; and if the workpiece having the identical shape is repeated, then machining the workpiece in each process, measuring the workpiece on the machine, correcting the workpiece based on the measuring, reworking the workpiece if it has been judged as to be defective based on the measuring, and measuring the reworked workpiece.

14. A machining method as claimed in claim 1, wherein if the material should be measured, then deciding whether or not the material should be measured in the machining process;

if the material should be measured in the process, then deciding whether or not material should be statistically processed;

if the material should be statistically processed, then deciding whether or not a statistical processing review number has been reached yet;

if the statistical processing review number has not been reached yet, then deciding whether or not the material can be measured on the machine;

if it is impossible to measure the material on the machine, deciding whether or not a workpiece having the identical shape is repeated; and if the workpiece having the identical shape is not repeated, then producing a machine program which statistically processes the material in each process and measures the material outside the machine, machining the workpiece in each process, measuring the workpiece outside the machine, correcting the workpiece based on the measuring, reworking the workpiece if it has been judged as to be defective based on the measuring, and measuring the reworked workpiece.

15. A machining method as claimed in claim 1, wherein if the material should be measured, then deciding whether or not the material should be measured in the machining process;

if the material should be measured in the process, then deciding whether or not material should be statistically processed;

if the material should be statistically processed, then deciding whether or not a statistical processing review number has been reached yet;

if the statistical processing review number has not been reached yet, then deciding whether or not the material can be measured on the machine; if it is impossible to measure the material on the machine, deciding whether or not a workpiece having the identical shape is repeated; and if the workpiece having the identical shape is repeated, then machining the workpiece in each process, measuring the workpiece outside the machine, correcting the workpiece based on the measuring, reworking the workpiece if it has been judged as to be defective based on the measuring, and measuring the reworked workpiece.

16. A machining method as claimed in claim 1, wherein if the material should be measured, then deciding whether or not the material should be measured in the machining process;

if it is unnecessary to measure the material in the process, then deciding whether or not the material can be measured on the machine;

if the material can be measured on the machine, then deciding whether or not a workpiece having the identical shape is repeated; and if the workpiece having the identical shape is not repeated, then producing a machine program which statistically processes the material in each process and measures the material on the machine, machining the workpiece in each process, measuring the workpiece on the machine, correcting the workpiece based on the measuring, reworking the workpiece if it has been judged as to be defective based on the measuring, and measuring the reworked workpiece.

17. A machining method as claimed in claim 1, wherein if the material should be measured, then deciding whether or not the material should be measured in the machining process;

if it is unnecessary to measure the material in the process, then deciding whether or not the material can be measured on the machine;

if the material can be measured on the machine, then deciding whether or not a workpiece having the identical shape is repeated; and if the workpiece having the identical shape is repeated, then machining the workpiece in each process, measuring the workpiece on the machine, correcting the workpiece based on the measuring, reworking the workpiece if it has been judged as to be defective based on the measuring, and measuring the reworked workpiece.

18. A machining method as claimed in claim 1, wherein if the material should be measured, then deciding whether or not the material should be measured in the machining process;

if it is unnecessary to measure the material in the process, then deciding whether or not the material can be measured on the machine;

if it is impossible to measure the material on the machine, then deciding whether or not a workpiece having the identical shape is repeated; and if the workpiece having the identical shape is not repeated, then producing a machine program which statistically processes the material in each process and measures the material outside the machine, machining the workpiece in each process, machining the workpiece in each process, measuring the workpiece outside the machine, correcting the workpiece based on the measuring, reworking the workpiece if it has been judged as to be defective based on the measuring, and measuring the reworked workpiece.

19. A machining method as claimed in claim 1, wherein if it is unnecessary to measure the material in the process, then deciding whether or not the material can be measured on the machine;

if it is impossible to measure the material on the machine, then deciding whether or not a workpiece having the identical shape is repeated; and if the workpiece having the identical shape is repeated, then machining the workpiece in each process, machining the workpiece in each process, measuring the workpiece outside the machine, correcting the workpiece based on the measuring, reworking the workpiece if it has been judged as to be defective based on the measuring, and measuring the reworked workpiece.

* * * * *